US012778167B2

(12) United States Patent
McGrane et al.

(10) Patent No.: US 12,778,167 B2
(45) Date of Patent: Nov. 3, 2026

(54) FLAVOR COMPOSITIONS AND PET FOOD PRODUCTS CONTAINING THE SAME

(71) Applicant: MARS, INCORPORATED, McLean, VA (US)

(72) Inventors: Scott Joseph McGrane, Leicestershire (GB); Andrew John Taylor, Loughborough (GB); Richard Masten Fine, Oradell, NJ (US); Jerry Wallace Skiles, Oradell, NJ (US)

(73) Assignee: MARS, INCORPORATED, McLean, VA (US)

( * ) Notice: Subject to any disclaimer, the term of this patent is extended or adjusted under 35 U.S.C. 154(b) by 537 days.

(21) Appl. No.: 15/534,440

(22) PCT Filed: Dec. 10, 2015

(86) PCT No.: PCT/US2015/065036
§ 371 (c)(1),
(2) Date: Jun. 8, 2017

(87) PCT Pub. No.: WO2016/094682
PCT Pub. Date: Jun. 16, 2016

(65) Prior Publication Data

US 2019/0021380 A1 Jan. 24, 2019

Related U.S. Application Data

(60) Provisional application No. 62/090,138, filed on Dec. 10, 2014.

(51) Int. Cl.
*A23L 27/23* (2016.01)
*A23K 20/111* (2016.01)
(Continued)

(52) U.S. Cl.
CPC ............ *A23L 27/23* (2016.08); *A23K 20/111* (2016.05); *A23K 20/132* (2016.05);
(Continued)

(58) Field of Classification Search
CPC .. A23K 20/142; A23K 20/132; A23K 20/153; A23K 20/111; A23K 50/42;
(Continued)

(56) References Cited

U.S. PATENT DOCUMENTS 2,948,714 A * 8/1960 Amiard .................... C07K 1/06 548/496
3,759,933 A 9/1973 Robison et al.
(Continued)

FOREIGN PATENT DOCUMENTS

CA 2 646 992 A1 9/2007
CN 1 937 930 A 3/2007
(Continued)

OTHER PUBLICATIONS

Erlanger et al., "Improved Synthesis of Amino Acid Benzyl Esters", Nov. 1954, J. Am. Chem. Soc, vol. 76, Issue 22, pp. 5781-5782 (Year: 1954).*
(Continued)

*Primary Examiner* — Emily M Le
*Assistant Examiner* — Tynesha L McClain
(74) *Attorney, Agent, or Firm* — Baker Botts L.L.P.

(57) ABSTRACT

A flavor composition comprising at least one transmembrane compound and/or at least one nucleotide derivative that modulates, increases and/or enhances the activity of an umami receptor is provided that can be used to enhance the umami taste and/or palatability of food products. In certain, non-limiting embodiments, the flavor composition comprises at least one nucleotide derivative and/or at least one transmembrane compound, optionally at least one nucleo-
(Continued)

tide, optionally at least one first amino acid, optionally at least one second amino acid.

12 Claims, 137 Drawing Sheets

Specification includes a Sequence Listing.

(51) Int. Cl.
*A23K 20/132* (2016.01)
*A23K 20/142* (2016.01)
*A23K 20/153* (2016.01)
*A23K 50/42* (2016.01)
*A23K 50/48* (2016.01)
*A23L 27/00* (2016.01)
*A23L 27/20* (2016.01)
*A23L 27/21* (2016.01)
*A23L 27/22* (2016.01)

(52) U.S. Cl.
CPC .......... *A23K 20/142* (2016.05); *A23K 20/153* (2016.05); *A23K 50/42* (2016.05); *A23K 50/48* (2016.05); *A23L 27/204* (2016.08); *A23L 27/21* (2016.08); *A23L 27/22* (2016.08); *A23L 27/235* (2016.08); *A23L 27/88* (2016.08); *A23V 2002/00* (2013.01)

(58) Field of Classification Search
CPC ......... A23K 50/48; A23K 50/40; A23L 27/21; A23L 27/88; A23L 27/204; A23L 27/235; A23L 27/22; A23L 27/23; A23V 2002/00
See application file for complete search history.

(56) References Cited

U.S. PATENT DOCUMENTS

| | | | |
|---|---|---|---|
| 3,832,471 | A | 8/1974 | Siregar |
| 4,144,341 | A | 3/1979 | Clark et al. |
| 4,267,195 | A | 5/1981 | Boudreau et al. |
| 4,597,970 | A | 7/1986 | Sharma et al. |
| 4,722,845 | A | 2/1988 | Cherukuri et al. |
| 4,804,549 | A | 2/1989 | Howley et al. |
| 4,826,824 | A | 5/1989 | Schiffman |
| 5,256,330 | A | 10/1993 | Koyama et al. |
| 6,166,076 | A | 12/2000 | Gilbertson |
| 7,368,285 | B2 | 5/2008 | Zoller et al. |
| 7,476,399 | B2 | 1/2009 | Tachdjian et al. |
| 7,527,944 | B2 | 5/2009 | Li et al. |
| 7,867,540 | B2 | 1/2011 | Didzbalis et al. |
| 8,008,525 | B2 | 8/2011 | Fukatsu et al. |
| 8,124,361 | B2 | 2/2012 | Slack et al. |
| 8,148,536 | B2 | 4/2012 | Shigemura et al. |
| 8,399,204 | B2 | 3/2013 | Sekiya et al. |
| 10,827,772 | B2 | 11/2020 | McGrane et al. |
| 2003/0199566 | A1* | 10/2003 | Bok ...................... C07C 235/34 514/397 |
| 2005/0084506 | A1 | 4/2005 | Tachdjian et al. |
| 2005/0124053 | A1 | 6/2005 | Moen et al. |
| 2005/0142169 | A1 | 6/2005 | Imafidon et al. |
| 2006/0045953 | A1 | 3/2006 | Tachdjian et al. |
| 2006/0052345 | A1 | 3/2006 | Shcherbakova et al. |
| 2006/0263411 | A1 | 11/2006 | Tachdjian et al. |
| 2008/0066195 | A1 | 3/2008 | Li et al. |
| 2010/0009986 | A1 | 1/2010 | Zemolka et al. |
| 2010/0196536 | A1 | 8/2010 | Palzer et al. |
| 2011/0027346 | A1* | 2/2011 | Weiner ...................... A61P 7/00 424/450 |
| 2011/0143002 | A1 | 6/2011 | Yamaguchi et al. |
| 2011/0224210 | A1* | 9/2011 | Aissaoui ............... C07C 237/22 514/235.5 |
| 2011/0311459 | A1* | 12/2011 | Amari .................. C07D 453/02 424/43 |
| 2012/0046309 | A1 | 2/2012 | Kirsch et al. |
| 2012/0315223 | A1* | 12/2012 | Ramirez ................. A61P 43/00 424/49 |
| 2013/0071547 | A1 | 3/2013 | Damak et al. |
| 2013/0196050 | A1 | 8/2013 | Amino et al. |
| 2013/0209625 | A1 | 8/2013 | Brand |
| 2014/0127144 | A1 | 5/2014 | Yang et al. |
| 2015/0250210 | A1 | 9/2015 | Taylor et al. |
| 2015/0257412 | A1 | 9/2015 | Mcgrane et al. |
| 2015/0257415 | A1 | 9/2015 | Mcgrane et al. |
| 2015/0282506 | A1 | 10/2015 | Taylor et al. |
| 2016/0209430 | A1 | 7/2016 | Mcgrane et al. |
| 2017/0367387 | A1 | 12/2017 | Mcgrane et al. |
| 2018/0255813 | A1 | 9/2018 | Mcgrane et al. |
| 2020/0397030 | A1 | 12/2020 | McGrane et al. |
| 2023/0248037 | A1 | 8/2023 | McGrane et al. |

FOREIGN PATENT DOCUMENTS

| | | | | |
|---|---|---|---|---|
| CN | 103012551 | A | | 4/2013 |
| DE | 154818 | A | | 4/1982 |
| EP | 0 488 682 | A1 | | 6/1992 |
| EP | 1 344 459 | A1 | | 9/2003 |
| EP | 2 042 043 | A1 | | 4/2009 |
| EP | 2 119 372 | A1 | | 11/2009 |
| EP | 2 622 970 | A1 | | 8/2013 |
| EP | 2620060 | A4 | | 3/2015 |
| JP | 4642932 | B | * | 12/1971 |
| JP | H 03206853 | A | | 9/1991 |
| JP | 2001163842 | A | * | 6/2001 |
| JP | 2002-101843 | A | | 4/2002 |
| JP | 2015105826 | A | | 6/2015 |
| RU | 2410383 | C2 | | 1/2011 |
| WO | WO0160178 | A1 | | 8/2001 |
| WO | 2001/093874 | A1 | | 12/2001 |
| WO | WO 2005/041684 | A2 | | 5/2005 |
| WO | WO 2007/047988 | A2 | | 4/2007 |
| WO | 2007134613 | | | 11/2007 |
| WO | WO 2007/121604 | A2 | | 11/2007 |
| WO | WO 2007/124152 | A2 | | 11/2007 |
| WO | WO 2009/007424 | A1 | | 1/2009 |
| WO | WO 2010/108542 | A1 | | 9/2010 |
| WO | WO 2010/129665 | A2 | | 11/2010 |
| WO | WO 2011/067202 | A1 | | 6/2011 |
| WO | WO 2011/069958 | A2 | | 6/2011 |
| WO | WO 2012/013480 | A1 | | 2/2012 |
| WO | WO 2013/010991 | A1 | | 1/2013 |
| WO | 2013139341 | | | 9/2013 |
| WO | 2013149012 | | | 10/2013 |
| WO | WO 2014/068043 | A1 | | 5/2014 |
| WO | WO 2014/068044 | A1 | | 5/2014 |
| WO | WO 2014/068045 | A1 | | 5/2014 |
| WO | WO 2014/068047 | A1 | | 5/2014 |
| WO | 2016094682 | A2 | | 6/2016 |
| WO | 2016094690 | A1 | | 6/2016 |

OTHER PUBLICATIONS

Machine Translation of Chlorella Ind Co, JP4642932 B, Dec. 1971 (Year: 1971).*

Machine translation of Noritake et al., JP 2001163842, Jun. 2001 (Year: 2001).*

Arnold, et al., "The Swiss Model Workspace: A Web-Based Environment for Protein Structure Homology Modelling", Bioinformatics, vol. 22, pp. 195-201 (Jan. 2005).

Berman, et al., Nucleic Acids Research, vol. 28, p. 235-242 (Jan. 2000).

Briscoe, et al., "The orphan G Protein-coupled Receptor GPR40 is Activated by Medium and Long Chain Fatty Acids", Journal of Biological Chemistry, American Society for Biochemistry and Molecular Biology, vol. 278, No. 13, pp. 11303-11311 (Mar. 28, 2003).

Cartoni, et al., "Taste Preference for Fatty Acids is Mediated by GPR40 and GPR120", Journal of Neuroscience, vol. 30, No. 25, pp. 8376-8382 (Jun. 23, 2010).

Cline, "Perspectives for Gene Therapy: Inserting New Genetic Information into Mammalian Cells by Physical Techniques and Viral Vectors", Pharmac. Ther., vol. 29, pp. 69-92, 1985.

(56) References Cited

OTHER PUBLICATIONS

Cotten, et al., "Receptor-Mediated Transport of DNA into Eurkaryotic Cells", Methods in Enzymology, vol. 217 (1993), pp. 618-644.
Dore, et al., "Structure of class C GPCR metabotropic glutamate receptor 5 transmembrane domain", Nature Jul. 31, 2014; 511(7511):557-62, Epub Jul. 6, 2014, Abstract Only (2 pgs.).
Eswar, et al., "Comparative Protein Structure Modeling Using Modeller", Curr Protoc Bioinformatics, Supplement 15, 5.6.1-5.6.30, 47 pages (Oct. 2006).
Godinot, et al., "Activation of tongue-expressed GPR40 and GPR120 by non-caloric agonists is not sufficient to drive preference in mice", Neuroscience, vol. 250, pp. 20-30 (Jul. 2013).
Hudson, et al., "The Molecular Basis of Ligand Interaction at Free Fatty Acid Receptor 4 (FFA4/GPR120)", The Journal of Biological Chemistry, vol. 289, pp. 20345-20358, Jul. 2014.
Jovanovic, et al., "Substituent and solvent effects on tautomeric equilibria of barbituric acid derivatives isoterically related compounds", Journal of Heterocyclic Chemistry, vol. 24, No. 1, pp. 191-204 (Jan. 1, 1987).
Kawai, et al., "Taste Enhancements Between Various Amino Acids and IMP", Chemical Senses and Flavor, vol. 27, No. 8, pp. 739-745 (Oct. 1, 2002).
Kunishima, et al., Nature, vol. 407, p. 971-977 (Oct. 2000).
Loeffler, et al., "Gene Transfer into Primary and Established Mammalian Cell Lines with Lipopolyamine-Coated DNA", Methods in Enzymology, vol. 217 (Mar. 1993), 599-618.
Lopez-Cascales, et al., "Binding of glutamate to the umami receptor", Biophysical Chemistry, North-Holland, Amsterdam, NL, vol. 152, No. 1-3, pp. 139-144 (Nov. 1, 2010).
Martin, et al., "The Lipid Sensor Candidates CD36 and GPR120 are Differentially Regulated by Dietary Lipids in Mouse Taste Buds: Impact on Sponganeous Fat Preference", PLoS one, Aug. 2011, 6(8), e24014, 9 pages.
Rasmussen, et al., "Crystal Structure of the Beta Adrenergic Receptor-Gs Protein Complex", Nature, (Jul. 2011) 477: 549-555.
Reed, et al., "Diverse tastes: Genetics of Sweet and Bitter Perception", Physiology and Behavior, Elsevier Science, Ltd., Oxford, GB, vol. 88, No. 3, pp. 215-226 (Jun. 30, 2006).
Shimpukade, et al., "Discovery of a Potent and Selective GPR120 Agonist", Journal of Medicinal Chemistry, vol. 55, No. 9, pp. 4511-4515 (Apr. 23, 2012).
Toda, et al., "Two Distinct Determinants of Ligan Specificity in T1R1/T1R3 (the Umami Taste Receptor)", The Journal of Biological Chemistry, vol. 288, No. 52, pp. 36863-36877, Dec. 27, 2013.
Wu, et al., "Structure of a Class C GPCR Metabotropic Glutamate Receptor 1 Bound to an Allosteric Modulator", Science Apr. 4, 2014; vol. 344, p. 58-64.
Wu, et al., "Structure of the Human Kappa Opioid Receptor in Complex with JDTic", Nature, (Mar. 2012) 485:327-332.
Wu, et al., "Structures of the CXC4 Chemokine Receptor in Compex with Small Molecule and cyclic Peptide Antagonists", Science, (Nov. 2010), 330:1066-1071.
Xu, et al., "Different Functional Roles of TiR Subunits in the Heteromeric Taste Receptors", Proceedings of the National Academy of Sciences, National Academy of Sciences, vol. 101, No. 39, pp. 14258-14263 (Sep. 28, 2004).
Yang, et al., Nature Methods vol. 12:7-8 (Jan. 2015).
Yoshii, et al., "Synergisitic Effects of 5'-Nucleotides on Rat Taste Responses to Various Amino Acids", Brain Research, Faculty of Pharmaceutical Sciences, Hokkaido Univ., 367 (1986), 45-51, accepted Jul. 2, 1985.
Zhang, et al., "GPCR-I-TASSER: A Hybrid Approach to G Protein Coupled Receptor Structure Modeling and the Application to the Human Genome", Structure, Aug. 2015, 23(8):1538-1549.
Zhang, et al., "Molecular mechanism for the umami taste synergism", Proceedings of the National Academy of Sciences, vol. 105, No. 52, pp. 20930-20934 (Dec. 30, 2008).
U.S. Appl. No. 15/534,413 (US 2018/0168208), filed Jun. 8, 2017 (Dec. 28, 2017).
U.S. Appl. No. 15/534,421, filed Jun. 8, 2017.
U.S. Appl. No. 15/534,434, filed Jun. 8, 2017.
International Search Report mailed Apr. 5, 2016 in International Application No. PCT/US2015/065046.
International Search Report mailed Aug. 2, 2016 in International Application No. PCT/US2015/065036.
International Search Report mailed Jul. 19, 2016 in International Application No. PCT/US2015/065106.
International Search Report mailed Jun. 30, 2016 in International Application No. PCT/US2015/065067.
"Sarcosine—Wikipedia", Oct. 23, 2014, https://en.wikipedia.org/w/index.php?titile=Sarcosine&oldid=630844266, 8 pgs.
Kurihara, et al., "Introductory Remarks on Umami Taste", Annals of the New York Academy of Sciences, vol. 855, Nov. 1998, pp. 393-397.
Li, et al., "Cats Lack a Sweet Taste Receptor", The Journal of Nutrition, 136(7 Suppl):1932S-1934S, Jul. 2006.
Festring et al., "Systematic Studies on the Chemical Structure and Umami Enhancing Activity of Maillard-Modified Guanosine 5'-Monophostates," J. Agric. Food Chem. 59: 665-676 (2011).
Database UniProt [online], Accession No. M3VV68, May 1, 2013, Internet: URL: https://www.uniprot.org/uniprot/M3VV68.txt?version=1, (2 pgs.).
Sigel et al., "Comparison of the Metal Ion Coordinating Properties of Tubercidin 5'-Monophosphate (7-Deaza-AMP) with Those of Adenosine 5'-Monophosphate (AMP) and 1, N6-Ethenoadenosine 5'-Monophosphate (e-AMP). Definite Evidence for Metal Ion-Base Backbinding to N-7 and Extent of Macrochelate Formulation in M(AMP) and M(e-AMP)," J. Am. Chem. Soc 110:6857-6865 (1988).
Cairoli, Paola, et al., Studies on Umami Tast. Synthesis of New Guanosine 5'-Phasphate Derivatives and Their Synergistic Effect with Monosodium Glutamate, J. Agric. Food Chem., Jan. 9, 2008, pp. 1043-1050, vol. 56, No. 3.
Festring, Daniel, et al., Stereoselective Synthesis of Amides Sharing the Guanosine 5'-Monophosphate Scaffold and Umami Enhancement Studies Using Human Sensory and hT1R1/rT1R3 Receptor Assays, J. Agric. Good Chem., Jul. 19, 2011, pp. 8875-8885, vol. 59, No. 16.
Hong-Yih Ou et al., Activation of Free Fatty Acid Receptor 1 Improves Hepatic Steatosis Through a p38-Dependent Pathway, Journal of Molecular Endocrinology, 2014, 165-174, 53.
Narukawa, et al., Characterization of umami receptor and coupling G protein in mouse taste cells, NeuroReport, May 9, 2008, pp. 1169-1173, vol. 19, No. 12.
Suess, B, et al., Human taste and umami receptor responses to chemosensorica generated by Maillard-type N2-alkyl- and N2-arylthiomethylation of guanosine 5'-monophosphates, J. Agric. Food Chem, Nov. 26, 2014, pp. 11429-11440, vol. 62, No. 47.
Wang Fang et al., "Condiment Production Process," pp. 340-341, Yanbian People's Press (Mar. 31, 2003) (with English translation).
Dang et al., "Interaction Between Umami Peptide and Tate Receptor T1R1/T1R3," Cell Biochem Biophys 70:1841-1848 (2014).
Rajabi, et al. "Structure-activity relationship of 2,4,5-trioxoimidazolidines as inhibitors of thymidine phosphorylase", European Journal of Medicinal Chemistry, 46:1165-1171 (2011).
Nelson et al., "An amino-acid taste receptor," Nature, 416, 199-202 (2002).
U.S. Appl. No. 15/534,413, Feb. 11, 2023 Non-Final Office Action.
Machine Translation of Fukuda et al., JP 2002101843A, Apr. 2002.
Machine Translation of Beckert et al. DD 154818, Apr. 1982.
Non-Final Office Action dated Apr. 10, 2025 in U.S. Appl. No. 15/534,413.

* cited by examiner

| Name (full chemical name) | CAS |
|---|---|
| GMP | 5550-12-9 |

| Name (full chemical name) | CAS |
|---|---|
| 2'-Deoxyadenosine-3', 5'-O-bisphosphate | 16174-58-6 |

| Name (full chemical name) | CAS |
| --- | --- |
| Inosine 5'-diphosphate (IDP) sodium salt | 81012-88-6 |

| Name (full chemical name) | CAS |
|---|---|
| 2'-/3'-O-(2-Aminoethyl carbamoyl)adenosine-5'-O -monophosphate; 2'-/3'-AEC-5'-AMP | N/A |

| Name (full chemical name) | CAS |
|---|---|
| 2'-/3'-O-(2-Aminoethyl carbamoyl)guanosine-5'-O-monophosphate; 2'-/3'-AEC-5'-GMP | N/A |

| Name (full chemical name) | CAS |
|---|---|
| Inosine Triphosphate (ITP) trisodium salt | 35908-31-7 |

| Name (full chemical name) | CAS |
|---|---|
| N6-Benzoyladenosine-5'-O-monophosphate; 6-Bnz-5'-AMP | 40871-55-4 |

| Name (full chemical name) | CAS |
|---|---|
| Adenosine 5'-O-thiomonophosphate dilithium salt | 93839-85-1 |

| Name (full chemical name) | CAS |
|---|---|
| Adenosine 3', 5' diphosphate sodium salt + Ala (1:1000) | 75431-54-8 |

| Name (full chemical name) | CAS |
|---|---|
| Adenosine 3', 5' diphosphate sodium salt + Ala (1:100) | 75431-54-8 |

| Name (full chemical name) | CAS |
| --- | --- |
| Adenosine 3', 5' diphosphate sodium salt + Ala (1:10) | 75431-54-8 |

| Name (full chemical name) | CAS |
|---|---|
| Adenosine 3', 5' diphosphate sodium salt | 75431-54-8 |

| IMP Control | T1R1/T1R3 $EC_{50}$ |
|---|---|
| alone in buffer | 0.17 ± 0.01 mM |
| +20 mM L-alanine | 0.14 ± 0.04 mM |
| +0.2 mM IMP | – |
| +20 mM L-alanine + 0.2 mM IMP | – |

| Name (full chemical name) | CAS |
|---|---|
| 1-benzyl-3-(2-oxo-2-phenylethyl)imidazolidine-2,4,5-trione | NA |

| Name (full chemical name) | CAS |
|---|---|
| 1-(2-bromophenyl)-3-((1R,2S)-2-hydroxy-2,3-dihydro-1H -inden-1-yl)urea | NA |

| Name (full chemical name) | CAS |
| --- | --- |
| N-(benzo[d][1,3]dioxol-5-yl)-2-propylpentanamide | NA |

| Name (full chemical name) | CAS |
|---|---|
| N-(heptan-4-yl)benzo[d][1,3]dioxole-5-carboxamide | 745047-51-2 |

| Name (full chemical name) | CAS |
|---|---|
| N-(2-amino-2-oxo-1-phenylethy1)-3-chloro-4,5-<br>-dimethoxybenzamide | NA |

| Name (full chemical name) | CAS |
|---|---|
| (E)-3-(4-methoxyphenyl)-N-(pentan-3-yl)acrylamide | NA |

| Name (full chemical name) | CAS |
|---|---|
| 2-((5-(4-(methylthio)phenyl)-2H-tetrazol-2-yl)methyl)pyridine | NA |

| Name (full chemical name) | CAS |
|---|---|
| GMP + Phe + N-(heptan-4-yl)benzo[d][1,3]dioxole-5-carboxamide (1:30:10) | NA |

TM = N−(heptan−4−yl)benzo[d][1,3]dioxole−5−carboxamide

| Name (full chemical name) | CAS |
|---|---|
| 1,3-dibenzylpyrimidine-2,4,6(1H,3H,5H)-trione | NA |

| Name (full chemical name) | CAS |
|---|---|
| 1,3-dibenzylpyrimidine-2,4,6(1H,3H,5H)-trione | NA |

| Name (full chemical name) | CAS |
| --- | --- |
| 4-benzyl-3-butyl-1-(2-oxo-2-(pyrrolidin-1-yl)ethyl)-1H-1,2,4-triazol-5(4H)-one | NA |

| Name (full chemical name) | CAS |
|---|---|
| 4-benzyl-3-butyl-1-(2-oxo-2-(pyrrolidin-1-yl)ethyl)-1H-1,2,4-triazol-5(4H)-one | NA |

| Name (full chemical name) | CAS |
|---|---|
| 2-((3,5-dichlorophenyl)carbamoyl)cyclohexanecarboxylic acid | NA |

| Name (full chemical name) | CAS |
| --- | --- |
| 2-((3,5-dichlorophenyl)carbamoyl)cyclohexanecarboxylic acid | NA |

| Name (full chemical name) | CAS |
|---|---|
| 4-acetamido-N-(1-(2-hydroxyethyl)-3-phenyl-1H-pyrazol-5-yl)benzamide | NA |

| Name (full chemical name) | CAS |
|---|---|
| 4-acetamido-N-(1-(2-hydroxyethyl)-3-phenyl-1H-pyrazol-5-yl)benzamide | NA |

| Name (full chemical name) | CAS |
|---|---|
| (Diphenylacetyl)-carbamic acid ethyl ester | 302841-86-7 |

| Name (full chemical name) | CAS |
|---|---|
| (Diphenylacetyl)-carbamic acid ethyl ester | 302841-86-7 |

| Name (full chemical name) | CAS |
|---|---|
| N,N'-(butane-1,4-diyl)dinicotinamide | NA |

| Name (full chemical name) | CAS |
|---|---|
| N,N'−(butane−1,4−diyl)dinicotinamide | NA |

| Name (full chemical name) | CAS |
|---|---|
| N-phenethylnicotinamide | NA |

| Name (full chemical name) | CAS |
|---|---|
| N−phenethylnicotinamide | NA |

| Name (full chemical name) | CAS |
|---|---|
| 2-amino-N-phenethylbenzamide | NA |

| Name (full chemical name) | CAS |
|---|---|
| 2-amino-N-phenethylbenzamide | NA |

| Name (full chemical name) | CAS |
|---|---|
| N-phenethylbenzo[d][1,3]dioxole-5-carboxamide | NA |

| Name (full chemical name) | CAS |
|---|---|
| N-phenethylbenzo[d][1,3]dioxole-5-carboxamide | NA |

| Name (full chemical name) | CAS |
|---|---|
| N-phenethylbenzamide | NA |

| Name (full chemical name) | CAS |
|---|---|
| N-phenethylbenzamide | NA |

| Name (full chemical name) | CAS |
|---|---|
| N-Benzoyl-DL-Leucinamide | NA |

| Name (full chemical name) | CAS |
|---|---|
| N-Benzoyl-DL-Leucinamide | NA |

| Name (full chemical name) | CAS |
|---|---|
| N-(2-(1H-Indol-3-yl)ethyl)nicotinamide | 29876-14-0 |

| Name (full chemical name) | CAS |
|---|---|
| N-(2-(1H-Indol-3-yl)ethyl)nicotinamide | 29876-14-0 |

| Name (full chemical name) | CAS |
|---|---|
| N-Benzyl-L-phenylalanine methyl ester hydrochloride | 2119751 |

| Name (full chemical name) | CAS |
|---|---|
| N-Benzyl-L-phenylalanine methyl ester hydrochloride | 2119751 |

| Name (full chemical name) | CAS |
|---|---|
| 6-Thioguanosine-5'-O-diphosphate(6-T-GDP) | 16541-19-8 |

| Name (full chemical name) | CAS |
|---|---|
| 6-Thioguanosine-5'-O-diphosphate(6-T-GDP) | 16541-19-8 |

| Name (full chemical name) | CAS |
|---|---|
| 6-Chloropurine riboside-5'-O-triphosphate(6-Cl-PuTP) | 55673-61-5 |

| Name (full chemical name) | CAS |
|---|---|
| 6-Chloropurine riboside-5'-O-triphosphate(6-Cl-PuTP) | 55673-61-5 |

T1R1/T1R3 Agonist profiling for:

1-benzyl-3-(2-(3,4-dihydro-2H-benzo[b][1,4]dioxepin-7-yl)-2-oxoethyl) imidazolidine-2,4,5-trione 1-benzyl-3-(2-(3,4-dihydro-2H-benzo[b][1,4]dioxepin-7-yl)-2-oxoethyl) imidazolidine-2,4,5-trione T1R1/T1R3 PAM profiling for:

1-benzyl-3-(2-(3,4-dihydro-2H-benzo[b][1,4]dioxepin-7-yl)-2-oxoethyl) imidazolidine-2,4,5-trione 1-benzyl-3-(2-(3,4-dihydro-2H-benzo[b][1,4]dioxepin-7-yl)-2-oxoethyl) imidazolidine-2,4,5-trione T1R1/T1R3 PAM profiling for:

1-benzyl-3-(2-(3,4-dihydro-2H-benzo[b][1,4]dioxepin-7-yl)-2-oxoethyl) imidazolidine-2,4,5-trione 1-benzyl-3-(2-(3,4-dihydro-2H-benzo[b][1,4]dioxepin-7-yl)-2-oxoethyl) imidazolidine-2,4,5-trione T1R1/T1R3 Agonist/PAM profiling for:

1-benzyl-3-(2-(3,4-dihydro-2H-benzo[b][1,4]dioxepin-7-yl)-2-oxoethyl)imidazolidine-2,4,5-trione MAX= 100mM L-Ala + 1mM GMP
MIN= Tyrode's buffer T1= 0.03 GMP + 100 Ala
T2= 0.6 GMP + 10 Ala
T3= 0.1 GMP + 60 Ala
T4= 0.3 GMP + 60 Ala T1R1/T1R3 Agonist profiling for:

1-benzyl-3-(2-(5-chlorothiophen-2-yl)-2-oxoethyl)imidazolidine-2,4,5-trione 1-benzyl-3-(2-(5-chlorothiophen-2-yl)-2-oxoethyl)imidazolidine-2,4,5-trione T1R1/T1R3 PAM profiling for:

1-benzyl-3-(2-(5-chlorothiophen-2-yl)-2-oxoethyl)imidazolidine-2,4,5-trione 1-benzyl-3-(2-(5-chlorothiophen-2-yl)-2-oxoethyl)imidazolidine-2,4,5-trione T1R1/T1R3 PAM profiling for:

1-benzyl-3-(2-(5-chlorothiophen-2-yl)-2-oxoethyl)imidazolidine-2,4,5-trione 1-benzyl-3-(2-(5-chlorothiophen-2-yl)-2-oxoethyl)imidazolidine-2,4,5-trione T1R1/T1R3 Agonist/PAM profiling for:1-benzyl-3-(2-(5-chlorothiophen-2-yl)-2-oxoethyl)imidazolidine-2,4,5-trione T1R1/T1R3 Agonist/PAM profiling for:1-benzyl-3-(2-(5-chlorothiophen-2-yl)-2-oxoethyl)imidazolidine-2,4,5-trione: Mock Control T1R1/T1R3 Agonist profiling for:

N-(heptan-4-yl)benzo[d][1,3]dioxole-5-carboxamide

N-(heptan-4-yl)benzo[d][1,3]dioxole-5-carboxamide

T1R1/T1R3 PAM profiling for:
N-(heptan-4-yl)benzo[d][1,3]dioxole-5-carboxamide

Subtraction of response from uninduced cells

○ Without compound (EC50=0.76)
■ With compound 0.3mM
◆ With compound 0.3mM (uninduced cells)
● Without compound (uninduced cells)
△ With compound 0.3mM - With compound 0.3mM (uninduced cells) (EC50=0.04)

N-(heptan-4-yl)benzo[d][1,3]dioxole-5-carboxamide

T1R1/T1R3 Agonist/PAM profiling for: N-(heptan-4-yl)benzo[d][1,3]dioxole-5-carboxamide T1R1/T1R3 Agonist/PAM profiling for:
N-(heptan-4-yl)benzo[d][1,3]dioxole-5-carboxamide: Mock Control T1R1/T1R3 Agonist profiling for:

N-Benzyl-L-phenylalanine methyl ester hydrochloride

Benzyl-L-phenylalanine methyl ester hydrochloride

T1R1/T1R3 Agonist/PAM profiling for:
N-Benzyl-L-phenylalanine methyl ester hydrochloride T1R1/T1R3 Agonist/PAM profiling for:
N-Benzyl-L-phenylalanine methyl ester hydrochloride: Mock Control T1R1/T1R3 Agonist profiling for:

N-Benzyl-D-Phenylalanine methyl ester hydrochloride

N-Benzyl-D-Phenylalanine methyl ester hydrochloride

T1R1/T1R3 PAM profiling for:
N-Benzyl-D-Phenylalanine methyl ester hydrochloride N-Benzyl-D-Phenylalanine methyl ester hydrochloride T1R1/T1R3 Agonist/PAM profiling for:
N-Benzyl-D-Phenylalanine methyl ester hydrochloride T1R1/T1R3 Agonist/PAM profiling for:
N-Benzyl-D-Phenylalanine methyl ester hydrochloride: Mock Control T1R1/T1R3 Agonist profiling for:

Benzyl-L-leucine methyl ester hydrochloride

Benzyl-L-leucine methyl ester hydrochloride

T1R1/T1R3 Agonist/PAM profiling for: Mock Control
Benzyl-L-leucine methyl ester hydrochloride T1R1/T1R3 Agonist profiling for:

Methyl-2-benzylamino-2-phenylacetate

Methyl-2-benzylamino-2-phenylacetate

T1R1/T1R3 Agonist profiling for:

L–Phenylalanine benzyl ester hydrochloride

L–Phenylalanine benzyl ester hydrochloride

T1R1/T1R3 Agonist/PAM profiling for:
L-Phenylalanine benzyl ester hydrochloride

T1R1/T1R3 Agonist/PAM profiling for:
L-Phenylalanine benzyl ester hydrochloride: Mock Control T1R1/T1R3 Agonist profiling for:

1,3-dibenzylpyrimidine-2,4,6(1H,3H,5H)-trione 1,3-dibenzylpyrimidine-2,4,6(1H,3H,5H)-trione T1R1/T1R3 PAM profiling for:

1,3-dibenzylpyrimidine-2,4,6(1H,3H,5H)-trione 1,3-dibenzylpyrimidine-2,4,6(1H,3H,5H)-trione Cat T1R1 nucleic acid sequence (SEQ ID NO:1):

ATGTCACTCCCGGCGGCTCACCTGGTCGGCCTGCAGCTCTCCCTCTCCTGCTGCTGG
GCTCTCAGCTGCCACAGCACAGAGACGTCTGCCGACTTCAGCCTCCCTGGGGATTAC
CTCCTCGCAGGTCTGTTCCCTCTGCACTCTGACTGTCCGGGCGTGAGGCACCGGCCC
ACGGTGACCCTCTGTGACAGGCCCGACAGCTTCAACGGTCACGGCTACCACCTCTTC
CAGGCCATGCGGTTTGGCATCGAGGAGATAAACAACTCCACGGCCCTCCTGCCGAA
CGTCACCCTGGGATACCAGCTGTACGACGTGTGCTCGGAGTCTGCCAACGTGTATGC
CACACTAAACGTGCTCTCCCTGCTGGGGACACATCACGTAGAGATCCGAGCAGACC
CTTCCCACTATTCGCCCGCCGCCCTGGCTGTCATTGGGCCTGACACCACCAACCACG
CAGCCACCACTGCAGCCCTGCTGAGCCCCTTCCTGGTGCCCCTGATCAGCTACGAGG
CCAGCAGCGTGACGCTCGGAGTGAAGCGGCATTACCCCTCGTTTCTGCGCACCATCC
CCAGCGACAAGCACCAGGTGGAGGCCATGGTGCTGCTGCTGCAGAGCTTCGGGTGG
GTCTGGATCTCGGTGGTCGGCAGCGACGGCGACTACGGGCAGCTGGGGGTGCAGGC
GCTGGAGGAGCAGGCCACCCAGCAGGGCATCTGCGTTGCCTTCAAGGACATCATCC
CCTTCTCTGCCCGGCCGGGCGACGAGAGGATGCAGGGCATCATGCACCACCTGGCC
CGAGCGAGGACCACCGTTGTGGTCGTTTTCTCCAGCAGGCAGCTGGCCAGGGTGTTC
TTTGAGTCGGTGGTGCTGGCCAACCTGACTGCCAAGGTGTGGATCGCCTCAGAAGAC
TGGGCCATCTCTAGACACATCAGCAATGTGCCCGGGATCCAGGGCATTGGCACAGT
GCTGGGTGTGGCCATCCAGCAGAGGCTTGTCCCTGGCCTGAAGGAGTTTGAAGAGG
CCTATGTCCAGGCAGATAAGGGGGCCCCTGGGCCTTGCTCCAGGACCTCCGAGTGC
AGCAGCAACCAGCTCTGTAGAGAGTGTCGGGCTTTCACGGCAGAGCAGATGCCCAC
GCTCGGGGCATTCTCCATGAGCTCTGCTTATAACGCCTACCGGGCAGTCTACGCAGT
GGCCCATGGCCTCCACCAGCTCCTGGGCTGTGCCTCTGGAGCCTGTTCCAGGGACCG
AGTCTACCCCTGGCAGCTTCTGGAGCAGATCCGCAAGGTGAATTTCCTCCTACACAA
GGACACCGTGAGGTTTAATGACAACGGGGACCCTCTCAGTGGCTACGACATAATTG
CCTGGGACTGGAGTGGCCCCAAGTGGAACTTCAGGGTCATTGGCTCCTCCATGTGGC
CTCCAGTTCAGCTGGACATAAATAAAACCAAAATCCGGTGGCACGGGAAGGA

FIG. 81

CAACCAGGTGCCAAAGTCTGTGTGCTCCAGCGACTGCCTCGAAGGGCACCAGCGAG
TGATTTCGGGTTTCTACCACTGTTGCTTTGAGTGTGTGCCCTGTGAGGCCGGGAGCTT
CCTCAACAAGAGCGACCTCCACAGCTGCCAGCCTTGTGGGAAAGAAGAGTGGGCAC
CCGCGGGAAGTGAAACCTGCTTTCCACGCACCGTGGTGTTTTTGACTTGGCACGAGA
CCATCTCTTGGGTGCTGCTGGCAGCTAATACGTTGCTGCTGCTGCTGGTGACTGGGA
CTGCTGGCCTGTTTGCCTGGCACTTAGACACCCCTGTGGTGAAGTCCGCTGGGGGCC
GACTGTGCTTCTTCATGCTGGGCTCCCTGGCAGGGGGCAGCTGTGGGCTCTACGGCT
TTTTTGGGGAGCCCACGCTGCCCACATGCTTGTTGCGCCAAAGCCTCCTTGCCCTGG
GTTTTGCCATCTTCCTGTCCTGCCTGACCATCCGCTCCTTCCAACTGGTCTTCATCTTC
AAGTTTTCTGCCAAGGTACCCACCTTCTACCGTGCCTGGGTCCAAAACCACGGTCCT
GGCCTATTTGTGGTGATCAGCTCAATGGCCCAGCTGCTCATCTGTCTAACTTGGCTG
GCGGTGTGGACCCCACTGCCCACCAGGGAGTACCAGCGCTTCCCTCAGCTGGTGGTG
CTTGATTGCACAGAGGCCAACTCACCGGGCTTCATGTTGGCTTTCGCCTACAATGGC
CTCCTGTCCGTCAGCGCCTTTGCCTGCAGCTACCTGGGCAAGGACCTGCCAGAGAAC
TACAACGAGGCCAAATGTGTCACTTTTAGTCTGCTGCTCAACTTCGTGTCCTGGATTG
CCTTCTTCACCACGGCCAGCGTCTACCAGGGCAAGTACTTGCCCGCGGTCAACGTGC
TGGCGGCGCTGAGCAGCCTGAGTGGCGGCTTCAGCGGTTATTTCCTCCCCAAGTGCT
ACGTGATCCTGTGCCGCCCAGATCTCAACAGCACAGAGCACTTCCAGGCCTCCATCC
AGGAGTACACGAGGCGCTGCGGCTCCACCTGA

FIG. 81 (Continued)

Cat T1R1 amino acid sequence (SEQ ID NO:2):

MSLPAAHLVGLQLSLSCCWALSCHSTETSADFSLPGDYLLAGLFPLHSDCPGVRHRPTV
TLCDRPDSFNGHGYHLFQAMRFGIEEINNSTALLPNVTLGYQLYDVCSESANVYATLNV
LSLLGTHHVEIRADPSHYSPAALAVIGPDTTNHAATTAALLSPFLVPLISYEASSVTLGVK
RHYPSFLRTIPSDKHQVEAMVLLLQSFGWVWISVVGSDGDYGQLGVQALEEQATQQGI
CVAFKDIIPFSARPGDERMQGIMHHLARARTTVVVVFSSRQLARVFFESVVLANLTAKV
WIASEDWAISRHISNVPGIQGIGTVLGVAIQQRLVPGLKEFEEAYVQADKGAPGPCSRTS
ECSSNQLCRECRAFTAEQMPTLGAFSMSSAYNAYRAVYAVAHGLHQLLGCASGACSRD
RVYPWQLLEQIRKVNFLLHKDTVRFNDNGDPLSGYDIIAWDWSGPKWNFRVIGSSMWP
PVQLDINKTKIRWHGKDNQVPKSVCSSDCLEGHQRVISGFYHCCFECVPCEAGSFLNKS
DLHSCQPCGKEEWAPAGSETCFPRTVVFLTWHETISWVLLAANTLLLLLVTGTAGLFA
WHLDTPVVKSAGGRLCFFMLGSLAGGSCGLYGFFGEPTLPTCLLRQSLLALGFAIFLSCL
TIRSFQLVFIFKFSAKVPTFYRAWVQNHGPGLFVVISSMAQLLICLTWLAVWTPLPTREY
QRFPQLVVLDCTEANSPGFMLAFAYNGLLSVSAFACSYLGKDLPENYNEAKCVTFSLLL
NFVSWIAFFTTASVYQGKYLPAVNVLAALSSLSGGFSGYFLPKCYVILCRPDLNSTEHFQ
ASIQEYTRRCGST*

FIG. 82

Cat T1R3 nucleic acid sequence (SEQ ID NO:3):

ATGCCCGGCCTCGCTCTCCTGGGCCTCACGGCTCTCCTGGGCCTCACGGCTCCTTGG
ACCACGGGGAGGGCGCAACGTCCTGCTTGTCACAGCAGCTCAGGATGCAGGGGGAC
TATGTGCTGGGTGGGCTCTTCCCTCTGGGCTCTGCCGAGGGTACAGGTCTTGGCGAC
GGGCTGCAGCCCAATGCCACCGTGTGCACCAGGTTCTCGTCTCTGGGCCTGCTCTGG
GCGCTGGCCGTGAAGATGGCGGTGGAGGAGATCAACAACGGGTCGGCCCTGCTGCC
CGGGCTGCACCTGGGCTATGACCTCTTTGACACGTGTTCAGAGCCCATGGTGGCCAT
GAAGCCCAGCCTCGTGTTCATGGCCAAAGCAGGCAGCTGCAGCATTGCCGCCTACT
GCAATTACACACAGTACCAGCCCCGCGTGCTGGCCGTCATCGGGCCCCACTCGTCTG
AGCTCGCCCTCGTCACCGGCAAGTTCTTCAGCTTCTTCCTTGTGCCTCAGGTCAGCTA
CGGCGCCAGCACCGACCGGCTGAGCAACCGGGAGATCTTCCCGTCCTTCTTCCGCAC
GGTGCCCAGCGACCAGGTGCAGGTGGCGGCCATGGTGGAGCTGCTGCAGGAGCTCG
GCTGGAACTGGGTGGCGGCGGTGGGTAGTGACGACGAGTATGGCCGGCAGGGCCTG
AGCCTCTTCTCCGGCCTGGCCAGCGCCAGGGGCATCTGCATCGCGCATGAGGGCCTG
GTGCCACTGCCGCCAGGCAGCCTGCGGCTGGGCGCCCTACAGGGCCTGCTGCGCCA
GGTGAACCAGAGCAGCGTGCAGGTGGTGGTGCTGTTCTCCTCCGCCCACGCGGCCC
GCACCCTCTTCAGCTACAGCATCCGCTGCAAGCTCTCACCCAAGGTGTGGGTGGCCA
GCGAGGCCTGGCTGACCTCAGACCTGGTCATGACGCTGCCCGGCATGCCTGGGGTG
GGCACCGTGCTGGGCTTCCTGCAGCAGGGCGCCCCGATGCCGGAGTTCCCATCCTAC
GTGCGGACCCGCCTGGCCCTGGCCGCTGACCCTGCCTTCTGCGCCTCGCTGGACGCT
GAACAGCCAGGCCTGGAGGAGCACGTGGTGGGGCCACGCTGCCCCCAATGTGACCA
CGTCACGCTAGAGAACCTATCTGCGGGGCTGCTGCACCACCAGACCTTCGCTGCCTA
CGCGGCTGTGTATGGCGTGGCCCAGGCCCTTCACAACACACTGCGCTGCAATGCCTC
GGGCTGCCCCAGGCGGGAGCCTGTGCGGCCCTGGCAGCTCCTAGAGAACATGTACA
ACGTGAGCTTCCGTGCTCGCGGCCTGGCACTGCAGTTCGACGCCAGCGGGAACGTG
AACGTGGATTACGACCTGAAACTGTGGGTGTGGCAGGACCCGACGCCCGAGCTGCG
CACCGTAGGCACCTTCAAGGGCCGCCTGGAGCTCTGGCGCTCTCAGATGTGCTGGCA
CACGCCGGGGAAGCAGCAGCCCGTGTCCCAGTGCTCCCGGCAGTGCAAGGAGGGCC
AGGTGCGCCGCGTGAAGGGCTTCCACTCTTGCTGTTACGACTGCGTGGACTGCA

FIG. 83

AGGCGGGCAGTTATCAGCGCAACCCAGATGACCTCCTCTGCACCCAGTGTGACCAG
GACCAGTGGTCCCCAGACCGGAGCACACGCTGCTTCGCCCGCAAGCCCATGTTCCTG
GCATGGGGGGAGCCAGCTGTGCTGCTACTGCTCGCGCTGCTGGCTCTGGCGCTGGGC
CTGGCGCTGGCAGCCCTGGGGCTCTTCCTCTGGCACTCGGACAGCCCGCTGGTTCAG
GCCTCAGGTGGGCCACGGGCCTGCTTTGGCCTGGCCTGCCTGGGCCTGGTCTGCCTC
AGTGTCCTCCTGTTCCCTGGCCAGCCAGGCCCTGCCAGCTGCCTGGCCCAGCAGCCA
CTGTTCCACCTCCCACTCACTGGCTGCCTGAGCACGCTTTTCCTGCAAGCGGCCGAG
ATATTTGTGGGGTCGGAGCTGCCACCAAGCTGGGCTGAGAAGATGCGTGGCCGCCT
GCGGGGGCCCTGGGCCTGGCTGGTGGTGCTGCTTGCTATGCTGGCAGAAGCCGCATT
GTGTGCCTGGTACCTGGTAGCCTTCCCGCCAGAGGTGGTGACGGACTGGCGGGTACT
GCCCACAGAGGCGCTGGTGCACTGCCACGTGCACTCCTGGATCAGCTTCGGCCTGGT
GCATGCCACTAACGCCATGCTGGCCTTCCTCTGCTTCCTGGGCACTTTCCTGGTGCAG
AGCCGGCCAGGCCGCTACAATGGTGCCCGCGGCCTCACCTTTGCCATGCTGGCCTAC
TTCATCACCTGGATCTCCTTTGTGCCCCTCTTTGCCAATGTGCACGTGGCCTACCAGC
CTGCCGTGCAGATGGGCACCATCCTCCTCTGTGCCCTGGGTATCCTAGCCACCTTCC
ACCTGCCCAAGTGCTACCTGCTGCTGCAGCGGCCGGAGCTCAACACCCCTGAGTTCT
TCCTGGAAGACAATGCCAGAGCACAGGGCAGCAGTTGGGGGCAGGGGAGGGGAGA
ATCGGGGCAAAAACAAGTGACACCCGATCCAGTGACCTCACCGCAGTGA

FIG. 83 (Continued)

Cat T1R3 amino acid sequence (SEQ ID NO:4):

MPGLALLGLTALLGLTALLDHGEGATSCLSQQLRMQGDYVLGGLFPLGSAEGTGLGDG
LQPNATVCTRFSSLGLLWALAVKMAVEEINNGSALLPGLHLGYDLFDTCSEPMVAMKP
SLVFMAKAGSCSIAAYCNYTQYQPRVLAVIGPHSSELALVTGKFFSFFLVPQVSYGASTD
RLSNREIFPSFFRTVPSDQVQVAAMVELLQELGWNWVAAVGSDDEYGRQGLSLFSGLA
SARGICIAHEGLVPLPPGSLRLGALQGLLRQVNQSSVQVVVLFSSAHAARTLFSYSIRCK
LSPKVWVASEAWLTSDLVMTLPGMPGVGTVLGFLQQGAPMPEFPSYVRTRLALAADP
AFCASLDAEQPGLEEHVVGPRCPQCDHVTLENLSAGLLHHQTFAAYAAVYGVAQALH
NTLRCNASGCPRREPVRPWQLLENMYNVSFRARGLALQFDASGNVNVDYDLKLWVW
QDPTPELRTVGTFKGRLELWRSQMCWHTPGKQQPVSQCSRQCKEGQVRRVKGFHSCC
YDCVDCKAGSYQRNPDDLLCTQCDQDQWSPDRSTRCFARKPMFLAWGEPAVLLLLAL
LALALGLALAALGLFLWHSDSPLVQASGGPRACFGLACLGLVCLSVLLFPGQPGPASCL
AQQPLFHLPLTGCLSTLFLQAAEIFVGSELPPSWAEKMRGRLRGPWAWLVVLLAMLAE
AALCAWYLVAFPPEVVTDWRVLPTEALVHCHVHSWISFGLVHATNAMLAFLCFLGTFL
VQSRPGRYNGARGLTFAMLAYFITWISFVPLFANVHVAYQPAVQMGTILLCALGILATF
HLPKCYLLLQRPELNTPEFFLEDNARAQGSSWGQGRGESGQKQVTPDPVTSPQ*

FIG. 84

FLAVOR COMPOSITIONS AND PET FOOD PRODUCTS CONTAINING THE SAME

CROSS-REFERENCE TO RELATED APPLICATIONS

This application is a U.S. National Stage patent application under 35 U.S.C. § 371 of International Application No. PCT/US2015/065036, filed on Dec. 10, 2015, which claims priority to U.S. Provisional Application Ser. No. 62/090,138, filed on Dec. 10, 2014, the contents of which are incorporated by reference in their entireties, and to which priority is claimed.

FIELD

The presently disclosed subject matter relates to compounds that modulate the activity of an umami taste receptor, and to flavor compositions that include at least one such compound, as well as to methods of identifying such compounds. The flavor compositions can be used to enhance or modify the palatability, taste and/or flavor of pet food products. The flavor compositions can include combinations of compounds, and can be added to pet food products in various delivery system formats. The compounds that modulate the activity of an umami taste receptor can include one or more transmembrane compound, nucleotide derivative, nucleotide, first amino acid, second amino acid, or combinations thereof.

BACKGROUND

Taste profiles for edible compositions include basic tastes such as sweet, salt, bitter, sour, umami and kokumi. Taste profiles have also been described as including free fatty acid tastes. Chemical compounds that elicit these tastes are often referred to as tastants. It is hypothesized that tastants are sensed by taste receptors in the mouth and throat which transmit signals to the brain where the tastants and resulting taste profiles are registered. Taste receptors include the T1R class of taste receptors such as T1R1, T1R2 and T1R3, which interact as heterodimers to function as taste receptors. For example, T1R2/T1R3 responds to sweet stimuli and the T1R1/T1R3 heterodimer recognizes the umami taste. Cats and members of the Felidae family fail to express a functional T1R2 monomer indicating that the primary functional T1R class taste receptor in cats is the umami receptor, T1R1/T1R3. Further, cats have shown a preference for food compositions with an umami taste.

There are several notable differences between human T1R1/T1R3 and cat T1R1/T1R3 receptors. For example, human T1R1/T1R3 responds to the amino acid glutamate as an agonist, and to nucleotides, notably IMP and GMP, as positive allosteric modulators. Human T1R1/T1R3 also responds to compounds that bind the transmembrane domain of the receptor. For example, N-(heptan-4-yl)benzo[d][1,3]dioxole-5-carboxamide), which is a positive allosteric modulator of the receptor, was shown to bind to the human T1R1 transmembrane domain by domain swapping experiments (Zhang et. al. Proc Natl Acad Sci USA. 105(52): 20930-4, 2008). Allosteric modulators that bind to the transmembrane domain are also known to modulate the activity of multiple members of the Class III GPCRs, including mGluR receptors and the CaSR receptor. However, both human and cat T1R1/T1R3 respond synergistically to combinations of nucleotides and amino acids.

Pet food manufacturers have a long-standing desire to provide pet food products that have high nutritional value. In addition, and with particular regard to cat and dog foods, pet food manufacturers desire a high degree of palatability so that pets can receive the full nutritional benefit from their food. Domestic animals, especially cats, are notoriously fickle in their food preferences, and often refuse to eat a pet food product that it has accepted over some time or refuse to eat any more than a minimal amount of a pet food product. As a result, pet owners frequently change types and brands of pet food in order to maintain their pets in a healthy and contented condition.

While there have been recent advances in taste and flavor technologies, there remains a need for compounds that can enhance or modify the palatability of pet food products by enhancing or modifying the taste, texture and/or flavor profiles of the pet food product. The enhancement or modification can be to increase the intensity of a desirable attribute, to replace a desirable attribute that is not present or somehow lost in the pet food product, or to decrease the intensity of an undesirable attribute. In particular, it is desirable to increase the intensity of a tastant in a pet food product. Therefore, there remains a need in the art for compositions to enhance the palatability and/or umami taste of pet food products.

SUMMARY OF THE INVENTION

The presently disclosed subject matter is directed to flavor compositions and methods for making and modifying such compositions across a variety of pet food products. Specifically, the present disclosure is directed to compositions comprising one or more transmembrane compounds and/or nucleotide derivatives that enhance, increase and/or modulate the activity of the umami receptor, T1R1/T1R3.

In certain embodiments of the present disclosure, the flavor composition comprises a transmembrane compound of Formula Tm-1:

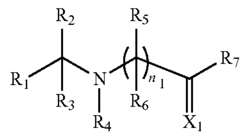

wherein $R_{1-7}$, $X_1$ and $n_1$ are described herein below. The present disclosure provides salts and stereoisomers of the compounds of Formula Tm-1.

In certain embodiments, the transmembrane compound comprises a compound of Formula Tm-2 having the following structure:

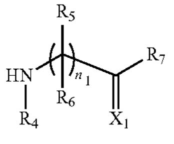

wherein $R_4$, $R_5$, $R_6$, $R_7$, $X_1$, and $n_1$ are described herein below. The present disclosure provides salts and stereoisomers of the compounds of Formula Tm-2.

In certain embodiments of the present disclosure, the flavor composition comprises one or more transmembrane compounds of Formulas Tm-20 to Tm-40, as described herein.

In certain embodiments of the present disclosure, the flavor composition comprises a transmembrane compound of Formula Tm-3:

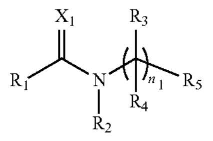

wherein $R_{1-5}$, $X_1$ and $n_1$ are described herein below. The present disclosure provides salts and stereoisomers of the compounds of Formula Tm-3.

In certain embodiments of the present disclosure, the flavor composition comprises a transmembrane compound of Formula Tm-4:

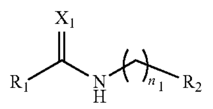

wherein $R_{1-2}$, $X_1$ and $n_1$ are described herein below. The present disclosure provides salts and stereoisomers of the compounds of Formula Tm-4.

In certain embodiments of the present disclosure, the flavor composition comprises one or more transmembrane compounds of Formulas Tm-41 to Tm-55, as described herein.

In certain embodiments of the present disclosure, the flavor composition comprises a transmembrane compound of Formula Tm-5:

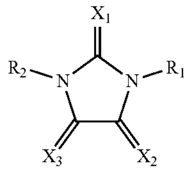

wherein $R_1$, $R_2$, and $X_1$-3 are described herein below. The present disclosure provides salts and stereoisomers of the compounds of Formula Tm-5.

In certain embodiments of the present disclosure, the flavor composition comprises a transmembrane compound of Formula Tm-6:

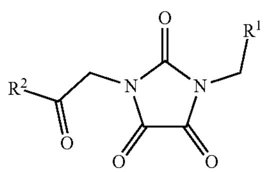

wherein $R^1$ and $R^2$ are described herein below. The present disclosure provides salts and stereoisomers of the compounds of Formula Tm-6.

In certain embodiments of the present disclosure, the flavor composition comprises a transmembrane compound of Formula Tm-7:

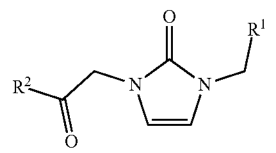

wherein $R^1$ and $R^2$ are described herein below. The present disclosure provides salts and stereoisomers of the compounds of Formula Tm-7.

In certain embodiments of the present disclosure, the flavor composition comprises one or more transmembrane compounds of Formulas Tm-56 to Tm-74, as described herein.

In certain embodiments of the present disclosure, the flavor composition comprises a transmembrane compound of Formula Tm-8:

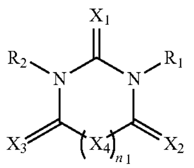

wherein $R_1$, $R_2$, $X_{1-4}$ and $n_1$ are described herein below. The present disclosure provides salts and stereoisomers of the compounds of Formula Tm-8.

In certain embodiments of the present disclosure, the flavor composition comprises a transmembrane compound of Formula Tm-76, as described herein.

In certain embodiments of the present disclosure, the flavor composition comprises a transmembrane compound of Formula Tm-13:

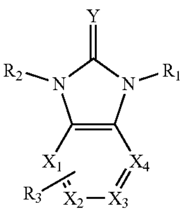

wherein $R_1$-$R_3$, Y and $X_{1-4}$ are described herein below. The present disclosure provides salts and stereoisomers of the compounds of Formula Tm-13.

In certain embodiments of the present disclosure, the flavor composition comprises a transmembrane compound of Formula Tm-12:

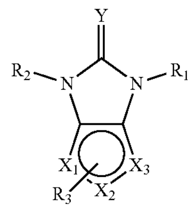

wherein $R_1$-$R_3$, Y and $X_{1-3}$ are described herein below. The present disclosure provides salts and stereoisomers of the compounds of Formula Tm-12.

In certain embodiments of the present disclosure, the flavor composition comprises a transmembrane compound of Formula Tm-75, as described herein.

In certain embodiments of the present disclosure, the flavor composition comprises one or more transmembrane compounds of Formulas Tm-77 to Tm-104, as described herein.

In certain embodiments, the flavor composition can further comprise at least one nucleotide or nucleotide derivative. Non-limiting examples of nucleotides include guanosine monophosphate (GMP), guanosine diphosphate (GDP), guanosine triphosphate (GTP), adenosine monophosphate (AMP), adenosine diphosphate (ADP), adenosine triphosphate (ATP), cytidine monophosphate (CMP), cytidine diphosphate (CDP), cytidine triphosphate (CTP, inosine monophosphate (IMP), inosine diphosphate (IDP), inosine triphosphate (ITP), uridine monophosphate (UMP), uridine diphosphate (UDP), uridine triphosphate (UTP), thymidine monophosphate (TMP), thymidine diphosphate (TDP), thymidine triphosphate (TTP), xanthosine monophosphate (XMP), xanthosine diphosphate (XDP), xanthosine triphosphate (XTP), and combinations thereof.

In one embodiment, the flavor composition can further comprise a nucleotide selected from the group consisting of guanosine monophosphate (GMP), inosine monophosphate (IMP), and a combination thereof.

In certain embodiments, the flavor composition further comprises one or more first amino acids and/or one or more second amino acids. In certain embodiments, the flavor composition further comprises at least one, two, three, four, five or more first amino acids and/or at least one, two, three, four, five or more second amino acids. In certain embodiments, the flavor composition further comprises at least one first amino acid and/or at least one second amino acid. In certain embodiments, the flavor composition comprises at least two first amino acids and/or at least one second amino acid. In certain embodiments, the flavor composition further comprises at least one first amino acid and/or at least two second amino acids. In certain embodiments, the flavor composition further comprises at least two first amino acids and/or at least two second amino acids.

Non-limiting examples of a first amino acid include tryptophan, phenylalanine, histidine, glycine, cysteine, alanine, tyrosine, serine, methionine, asparagine, leucine, and combinations thereof.

Non-limiting examples of a second amino acid include asparagine, threonine, isoleucine, proline, glutamic acid, aspartic acid, hydroxyl proline, arginine, cystine, glutamine, lysine, valine, ornithine, monosodium glutamate, taurine, and combinations thereof.

In certain embodiments, the flavor composition further comprises alanine.

In certain embodiments, the flavor composition further comprises glycine.

In certain embodiments, the flavor composition further comprises histidine.

In certain embodiments of the present disclosure, the flavor composition comprises one or more nucleotide derivatives of Formulas Nt-1 to Nt-55, as described herein.

In other embodiments, the flavor composition further comprises alanine and guanosine monophosphate (GMP).

In yet other embodiments, the flavor composition further comprises alanine and inosine monophosphate (IMP).

In certain embodiments, the present disclosure provides for food product comprising a flavor composition as described herein, wherein the flavor composition is present at a concentration of about 0.0001 weight % to about 10 weight % of the food product. In other embodiments, the flavor composition is present at a concentration of from about 0.001 ppm to about 1,000 ppm of the food product. In yet other embodiments, the flavor composition is present at a concentration of from about 1 pM to about 1 M, or about 1 M to about 1 M of the food product.

In certain embodiments, the flavor composition is present in an amount effective to increase the palatability of the food product, as determined by a panel of taste testers.

In other embodiments, the present disclosure provides for a method of increasing an umami taste intensity in a food product comprising admixing a food product with the flavor compositions described herein, wherein the flavor composition is present at a concentration of from about 0.0001 weight % to about 10 weight % of the admixture. In other embodiments, the flavor composition is present at a concentration of from about 0.001 ppm to about 1,000 ppm of the admixture. In yet other embodiments, the flavor composition is present at a concentration of from about 1 pM to about 1 M, or about 1 M to about 1 M of the admixture.

In other embodiments, the present disclosure provides for a method of increasing an umami taste intensity in a food product comprising admixing a food product with the flavor compositions described herein, wherein the flavor composition is present in an amount effective to increase the palatability of the food product, as determined by a panel of taste testers. In certain embodiments, the increase in umami taste intensity comprises an increase in umami aftertaste.

The present disclosure also provides for methods of preparing a food product comprising a flavor composition described herein, wherein the method comprises thermal processing of a food product precursor, wherein the flavor composition is generated during the thermal processing. Examples of thermal processing include, for example, sterilization, retorting, extrusion, injection molding or combinations thereof.

In certain embodiments, the food products described herein comprise pet food products, for example, feline pet food products such as wet and/or dry feline pet food products. In other examples, the pet food products comprise canine pet food products such as wet and/or dry canine pet food products.

In other embodiments, the food products described herein comprise human food products.

The foregoing has outlined rather broadly the features and technical advantages of the present application in order that the detailed description that follows may be better understood. Additional features and advantages of the application will be described hereinafter which form the subject of the claims of the application. It should be appreciated by those skilled in the art that the conception and specific embodiment disclosed may be readily utilized as a basis for modifying or designing other structures for carrying out the same purposes of the present application. It should also be realized by those skilled in the art that such equivalent constructions do not depart from the spirit and scope of the application as set forth in the appended claims. The novel features which are believed to be characteristic of the application, both as to its organization and method of operation, together with further objects and advantages will be better understood from the following description.

ethyl)nicotinamide alone in buffer, or in the presence of 20 mM L-alanine, 0.2 mM IMP, or both 20 mM L-alanine and 0.2 mM IMP.

Figure 68A:
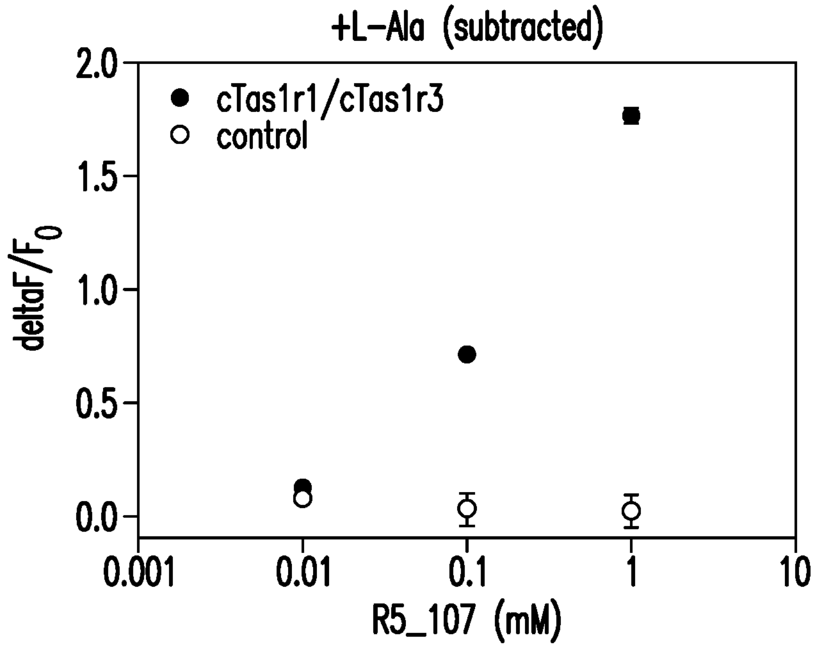
Figure 68A:
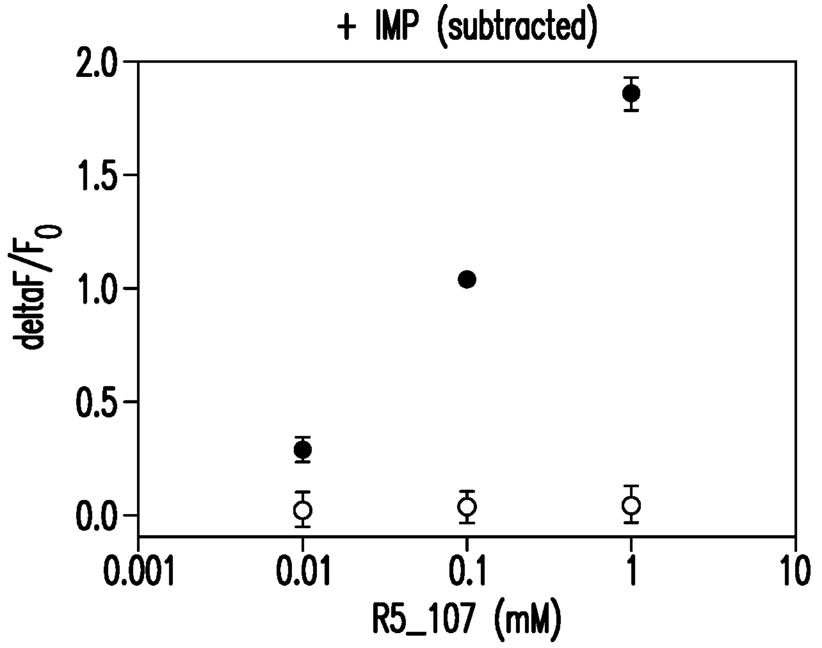
Figure 68B:
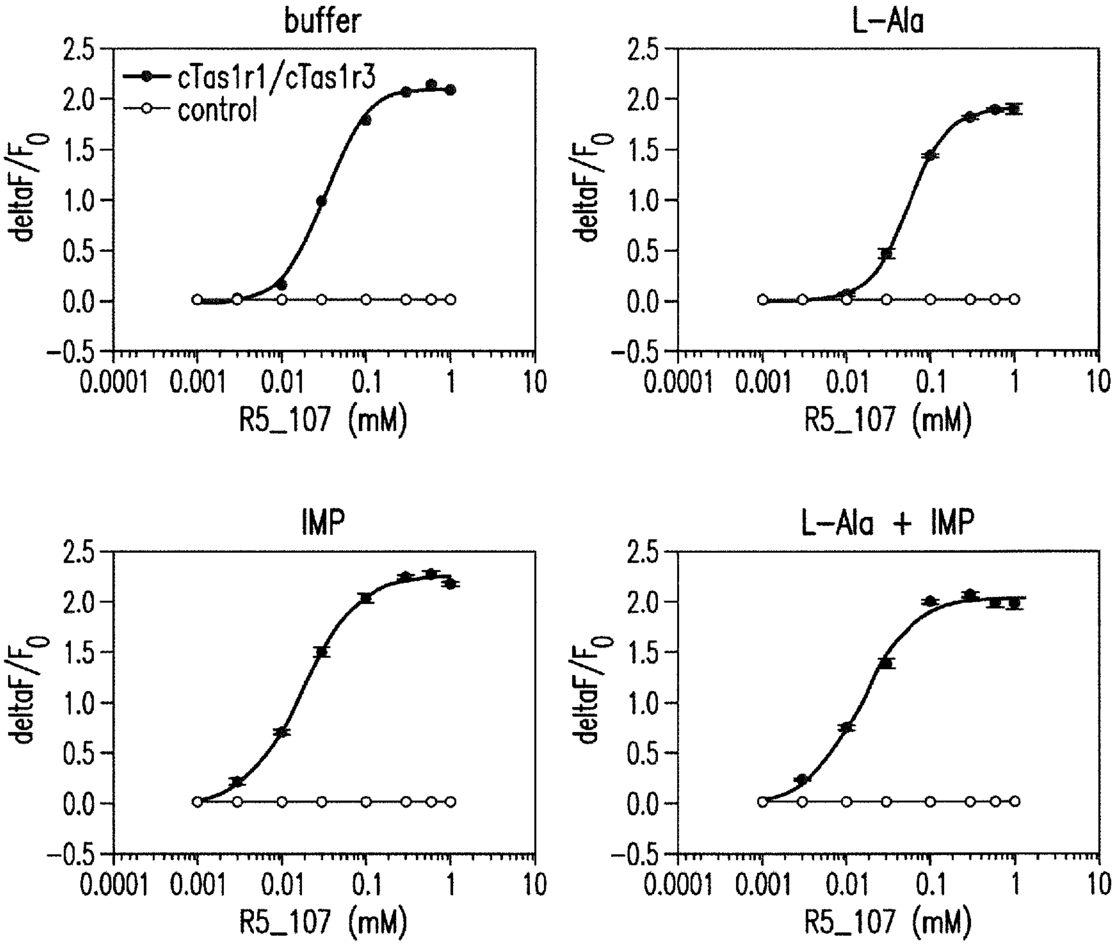

FIG. 68A-B shows (A) the activation of T1R1/T1R3 by N-benzyl-L-phenylalanine methyl ester hydrochloride in the presence of 20 mM L-alanine or 0.2 mM IMP, and (B) dose response curves for activating T1R1/T1R3 by N-benzyl-L-phenylalanine methyl ester hydrochloride alone in buffer, or in the presence of 20 mM L-alanine, 0.2 mM IMP, or both 20 mM L-alanine and 0.2 mM IMP.

Figure 69A:
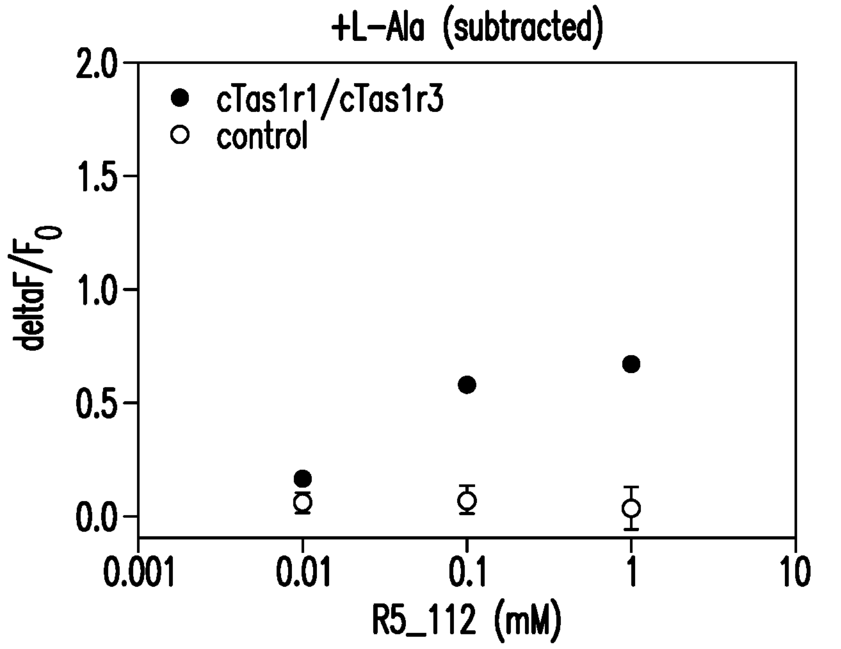
Figure 69A:
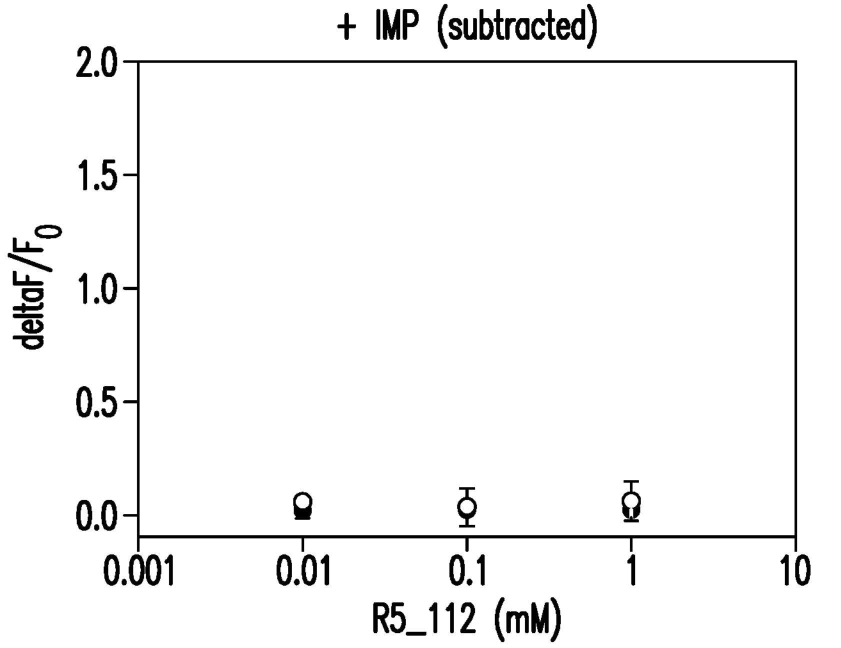
Figure 69B:
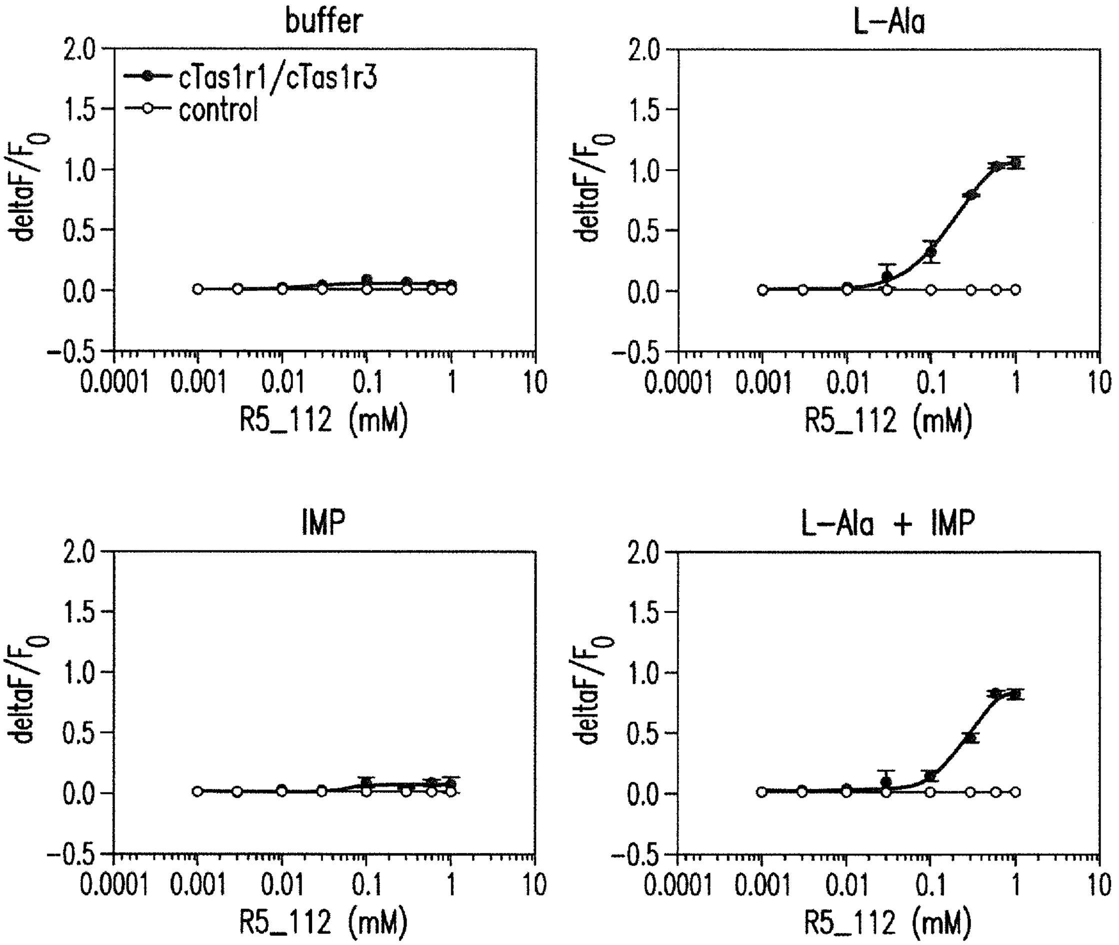

FIG. 69A-B shows (A) the activation of T1R1/T1R3 by 6-Thioguanosine-5'-O-diphosphate (6-T-GDP) in the presence of 20 mM L-alanine or 0.2 mM IMP, and (B) dose response curves for activating T1R1/T1R3 by 6-Thioguanosine-5'-O-diphosphate (6-T-GDP) alone in buffer, or in the presence of 20 mM L-alanine, 0.2 mM IMP, or both 20 mM L-alanine and 0.2 mM IMP.

Figure 70A:
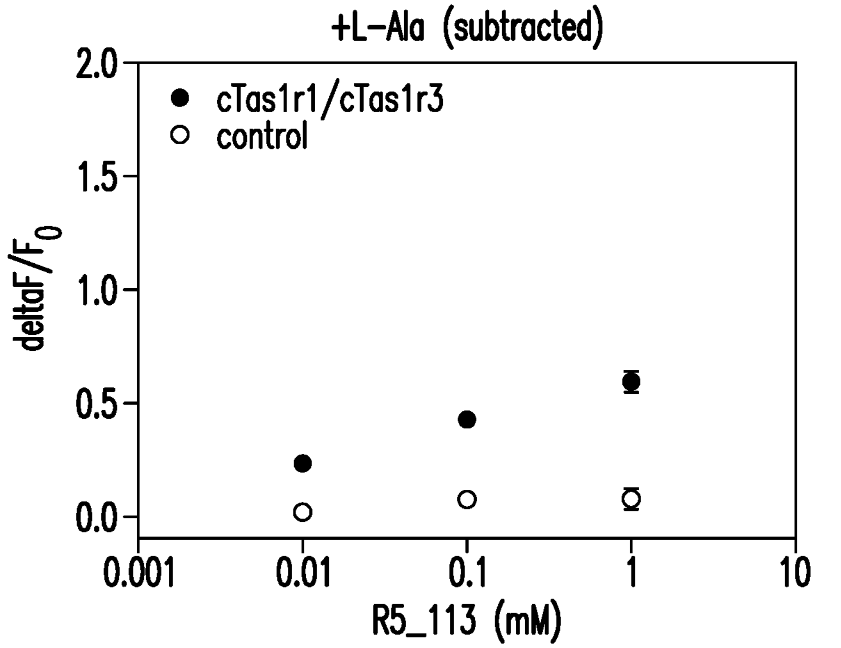
Figure 70A:
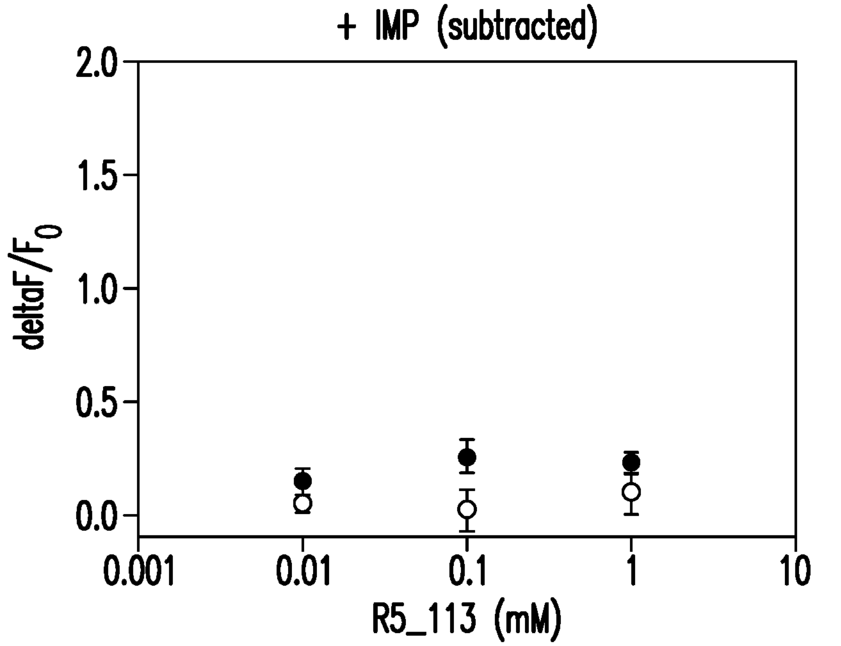
Figure 70B:
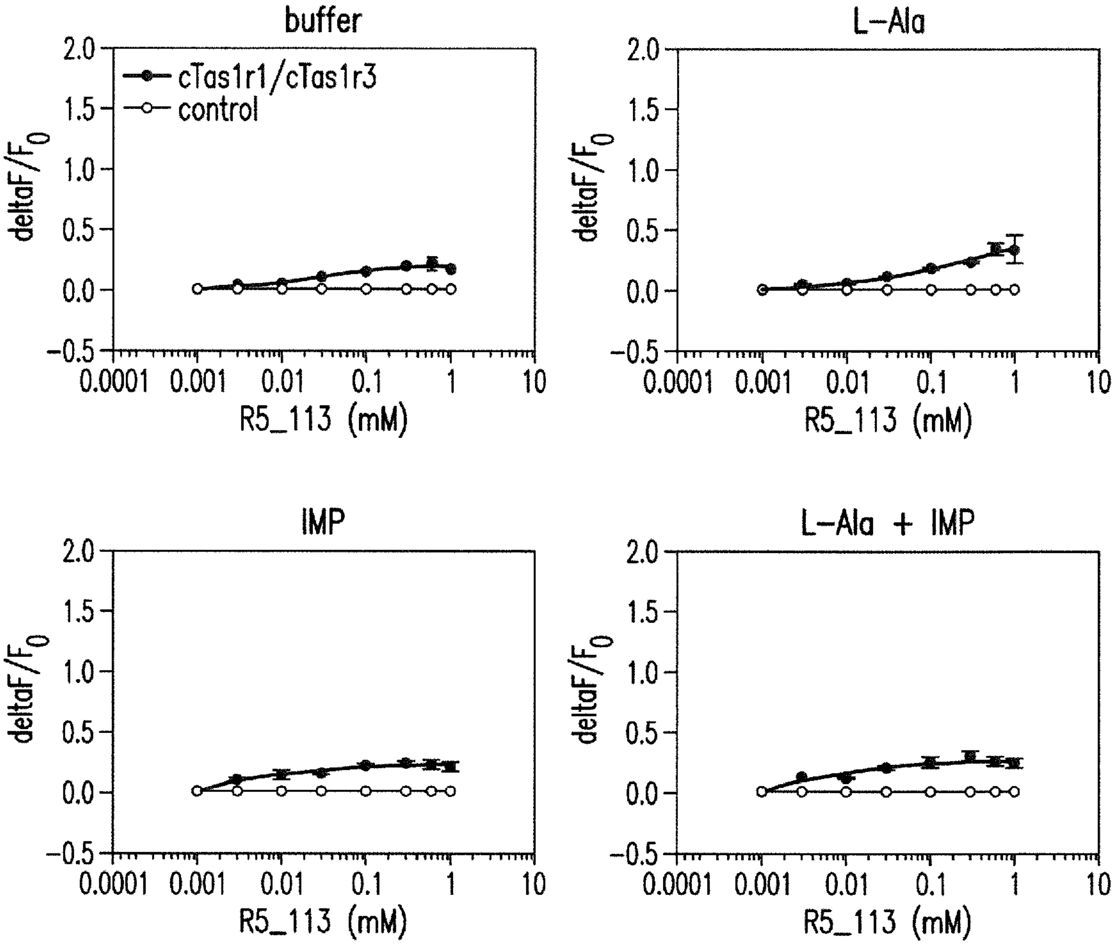

FIG. 70A-B shows (A) the activation of T1R1/T1R3 by 6-Chloropurine riboside-5'-O-triphosphate (6-Cl-PuTP) in the presence of 20 mM L-alanine or 0.2 mM IMP, and (B) dose response curves for activating T1R1/T1R3 by 6-Chloropurine riboside-5'-O-triphosphate (6-Cl-PuTP) alone in buffer, or in the presence of 20 mM L-alanine, 0.2 mM IMP, or both 20 mM L-alanine and 0.2 mM IMP.

Figure 71:
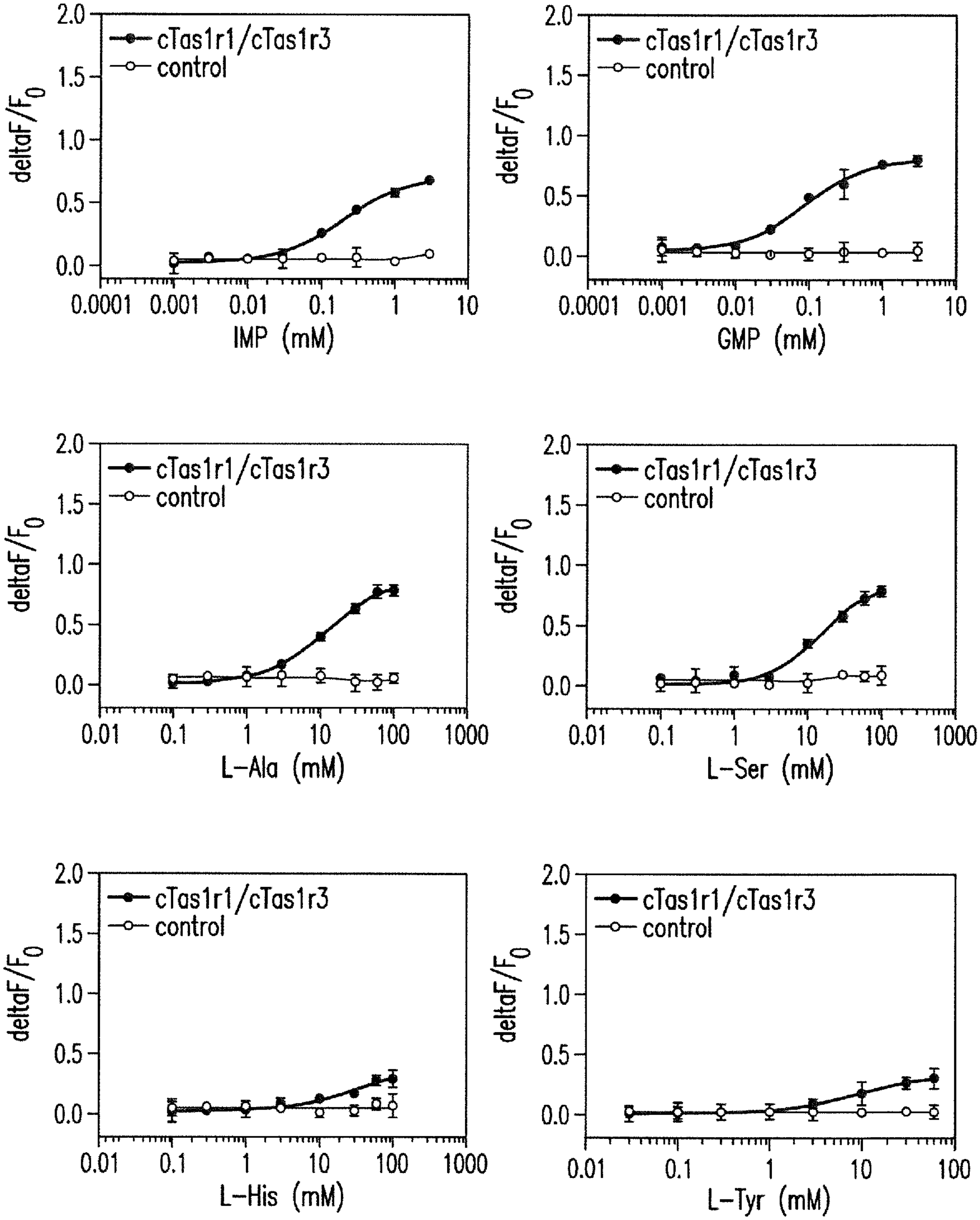
Figure 71:
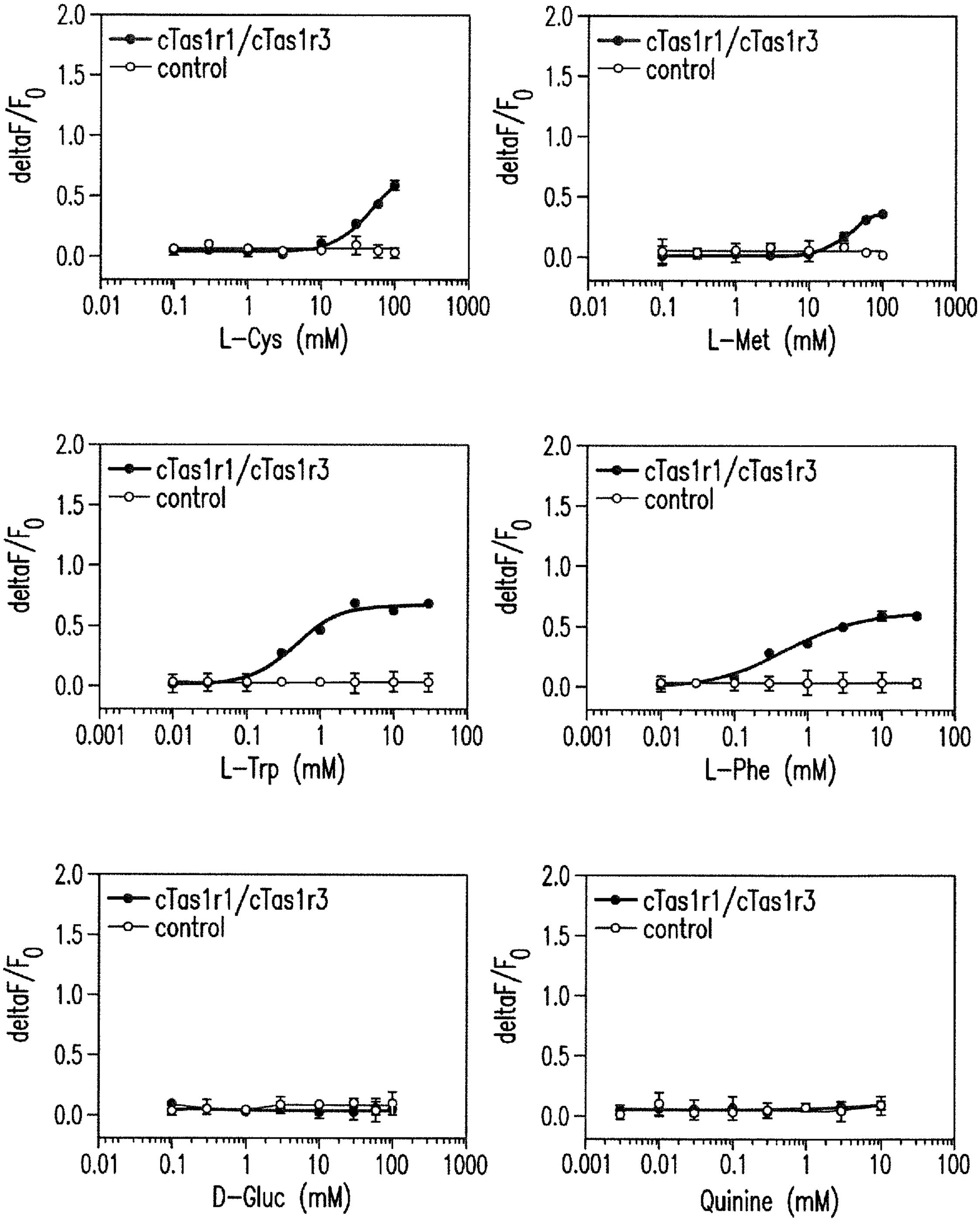
Figure 71:
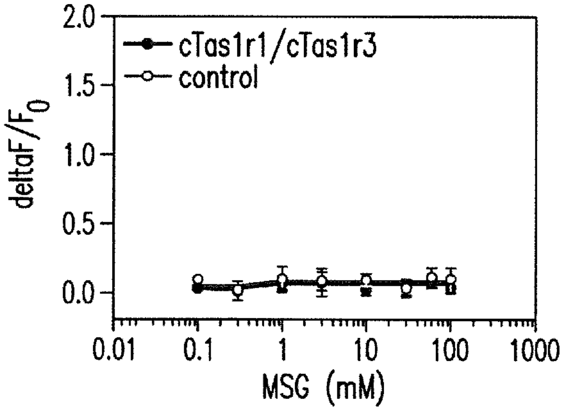
Figure 71:
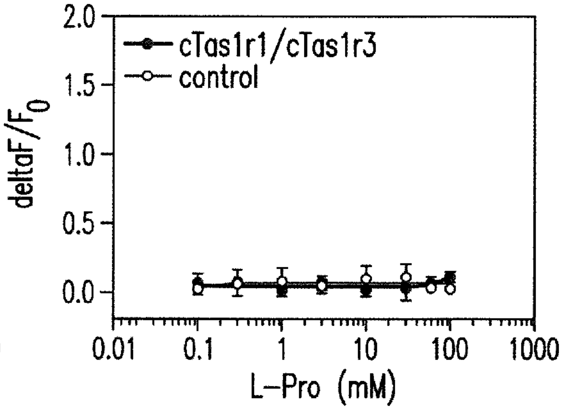
Figure 72A:
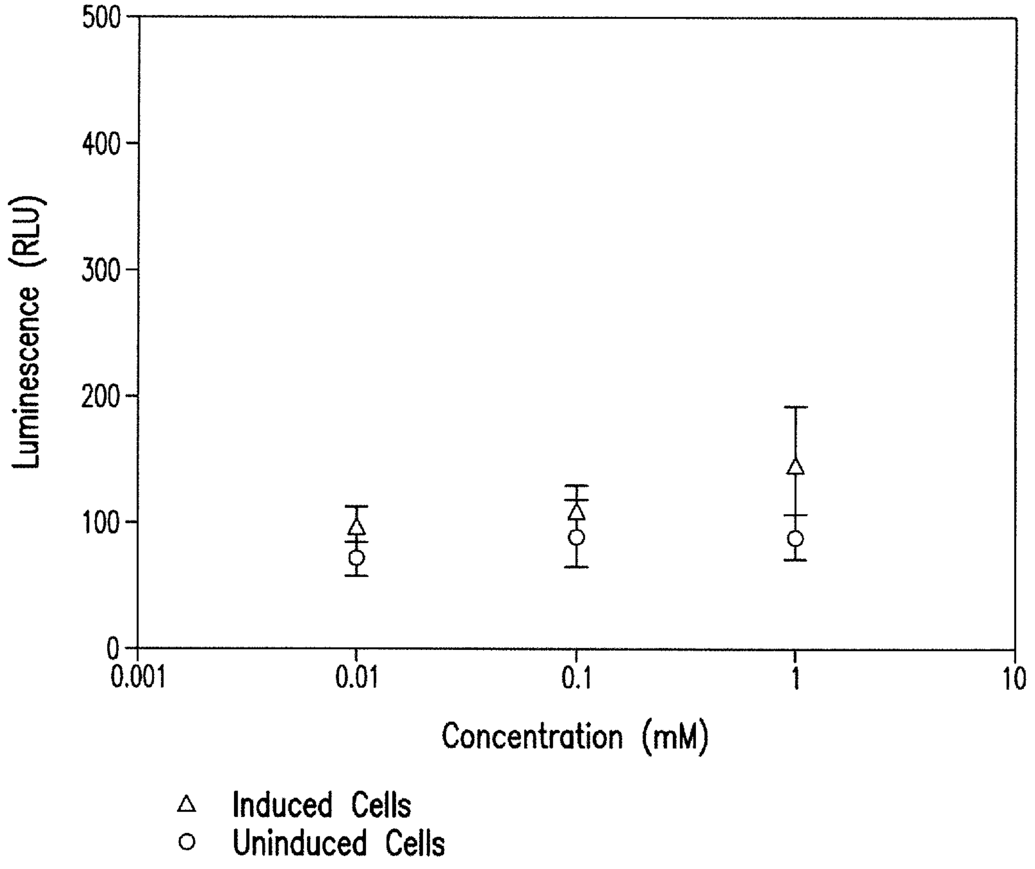
Figure 72A:
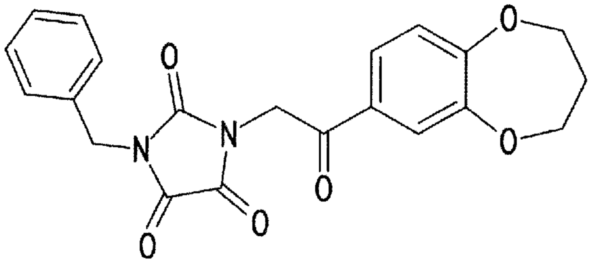
Figure 72B:
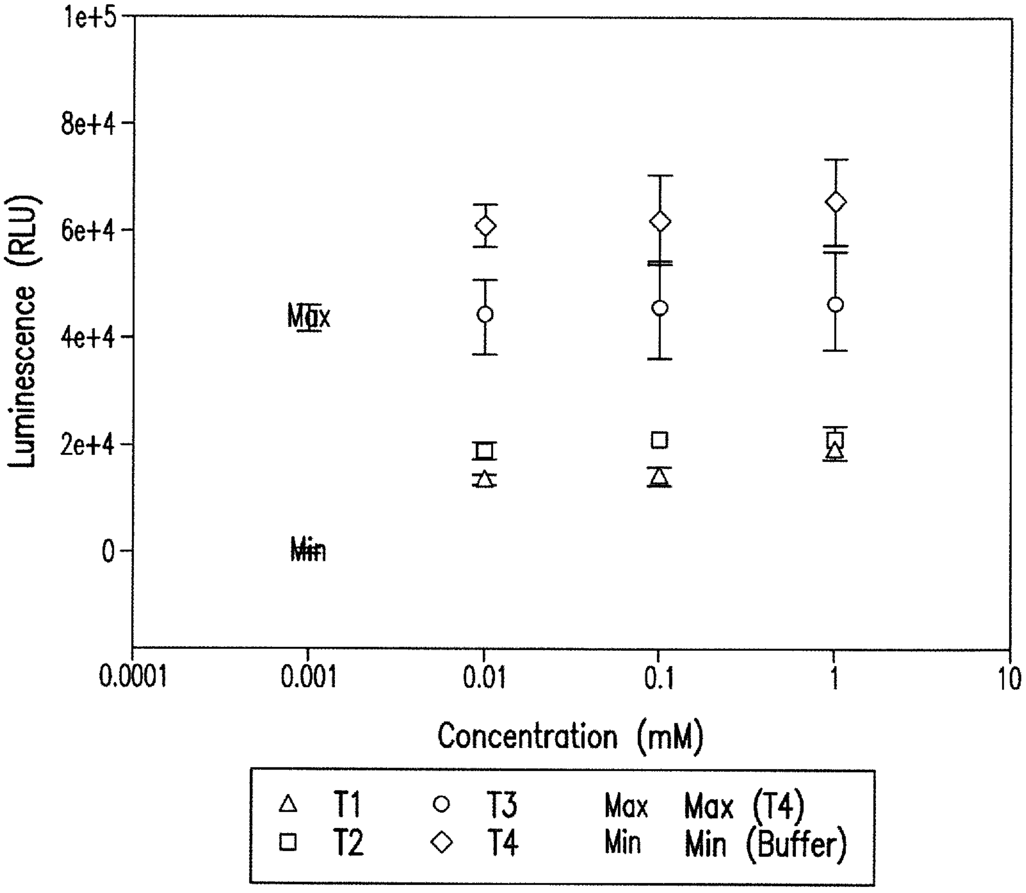
Figure 72B:
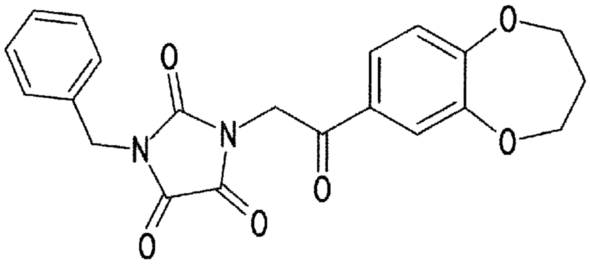
Figure 72C:
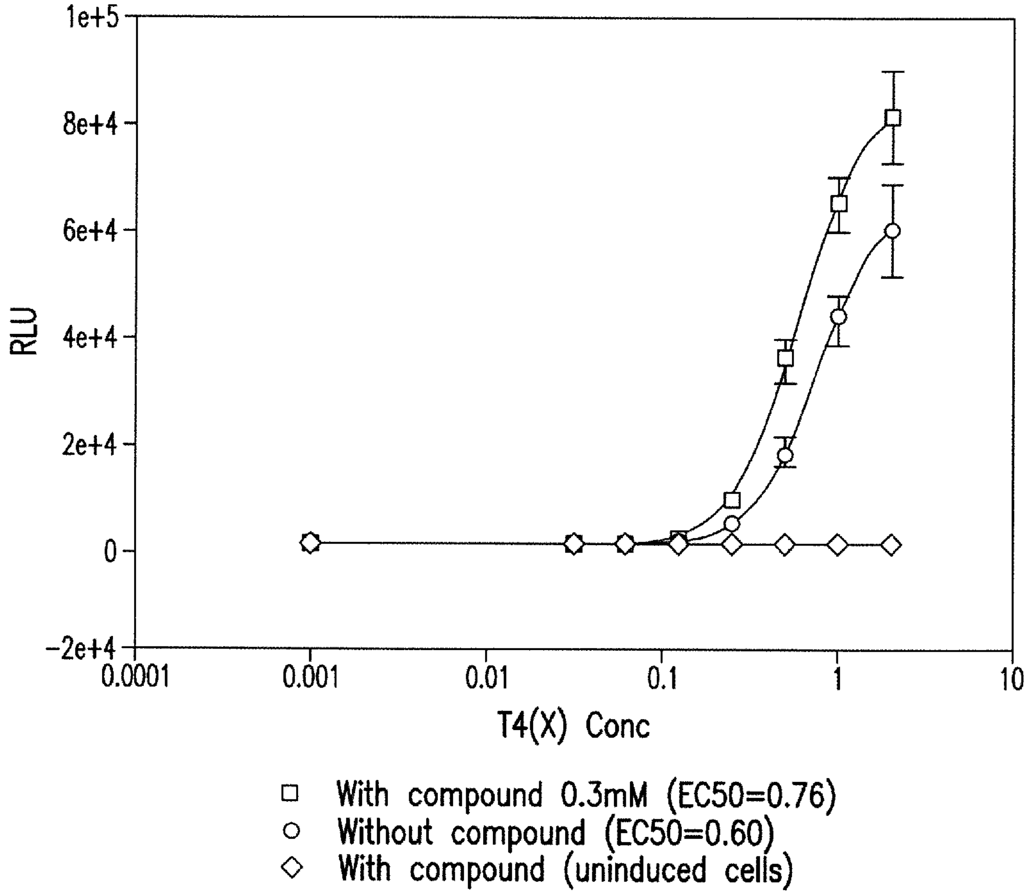
Figure 72C:
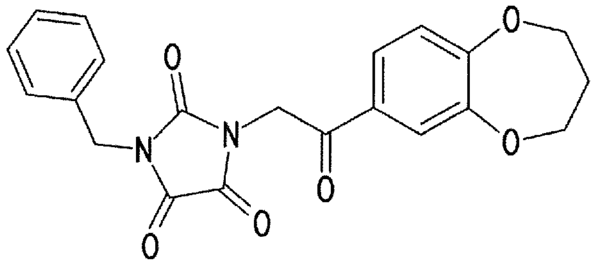
Figure 72D:
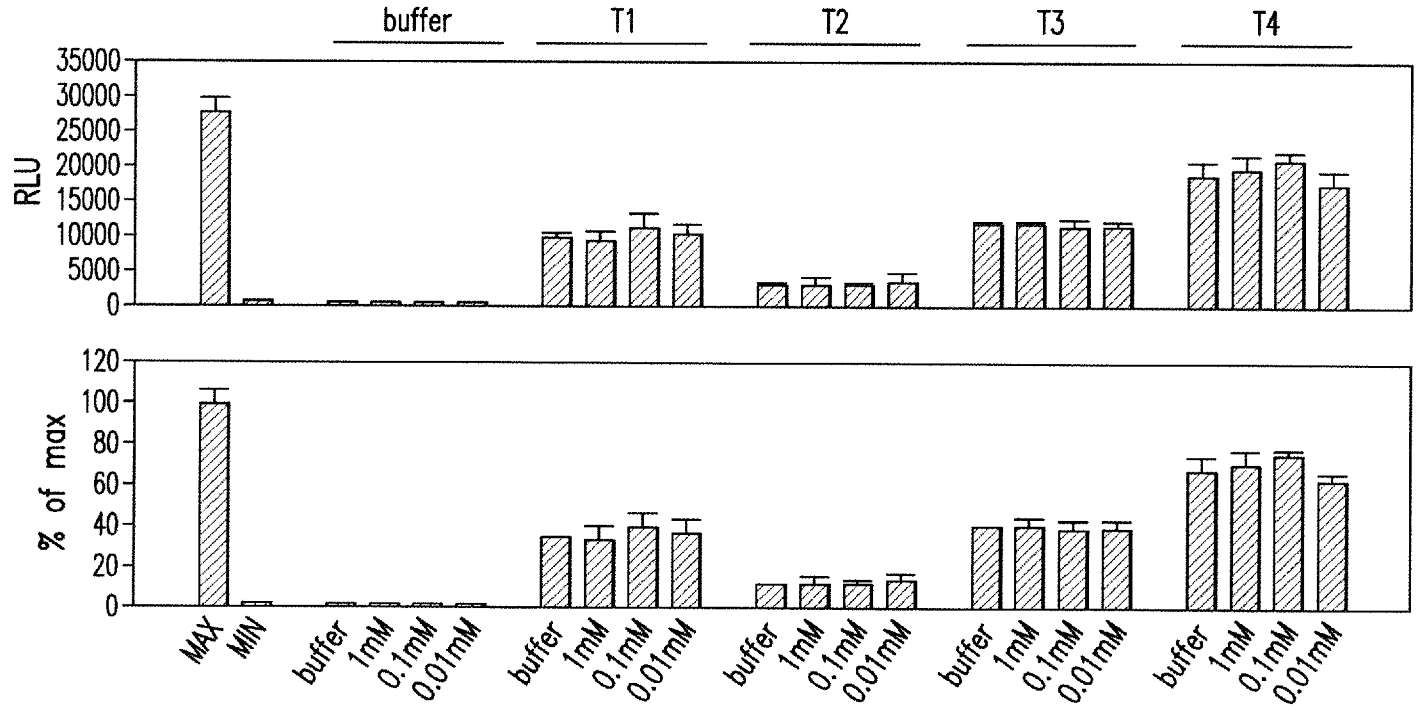
Figure 73A:
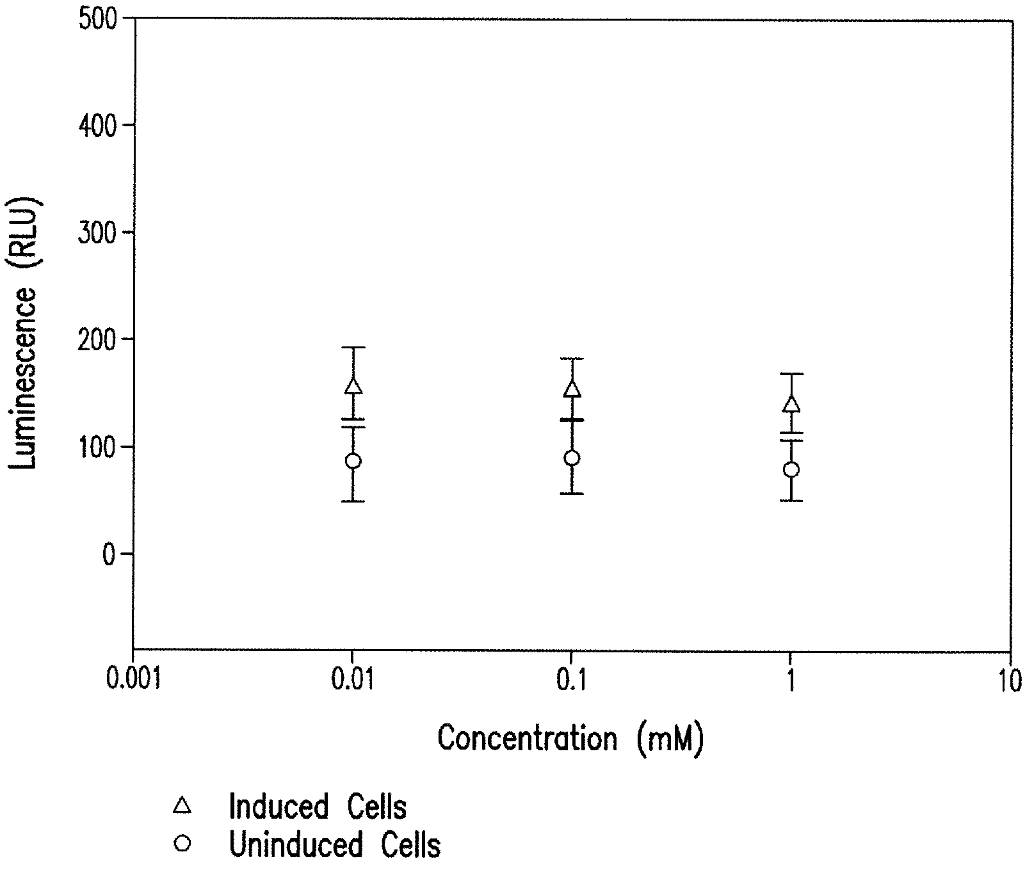
Figure 73A:
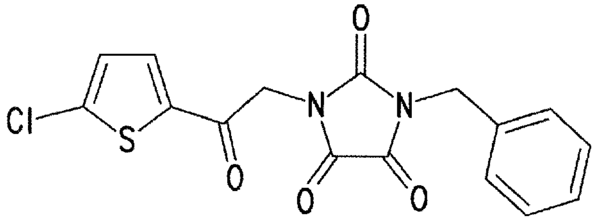
Figure 73B:
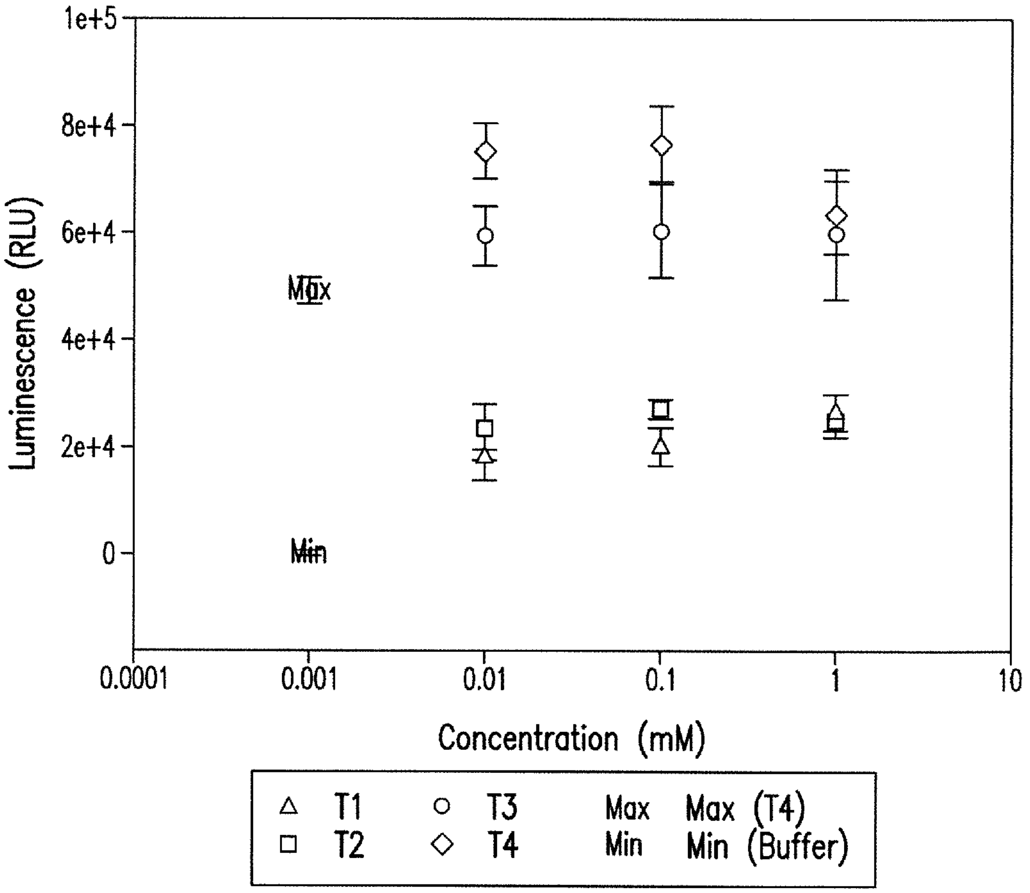
Figure 73B:
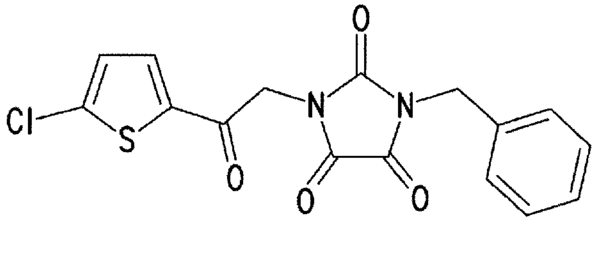
Figure 73C:
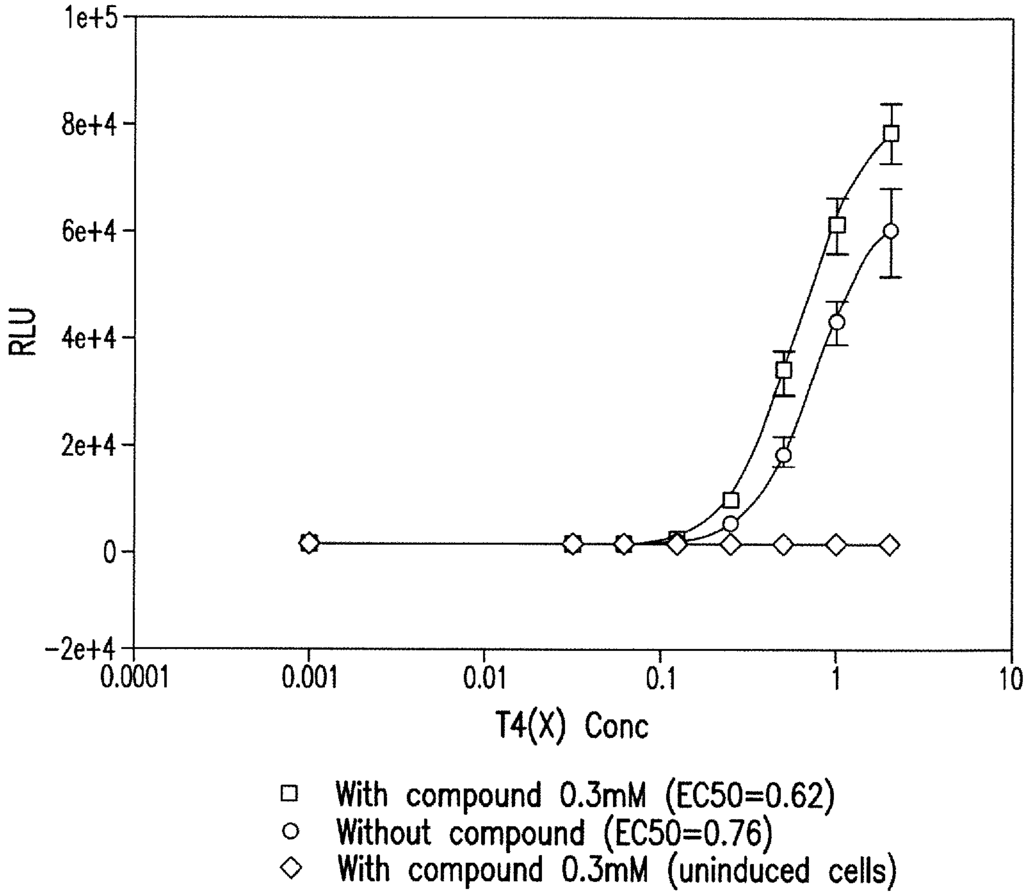
Figure 73C:
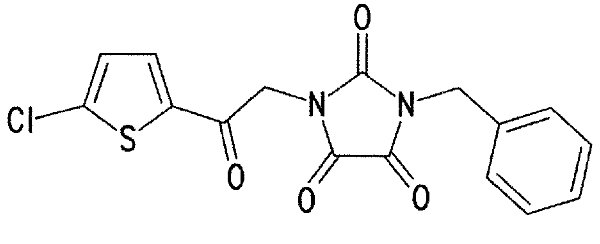
Figure 73D:
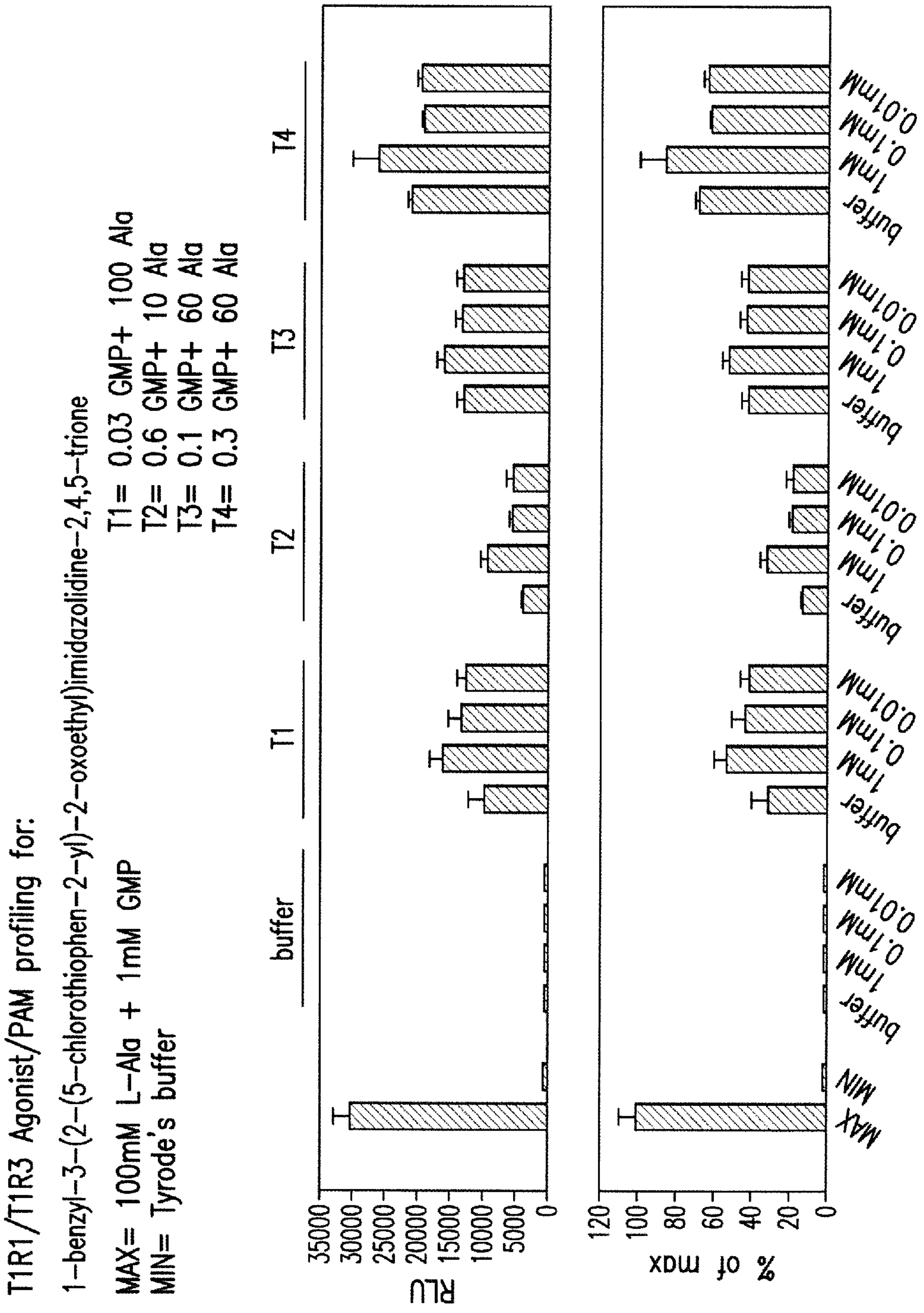
Figure 73E:
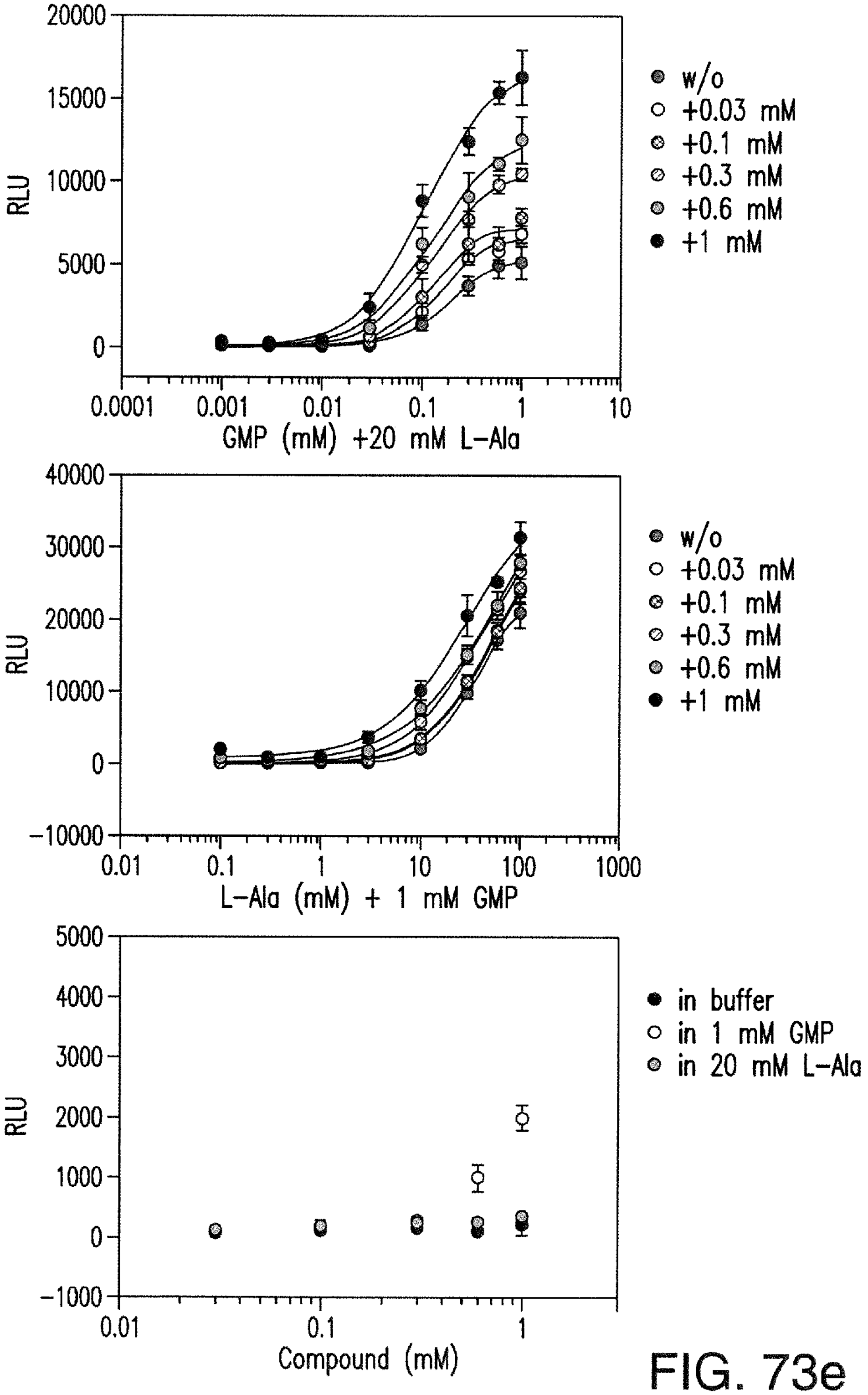
Figure 73F:
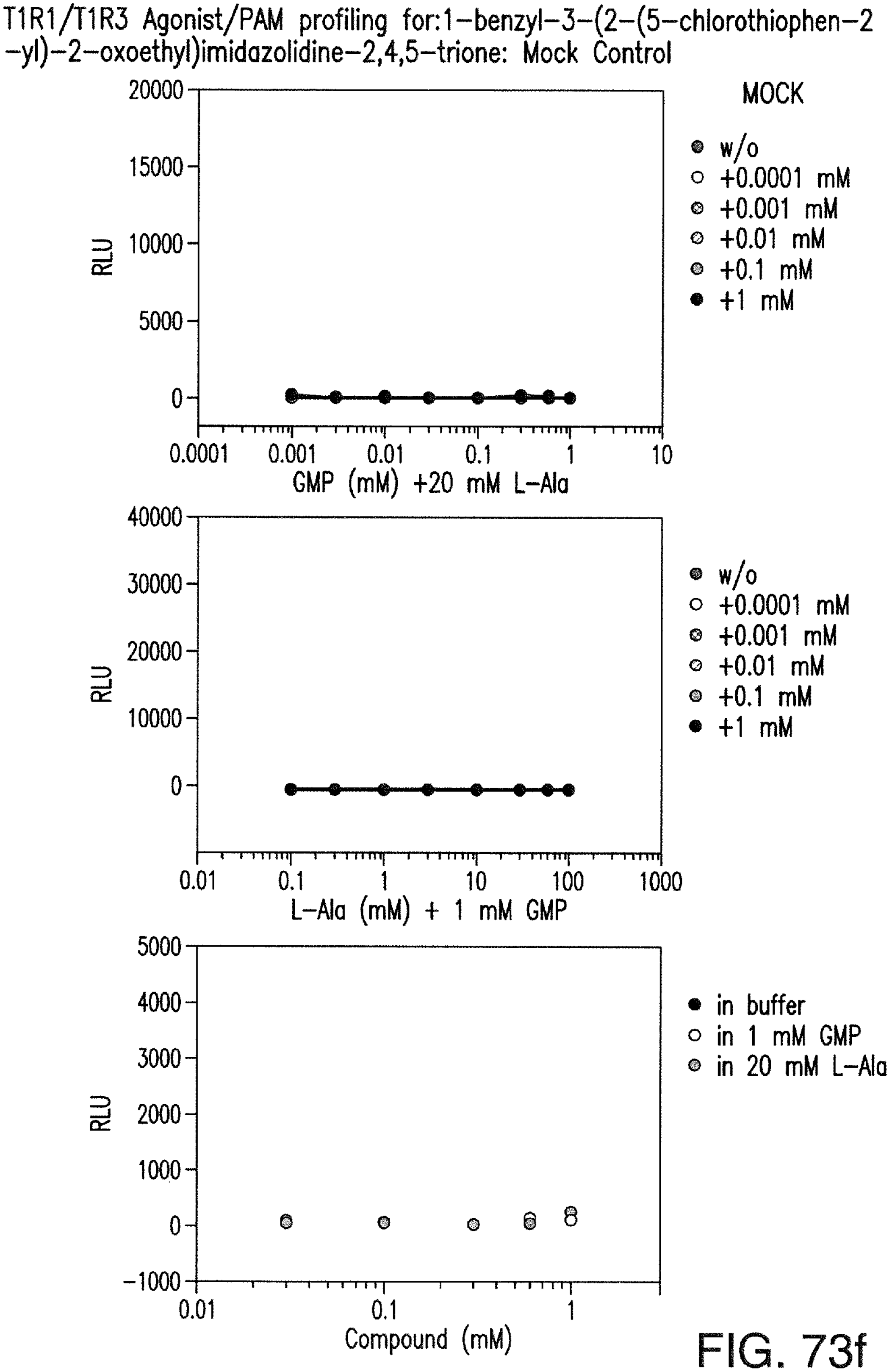
Figure 74A:
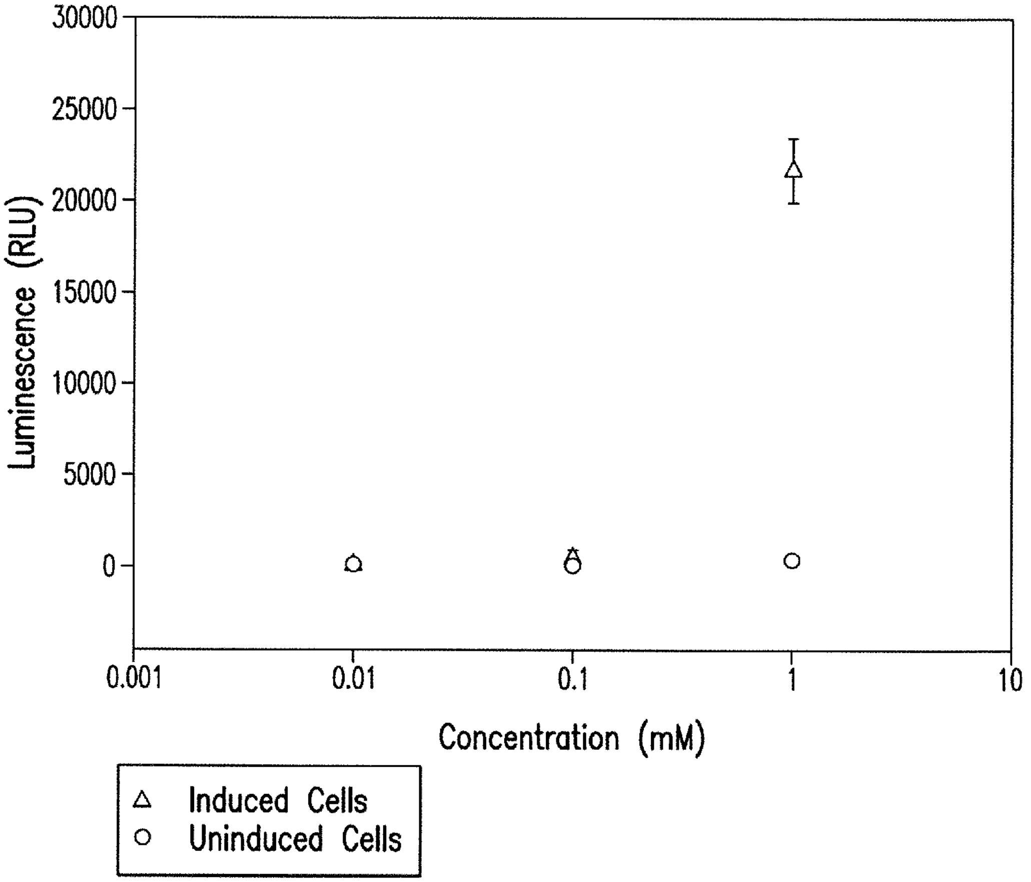
Figure 74A:
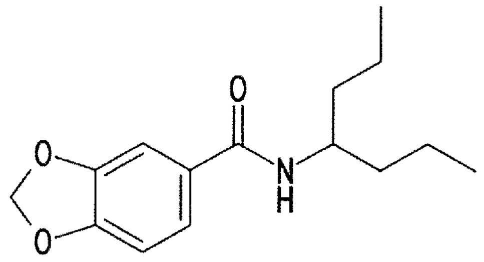
Figure 74B:
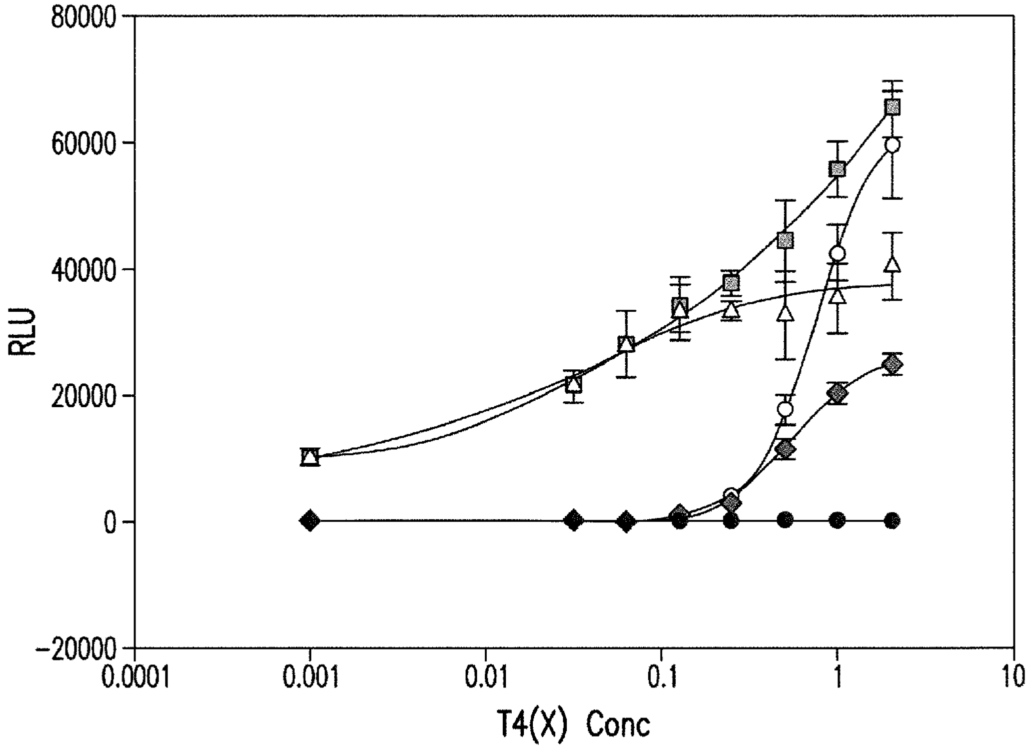
Figure 74B:
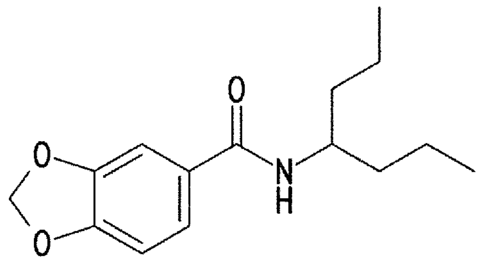
Figure 74C:
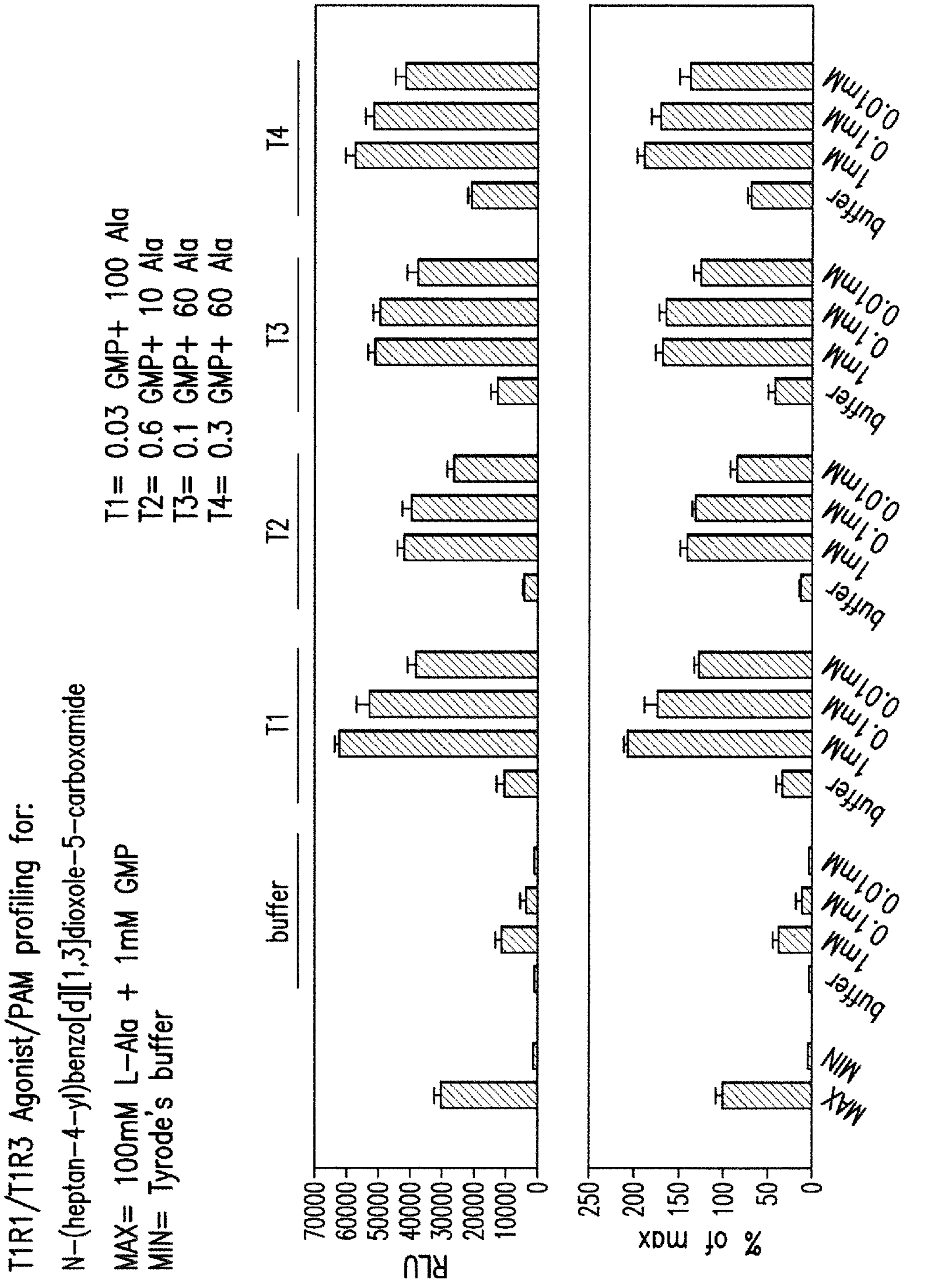
Figure 74D:
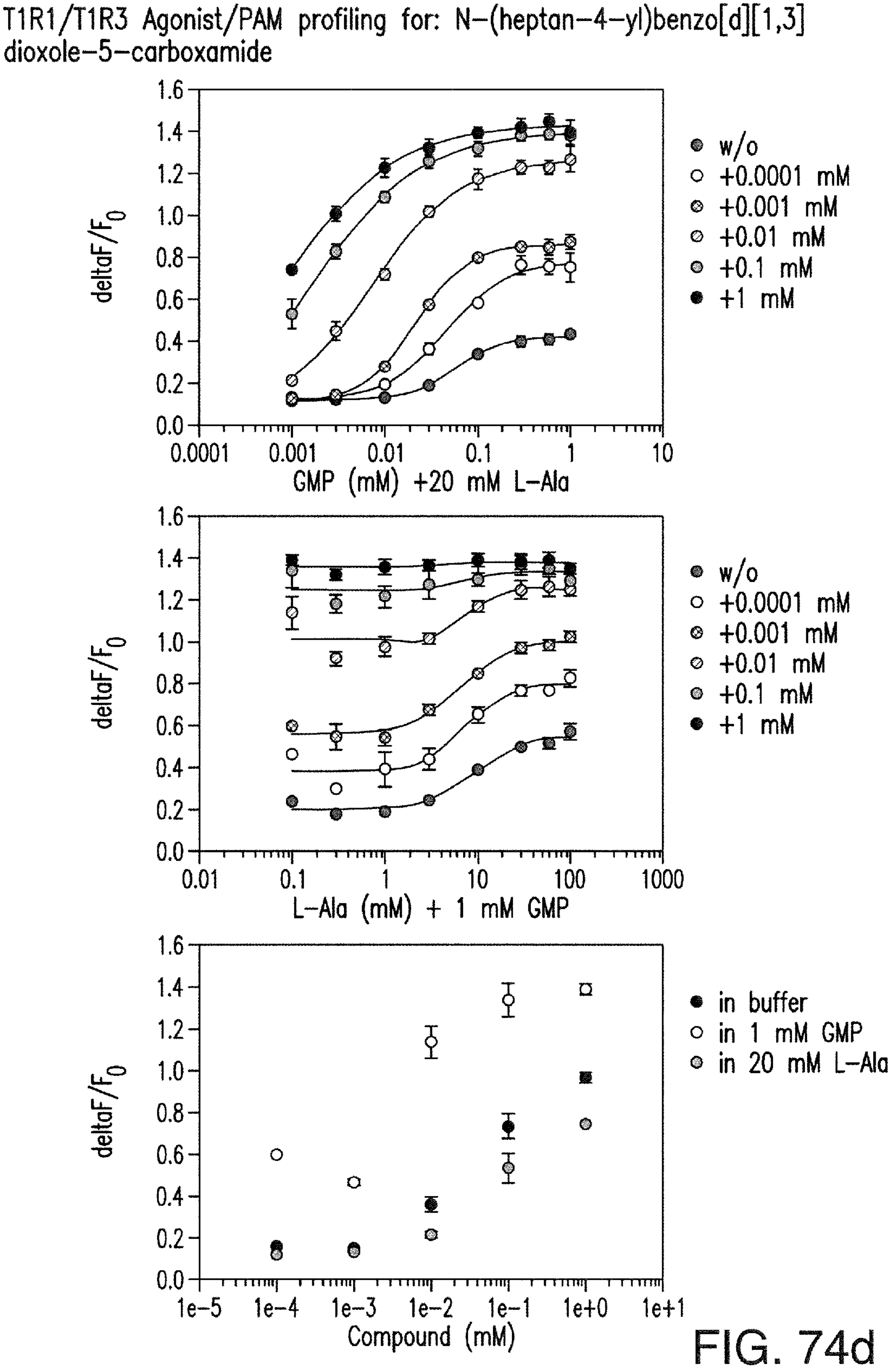
Figure 74E:
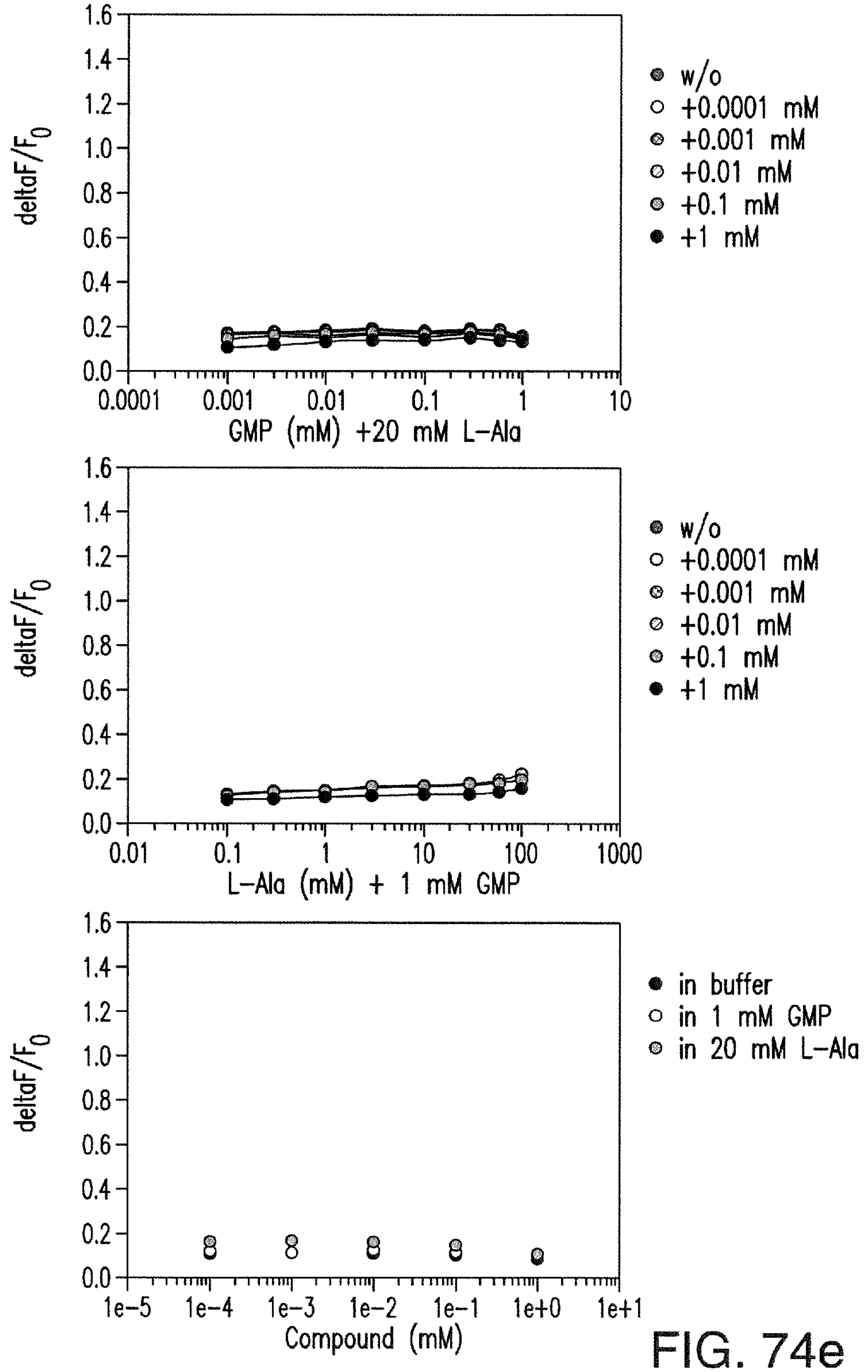
Figure 75A:
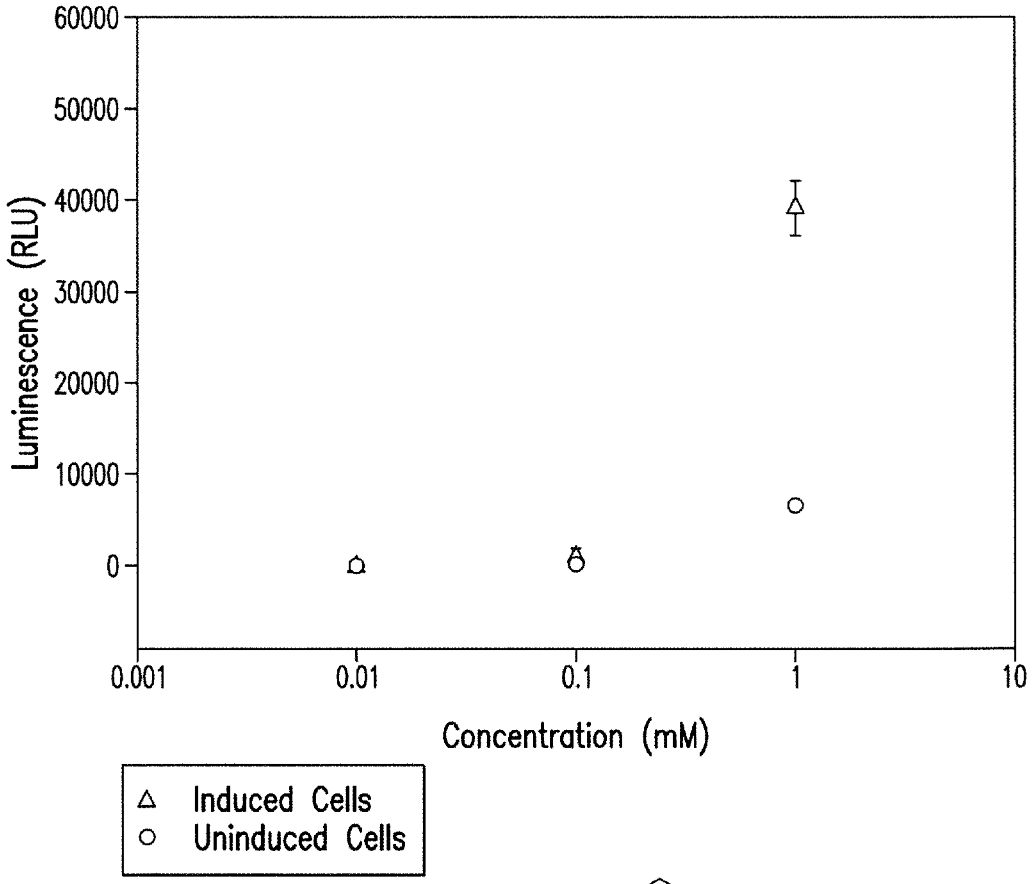
Figure 75A:
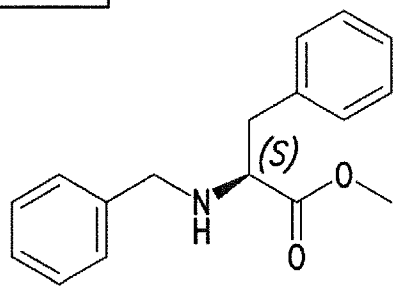
Figure 75B:
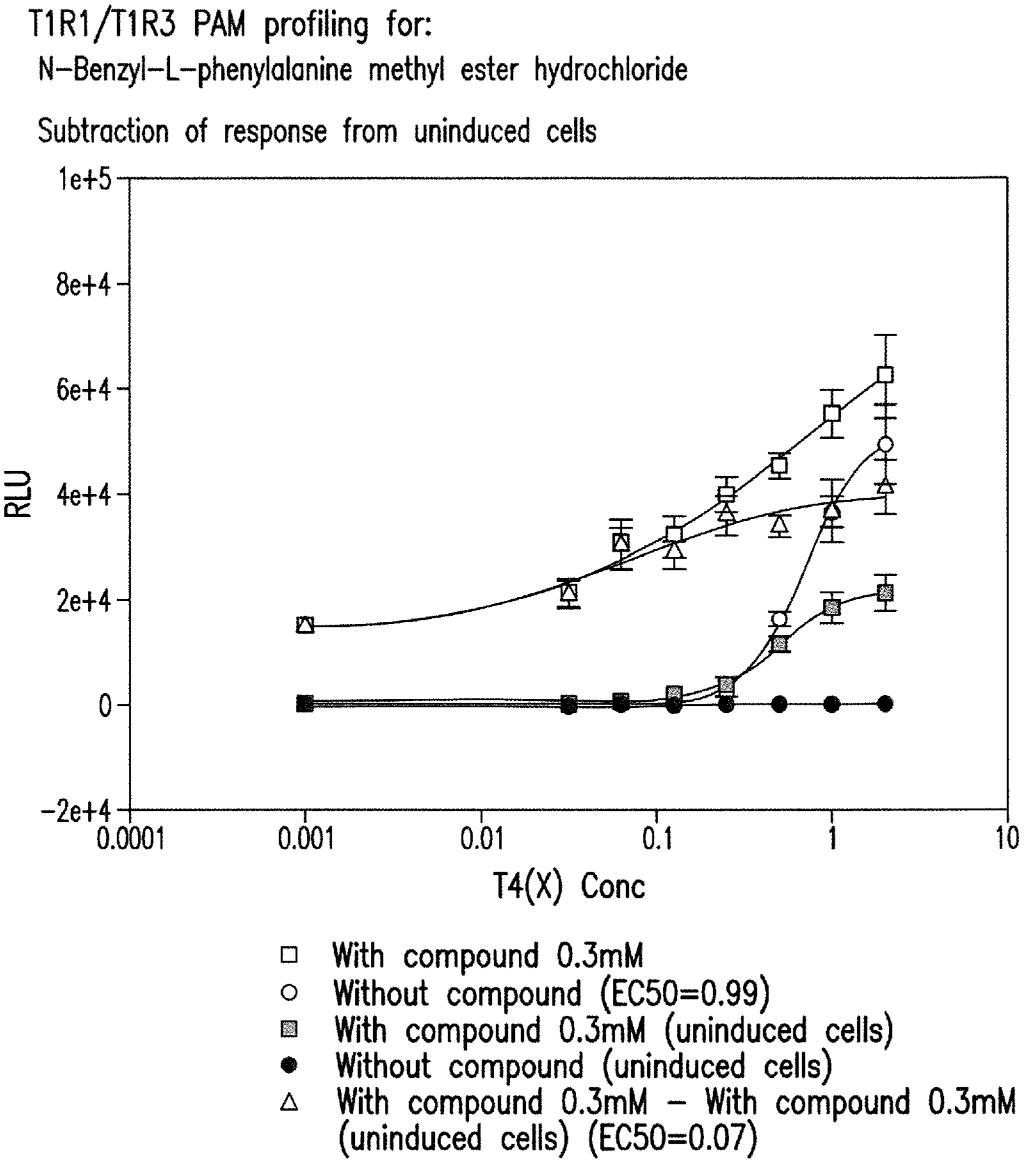
Figure 75C:
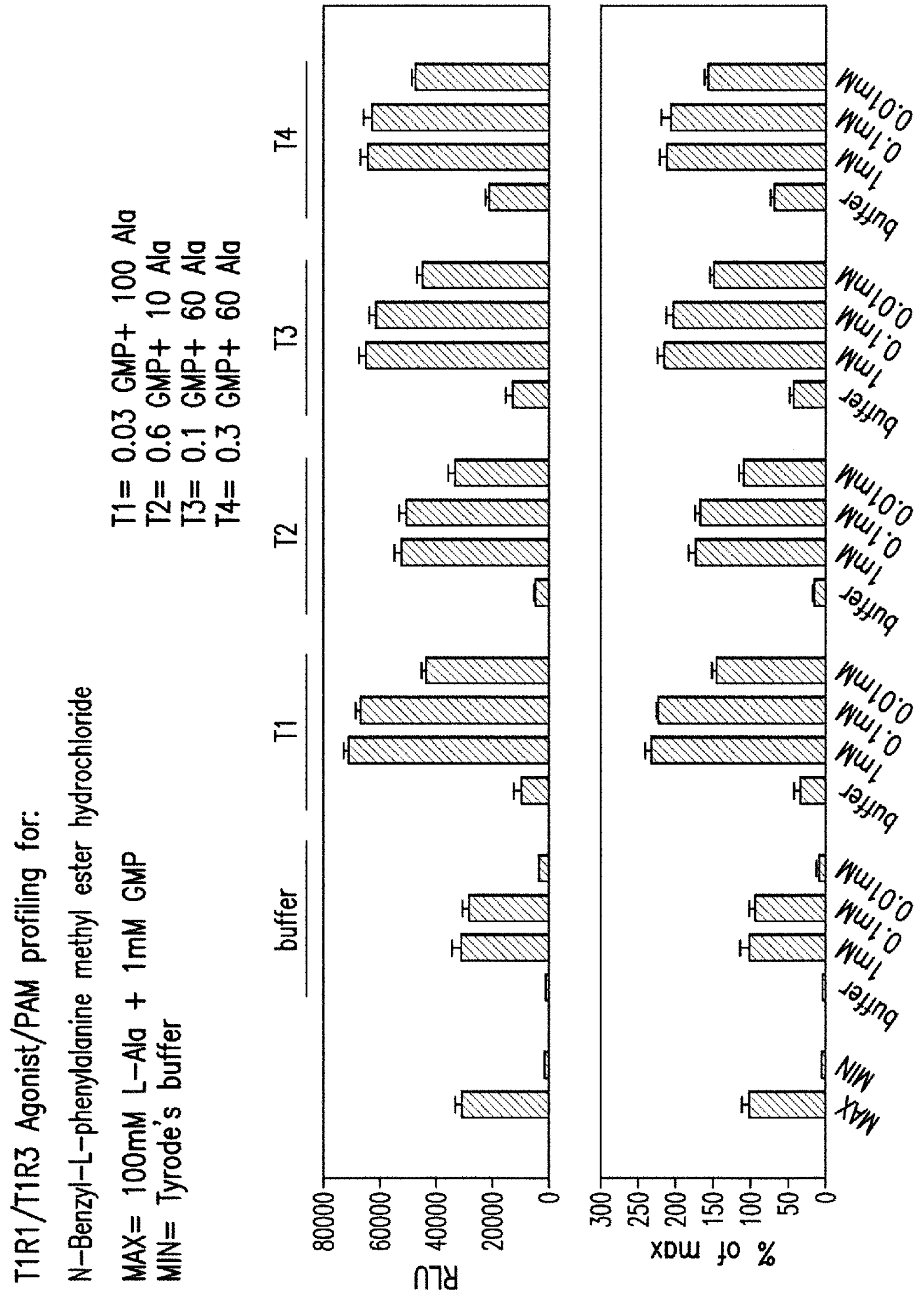
Figure 75D:
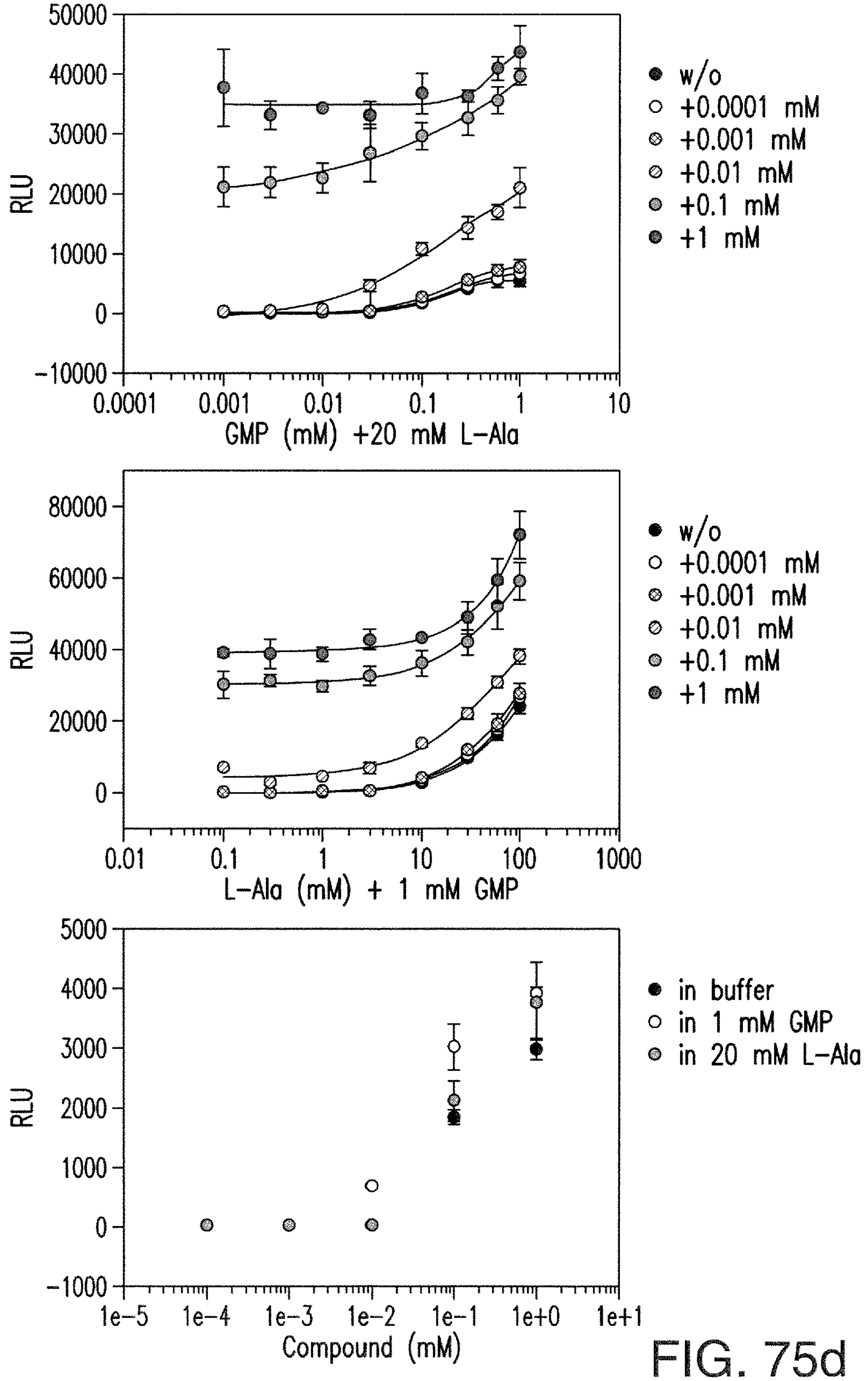
Figure 75E:
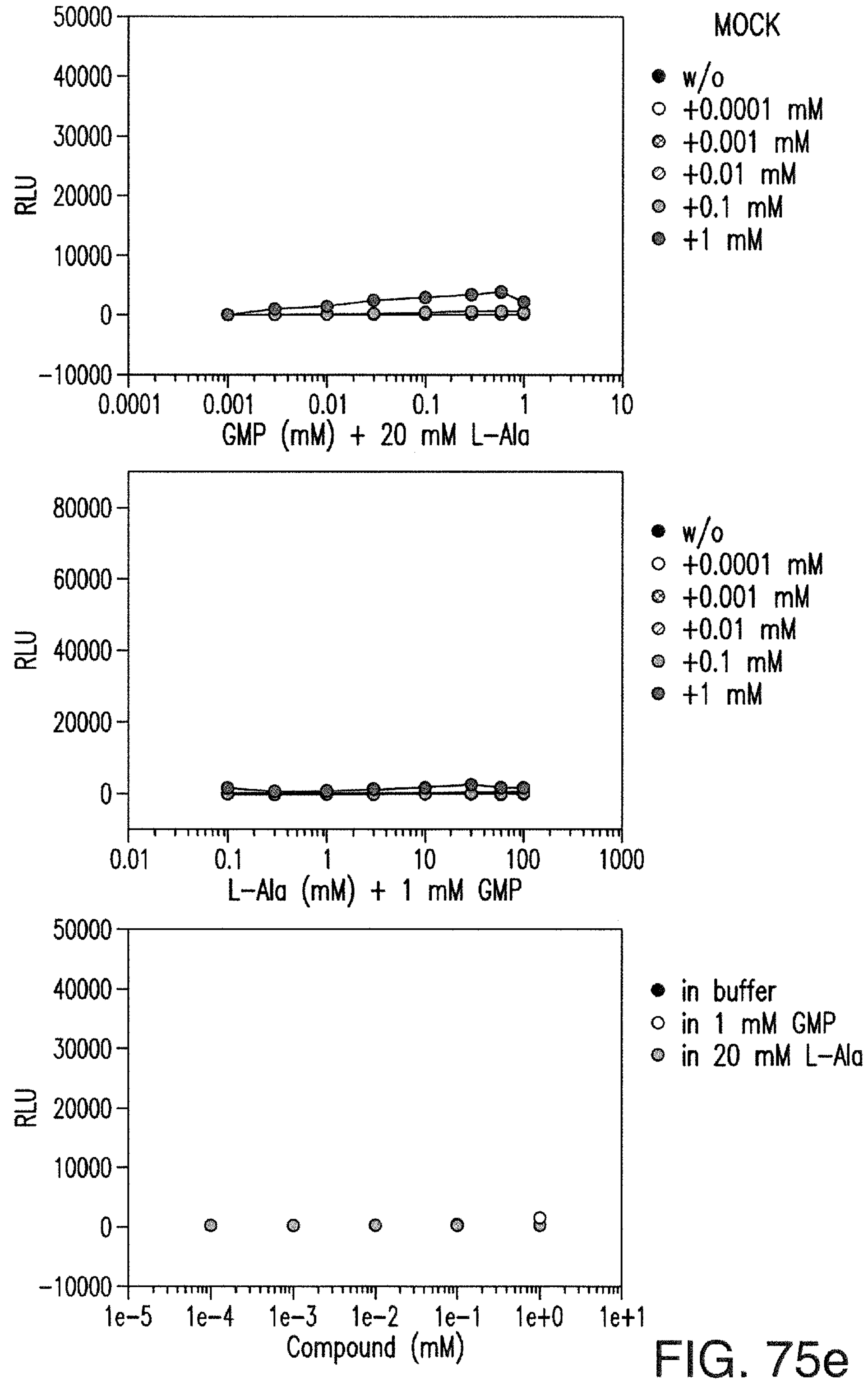
Figure 76A:
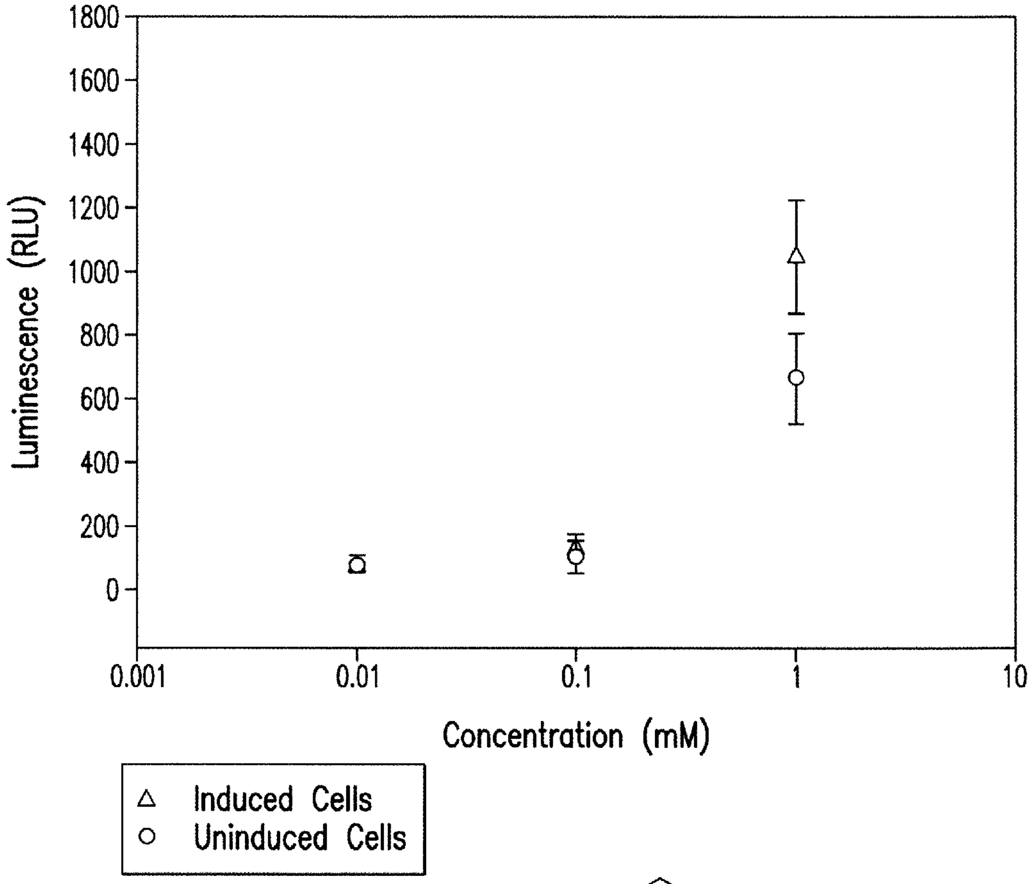
Figure 76A:
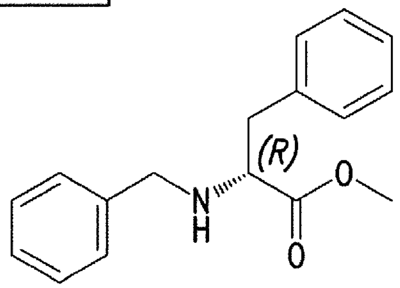
Figure 76B:
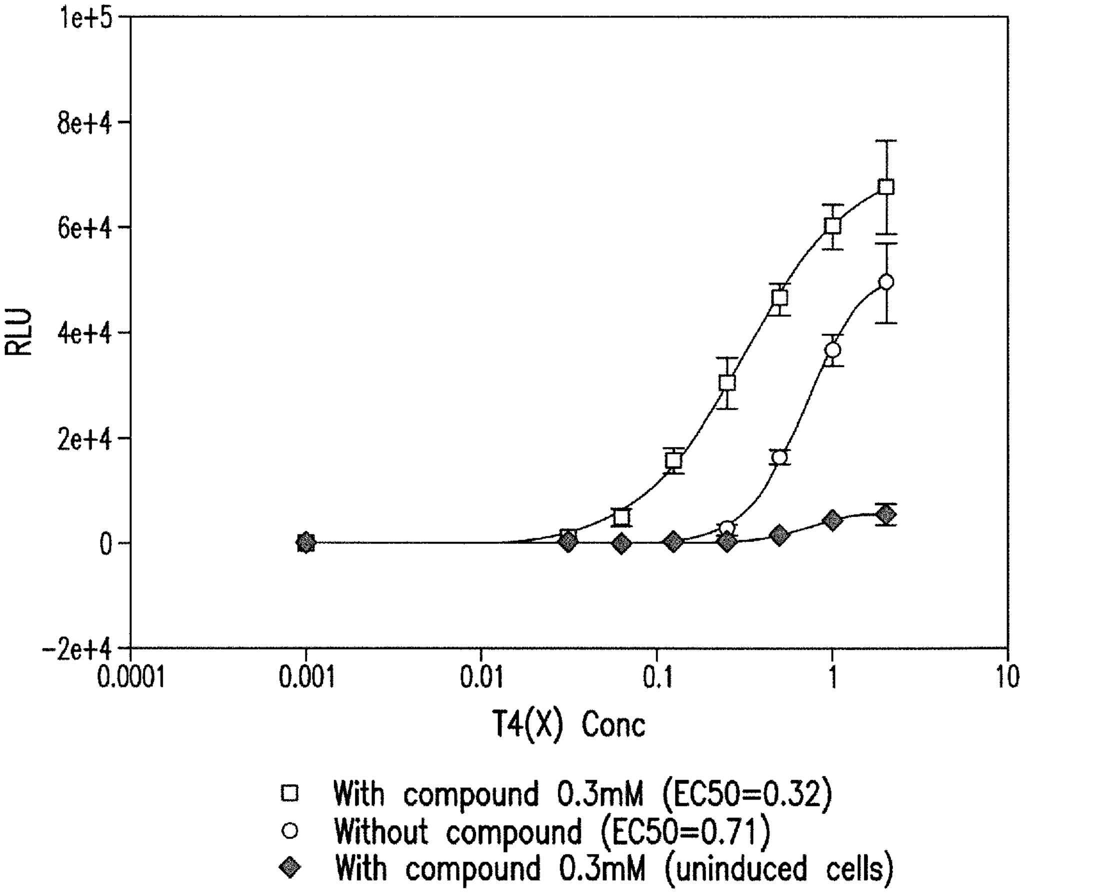
Figure 76B:
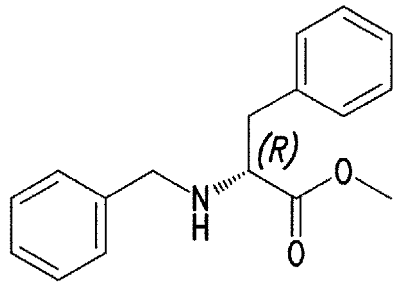
Figure 76C:
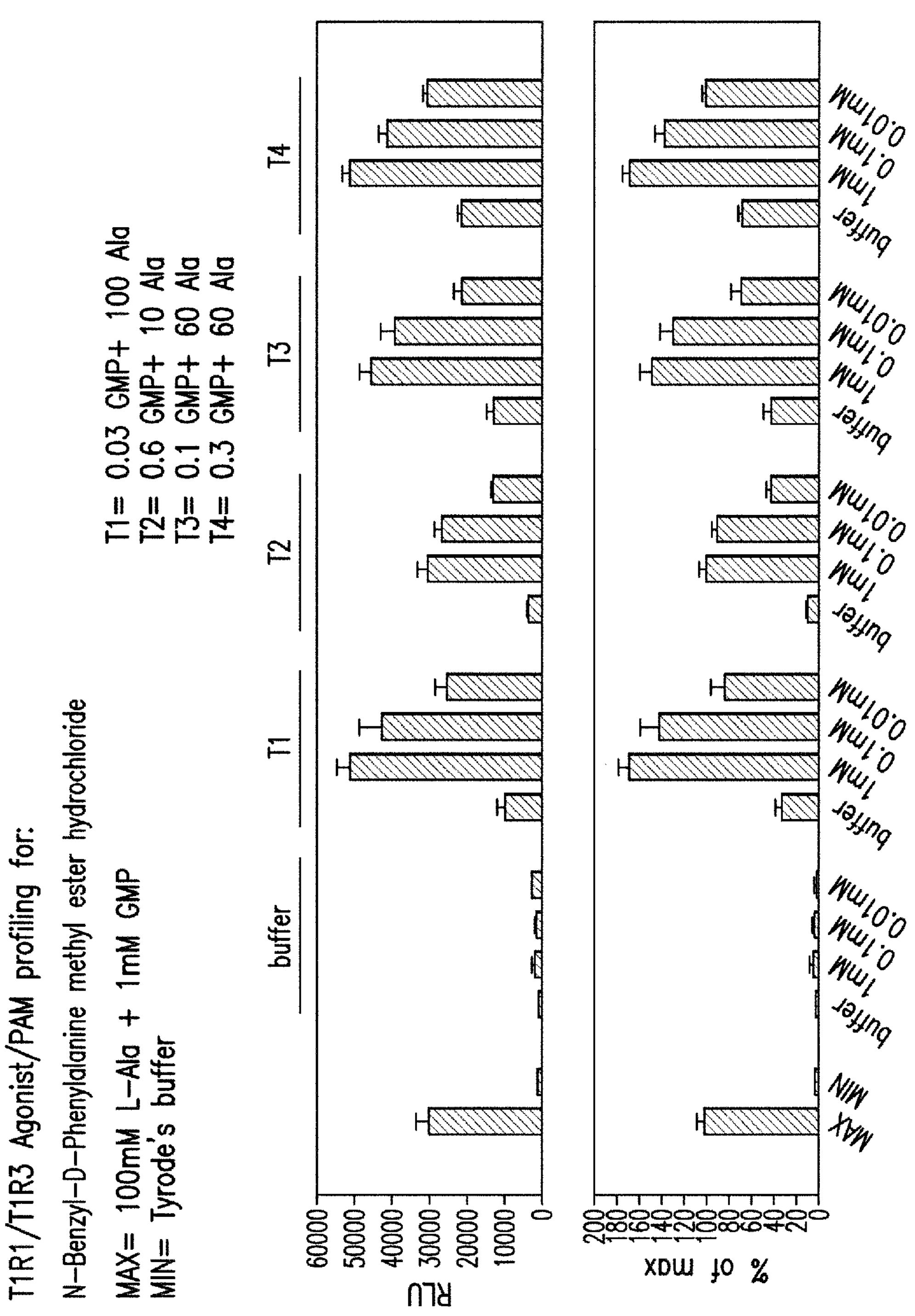
Figure 76D:
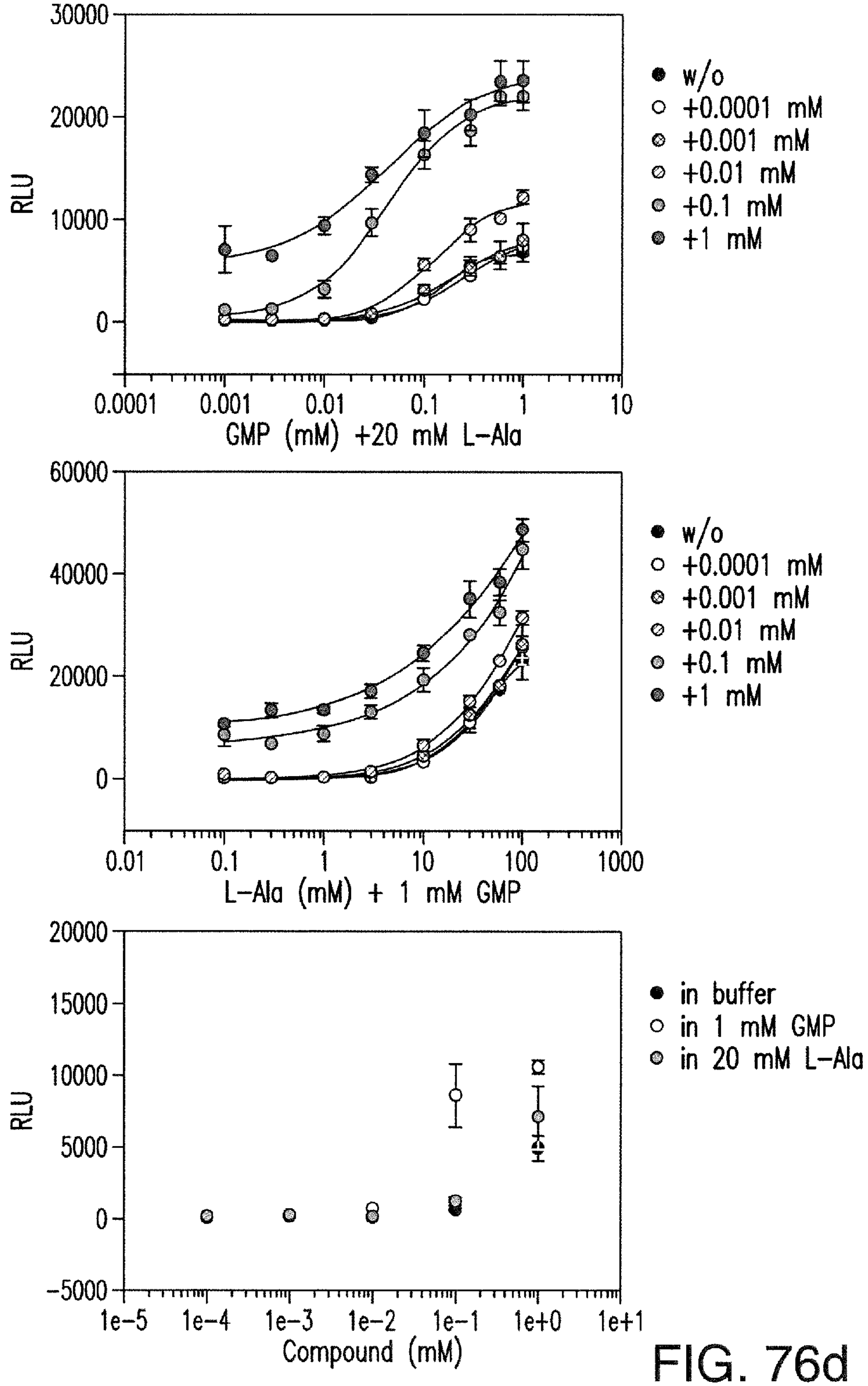
Figure 76E:
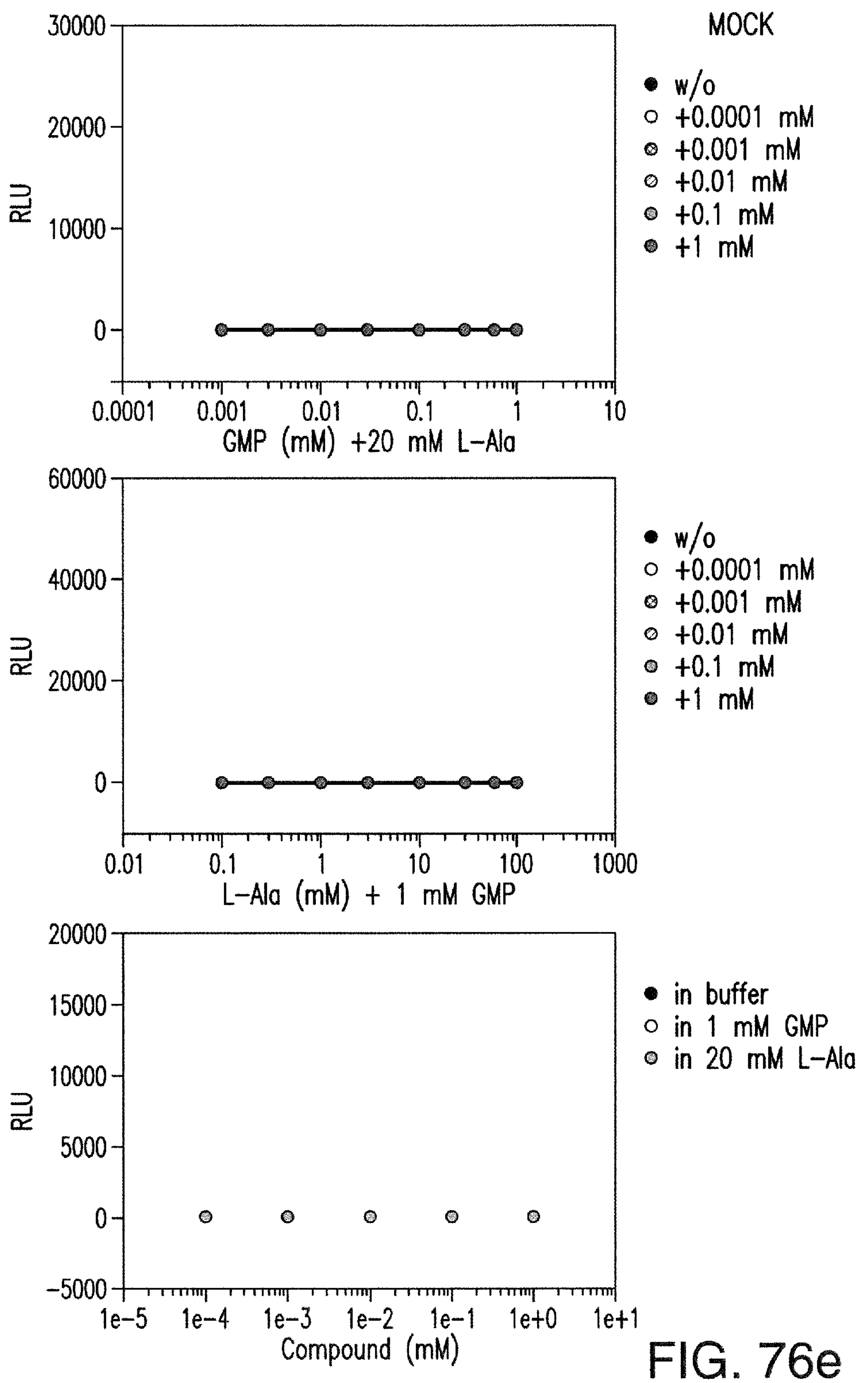
Figure 77A:
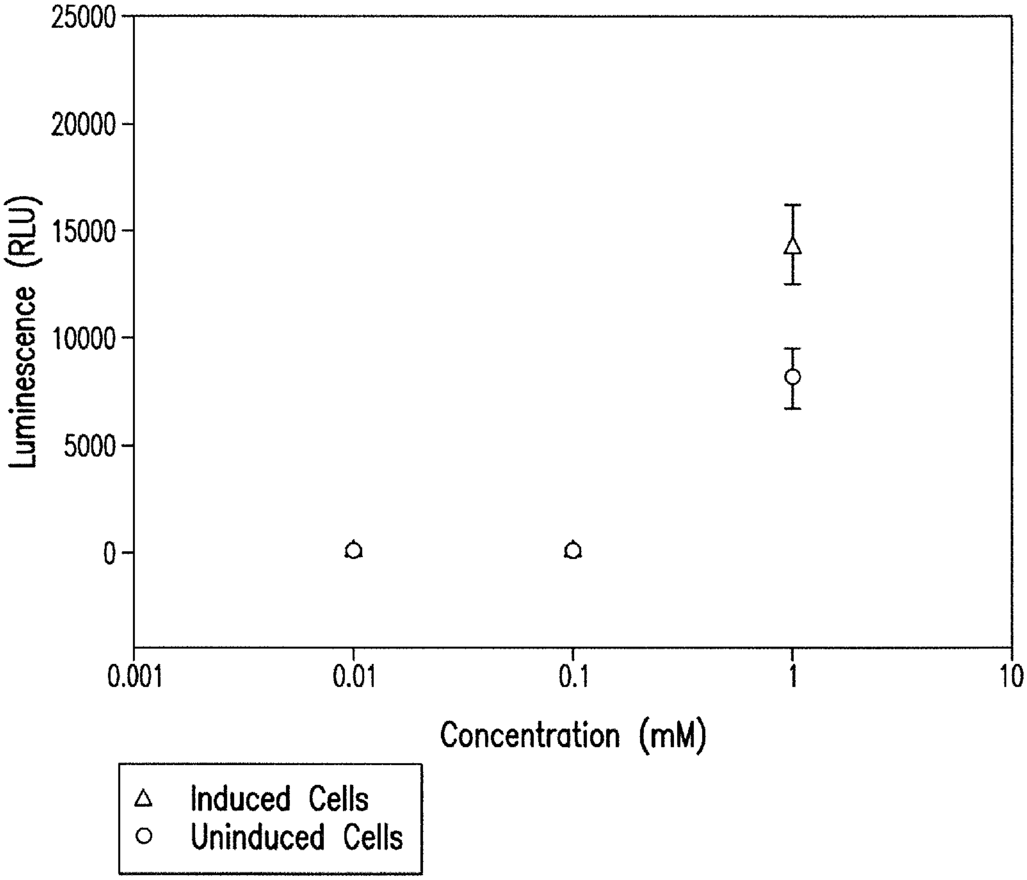
Figure 77A:
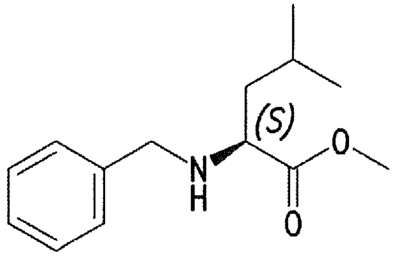
Figure 77B:
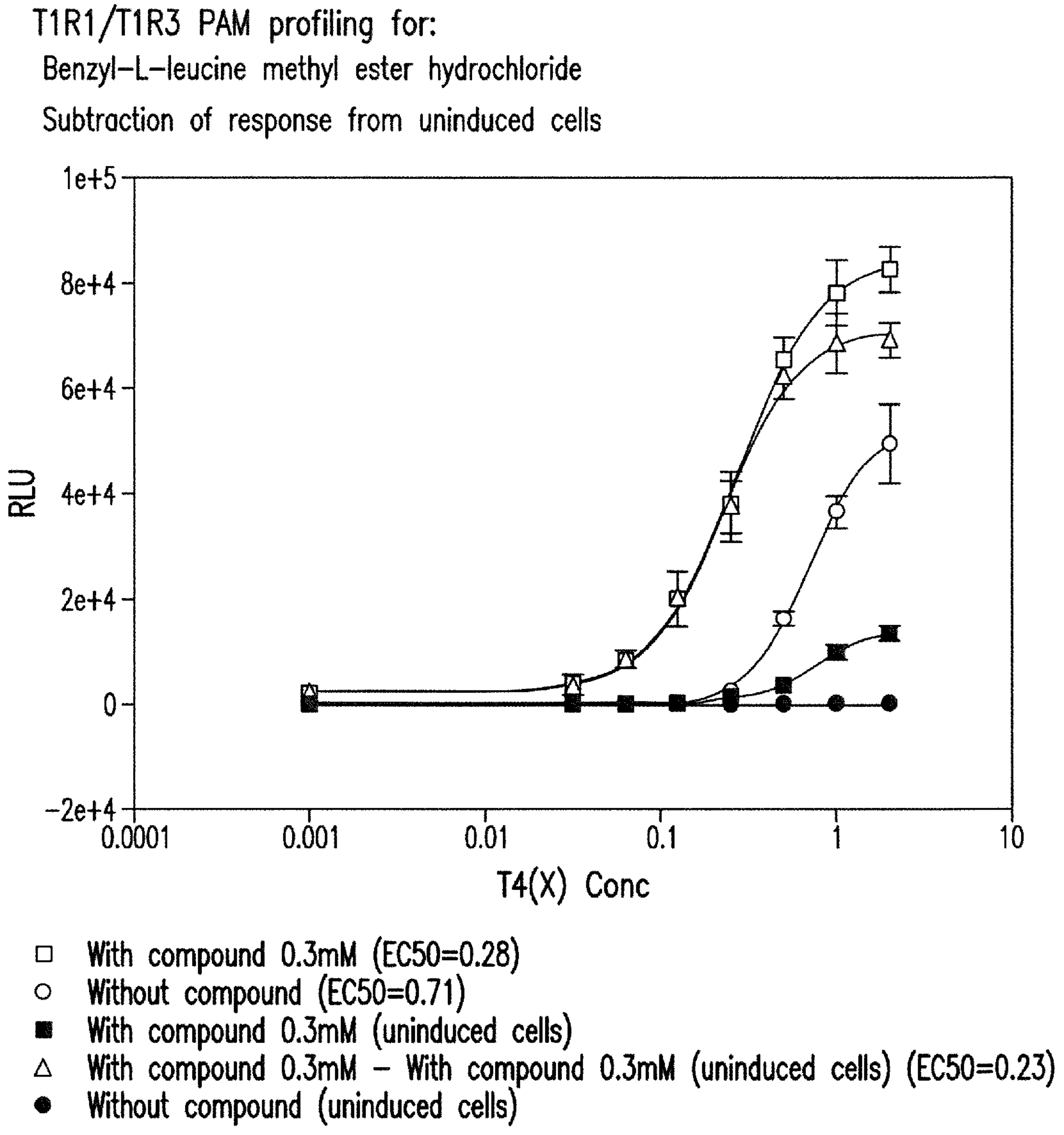
Figure 77C:
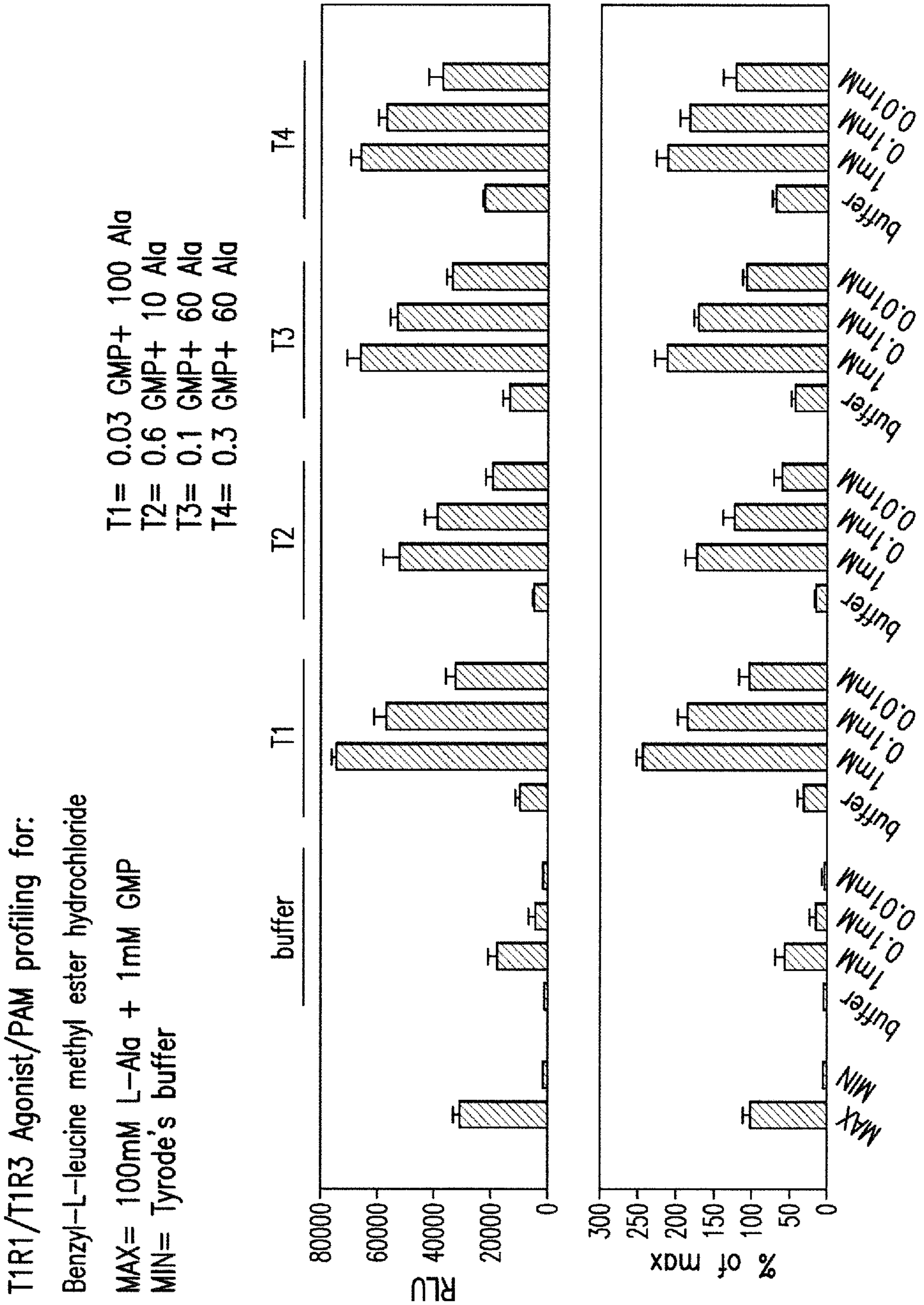
Figure 77D:
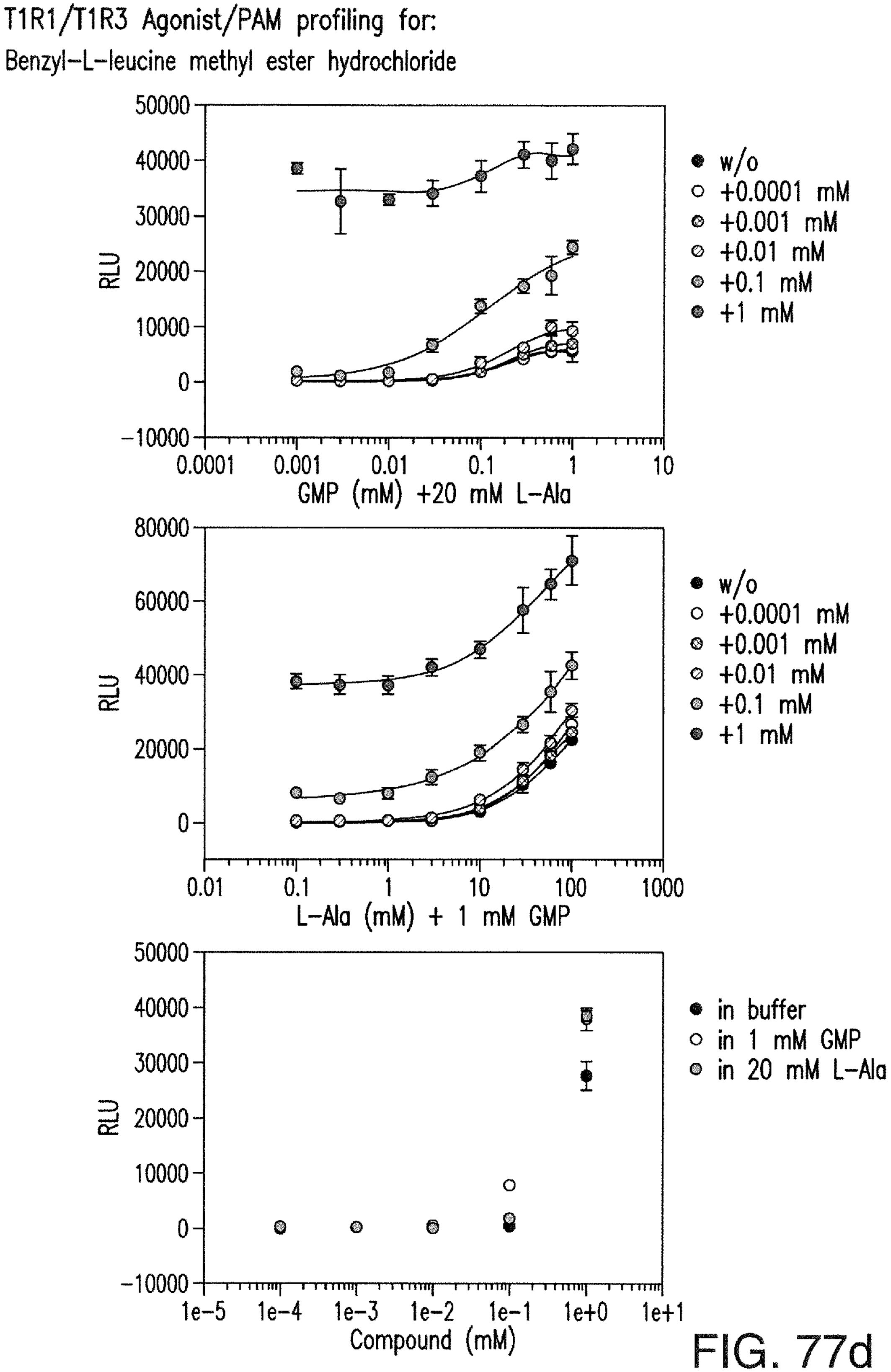
Figure 77E:
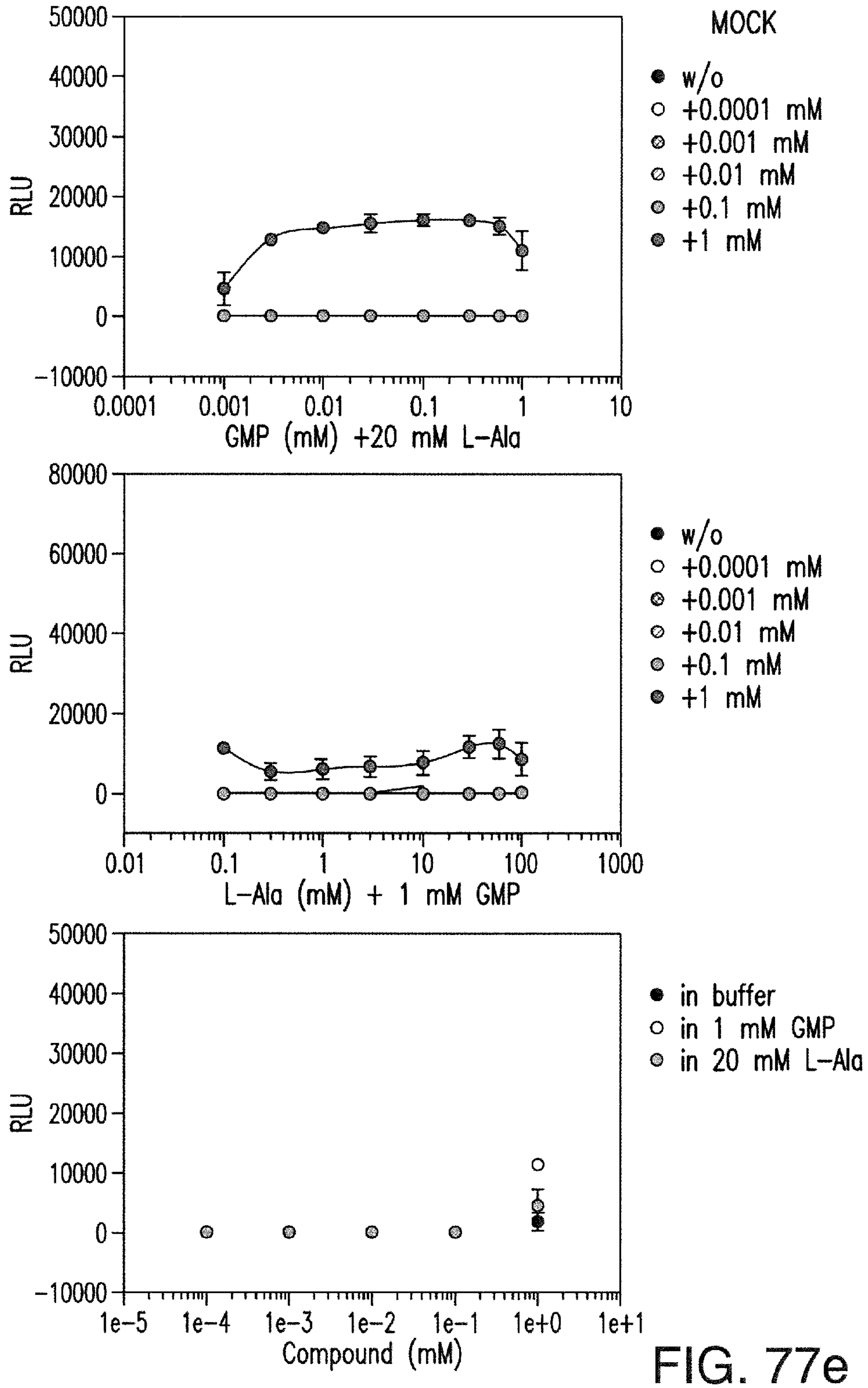
Figure 78A:
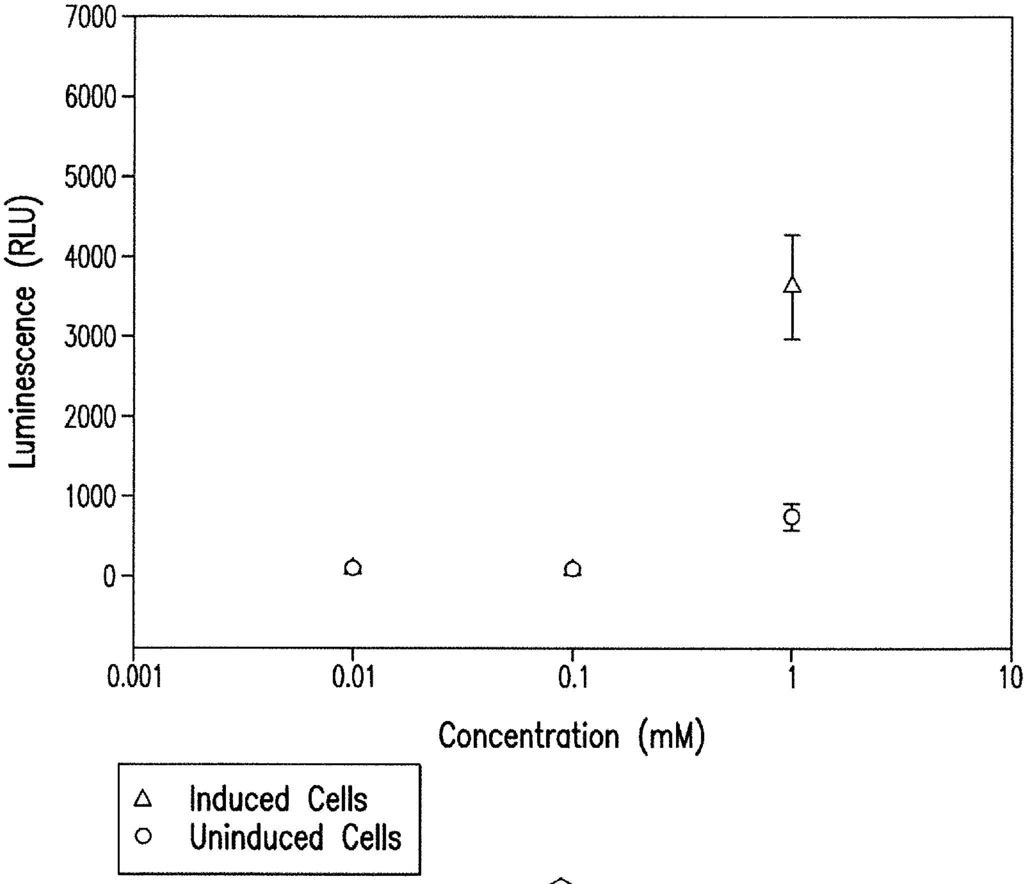
Figure 78A:
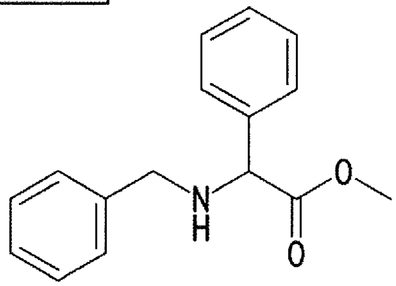
Figure 78B:
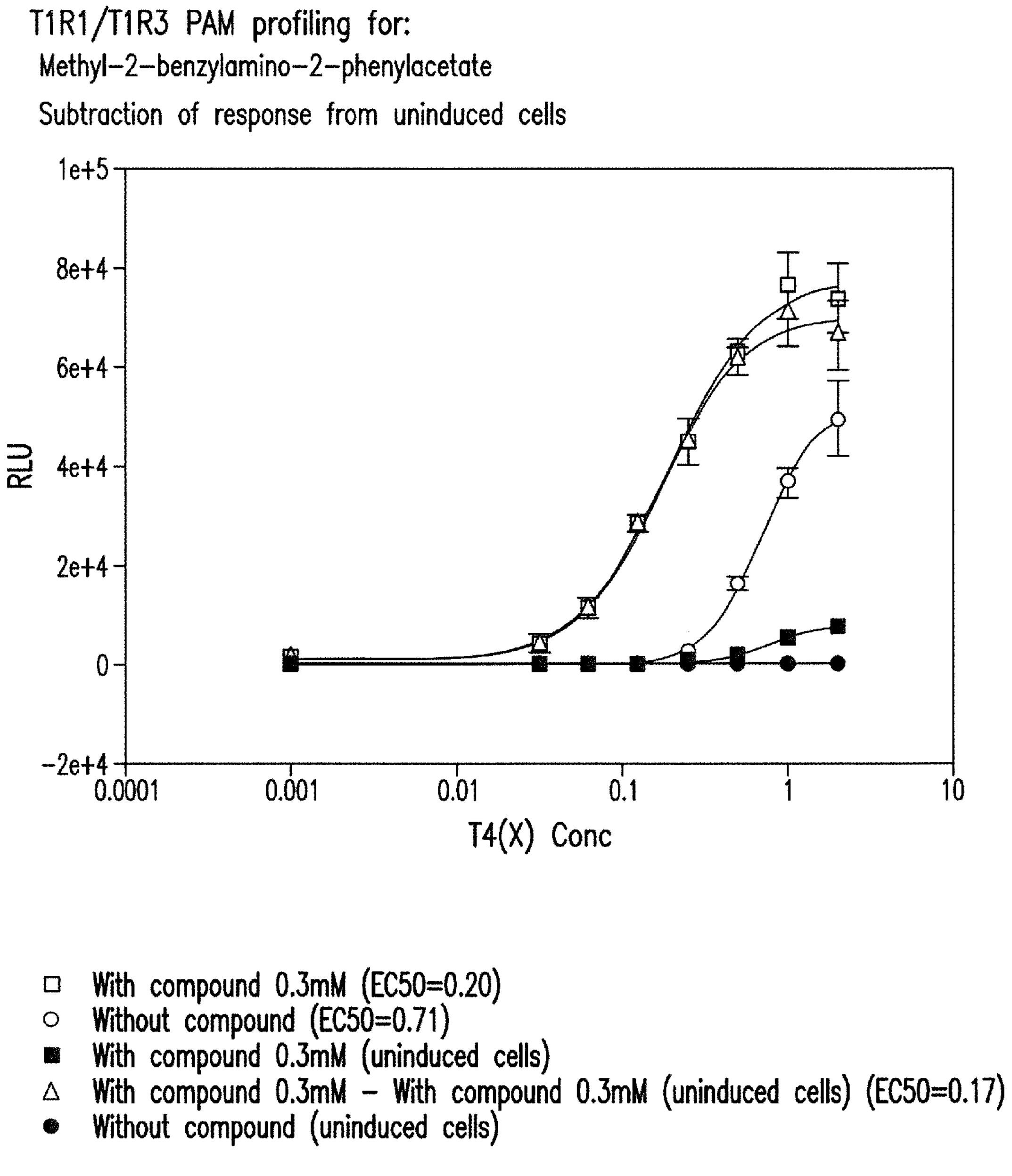
Figure 78C:
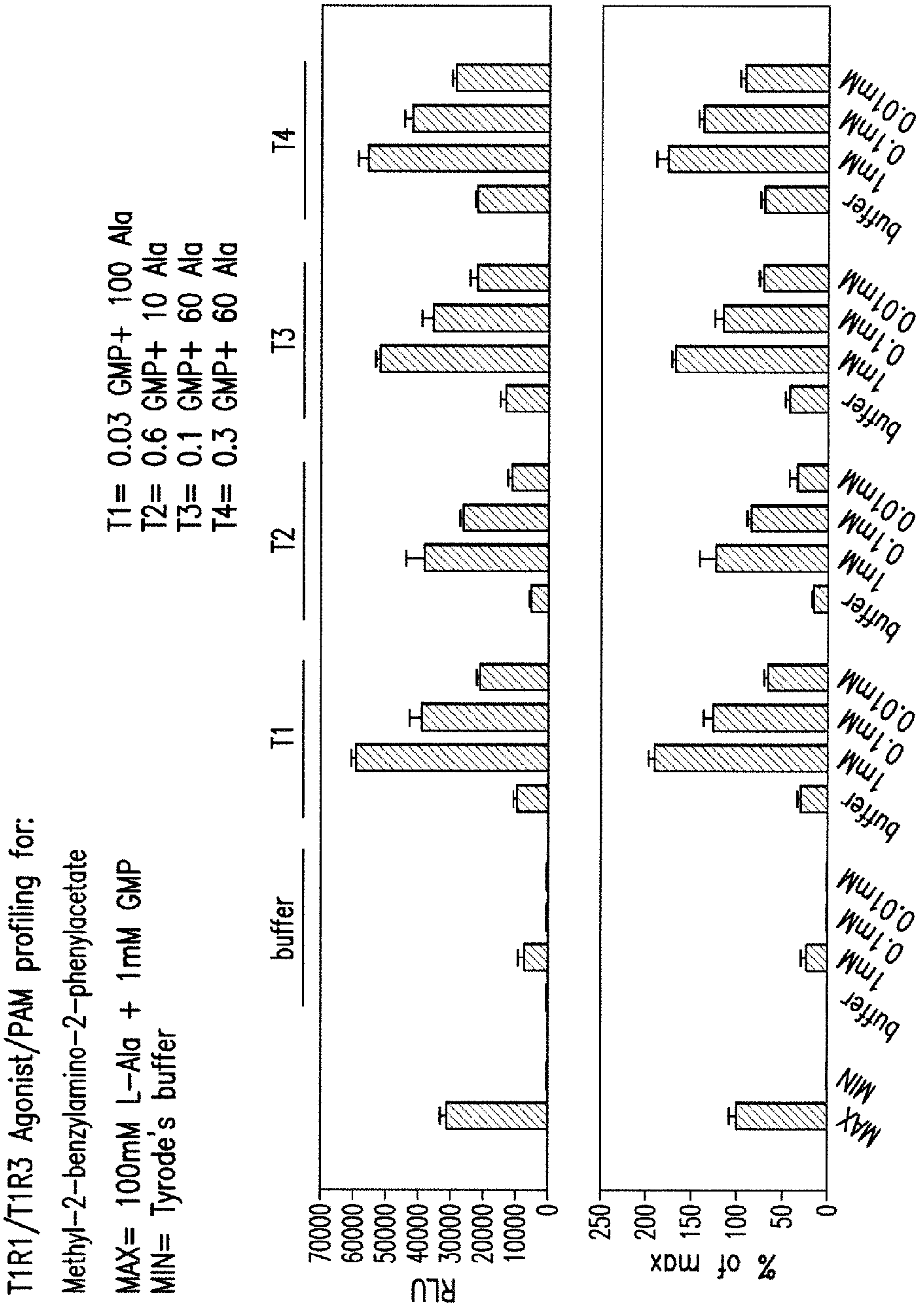
Figure 78D:
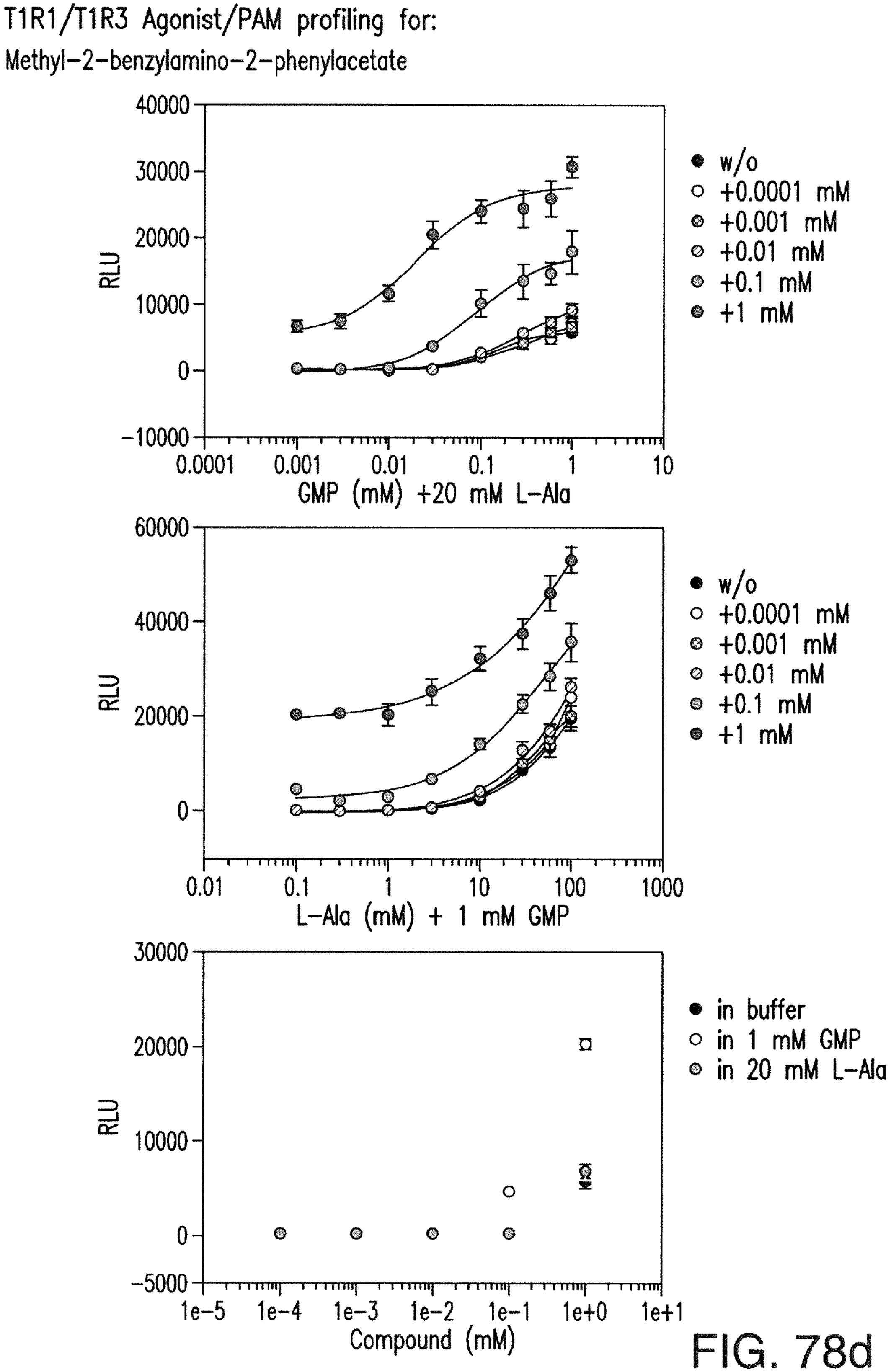
Figure 78E:
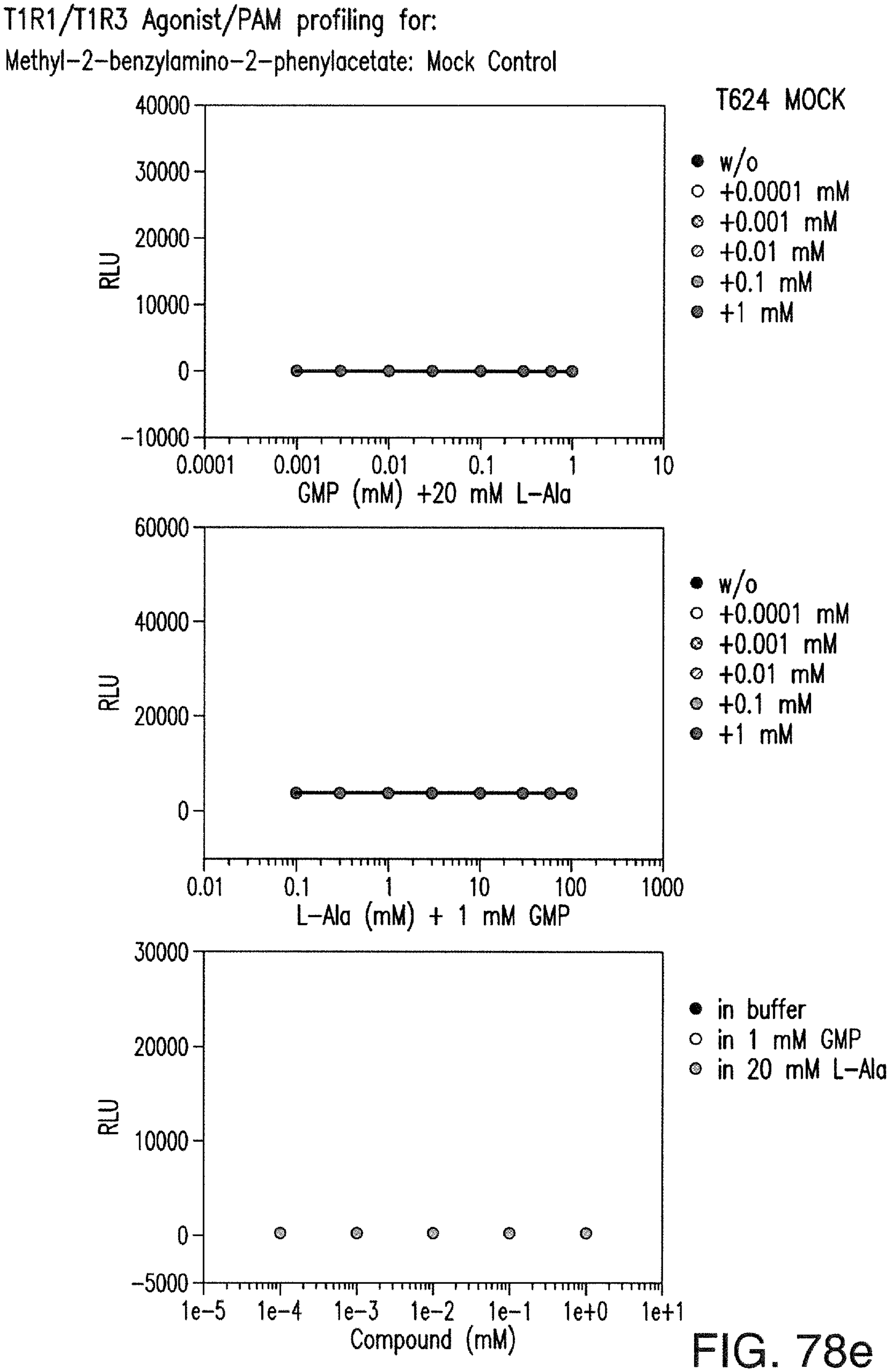
Figure 79A:
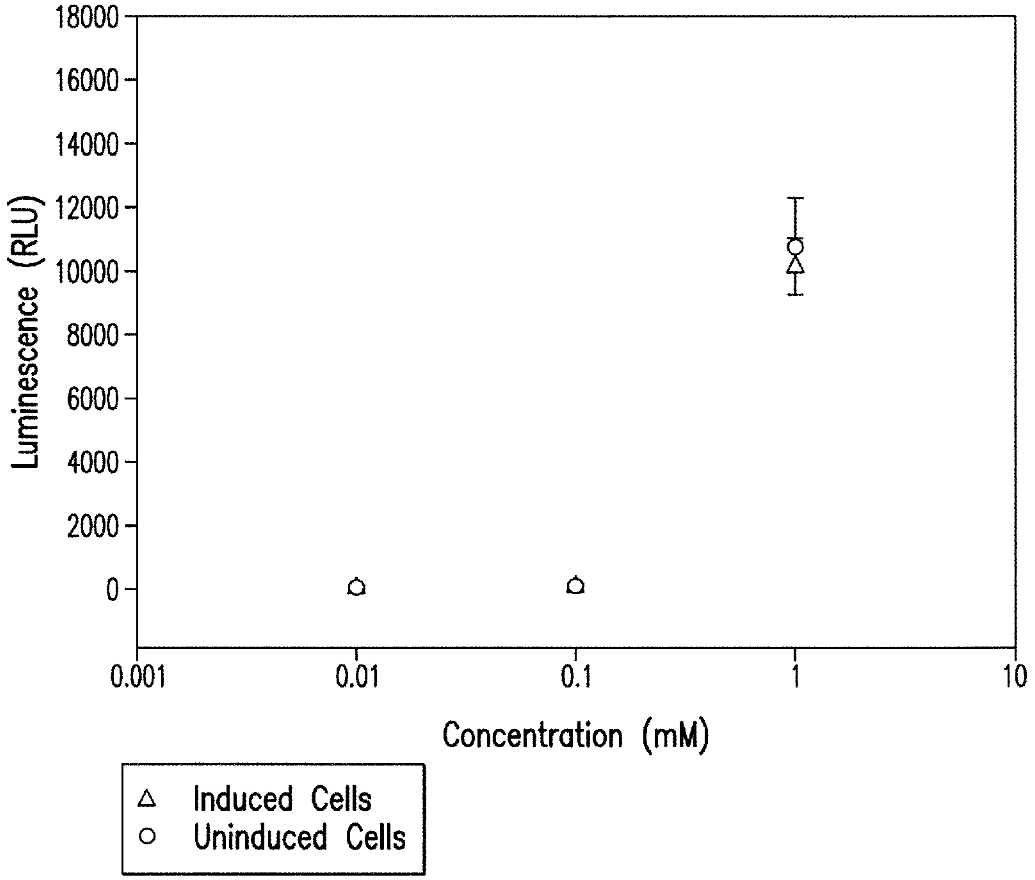
Figure 79A:
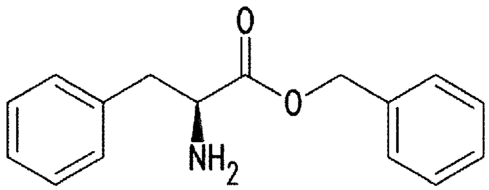
Figure 79B:
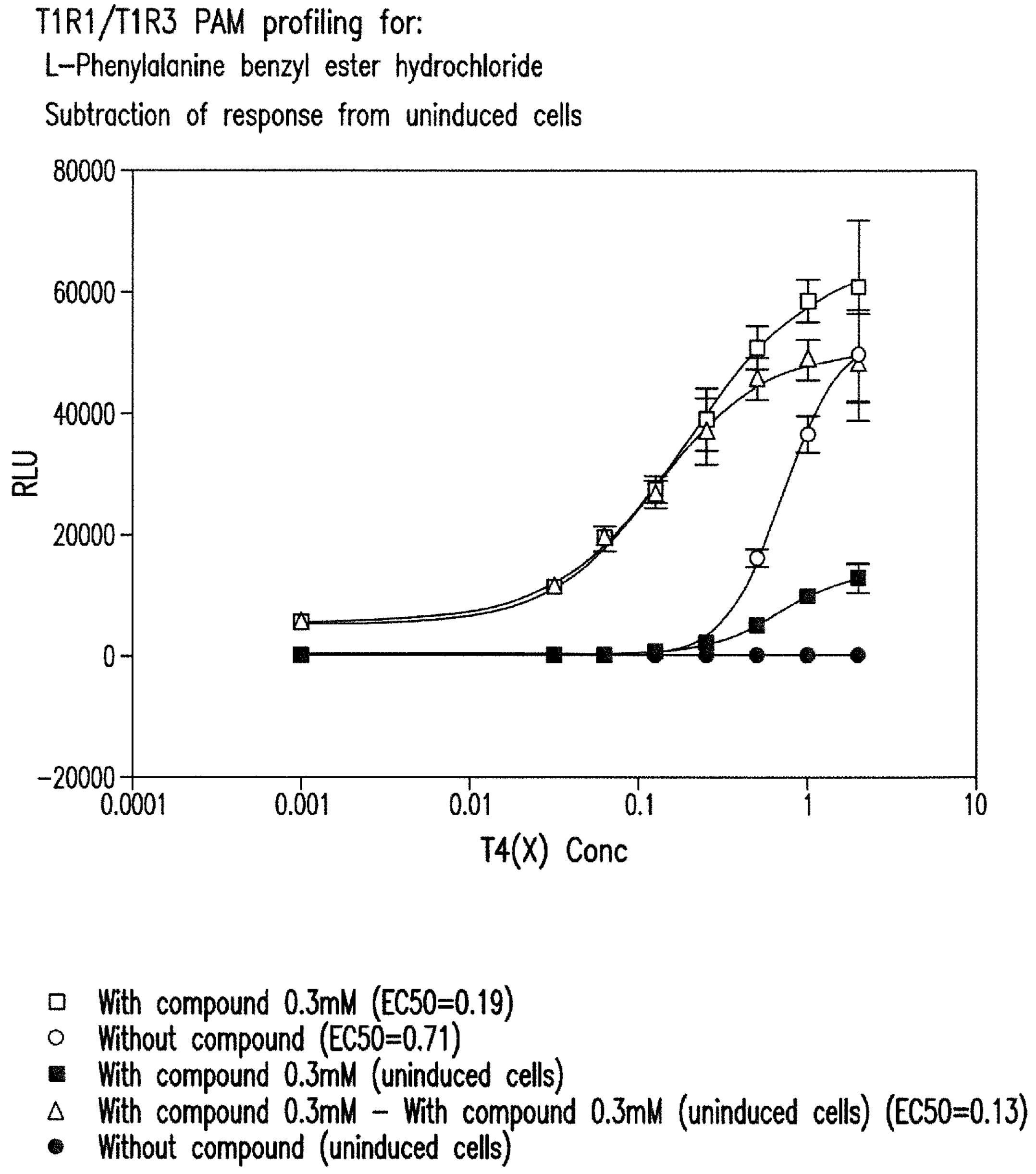
Figure 79C:
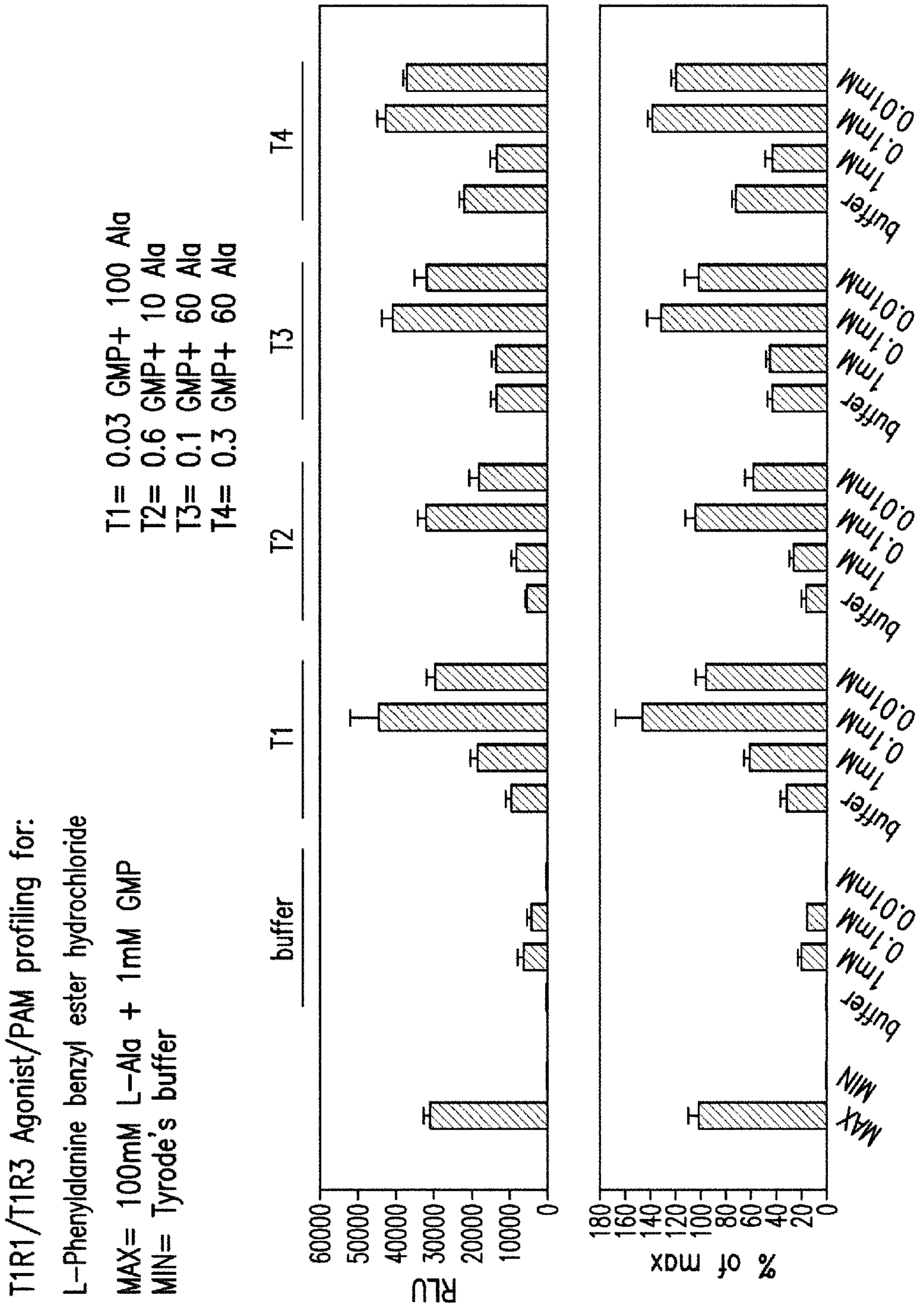
Figure 79D:
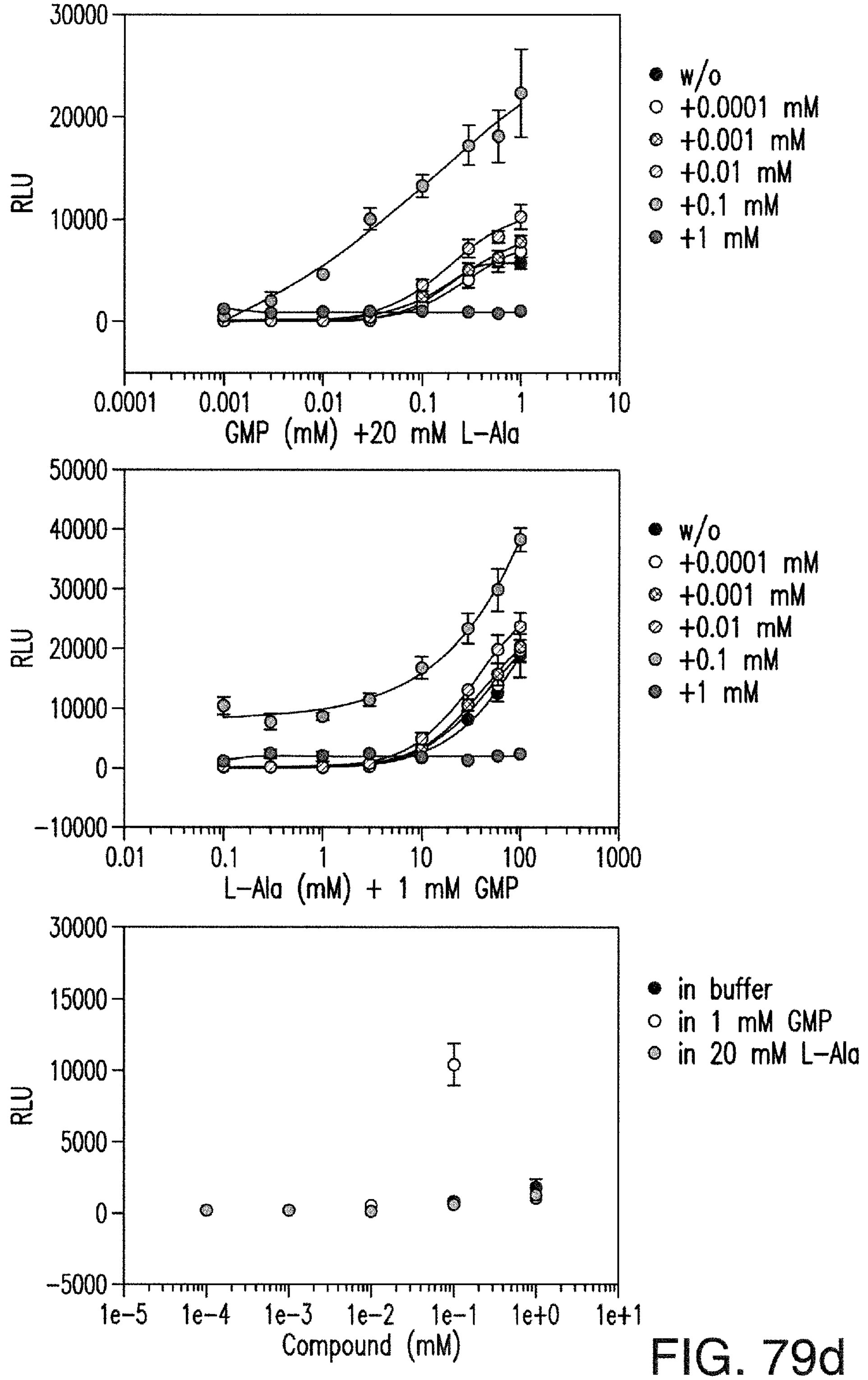
Figure 79E:
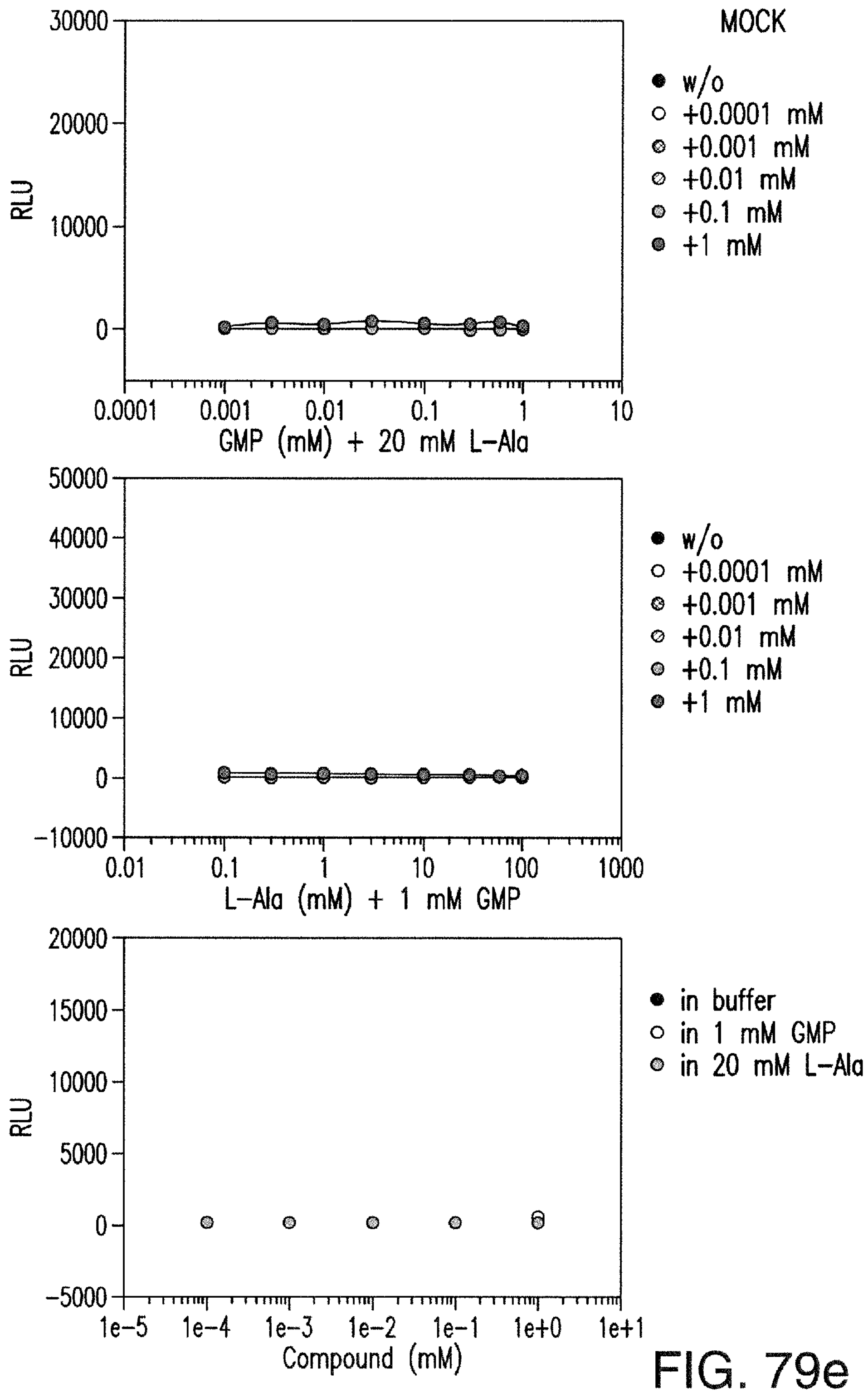

FIG. 71 shows dose response curves for positive and negative controls in activating cat T1R1/T1R3 for the experiments described by FIGS. 57-75. Dose response curves for amino acids were determined in the presence of 0.2 mM IMP. Dose response curves for nucleotides were determined in the presence of 20 mM alanine.

FIG. 72A-D shows the activation of T1R1/T1R3: (A) by the transmembrane compound 1-benzyl-3-(2-(3,4-dihydro-2H-benzo[b][1,4]dioxepin-7-yl)-2-oxoethyl)imidazolidine-2,4,5-trione alone (agonist profile assessment), and (B) and (C) in the presence of GMP and Alanine (PAM profile assessment). (D) shows a graphical representation of data from both (A) and (B). The transmembrane compound exhibited PAM activity.

FIG. 73A-F shows the activation of T1R1/T1R3: (A) by the transmembrane compound 1-benzyl-3-(2-(5-chlorothiophen-2-yl)-2-oxoethyl)imidazolidine-2,4,5-trione alone (agonist profile assessment), and (B) and (C) in the presence of GMP and Alanine (PAM profile assessment). (D) shows a graphical representation of data from both (A) and (B). (E) and (F) show dose response curves for the transmembrane compound as GMP concentration was held constant and Ala concentration was varied, and when Ala concentration was held constant and GMP concentration was varied in cells expressing T1R1/T1R3 (induced) and mock control cells that did not express T1R1 (uninduced). The transmembrane compound exhibited PAM activity.

FIG. 74A-E shows the activation of T1R1/T1R3: (A) by the transmembrane compound N-(heptan-4-yl)benzo[d][1,3]dioxole-5-carboxamide alone (agonist profile assessment), and (B) in the presence of GMP and Alanine (PAM profile assessment). (C) shows a graphical representation of data from both (A) and (B). (D) and (E) show dose response curves for the transmembrane compound as GMP concentration was held constant and Ala concentration was varied, and when Ala concentration was held constant and GMP concentration was varied in cells expressing T1R1/T1R3 (induced, (D)) and mock control cells that did not express T1R1 (uninduced, (E)). The transmembrane compound exhibited agonist and PAM activity.

FIG. 75A-E shows the activation of T1R1/T1R3: (A) by the transmembrane compound N-benzyl-L-phenylalanine methyl ester hydrochloride alone (agonist profile assessment), and (B) in the presence of GMP and Alanine (PAM profile assessment). (C) shows a graphical representation of data from both (A) and (B). (D) and (E) show dose response curves for the transmembrane compound as GMP concentration was held constant and Ala concentration was varied, and when Ala concentration was held constant and GMP concentration was varied in cells expressing T1R1/T1R3 (induced, (D)) and mock control cells that did not express T1R1 (uninduced, (E)). The transmembrane compound exhibited agonist and PAM activity.

FIG. 76A-E shows the activation of T1R1/T1R3: (A) by the transmembrane compound N-Benzyl-D-Phenylalanine methyl ester hydrochloride alone (agonist profile assessment), and (B) in the presence of GMP and Alanine (PAM profile assessment). (C) shows a graphical representation of data from both (A) and (B). (D) and (E) show dose response curves for the transmembrane compound as GMP concentration was held constant and Ala concentration was varied, and when Ala concentration was held constant and GMP concentration was varied in cells expressing T1R1/T1R3 (induced, (D)) and mock control cells that did not express T1R1 (uninduced, (E)). The transmembrane compound exhibited agonist and PAM activity.

FIG. 77A-E shows the activation of T1R1/T1R3: (A) by the transmembrane compound Benzyl-L-leucine methyl ester hydrochloride alone (agonist profile assessment), and (B) in the presence of GMP and Alanine (PAM profile assessment). (C) shows a graphical representation of data from both (A) and (B). (C) and (E) show dose response curves for the transmembrane compound as GMP concentration was held constant and Ala concentration was varied, and when Ala concentration was held constant and GMP concentration was varied in cells expressing T1R1/T1R3 (induced, (D)) and mock control cells that did not express T1R1 (uninduced, (E)). The transmembrane compound exhibited agonist and PAM activity.

FIG. 78A-E shows the activation of T1R1/T1R3: (A) by the transmembrane compound Methyl-2-benzylamino-2-phenylacetate alone (agonist profile assessment), and (B) in the presence of GMP and Alanine (PAM profile assessment). (C) shows a graphical representation of data from both (A) and (B). (D) and (E) show dose response curves for the transmembrane compound as GMP concentration was held constant and Ala concentration was varied, and when Ala concentration was held constant and GMP concentration was varied in cells expressing T1R1/T1R3 (induced, (D)) and mock control cells that did not express T1R1 (uninduced, (E)). The transmembrane compound exhibited agonist and PAM activity.

FIG. 79A-E shows the activation of T1R1/T1R3: (A) by the transmembrane compound L-Phenylalanine benzyl ester hydrochloride alone (agonist profile assessment), and (B) in the presence of GMP and Alanine (PAM profile assessment). (C) shows a graphical representation of data from both (A) and (B). (D) and (E) show dose response curves for the transmembrane compound as GMP concentration was held constant and Ala concentration was varied, and when Ala concentration was held constant and GMP concentration was varied in cells expressing T1R1/T1R3 (induced, (D)) and mock control cells that did not express T1R1 (uninduced, (E)). The transmembrane compound exhibited agonist and PAM activity.

Figure 80A:
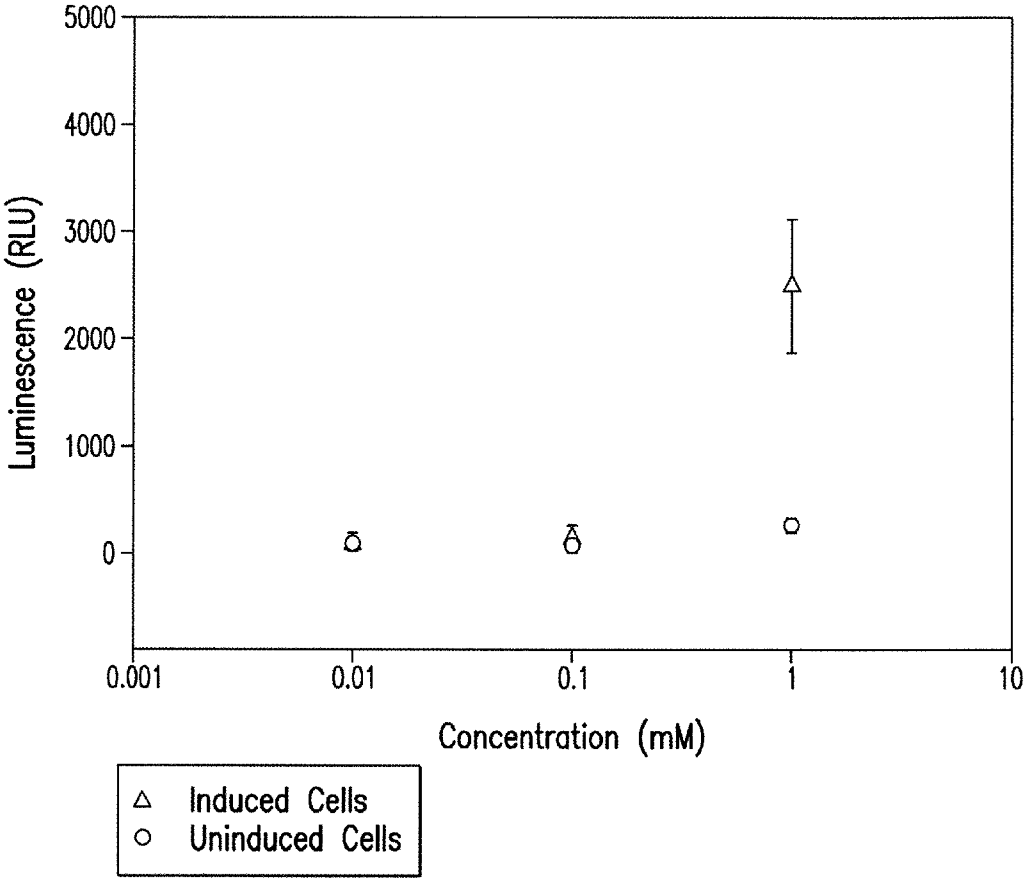
Figure 80A:
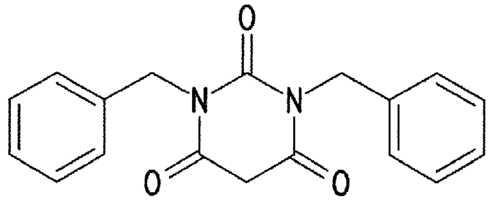
Figure 80B:
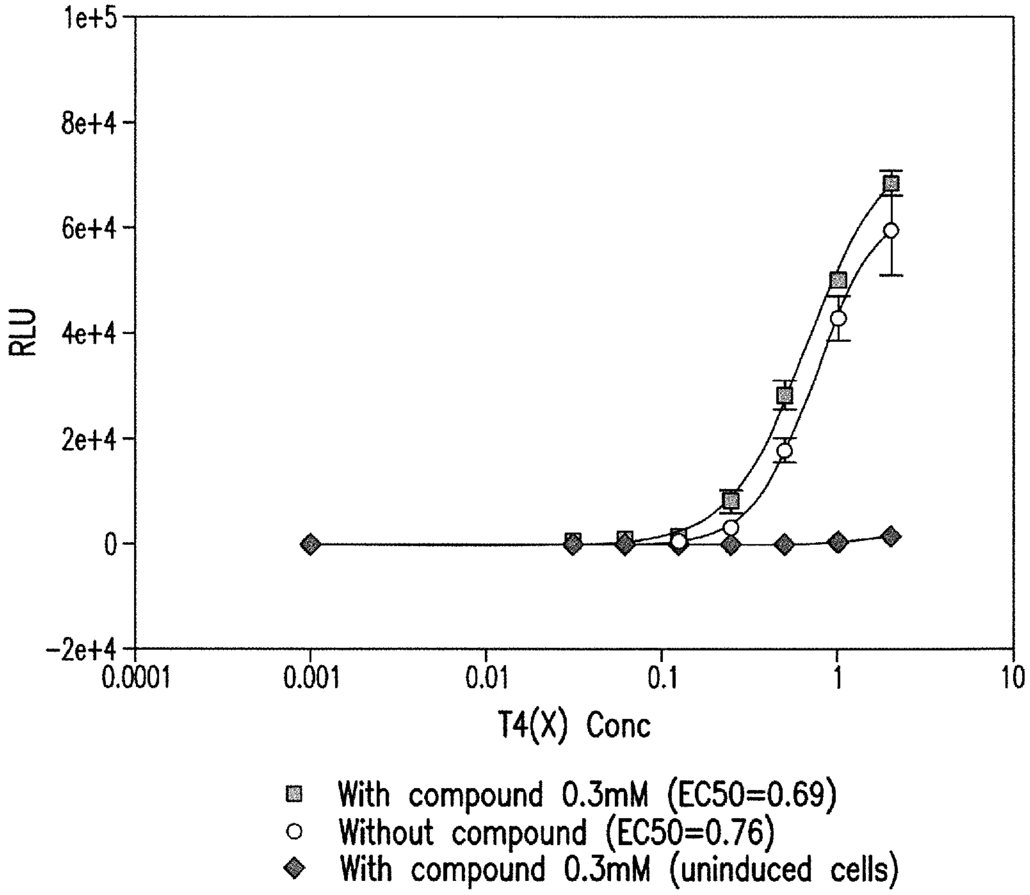
Figure 80B:
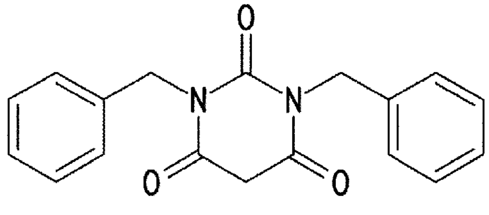

FIG. 80A-B shows the activation of T1R1/T1R3: (A) by the transmembrane compound 1,3-dibenzylpyrimidine-2,4,6(1H,3H,5H)-trione alone (agonist profile assessment), and (B) in the presence of GMP and Alanine (PAM profile assessment). The transmembrane compound exhibited agonist activity.

FIG. 81 shows a cat T1R1 receptor nucleic acid sequence (SEQ ID NO: 1).

FIG. 82 shows a cat T1R1 receptor amino acid sequence (SEQ ID NO:2).

FIG. 83 shows a cat T1R3 receptor nucleic acid sequence (SEQ ID NO:3).

FIG. 84 shows a cat T1R3 receptor amino acid sequence (SEQ ID NO:4).

DETAILED DESCRIPTION

To date, there remains a need for a flavor modifier that can provide a desired level of umami flavor to increase and/or enhance the palatability of various cat pet food products. The present application relates to flavor compositions that include at least one nucleotide derivative and/or transmembrane compound. The flavor compositions can be used to increase the palatability and/or enhance or modify the taste of various pet food products such as a nutritionally-complete pet food. In certain embodiments, the flavor compositions can be used to increase the umami taste of a pet food product. The flavor compositions can further include combinations of compounds, including nucleotides and/or amino acids, and can be added to pet food products in various delivery system formats.

1. DEFINITIONS

The terms used in this specification generally have their ordinary meanings in the art, within the context of this invention and in the specific context where each term is used. Certain terms are discussed below, or elsewhere in the specification, to provide additional guidance to the practitioner in describing the compositions and methods of the invention and how to make and use them.

As used herein, the use of the word "a" or "an" when used in conjunction with the term "comprising" in the claims and/or the specification may mean "one," but it is also consistent with the meaning of "one or more," "at least one," and "one or more than one." Still further, the terms "having," "including," "containing" and "comprising" are interchangeable and one of skill in the art is cognizant that these terms are open ended terms.

The term "about" or "approximately" means within an acceptable error range for the particular value as determined by one of ordinary skill in the art, which will depend in part on how the value is measured or determined, i.e., the limitations of the measurement system. For example, "about" can mean within 3 or more than 3 standard deviations, per the practice in the art. Alternatively, "about" can mean a range of up to 20%, preferably up to 10%, more preferably up to 5%, and more preferably still up to 1% of a given value. Alternatively, particularly with respect to biological systems or processes, the term can mean within an order of magnitude, preferably within 5-fold, and more preferably within 2-fold, of a value.

As used herein, "taste" refers to a sensation caused by activation or inhibition of receptor cells in a subject's oral cavity. In certain embodiments, taste can be selected from the group consisting of sweet, sour, salt, bitter, kokumi and umami. In certain embodiments, "taste" can include free fatty acid taste. See, e.g., Cartoni et al., J. of Neuroscience, 30(25): 8376-8382 (2010), the contents of which are incorporated herein by reference. In certain embodiments, a taste is elicited in a subject by a "tastant." In certain embodiments, a tastant is a synthetic tastant. In certain embodiments, the tastant is prepared from a natural source.

As used herein, "taste profile" refers to a combination of tastes, such as, for example, one or more of a sweet, sour, salt, bitter, umami, kokumi and free fatty acid taste. In certain embodiments, a taste profile is produced by one or more tastant that is present in a composition at the same or different concentrations. In certain embodiments, a taste profile refers to the intensity of a taste or combination of tastes, for example, a sweet, sour, salt, bitter, umami, kokumi and free fatty acid taste, as detected by a subject or any assay known in the art. In certain embodiments, modifying, changing or varying the combination of tastants in a taste profile can change the sensory experience of a subject.

In certain embodiments, "aftertaste" refers to the taste intensity of a food product that is perceived after the food product is removed from the mouth or oral cavity.

As used herein, "flavor" refers to one or more sensory stimuli, such as, for example, one or more of taste (gustatory), smell (olfactory), touch (tactile) and temperature (thermal) stimuli. In certain non-limiting embodiments, the sensory experience of a subject exposed to a flavor can be classified as a characteristic experience for the particular flavor. For example, a flavor can be identified by the subject as being, but not limited to, a floral, citrus, berry, nutty, caramel, chocolate, peppery, smoky, cheesy, meaty, etc., flavor. As used herein, a flavor composition can be selected from a liquid, solution, dry powder, spray, paste, suspension and any combination thereof. The flavor can be a natural composition, an artificial composition, a nature identical, or any combination thereof.

As used interchangeably herein, "aroma" and "smell" refer to an olfactory response to a stimulus. For example, and not by way of limitation, an aroma can be produced by aromatic substances that are perceived by the odor receptors of the olfactory system.

As used herein, "flavor profile" refers to a combination of sensory stimuli, for example, tastes, such as sweet, sour, bitter, salty, umami, kokumi and free fatty acid tastes, and/or olfactory, tactile and/or thermal stimuli. In certain embodiments, the flavor profile comprises one or more flavors which contribute to the sensory experience of a subject. In certain embodiments, modifying, changing or varying the combination of stimuli in a flavor profile can change the sensory experience of a subject.

As used herein "admixing," for example, "admixing the flavor composition or combinations thereof of the present application with a food product," refers to the process where the flavor composition, or individual components of the flavor composition, is mixed with or added to the completed product or mixed with some or all of the components of the product during product formation or some combination of these steps. When used in the context of admixing, the term "product" refers to the product or any of its components. This admixing step can include a process selected from the step of adding the flavor composition to the product, spraying the flavor composition on the product, coating the flavor composition on the product, suspending the product in the flavor composition, painting the flavor composition on the product, pasting the flavor composition on the product, encapsulating the product with the flavor composition, mixing the flavor composition with the product and any combination thereof. The flavor composition can be a solution, liquid, dry powder, spray, paste, suspension and any combination thereof.

In certain embodiments, the nucleotide derivatives and/or transmembrane compounds of a flavor composition can be generated during the thermal processing of a pet food product, e.g., sterilization, retorting, injection molding and/or extrusion, from precursor compounds present in the pet food product. In certain embodiments, a nucleotide derivative and/or transmembrane compound of a flavor composition can be generated during the processing of a pet food product and additional components of the flavor composition, e.g., a nucleotide and/or an amino acid, can be added to the pet food product by admixing.

As used herein, "ppm" means parts-per-million and is a weight relative parameter. A part-per-million is a microgram per gram, such that a component that is present at 10 ppm is present at 10 micrograms of the specific component per 1 gram of the aggregate mixture.

As used herein, "palatability" can refer to the overall willingness of a human or non-human animal, for example, a companion animal, to eat a certain food product. Increasing the "palatability" of a food product can lead to an increase in the enjoyment and acceptance of the food by the human or non-human animal to ensure the human or non-human animal eats a "healthy amount" of the food. The term "healthy amount" of a food as used herein refers to an amount that enables the human or non-human animal to maintain or achieve an intake contributing to its overall general health in terms of micronutrients, macronutrients and calories, for example, such as set out in the "Mars Petcare Essential Nutrient Standards." In certain embodiments, "palatability" can mean a relative preference of a human or non-human animal for one food product over another. For example, when a human or non-human animal shows a preference for one of two or more food products, the preferred food product is more "palatable," and has "enhanced palatability." In certain embodiments, the relative palatability of one food product compared to one or more other food products can be determined, for example, in side-by-side, free-choice comparisons, e.g., by relative consumption of the food products, or other appropriate measures of preference indicative of palatability. Palatability can be determined by a standard testing protocol in which the animal has equal access to both food products such as a test called "two-bowl test" or "versus test." Such preference can arise from any of the animal's senses, but can be related to, inter alia, taste, aftertaste, smell, mouth feel and/or texture.

The term "pet food" or "pet food product" means a product or composition that is intended for consumption by a companion animal, such as cats, dogs, guinea pigs, rabbits, birds and horses. For example, but not by way of limitation, the companion animal can be a "domestic" cat such as *Felis domesticus*. In certain embodiments, the companion animal can be a "domestic" dog, e.g., *Canis lupus* familiaris. A "pet food" or "pet food product" includes any food, feed, snack, food supplement, liquid, beverage, treat, toy (chewable and/or consumable toys), meal substitute or meal replacement.

The term "human food" or "human food product" means a product or composition that is intended for consumption by a human. A "human food" or "human food product" includes any food, feed, snack, food supplement, liquid, beverage, treat, toy (chewable and/or consumable toys), meal substitute or meal replacement.

In certain embodiments, a "food product" includes human and/or pet food products.

As used herein "nutritionally-complete" refers to food product, for example, a pet food product, that contains all known required nutrients for the intended recipient of the food product, in appropriate amounts and proportions based, for example, on recommendations of recognized or competent authorities in the field of companion animal nutrition. Such foods are therefore capable of serving as a sole source of dietary intake to maintain life, without the addition of supplemental nutritional sources.

As used herein "flavor composition" refers to at least one compound or biologically acceptable salt thereof that modulates, including enhancing, multiplying, potentiating, decreasing, suppressing, or inducing, the tastes, smells, flavors and/or textures of a natural or synthetic tastant, flavoring agent, taste profile, flavor profile and/or texture profile in an animal or a human. In certain embodiments, the flavor composition comprises a combination of compounds or biologically acceptable salts thereof. In certain embodiments, the flavor composition includes one or more excipients.

As used herein "agonist" refers to at least one compound or biologically acceptable salt thereof that modulates, including enhancing, multiplying, potentiating, or inducing the activity of a receptor to which it binds or otherwise interacts with. In certain embodiments, the term is used to describe compounds that act alone to activate the receptor, or to describe "positive allosteric modulator" (also known as "PAM") compounds, which positively enhance the action of other agonists.

As used herein, "synergy," "synergistically" or "synergistic effect" refers to an effect produced by two or more individual components in which the total effect produced by these components, when utilized in combination, is greater than the sum of the individual effects of each component acting alone. As used herein, the term "synergistically effective" refers to any combined amount of a nucleotide derivative and/or transmembrane compound, and an additional compound (e.g., an amino acid, nucleotide, or a compound that binds to the transmembrane domains of T1R1 or T1R3 (see, for example, Zhang et al., Proc Natl Acad Sci USA. 2008 Dec. 30; 105(52):20930-4, Epub 2008 Dec. 22)), that exhibits synergistic activation of the T1R1/T1R3 receptor or increased palatability of a pet food product.

The term "alkyl" refers to a straight or branched $C_1$-$C_{20}$ (preferably $C_1$-$C_6$) hydrocarbon group consisting solely of carbon and hydrogen atoms, containing no unsaturation, and which is attached to the rest of the molecule by a single bond, e.g., methyl, ethyl, n-propyl, 1-methylethyl (isopropyl), n-butyl, n-pentyl, 1,1-dimethylethyl (t-butyl).

The term "alkenyl" refers to a $C_2$-$C_{20}$ (preferably $C_2$-$C_{12}$) aliphatic hydrocarbon group containing at least one carbon-carbon double bond and which may be a straight or branched chain, e.g., ethenyl, 1-propenyl, 2-propenyl (allyl), isopropenyl, 2-methyl-1-propenyl, 1-butenyl, 2-butenyl.

The term "alkynyl" refers to a $C_2$-$C_{20}$ (preferably $C_2$-$C_{12}$) aliphatic hydrocarbon group containing at least one carbon-carbon triple bond and which may be a straight or branched chain, e.g., ethynyl, 1-propynyl, 2-propynyl.

The term "cycloalkyl" denotes an unsaturated, non-aromatic mono- or multicyclic hydrocarbon ring system (containing, for example, $C_3$-$C_6$) such as cyclopropyl, cyclobutyl, cyclopentyl, cyclohexyl. Examples of multicyclic cycloalkyl groups (containing, for example, $C_6$-$C_{15}$) include perhydronapththyl, adamantyl and norbornyl groups bridged cyclic group or spirobicyclic groups, e.g., spiro (4,4) non-2-yl.

The term "cycloalkalkyl" refers to a cycloalkyl as defined above directly attached to an alkyl group as defined above, that results in the creation of a stable structure such as cyclopropylmethyl, cyclobutylethyl, or cyclopentylethyl.

The term “ethereal” refers to an alkyl group or cycloalkyl group as defined above having at least one oxygen incorporated into the alkyl chain, e.g., methyl ethyl ether, diethyl ether, tetrahydrofuran. Such groups can also be described as alkoxyalkyl or alkoxycycloalkyl groups.

The term “aminoalkyl” refers to an alkyl group or a cycloalkyl group as defined above having at least one nitrogen atom, e.g., n-butyl amine and tetrahydrooxazine.

The term “aryl” refers to aromatic radicals having in the range of about 6 to about 14 carbon atoms such as phenyl, naphthyl, tetrahydronapthyl, indanyl, biphenyl.

The term “arylalkyl” refers to an aryl group as defined above directly bonded to an alkyl group as defined above, e.g., $—CH_2C_6H_5$, and $—C_2H_4C_6H_5$.

The term “heterocyclic” refers to a stable 3- to 15-membered ring radical, which consists of carbon atoms and one or more, for example, from one to five, heteroatoms selected from the group consisting of nitrogen, oxygen and sulfur. For purposes of this application, the heterocyclic ring radical may be a monocyclic or bicyclic ring system, which may include fused or bridged ring systems, and the nitrogen, carbon, oxygen or sulfur atoms in the heterocyclic ring radical may be optionally oxidized to various oxidation states. In addition, the nitrogen atom may be optionally quaternized; and the ring radical may be partially or fully saturated, or the ring radical may be fully unsaturated (i.e., heteroaromatic or heteroaryl aromatic).

The heterocyclic ring radical may be attached to the main structure at any heteroatom or carbon atom that results in the creation of a stable structure.

The term “heteroaryl” refers to a heterocyclic ring wherein the ring is aromatic.

The term “heteroarylalkyl” refers to heteroaryl ring radical as defined above directly bonded to alkyl group. The heteroarylalkyl radical may be attached to the main structure at any carbon atom from alkyl group that results in the creation of a stable structure.

The term “heterocyclyl” refers to a heterocylic ring radical as defined above. The heterocyclyl ring radical may be attached to the main structure at any heteroatom or carbon atom that results in the creation of a stable structure.

In certain embodiments, the term “umami receptor” refers to a G protein coupled receptor (GPCR), for example, a T1R1/T1R3 GPCR. The umami receptor can be for example, a cat, dog, human or non-human mammal umami receptor.

In certain embodiments, the cat T1R1 is a protein comprising an amino acid sequence as set forth in SEQ ID NO:2, or a sequence at least 99, 98, 97, 96, 95, 90, 85 or 80 percent homologous thereto (homology, as that term is used herein, may be measured using standard software such as BLAST or FASTA), and is encoded, for example, by a nucleic acid comprising a sequence as set forth in SEQ ID NO: 1, or a sequence at least 99, 98, 97, 96, 95, 90, 85 or 80 percent homologous thereto (homology, as that term is used herein, may be measured using standard software such as BLAST or FASTA).

In certain embodiments, the cat T1R3 is a protein comprising an amino acid sequence as set forth in SEQ ID NO:4, or a sequence at least 99, 98, 97, 96, 95, 90, 85 or 80 percent homologous thereto (homology, as that term is used herein, may be measured using standard software such as BLAST or FASTA), and is encoded, for example, by a nucleic acid comprising a sequence as set forth in SEQ ID NO:3, or a sequence at least 99, 98, 97, 96, 95, 90, 85 or 80 percent homologous thereto (homology, as that term is used herein, may be measured using standard software such as BLAST or FASTA).

2. NUCLEOTIDE DERIVATIVES

The present disclosure relates to flavor compositions that include at least one nucleotide derivative. In certain embodiments, the nucleotide derivative is an umami taste enhancing compound. The nucleotide derivatives disclosed herein were identified through the in silico modeling of the nucleotide derivatives within the binding pocket of the feline T1R1/T1R3 receptor (“Umami receptor”). The flavor compositions can be used to enhance or modify the palatability, taste or flavor of pet food product. The flavor compositions can include combinations of compounds, for example, combinations of one or more nucleotide derivatives and/or one or more amino acids and/or one or more nucleotides and/or one or more transmembrane compounds, as described herein, and can be added to pet food product compositions in various delivery system formats.

In certain embodiments, the nucleotide derivative can be a compound listed in Tables 2 and 5-13 below.

In certain embodiments, the nucleotide derivative comprises a compound of Formula Nt-1 having the following structure:

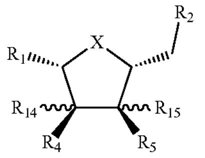

wherein $R_1$ is selected from the group consisting of a substituted or unsubstituted purine or substituted or unsubstituted pyrimidine;

wherein $R_2$ is selected from monophosphate, diphosphate, triphosphate, $OP(W)(OH)_2$, $—OP(W)(OH)OP(W)(OH)_2$, $—OP(W)(OH)OP(W)(OH)OP(W)(OH)_2$, $—OS(O)_2aryl(H)$, $—OS(O)_2aryl(CH_3)$, $—P(W)(OH)_2$, $—OP(W)(OH)OS(O)_2(OH)$, $—OP(W)(OH)_2$, $—P(W)(OH)OP(W)(OH)_2$, $—O(CH_2)_{1-4}OP(W)(OH)_2$, $—OS(W)(OH)_2$, $—OP(W)(OH)\ CH_2OP(W)(OH)_2$, $—OP(W)(OH)OP(W)O(CH_2)_{1-4}R_{18}$, $—(CH_2)_{0-4}COOH$, $—(CH_2)_{0-4}S(O)(OH)_2$, $—(CH_2)_{0-4}C(O)NHOH$ and $—(CH_2)_{0-4}B(OH)_2$;

wherein X is selected from O, S, $N(R_3)$ and $CH_2$;

wherein W is selected from O and S;

wherein $R_3$ is selected from H and $CH_3$;

wherein $R_4$, $R_5$, $R_{14}$, $R_{15}$, $R_{18}$ are independently selected from H, OH, SH, $CH_2$, $CH_3$, $OR_6$, $SR_6$, $CH_2CH_3$, lower alkyl branched and unbranched ($C_1$-$C_6$), XC(O)lower alkyl, $—XC(O)CH_2Ph$, $—P(W)(OH)_2$, $—XC(O)PhR_{11}$, —OP(O)(OH)O, $OCH_3$, $N(R_{11}, R_{17})$, $—O(C)n\ R_{11}$, $R_{17}O—$, $N(H\text{ or independently lower alkyl})_{2-3}$ and $COOR_{11}$, $—OC(W)NH(CH_2)_{1-6}NH_2$, $—OC(W)NH(CH_2)_{1-6}R_{44}$ wherein $R_{44}$ is H, OH, SH, $CH_2$, $CH_3$, $OR_6$, $SR_6$, $CH_2CH_3$, lower alkyl branched and unbranched ($C_1$-$C_6$), XC(O)lower alkyl, $—XC(O)CH_2Ph$, $—P(W)(OH)_2$, $—XC(O)PhR_{11}$, —OP(O)(OH)O, $OCH_3$, $N(R_{11}, R_{17})$, $—O(C)n\ R_{11}$, $R_{17}O—$, N(H or indepen dently lower alkyl$)_{2-3}$ or $COOR_{11}$, —OC(W)NH$(CH_2)_{1-6}NH_2$;

wherein Z is selected from piperidine, morpholine, piperazine, N-methyl-piperazine, $N(R_{16})(R_{17})$; and wherein $R_6$, $R_{11}$, $R_{16}$ and $R_{17}$ are selected independently from H, OH, SH, $CH_2$, $CH_3$, $OCH_3$, COOR, $N(R_{12})(R_{13})$, $CH_2CH_3$, lower alkyl branched and unbranched ($C_1$-$C_6$), XC(O)lower alkyl, —XC(O)$CH_2$Ph, —P(W)$(OH)_2$, —XC(O)Ph$R_{12}$, —OP(O)(OH)O, $OCH_3$, $N(R^{12}, R^{13})$, —O(C)n $R^{12}$, $R_{13}$O—, N(H or independently lower alkyl$)_{2-3}$ and $COOR_{12}$; and wherein $R_{12}$ and $R_{13}$ are selected independently from H, OH, SH, $CH_2$, $CH_3$, $OCH_3$ and $CH_2CH_3$.

In certain embodiments, $R_1$ in Formula Nt-1 is selected from

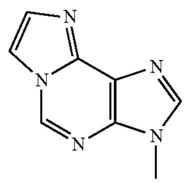

and

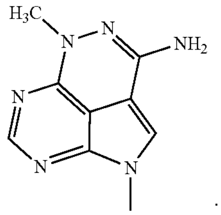

.

In certain embodiments, $R_1$ in Formula Nt-1 is selected from the compounds listed in Table 1.

TABLE 1

| $R_1$ group of nucleotide derivatives of Formula Nt-1<br>$R_1$ | |
|---|---|
| 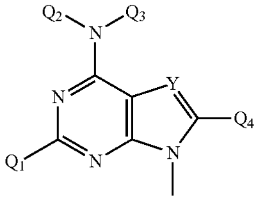 | wherein $Q_1$, $Q_2$, $Q_3$ and $Q_4$ are independently selected from H, $CH_3$, —$SCH_3$, $N(R_{19})(R_{20})$, F, Cl, Br, I, —$OCH_3$, O, S, unsubstituted or substituted branched or unbranched lower alkyl ($C_1$—$C_{10}$), substituted or unsubstituted aryl, —$(CH_2)_{1-6}NH_2$, —$(CH_2)_{1-4}$aryl, $S(O)_{1-2}Q_6$, $COOCH_3$, COOEt, —$(CH_2)_{0-4}$Ph, c-$C_3H_5$, c-$C_4H_7$, c-$C_5H_9$, c-$C_6H_{10}$ and —$CH_2CH_2CH_2CH_2$—;<br>wherein $Q_6$ is selected from Me and Ph;<br>wherein $R_{19}$ and $R_{20}$ are independently selected from H, $CH_3$, —$SCH_3$, F, Cl, Br, I, —$OCH_3$, O, S, branched or unbranched lower alkyl ($C_1$-$C_{10}$), aryl, —$(CH_2)_{1-4}$aryl, $SCH_3$, $S(O)_{1-2}Q_6$, $COOCH_3$, COOEt, —$(CH_2)_{0-4}$Ph, c-$C_4H_7$, c-$C_4H_7$, c-$C_5H_9$, c-$C_6H_{10}$ and —$CH_2CH_2CH_2CH_2$—; and<br>wherein Y is selected from C or N. |
| 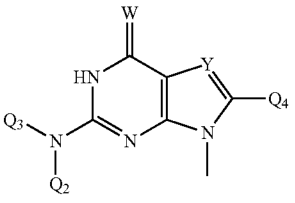 | wherein $Q_2$, $Q_3$ and $Q_4$ are independently selected from H, $CH_3$, —$SCH_3$, $N(R_{19})(R_{20})$, F, Cl, Br, I, —$OCH_3$, O, S, unsubstituted or substituted branched or unbranched lower alkyl ($C_1$-$C_{10}$), substituted or unsubstituted aryl, —$(CH_2)_{1-4}$aryl, $S(O)_{1-2}Q_6$, $COOCH_3$, COOEt, —$(CH_2)_{0-4}$Ph, c-$C_3H_5$, c-$C_4H_7$, c-$C_5H_9$, c-$C_6H_{10}$ and —$CH_2CH_2CH_2CH_2$;<br>wherein $Q_6$ is selected from Me and Ph;<br>wherein $R_{19}$ and $R_{20}$ are independently selected from H, $CH_3$, —$SCH_3$, F, Cl, Br, I, —$OCH_3$, O, S, branched or unbranched lower alkyl ($C_1$-$C_{10}$), aryl, —$(CH_2)_{1-4}$aryl, $SCH_3$, $S(O)_{1-2}Q_6$, $COOCH_3$, COOEt, —$(CH_2)_{0-4}$Ph, c-$C_4H_7$, c-$C_4H_7$, c-$C_5H_9$, c-$C_6H_{10}$ and —$CH_2CH_2CH_2CH_2$—; and<br>wherein Y or W are independently selected from O, S, C or N. |
| 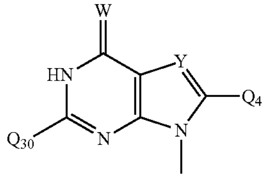 | wherein $Q_{30}$ and $Q_4$ are independently selected from H, $CH_3$, —$SCH_3$, $N(R_{19})(R_{20})$, F, Cl, Br, I, —$OCH_3$, O, S, unsubstituted or substituted branched or unbranched lower alkyl ($C_1$-$C_{10}$), substituted or unsubstituted aryl, —$(CH_2)_{1-4}$aryl, $S(O)_{1-2}Q_6$, $COOCH_3$, COOEt, —$(CH_2)_{0-4}$Ph, c-$C_3H_5$, c-$C_4H_7$, c-$C_5H_9$, c-$C_6H_{10}$ and —$CH_2CH_2CH_2CH_2$;<br>wherein $Q_6$ is selected from Me and Ph;<br>wherein $R_{19}$ and $R_{20}$ are independently selected from H, $CH_3$, —$SCH_3$, F, Cl, Br, I, —$OCH_3$, O, S, branched or unbranched lower alkyl ($C_1$-$C_{10}$), aryl, —$(CH_2)_{1-4}$aryl, $SCH_3$, $S(O)_{1-2}Q_6$, $COOCH_3$, COOEt, —$(CH_2)_{0-4}$Ph, c-$C_4H_7$, c-$C_4H_7$, c-$C_5H_9$, c-$C_6H_{10}$ and —$CH_2CH_2CH_2CH_2$—; and<br>wherein Y or W are independently selected from O, S, C or N. |
| 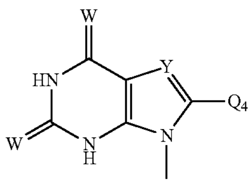 | wherein $Q_4$ is selected from H, $CH_3$, —$SCH_3$, $N(R_{19})(R_{20})$, F, Cl, Br, I, —$OCH_3$, O, S, unsubstituted or substituted branched or unbranched lower alkyl ($C_1$-$C_{10}$), substituted or unsubstituted aryl, —$(CH_2)_{1-4}$aryl, $S(O)_{1-2}Q_6$, $COOCH_3$, COOEt, —$(CH_2)_{0-4}$Ph, c-$C_3H_5$, c-$C_4H_7$, c-$C_5H_9$, c-$C_6H_{10}$ and —$CH_2CH_2CH_2CH_2$;<br>wherein $Q_6$ is selected from Me and Ph;<br>wherein $R_{19}$ and $R_{20}$ are independently selected from H, |

TABLE 1-continued

| $R_1$ group of nucleotide derivatives of Formula Nt-1<br>$R_1$ | |
|---|---|
| | $CH_3$, —$SCH_3$, F, Cl, Br, I, —$OCH_3$, O, S, branched or unbranched lower alkyl ($C_1$-$C_{10}$), aryl, —$(CH_2)_{1-4}$aryl, $SCH_3$, $S(O)_{1-2}Q_6$, $COOCH_3$, COOEt, —$(CH_2)_{0-4}$Ph, c-$C_4H_7$, c-$C_4H_7$, c-$C_5H_9$, c-$C_6H_{10}$ and —$CH_2CH_2CH_2CH_2$—; and<br>wherein Y or W are independently selected from O, S, C or N. |
| 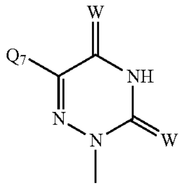 | wherein $Q_7$ is selected from H, $CH_3$, —$SCH_3$, $N(R_{19})(R_{20})$, F, Cl, Br, I, —$OCH_3$, O, S, unsubstituted or substituted branched or unbranched lower alkyl ($C_1$-$C_{10}$), substituted or unsubstituted aryl, —$(CH_2)_{1-4}$aryl, $S(O)_{1-2}Q_6$, $COOCH_3$, COOEt, —$(CH_2)_{0-4}$Ph, c-$C_3H_5$, c-$C_4H_7$, c-$C_5H_9$, c-$C_6H_{10}$ and —$CH_2CH_2CH_2CH_2$;<br>wherein $Q_6$ is selected from Me and Ph;<br>wherein $R_{19}$ and $R_{20}$ are independently selected from H, $CH_3$, —$SCH_3$, F, Cl, Br, I, —$OCH_3$, O, S, branched or unbranched lower alkyl ($C_1$-$C_{10}$), aryl, —$(CH_2)_{1-4}$aryl, $SCH_3$, $S(O)_{1-2}Q_6$, $COOCH_3$, COOEt, —$(CH_2)_{0-4}$Ph, c-$C_4H_7$, c-$C_4H_7$, c-$C_5H_9$, c-$C_6H_{10}$ and —$CH_2CH_2CH_2CH_2$—; and<br>wherein W is selected from O, S, C or N. |
| 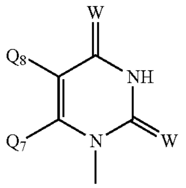 | wherein $Q_7$ and $Q_8$ are independently selected from H, $CH_3$, —$SCH_3$, $N(R_{19})(R_{20})$, F, Cl, Br, I, —$OCH_3$, O, S, unsubstituted or substituted branched or unbranched lower alkyl ($C_1$-$C_{10}$), substituted or unsubstituted aryl, —$(CH_2)_{1-4}$aryl, $S(O)_{1-2}Q_6$, $COOCH_3$, COOEt, —$(CH_2)_{0-4}$Ph, c-$C_3H_5$, c-$C_4H_7$, c-$C_5H_9$, c-$C_6H_{10}$ and —$CH_2CH_2CH_2CH_2$;<br>wherein $Q_6$ is selected from Me and Ph;<br>wherein $R_{19}$ and $R_{20}$ are independently selected from H, $CH_3$, —$SCH_3$, F, Cl, Br, I, —$OCH_3$, O, S, branched or unbranched lower alkyl ($C_1$-$C_{10}$), aryl, —$(CH_2)_{1-4}$aryl, $SCH_3$, $S(O)_{1-2}Q_6$, $COOCH_3$, COOEt, —$(CH_2)_{0-4}$Ph, c-$C_4H_7$, c-$C_4H_7$, c-$C_5H_9$, c-$C_6H_{10}$ and —$CH_2CH_2CH_2CH_2$—; and<br>wherein W is selected from O, S, C or N. |
| 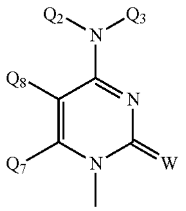 | wherein $Q_2$, $Q_3$, $Q_7$ and $Q_8$ are independently selected from H, $CH_3$, —$SCH_3$, $N(R_{19})(R_{20})$, F, Cl, Br, I, —$OCH_3$, O, S, unsubstituted or substituted branched or unbranched lower alkyl ($C_1$-$C_{10}$), substituted or unsubstituted aryl, —$(CH_2)_{1-4}$aryl, $S(O)_{1-2}Q_6$, $COOCH_3$, COOEt, —$(CH_2)_{0-4}$Ph, c-$C_3H_5$, c-$C_4H_7$, c-$C_5H_9$, c-$C_6H_{10}$ and —$CH_2CH_2CH_2CH_2$;<br>wherein $Q_6$ is selected from Me and Ph;<br>wherein $R_{19}$ and $R_{20}$ are independently selected from H, $CH_3$, —$SCH_3$, F, Cl, Br, I, —$OCH_3$, O, S, branched or unbranched lower alkyl ($C_1$-$C_{10}$), aryl, —$(CH_2)_{1-4}$aryl, $SCH_3$, $S(O)_{1-2}Q_6$, $COOCH_3$, COOEt, —$(CH_2)_{0-4}$Ph, c-$C_4H_7$, c-$C_4H_7$, c-$C_5H_9$, c-$C_6H_{10}$ and —$CH_2CH_2CH_2CH_2$—; and<br>wherein W is selected from O, S, C or N. |
| 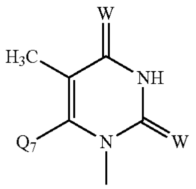 | wherein Q7 is selected from H, $CH_3$, —$SCH_3$, $N(R_{19})(R_{20})$, F, Cl, Br, I, —$OCH_3$, O, S, unsubstituted or substituted branched or unbranched lower alkyl ($C_1$-$C_{10}$), substituted or unsubstituted aryl, —$(CH_2)_{1-4}$aryl, $S(O)_{1-2}Q_6$, $COOCH_3$, COOEt, —$(CH_2)_{0-4}$Ph, c-$C_3H_5$, c-$C_4H_7$, c-$C_5H_9$, c-$C_6H_{10}$ and —$CH_2CH_2CH_2CH_2$;<br>wherein $Q_6$ is selected from Me and Ph;<br>wherein $R_{19}$ and $R_{20}$ are independently selected from H, $CH_3$, —$SCH_3$, F, Cl, Br, I, —$OCH_3$, O, S, branched or unbranched lower alkyl ($C_1$-$C_{10}$), aryl, —$(CH_2)_{1-4}$aryl, $SCH_3$, $S(O)_{1-2}Q_6$, $COOCH_3$, COOEt, —$(CH_2)_{0-4}$Ph, c-$C_4H_7$, c-$C_4H_7$, c-$C_5H_9$, c-$C_6H_{10}$ and —$CH_2CH_2CH_2CH_2$—; and<br>wherein W is selected from O, S, C or N. |

TABLE 1-continued

| $R_1$ group of nucleotide derivatives of Formula Nt-1 | |
|---|---|
| $R_1$ | |
| 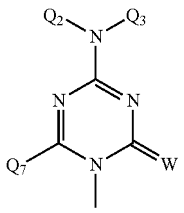 | wherein $Q_2$, $Q_3$ and $Q_7$ are independently selected from H, $CH_3$, —$SCH_3$, $N(R_{19})(R_{20})$, F, Cl, Br, I, —$OCH_3$, O, S, unsubstituted or substituted branched or unbranched lower alkyl ($C_1$-$C_{10}$), substituted or unsubstituted aryl, —$(CH_2)_{1-4}$aryl, $S(O)_{1-2}Q_6$, $COOCH_3$, COOEt, —$(CH_2)_{0-4}$Ph, c-$C_3H_5$, c-$C_4H_7$, c-$C_5H_9$, c-$C_6H_{10}$ and —$CH_2CH_2CH_2CH_2$; wherein $Q_6$ is selected from Me and Ph; wherein $R_{19}$ and $R_{20}$ are independently selected from H, $CH_3$, —$SCH_3$, F, Cl, Br, I, —$OCH_3$, O, S, branched or unbranched lower alkyl ($C_1$-$C_{10}$), aryl, —$(CH_2)_{1-4}$aryl, $SCH_3$, $S(O)_{1-2}Q_6$, $COOCH_3$, COOEt, —$(CH_2)_{0-4}$Ph, c-$C_4H_7$, c-$C_4H_7$, c-$C_5H_9$, c-$C_6H_{10}$ and —$CH_2CH_2CH_2CH_2$—; and<br>wherein W is selected from O, S, C or N. |
| 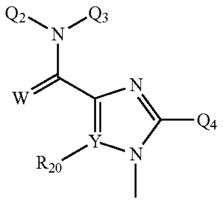 | wherein $Q_2$, $Q_3$ and $Q_4$ are independently selected from H, $CH_3$, —$SCH_3$, $N(R_{19})(R_{20})$, F, Cl, Br, I, —$OCH_3$, O, S, unsubstituted or substituted branched or unbranched lower alkyl ($C_1$-$C_{10}$), substituted or unsubstituted aryl, —$(CH_2)_{1-4}$aryl, $S(O)_{1-2}Q_6$, $COOCH_3$, COOEt, —$(CH_2)_{0-4}$Ph, c-$C_3H_5$, c-$C_4H_7$, c-$C_5H_9$, c-$C_6H_{10}$ and —$CH_2CH_2CH_2CH_2$; wherein $Q_6$ is selected from Me and Ph; wherein $R_{19}$ and $R_{20}$ are independently selected from H, $CH_3$, —$SCH_3$, F, Cl, Br, I, —$OCH_3$, O, S, branched or unbranched lower alkyl ($C_1$-$C_{10}$), aryl, —$(CH_2)_{1-4}$aryl, $SCH_3$, $S(O)_{1-2}Q_6$, $COOCH_3$, COOEt, —$(CH_2)_{0-4}$Ph, c-$C_4H_7$, c-$C_4H_7$, c-$C_5H_9$, c-$C_6H_{10}$ and —$CH_2CH_2CH_2CH_2$—;<br>wherein W is selected from O and S;<br>wherein Y is selected from C and N, and when Y is nitrogen, $R_{50}$ is not present, and when Y is carbon, $R_{50}$ is selected from H, $CH_3$, —$SCH_3$, —$N(R_{19})(R_{20})$, F, Cl, Br, I, —$OCH_3$, O, S, branched or unbranched lower alkyl ($C_1$-$C_{10}$), aryl, —$(CH_2)_{1-4}$aryl, $SCH_3$, $S(O)_{1-2}Q_6$, $COOCH_3$, COOEt, —$(CH_2)_{0-4}$Ph, c-$C_4H_7$, COOH, c-$C_4H_7$, c-$C_5H_9$, c-$C_6H_{10}$ and —$CH_2CH_2CH_2CH_2$—;<br>wherein $Q_6$ is selected from Me and Ph; and<br>wherein $R_{19}$ and $R_{20}$ are independently selected from H, $CH_3$, —$SCH_3$, F, Cl, Br, I, —$OCH_3$, O, S, branched or unbranched lower alkyl ($C_1$-$C_{10}$), —$(CH_2)_{1-4}$aryl, $SCH_3$, $S(O)_{1-2}Q_6$, $COOCH_3$, COOEt, —$(CH_2)_{0-4}$Ph, c-$C_4H_7$, c-$C_4H_7$, c-$C_5H_9$, c-$C_6H_{10}$, —$CH_2CH_2CH_2CH_2$ and aryl. |
| 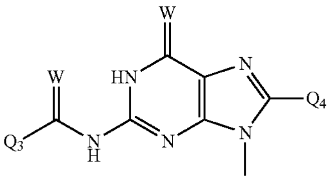 | wherein W is selected from O or S;<br>wherein $Q_3$ is selected from substituted or unsubstituted lower alkyl branched and unbranched ($C_1$-$C_{15}$), substituted or unsubstituted aryl, substituted or unsubstituted furan, substituted or unsubstituted thiophene, substituted or unsubstituted phenyl, substituted or unsubstituted pyridine and substituted or unsubstituted naphthalene; and<br>wherein $Q_4$ is selected from O, S, $CH_3$, $SCH_3$, H, Br, F, Cl and I. |
| 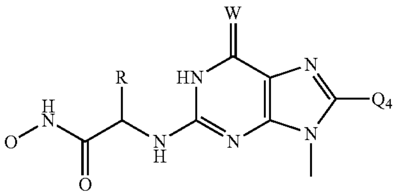 | wherein W is selected from O or S;<br>wherein R is derived from the side-chains of the 21 naturally occurring amino acids;<br>wherein Q is selected from substituted or unsubstituted lower alkyl branched and unbranched ($C_1$-$C_{15}$), substituted or unsubstituted aryl, substituted or unsubstituted furan, substituted or unsubstituted thiophene, substituted or unsubstituted phenyl, substituted or unsubstituted pyridine and substituted or unsubstituted naphthalene; and<br>wherein $Q_4$ is selected from O, S, $CH_3$, $SCH_3$, H, Br, F, Cl and I. |

TABLE 1-continued

| $R_1$ group of nucleotide derivatives of Formula Nt-1<br>$R_1$ | |
|---|---|
| 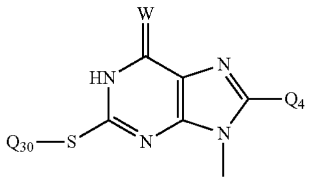 | wherein W is selected from O or S;<br>wherein $Q_{30}$ is selected from substituted or unsubstituted lower alkyl branched and unbranched ($C_1$-$C_{15}$), substituted or unsubstituted aryl, substituted or unsubstituted furan, substituted or unsubstituted thiophene, substituted or unsubstituted phenyl, substituted or unsubstituted pyridine and substituted or unsubstituted naphthalene; and<br>wherein $Q_4$ is selected from O, S, $CH_3$, $SCH_3$, H, Br, F, Cl and I. |

The substituents in the substituted groups described herein, for example, "substituted alkyl", "substituted aryl", "substituted furan", "substituted thiophene", "substituted alkyl", "substituted phenyl", "substituted pyrimidine" or "substituted naphthalene" may be the same or different with one or more selected from the groups described in the present application and hydrogen, halogen, methyl, amido, acetyl, nitro (—$NO_2$), hydroxyl (—OH), oxo (═O), thio (═S), $OCH_3$, methylene dioxy, CN, $NO_2$, COOH, $SO_3H$, $S(O)_{1-2}CH_3$, $S(O)_{1-2}$aryl, $SCH_3$, OH, $N(R)_{1-2}$, $COOCH_3$, $OC(O)CH_3$, SH, sulfonyl, sulfonamido, sulfate, cyano, azido, trifluoromethyl (—$CF_3$), methoxy (—$OCH_3$), tert-butyl carbamate (-Boc) or optionally substituted groups selected from alkyl, cycloalkyl, alkenyl, alkynyl, alkoxy, aryl, aryloxy, arylalkyl, ethereal, carboxy, hydroxyl, heteroaryl, heteroarylalkyl, sulfonyl, and heterocyclic. A "substituted" functionality may have one or more than one substituent.

In certain embodiments, the nucleotide derivative comprises a compound of Formula Nt-2 having the following structure:

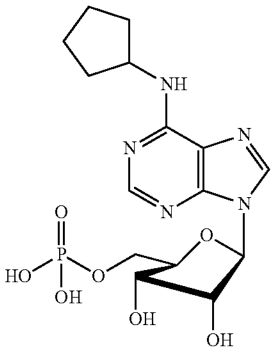

In certain embodiments, the nucleotide derivative comprises a compound of Formula Nt-3 having the following structure:

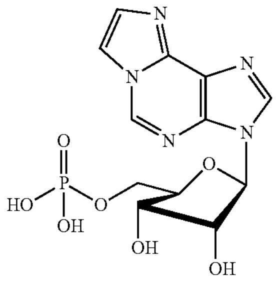

In certain embodiments, the nucleotide derivative comprises a compound of Formula Nt-4 having the following structure:

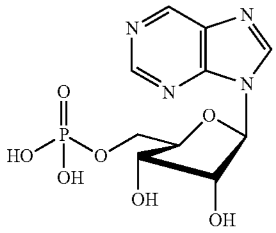

In certain embodiments, the nucleotide derivative comprises a compound of Formula Nt-5 having the following structure:

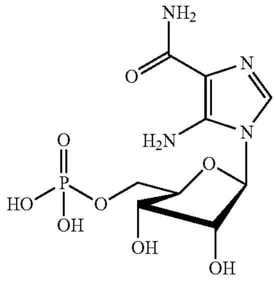

In certain embodiments, the nucleotide derivative comprises a compound of Formula Nt-6 having the following structure:

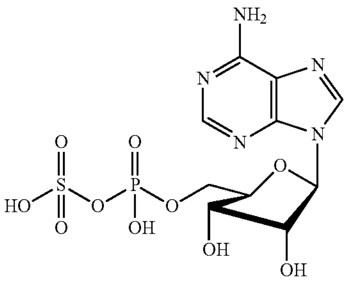

In certain embodiments, the nucleotide derivative comprises a compound of Formula Nt-7 having the following structure:

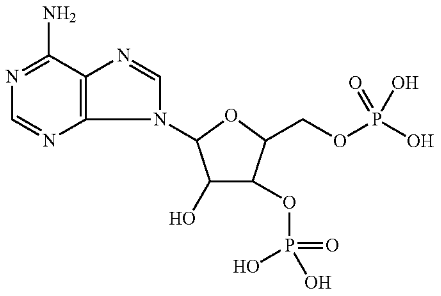 [SMILES: Nc1ncnc2c1ncn2C1OC(COP(=O)(O)O)C(OP(=O)(O)O)C1O]

In certain embodiments, the nucleotide derivative comprises a compound of Formula Nt-8 having the following structure:

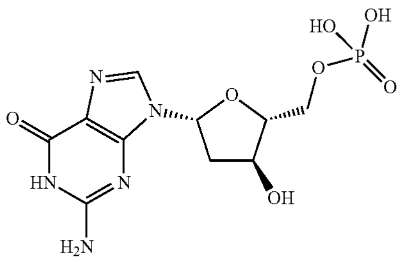 [SMILES: Nc1nc2c(ncn2[C@H]2C[C@H](O)[C@@H](COP(=O)(O)O)O2)c(=O)[nH]1]

In certain embodiments, the nucleotide derivative comprises a compound of Formula Nt-9 having the following structure:

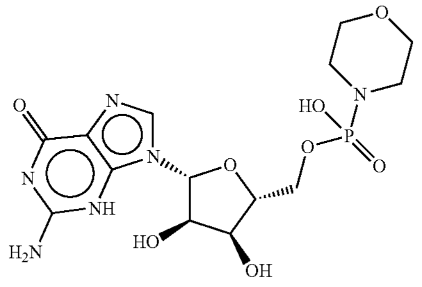

In certain embodiments, the nucleotide derivative comprises a compound of Formula Nt-10 having the following structure:

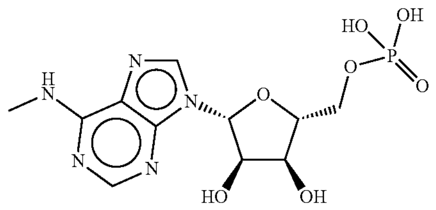

In certain embodiments, the nucleotide derivative comprises a compound of Formula Nt-11 having the following structure:

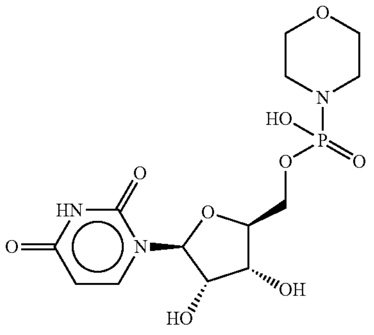

In certain embodiments, the nucleotide derivative comprises a compound of Formula Nt-12 having the following structure:

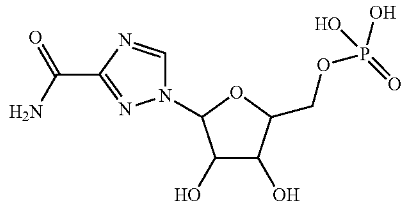 [SMILES: NC(=O)c1ncn(C2OC(COP(=O)(O)O)C(O)C2O)n1]

In certain embodiments, the nucleotide derivative comprises a compound of Formula Nt-13 having the following structure:

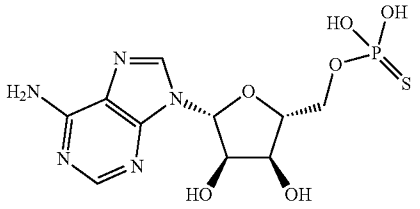 [SMILES: Nc1ncnc2c1ncn2[C@@H]1O[C@H](COP(O)(O)=S)[C@@H](O)[C@H]1O]

In certain embodiments, the nucleotide derivative comprises a compound of Formula Nt-14 having the following structure:

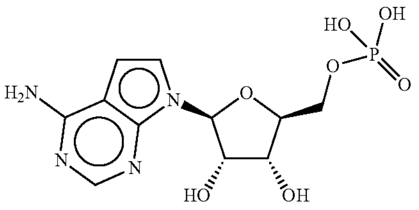

In certain embodiments, the nucleotide derivative comprises a compound of Formula Nt-15 having the following structure:

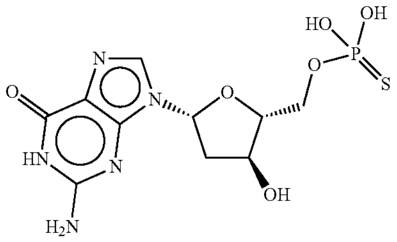

In certain embodiments, the nucleotide derivative comprises a compound of Formula Nt-16 having the following structure:

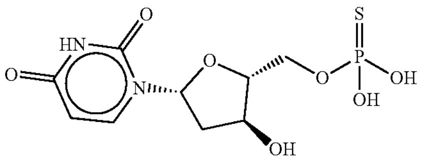

In certain embodiments, the nucleotide derivative comprises a compound of Formula Nt-17 having the following structure:

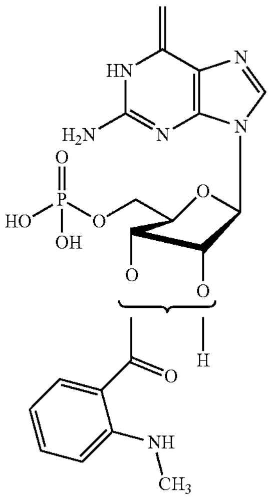

In certain embodiments, the nucleotide derivative comprises a compound of Formula Nt-18 having the following structure:

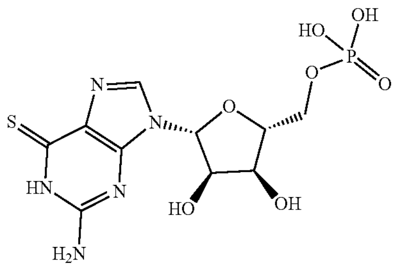 [SMILES: Nc1nc2c(ncn2[C@@H]2O[C@H](COP(=O)(O)O)[C@@H](O)[C@H]2O)c(=S)[nH]1]

In certain embodiments, the nucleotide derivative comprises a compound of Formula Nt-19 having the following structure:

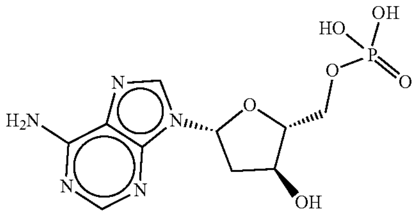

In certain embodiments, the nucleotide derivative comprises a compound of Formula Nt-20 having the following structure:

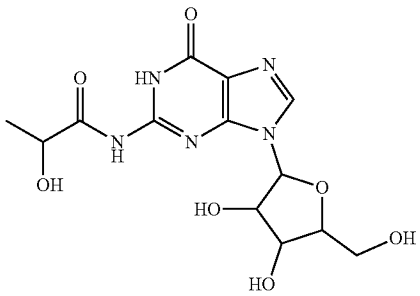 [SMILES: CC(O)C(=O)Nc1nc2c(ncn2C2OC(CO)C(O)C2O)c(=O)[nH]1]

In certain embodiments, the nucleotide derivative comprises a compound of Formula Nt-21 having the following structure:

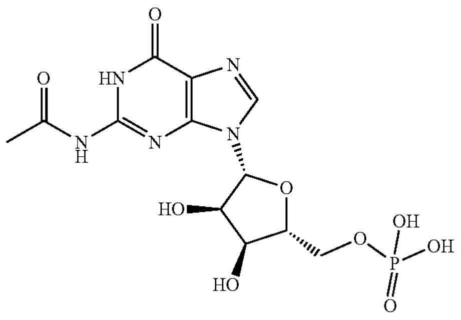 [SMILES: CC(=O)Nc1nc2c(ncn2[C@@H]2O[C@H](COP(=O)(O)O)[C@@H](O)[C@H]2O)c(=O)[nH]1]

In certain embodiments, the nucleotide derivative comprises a compound of Formula Nt-22 having the following structure:

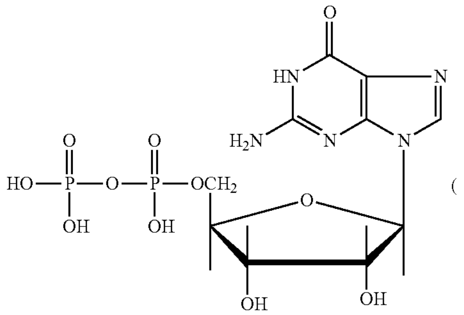

In certain embodiments, the nucleotide derivative comprises a compound of Formula Nt-23 having the following structure:

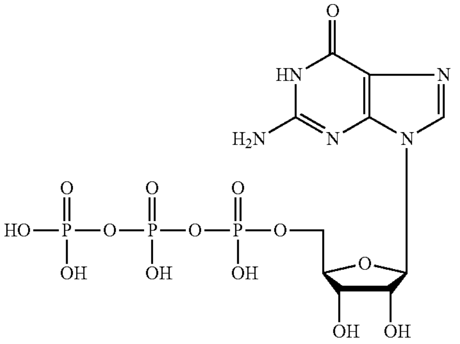

In certain embodiments, the nucleotide derivative comprises a compound of Formula Nt-24 having the following structure:

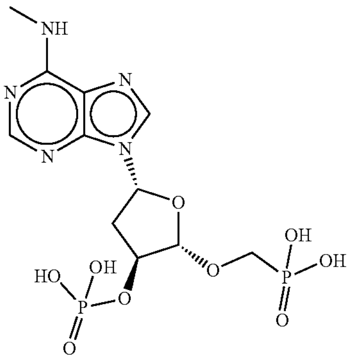

In certain embodiments, the nucleotide derivative comprises a compound of Formula Nt-25 having the following structure:

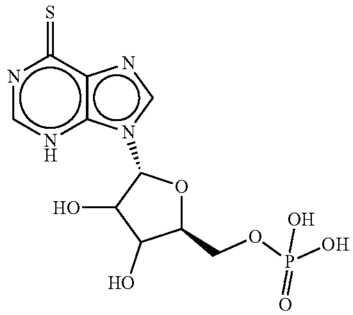

In certain embodiments, the nucleotide derivative comprises a compound of Formula Nt-26 having the following structure:

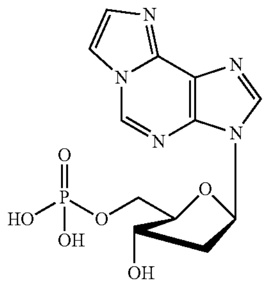

In certain embodiments, the nucleotide derivative comprises a compound of Formula Nt-27 having the following structure:

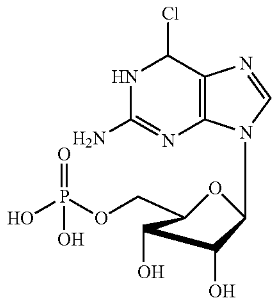

In certain embodiments, the nucleotide derivative comprises a compound of Formula Nt-28 having the following structure:

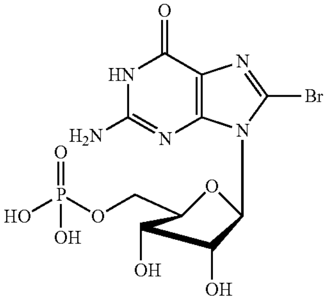

In certain embodiments, the nucleotide derivative comprises a compound of Formula Nt-29 having the following structure:

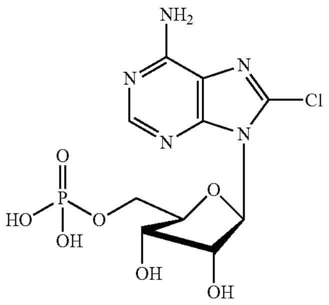

In certain embodiments, the nucleotide derivative comprises a compound of Formula Nt-30 having the following structure:

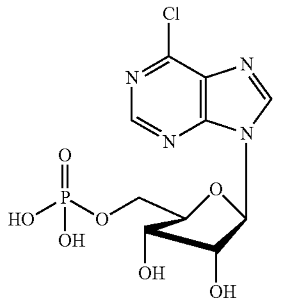

In certain embodiments, the nucleotide derivative comprises a compound of Formula Nt-31 having the following structure:

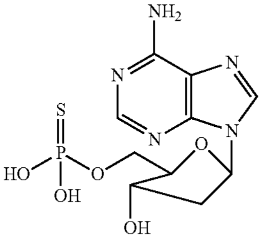 [SMILES: Nc1ncnc2c1ncn2C1CC(O)C(COP(O)(O)=S)O1]

In certain embodiments, the nucleotide derivative comprises a compound of Formula Nt-32 having the following structure:

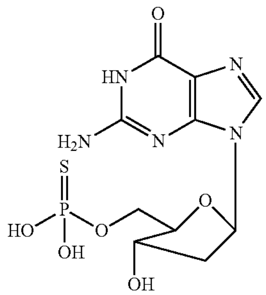 [SMILES: Nc1nc2c(ncn2C2CC(O)C(COP(O)(O)=S)O2)c(=O)[nH]1]

In certain embodiments, the nucleotide derivative comprises a compound of Formula Nt-33 having the following structure:

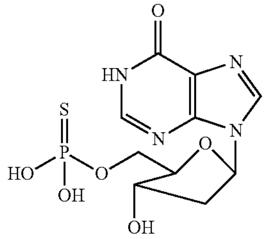 [SMILES: O=c1[nH]cnc2c1ncn2C1CC(O)C(COP(O)(O)=S)O1]

In certain embodiments, the nucleotide derivative comprises a compound of Formula Nt-34 having the following structure:

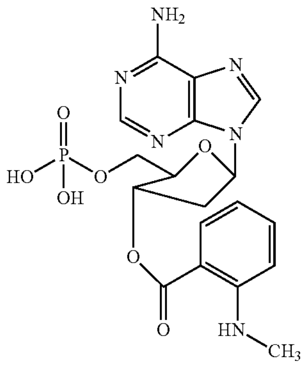 [SMILES: CNc1ccccc1C(=O)OC1CC(n2cnc3c(N)ncnc32)OC1COP(=O)(O)O]

In certain embodiments, the nucleotide derivative comprises a compound of Formula Nt-35 having the following structure:

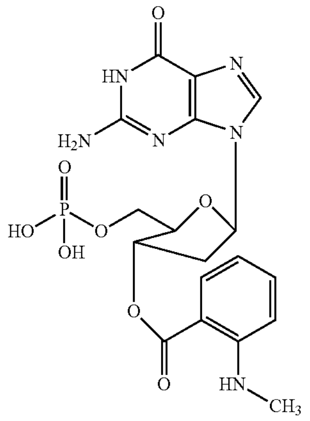 [SMILES: CNc1ccccc1C(=O)OC1CC(n2cnc3c(=O)[nH]c(N)nc32)OC1COP(=O)(O)O]

In certain embodiments, the nucleotide derivative comprises a compound of Formula Nt-36 having the following structure:

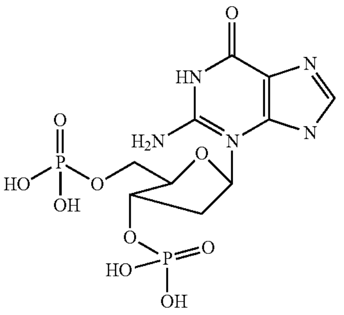

In certain embodiments, the nucleotide derivative comprises a compound of Formula Nt-37 having the following structure:

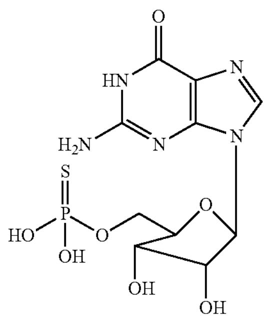 [SMILES: Nc1nc2c(ncn2C2OC(COP(O)(O)=S)C(O)C2O)c(=O)[nH]1]

In certain embodiments, the nucleotide derivative comprises a compound of Formula Nt-38 having the following structure:

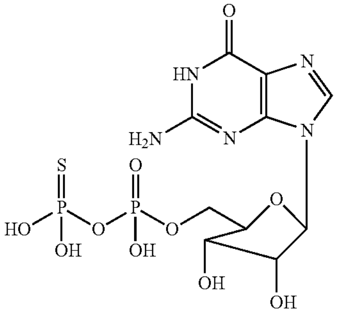 [SMILES: Nc1nc2c(ncn2C2OC(COP(=O)(O)OP(O)(O)=S)C(O)C2O)c(=O)[nH]1]

In certain embodiments, the nucleotide derivative comprises a compound of Formula Nt-39 having the following structure:

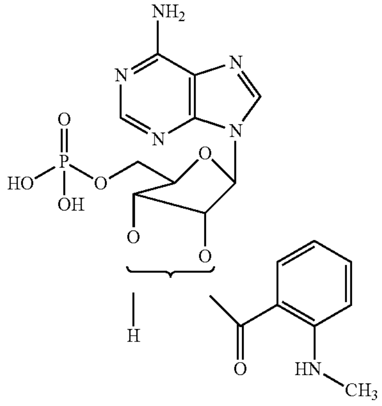

In certain embodiments, the nucleotide derivative comprises a compound of Formula Nt-40 having the following structure:

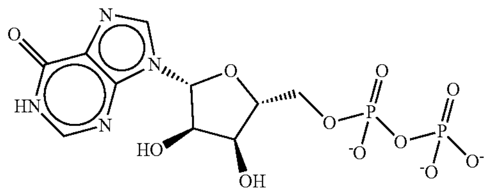

In certain embodiments, the nucleotide derivative comprises a compound of Formula Nt-41 having the following structure:

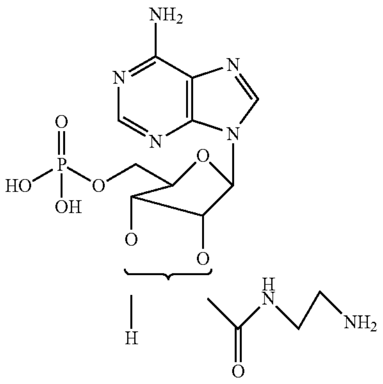

In certain embodiments, the nucleotide derivative comprises a compound of Formula Nt-42 having the following structure:

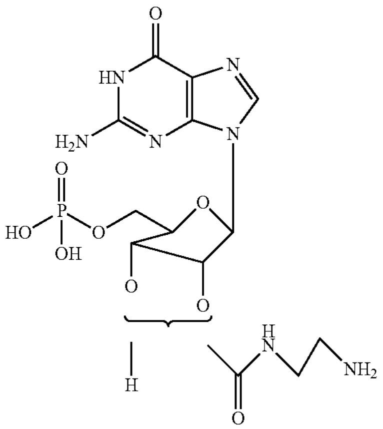

In certain embodiments, the nucleotide derivative comprises a compound of Formula Nt-43 having the following structure:

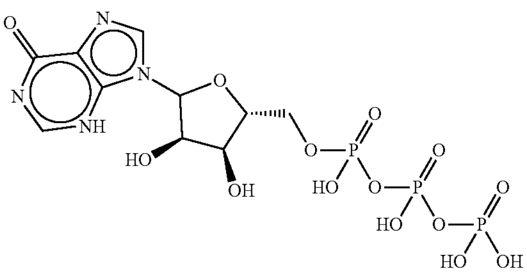

In certain embodiments, the nucleotide derivative comprises a compound of Formula Nt-44 having the following structure:

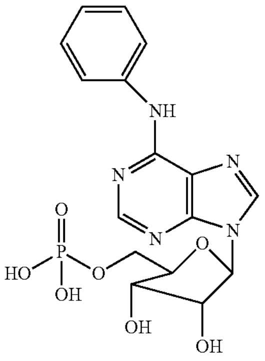 [SMILES: O=P(O)(O)OCC1OC(n2cnc3c(Nc4ccccc4)ncnc32)C(O)C1O]

In certain embodiments, the nucleotide derivative comprises a compound of Formula Nt-45 having the following structure:

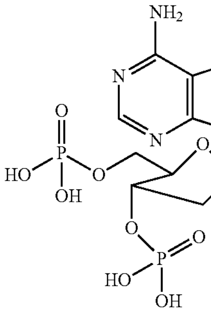

In certain embodiments, the nucleotide derivative comprises a compound of Formula Nt-46 having the following structure:

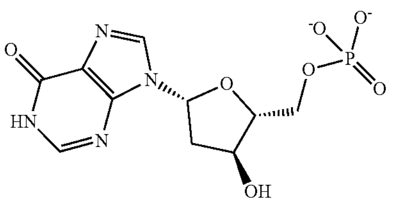

In certain embodiments, the nucleotide derivative comprises a compound of Formula Nt-47 having the following structure:

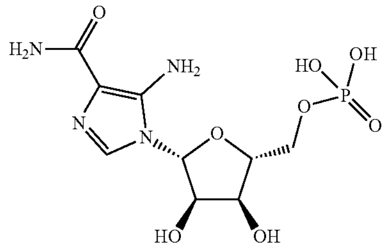 [SMILES: NC(=O)c1ncn([C@@H]2O[C@H](COP(=O)(O)O)[C@@H](O)[C@H]2O)c1N]

In certain embodiments, the nucleotide derivative comprises a compound of Formula Nt-48 having the following structure:

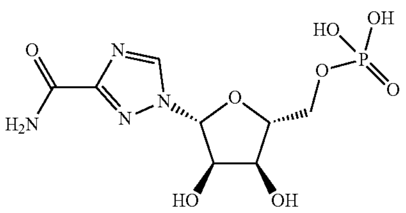 [SMILES: NC(=O)c1ncn([C@@H]2O[C@H](COP(=O)(O)O)[C@@H](O)[C@H]2O)n1]

In certain embodiments, the nucleotide derivative comprises a compound of Formula Nt-49 having the following structure:

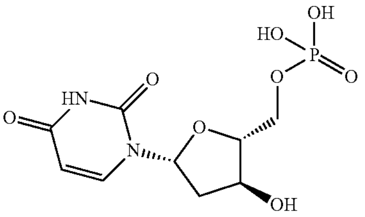 [SMILES: O=c1ccn([C@H]2C[C@H](O)[C@@H](COP(=O)(O)O)O2)c(=O)[nH]1]

In certain embodiments, the nucleotide derivative comprises a compound of Formula Nt-50 having the following structure:

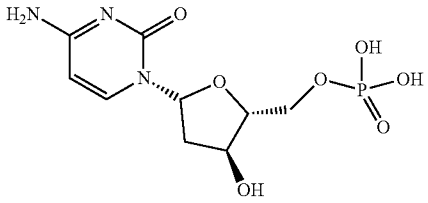

In certain embodiments, the nucleotide derivative comprises a compound of Formula Nt-51 having the following structure:

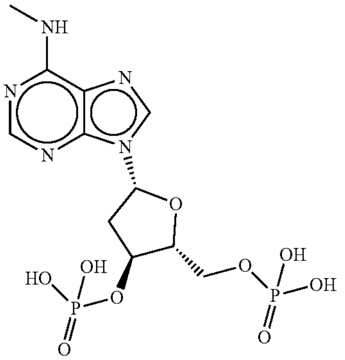

In certain embodiments, the nucleotide derivative comprises a compound of Formula Nt-52 having the following structure:

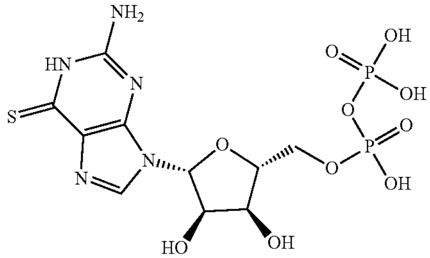 [SMILES: Nc1nc2c(ncn2[C@@H]2O[C@H](COP(=O)(O)OP(=O)(O)O)[C@@H](O)[C@H]2O)c(=S)[nH]1]

In certain embodiments, the nucleotide derivative comprises a compound of Formula Nt-53 having the following structure:

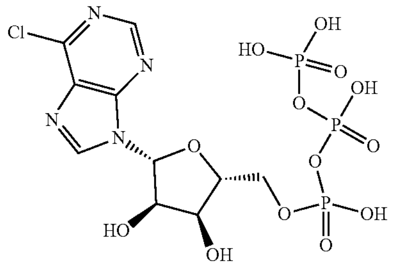 [SMILES: O=P(O)(O)OP(=O)(O)OP(=O)(O)OC[C@H]1O[C@@H](n2cnc3c(Cl)ncnc32)[C@H](O)[C@@H]1O]

In certain embodiments, the nucleotide derivative comprises a compound of Formula Nt-54 having the following structure:

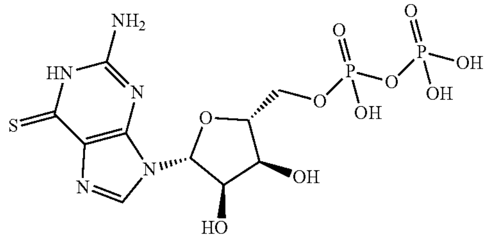 [SMILES: Nc1nc2c(ncn2[C@@H]2O[C@H](COP(=O)(O)OP(=O)(O)O)[C@@H](O)[C@H]2O)c(=S)[nH]1]

In certain embodiments, the nucleotide derivative comprises a compound of Formula Nt-55 having the following structure:

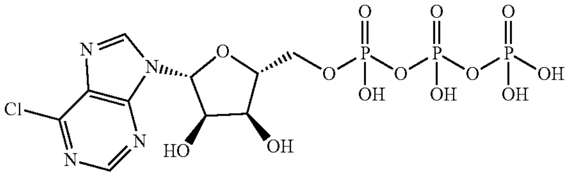 [SMILES: O=P(O)(O)OP(=O)(O)OP(=O)(O)OC[C@H]1O[C@@H](n2cnc3c(Cl)ncnc32)[C@H](O)[C@@H]1O]

In certain embodiments, the nucleotide derivative can be a salt, stereoisomer or a comestible form of compounds of Formulas Nt-1 to Nt-55 and/or the compounds listed in Tables 2 and 6-14.

TABLE 2

| Nucleotide derivatives<br>Chemical Name |
|---|
| Adenosine 3',5'-diphosphate (ADP) |
| 2'-/3'-O-(N'-Methyl-anthraniloyl) adenosine-5'-O-monophosphate (MANT-AMP) |

TABLE 2-continued

| Nucleotide derivatives Chemical Name |
|---|
| 2'-Deoxy-3'-O-(N'-methylanthraniloyl)adenosine-5'-O-monophosphate |
| Adenosine-5'-O-monophosphorothioate (5'-AMPS) |
| 1,N6-Ethenoadenosine-5'-O-monophosphate (8-5'-AMP) |
| 2'-Deoxy-N6-methyl adenosine 3',5'-diphosphate |
| 2'-Deoxyadenosine-3',5'-O-bisphosphate |
| Adenosine 5'-phosphosulfate |
| N6-Cyclopentyladenosine-5'-O-monophosphate (6-cPe-5'-AMP) |
| Adenosine 5'-O-thiomonophosphate |
| 2'-Deoxyadenosine-5'-O-monophosphorothioate (5'-dAMP5) |
| 2'-/3'-O-(2-Aminoethyl carbamoyl)adenosine-5'-O-monophosphate (2'-/3'-AEC-5'-AMP) |
| N6-Methyladenosine 5'-monophosphate |
| 2'-Deoxyadenosine 5'-monophosphate |
| 2'-Deoxy-1,N6-ethenoadenosine-5'-O-monophosphate |
| 7-Deazaadenosine-5'-O-monophosphate (7-CH-5'-AMP/5'-TuMP) |
| 8-Chloroadenosine-5'-O-monophosphate (8-C1-5'-AMPS) |
| N6-Benzoyladenosine-5'-O-monophosphate (6-Bnz-5'-AMP) |
| 6-Thioguanosine-5'-O-monophosphate (6-T-5'-GMP) |
| 2'-Deoxyguanosine-5'-O-monophosphorothioate |
| 2'-,3'-O-(N'-Methylanthraniloyl)guanosine-5'-O-monophosphate (MANT-5'-GMP) (Fluorescent analogue of 5'-GMP) |
| Guanosine-5'-monophosphorothioate (5'-GMPS) |
| 2'-Deoxy-3'-O-(N'-methylanthraniloyl) guanosine-5'-O-monophosphate |
| Guanosine-5'-O-(2-thiodiphosphate) |
| 2'-Deoxyguanosine-3',5'-O-bisphosphate |
| 2'-Deoxyguanosine-5'-O-monophosphorothioate (5'-dGMPS) |
| N-Lactoy1-5'-GMP |
| N-Acetyl-5'-GMP |
| Guanosine 5'-diphosphate |
| 2'-/3'-O-(2-Aminoethylcarbamoyl) guanosine-5'-O-monophosphate (2'-/3'-AEC-5'-GMP) |
| Guanosine 5'-triphosphate |
| 2'-Deoxyguanosine 5'-monophosphate |
| Guanosine 5'-monophosphomorpholidate 4-morpholine-N,N'-dicyclohexylcarboxamidine |
| 8-Bromoguanosine-5'-O-monophosphate (8-Br-5'-GMP) |
| 2-Amino-6-chloropurineriboside-5'-O-monophosphate (2-NH2-6-C1-5'-PuMP) |
| 6-Chloropurineriboside-5'-O-monophosphate |
| 6-Thioinosine Phosphate |
| Inosine Triphosphate (ITP) |
| 2'-Deoxyinosine-5'-O-monophosphorothioate |
| Inosine 5'-diphosphate (IDP) |
| Uridine 5'-monophosphomorpholidate 4-morpholine-N,N'-dicyclohexylcarboxamidine |
| 2'-Deoxyuridine-5'-O-monophosphosphorothioate (5'-dUMPS) |
| Ribavirin 5'-Monophosphate |

In certain embodiments, the nucleotide derivatives of the present disclosure comprise a salt of the nucleotide derivative, for example, but not limited to, an acetate salt or a formate salt. In certain embodiments, the nucleotide derivative salt comprises an anion (−) (for example, but not limited to, $Cl^-$, $O^{2-}$, $CO_3^{2-}$, $HCO_3^-$, $OH^-$, $NO_3^-$, $PO_4^{3-}$, $SO_4^{2-}$, $CH_3COO^-$, $HCOO^-$ and $C_2O_4^{2-}$) bonded via an ionic bond with a cation (+) (for example, but not limited to, $Al^{3+}$, $Ca^{2+}$, $Na^+$, $K^+$, $Cu^{2+}$, $H^+$, $Fe^{3+}$, $Mg^{2+}$, $NH_4^+$ and $H_3O^+$). In other embodiments, the nucleotide derivative salt comprises a cation (+) bonded via an ionic bond with an anion (−).

In certain embodiments, the nucleotide derivatives of the present application are identified through in silico modeling of the feline T1R1/T1R3 receptor ("Umami receptor"), wherein the nucleotide derivatives of the present application comprise a structure that fits within a binding site of the feline T1R1/T1R3 receptor.

In certain embodiments, the nucleotide derivatives of the present application are identified through an in vitro assay, wherein the nucleotide derivatives activate a feline T1R1/T1R3 receptor expressed by cells in vitro. In certain embodiments, the nucleotide derivatives activate the receptor alone, or in combination with other T1R1/T1R3 binding agents, such as the nucleotides, amino acids and transmembrane compounds described herein, and/or in combination with amino acids described herein that bind to one or more other receptors. In certain embodiments the in vitro assay comprises the in vitro assays described in the Examples section of the present application.

2.1 T1R1 Nucleotide Binding Site

The present application also provides for compositions that modulate an umami receptor, for example, a T1R1/T1R3 receptor, wherein the compositions interact with one or more amino acids in a Venus Flytrap domain of the umami receptor. In certain embodiments, the Venus Flytrap domain (VFT) is present in T1R1. In certain embodiments, the amino acids that the composition interacts with comprise one or more of Thr449, Ser172, Glu170, Glu301, His71, His47, Arg277, His308, Asn69, Asn302, Ser306, Ser384, Asp302, Ser306, and Ala380.

In one non-limiting embodiment, the composition comprises a nucleotide and/or nucleotide derivative, wherein the nucleotide and/or nucleotide derivative interacts with one, two, three, four, five, six, seven, eight or more of His71, Arg277, His308, Ser306, Ser384, Ala380, His47, Asn69, and Asp302 of T1R1.

In another non-limiting embodiment, the composition comprises a nucleotide and/or nucleotide derivative, wherein the nucleotide and/or nucleotide derivative interacts with one, two, three, four or more of Met383, Ser385, Ile309, Ser107, and Asp49 of T1R1.

When binding a nucleotide and/or nucleotide derivative, the amino acid residues of the VFT may coordinate the phosphates, diphosphates, triphosphates, bisphosphates, phosphate mimetics (e.g. acidic functionalities such as COOH, $SO_3H$, NHOH, etc.), of a nucleotide and/or nucleotide derivative, and include one or more of His71, His47, Arg277, His308, Ile309, Asn69, Ser107, and Asp49 of T1R1.

In certain embodiments, at least one phosphate of the nucleotide and/or nucleotide derivative interacts with one, two, three, four or more of His71, His47, Arg277, His308, and Asn69 of T1R1. In a non-limiting example, binding of a nucleotide and/or nucleotide derivative to the VFT involves interactions between negatively charged groups of amino acids in the phosphate binding region of VFT and a nucleotide and/or nucleotide derivative phosphate.

The amino acid residues of the VFT may coordinate the sugar atoms of a nucleotide and/or nucleotide derivative (or, for example, a modified sugar or sugar replacement), and can include Asp302 and/or Ser306 of T1R1.

In certain embodiments, at least one sugar molecule of the nucleotide and/or nucleotide derivative interacts with amino acids Asp302 and/or Ser306 of T1R1.

The amino acid residues of the VFT may coordinate a nitrogenous base of a nucleotide and/or nucleotide derivative, and can include one or more of Ser384, Ser385, Ala380, Met383, Glu170 and Asp302 of T1R1.

In certain embodiments, the nitrogenous base of the nucleotide and/or nucleotide derivative interacts with one, two or more of Ser384, His308, and Ala380 of T1R1.

In other non-limiting embodiments, a sugar molecule of the nucleotide and/or nucleotide derivative interacts with Asp302 of the VFT, wherein Asp302 is oriented to simultaneously coordinate the zwitterionic backbone nitrogen of a bound amino acid and the sugar of the nucleotide or nucleotide derivative.

In certain embodiments, the composition interacts with the umami Venus Flytrap domain (VFT) according to any combination of interactions described herein, for example, one, two, three or more of the interactions. The interactions between a nucleotide and/or nucleotide derivative and the VFT may further include additional hydrophobic interactions that add to the interaction energy of the nucleotide and/or nucleotide derivative to the VFT.

In certain embodiments, the interaction between the composition and the one or more amino acids comprises one or more hydrogen bond, covalent bond, non-covalent bond, salt bridge, physical interaction, and combinations thereof. The interactions can also be any interaction characteristic of a ligand receptor interaction known in the art. Such interactions can be determined by, for example, site directed mutagenesis, x-ray crystallography, x-ray or other spectroscopic methods, Nuclear Magnetic Resonance (NMR), cross-linking assessment, mass spectroscopy or electrophoresis, displacement assays based on known agonists, structural determination and combinations thereof. In certain embodiments, the interactions are determined in silico, for example, by theoretical means such as docking a compound into the VFT domain using molecular docking, molecular modeling, molecular simulation, or other means known to persons of ordinary skill in the art.

The present application also provides for methods of identifying a compound that modulates the activity of an umami receptor, for example, a T1R1, wherein the compound is identified based on its ability to interact with one or more of the amino acids described herein that are present in the VFT domain of T1R1.

In certain embodiments the method comprises contacting a test agent with a feline T1R1 umami receptor, detecting an interaction between the test agent and one more amino acids in a VFT interacting site of the feline T1R1 umami receptor, and selecting as the compound, a test agent that interacts with one or more of the amino acids.

3. TRANSMEMBRANE COMPOUNDS

The present disclosure relates to flavor compositions that include at least one transmembrane compounds. In certain embodiments, the transmembrane compound is an umami taste enhancing compound. The transmembrane compounds disclosed herein were identified through the in silico modeling of putative agonists within the transmembrane region of T1R1 of the feline T1R1/T1R3 receptor ("Umami receptor"). Accordingly, in certain embodiments, a transmembrane compound is a composition that interacts with (e.g., binds to) a region of a T1R1 comprising the transmembrane domain of T1R1. In certain embodiments, such interactions with the transmembrane domain of T1R1 agonizes the T1R1/T1R3 or umami receptor. In other embodiments, the transmembrane compound acts synergistically with other T1R1 agonists or modulators to modulate the activity of the T1R1/T1R3 or umami receptor.

The flavor compositions can be used to enhance or modify the palatability, taste or flavor of pet food product. The flavor compositions can include combinations of compounds, for example, combinations of transmembrane compounds, and/or nucleotides, and/or nucleotide derivatives and/or amino acids, and can be added to pet food product compositions in various delivery system formats.

3.1 Amine Derivatives I

In certain embodiments, the transmembrane compound comprises a compound of Formula Tm-1 having the following structure:

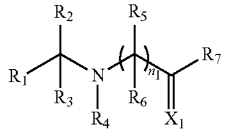

wherein $X_1$ is selected from the group consisting of O and S;

wherein $n_1$ is 1-3;

wherein $n_2$ is 0-4 (wherein when n is 0, a chemical bond is present);

wherein $n_4$ is 0-3;

wherein $R_1$, $R_2$, and $R_3$ are independently selected from the group consisting of H, =O, =S, branched or unbranched and substituted or unsubstituted lower alkyl ($C_1$-$C_8$), and $R_5$;

wherein $R_4$ is selected from the group consisting of H, branched or unbranched lower alyl ($C_1$-$C_8$), and $(CH_2)n_2$aryl;

wherein $R_5$ is selected from the group consisting of H, $CH_3$, $CH(CH_3)_2$, $CH_2CH(CH_3)_2$, $CH(CH_3)CH_2CH_3$, $CH_2CH_2SCH_3$, $CH_2SH$, $CH_2SeH$, $CH_2OH$, $CH(OH)CH_3$, $CH_2C(O)NH_2$, $CH_2CH_2C(O)NH_2$, $CH_2CH_2CH_2NHC(NH)NH_2$, $CH_2$(1H-imidazole-yl), $CH_2(CH_2)_2CH_2NH_2$, $CH_2COOH$, $CH_2CH_2COOH$, $CH_2C_6H_5$, $CH_2$(4-hydroxphenyl), $CH_2$[3-yl-(1H-indol)], $CH_2$(cyclo-pentyl), $CH_2$(cyclo-hexyl), $CH_2$(indanyl), independently branched or unbranched lower alkyl ($C_1$-$C_{10}$), $(CH_2)_{0-4}PH$, c-$C_3H_5$, c-$C_4H_7$, c-$C_5H_9$, c-$C_6H_{10}$, phenyl, biaryl, $(CH_2)n_2$aryl, pyridine, thiophene, $CH_2Ph$, $CH_2$pyridine, and $CH_2$thiophene, the aryl and alkyl (both branched and unbranched) groups may optionally be substituted by methyl, OH, SH, $OCH_3$, $SCH_3$, COOH, $COOR_{13}$, $S(O)n_4R_1$, $C(O)R^{11}$, $C(O)NR_{11}R_{12}$, CN, $NR_{11}R_{12}$, $NR_{11}C(O)R_{12}$, aryl, methylenedioxy, alkyl ($C_1$-$C_5$), $CH_2SSCH_2CH(COOH)(NH_2)$, Halogen (F, Cl, Br, I), $NO_2$, NHC(=NH)$NH_2$, CHO, $CF_3$, P(=X)$(OR_1)_2$, OP(=$X_1$)$(OR_1)_2$;

wherein $R_5$ and $R_6$ may be joined to form cyclic rings such as cyclopropyl, cyclobutyl, cyclopentyl, cyclohexyl, and cycloheptyl, (i.e. spiro rings); wherein $R_6$ is selected from the group consisting of H, and branched or unbranched lower alkyl ($C_1$-$C_4$);

wherein $R_7$ is selected from the group consisting of H, AA, OH, O, branched or unbranched lower alkyl ($C_1$-$C_6$), $O(CH_2)_{n1}$aryl, $NR_{11}R_{12}$, $N(R_{14})OH$, $C(R_8)(R_9)$, aryl, and heteroaryl;

wherein $R_8$ and $R_9$ are independently selected from the group consisting of H, branched or unbranched lower alkyl($C_1$-$C_6$), aryl, alkyl-aryl, and alkyl-heteroaryl;

wherein $R_{11}$ and $R_{12}$ are independently selected from the group consisting of H, $CH_3$, branched or unbranched lower alkyl ($C_1$-$C_6$), phenyl, aryl, and $(CH_2)_{n1}$aryl;

wherein $R_{13}$ is selected from the group consisting of H, $CH_3$, $CH_2CH_3$, $CH_2$aryl, and tert-butyl;

wherein $R_{14}$ is selected from the group consisting of H and $CH_3$; and wherein AA is selected from the group consisting of a naturally occurring alpha amino acid or (R) or (S)-configuration (i.e., proteogenic amino acids).

In one non-limiting embodiment, all asymmetric configurations are contemplated for the presently disclosed formulations.

In certain embodiments, aryl has its standard chemical meaning and may comprise the following, but is not limited to, Ph, pyridine, thiophene, furan, napthyl, indole, benzothiophene, benzofuran, quinolone, isoquinoline, pyrrole, N-(methyl)pyrolle, imidazole, thiazole, pyrimidine, isoxazole, oxazole, isoindole, indolizine, purine, pyrazine, and-pyridazine.

In certain embodiments, attachments of the aryl group may be placed at various carbon centers, as would be understood by one of ordinary skill in the art.

In other non-limiting embodiments, when the compound comprises two aryl rings (e.g., phenyls), either one or both rings may be substituted by a biaryl ring system. Such biaryl ring systems include, for example, phenyl-phenyl, phenyl-pyridyl, phenyl-thiophene, thiophene-thiophene, and phenyl-furan.

In certain embodiments, the transmembrane compound comprises a compound of Formula Tm-2 having the following structure:

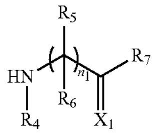

wherein $R_4$, $R_5$, $R_6$, $R_7$, $X_1$, and $n_1$ are as defined for Formula Tm-1.

In certain embodiments, the transmembrane compound comprises a compound of Formula Tm-20 having the following structure:

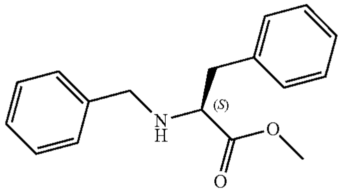

In certain embodiments, the transmembrane compound comprises a compound of Formula Tm-21 having the following structure:

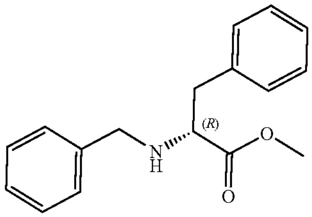

In certain embodiments, the transmembrane compound comprises a compound of Formula Tm-22 having the following structure:

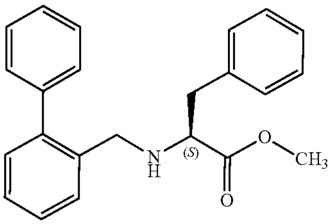

In certain embodiments, the transmembrane compound comprises a compound of Formula Tm-23 having the following structure:

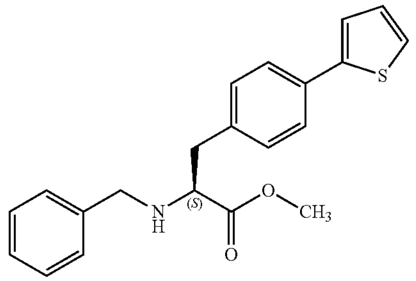

In certain embodiments, the transmembrane compound comprises a compound of Formula Tm-24 having the following structure:

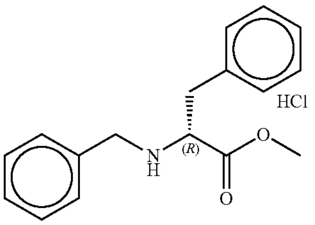

In certain embodiments, the transmembrane compound comprises a compound of Formula Tm-25 having the following structure:

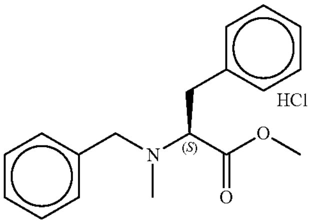

In certain embodiments, the transmembrane compound comprises a compound of Formula Tm-26 having the following structure:

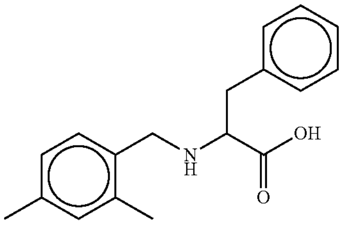

In certain embodiments, the transmembrane compound comprises a compound of Formula Tm-27 having the following structure:

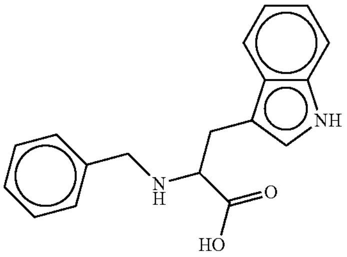

In certain embodiments, the transmembrane compound comprises a compound of Formula Tm-28 having the following structure:

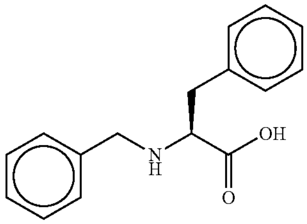

In certain embodiments, the transmembrane compound comprises a compound of Formula Tm-29 having the following structure:

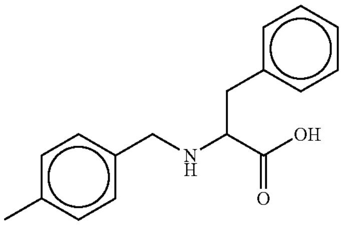

In certain embodiments, the transmembrane compound comprises a compound of Formula Tm-30 having the following structure:

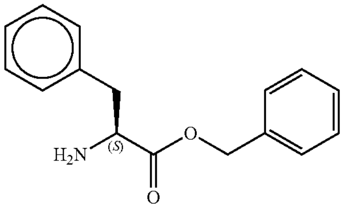

In certain embodiments, the transmembrane compound comprises a compound of Formula Tm-31 having the following structure:

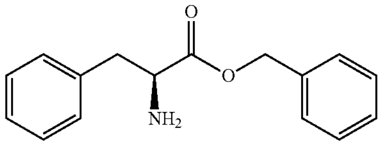 [SMILES: N[C@@H](Cc1ccccc1)C(=O)OCc1ccccc1]

In certain embodiments, the transmembrane compound comprises a compound of Formula Tm-32 having the following structure:

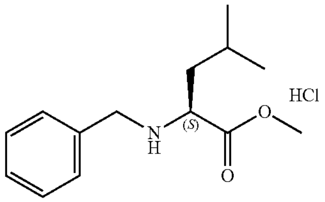

In certain embodiments, the transmembrane compound comprises a compound of Formula Tm-33 having the following structure:

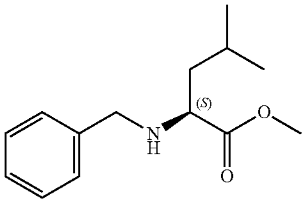

In certain embodiments, the transmembrane compound comprises a compound of Formula Tm-34 having the following structure:

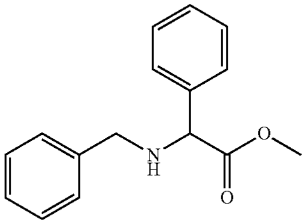 [SMILES: COC(=O)C(NCc1ccccc1)c1ccccc1]

In certain embodiments, the transmembrane compound comprises a compound of Formula Tm-35 having the following structure:

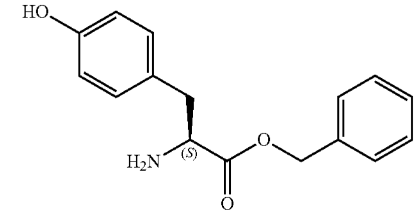

In certain embodiments, the transmembrane compound comprises a compound of Formula Tm-36 having the following structure:

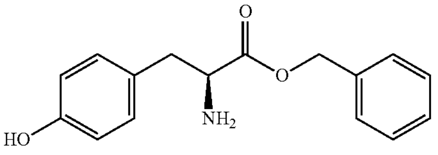 [SMILES: N[C@@H](Cc1ccc(O)cc1)C(=O)OCc1ccccc1]

In certain embodiments, the transmembrane compound comprises a compound of Formula Tm-37 having the following structure:

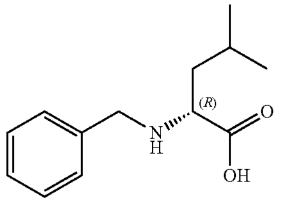

In certain embodiments, the transmembrane compound comprises a compound of Formula Tm-38 having the following structure:

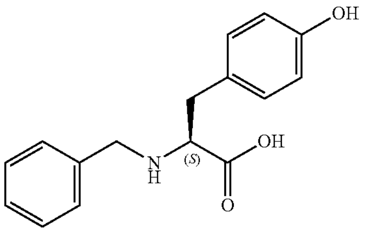

In certain embodiments, the transmembrane compound comprises a compound of Formula Tm-39 having the following structure:

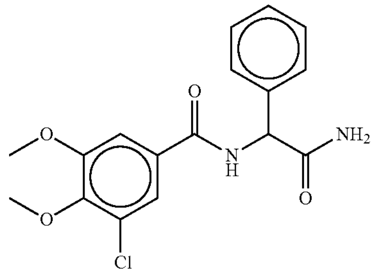

In certain embodiments, the transmembrane compound comprises a compound of Formula Tm-40 having the following structure:

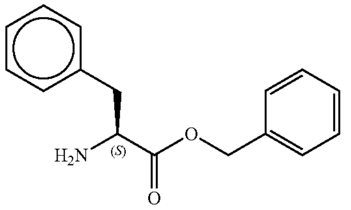

3.2 Amine Derivatives II

In certain embodiments, the transmembrane compound comprises a compound of Formula Tm-3 having the following structure:

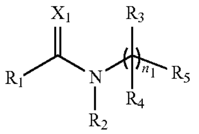

wherein $X_1$ is selected from the group consisting of O and S;

wherein $n_1$ and $n_2$ are 0-4 (wherein when $n_1$ and/or $n_2$ is 0, a chemical bond is present);

wherein $R_1$ is selected from the group consisting of branched or unbranched lower alkyl ($C_1$-$C_{10}$), $(CH_2)_{n2}$Ph, c-$C_3H_5$, c-$C_4H_7$, c-$C_5H_9$, c-$C_6H_{10}$, Phenyl, $(CH_2)_{n2}$aryl, Ph, pyridine, thiophene, $CH_2$Ph, $CH_2$pyridine, $CH_2$thiophene, O-aryl, Ph, pyridine, thiophene, furan, napthyl, indole, benzothiophene, benzofuran, quinolone, isoquinoline, pyrrole, N-(methyl)pyrolle, imidazole, thiazole, pyrimdine, isoxazole, oxazole, isoindole, indolizine, purine, pyrazine, pyridazine, O-alkyl ($C_1$-$C_6$), biaryl, and $OR_1$ (e.g., carbamates), the aryl and alkyl (both branched and unbranched) groups may optionally be substituted by methyl, OH, SH, $OCH_3$, $SCH_3$, COOH, $COOR_{13}$, $S(O)n_4R_1$, $C(O)R_{11}$, $C(O)NR_{11}R_{12}$, CN, $NR_{11}R_{12}$, $NR_{11}C(O)R^{12}$, aryl, methylenedioxy, alkyl ($C_1$-$C_5$), $CH_2SCH_2CH(COOH)(NH_2)$, Halogen (F, Cl, Br, I), $NO_2$, $NHC(=NH)NH_2$, CHO, $CF_3$, $P(=X_1)(OR_1)_2$, or $OP(=X_1)(OR_1)_2$;

wherein $R_2$ is selected from the group consisting of H, $CH_3$, $(CH_2)$, and aryl;

wherein $R_3$, $R_4$, and $R_5$ are independently selected from the group consisting of H, branched or unbranched lower alkyl ($C_1$-$C_8$), $(CH_2)_{n2}$aryl, and $R_1$;

wherein $R_{11}$ and $R_{12}$ are independently selected from the group consisting of H, $CH_3$, branched or unbranched lower alkyl ($C_1$-$C_6$), phenyl, aryl, and $(CH_2)_{n1}$aryl;

wherein $R_{13}$ is selected from the group consisting of H, $CH_3$, $CH_2CH_3$, $CH_2$aryl, and tert-butyl;

In certain embodiments, aryl has its standard chemical meaning and may comprise, but is not limited to, Ph, pyridine, thiophene, furan, napthyl, indole, benzothiophene, benzofuran, quinolone, isoquinoline, pyrrole, N-(methyl) pyrolle, imidazole, thiazole, pyrimidine, isoxazole, oxazole, isoindole, indolizine, purine, pyrazine, andpyridazine.

In certain embodiments, attachments of the aryl group may be placed at various carbon centers, as would be understood by one of ordinary skill in the art.

In certain embodiments, asymmetric centers may be of either (R) or (S) configuration, as would be understood by one of ordinary skill in the art.

In one non-limiting embodiment, all asymmetric configurations are contemplated for the presently disclosed formulations.

In other non-limiting embodiments, when the compound comprises two aryl rings (e.g., phenyls), either one or both rings may be substituted by a biaryl ring system. Such biaryl ring systems include, for example, phenyl-phenyl, phenyl-pyridyl, phenyl-thiophene, thiophene-thiophene, and penyl-furan.

In certain embodiments, the transmembrane compound comprises a compound of Formula Tm-4 having the following structure:

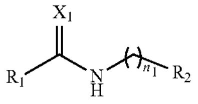

wherein $R^1$ and $R^2$ are independently selected from the group consisting of aryl, cyclo-alkyl (e.g., cyclo-propyl, cyclo-butyl, cyclo-pentyl, cyclo-hexyl, cyclo-heptyl), and hetero aryl, (for example, but not limited to, Ph, pyridine, thiophene, furan, napthyl, indole, benzothiophene, benzofuran, quinolone, isoquinoline, pyrrole, N-(methyl)pyrolle, imidazole, thiazole, pyrimidine, isoxazole, oxazole, isoindole, indolizine, purine, pyrazine, andpyridazine);

wherein the aryl groups or cyclo-alkyl groups may optionally be substituted by methyl, OH, SH, $OCH_3$, $SCH_3$, COOH, $COOR_{13}$, $S(O)n_4R_1$, $C(O)R_{11}$, $C(O)NR_{11}$, $R_{12}$, CN, $NR_{11}C(O)R_{12}$, aryl, methylenedioxy, alkyl ($C_1$-$C_5$), $CH_2SSCH_2CH(COOH)(NH_2)$, Halogen (F, Cl, Br, I), $NO_2$, $NHC({=}NH)NH_2$, CHO, $CF_3$, $P({=}X_1)(OR_1)_2$ or $OP({=}X_1)(OR_1)_2$;

wherein the cyclo-alkyl groups may optionally contain hetero atoms within the rings (e.g., O, N and/or S), for example, piperidine, piperazine, tetrahydrothiophene, pyran, pyrrolidine, or tetrahydrofuran;

wherein $n_1$=0-4;

wherein $R_{11}$, $R_{12}$, $R_{13}$, and $X_1$ are as defined herein; and wherein $n_4$=0-4.

In certain embodiments, the transmembrane compound comprises a compound of Formula Tm-41 having the following structure:

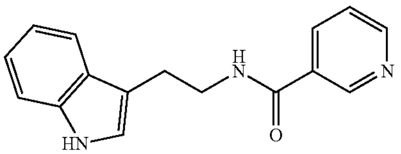 [SMILES: O=C(NCCc1c[nH]c2ccccc12)c1cccnc1]

In certain embodiments, the transmembrane compound comprises a compound of Formula Tm-42 having the following structure:

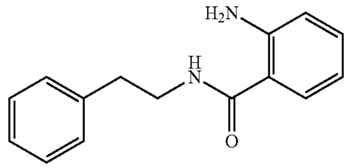 [SMILES: Nc1ccccc1C(=O)NCCc1ccccc1]

In certain embodiments, the transmembrane compound comprises a compound of Formula Tm-43 having the following structure:

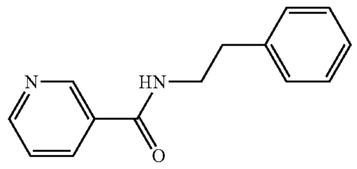 [SMILES: O=C(NCCc1ccccc1)c1cccnc1]

In certain embodiments, the transmembrane compound comprises a compound of Formula Tm-44 having the following structure:

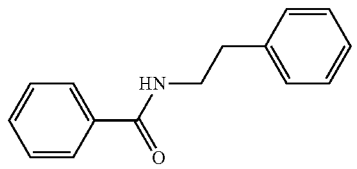 [SMILES: O=C(NCCc1ccccc1)c1ccccc1]

In certain embodiments, the transmembrane compound comprises a compound of Formula Tm-45 having the following structure:

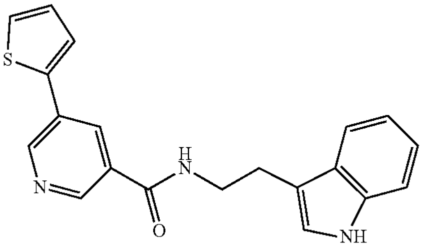 [SMILES: O=C(NCCc1c[nH]c2ccccc12)c1cncc(-c2cccs2)c1]

In certain embodiments, the transmembrane compound comprises a compound of Formula Tm-46 having the following structure:

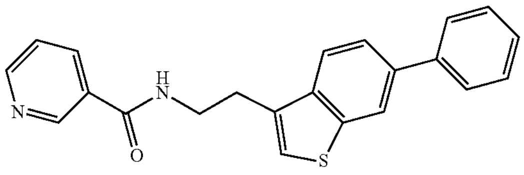 [SMILES: O=C(NCCc1csc2cc(-c3ccccc3)ccc12)c1cccnc1]

In certain embodiments, the transmembrane compound comprises a compound of Formula Tm-47 having the following structure:

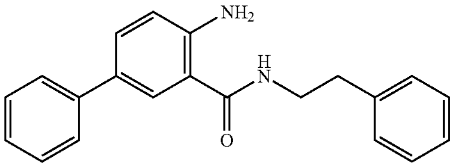 [SMILES: Nc1ccc(-c2ccccc2)cc1C(=O)NCCc1ccccc1]

In certain embodiments, the transmembrane compound comprises a compound of Formula Tm-48 having the following structure:

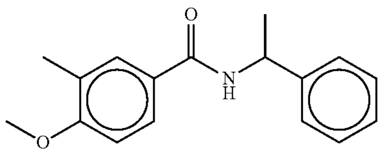

In certain embodiments, the transmembrane compound comprises a compound of Formula Tm-49 having the following structure:

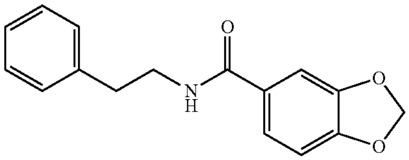 [SMILES: O=C(NCCc1ccccc1)c1ccc2c(c1)OCO2]

In certain embodiments, the transmembrane compound comprises a compound of Formula Tm-50 having the following structure:

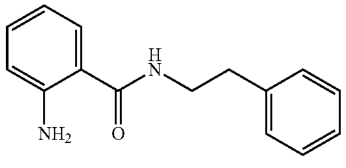 [SMILES: Nc1ccccc1C(=O)NCCc1ccccc1]

In certain embodiments, the transmembrane compound comprises a compound of Formula Tm-51 having the following structure:

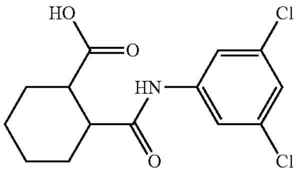 [SMILES: O=C(O)C1CCCCC1C(=O)Nc1cc(Cl)cc(Cl)c1]

In certain embodiments, the transmembrane compound comprises a compound of Formula Tm-52 having the following structure:

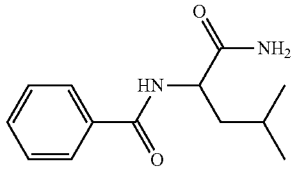 [SMILES: CC(C)CC(NC(=O)c1ccccc1)C(N)=O]

In certain embodiments, the transmembrane compound comprises a compound of Formula Tm-53 having the following structure:

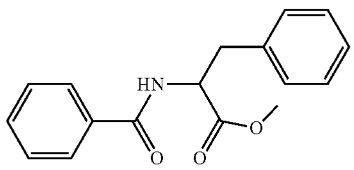 [SMILES: COC(=O)C(Cc1ccccc1)NC(=O)c1ccccc1]

In certain embodiments, the transmembrane compound comprises a compound of Formula Tm-54 having the following structure:

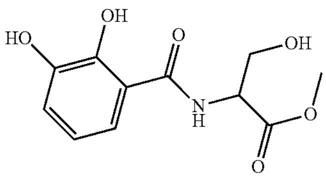 [SMILES: COC(=O)C(CO)NC(=O)c1cccc(O)c1O]

In certain embodiments, the transmembrane compound comprises a compound of Formula Tm-55 having the following structure:

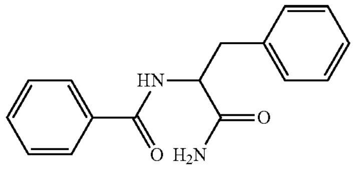 [SMILES: NC(=O)C(Cc1ccccc1)NC(=O)c1ccccc1]

3.3 Parabanic acid Derivatives

In certain embodiments, the transmembrane compound comprises a compound of Formula Tm-6 having the following structure:

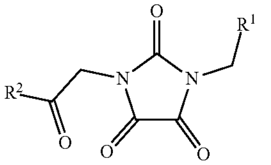

wherein $R^1$ or $R^2$ are selected independently from the group consisting of a substituted or unsubstituted alkyl, substituted or unsubstituted alkenyl, substituted or unsubstituted alkynyl, substituted or unsubstituted cycloalkyl, substituted or unsubstituted aryl, substituted or unsubstituted cycloalkalkyl, substituted or unsubstituted arylalkyl, substituted or unsubstituted heteroarylalkyl, substituted or unsubstituted heteroaryl, substituted or unsubstituted heterocyclic, substituted or unsubstituted alkoxy, substituted or unsubstituted aryloxy, hydroxyl, hydrogen, substituted or unsubstituted ethereal, substituted or unsubstituted benzothiazolyl, substituted or unsubstituted pyridyl, substituted or unsubstituted naphthyl, substituted or unsubstituted thienyl, substituted or unsubstituted benzothienyl, substituted or unsubstituted indolyl, substituted or unsubstituted isoquinolyl, substituted or unsubstituted quinolyl, substituted or unsubstituted indenyl, or substituted or unsubstituted indanyl.

In certain embodiments, $R^1$ or $R^2$ can comprise the following structure:

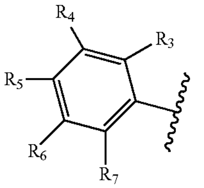

wherein $R^3$, $R^4$, $R^5$, $R^6$ and $R^7$ are selected independently from the group consisting of hydrogen, halogen, cyano, azido, hydroxyl, substituted or unsubstituted sulfonyl, substituted or unsubstituted sulfonamido, substituted or unsubstituted alkyl, substituted or unsubstituted alkenyl, substituted or unsubstituted cycloalkyl, substituted or unsubstituted aryl, substituted or unsubstituted cycloalkalkyl, substituted or unsubstituted arylalkyl, substituted or unsubstituted heteroarylalkyl, substituted or unsubstituted heteroaryl, substituted or unsubstituted amido, substituted or unsubstituted heterocyclic, substituted or unsubstituted alkoxy, substituted or unsubstituted aryloxy, substituted or unsubstituted ethereal, substituted or unsubstituted carboxy, substituted or unsubstituted acyl, substituted or unsubstituted benzothiazolyl, substituted or unsubstituted pyridyl, substituted or unsubstituted naphthyl, substituted or unsubstituted thienyl, substituted or unsubstituted benzothienyl, substituted or unsubstituted indolyl, substituted or unsubstituted isoquinolyl, substituted or unsubstituted quinolyl, or substituted or unsubstituted heteroarenyl, or substituted or unsubstituted indene, or substituted or unsubstituted indanyl. In certain embodiments, two or more of $R^3$, $R^4$, $R^5$, $R^6$ and $R^7$ may be taken together to form a ring, which can be heterocyclic (i.e., contain one or more heteroatoms) or which can be entirely carbocyclic and which can independently be saturated or unsaturated.

The substituents in the substituted groups described herein, for example, "substituted ethereal", "substituted carboxy", "substituted acyl", "substituted sulfonyl", "substituted alkyl", "substituted alkenyl", "substituted cycloalkyl", "substituted cycloalkalkyl", "substituted arylalkyl", "substituted aryl", "substituted heterocyclic", "substituted heteroarylalkyl," "substituted heteroaryl", "substituted naphthyl", "substituted phenyl", "substituted thienyl", "substituted benzothienyl", "substituted pyridyl", "substituted indolyl", "substituted isoquinolyl", "substituted quinolyl", "substituted benzothiazolyl", "substituted heteroaryl," "substituted indenyl" or "substituted indanyl" may be the same or different with one or more selected from the groups described in the present application and hydrogen, halogen, amido, acetyl, nitro ($-NO_2$), hydroxyl ($-OH$), oxo ($=O$), thio ($=S$), sulfonyl, sulfonamido, sulfate, thio, cyano, azido, trifluoromethyl ($-CF_3$), methoxy ($-OCH_3$), tert-butyl carbamate (-Boc) or optionally substituted groups selected from alkyl, cycloalkyl, alkenyl, alkynyl, alkoxy, aryl, aryloxy, arylalkyl, ethereal, carboxy, hydroxyl, heteroaryl, sulfonyl, and heterocyclic. A "substituted" functionality may have one or more than one substituent.

In one non-limiting embodiment, $R^1$ and $R^2$ are unsubstituted phenyl groups.

In one non-limiting embodiment, $R^1$ is an unsubstituted phenyl group and $R^2$ is a substituted phenyl group.

In certain embodiments, the transmembrane compound comprises a compound of Formula Tm-7 having the following structure:

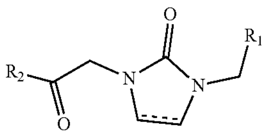

wherein $R_1$ and $R_2$ are as defined above for Formula Tm-6.

In certain embodiments, the transmembrane compound comprises a compound of Formula Tm-5 having the following structure:

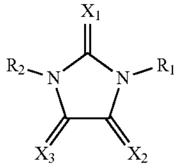

wherein $X_1$ is selected from the group consisting of O, $N(R_3)$, S;

wherein $X_2$ and $X_3$ are selected independently from the group consisting of O and S;

wherein $R_3$ is selected from the group consisting of H and branched or unbranched lower alkyl ($C_1$-$C_4$); and wherein $R_1$ and $R_2$ are as defined above for Formula Tm-6, and may also be $(CH_2)_nC(=X_1)R$, $(CH_2)_nC(=X_1)R_2$, wherein $X_1$ is O or S, and n is 0-4.

In certain embodiments, the transmembrane compound comprises a compound of Formula Tm-9 having the following structure:

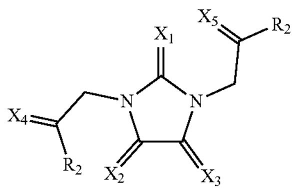

wherein $X_{1-5}$ are selected independently from the group consisting of O and S; and wherein $R_1$ and $R_2$ are as defined above for Formula Tm-6.

In certain embodiments, the transmembrane compound comprises a compound of Formula Tm-10 having the following structure:

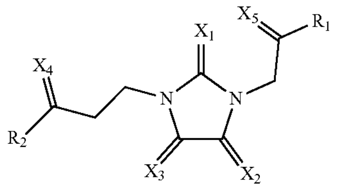

wherein $X_{1-5}$ are selected independently from the group consisting of O and S; and wherein $R_1$ and $R_2$ are as defined above for Formula Tm-6.

In certain embodiments, the transmembrane compound comprises a compound of Formula Tm-11 having the following structure:

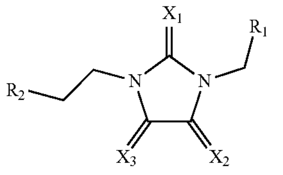

wherein $X_{1-3}$ are selected independently from the group consisting of O and S; and wherein $R_1$ and $R_2$ are as defined above for Formula Tm-6.

In certain embodiments, the transmembrane compound comprises a compound of Formula Tm-56 having the following structure:

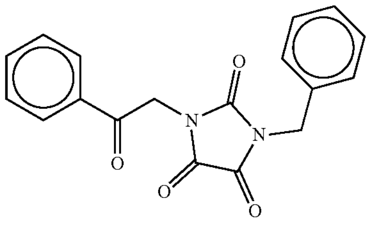

In certain embodiments, the transmembrane compound comprises a compound of Formula Tm-57 having the following structure:

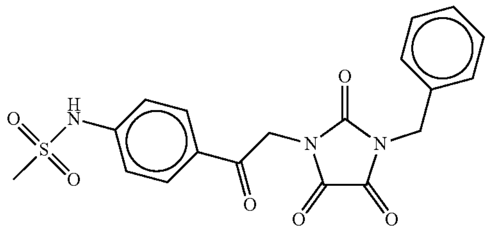

In certain embodiments, the transmembrane compound comprises a compound of Formula Tm-58 having the following structure:

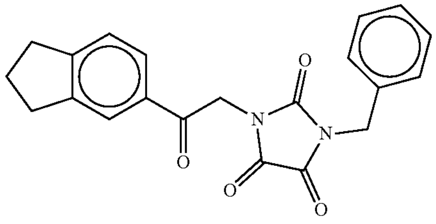

In certain embodiments, the transmembrane compound comprises a compound of Formula Tm-59 having the following structure:

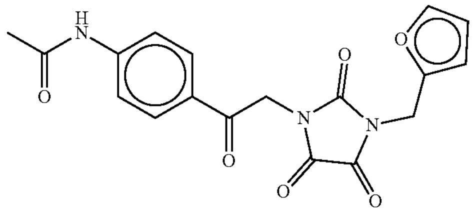

In certain embodiments, the transmembrane compound comprises a compound of Formula Tm-60 having the following structure:

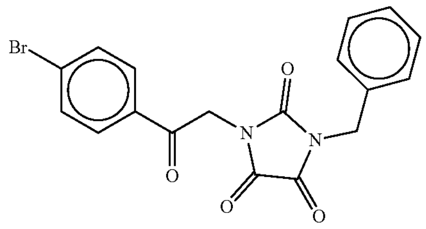

In certain embodiments, the transmembrane compound comprises a compound of Formula Tm-61 having the following structure:

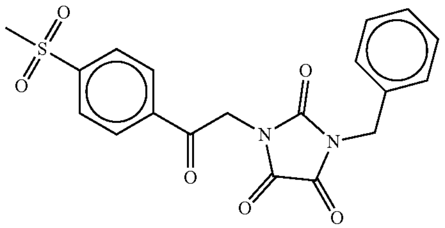

In certain embodiments, the transmembrane compound comprises a compound of Formula Tm-62 having the following structure:

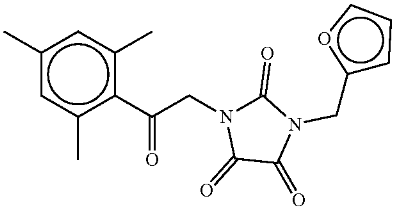

In certain embodiments, the transmembrane compound comprises a compound of Formula Tm-63 having the following structure:

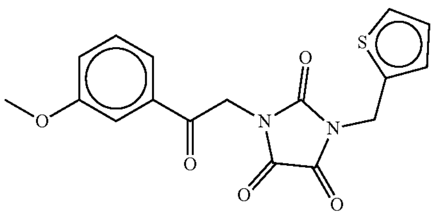

In certain embodiments, the transmembrane compound comprises a compound of Formula Tm-64 having the following structure:

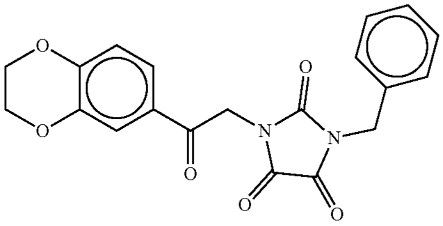

In certain embodiments, the transmembrane compound comprises a compound of Formula Tm-65 having the following structure:

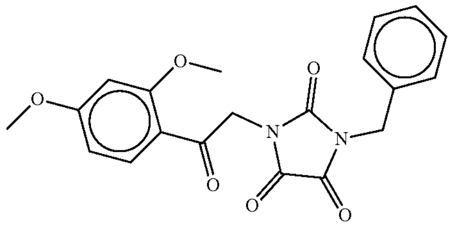

In certain embodiments, the transmembrane compound comprises a compound of Formula Tm-66 having the following structure:

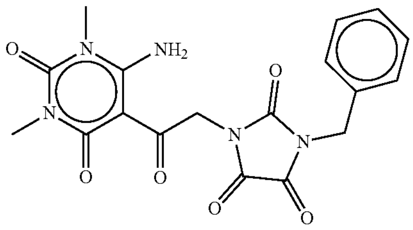

In certain embodiments, the transmembrane compound comprises a compound of Formula Tm-67 having the following structure:

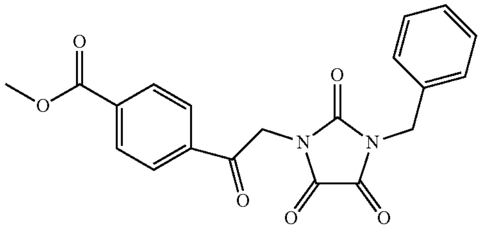 [SMILES: COC(=O)c1ccc(C(=O)CN2C(=O)C(=O)N(Cc3ccccc3)C2=O)cc1]

In certain embodiments, the transmembrane compound comprises a compound of Formula Tm-68 having the following structure:

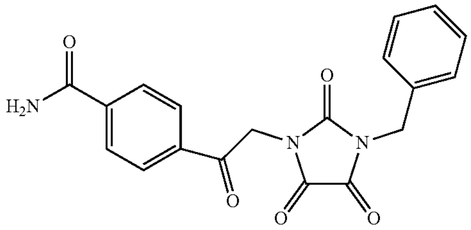 [SMILES: NC(=O)c1ccc(C(=O)CN2C(=O)C(=O)N(Cc3ccccc3)C2=O)cc1]

In certain embodiments, the transmembrane compound comprises a compound of Formula Tm-69 having the following structure:

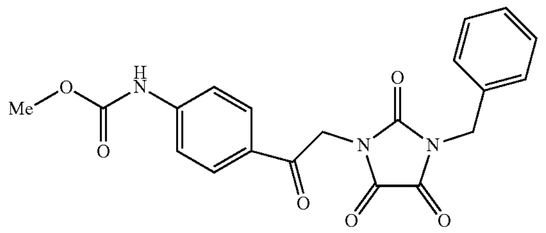 [SMILES: COC(=O)Nc1ccc(C(=O)CN2C(=O)C(=O)N(Cc3ccccc3)C2=O)cc1]

In certain embodiments, the transmembrane compound comprises a compound of Formula Tm-70 having the following structure:

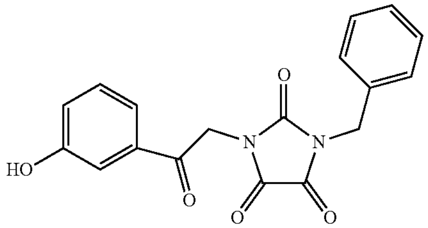 [SMILES: O=C(CN1C(=O)C(=O)N(Cc2ccccc2)C1=O)c1cccc(O)c1]

In certain embodiments, the transmembrane compound comprises a compound of Formula Tm-71 having the following structure:

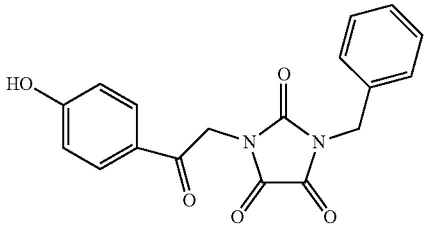 [SMILES: O=C(CN1C(=O)C(=O)N(Cc2ccccc2)C1=O)c1ccc(O)cc1]

In certain embodiments, the transmembrane compound comprises a compound of Formula Tm-72 having the following structure:

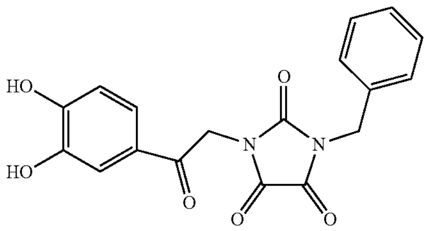 [SMILES: O=C(CN1C(=O)C(=O)N(Cc2ccccc2)C1=O)c1ccc(O)c(O)c1]

In certain embodiments, the transmembrane compound comprises a compound of Formula Tm-73 having the following structure:

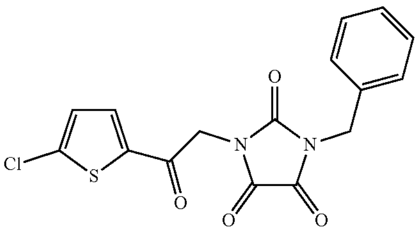 [SMILES: O=C(CN1C(=O)C(=O)N(Cc2ccccc2)C1=O)c1ccc(Cl)s1]

In certain embodiments, the transmembrane compound comprises a compound of Formula Tm-74 having the following structure:

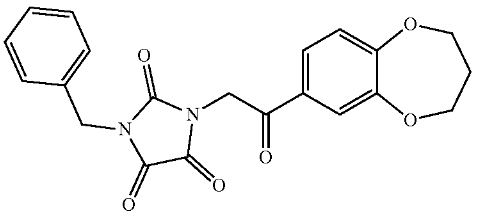 [SMILES: O=C(CN1C(=O)C(=O)N(Cc2ccccc2)C1=O)c1ccc2c(c1)OCCCO2]

3.4 Imidazopyridinone Derivatives

In certain embodiments, the transmembrane compound comprises a compound of Formula Tm-19 having the following structure:

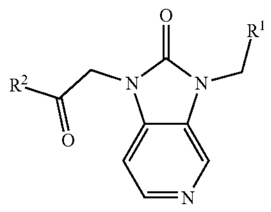

wherein $R^1$ or $R^2$ are selected independently from the group consisting of a substituted or unsubstituted alkyl, substituted or unsubstituted alkenyl, substituted or unsubstituted alkynyl, substituted or unsubstituted cycloalkyl, substituted or unsubstituted aryl, substituted or unsubstituted cycloalkalkyl, substituted or unsubstituted arylalkyl, substituted or unsubstituted heteroarylalkyl, substituted or unsubstituted heteroaryl, substituted or unsubstituted heterocyclic, substituted or unsubstituted alkoxy, substituted or unsubstituted aryloxy, hydroxyl, hydrogen, substituted or unsubstituted ethereal, substituted or unsubstituted benzothiazolyl, substituted or unsubstituted pyridyl, substituted or unsubstituted naphthyl, substituted or unsubstituted thienyl, substituted or unsubstituted benzothienyl, substituted or unsubstituted indolyl, substituted or unsubstituted isoquinolyl, substituted or unsubstituted quinolyl, substituted or unsubstituted indenyl, or substituted or unsubstituted indanyl.

In certain embodiments, $R^1$ or $R^2$ can comprise the following structure:

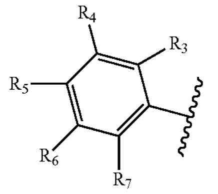

wherein $R^3$, $R^4$, $R^5$, $R^6$ and $R^7$ are selected independently from the group consisting of hydrogen, halogen, cyano, azido, hydroxyl, substituted or unsubstituted sulfonyl, substituted or unsubstituted sulfonamido, substituted or unsubstituted alkyl, substituted or unsubstituted alkenyl, substituted or unsubstituted cycloalkyl, substituted or unsubstituted aryl, substituted or unsubstituted cycloalkalkyl, substituted or unsubstituted arylalkyl, substituted or unsubstituted heteroarylalkyl, substituted or unsubstituted heteroaryl, substituted or unsubstituted amido, substituted or unsubstituted heterocyclic, substituted or unsubstituted alkoxy, substituted or unsubstituted aryloxy, substituted or unsubstituted ethereal, substituted or unsubstituted carboxy, substituted or unsubstituted acyl, substituted or unsubstituted benzothiazolyl, substituted or unsubstituted pyridyl, substituted or unsubstituted naphthyl, substituted or unsubstituted thienyl, substituted or unsubstituted benzothienyl, substituted or unsubstituted indolyl, substituted or unsubstituted isoquinolyl, substituted or unsubstituted quinolyl, or substituted or unsubstituted heteroarenyl, or substituted or unsubstituted indene, or substituted or unsubstituted indanyl. In certain embodiments, two or more of $R^3$, $R^4$, $R^5$, $R^6$ and $R^7$ may be taken together to form a ring, which can be heterocyclic (i.e., contain one or more heteroatoms) or which can be entirely carbocyclic and which can independently be saturated or unsaturated.

The substituents in the substituted groups described herein, for example, "substituted ethereal", "substituted carboxy", "substituted acyl", "substituted sulfonyl", "substituted alkyl", "substituted alkenyl", "substituted cycloalkyl", "substituted cycloalkalkyl", "substituted arylalkyl", "substituted aryl", "substituted heterocyclic", "substituted heteroarylalkyl," "substituted heteroaryl", "substituted naphthyl", "substituted phenyl", "substituted thienyl", "substituted benzothienyl", "substituted pyridyl", "substituted indolyl", "substituted isoquinolyl", "substituted quinolyl", "substituted benzothiazolyl", "substituted heteroaryl," "substituted indenyl" or "substituted indanyl" may be the same or different with one or more selected from the groups described in the present application and hydrogen, halogen, amido, acetyl, nitro ($—NO_2$), hydroxyl (—OH), oxo (═O), thio (═S), sulfonyl, sulfonamido, sulfate, thio, cyano, azido, trifluoromethyl ($—CF_3$), methoxy ($—OCH_3$), tert-butyl carbamate (-Boc) or optionally substituted groups selected from alkyl, cycloalkyl, alkenyl, alkynyl, alkoxy, aryl, aryloxy, arylalkyl, ethereal, carboxy, hydroxyl, heteroaryl, sulfonyl, and heterocyclic. A "substituted" functionality may have one or more than one substituent.

In one non-limiting embodiment, $R^1$ and $R^2$ are unsubstituted phenyl groups.

In one non-limiting embodiment, $R^1$ is an unsubstituted phenyl group and $R^2$ is a substituted phenyl group.

In certain embodiments, the transmembrane compound comprises a compound of Formula Tm-12 having the following structure:

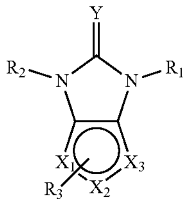

wherein Y is selected from the group consisting of O, S and $N(R_4)$;

wherein $X_{1-3}$ are selected independently from the group consisting of C, O, N and S;

wherein $R_3$ is a substituted or unsubstituted aromatic substituent, wherein the substituent is, for example, H, $OR_4$, $S(O)_nR_4$, $N(R_4)(R_5)$, CN, COOH, COOR, $C(O)N(R_4)(R_5)$, $SO_2N(R_4)(R_5)$, halogen (e.g., Cl, Br, F, I), branched or unbranched substituted or unsubstituted lower alkyl ($C_1$-$C_8$), aryl, biaryl, $P(O)(OH)_2$, NHOH, $B(OH)_2$, $C(═NH)NH_2$, $NHC(═NH)NH_2$, $NO_2$, $CF_3$, $—OCH_2O—$ (i.e., methylenedioxy), branched or unbranched substituted or unsubstituted lower alkyne (C2-C6), branched or unbranched substituted or unsubstituted lower alkene (C2-C6), $(CH2)_n$aryl;

wherein R4 and R5 are independently H, branched or unbranched substituted or unsubstituted lower alkyl (C1-C8), branched or unbranched substituted or unsubstituted lower alkyne (C2-C6), branched or unbranched substituted or unsubstituted lower alkene (C2-C6), aryl, $(CH2)_n$aryl;

wherein n is 0-4; and wherein $R_1$ and $R_2$ are as described for Formula Tm-19.

In certain embodiments, the transmembrane compound comprises a compound of Formula Tm-13 having the following structure:

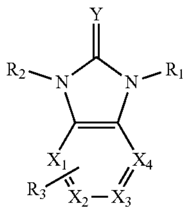

wherein Y is selected from the group consisting of O, S and $N(R_4)$;

wherein $X_{1-4}$ are selected independently from the group consisting of C, O, N and S;

wherein $R_3$ is a substituted or unsubstituted aromatic substituent, wherein the substituent is, for example, H, $OR_4$, $S(O)_nR_4$, $N(R_4)(R_5)$, CN, COOH, COOR, $C(O)N(R_4)(R_5)$, $SO_2N(R_4)(R_5)$, halogen (e.g., Cl, Br, F, I), H, branched or unbranched substituted or unsubstituted lower alkyl (C1-C8), aryl, biaryl, $P(O)(OH)_2$, NHOH, $B(OH)_2$, $C(═NH)NH_2$, $NHC(═NH)NH_2$, $NO_2$, $CF_3$, $—OCH_2O—$ (i.e., methylenedioxy), branched or unbranched substituted or unsubstituted lower alkyne (C2-C6), branched or unbranched substituted or unsubstituted lower alkene (C2-C6), $(CH2)_n$aryl;

wherein R4 and R5 are independently H, branched or unbranched substituted or unsubstituted lower alkyl (C1-C8), branched or unbranched substituted or unsubstituted lower alkyne (C2-C6), branched or unbranched substituted or unsubstituted lower alkene (C2-C6), aryl, $(CH2)_n$aryl;

wherein n is 0-4; and wherein $R_1$ and $R_2$ are as described for Formula Tm-19.

In certain embodiments, the transmembrane compound comprises a compound of Formula Tm-14 having the following structure:

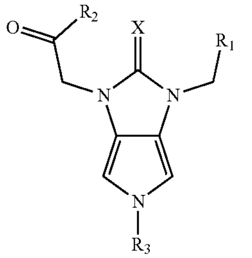

wherein X is selected from the group consisting of C, O, N and S; and wherein $R_{1-3}$ are as described for Formulas Tm-19, Tm-12 and Tm-13.

In certain embodiments, the transmembrane compound comprises a compound of Formula Tm-15 having the following structure:

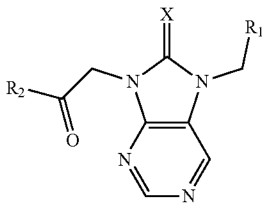

wherein $R_{1-2}$ are as described for Formulas Tm-19, Tm-12 and Tm-13.

In certain embodiments, the transmembrane compound comprises a compound of Formula Tm-16 having the following structure:

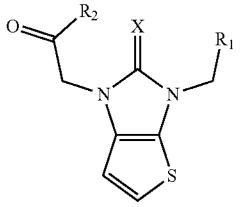

wherein X is selected from the group consisting of C, O, N and S; and wherein $R_{1-2}$ are as described for Formulas Tm-19, Tm-12 and Tm-13.

In certain embodiments, the transmembrane compound comprises a compound of Formula Tm-17 having the following structure:

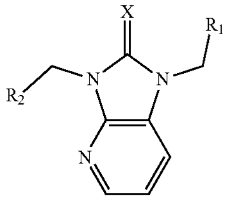

wherein $R_{1-2}$ are as described for Formulas Tm-19, Tm-12 and Tm-13.

In certain embodiments, the transmembrane compound comprises a compound of Formula Tm-18 having the following structure:

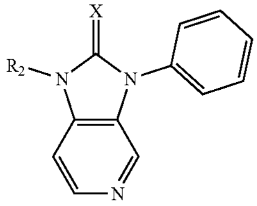

wherein $R_2$ is as described for Formulas Tm-19, Tm-12 and Tm-13.

In certain embodiments, the transmembrane compound comprises a compound of Formula Tm-75 having the following structure:

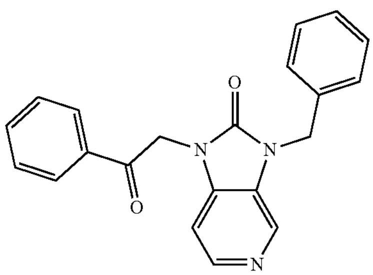 [SMILES: O=C(Cn1c(=O)n(Cc2ccccc2)c2cnccc21)c1ccccc1]

3.5 Pyrimidine-2,4,6-Trione Derivatives

In certain embodiments, the transmembrane compound comprises a compound of Formula Tm-8 having the following structure:

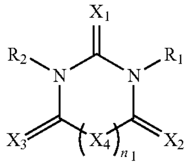

wherein $X_1$ is selected from the group consisting of O, $N(R_{12})$ and S;

wherein $X_2$ and $X_3$ are selected independently from the group consisting of O and S;

wherein $X_4$ is selected from the group consisting of NH, $N(R_7)$, and $C(R_8, R_9)$;

wherein $n_1$ is 0-1, and when $n_1$ is 0 then a chemical bond is between the two carbons bearing $X_2$ and $X_3$;

wherein $R_7$, $R_8$, and $R_9$ are selected independently from the group consisting of H, substituted or unsubstituted branched or unbranched lower alkyl ($C_1$-$C_{20}$), aryl, heteroaryl, cyclo-alkyl (C3-C7), and substituted, unsubstituted, branched, or unbranched $C(CH2)_{n2}$aryl, substitution on alkyl and aryl groups include functionality for those skilled in the art such as OH, $NH_2$, Halogen, SH, nitro, aryl, alkene, COOH, COOR, $C(O)N(R_4)(R_5)$, $SO_2N(R_4)(R_5)$, $NO_2$, $P(O)(OH)_2$, NHOH, $B(OH)_2$, $C(=NH)NH_2$, $NHC(=NH)NH_2$, $NO_2$, and CF3;

wherein R4 and R5 are independently H, branched or unbranched substituted or unsubstituted lower alkyl (C1-C8), branched or unbranched substituted or unsubstituted lower alkyne (C2-C6), branched or unbranched substituted or unsubstituted lower alkene (C2-C6), aryl, $(CH2)_n$aryl;

wherein $n_2$ is 0-10;

wherein $R_{12}$ is selected from the group consisting of H, branched or unbranched lower alkyl (C1-C4); and wherein $R_1$ and $R_2$ are selected independently from the group consisting of a substituted or unsubstituted alkyl, substituted or unsubstituted alkenyl, substituted or unsubstituted alkynyl, substituted or unsubstituted cycloalkyl, substituted or unsubstituted aryl, substituted or unsubstituted cycloalkalkyl, substituted or unsubstituted arylalkyl, substituted or unsubstituted heteroarylalkyl, substituted or unsubstituted heteroaryl, substituted or unsubstituted heterocyclic, substituted or unsubstituted alkoxy, substituted or unsubstituted aryloxy, hydroxyl, hydrogen, substituted or unsubstituted ethereal, substituted or unsubstituted benzothiazolyl, substituted or unsubstituted pyridyl, substituted or unsubstituted naphthyl, substituted or unsubstituted thienyl, substituted or unsubstituted benzothienyl, substituted or unsubstituted indolyl, substituted or unsubstituted isoquinolyl, substituted or unsubstituted quinolyl, substituted or unsubstituted indenyl, or substituted or unsubstituted indanyl.

In certain embodiments, $R_1$ and/or $R_2$ can comprise the following structure:

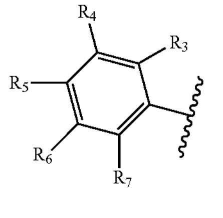

wherein $R^3$, $R^4$, $R^5$, $R^6$ and $R^7$ are selected independently from the group consisting of hydrogen, halogen, cyano, azido, hydroxyl, substituted or unsubstituted sulfonyl, substituted or unsubstituted sulfonamido, substituted or unsubstituted alkyl, substituted or unsubstituted alkenyl, substituted or unsubstituted cycloalkyl, substituted or unsubstituted aryl, substituted or unsubstituted cycloalkalkyl, substituted or unsubstituted arylalkyl, substituted or unsubstituted heteroarylalkyl, substituted or unsubstituted heteroaryl, substituted or unsubstituted amido, substituted or unsubstituted heterocyclic, substituted or unsubstituted alkoxy, substituted or unsubstituted aryloxy, substituted or unsubstituted ethereal, substituted or unsubstituted carboxy, substituted or unsubstituted acyl, substituted or unsubstituted benzothiazolyl, substituted or unsubstituted pyridyl, substituted or unsubstituted naphthyl, substituted or unsubstituted thienyl, substituted or unsubstituted benzothienyl, substituted or unsubstituted indolyl, substituted or unsubstituted isoquinolyl, substituted or unsubstituted quinolyl, or substituted or unsubstituted heteroarenyl, or substituted or unsubstituted indene, or substituted or unsubstituted indanyl. In certain embodiments, two or more of $R^3$, $R^4$, $R^5$, $R^6$ and $R^7$ may be taken together to form a ring, which can be heterocyclic (i.e., contain one or more heteroatoms) or which can be entirely carbocyclic and which can independently be saturated or unsaturated.

In one non-limiting embodiment, $R_1$ and $R_2$ are unsubstituted phenyl groups.

In one non-limiting embodiment, $R_1$ is an unsubstituted phenyl group and $R_2$ is a substituted phenyl group.

In one non-limiting embodiment, $R_1$ and $R_2$ are as defined above for Formulas Tm-6, Tm-19, Tm-12 and Tm-13, and may also be $(CH_2)_nC(=X_1)R_1$, $(CH_2)_nC(=X_1)R_2$, wherein $X_1$ is O or S, and n is 0-4.

In certain embodiments, the transmembrane compound comprises a compound of Formula Tm-76 having the following structure:

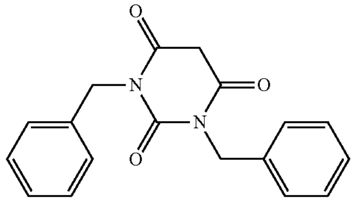 [SMILES: O=C1CC(=O)N(Cc2ccccc2)C(=O)N1Cc1ccccc1]

3.6 Additional Transmembrane Compounds

In certain embodiments, the transmembrane compound comprises a compound of Formula Tm-77 having the following structure:

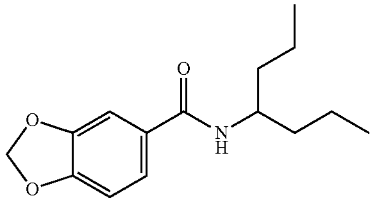 [SMILES: CCCC(CCC)NC(=O)c1ccc2c(c1)OCO2]

In certain embodiments, the transmembrane compound comprises a compound of Formula Tm-78 having the following structure:

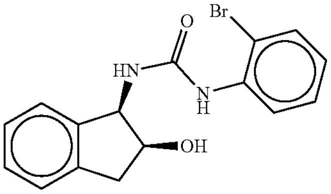

In certain embodiments, the transmembrane compound comprises a compound of Formula Tm-79 having the following structure:

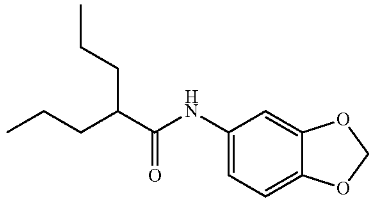 [SMILES: CCCC(CCC)C(=O)Nc1ccc2c(c1)OCO2]

In certain embodiments, the transmembrane compound comprises a compound of Formula Tm-80 having the following structure:

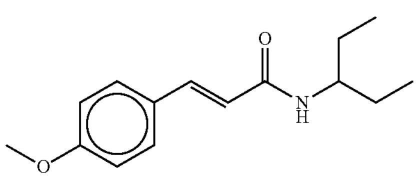

In certain embodiments, the transmembrane compound comprises a compound of Formula Tm-81 having the following structure:

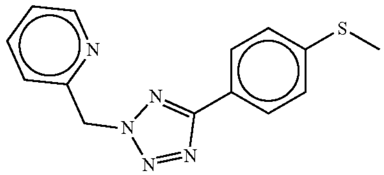

In certain embodiments, the transmembrane compound comprises a compound of Formula Tm-82 having the following structure:

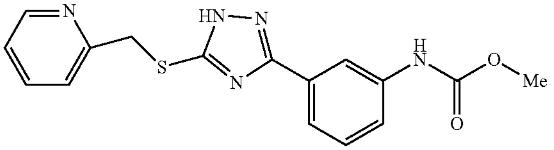 [SMILES: COC(=O)Nc1cccc(-c2n[nH]c(SCc3ccccn3)n2)c1]

In certain embodiments, the transmembrane compound comprises a compound of Formula Tm-83 having the following structure:

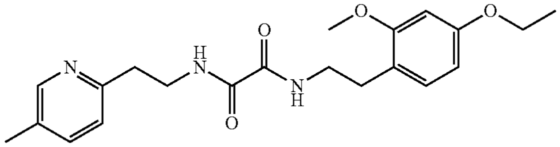 [SMILES: CCOc1ccc(CCNC(=O)C(=O)NCCc2ccc(C)cn2)c(OC)c1]

In certain embodiments, the transmembrane compound comprises a compound of Formula Tm-84 having the following structure:

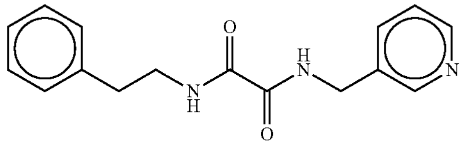

In certain embodiments, the transmembrane compound comprises a compound of Formula Tm-85 having the following structure:

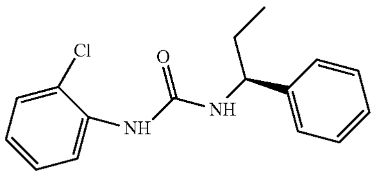 [SMILES: CC[C@H](NC(=O)Nc1ccccc1Cl)c1ccccc1]

In certain embodiments, the transmembrane compound comprises a compound of Formula Tm-86 having the following structure:

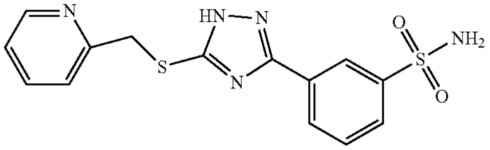 [SMILES: NS(=O)(=O)c1cccc(-c2n[nH]c(SCc3ccccn3)n2)c1]

In certain embodiments, the transmembrane compound comprises a compound of Formula Tm-87 having the following structure:

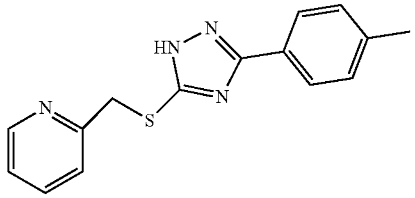 [SMILES: Cc1ccc(-c2n[nH]c(SCc3ccccn3)n2)cc1]

In certain embodiments, the transmembrane compound comprises a compound of Formula Tm-88 having the following structure:

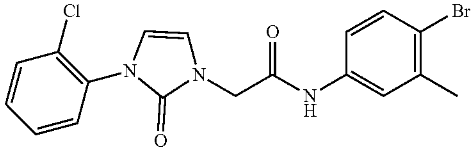 [SMILES: Cc1cc(NC(=O)Cn2ccn(-c3ccccc3Cl)c2=O)ccc1Br]

In certain embodiments, the transmembrane compound comprises a compound of Formula Tm-89 having the following structure:

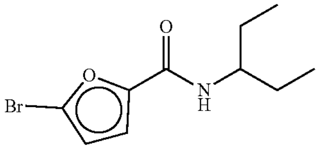

In certain embodiments, the transmembrane compound comprises a compound of Formula Tm-90 having the following structure:

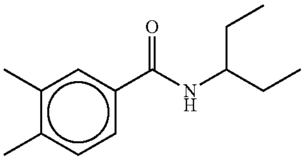

In certain embodiments, the transmembrane compound comprises a compound of Formula Tm-91 having the following structure:

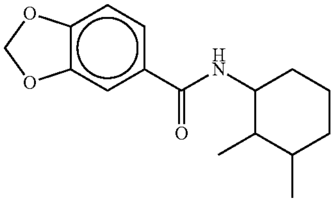

In certain embodiments, the transmembrane compound comprises a compound of Formula Tm-92 having the following structure:

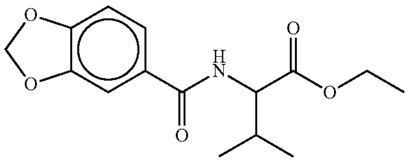

In certain embodiments, the transmembrane compound comprises a compound of Formula Tm-93 having the following structure:

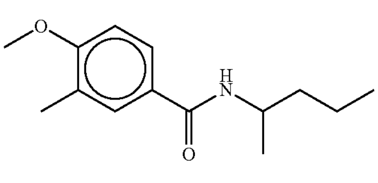

In certain embodiments, the transmembrane compound comprises a compound of Formula Tm-94 having the following structure:

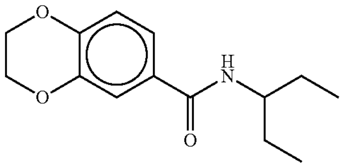

In certain embodiments, the transmembrane compound comprises a compound of Formula Tm-95 having the following structure:

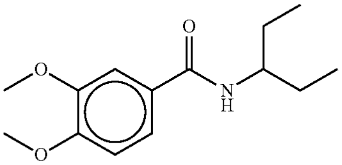

In certain embodiments, the transmembrane compound comprises a compound of Formula Tm-96 having the following structure:

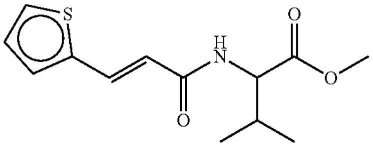

In certain embodiments, the transmembrane compound comprises a compound of Formula Tm-97 having the following structure:

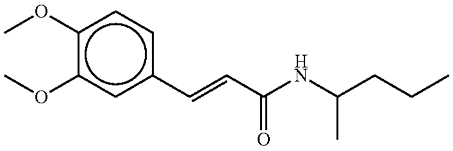

In certain embodiments, the transmembrane compound comprises a compound of Formula Tm-98 having the following structure:

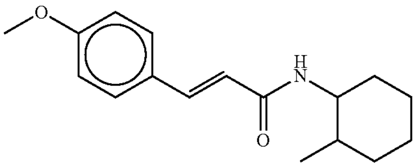

In certain embodiments, the transmembrane compound comprises a compound of Formula Tm-99 having the following structure:

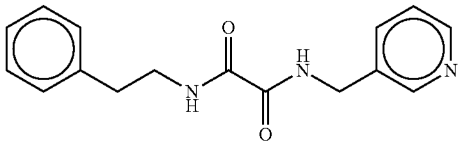

In certain embodiments, the transmembrane compound comprises a compound of Formula Tm-100 having the following structure:

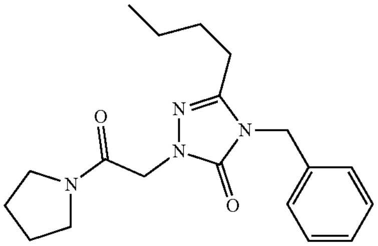 [SMILES: CCCCc1nn(CC(=O)N2CCCC2)c(=O)n1Cc1ccccc1]

In certain embodiments, the transmembrane compound comprises a compound of Formula Tm-101 having the following structure:

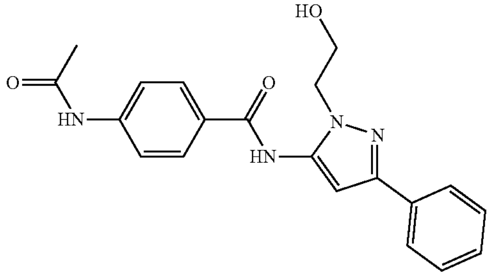 [SMILES: CC(=O)Nc1ccc(C(=O)Nc2cc(-c3ccccc3)nn2CCO)cc1]

In certain embodiments, the transmembrane compound comprises a compound of Formula Tm-102 having the following structure:

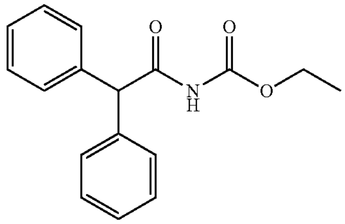 [SMILES: CCOC(=O)NC(=O)C(c1ccccc1)c1ccccc1]

In certain embodiments, the transmembrane compound comprises a compound of Formula Tm-103 having the following structure:

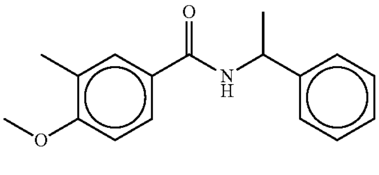

In certain embodiments, the transmembrane compound comprises a compound of Formula Tm-104 having the following structure:

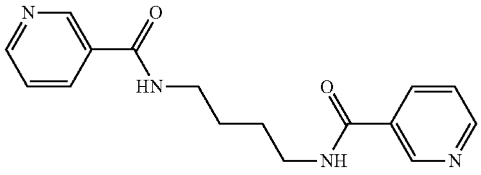 [SMILES: O=C(NCCCCNC(=O)c1cccnc1)c1cccnc1]

In certain embodiments of the present disclosure, the transmembrane compound comprises a compound described in Table 3 below.

TABLE 3

| Transmembrane compounds. Compound Name |
|---|
| 5-bromo-N-(pentan-3-yl)furan-2-carboxamide |
| 3,4-dimethyl-N-(pentan-3-yl)benzamide; N-(1-ethylpropyl)-3,4-dimethylbenzamide |
| 4-methoxy-3-methyl-N-(1-phenylethyl)benzamide |
| N-(2,3-dimethylcyclohexyl)benzo[d][1,3]dioxole-5-carboxamide |
| ethyl 2-(benzo[d][1,3]dioxole-5-carboxamido)-3-methylbutanoate; ethyl N-(1,3-benzodioxol-5 ylcarbonyl)valinate |
| 4-methoxy-3-methyl-N-(pentan-2-yl)benzamide |
| N-(pentan-3-yl)-2,3-dihydrobenzo[b][1,4]dioxine-6-carboxamide |
| 3,4-dimethoxy-N-(pentan-3-yl)benzamide |
| (E)-methyl 3-methyl-2-(3-(thiophen-2-yl)acrylamido)butanoate |
| (E)-3-(3,4-dimethoxyphenyl)-N-(pentan-2-yl)acrylamide; (2E)-3-(3,4-dimethoxyphenyl)-N-(pentan-2-yl)prop-2-enamide |
| (E)-3-(4-methoxyphenyl)-N-(2-methylcyclohexyl)acrylamide |
| N1-phenethyl-N2-(pyridin-3-ylmethyl)oxalamide; N-(2-phenylethyl)-N'-(pyridin-3-ylmethyl)ethanediamide |
| N-(heptan-4-yl)benzo[d][1,3]dioxole-5-carboxamide |
| 1-(2-bromophenyl)-3-((1R,2S)-2-hydroxy-2,3-dihydro-1H-inden-1-yl)urea |
| N-(benzo[d][1,3]dioxol-5-yl)-2-propylpentanamide |
| 1-benzyl-3-(2-oxo-2-phenylethyl)imidazolidine-2,4,5-trione |
| N-(2-amino-2-oxo-1-phenylethyl)-3-chloro-4,5-dimethoxybenzamide |
| (E)-3-(4-methoxyphenyl)-N-(pentan-3-yl)acrylamide |
| 2-((5-(4-(methylthio)phenyl)-2H-tetrazol-2-yl)methyl)pyridine |
| N-(heptan-4-yl)benzo[d][1,3]dioxole-5-carboxamide |

3.7 Transmembrane Compound Salts

In certain embodiments, the transmembrane compounds of the present disclosure comprise a salt of the transmembrane compound, for example, but not limited to, an acetate salt, a TFA salt or a formate salt. In certain embodiments, the transmembrane compound salt comprises an anion (−) (for example, but not limited to, $Cl^-$, $F^-$, $Br^-$, $O^{2-}$, $CO_3^{2-}$, $HCO_3^-$, $OH^-$, $NO_3^-$, $PO_4^{3-}$, $SO_4^{2-}$, $CH_3COO^-$, $HCOO^-$, $C_2O_4^{2-}$ and $CN^-$) bonded via an ionic bond with a cation (+) (for example, but not limited to, $Al^{3+}$, $Ca^{2+}$, $Na^+$, $K^+$, $Cu^{2+}$, $H^+$, $Fe^{3+}$, $Mg^{2+}$, $Ag^+$, $NH_4^+$, $H_3O^+$, $Hg_2^{2+}$). In other embodiments, the transmembrane compound salt comprises a cation (+) bonded via an ionic bond with an anion (−).

In certain embodiments, the transmembrane compound can be a salt, stereoisomer or a comestible form of a transmembrane compound described herein, for example, compounds of Formulas Tm-1 to Tm-104.

3.8 T1R1 Transmembrane Compound Binding Site

The present application provides for compositions that modulate the activity of an umami receptor, for example, a T1R1/T1R3 receptor, wherein the compositions interact with one or more amino acids in a transmembrane domain of the umami receptor, for example, a seven transmembrane domain (7TM) in T1R1. In certain embodiments, the amino acids that the compositions interact with comprise 1, 2, 3, 4, 5, 6, 7, 8, 9, 10, 11, 12, 13, 14, 15 or more of Ala795, Ala796, Asn792, Trp773, Phe776, Ala731, Phe728, Leu730, Phe732, Asn735, Ala689, Ser686, Gln690, Ile693, Cys694, Leu695, Arg634, Gln635, Phe642, Ala639, Ala643, and Leu638.

In a specific non-limiting embodiment, the amino acids that the compositions interact with comprise Asn735 and/or Ser686.

In other non-limiting embodiments, the amino acids that the compositions interact with comprise 1, 2, 3, 4, 5, 6, 7 or more of Trp773, Phe776, Phe732, Phe728, Leu730, Leu695, Leu638, and Phe642.

In yet other non-limiting embodiments, the amino acids that the compositions interact with comprise 1, 2, 3, 4, or more of Trp773, Phe776, Phe732, Phe728, and Phe642. In a non-limiting example, the amino acids that interact with the composition undergo ring stacking interactions to the bound composition.

In certain embodiments, the composition interacts with the umami 7TM domain according to any combination of interactions described herein, for example, one, two, three or more of the interactions. The interactions between the composition and the 7TM may further include additional hydrophobic interactions that add to the interaction energy of the composition to the 7TM.

In certain embodiments, the interaction between a composition and the one or more T1R1 7TM domain amino acids comprises one or more hydrogen bond, covalent bond, non-covalent bond, salt bridge, physical interaction, and combinations thereof. The interactions can also be any interaction characteristic of a ligand receptor interaction known in the art. Such interactions can be determined by, for example, site directed mutagenesis, x-ray crystallography, x-ray or other spectroscopic methods, Nuclear Magnetic Resonance (NMR), cross-linking assessment, mass spectroscopy or electrophoresis, cryo-microscopy, displacement assays based on known agonists, structural determination and combinations thereof. In certain embodiments, the interactions are determined in silico, for example, by theoretical means such as docking a compound into the T1R1 7TM domain using molecular docking, molecular modeling, molecular simulation, or other means known to persons of ordinary skill in the art.

The present application also provides for methods of identifying a compound that modulates the activity of an umami receptor, for example, a T1R1, wherein the compound is identified based on its ability to interact with one or more of the amino acids described herein that are present in the 7TM domain of T1R1.

In certain embodiments the method comprises contacting a test agent with a feline T1R1 umami receptor, detecting an interaction between the test agent and one more amino acids in a 7TM interacting site of the feline T1R1 umami receptor, and selecting as the compound, a test agent that interacts with one or more of the amino acids.

4. FLAVOR COMPOSITIONS

In certain embodiments, the flavor compositions of the present disclosure can be used to enhance the umami taste and/or increase the palatability of pet food products, such as cat food products. The flavor compositions can include combinations of compounds, and can be added to the pet food product in various delivery systems.

In certain embodiments, the present disclosure relates to methods for modulating the umami taste of a pet food product comprising: a) providing at least one pet food product, or a precursor thereof, and b) combining the pet food product, or precursor thereof, with at least a umami taste modulating amount of at least one flavor composition, for example, comprising one or more nucleotide derivatives and/or one or more transmembrane compound, or a comestibly acceptable salt thereof, so as to form an enhanced pet food product.

In certain embodiments, the flavor compositions of the present disclosure can enhance the umami taste and/or palatability of a pet food product, such as, for example, a pet food product including wet pet food products, dry pet food products, moist pet food products, pet beverage products and/or snack pet food products.

In certain embodiments, one or more of the flavor compositions of the present disclosure can be added to a pet food product, in an amount effective to modify, enhance or otherwise alter a taste or taste profile of the pet food product. The modification can include, for example, an increase or enhancement in the umami taste of the pet food product, as determined by animals, e.g., cats and/or dogs, or in the case of formulation testing, as determined by a panel of animal taste testers, e.g., cats and/or dogs, via procedures known in the art.

In certain embodiments of the present disclosure, a pet food product can be produced that contains a sufficient amount of at least one flavor composition described herein, for example, comprising a nucleotide derivative, e.g., a compound of Formula Nt-1, to produce a pet food product having the desired taste, e.g., umami.

In certain embodiments of the present disclosure, a pet food product can be produced that contains a sufficient amount of at least one flavor composition described herein, for example, comprising a transmembrane compound, e.g., a compound of Formula Tm-1 to Tm-19, to produce a pet food product having the desired taste, e.g., umami.

In certain embodiments of the present disclosure, a pet food product can be produced that contains a sufficient amount of a flavor composition comprising at least one, two, three, four, five, six or more nucleotide derivatives.

In certain embodiments of the present disclosure, a pet food product can be produced that contains a sufficient amount of a flavor composition comprising at least one, two, three, four, five, six or more transmembrane compounds.

In certain embodiments, a modulating amount of one or more of the flavor compositions of the present disclosure can be added to the pet food product, so that the pet food product has an increased palatability as compared to a pet food product prepared without the flavor composition, as determined by animals, e.g., cats and/or dogs, or in the case of formulation testing, as determined by a panel of animal taste testers, via procedures known in the art.

In certain embodiments of the present disclosure, the flavor composition is added to a pet food product in an amount effective to increase, enhance and/or modify the palatability of the pet food product.

The concentration of flavor composition admixed with a pet food product to modulate and/or improve the palatability and/or umami taste of the pet food product can vary depending on variables, such as, for example, the specific type of pet food product, what umami compounds are already present in the pet food product and the concentrations thereof, and the enhancer effect of the particular flavor composition on such umami compounds.

A broad range of concentrations of the flavor compositions can be employed to provide such umami taste and/or palatability modification. In certain embodiments of the present application, the flavor composition is admixed with a pet food product wherein the flavor composition is present in an amount of from about 0.001 ppm to about 1,000 ppm. For example, but not by way of limitation, the flavor composition can be present in the amount from about 0.001 ppm to about 750 ppm, from about 0.001 ppm to about 500 ppm, from about 0.001 ppm to about 250 ppm, from about 0.001 ppm to about 150 ppm, from about 0.001 ppm to about 100 ppm, from about 0.001 ppm to about 75 ppm, from about 0.001 ppm to about 50 ppm, from about 0.001 ppm to about 25 ppm, from about 0.001 ppm to about 15 ppm, from about 0.001 ppm to about 10 ppm, from about 0.001 ppm to about 5 ppm, from about 0.001 ppm to about 4 ppm, from about 0.001 ppm to about 3 ppm, from about 0.001 ppm to about 2 ppm, from about 0.001 ppm to about 1 ppm, from about 0.01 ppm to about 1,000 ppm, from about 0.1 ppm to 1,000 ppm, from about 1 ppm to 1,000 ppm, from about 2 ppm to about 1,000 ppm, from about 3 ppm to about 1,000 ppm, from about 4 ppm to about 1,000 ppm, from about 5 ppm to about 1,000 ppm, from about 10 ppm to about 1,000 ppm, from about 15 ppm to about 1,000 ppm, from about 25 ppm to about 1,000 ppm, from about 50 ppm to about 1,000 ppm, from about 75 ppm to about 1,000 ppm, from about 100 ppm to about 1,000 ppm, from about 150 ppm to about 1,000 ppm, from about 250 ppm to about 1,000 ppm, from about 250 ppm to about 1,000 ppm, from about 500 ppm to about 1,000 ppm or from about 750 ppm to about 1,000 ppm, and values in between.

In certain embodiments, the flavor composition is present in the pet food product at an amount greater than about 0.001 ppm, greater than about 0.01 ppm, greater than about 0.1 ppm, greater than about 1 ppm, greater than about 2 ppm, greater than about 3 ppm, greater than about 4 ppm, greater than about 5 ppm, greater than about 10 ppm, greater than about 25 ppm, greater than about 50 ppm, greater than about 75 ppm, greater than about 100 ppm, greater than about 250 ppm, greater than about 500 ppm, greater than about 750 ppm or greater than about 1000 ppm, and values in between.

In certain embodiments, a nucleotide derivative of the present disclosure is present in a food product in an amount that is sufficient to modulate, activate and/or enhance an umami receptor, e.g., a T1R1/T1R3 receptor. For example, but not by way of limitation, a nucleotide derivative can be present in a food product in an amount from about 1 pM to about 1 M, from about 1 nM to about 1 M, from about 1 μM to about 1 M, from about 1 mM to about 1 M, from about 10 mM to about 1 M, from about 100 mM to about 1 M, from about 250 mM to about 1 M, from about 500 mM to about 1 M, from about 750 mM to about 1 M, from about 0.001 μM to about 1 M, from about 0.001 μM to about 750 mM, from about 0.001 μM to about 500 mM, from about 0.001 μM to about 250 mM, from about 0.001 μM to about 100 mM, from about 0.001 μM to about 50 mM, from about 0.001 μM to about 25 mM, from about 0.001 μM to about 10 mM, from about 0.001 μM to about 1 mM, from about 0.001 μM to about 100 μM or from about 0.001 μM to about 10 μM, and values in between.

In certain embodiments, a transmembrane compound of the present disclosure is present in amount of a compound that is sufficient to modulate, activate or enhance an umami receptor, e.g., feline T1R1/T1R3 receptor. For example, but not by way of limitation, a transmembrane compound can be present in a food product in an amount from about 1 pM to about 10 M, from about 1 pM to about 1 M, from about 1 nM to about 1 M, from about 1 μM to about 1 M, from about 1 mM to about 1 M, from about 10 mM to about 1 M, from about 100 mM to about 1 M, from about 250 mM to about 1 M, from about 500 mM to about 1 M, from about 750 mM to about 1 M, from about 1 μM to about 1 M, from about 1 μM to about 750 mM, from about 1 μM to about 500 mM, from about 1 μM to about 250 mM, from about 1 μM to about 100 mM, from about 1 μM to about 50 mM, from about 1 μM to about 25 mM, from about 1 μM to about 10 mM, from about 1 μM to about 1 mM, from about 1 μM to about 100 μM or from about 1 μM to about 10 μM, and values in between.

In certain embodiments of the present application, the flavor composition is admixed with a food product wherein the flavor composition is present in an amount of from about 0.0001 to about 10% weight/weight (w/w) of the food product. For example, but not by way of limitation, the flavor composition can be present in the amount from about 0.0001% to about 10%, from about 0.0001% to about 1%, from about 0.0001% to about 0.1%, from about 0.0001 to about 0.01%, from about 0.0001% to about 0.001%, from about 0.001% to about 10%, from about 0.001% to about 1%, from about 0.01% to about 1% or from about 0.1% to about 1%, and values in between.

In certain embodiments, the nucleotide derivatives and/or transmembrane compounds of the present application are blended together in various ratios or are blended together with other compounds, e.g., nucleotides and/or amino acids and/or furanones, to form various flavor compositions. Non-limiting examples of nucleotides, amino acids and furanones are disclosed in Patent Application Nos. PCT/EP2013/072788, PCT/EP2013/072789, PCT/EP2013/072790, and PCT/EP2013/072794, which are incorporated herein by reference in their entireties. In certain embodiments, the nucleotide derivatives and/or transmembrane compounds that are blended with other compounds are one or more compounds of Formula Nt-1 to Nt-55 and/or one or more compounds of Formula Tm-1 to Tm-104.

In certain embodiments, the nucleotide derivatives that are blended with other compounds include nucleotide derivatives of Formulas Nt-1 to Nt-55 and Tables 2 and 6-14.

In certain embodiments, the transmembrane compounds that are blended with other compounds include transmembrane compounds of Formulas Tm-1 to Tm-104.

4.1 Nucleotides

In certain embodiments of the present disclosure, the flavor composition comprises at least one nucleotide derivative and/or at least one transmembrane compound, and at least one nucleotide as described herein.

In certain embodiments of the present disclosure, the flavor composition comprises at least two, three, four, five or more nucleotides as described herein. Non-limiting examples of nucleotides include guanosine monophosphate (GMP), guanosine diphosphate (GDP), guanosine triphosphate (GTP), adenosine monophosphate (AMP), adenosine diphosphate (ADP), adenosine triphosphate (ATP), cytidine monophosphate (CMP), cytidine diphosphate (CDP), cytidine triphosphate (CTP), inosine monophosphate (IMP), inosine diphosphate (IDP, inosine triphosphate (ITP), uridine monophosphate (UMP), uridine diphosphate (UDP), uridine triphosphate (UTP), thymidine monophosphate (TMP), thymidine diphosphate (TDP), thymidine triphosphate (TTP), and xanthosine monophosphate (XMP), xanthosine diphosphate (XDP), and xanthosine triphosphate (XTP), or any nucleotide derivative as described by Formula Nt-1.

In certain embodiments, the flavor composition can include a nucleotide present in a food product which can be present in an amount of from about 1 pM to about 1 M, from about 1 nM to about 1 M, from about 1 μM to about 1 M, from about 1 mM to about 1 M, from about 10 mM to about 1 M, from about 100 mM to about 1 M, from about 250 mM to about 1 M, from about 500 mM to about 1 M, from about 750 mM to about 1 M, from about 1 μM to about 1 M, from about 1 μM to about 750 mM, from about 1 μM to about 500 mM, from about 1 μM to about 250 mM, from about 1 μM to about 100 mM, from about 1 μM to about 50 mM, from about 1 μM to about 25 mM, from about 1 μM to about 10 mM, from about 1 μM to about 1 mM, from about 1 μM to about 100 μM or from about 1 μM to about 10 μM, and values in between.

In certain embodiments, the nucleotide can be present in an amount of greater than about 1 mM or greater than about 2.5 mM of the pet food product. In certain non-limiting embodiments, the nucleotide and/or nucleotide derivative can be present in an amount of less than about 100 mM, less than about 50 mM, less than about 20 mM or less than about 10 mM of the pet food product. In a certain, non-limiting embodiments, the nucleotide is present in an amount of about 5 mM of the pet food product.

In certain embodiments, the flavor composition comprises at least one transmembrane compound and at least one nucleotide and/or nucleotide derivative, which can be IMP, GMP or a mixture thereof. In certain embodiments, the at least one nucleotide can be a combination of GMP and IMP comprising about 1% to about 99% of GMP and from about 1% to about 99% of IMP, or from about 20% to about 80% of GMP and from about 20% to about 80% of IMP, or about 50% GMP and about 50% IMP, or about 10% GMP and about 90% IMP, or about 20% GMP and about 80% IMP, or about 30% GMP and about 70% IMP, or about 40% GMP and about 60% IMP, or about 60% GMP and about 40% IMP, or about 70% GMP and about 30% IMP, or about 80% GMP and about 20% IMP or about 10% GMP and about 90% IMP.

In certain embodiments of the present disclosure, the flavor composition further comprises at least one amino acid as described herein.

4.2 Amino Acids

In certain embodiments of the present disclosure, the flavor composition comprises at least one nucleotide derivative and/or at least one transmembrane compound, and at least one amino acid as described herein. In certain embodiments, the flavor composition comprises at least two, three, four, five or more amino acids as described herein.

In certain embodiments, the flavor composition comprises at least one, two, three, four, five or more first amino acids and/or at least one, two, three, four, five or more second amino acids.

In certain embodiments of the present disclosure, the flavor composition comprises at least one first amino acid and at least one second amino acid.

In certain embodiments of the present disclosure, the flavor composition comprises at least two first amino acids and at least one second amino acid.

In certain embodiments of the present disclosure, the flavor composition comprises at least one first amino acid and at least two second amino acids.

In certain embodiments of the present disclosure, the flavor composition comprises at least two first amino acids and at least two second amino acids.

In certain embodiments of the present disclosure, the flavor composition further comprises at least one nucleotide as described herein.

Non-limiting examples of a first amino acid include tryptophan, phenylalanine, histidine, glycine, cysteine, alanine, tyrosine, serine, methionine, asparagine, leucine and combinations thereof.

Non-limiting examples of a second amino acid include asparagine, threonine, isoleucine, proline, glutamic acid, aspartic acid, hydroxyl proline, arginine, cystine, glutamine, lysine, valine, ornithine, taurine, monosodium glutamate (MSG) and combinations thereof.

In certain embodiments, the at least one first amino acid and/or the second amino acid, alone or in combination, can be present in an amount of from about 1 mM to about 1 M, or from about 250 mM to about 1 M, or from about 5 mM to about 500 mM, or from about 10 mM to about 100 mM, or from about 15 mM to about 50 mM, or from about 20 mM to about 40 mM of the pet food product. In certain embodiments, the amino acid(s) can be present at an amount less than about 1 M, less than about 200 mM, less than about 100 mM, less than about 50 mM, less than about 20 mM or less than about 10 mM of the pet food product. In certain embodiments, the first amino acid and/or the second amino acid, alone or in combination, can be present in an amount of about 25 mM of the pet food product.

4.2.1 T1R1 Amino Acid Binding Site

The amino acids of the compositions described herein that modulate an umami receptor, for example, a T1R1/T1R3 receptor, can interact with one or more amino acids in a Venus Flytrap domain of the umami receptor. In certain embodiments, the Venus Flytrap domain (VFT) is present in T1R1. In certain embodiments, the VFT amino acids that the composition interacts with comprises one or more of Thr149, Tyr220, Thr148, Thr449, Ser172, Glu170, Glu301, His71, His47, Arg277, His308, Asn69, Asn302, Ser306, Ser384, Asp302, Ser306, and Ala380.

In one non-limiting embodiment, the composition comprises an amino acid, wherein the amino acid interacts with one, two, three, four, five, six or more of Ser172, Thr149, Thr148, Glu301, Tyr220, Glu170 and Asp302 of T1R1.

In other non-limiting embodiments, the composition interacts with one, two, three, four, five or more of Thr149, Ser172, Tyr220, Thr148, Glu170, and/or Asp302, wherein the interactions can comprise, for example, hydrogen bonds, salt-bridges, and/or Pi-cation interactions.

In a non-limiting example, the composition interacts with Glu170 and/or Asp302 of the VFT domain, wherein the composition does not include L-Glutamate or L-Aspartic Acid. In one embodiment, Glu170 and Asp302 help coordinate the zwitterionic nitrogen of the amino acid ligand of the composition that fits the active site of T1R1, while simultaneously establishing an electrostatic environment that is inhospitable to binding L-Glutamate and L-Aspartic Acid.

In certain embodiments, the composition interacts with the VFT according to any combination of interactions described herein, for example, one, two, three or more of the interactions. The interactions between amino acid and the VFT may further include additional hydrophobic interactions that add to the interaction energy of the amino acid to the VFT.

In certain embodiments, the interaction between the composition and the one or more VFT amino acids comprises one or more hydrogen bond, covalent bond, non-covalent bond, salt bridge, physical interaction, and combinations thereof. The interactions can also be any interaction characteristic of a ligand receptor interaction known in the art. Such interactions can be determined by, for example, site directed mutagenesis, x-ray crystallography, x-ray or other spectroscopic methods, Nuclear Magnetic Resonance (NMR), cross-linking assessment, mass spectroscopy or electrophoresis, displacement assays based on known agonists, structural determination and combinations thereof. In certain embodiments, the interactions are determined in silico, for example, by theoretical means such as docking a compound into the VFT domain using molecular docking, molecular modeling, molecular simulation, or other means known to persons of ordinary skill in the art.

The present application also provides for methods of identifying a compound that modulates the activity of an umami receptor, for example, a T1R1, wherein the compound is identified based on its ability to interact with one or more of the amino acids described herein that are present in the VFT domain of T1R1.

In certain embodiments the method comprises contacting a test agent with a feline T1R1 umami receptor, detecting an interaction between the test agent and one more amino acids in a VFT interacting site of the feline T1R1 umami receptor, and selecting as the compound, a test agent that interacts with one or more of the amino acids.

5. DELIVERY SYSTEMS

In certain embodiments, the flavor compositions of the present application can be incorporated into a delivery system for use in pet food products. Delivery systems can be liquid or solid, aqueous or non-aqueous. Delivery systems are generally adapted to suit the needs of the flavor composition and/or the pet food product into which the flavor composition will be incorporated.

The flavoring compositions can be employed in liquid form, dried form and/or solid form. When used in dried form, suitable drying means such as spray drying can be used. Alternatively, a flavoring composition can be encapsulated or absorbed onto water soluble materials, including but not limited to materials such as cellulose, starch, sugar, maltodextrin, gum arabic and so forth. The actual techniques for preparing such dried forms are well-known in the art, and can be applied to the presently disclosed subject matter.

The flavor compositions of the presently disclosed subject matter can be used in many distinct physical forms well known in the art to provide an initial burst of taste, flavor and/or texture; and/or a prolonged sensation of taste, flavor and/or texture. Without being limited thereto, such physical forms include free forms, such as spray dried, powdered, and beaded forms, and encapsulated forms, and mixtures thereof.

In certain embodiments, the nucleotide derivatives and/or transmembrane compounds of a flavor composition can be generated during processing of the pet food. For example, and not by way of limitation, the nucleotide derivatives and/or transmembrane compounds can be generated from precursor compounds during thermal processing, e.g., retorting, extrusion and/or sterilization, of the pet food.

In certain embodiments, as noted above, encapsulation techniques can be used to modify the flavor systems. In certain embodiments, flavor compounds, flavor components or the entire flavor composition can be fully or partially encapsulated. Encapsulating materials and/or techniques can be selected to determine the type of modification of the flavor system.

In certain embodiments, the encapsulating materials and/or techniques are selected to improve the stability of the flavor compounds, flavor components or flavor compositions; while in other embodiments the encapsulating materials and/or techniques are selected to modify the release profile of the flavor compositions.

Suitable encapsulating materials can include, but are not limited to, hydrocolloids such as alginates, pectins, agars, guar gums, celluloses, and the like, proteins, polyvinyl acetate, polyethylene, crosslinked polyvinyl pyrrolidone, polymethylmethacrylate, polylactidacid, polyhydroxyalkanoates, ethylcellulose, polyvinyl acetatephthalate, polyethylene glycol esters, methacrylicacid-co-methylmethacrylate, ethylene-vinylacetate (EVA) copolymer, and the like, and combinations thereof. Suitable encapsulating techniques can include, but are not limited to, spray coating, spray drying, spray chilling, absorption, adsorption, inclusion complexing (e.g., creating a flavor/cyclodextrin complex), coacervation, fluidized bed coating or other process can be used to encapsulate an ingredient with an encapsulating material.

Encapsulated delivery systems for flavoring agents or sweetening agents can contain a hydrophobic matrix of fat or wax surrounding a sweetening agent or flavoring agent core. The fats can be selected from any number of conventional materials such as fatty acids, glycerides or poly glycerol esters, sorbitol esters, and mixtures thereof. Examples of fatty acids include but are not limited to hydrogenated and partially hydrogenated vegetable oils such as palm oil, palm kernel oil, peanut oil, rapeseed oil, rice bran oil, soybean oil, cottonseed oil, sunflower oil, safflower oil and combinations thereof. Examples of glycerides include, but are not limited to, monoglycerides, diglycerides and triglycerides.

Waxes can be chosen from the group consisting of natural and synthetic waxes and mixtures thereof. Non-limiting examples include paraffin wax, petrolatum, carbowax, microcrystalline wax, beeswax, carnauba wax, candellila wax, lanolin, bayberry wax, sugarcane wax, spermaceti wax, rice bran wax, and mixtures thereof.

The fats and waxes can be use individually or in combination in amounts varying from about 10 to about 70%, and alternatively in amounts from about 30 to about 60%, by weight of the encapsulated system. When used in combination, the fat and wax can be present in a ratio from about 70:10 to 85:15, respectively.

Typical encapsulated flavor compositions, flavoring agent or sweetening agent delivery systems are disclosed in U.S. Pat. Nos. 4,597,970 and 4,722,845, the disclosures of which are incorporated herein by reference in their entireties.

Liquid delivery systems can include, but are not limited to, systems with a dispersion of the flavor compositions of the present application, such as in carbohydrate syrups and/or emulsions. Liquid delivery systems can also include extracts where the nucleotide derivative, transmembrane compound, and/or the flavor compositions are solubilized in a solvent. Solid delivery systems can be created by spray drying, spray coating, spray chilling, fluidized bed drying, absorption, adsorption, coacervation, complexation, or any other standard technique. In some embodiments, the delivery system can be selected to be compatible with or to function in the edible composition. In certain embodiments, the delivery system will include an oleaginous material such as a fat or oil. In certain embodiments, the delivery system will include a confectionery fat such as cocoa butter, a cocoa butter replacer, a cocoa butter substitute, or a cocoa butter equivalent.

When used in dried form, suitable drying means such as spray drying may be used. Alternatively, a flavoring composition may be adsorbed or absorbed onto substrates such as water soluble materials, such as cellulose, starch, sugar, maltodextrin, gum arabic and so forth may be encapsulated. The actual techniques for preparing such dried forms are well known in the art.

6. PET FOOD PRODUCTS

The flavor compositions of the present disclosed subject matter can be used in a wide variety of pet food products.

Non-limiting examples of suitable pet food products include wet food products, dry food products, moist food products, pet food supplements (e.g., vitamins), pet beverage products, snack and treats and pet food categories described herein.

The combination of the flavoring composition(s) of the presently disclosed subject matter together with a pet food product and optional ingredients, when desired, provides a flavoring agent that possesses unexpected taste and imparts, for example, an umami and/or savory sensory experience. The flavor compositions disclosed herein can be added prior to, during or after formulation processing or packaging of the pet food product, and the components of the flavor composition can be added sequentially or simultaneously. In certain embodiments, one or more of the components of the flavor compositions disclosed herein can be generated during the production of the pet food product from precursor compounds, e.g., during thermal food processing. For example, and not by way of limitation, a nucleotide derivative and/or transmembrane compound of a flavor composition can be generated during the production of a pet food product and additional components of the flavor composition can be added prior to, during or after formulation processing or packaging of the pet food product.

In certain embodiments, the pet food product is a nutritionally complete dry food product. A dry or low moisture-containing nutritionally-complete pet food product can comprise less than about 15% moisture, and include from about 10 to about 60% fat, from about 10% to about 70% protein and from about 30% to about 80% carbohydrates, e.g., dietary fiber and ash.

In certain embodiments, the pet food product is a nutritionally complete wet food product. A wet or high moisture-containing nutritionally-complete pet food product can comprise greater than about 50% moisture. In certain embodiments, the wet pet food product includes from about 40% fat, from about 50% protein and from about 10% carbohydrates, e.g., dietary fiber and ash.

In certain embodiments, the pet food product is a nutritionally complete moist food product. A moist, e.g., semi-moist or semi-dry or soft dry or soft moist or intermediate or medium moisture containing nutritionally-complete pet food product comprises from about 15 to about 50% moisture.

In certain embodiments, the pet food product is a pet food snack product. Non-limiting examples of pet food snack products include snack bars, pet chews, crunchy treats, cereal bars, snacks, biscuits and sweet products.

In certain embodiments, the protein source can be derived from a plant source, such as lupin protein, wheat protein, soy protein and combinations thereof.

Alternatively or additionally, the protein source can be derived from a variety of animal sources. Non-limiting examples of animal protein include beef, pork, poultry, lamb, or fish including, for example, muscle meat, meat byproduct, meat meal or fish meal.

7. METHODS OF MEASURING TASTE ATTRIBUTES

In certain embodiments of the present disclosure, the taste, flavor and/or palatability attributes of a pet food product can be modified by admixing a flavor composition with the food product, or generated under food preparation conditions, as described herein. In certain embodiments, the attribute(s) can be enhanced or reduced by increasing or decreasing the concentration of the flavor composition admixed or generated with the food product. In certain embodiments, the taste attributes of the modified food product can be evaluated as described herein, and the concentration of flavor composition admixed or generated with the food product can be increased or decreased based on the results of the evaluation.

In certain embodiments of the present disclosure, the taste and/or palatability attributes can be measured using an in vitro assay, wherein a compound's ability to activate a feline umami receptor expressed by cells in vitro at different concentrations is measured. In certain embodiments, an increase in the activation of the receptor correlates with an increase in the taste and/or palatability attributes of the compound.

In certain embodiments, the composition is measured alone or in combination with other compounds. In certain embodiments the in vitro assay comprises the in vitro assays described in the Examples section of the present application. In some embodiments, the in vitro assay comprises recombinant cells expressing an umami receptor encoded by nucleic acid introduced into the cells (e.g., an exogenous nucleic acid). In other non-limiting embodiments, the in vitro assay comprises cells expressing an umami receptor that is native to the cells. Examples of such cells expressing a native umami receptor include, for example but not limited to, cat and/or dog taste cells. In certain embodiments, the cat and/or dog taste cells expressing an umami receptor are isolated from a cat and/or dog and cultured in vitro.

In certain embodiments of the present disclosure, the taste and/or palatability attributes can be measured using a panelist of taste testers. For example, but not by way of limitation, the panel can contain feline panelists. In certain embodiments, the panel can include canine panelists. In certain embodiments, the palatability of a pet food product can be determined by the consumption of a pet food product containing a flavor composition alone (e.g., the one bowl test, monadic ranking). In certain embodiments, the palatability of a pet food product can be determined by the preferential consumption of a pet food product containing a flavor composition, disclosed herein, versus a pet food product that does not contain the flavor composition or another flavor composition (e.g., the two bowl test for testing preference, difference and/or choice).

In certain embodiments, the palatability and/or umami taste of a flavor composition can be determined by the preferential consumption of a water solution containing a flavor composition, disclosed herein, versus a water solution that does not contain the flavor composition or contains a different flavor composition (e.g., the two bottle test). For example, a solution panel can be used to compare the palatability of a range of concentrations of compounds in a monadic exposure. In certain embodiments, the solution can contain a palatability enhancer, for example, L-histidine, as an ingestive/positive tastant to increase baseline solution intake, therefore enabling the identification of a potential negative impact of the test compound.

The intake ratio for each pet food product or water solution can be determined by measuring the amount of one ration consumed divided by the total consumption. The consumption ratio (CR) can then be calculated to compare the consumption of one ration in terms of the other ration to determine the preferential consumption of one food product or water solution over the other. Alternatively or additionally, the difference in intake (g) can be used to assess the average difference in intake between the two solutions in a two bottle test or between two pet food products in a two bowl test at a selected significance level, for example, at the 5% significance level to determine an average difference in intake with a 95% confidence interval. However, any significance level may be used, for example, a 1, 2, 3, 4, 5, 10, 15, 20, 25, or 50% significance level. In certain embodiments, percentage preference scores, e.g., the percentage preference for one solution or food product by an animal is the percentage of the total liquid or food product ingested during the test that that solution or food product accounts for, can also be calculated.

8. METHODS OF GENERATION

In certain embodiments, the nucleotide derivatives and/or transmembrane compounds of the present disclosure can be generated using standard chemosynthesis processes. In certain embodiments, the chemosynthesis process provides a nucleotide derivative and/or transmembrane compound having a purity of at least 99.999%, or at least 99%, or at least 95%, or at least 90%, or at least 85 or at least 80%. In certain embodiments, the nucleotide derivatives and/or transmembrane compounds can be prepared using standard hydrolysis processes such as those employing acids, enzymes or a combination of acids and enzymes.

The nucleotide derivatives and/or transmembrane compounds of the present disclosure can also be generated under food preparation conditions, e.g., during the production of a pet food product. For example, but not by way of limitation, the nucleotide derivatives and/or transmembrane compounds of the present disclosure can be generated during a thermal food process, e.g., sterilization, retorting and/or extrusion, from precursor compounds present in the pet food. In certain embodiments, a liquid and/or a powder palatant can also be added to enhance the taste of a pet food, e.g., to a dry pet food product, and to increase the palatability of the pet food. The palatant can be a digest of meat (e.g., liver) and/or a digest of a vegetable, and can optionally include other palatants known in the art. In certain embodiments, the nucleotide derivative and/or transmembrane compound can be admixed with or generated in the liquid and/or powder palatant prior to its addition to the pet food product. Alternatively or additionally, the nucleotide derivative and/or transmembrane compound can be admixed with or generated in the liquid and/or powder palatant after its addition to the pet food product.

In certain embodiments, the flavor compositions of the present disclosure comprise one or more transmembrane compounds of Formulas Tm-1 to Tm-104. In certain embodiments, such compounds can, without limitation, be synthesized by any means known in the art. In certain embodiments, parabanic acid derivative transmembrane compound compounds can be synthesized according to the following synthesis scheme:

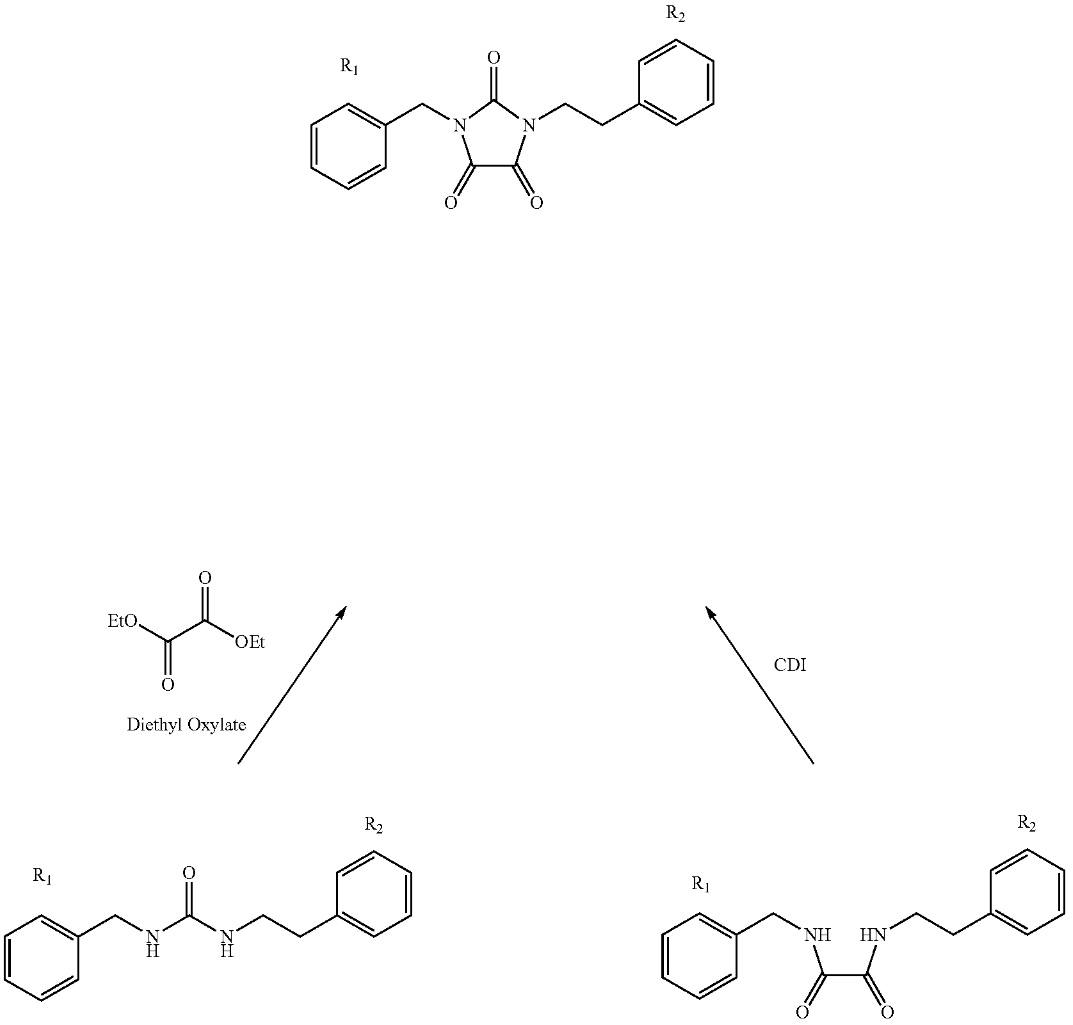

-continued

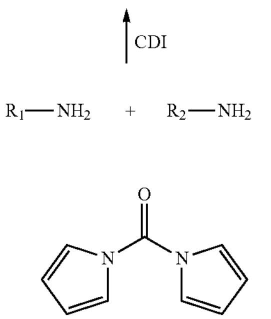

Carbonbonyldiimidazole (CDI)

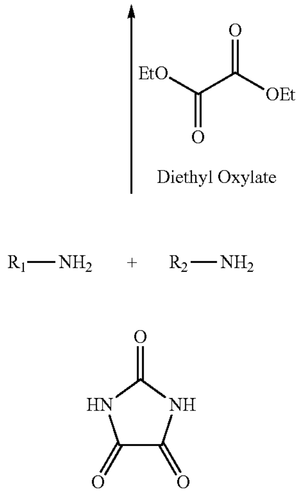

Parabonic Acid

9. NON-LIMITING EXAMPLES OF FLAVOR COMPOSITIONS OF THE PRESENT DISCLOSURE

As described herein, there are at least three different binding sites present on the feline T1R1/T1R3 receptor (i.e., umami receptor) that allows for binding of small molecules and/or compounds. One of the binding sites present on the feline T1R1/T1R3 receptor can bind nucleotide and/or nucleotide derivatives as described herein. A second binding site present on the feline T1R1/T1R3 receptor can bind first group amino acids as described herein, and a third binding site present on the feline T1R1/T1R3 receptor (i.e., the T1R1 7TM domain) can bind transmembrane compounds as described herein. Without being bound to any particular theory, the binding of a first group amino acid, as disclosed herein, can change the conformation of the feline T1R1/T1R3 receptor to allow greater contact with a bound nucleotide and/or nucleotide derivative, and result in synergistic activation of the umami receptor. The second group amino acids, disclosed herein, can interact with one or more other receptors and do not compete with first amino acids for binding to the umami receptor. The addition of a second group amino acid to a flavor composition can enhance the flavor perception of the composition. Binding of a transmembrane compound to the receptor, as described herein, further activates the receptor, thereby enhancing or modifying the palatability of a food product comprising such compounds.

In certain embodiments, the present disclosure provides for a flavor composition comprising at least one nucleotide and/or nucleotide derivative that binds to a first binding site on the umami receptor and/or at least one first group amino acid that binds to a second binding site on the umami receptor and/or at least one transmembrane compound that binds to a third binding site on the umami receptor (e.g. within the 7TM domain of an umami receptor) and/or at least one second group amino acid that binds to a distinct receptor.

The presently disclosed subject provides flavor compositions that comprise at least one, two, three, four, five or more nucleotide derivatives and/or at least one, two, three, four, five or more nucleotides and/or at least one, two, three, four, five or more transmembrane compounds and/or at least one, two, three, four, five or more first group amino acids and/or at least one, two, three, four, five or more second group amino acids.

In certain embodiments, the present disclosure provides for a flavor composition comprising at least one nucleotide derivative, and at least one, two, three, four, five or more first group amino acids and/or at least one, two, three, four, five or more second group amino acids selected from Table 4.

In certain embodiments, the present disclosure provides for a flavor composition comprising at least one nucleotide derivative and at least one first group amino acid selected from Table 4.

In certain embodiments, the present disclosure provides for a flavor composition comprising at least one nucleotide derivative and at least one second group amino acid selected from Table 4.

In certain embodiments, the present disclosure provides for a flavor composition comprising at least one nucleotide derivative, and at least one first group amino acid and at least one second group amino acid selected from Table 4.

In certain embodiments, the present disclosure provides for a flavor composition comprising at least one nucleotide derivative, and at least two first group amino acids and at least one second group amino acid selected from Table 4.

In certain embodiments, the present disclosure provides for a flavor composition comprising at least one nucleotide derivative, and at least one first group amino acid and at least two second group amino acids selected from Table 4.

In certain embodiments, the present disclosure provides for a flavor composition comprising at least one nucleotide derivative, and at least two first group amino acids and at least two second group amino acids selected from Table 4.

In certain embodiments, the present disclosure provides for a flavor composition comprising at least one nucleotide derivative, and at least one nucleotide and at least one first group amino acid selected from Table 4.

In certain embodiments, the present disclosure provides for a flavor composition comprising at least one nucleotide derivative, and at least one nucleotide and at least one second group amino acid selected from Table 4.

In certain embodiments, the present disclosure provides for a flavor composition comprising at least one nucleotide derivative, and at least one nucleotide and at least one, two, three, four, five or more first group amino acids and/or at least one, two, three, four, five or more second group amino acids selected from Table 4.

In certain embodiments, the present disclosure provides for a flavor composition comprising at least one nucleotide derivative, at least one nucleotide, and at least one first group amino acid and at least one second group amino acid selected from Table 4.

TABLE 4

| Amino acids. | |
|---|---|
| First Group amino acids: | Second Group amino acids: |
| L-Tryptophan | L-Proline |
| L-Phenylalanine | Hydroxy-L-proline |
| L-Histidine | L-Glutamic acid |
| Glycine | Monosodium glutamate (MSG) |
| L-Cysteine | L-Aspartic acid |
| L-Alanine | L-Arginine |
| L-Tyrosine | L-Cystine |
| L-Serine | L-Glutamine |
| L-Methionine | L-Isoleucine |
| L-Leucine | L-Lysine |
| L-Asparagine | L-Threonine |
| | L-Valine |
| | L-Ornithine |

In certain non-limiting embodiments, the present disclosure provides for a flavor composition comprising at least one nucleotide derivative, histidine and proline.

In certain non-limiting embodiments, the present disclosure provides for a flavor composition comprising at least one nucleotide derivative, alanine and proline.

In certain non-limiting embodiments, the present disclosure provides for a flavor composition comprising at least one nucleotide derivative, glycine and proline.

In certain non-limiting embodiments, the present disclosure provides for a flavor composition comprising at least one nucleotide derivative, phenylalanine and proline.

In certain non-limiting embodiments, the present disclosure provides for a flavor composition comprising at least one nucleotide derivative, tryptophan and proline.

In certain non-limiting embodiments, the present disclosure provides for a flavor composition comprising at least one nucleotide derivative, tyrosine and proline.

In certain non-limiting embodiments, the present disclosure provides for a flavor composition comprising at least one nucleotide derivative, histidine and threonine.

In certain non-limiting embodiments, the present disclosure provides for a flavor composition comprising at least one nucleotide derivative, alanine and threonine.

In certain non-limiting embodiments, the present disclosure provides for a flavor composition comprising at least one nucleotide derivative, glycine and threonine.

In certain non-limiting embodiments, the present disclosure provides for a flavor composition comprising at least one nucleotide derivative, phenylalanine and threonine.

In certain non-limiting embodiments, the present disclosure provides for a flavor composition comprising at least one nucleotide derivative, tryptophan and threonine.

In certain non-limiting embodiments, the present disclosure provides for a flavor composition comprising at least one nucleotide derivative, tyrosine and threonine.

In certain non-limiting embodiments, the present disclosure provides for a flavor composition comprising at least one nucleotide derivative, histidine and glutamic acid.

In certain non-limiting embodiments, the present disclosure provides for a flavor composition comprising at least one nucleotide derivative, alanine and glutamic acid.

In certain non-limiting embodiments, the present disclosure provides for a flavor composition comprising at least one nucleotide derivative, glycine and glutamic acid.

In certain non-limiting embodiments, the present disclosure provides for a flavor composition comprising at least one nucleotide derivative, phenylalanine and glutamic acid.

In certain non-limiting embodiments, the present disclosure provides for a flavor composition comprising at least one nucleotide derivative, tryptophan and glutamic acid.

In certain non-limiting embodiments, the present disclosure provides for a flavor composition comprising at least one nucleotide derivative, tyrosine and glutamic acid.

In certain embodiments, any of the flavor compositions disclosed above can further comprise at least one nucleotide and/or at least one transmembrane compound, as described herein.

In certain non-limiting embodiments, the present disclosure provides for a flavor composition comprising adenosine 3',5'-diphosphate and alanine.

In certain non-limiting embodiments, the present disclosure provides for a flavor composition comprising 6-thioguanosine-5'-O-monophosphate and alanine.

In certain non-limiting embodiments, the present disclosure provides for a flavor composition comprising 2'-, 3'-O—(N'-methylanthraniloyl)guanosine-5'-O-monophosphate and alanine.

In certain non-limiting embodiments, the present disclosure provides for a flavor composition comprising 2-amino-6-chloropurineriboside-5'-O-monophosphate and alanine.

In certain non-limiting embodiments, the present disclosure provides for a flavor composition comprising 6-chloropurineriboside-5'-O-monophosphate and alanine.

In certain non-limiting embodiments, the present disclosure provides for a flavor composition comprising inosine triphosphate (ITP) and alanine.

In certain non-limiting embodiments, the present disclosure provides for a flavor composition comprising inosine triphosphate (ITP), alanine and IMP.

In certain non-limiting embodiments, the present disclosure provides for a flavor composition comprising 1-(2-bromophenyl)-3-((1R, 2S)-2-hydroxy-2,3-dihydro-1H-inden-1-yl)urea, alanine and IMP.

In certain non-limiting embodiments, the present disclosure provides for a flavor composition comprising N-(benzo[d][1,3]dioxol-5-yl)-2-propylpentanamide, alanine and IMP.

In certain non-limiting embodiments, the present disclosure provides for a flavor composition comprising N-(heptan-4-yl)benzo[d][1,3]dioxole-5-carboxamide, alanine and IMP.

In certain non-limiting embodiments, the present disclosure provides for a flavor composition comprising N-(2-amino-2-oxo-1-phenylethyl)-3-chloro-4,5-dimethoxybenzamide, alanine and IMP.

In certain non-limiting embodiments, the present disclosure provides for a flavor composition comprising (E)-3-(4-methoxyphenyl)-N-(pentan-3-yl)acrylamide, alanine and IMP.

In certain non-limiting embodiments, the present disclosure provides for a flavor composition comprising 1-benzyl-3-(2-oxo-2-phenylethyl)imidazolidine-2,4,5-trione, alanine and IMP.

In certain non-limiting embodiments, the present disclosure provides for a flavor composition comprising 1H-imidazo[4,5-c]pyridin-2(3H)-one, alanine and IMP.

In certain non-limiting embodiments, the present disclosure provides for a flavor composition comprising N-(heptan-4-yl)benzo[d][1,3]dioxole-5-carboxamide, phenylalanine and GMP.

In certain non-limiting embodiments, the present disclosure provides for a flavor composition comprising a combination of N-(heptan-4-yl)benzo[d][1,3]dioxole-5-carboxamide with a first amino acid (Group A amino acid), second amino acid (Group B amino acid) and one or more nucleotide, as described below.

TABLE 5

Flavor compositions comprising a transmembrane compound, first amino acid (Group A), second amino acid (Group B) and a nucleotide.

| Transmembrane compound: | Group A amino acid: | Group B amino acid: | Nucleotide: |
|---|---|---|---|
| N-(heptan-4-yl)benzo[d][1,3]dioxole-5-carboxamide | Ala | Pro | IMP + GMP |
| N-(heptan-4-yl)benzo[d][1,3]dioxole-5-carboxamide | Ala | Pro | IMP |
| N-(heptan-4-yl)benzo[d][1,3]dioxole-5-carboxamide | Ala | Pro | GMP |
| N-(heptan-4-yl)benzo[d][1,3]dioxole-5-carboxamide | Gly | Pro | IMP + GMP |
| N-(heptan-4-yl)benzo[d][1,3]dioxole-5-carboxamide | Gly | Pro | IMP |
| N-(heptan-4-yl)benzo[d][1,3]dioxole-5-carboxamide | Gly | Pro | GMP |
| N-(heptan-4-y)benzo[d][1,3]dioxole-5-carboxamide | His | Pro | IMP + GMP |
| N-(heptan-4-y)benzo[d][1,3]dioxole-5-carboxamide | His | Pro | IMP |
| N-(heptan-4-y)benzo[d][1,3]dioxole-5-carboxamide | His | Pro | GMP |
| N-(heptan-4-y)benzo[d][1,3]dioxole-5-carboxamide | Ala | Thr | IMP + GMP |
| N-(heptan-4-y)benzo[d][1,3]dioxole-5-carboxamide | Ala | Thr | IMP |
| N-(heptan-4-y)benzo[d][1,3]dioxole-5-carboxamide | Ala | Thr | GMP |
| N-(heptan-4-y)benzo[d][1,3]dioxole-5-carboxamide | Gly | Thr | IMP + GMP |
| N-(heptan-4-y)benzo[d][1,3]dioxole-5-carboxamide | Gly | Thr | IMP |
| N-(heptan-4-y)benzo[d][1,3]dioxole-5-carboxamide | Gly | Thr | GMP |
| N-(heptan-4-y)benzo[d][1,3]dioxole-5-carboxamide | His | Thr | IMP + GMP |
| N-(heptan-4-y)benzo[d][1,3]dioxole-5-carboxamide | His | Thr | IMP |
| N-(heptan-4-y)benzo[d][1,3]dioxole-5-carboxamide | His | Thr | GMP |

In certain non-limiting embodiments, the present disclosure provides for a pet food product comprising a flavor composition as described herein, wherein the flavor composition is present in an amount of from about 0.001 ppm to about 1,000 ppm.

In certain non-limiting embodiments, the present disclosure provides for a pet food product comprising a flavor composition as described herein, wherein the flavor composition is present at a concentration of from about 0.0001% weight to about 10% weight of the pet food product.

In certain non-limiting embodiments, the present disclosure provides for a pet food product comprising a flavor composition as described herein, wherein the flavor composition is present in an amount greater than about 1 ppm.

In certain non-limiting embodiments, the present disclosure provides for a pet food product comprising a flavor composition as described herein, wherein the flavor composition is present in an amount greater than about 10 ppm.

In certain non-limiting embodiments, the present disclosure provides for a pet food product comprising a flavor composition as described herein, wherein the flavor composition is present in an amount greater than about 100 ppm.

In certain non-limiting embodiments, the present disclosure provides for a pet food product comprising a nucleotide derivative as described herein, wherein the nucleotide derivative is present in an amount from about 1 pM to about 1 M.

10. NON-LIMITING EXAMPLES OF METHODS OF THE PRESENT DISCLOSURE

In certain non-limiting embodiments, the present disclosure provides for a method of increasing the palatability of a pet food product comprising admixing the pet food product with a flavor composition comprising a nucleotide derivative and/or a transmembrane compound as described herein, wherein the nucleotide derivative and/or transmembrane compound is present at a concentration of from about 1 pM to about 10 M, or from about 1 pM to about 1 M in the admixture.

In certain non-limiting embodiments, the present disclosure provides for a method of increasing the palatability of a pet food product comprising producing the pet food product with a flavor composition comprising a nucleotide derivative and/or a transmembrane compound as described herein, wherein the nucleotide derivative and/or a transmembrane compound is present at a concentration of from about 1 pM to about 10 M, or from about 1 pM to about 1 M in the product.

In certain non-limiting embodiments, the present disclosure provides for a method of increasing the umami taste of a pet food product comprising admixing the pet food product with a flavor composition comprising a nucleotide derivative and/or a transmembrane compound as described herein, wherein the nucleotide derivative is present at a concentration of from 0.001 ppm to 1,000 ppm in the admixture.

In certain non-limiting embodiments, the present disclosure provides for a method of increasing the palatability of a pet food product comprising admixing the pet food product with a flavor composition comprising a nucleotide derivative and/or a transmembrane compound as described herein, wherein the flavor composition is present at a concentration of from about 0.001 ppm to 1,000 ppm in the admixture.

In certain non-limiting embodiments, the present disclosure provides for a method of increasing the umami taste of a pet food product comprising admixing the pet food product with a flavor composition comprising a nucleotide derivative and/or a transmembrane compound as described herein, wherein the flavor composition is present at a concentration of from about 0.0001% to about 10% weight in the admixture.

11. EXAMPLES

The presently disclosed subject matter will be better understood by reference to the following Examples, which are provided as exemplary of the invention, and not by way of limitation.

Example 1—Activation of T1R1/T1R3 Receptor by Nucleotide Derivatives

The present example describes the activation of the cat T1R1/T1R3 receptor by nucleotide derivatives in vitro.

Nucleotide derivatives that may function as T1R1/T1R3 activators were identified by in silico modeling with the umami cat receptor, T1R1/T1R3, and selected for further testing in vitro. In vitro functional characterization of the selected nucleotide derivatives was used to evaluate the effectiveness of a nucleotide derivative in activating the T1R1/T1R3 receptor alone and in combination with amino acids and/or nucleotides.

Methods:

HEK293 cells that stably express T1R3 and inducibly express T1R1 were exposed to nucleotide derivatives alone to activate the umami receptor. Activation of the T1R1/T1R3 receptor was detected by a change in intracellular calcium levels using a calcium sensitive fluorescent dye. Cells that express T1R3 but not T1R1 were used as a control. A FLIPR® Tetra or a FlexStation® 3 was used for data capture.

For each nucleotide derivative, dose response curves were generated and the following properties were determined: $EC_{50}$ of the nucleotide derivative alone; $EC_{50}$ of the nucleotide derivative with 20 mM alanine; $EC_{50}$ of the nucleotide derivative with 0.2 mM IMP; and $EC_{50}$ of the nucleotide derivative with 20 mM alanine and 0.2 mM IMP.

The term half maximal effective concentration ($EC_{50}$) refers to the concentration of a compound which induces a response halfway between the baseline and the maximum after a specified exposure time. In each experiment, serial dilutions of up to 0.1 mM, 1 mM or 10 mM of the nucleotide derivative were added to the T1R1/T1R3-expressing cells.

Figure 2:
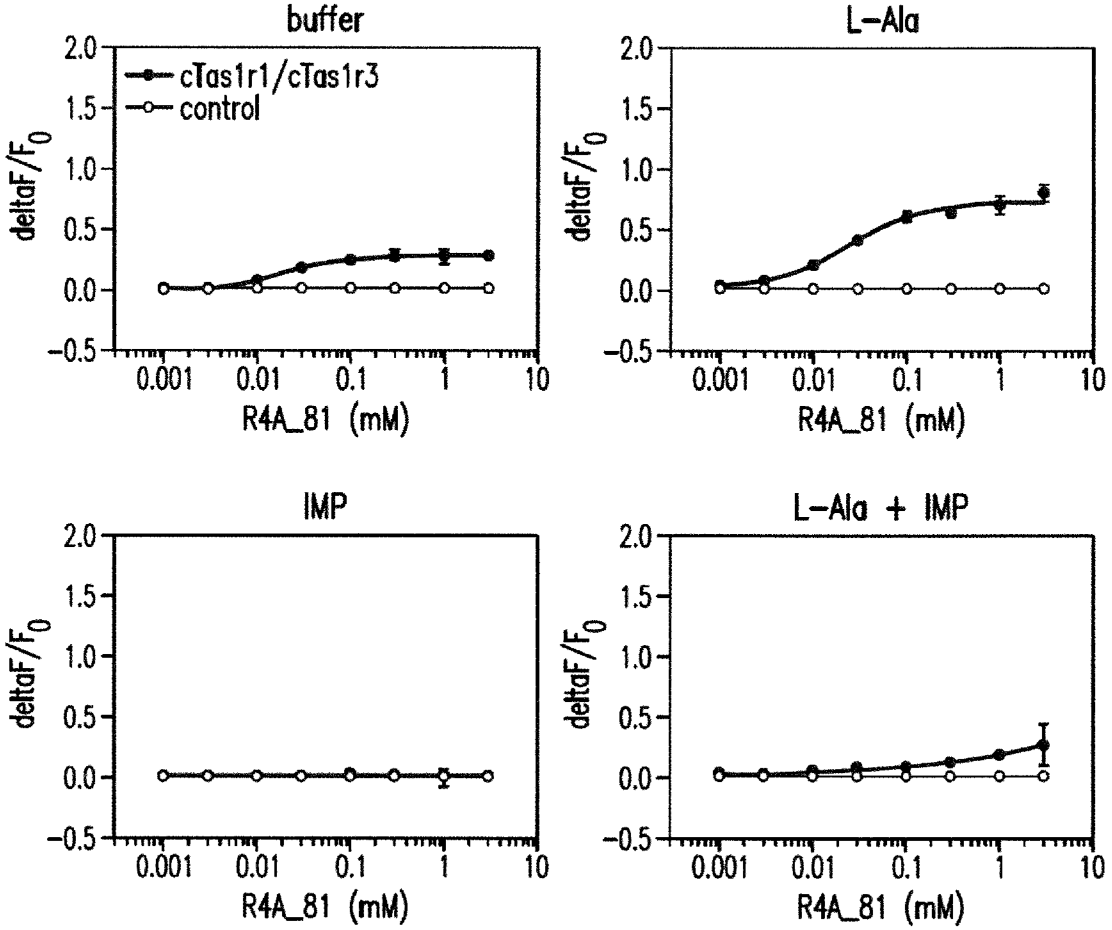
FIG. 2 shows dose response curves for 2'-deoxyadenosine-3', 5'-O-bisphosphate.
Figure 3:
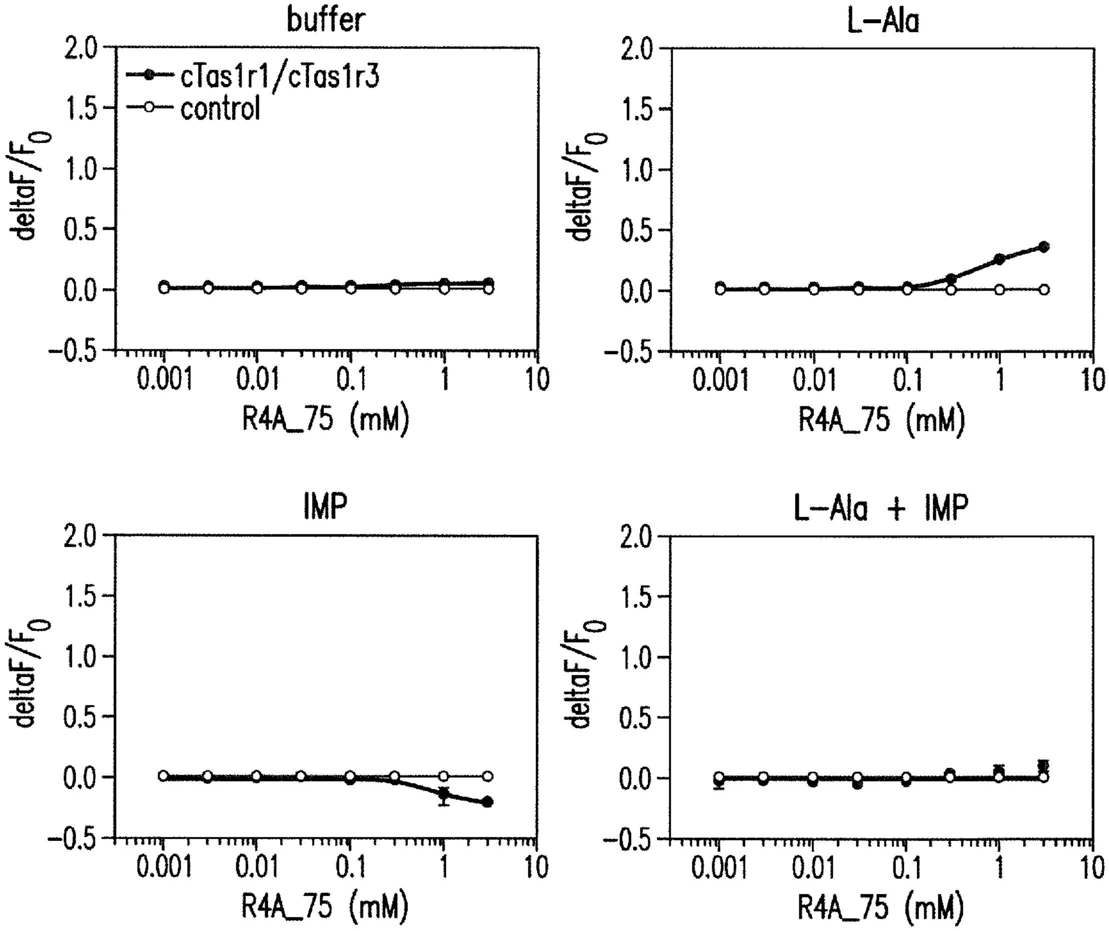
FIG. 3 shows dose response curves for inosine 5'-diphosphate (IDP) sodium salt.
Figure 4:
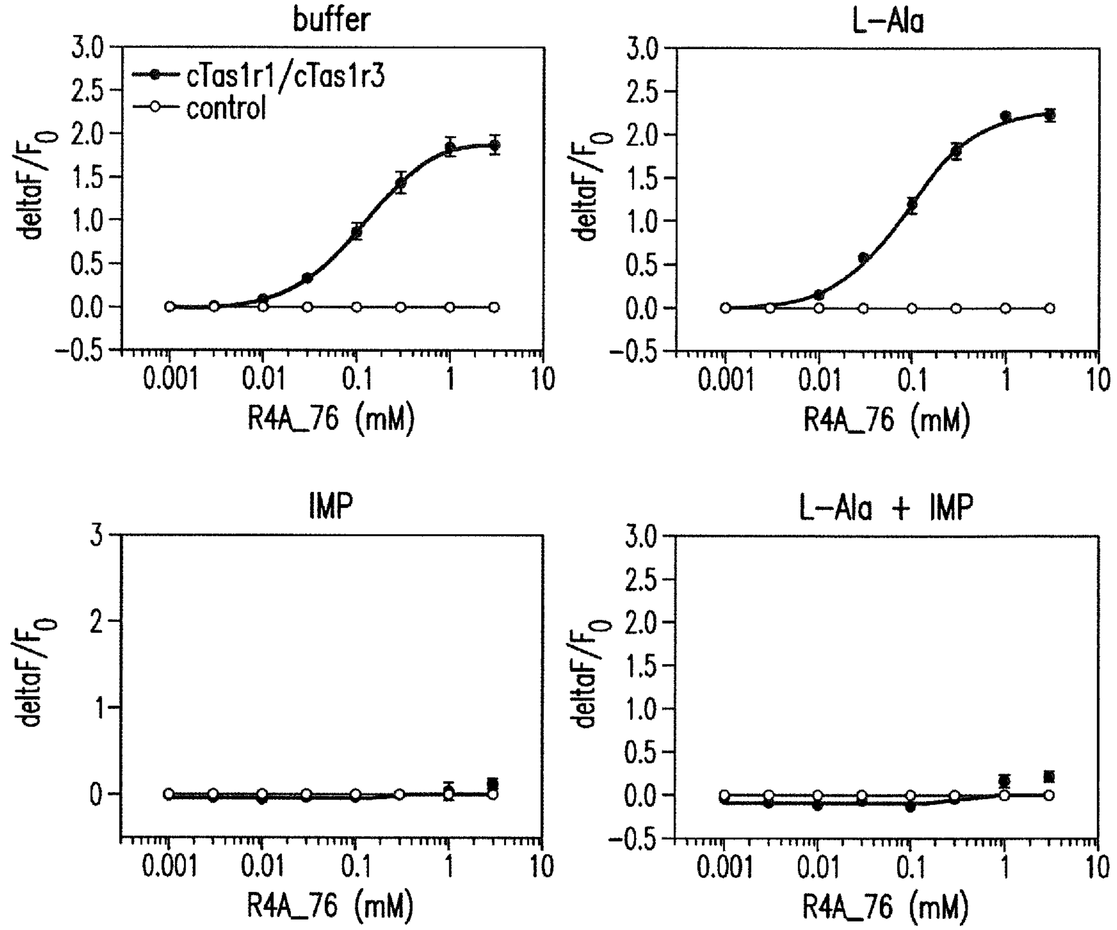
FIG. 4 shows dose response curves for 2'-/3'-O-(2-aminoethylcarbamoyl) adenosine-5' O-monophosphate.
Figure 5:
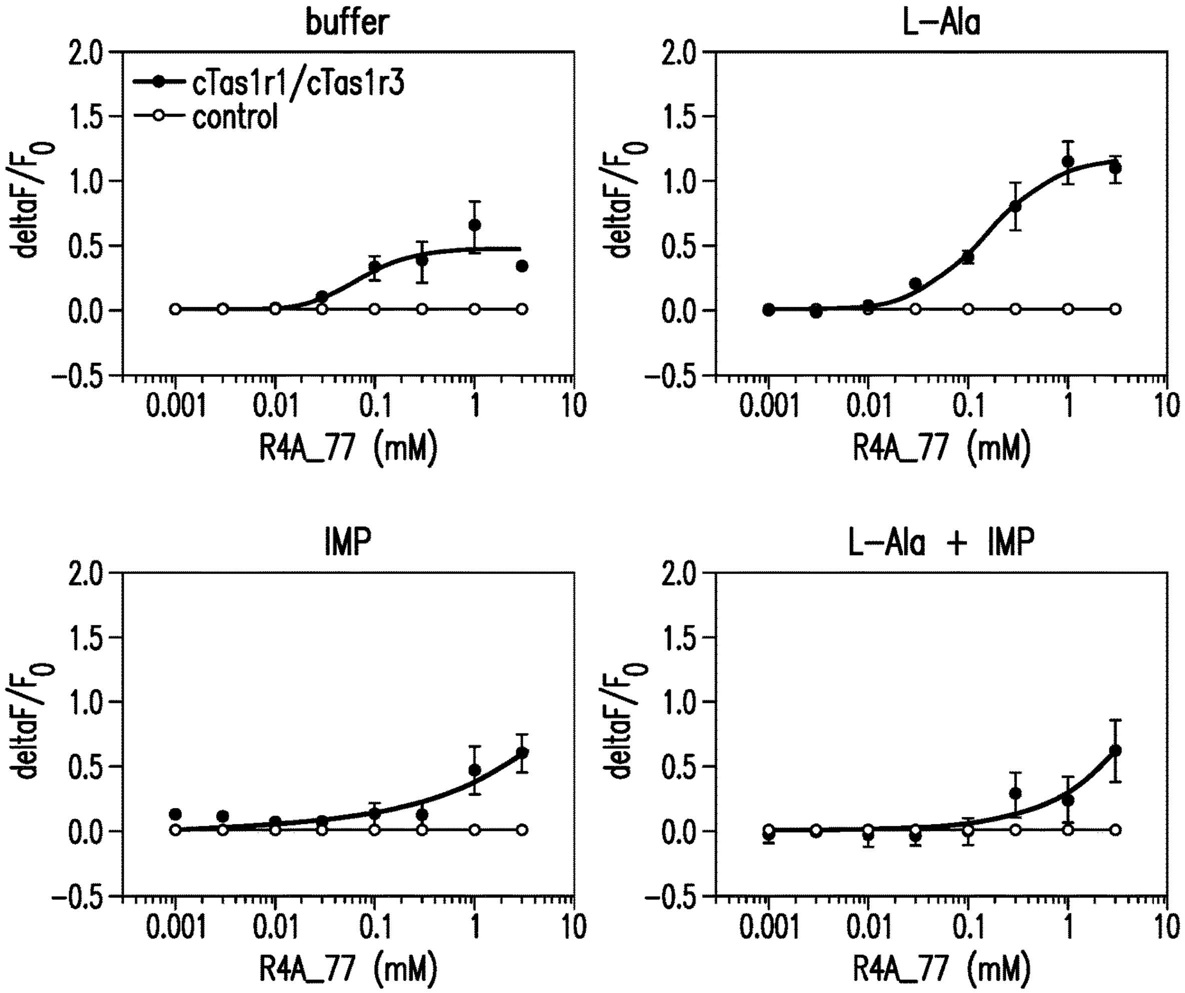
FIG. 5 shows dose response curves for 2'-/3'-O-(2-aminoethylcarbamoyl) guanosine-5'-O-monophosphate.

Results:

Treatment of HEK293 cells expressing T1R1/T1R3 receptors with 2'-deoxyadenosine-3', 5'-O-bisphosphate alone (e.g., in buffer), or in combination with 20 mM alanine, resulted in the activation of the T1R1/T1R3 receptor, as indicated by the change in intracellular calcium levels ($\Delta F/F_0$). In the presence of alanine or in buffer, 2'-deoxyadenosine-3', 5'-O-bisphosphate resulted in an observed $EC_{50}$ value of 0.02 mM (Table 6 and FIG. 2). These results indicated that 2'-deoxyadenosine-3', 5'-O-bisphosphate is a positive activator of the T1R1/T1R3 receptor.

Figure 8:
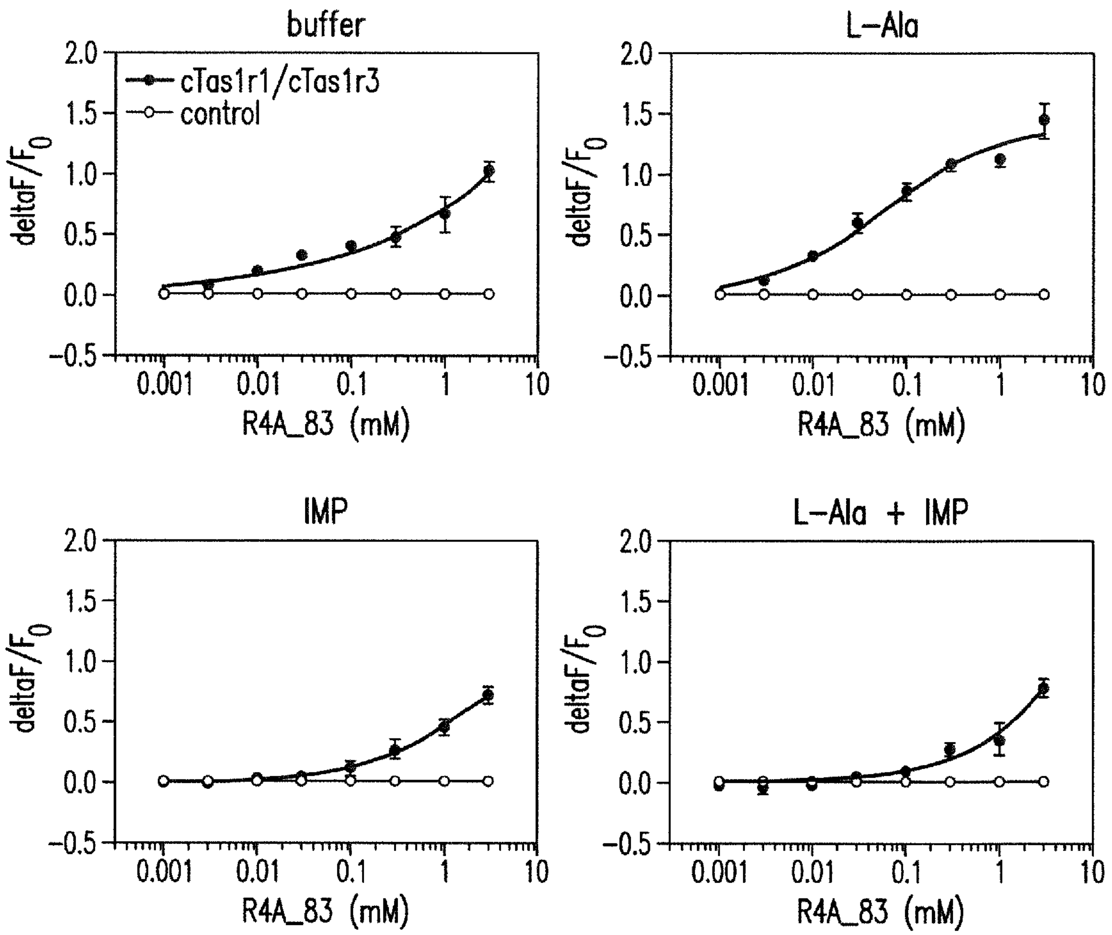
FIG. 8 shows dose response curves for adenosine 5'-O-thiomonophosphate dilithium salt.
Figure 9:
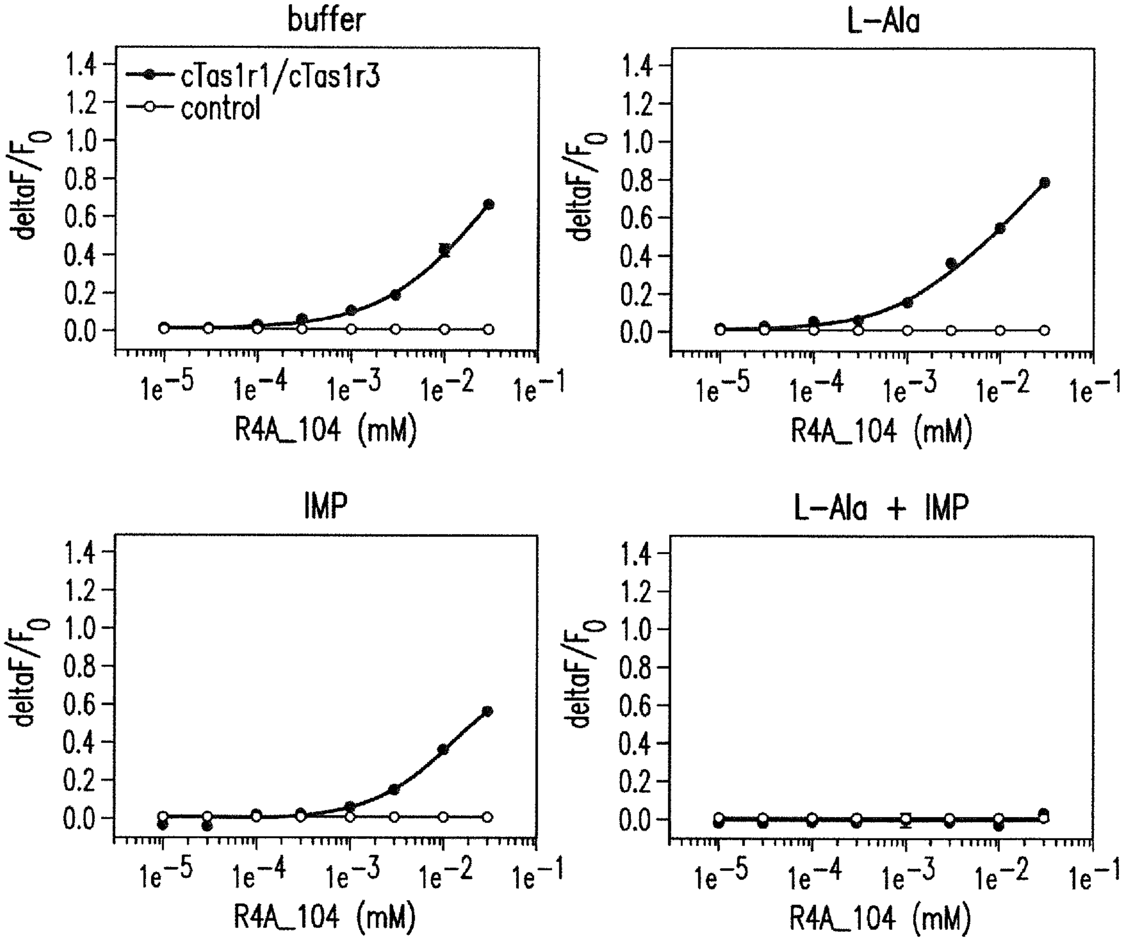
FIG. 9 shows dose response curves for adenosine 3', 5' diphosphate sodium salt and alanine (1:1000).
Figure 10:
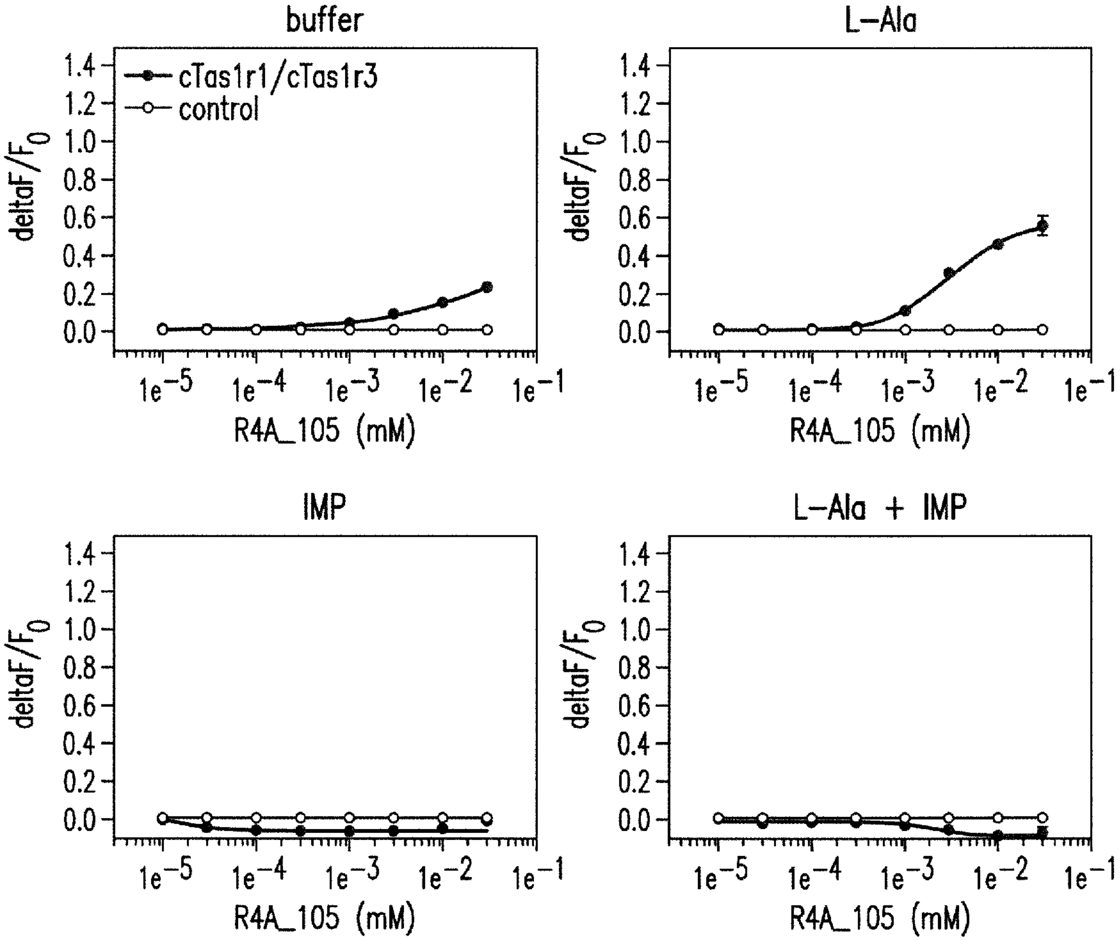
FIG. 10 shows dose response curves for adenosine 3', 5' diphosphate sodium salt and alanine (1:100).
Figure 11:
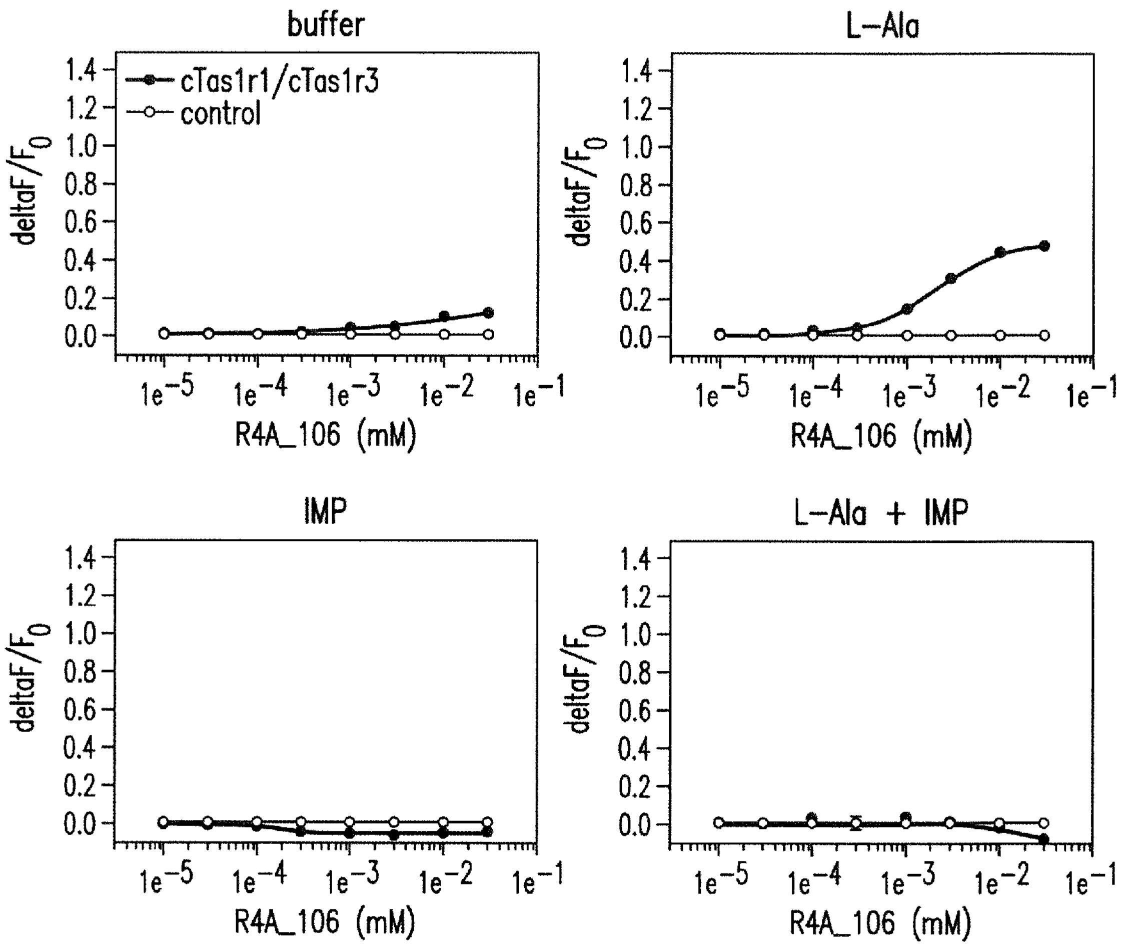
FIG. 11 shows dose response curves for adenosine 3', 5' diphosphate sodium salt and alanine (1:10).
Figure 12:
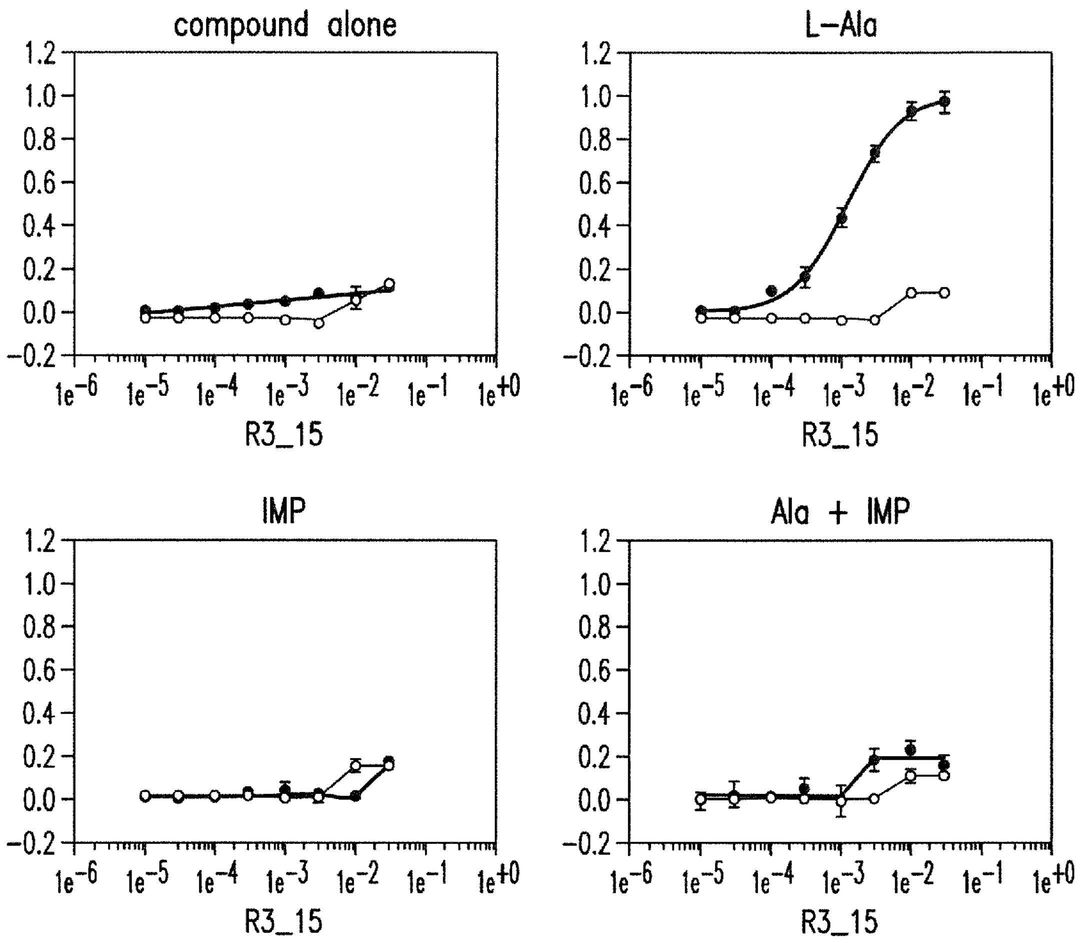
FIG. 12 shows dose response curves for adenosine 3', 5' diphosphate sodium salt.
Figure 13:
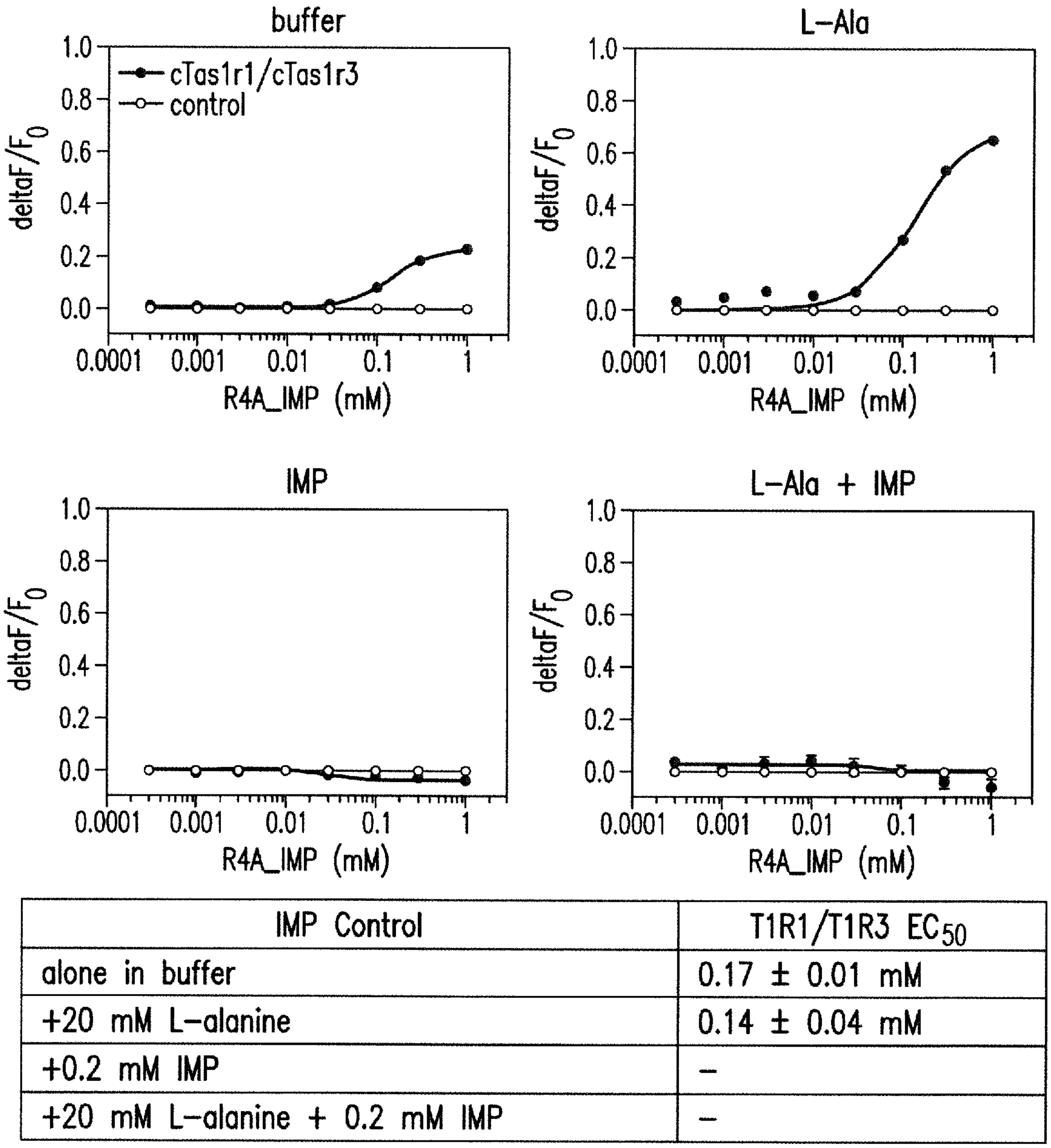
FIG. 13 shows dose response curves for inosine monophosphate (IMP) for activating cat T1R1/T1R3. IMP was used as a control for the experiments described by FIGS. 1-13 and 38-45.

The nucleotide derivative, adenosine 5'-O-thiomonophosphate dilithium salt, was observed to function as an activator of T1R1/T1R3 alone (FIG. 8 and Table 6). In the presence of 20 mM alanine, which has an $EC_{50}$ value of 13.6 mM alone, the $EC_{50}$ of the dilithium salt form of adenosine 5'-O-thiomonophosphate decreased from greater than 1 mM to 0.06 mM and the $\Delta F/F_0$ extended significantly higher (FIG. 8 and Table 6). These results suggest that alanine and nucleotide derivatives, e.g., adenosine 5'-O-thiomonophosphate, act synergistically to activate T1R1/T1R3.

Without being bound to a particular theory, these results show that nucleotide derivatives alone or in combination with an amino acid, e.g., alanine, can function as positive modulators of the T1R1/T1R3 receptor.

TABLE 6

Activation of T1R1/T1R3 by nucleotide derivatives

| Name | Chemical Structure | CAS No. | $EC_{50}$- alone (mM) | $EC_{50}$- with Ala (mM) | $EC_{50}$- with IMP (mM) | $EC_{50}$- with Ala and IMP (mM) |
|---|---|---|---|---|---|---|
| 2'-Deoxyadenosine-3',5'-O-bisphosphate | 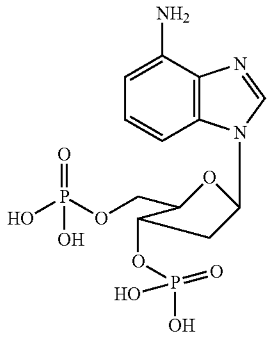 [SMILES: Nc1cccc2c1ncn2C1CC(OP(=O)(O)O)C(COP(=O)(O)O)O1] | 16174-58-6 | 0.02 ± 0.009 | 0.02 ± 0.005 | — | — |
| Inosine 5'-diphosphate (IDP) sodium salt | 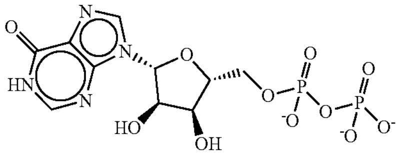 | 81012-88-6 | — | 0.65 ± 0.07 | — | — |

TABLE 6-continued

Activation of T1R1/T1R3 by nucleotide derivatives

| Name | Chemical Structure | CAS No. | $EC_{50}$- alone (mM) | $EC_{50}$- with Ala (mM) | $EC_{50}$- with IMP (mM) | $EC_{50}$- with Ala and IMP (mM) |
|---|---|---|---|---|---|---|
| 2'-/3'-O-(2-Aminoethylcarbamoyl) guanosine-5'-O-monophosphate (2'-/3'-AEC-5'-GMP) | 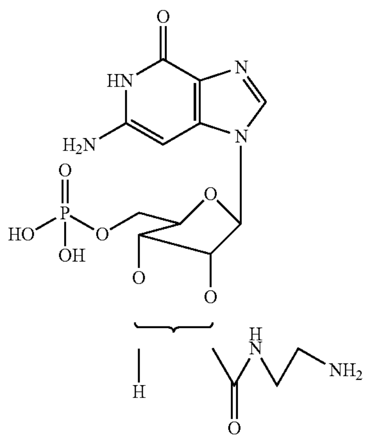 | N/A | 0.07 ± 0.04 | 0.14 ± 0.02 | >3 | >3 |
| Inosine Triphosphate (ITP) trisodium salt | 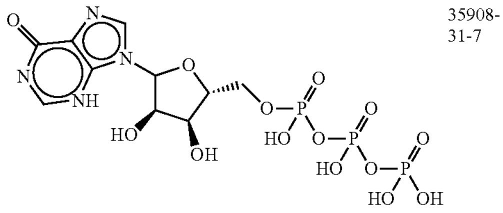 | 35908-31-7 | 0.05 ± 0.03 | 0.08 ± 0.01 | 0.02 ± 0.03 | 0.03 ± 0.01 |
| N6-Benzoyladenosine-5'-O-monophosphate (6-Bnz-5'-AMP) | 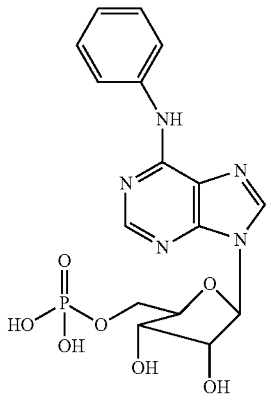 [SMILES: O=P(O)(O)OCC1OC(n2cnc3c(Nc4ccccc4)ncnc32)C(O)C1O] | 40871-55-4 | >1 | >1 | 0.72 ± 0.25 | >1 |
| Adenosine 5'-O-thiomonophosphate dilithium salt | 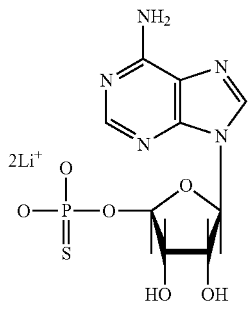 | 93839-85-1 | >1 | 0.06 ± 0.03 | >1 | >1 |

TABLE 6-continued

Activation of T1R1/T1R3 by nucleotide derivatives

| Name | Chemical Structure | CAS No. | $EC_{50}$- alone (mM) | $EC_{50}$- with Ala (mM) | $EC_{50}$- with IMP (mM) | $EC_{50}$- with Ala and IMP (mM) |
|---|---|---|---|---|---|---|
| Adenosine 3',5'-diphosphate sodium salt | 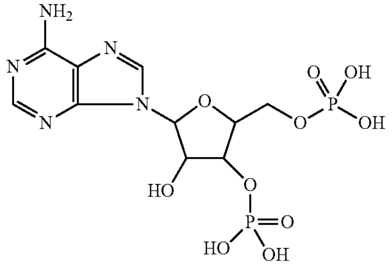 [SMILES: Nc1ncnc2c1ncn2C1OC(COP(=O)(O)O)C(OP(=O)(O)O)C1O] | 75431-54-8 | — | 0.001 ± 0.1 | — | — |
| Adenosine 3',5'-diphosphate sodium salt + Ala (1 : 1000) | 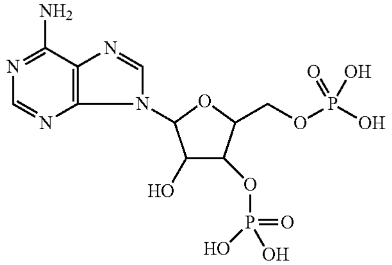 [SMILES: Nc1ncnc2c1ncn2C1OC(COP(=O)(O)O)C(OP(=O)(O)O)C1O] | 75431-54-8 | >0.01 | >0.01 | >0.01 | — |
| Adenosine 3',5'-diphosphate sodium salt + Ala (1 : 100) | 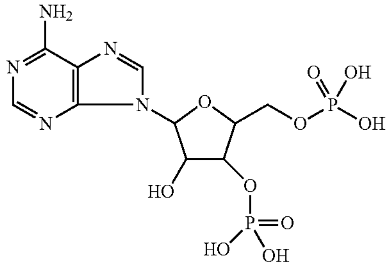 [SMILES: Nc1ncnc2c1ncn2C1OC(COP(=O)(O)O)C(OP(=O)(O)O)C1O] | 75431-54-8 | >0.03 | 0.003 ± 0.0003 | — | — |
| Adenosine 3',5'-diphosphate sodium salt + Ala (1 : 10) | 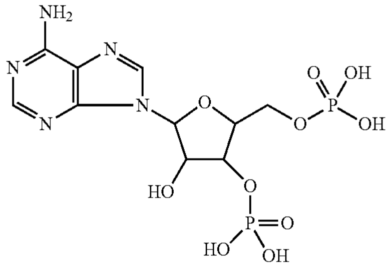 [SMILES: Nc1ncnc2c1ncn2C1OC(COP(=O)(O)O)C(OP(=O)(O)O)C1O] | 75431-54-8 | >0.03 | 0.003 ± 0.0003 | — | — |

Example 2—Activation of T1R1/T1R3 Receptor by Nucleotide Derivative Compounds in Combination with an Amino Acid The present example describes the activation of the cat T1R1/T1R3 receptor by nucleotide derivatives in combination with an amino acid in vitro.

Nucleotide derivatives were evaluated to determine the effectiveness of the nucleotide derivatives in activating the T1R1/T1R3 receptor in combination with one or more nucleotides and/or one or more amino acids.

Methods:

HEK293 cells that stably express T1R3 and inducibly express T1R1 were exposed to nucleotide derivatives alone or in combination with one or more amino acids and/or one or more nucleotides to activate the umami receptor. Activation of the T1R1/T1R3 receptor was detected by a change in intracellular calcium levels using a calcium sensitive fluorescent dye and/or a luminescent reporter system. Cells that express T1R3 but not T1R1 were used as a control. A FLIPR® Tetra or a FlexStation® 3 was used for data capture.

For each nucleotide derivative, dose response curves were generated and the following properties were determined in the presence of 20 mM alanine: the $EC_{50}$ of the nucleotide derivative, maximum response of the receptor in the presence of the nucleotide derivative, the maximum response of the receptor in the presence of the nucleotide derivative in relation to the response of the receptor in the presence of IMP and the threshold amount of the nucleotide derivative that results in the activation of the T1R1/T1R3 receptor. $EC_{50}$ values for the positive and negative controls used are summarized in Table 16.

Results:

The effect of all nucleotide derivatives tested in activating T1R1/T1R3 is shown in table 15. Treatment of HEK293 cells expressing T1R1/T1R3 receptors with the nucleotide derivative, adenosine 3',5'-diphosphate sodium salt (ADP), in combination with 20 mM alanine resulted in the activation of the T1R1/T1R3 receptor, as indicated by the maximum change in intracellular calcium levels ($\Delta F/F_0$) and the observed $EC_{50}$ value of 0.001 mM. In contrast, the nucleotide, adenosine monophosphate (AMP), in the presence of 20 mM alanine, resulted in an observed $EC_{50}$ value of 0.011 mM (Table 7). These results indicate that the adenosine-based nucleotide derivative exhibited improved activity at activating the T1R1/T1R3 receptor compared to the standard nucleotide from which it was derived. Similar results were observed for 2'-/3'-O—(N'-Methyl-anthraniloyl) adenosine-5'-O-monophosphate sodium salt (Table 7). In addition, the adenosine-based nucleotide derivatives also exhibited a lower threshold value for activating the receptors as compared to AMP (Table 7).

Figure 1:
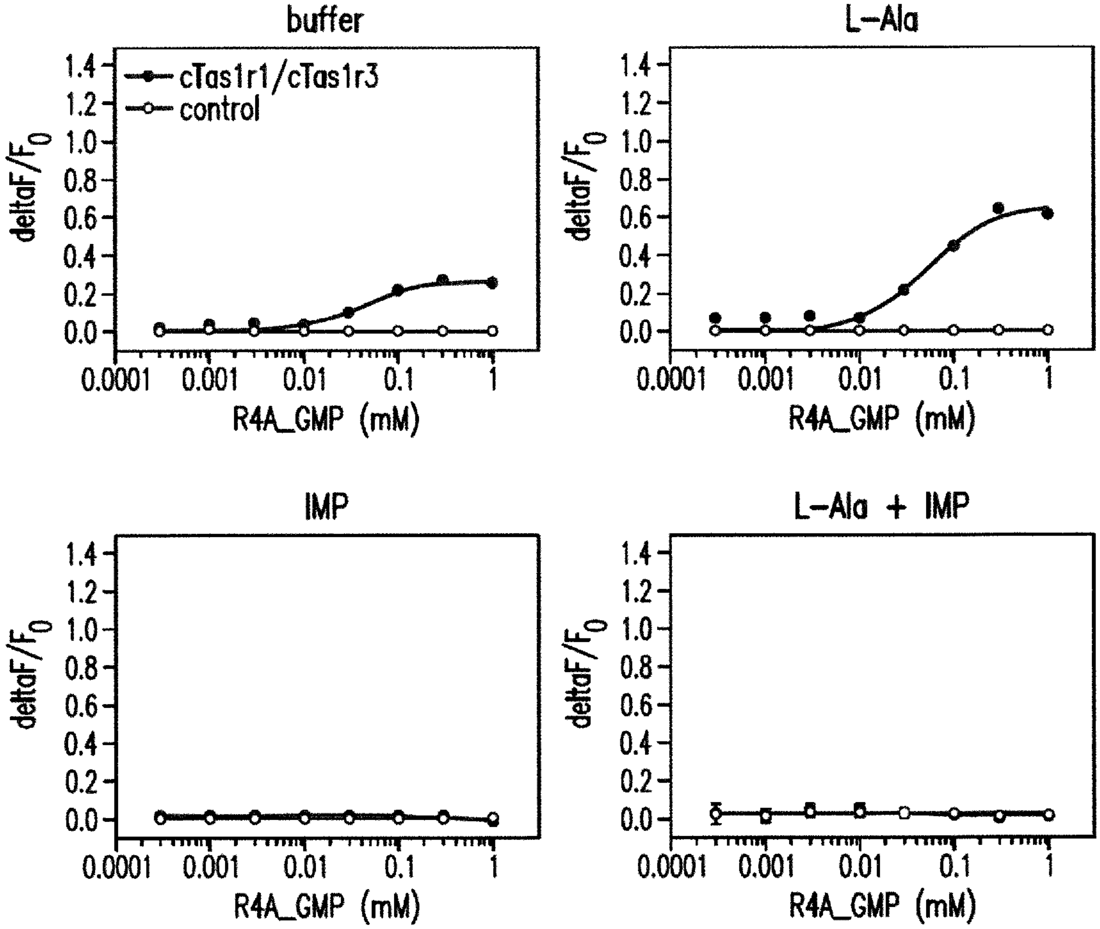
FIG. 1 shows dose response curves for guanosine monophosphate (GMP) as a test compound for activating the cat T1R1/T1R3 umami receptor in vitro. In the present figure (as well as in FIGS. 2-12, 14, and 38-45, four curves are shown: the test compound in buffer, the test compound in buffer with 20 mM alanine, the test compound in buffer with 0.2 mM IMP, and the test compound in 20 mM alanine and 0.2 mM IMP. Horizontal axes are test compound concentrations in mM. Vertical axes are receptor responses measured as ΔF/F in a fluorescent assay or as Lum in a luminescence assay.

The guanosine-based nucleotide derivatives, 6-thioguanosine-5'-O-monophosphate, 2'-deoxyguanosine-5'-O-monophosphorothioate (sodium salt); 2'-, 3'-O—(N'-methylanthraniloyl) guanosine-5'-O-monophosphate; guanosine-5'-monophosphorothioate (sodium salt); 2'-deoxy-3'-O—(N'-methylanthraniloyl) guanosine-5'-O-monophosphate; Guanosine-5'-O-(2-thiodiphosphate), 2'-deoxyguanosine-3', 5'-O-bisphosphate; and 2'-deoxyguanosine-5'-O-monophosphorothioate were observed to function as an activators of T1R1/T1R3 in the presence of alanine (Table 8). As shown in Table 8, these guanosine-based nucleotide derivatives exhibited improved activity as compared to the standard nucleotide, guanosine monophosphate (GMP). For example, 6-thioguanosine-5'-O-monophosphate exhibited an $EC_{50}$ value of 0.0009 mM in the presence of alanine and a threshold value of 0.0002 mM; whereas, GMP exhibited an $EC_{50}$ value of 0.02 mM and a threshold value of 0.008 mM (Table 8 and FIG. 1).

Purine-based nucleotide derivatives, 2-Amino-6-chloropurineriboside-5'-O-monophosphate (2-NH2-6-Cl-5'-PuMP) and 6-chloropurineriboside-5'-O-monophosphate also were observed to function as activators of the T1R1/T1R3 receptor (Table 9). For example, 2-Amino-6-chloropurineriboside-5'-O-monophosphate, in the presence of alanine, exhibited an $EC_{50}$ value of 0.0005 mM with a threshold value of 0.00013 mM, and 6-chloropurineriboside-5'-O-monophosphate, in the presence of alanine, exhibited an $EC_{50}$ value of 0.002 mM with a threshold value of 0.0005 mM (Table 9). In contrast, purine riboside-5'-O-monophosphate (5'-PuMP) exhibited an $EC_{50}$ value of 0.02 mM with a threshold value of 0.005 mM in the presence of alanine, indicating that the purine-based nucleotides activated the cat Umami receptor at a lower concentration as compared to the standard nucleotide, 5'-PuMP (Table 9).

Figure 6:
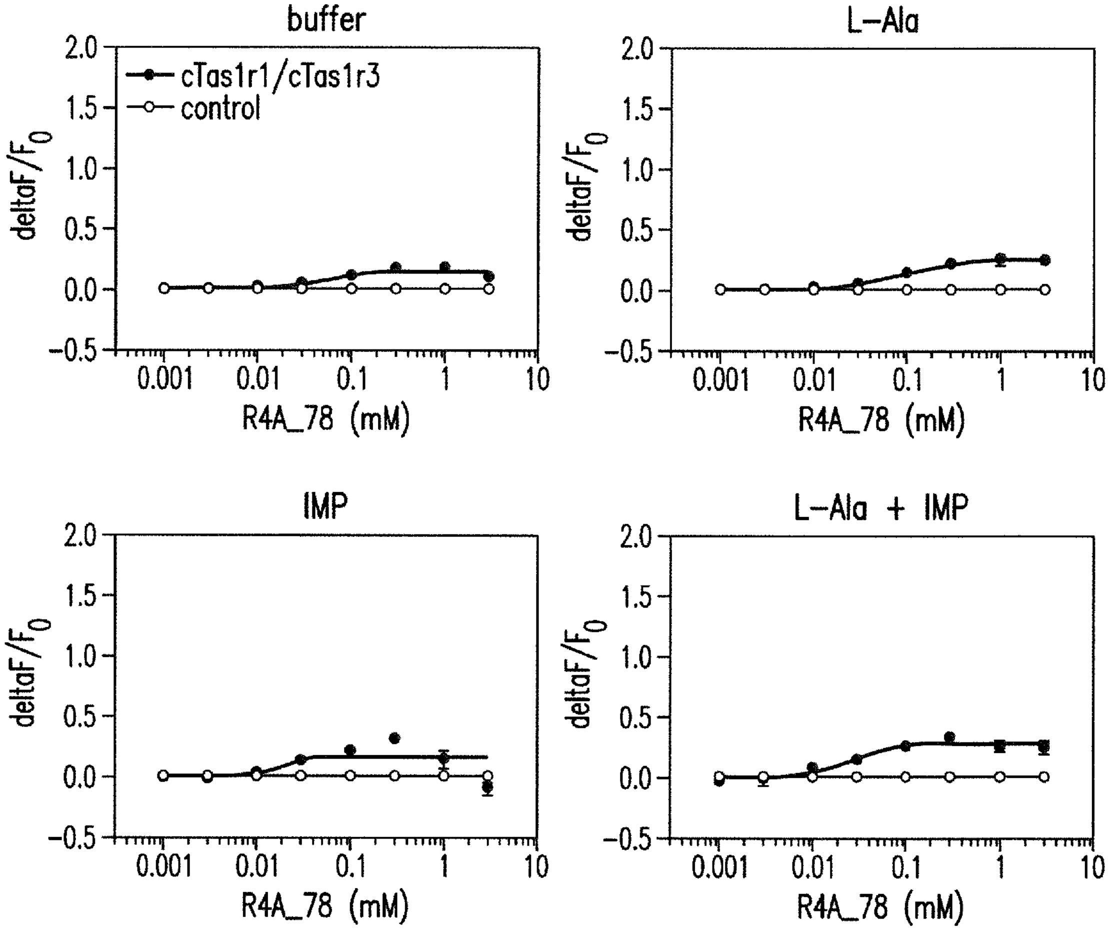
FIG. 6 shows dose response curves for inosine triphosphate (ITP) trisodium salt.
Figure 7:
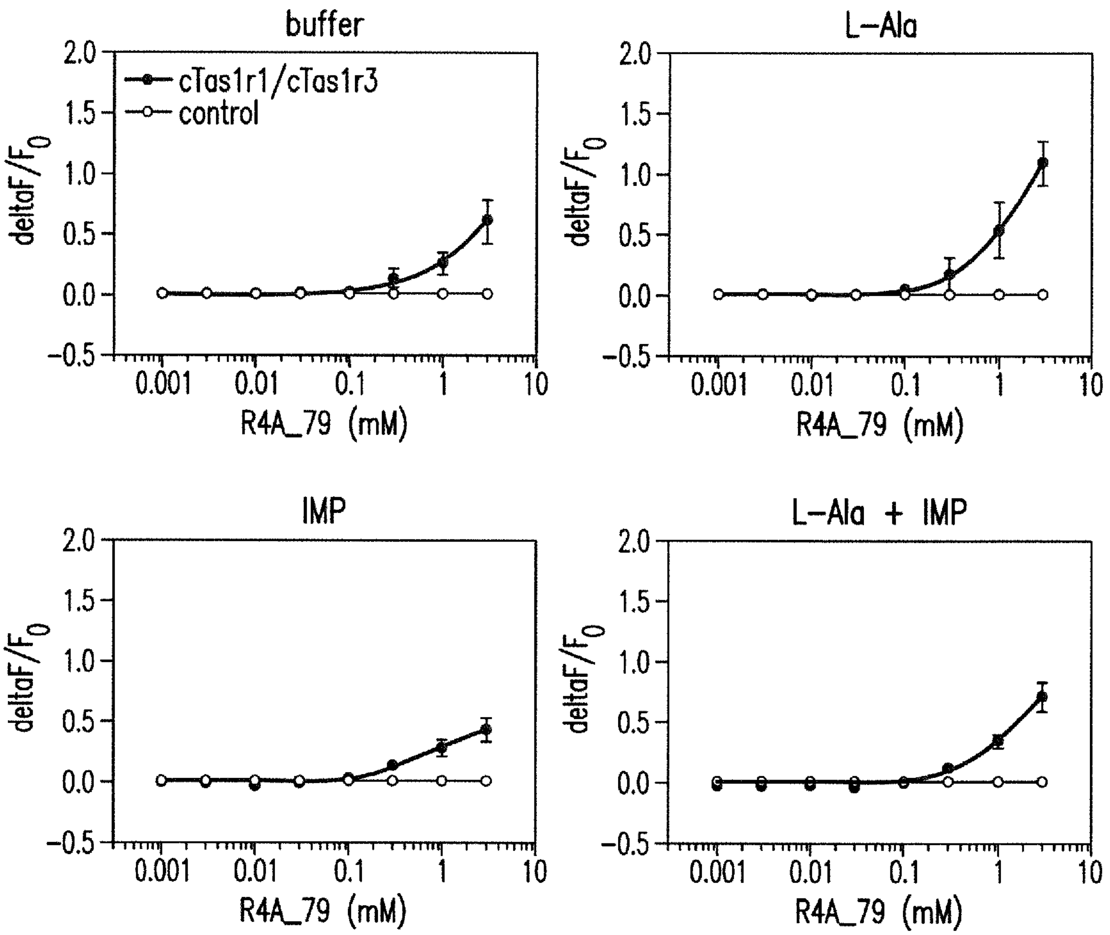
FIG. 7 shows dose response curves for N6-benzoyladenosine-5'-O-monophosphate.

Inosine-based nucleotide derivatives were observed to activate the receptor in the presence of alanine (Table 11). 6-thioinosine phosphate exhibited an $EC_{50}$ value of 0.02 mM in the presence of alanine and inosine triphosphate (ITP) exhibited an $EC_{50}$ value of 0.08 mM in the presence of alanine (Table 11 and FIG. 6). The standard nucleotide, inosine monophosphate (IMP), exhibited an $EC_{50}$ value 0.07 mM, indicating that 6-thioinosine phosphate exhibited increased activity as compared to IMP. Similar results were observed for uridine-based nucleotide derivatives, where the nucleotide derivatives exhibited improved activity compared to uridine monophosphate (UMP). For example, the uridine-based nucleotide derivative, uridine 5'-monophosphomorpholidate 4-morpholine-N,N'-dicyclohexylcarboxamidine, exhibited an $EC_{50}$ value of greater than 3 mM compared to the UMP $EC_{50}$ value of greater than 30 mM (Table 12).

Without being bound to a particular theory, these results show that nucleotide derivatives function as positive modulators of the T1R1/T1R3 receptor and exhibit improved activity as compared to standard nucleotides.

TABLE 7

Activation of T1R1/T1R3 by adenosine and adenosine-based nucleotide derivatives

| Name | Chemical Structure | CAS No. | $EC_{50}$-with Ala (mM) | Max resp. (ΔF/F) | Max. resp. % of IMP | Thresh-old (mM) |
|---|---|---|---|---|---|---|
| Adenosine 3',5'-diphosphate sodium salt (ADP) | 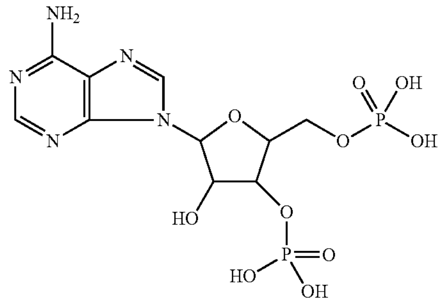 [SMILES: Nc1ncnc2c1ncn2C1OC(COP(=O)(O)O)C(OP(=O)(O)O)C1O] | 75431-54-8 | 0.001 | 0.9578 | 98.9 | 0.00025 |

TABLE 7-continued

Activation of T1R1/T1R3 by adenosine and adenosine-based nucleotide derivatives

| Name | Chemical Structure | CAS No. | $EC_{50}$-with Ala (mM) | Max resp. (ΔF/F) | Max. resp. % of IMP | Thresh-old (mM) |
|---|---|---|---|---|---|---|
| 2'-/3'-O-(N'-Methyl-anthraniloyl) adenosine-5'-O-monophosphate sodium salt (MANT-AMP) | 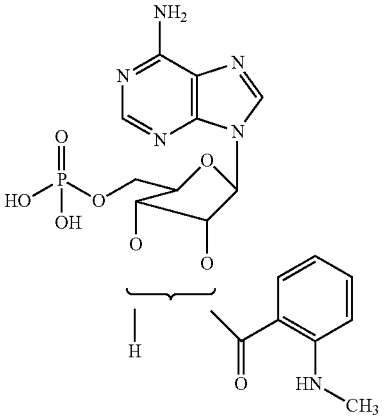 | 85287-53-2 | 0.01 | 1.915 | 154.1 | 0.0025 |
| Adenosine 5'-monophosphate disodium salt (AMP) | 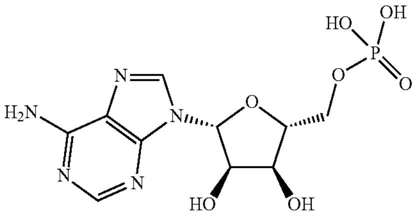 [SMILES: Nc1ncnc2c1ncn2[C@@H]1O[C@H](COP(=O)(O)O)[C@@H](O)[C@H]1O] | 4578-31-8 | 0.011 | 1.5470 | 159.8 | 0.003 |
| 2'-Deoxy-3'-O-(N'-methylanthraniloyl) adenosine-5'-O-monophosphate | 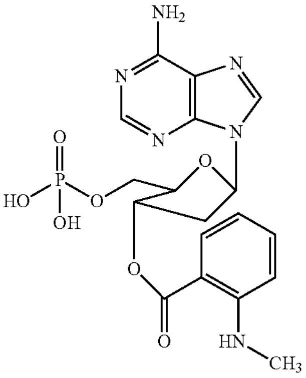 [SMILES: CNc1ccccc1C(=O)OC1CC(n2cnc3c(N)ncnc32)OC1COP(=O)(O)O] | N/A | 0.01 | 0.3975 | 32.0 | 0.0025 |
| Adenosine-5'-O-mono-phosphorothioate (5'-AMPS) | 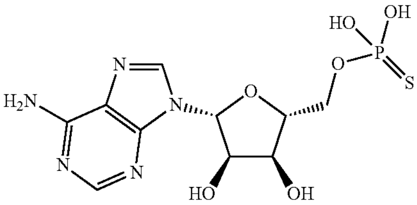 [SMILES: Nc1ncnc2c1ncn2[C@@H]1O[C@H](COP(O)(O)=S)[C@@H](O)[C@H]1O] | 19341-57-2 | 0.011 | 1.2435 | 128.4 | 0.003 |
| 1, N6-Ethenoadenosine-5'-O-mono-phosphate (ϵ-5'-AMP) | 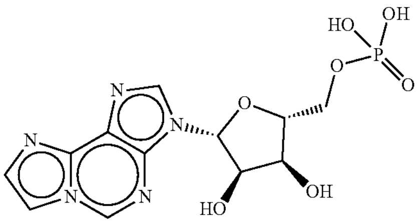 | 103213-41-8 | 0.04 | 1.4766 | 152.5 | 0.010 |

TABLE 7-continued

Activation of T1R1/T1R3 by adenosine and adenosine-based nucleotide derivatives

| Name | Chemical Structure | CAS No. | $EC_{50}$-with Ala (mM) | Max resp. (ΔF/F) | Max. resp. % of IMP | Thresh-old (mM) |
|---|---|---|---|---|---|---|
| 2'-Deoxy-$N^6$-methyl adenosine 3',5'-diphosphate diammonium salt (MRS 2179 ammonium salt hydrate) | 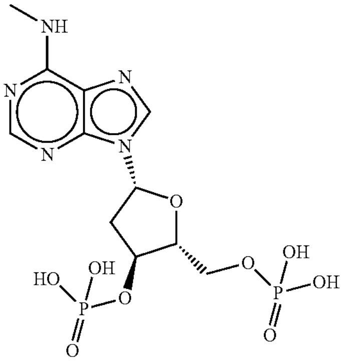 | 101204-49-3 | 0.05 | 1.8150 | 146.1 | 0.013 |
| 2'-Deoxy-adenosine-3', 5'-O-bisphosphate | 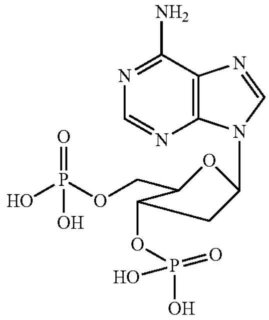 [SMILES: Nc1ncnc2c1ncn2C1CC(OP(=O)(O)O)C(COP(=O)(O)O)O1] | 16174-58-6 | 0.02 | 0.8 | 76.4 | 0.005 |
| Adenosine 5'-phosphosulfate sodium salt | 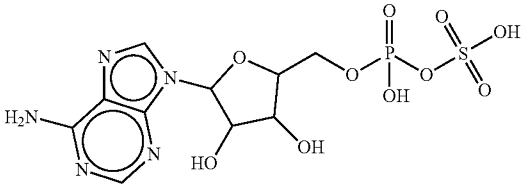 | 102029-95-8 | 0.03 | 0.8658 | 89.4 | 0.008 |
| N6-Cyclo-pentyladenosine-5'-O-monophosphate (6-cPe-5'-AMP) | 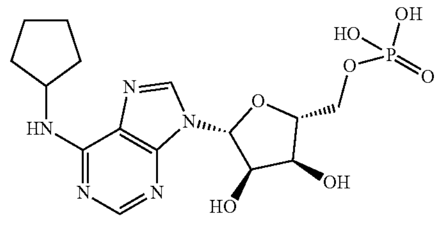 [SMILES: O=P(O)(O)OC[C@H]1O[C@@H](n2cnc3c(NC4CCCC4)ncnc32)[C@H](O)[C@@H]1O] | 117778-38-8 | 0.05 | 1.2317 | 127.2 | 0.013 |
| Adenosine 5'-O-thiomonophosphate dilithium salt | 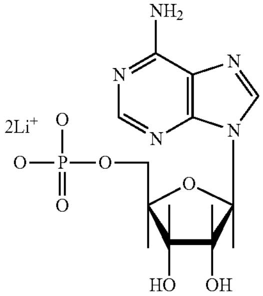 | 93839-85-1 | 0.06 | 1.4 | 139.4 | 0.015 |

TABLE 7-continued

Activation of T1R1/T1R3 by adenosine and adenosine-based nucleotide derivatives

| Name | Chemical Structure | CAS No. | $EC_{50}$-with Ala (mM) | Max resp. (ΔF/F) | Max. resp. % of IMP | Thresh-old (mM) |
|---|---|---|---|---|---|---|
| 2'-Deoxy-adenosine-5'-O-mono-phosphorothioate, sodium salt (5'-dAMPS) | 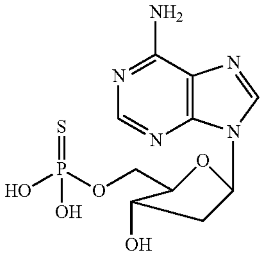 [SMILES: Nc1ncnc2c1ncn2C1CC(O)C(COP(O)(O)=S)O1] | 64145-26-2 | 0.06 | 1.0375 | 83.5 | 0.015 |
| 2'-/3'-O-(2-Aminoethyl carbamoyl) adenosine-5'-O-mono-phosphate (2'-/3'-AEC-5'-AMP) | 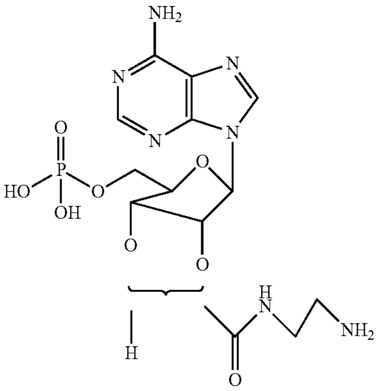 | 81012-88-6 | 0.09 | 2.2 | 213.9 | 0.0225 |
| N6-Methyl-adenosine 5'-monophosphate sodium salt | 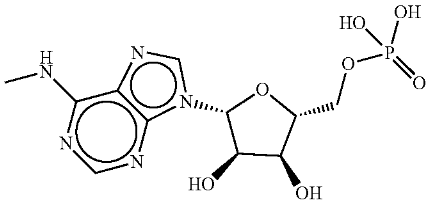 | 81921-35-9 | 0.08 | 0.9907 | 102.3 | 0.020 |
| 2'-Deoxyadenosine 5'-monophosphate | 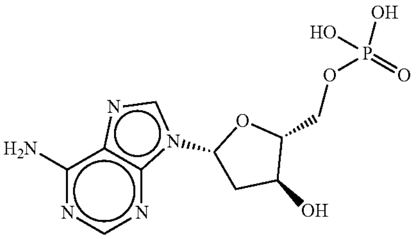 | 653-63-4 | 0.14 | 1.1503 | 118.8 | 0.035 |
| 2'-Deoxy-1,N6-ethenoadenosine-5'-O-monophosphate | 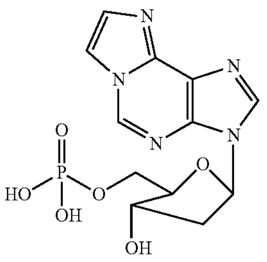 [SMILES: O=P(O)(O)OCC1OC(n2cnc3c2ncn2ccnc32)CC1O] | 60508-81-8 | 0.2 | 0.87 | 70.0 | 0.05 |

TABLE 7-continued

| Name | Chemical Structure | CAS No. | $EC_{50}$-with Ala (mM) | Max resp. (ΔF/F) | Max. resp. % of IMP | Thresh-old (mM) |
|---|---|---|---|---|---|---|
| Activation of T1R1/T1R3 by adenosine and adenosine-based nucleotide derivatives | | | | | | |
| 7-Deaza-adenosine-5'-O-monophosphate (7-CH-5'-AMP/5'-TuMP) | 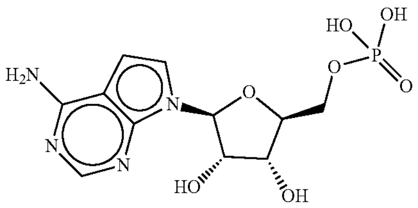 | 16719-46-3 | 0.75 | 0.4979 | 51.4 | 0.188 |
| 8-Chloroadenosine-5'-O-monophosphate, sodium salt 8-Cl-5'-AMPS | 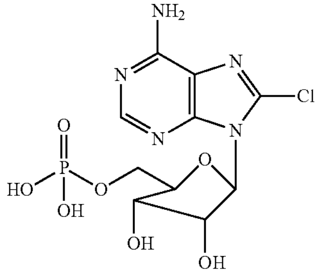 [SMILES: Nc1ncnc2c1nc(Cl)n2C1OC(COP(=O)(O)O)C(O)C1O] | 37676-40-7 | 0.8 | 0.79 | 63.6 | 0.2 |
| N6-Benzoyladenosine-5'-O-monophosphate (6-Bnz-5'-AMP) | 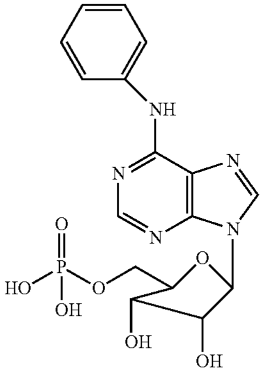 [SMILES: O=P(O)(O)OCC1OC(n2cnc3c(Nc4ccccc4)ncnc32)C(O)C1O] | 40871-55-4 | >1 | 1.1 | 105.6 | 0.3 |

TABLE 8

| Name | Chemical Structure | CAS No. | $EC_{50}$-with Ala (mM) | Max. resp. (ΔF/F) | Max. resp. % of IMP | Thresh-old (mM) |
|---|---|---|---|---|---|---|
| Activation of T1R1/T1R3 by guanosine and guanosine-based nucleotide derivatives | | | | | | |
| 6-Thioguanosine-5'-O-monophosphate (6-T-5'-GMP) | 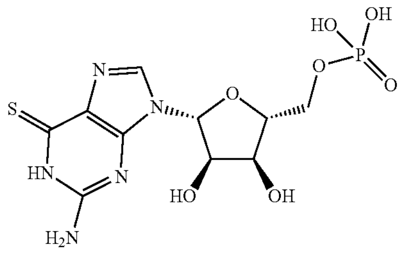 [SMILES: Nc1nc2c(ncn2[C@@H]2O[C@H](COP(=O)(O)O)[C@@H](O)[C@H]2O)c(=S)[nH]1] | 74686-78-5 | 0.0009 | 1.3614 | 140.6 | 0.0002 |

TABLE 8-continued

| Name | Chemical Structure | CAS No. | $EC_{50}$-with Ala (mM) | Max. resp. (ΔF/F) | Max. resp. % of IMP | Thresh-old (mM) |
|---|---|---|---|---|---|---|
| Activation of T1R1/T1R3 by guanosine and guanosine-based nucleotide derivatives | | | | | | |
| 2'-Deoxyguanosine-5'-O-monophosphorothioate, sodium salt | 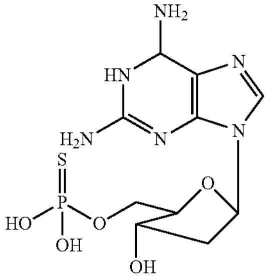 [SMILES: NC1=Nc2c(ncn2C2CC(O)C(COP(O)(O)=S)O2)C(N)N1] | 87358-26-7 | 0.01 | 1.0775 | 86.7 | 0.0025 |
| 2'-,3'-O-(N'-Methylanthraniloyl) guanosine-5'-O-monophosphate (MANT-5'-GMP) Fluorescent analogue of 5'-GMP | 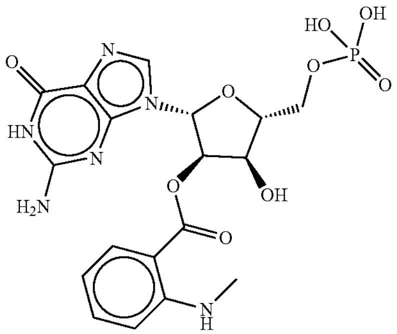 | 85287-54-3 | 0.0056 | 0.7190 | 74.3 | 0.0014 |
| Guanosine-5'-monophosphorothioate sodium salt (5'-GMPS) | 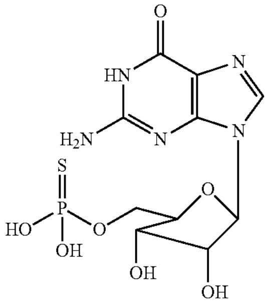 [SMILES: Nc1nc2c(ncn2C2OC(COP(O)(O)=S)C(O)C2O)c(=O)[nH]1] | 76310-16-2 | 0.01 | 1.29 | 103.8 | 0.0025 |
| 2'-Deoxy-3'-O-(N'-methylanthraniloyl) guanosine-5'-O-monophosphate | 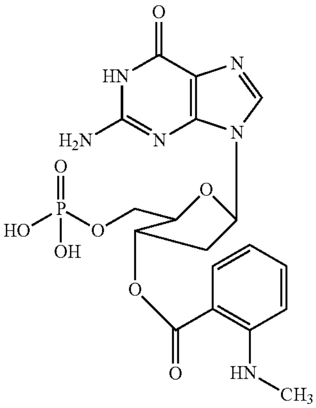 [SMILES: CNc1ccccc1C(=O)OC1CC(n2cnc3c(=O)[nH]c(N)nc32)OC1COP(=O)(O)O] | N/A | 0.01 | 0.295 | 23.7 | 0.0025 |

TABLE 8-continued

Activation of T1R1/T1R3 by guanosine and guanosine-based nucleotide derivatives

| Name | Chemical Structure | CAS No. | $EC_{50}$-with Ala (mM) | Max. resp. (ΔF/F) | Max. resp. % of IMP | Thresh-old (mM) |
|---|---|---|---|---|---|---|
| Guanosine-5'-O-(2-thiodiphosphate) | 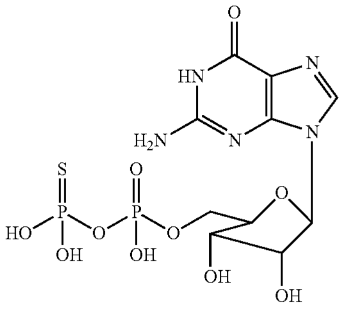 [SMILES: Nc1nc2c(ncn2C2OC(COP(=O)(O)OP(O)(O)=S)C(O)C2O)c(=O)[nH]1] | 71376-97-1 | 0.01 | 0.5875 | 47.3 | 0.0025 |
| 2'-Deoxyguanosine-3',5'-O-bisphosphate | 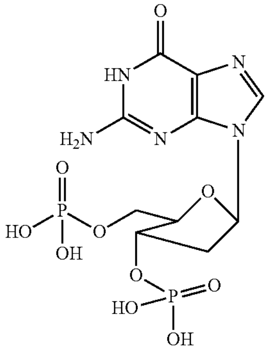 [SMILES: Nc1nc2c(ncn2C2CC(OP(=O)(O)O)C(COP(=O)(O)O)O2)c(=O)[nH]1] | 16174-59-7 | 0.02 | 1.8925 | 152.3 | 0.005 |
| 2'-Deoxyguanosine-5'-O-monophosphorothioate (5'-dGMPS) | 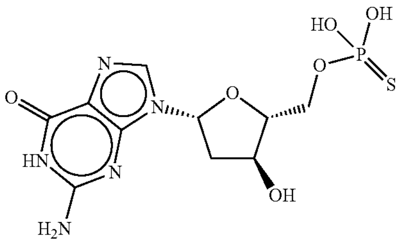 | 87358-26-7 | 0.02 | 0.8446 | 87.2 | 0.005 |
| Guanosine monophosphate (GMP)-disodium salt | 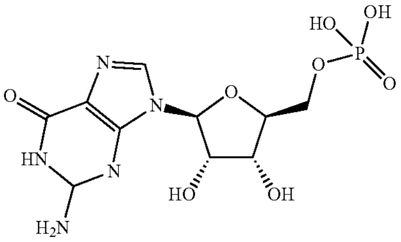 [SMILES: NC1NC(=O)c2ncn([C@H]3O[C@@H](COP(=O)(O)O)[C@H](O)[C@@H]3O)c2N1] | 5550-12-9 | 0.03 | 1.2786 | 132.1 | 0.008 |
| N-Lactoyl-5'-GMP | 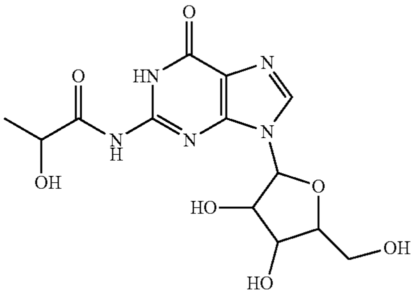 [SMILES: CC(O)C(=O)Nc1nc2c(ncn2C2OC(CO)C(O)C2O)c(=O)[nH]1] | N/A | 0.1 | 1.3600 | 140.5 | 0.025 |

TABLE 8-continued

Activation of T1R1/T1R3 by guanosine and guanosine-based nucleotide derivatives

| Name | Chemical Structure | CAS No. | $EC_{50}$-with Ala (mM) | Max. resp. (ΔF/F) | Max. resp. % of IMP | Thresh-old (mM) |
|---|---|---|---|---|---|---|
| N-Acetyl-5'-GMP | 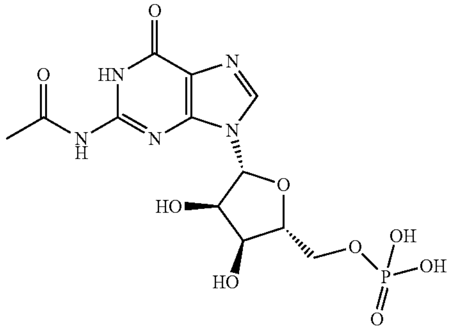 [SMILES: CC(=O)Nc1nc2c(ncn2[C@@H]2O[C@H](COP(=O)(O)O)[C@@H](O)[C@H]2O)c(=O)[nH]1] | N/A | 0.1 | 1.3351 | 137.9 | 0.025 |
| Guanosine 5'-diphosphate sodium salt | 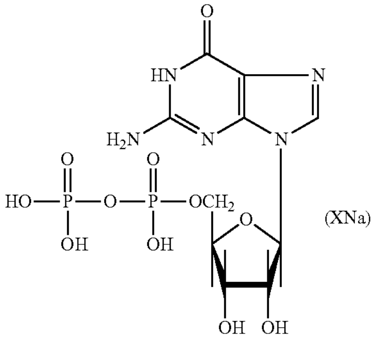 (XNa) | 43139-22-6 | 0.2 | 1.7550 | 141.2 | 0.050 |
| 2'-/3'-O-(2-Aminoethylcarbamoyl) guanosine-5'-O-monophosphate (2'-/3'-AEC-5'-GMP) | 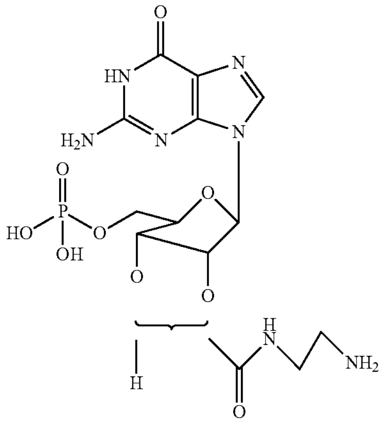 | N/A | 0.14 | 1.1 | 109.5 | 0.035 |
| Guanosine 5'-triphosphate sodium salt hydrate | 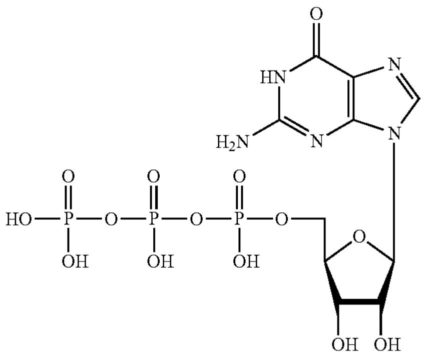 * xNa | 36051-31-7 | 0.7 | 1.8075 | 145.5 | 0.175 |

TABLE 8-continued

Activation of T1R1/T1R3 by guanosine and guanosine-based nucleotide derivatives

| Name | Chemical Structure | CAS No. | $EC_{50}$-with Ala (mM) | Max. resp. (ΔF/F) | Max. resp. % of IMP | Thresh-old (mM) |
|---|---|---|---|---|---|---|
| 2'-Deoxyguanosine 5'-monophosphate sodium salt hydrate | 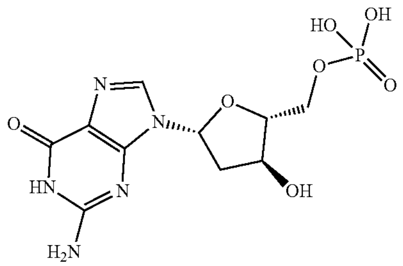 [SMILES: Nc1nc2c(ncn2[C@H]2C[C@H](O)[C@@H](COP(=O)(O)O)O2)c(=O)[nH]1] | N/A | 0.24 | 0.5926 | 61.2 | 0.060 |
| Guanosine 5'-monophosphomorpholidate 4-morpholine-N,N'-dicyclohexylcarboxamidine salt | 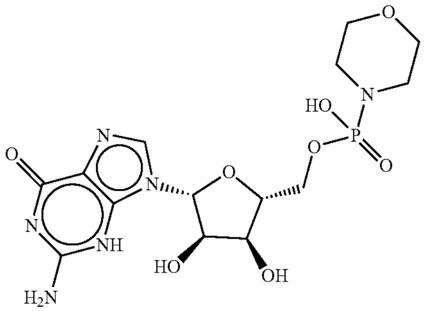 | 7361-07-1 | 1.3 | 0.5121 | 52.9 | 0.325 |
| 8-Bromoguanosine-5'-O-monophosphate (8-Br-5'-GMP) | 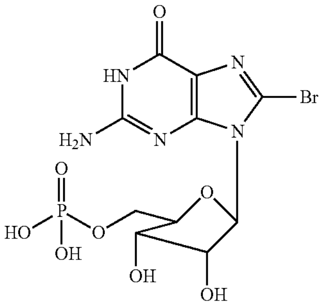 [SMILES: Nc1nc2c(nc(Br)n2C2OC(COP(=O)(O)O)C(O)C2O)c(=O)[nH]1] | 21870-09-7 | CNBD | 0.375 | 30.2 | 1 |

TABLE 9

Activation of T1R1/T1R3 by purine-based nucleotide derivatives

| Chemical Name | Chemical Structure | CAS No. | $EC_{50}$-with Ala (mM) | Max resp. (ΔF/F) | Max. resp. % of IMP | Thresh-old (mM) |
|---|---|---|---|---|---|---|
| 2-Amino-6-chloropurineriboside-5'-O-monophosphate (2-NH2-6-Cl-5'-PuMP) | 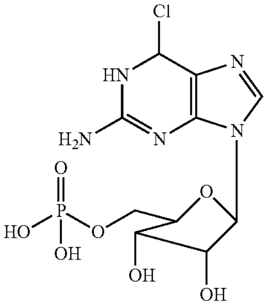 [SMILES: NC1=Nc2c(ncn2C2OC(COP(=O)(O)O)C(O)C2O)C(Cl)N1] | 16321-98-5 | 0.0005 | 1.8700 | 150.5 | 0.00013 |

TABLE 9-continued

Activation of T1R1/T1R3 by purine-based nucleotide derivatives

| Chemical Name | Chemical Structure | CAS No. | $EC_{50}$-with Ala (mM) | Max resp. (ΔF/F) | Max. resp. % of IMP | Thresh-old (mM) |
|---|---|---|---|---|---|---|
| 6-Chloropurineriboside-5'-O-monophosphate, sodium salt | 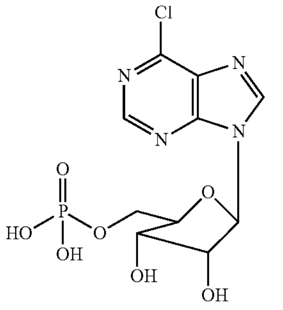 [SMILES: O=P(O)(O)OCC1OC(n2cnc3c(Cl)ncnc32)C(O)C1O] | 5843-59-4 | 0.002 | 1.5325 | 123.3 | 0.0005 |
| Purine riboside-5'-O-monophosphate (5'-PuMP) | 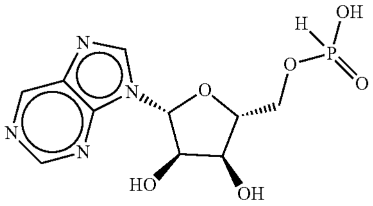 | 4578-31-8 | 0.02 | 2.0266 | 209.3 | 0.005 |

TABLE 10

Activation of T1R1/T1R3 by xanthosine

| Chemical Name | Chemical Structure | CAS No. | $EC_{50}$-with Ala (mM) | Max resp. (ΔF/F) | Max. resp. % of IMP | Thresh-old (mM) |
|---|---|---|---|---|---|---|
| Xanthosine 5'-Monophosphate Disodium Salt (XMP) | 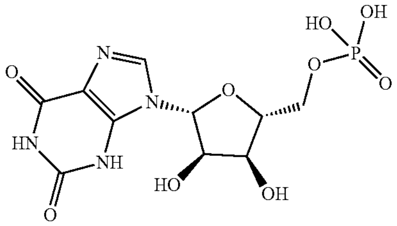 [SMILES: O=c1[nH]c(=O)c2ncn([C@@H]3O[C@H](COP(=O)(O)O)[C@@H](O)[C@H]3O)c2[nH]1] | 25899-70-1 | 0.1 | 1.6223 | 167.6 | 0.025 |

TABLE 11

Activation of T1R1/T1R3 by inosine and inosine-based nucleotide derivatives

| Chemical Name | Chemical Structure | CAS No. | $EC_{50}$-with Ala (mM) | Max resp. (ΔF/F) | Max. resp. % of IMP | Thresh-old (mM) |
|---|---|---|---|---|---|---|
| 6-Thioinosine Phosphate | 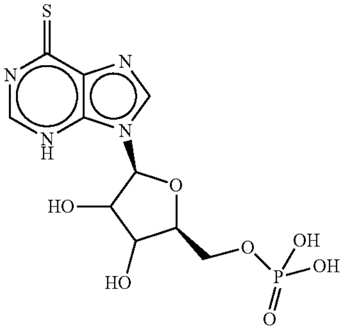 | 53-83-8 | 0.02 | 1.3875 | 111.7 | 0.005 |
| Inosine 5'-monophosphate disodium salt (IMP) | 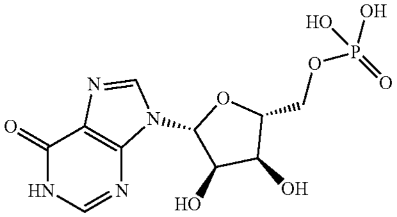 [SMILES: O=c1[nH]cnc2c1ncn2[C@@H]1O[C@H](COP(=O)(O)O)[C@@H](O)[C@H]1O] | 352195-40-5 | 0.07 | 0.8681 | 89.7 | 0.018 |
| Inosine Triphosphate (ITP) trisodium salt | 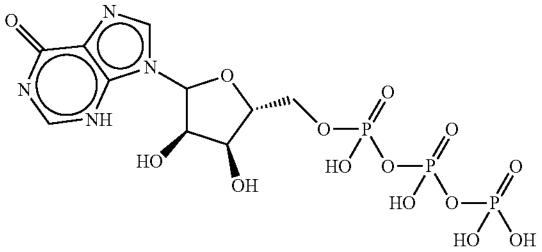 | 35908-31-7 | 0.08 | 0.3 | 25.1 | 0.02 |
| 2'-Deoxyinosine-5'-O-monophosphorothioate, sodium salt | 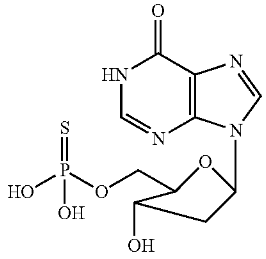 [SMILES: O=c1[nH]cnc2c1ncn2C1CC(O)C(COP(O)(O)=S)O1] | 771477-45-3 | 0.1 | 1.0375 | 83.5 | 0.025 |
| Inosine 5'-diphosphate (IDP) sodium salt | 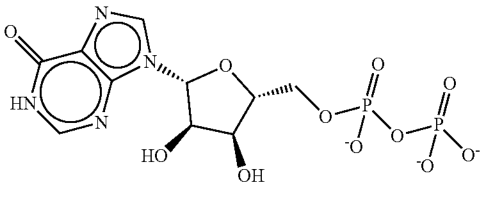 | 81012-88-6 | 0.65 | 0.3 | 33.3 | 0.1625 |

TABLE 12

Activation of T1R1/T1R3 by uridine and uridine-based nucleotide derivatives

| Chemical Name | Chemical Structure | CAS No. | $EC_{50}$- with Ala (mM) | Max resp. (ΔF/F) | Max. resp. % of IMP | Thresh-old (mM) |
|---|---|---|---|---|---|---|
| Uridine 5'-monophosphomorpholidate 4-morpholine-N,N'-dicyclohexylcarboxamide salt | 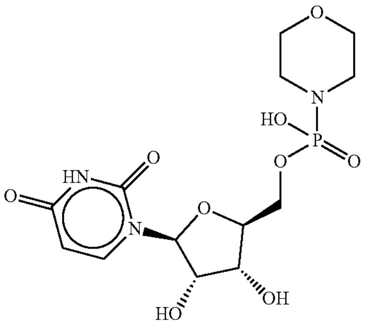 | 24558-91-6 | >3 | 1.0150 | 104.8 | 2.000 |
| 2'-Deoxyuridine-5'-O-monophosphosphorothioate (5'-dUMPS) | 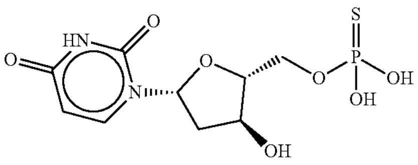 | 205379-91-5 | >30 | 0.4200 | 43.4 | 5.000 |
| Uridine 5'-monophosphate disodium salt (UMP) | 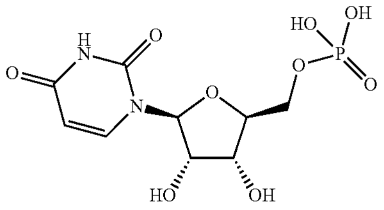 [SMILES: O=c1ccn([C@H]2O[C@@H](COP(=O)(O)O)[C@H](O)[C@@H]2O)c(=O)[nH]1] | 3387-36-8 | >30 | 0.2316 | 23.9 | 3.000 |

TABLE 13

Activation of T1R1/T1R3 by cytidine

| Chemical Name | Chemical Structure | CAS No. | $EC_{50}$- with Ala (mM) | Max resp. (ΔF/F) | Max. resp. % of IMP | Thresh-old (mM) |
|---|---|---|---|---|---|---|
| Cytidine 5'-monophosphate (CMP) | 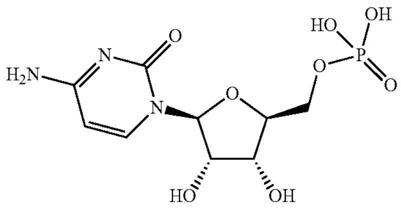 [SMILES: Nc1ccn([C@H]2O[C@@H](COP(=O)(O)O)[C@H](O)[C@@H]2O)c(=O)n1] | 63-37-6 | 5.7 | 0.3066 | 31.7 | 1.425 |

TABLE 14

| Activation of T1R1/T1R3 by miscellaneous nucleotide derivatives | | | | | | |
|---|---|---|---|---|---|---|
| Chemical Name | Chemical Structure | CAS No. | $EC_{50}$-with Ala (mM) | Max resp. (ΔF/F) | Max. resp. % of IMP | Thresh-old (mM) |
| Ribavirin 5'-Monophosphate, Dilithium salt | 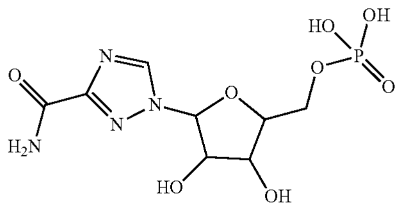 [SMILES: NC(=O)c1ncn(C2OC(COP(=O)(O)O)C(O)C2O)n1] | 66983-94-6 | 0.7 | 1.5294 | 158.0 | 0.175 |
| 5-Amino-imidazole-4-carboxamide-1-β-D-ribofuranosyl 5'-monophosphate (AICAR) | 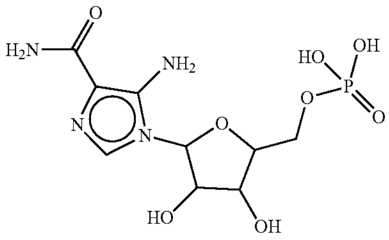 | 3031-94-5 | >1 | 0.6985 | 72.2 | 0.200 |
| 6-Thio-guanosine-5'-O-diphosphate | 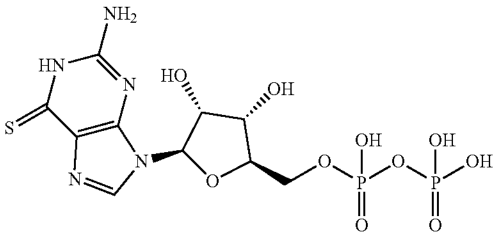 [SMILES: Nc1nc2c(ncn2[C@@H]2O[C@H](COP(=O)(O)OP(=O)(O)O)[C@@H](O)[C@H]2O)c(=S)[nH]1] | 16541-19-8 | 0.18 ± 0.02 | 1.047 | 152.8 | 0.03 |
| 6-Chloropurine riboside-5'-O-triphosphate | 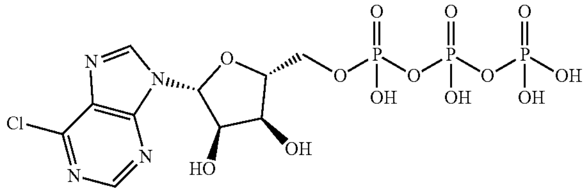 [SMILES: O=P(O)(O)OP(=O)(O)OP(=O)(O)OC[C@H]1O[C@@H](n2cnc3c(Cl)ncnc32)[C@H](O)[C@@H]1O] | 55673-61-5 | >0.03 | 0.345 | 50.4 | 0.01 |

TABLE 15

| Modulation of T1R1/T1R3 by nucleotide derivatives | | | | | |
|---|---|---|---|---|---|
| | | + Alanine (20 mM) | | | |
| Compound Name | Activity | $EC_{50}$ (mM) | Max resp ΔF/F | Max resp % of IMP | Thres (mM) |
| N6-Cyclopentyladenosine-5'-O-monophosphate (6-cPe-5'-AMP) | active | 0.05 | 1.2317 | 127.2 | 0.013 |
| 8-(4-Chlorophenylthio)adenosine-5'-O-monophosphate (8-pCPT-5'-AMP) | unknown | N/D | N/D | N/D | N/D |
| 1,N6-Ethenoadenosine-5'-O-monophosphate (ϵ-5'-AMP) | active | 0.04 | 1.4766 | 152.5 | 0.010 |
| Guanosine-3'-O-monophosphate (3'-GMP) | N/A | N/D | N/D | N/D | N/D |
| Guanosine-2',3'-cyclic monophosphate | N/A | N/D | N/D | N/D | N/D |
| Purine riboside-5'-O-monophosphate (5'-PuMP) | active | 0.02 | 2.0266 | 209.3 | 0.005 |
| 6-Azauridine-5'-monophosphate<br>6-Aza-D-uridine-5'-monophosphate | unknown | N/D | N/D | N/D | N/D |
| 1-(b-D-Arabinofuranosyl)cytosine5'-monophosphate | unknown | N/D | N/D | N/D | N/D |
| 5-(6-amino-9H-purin-9-yl)-3,4-dihydroxytetrahydro-2-furancarboxylic acid | unknown | N/D | N/D | N/D | N/D |
| [Di-deoxy thymidine] or SODIUM (5-(5-METHYL-2,4-DIOXO-3,4-DIHYDROPYRIMIDIN-1(2H)-YL) TETRAHYDROFURAN-2-YL)METHYL PHOSPHATE | N/A | N/D | N/D | N/D | N/D |

TABLE 15-continued

Modulation of T1R1/T1R3 by nucleotide derivatives

| Compound Name | Activity | + Alanine (20 mM) EC$_{50}$ (mM) | Max resp ΔF/F | Max resp % of IMP | Thres (mM) |
|---|---|---|---|---|---|
| Adenosine 5'-monophosphate disodium salt (AMP) | active | 0.011 | 1.5470 | 159.8 | 0.003 |
| [AICAR] or 5-Aminoimidazole-4-carboxamide-1-β-D-ribofuranosyl 5'-monophosphate | active | >1 | 0.6985 | 72.2 | 0.200 |
| 8-(6-Aminohexyl)aminoadenosine 5'-monophosphate lithium salt | N/A | N/D | N/D | N/D | N/D |
| Adenosine 5'-phosphosulfate sodium salt | active | 0.03 | 0.8658 | 89.4 | 0.008 |
| Adenosine 3',5'-diphosphate sodium salt | active | 0.001 | 0.9578 | 98.9 | 0.00025 |
| Cytidine 3',5'-cyclic monophosphate sodium salt | N/A | N/D | N/D | N/D | N/D |
| Cytidine 5'-monophosphate (CMP) | active | 5.7 | 0.3066 | 31.7 | 1.425 |
| 2'-Deoxyinosine 5'-monophosphate sodium salt | unknown | N/D | N/D | N/D | N/D |
| 2'-Deoxycytidine 5'-monophosphate | N/A | N/D | N/D | N/D | N/D |
| 2'-Deoxyguanosine 5'-monophosphate sodium salt hydrate | active | 0.24 | 0.5926 | 61.2 | 0.060 |
| Guanosine 3',5'-cyclic monophosphate sodium salt | N/A | N/D | N/D | N/D | N/D |
| Guanosine 5'-monophosphomorpholidate 4-morpholine-N,N'-dicyclohexylcarboxamidine salt | active | 1.3 | 0.5121 | 52.9 | 0.325 |
| Inosine 3':5'-cyclic monophosphate sodium salt | N/A | N/D | N/D | N/D | N/D |
| N6-Methyladenosine 5'-monophosphate sodium salt | active | 0.08 | 0.9907 | 102.3 | 0.020 |
| D-Ribose 5-phosphate disodium salt hydrate | unknown | N/D | N/D | N/D | N/D |
| Sucrose 6'-monophosphate dipotassium salt | unknown | N/D | N/D | N/D | N/D |
| Thymidine 5'-monophosphate disodium salt hydrate (TMP) | N/A | N/D | N/D | N/D | N/D |
| Thiamine monophosphate chloride dihydrate | unknown | N/D | N/D | N/D | N/D |
| Uridine 5'-monophosphomorpholidate 4-morpholine-N,N'-dicyclohexylcarboxamidine salt | active | >3 | 1.0150 | 104.8 | 2.000 |
| Uridine 5'-monophosphate disodium salt (UMP) | active | >30 | 0.2316 | 23.9 | 3.000 |
| Abacavir 5'-Phosphate | unknown | N/D | N/D | N/D | N/D |
| Acyclovir Monophosphate | N/A | N/D | N/D | N/D | N/D |
| Acycloguanosine Monophosphate | | | | | |
| Ribavirin 5'-Monophosphate, Dilithium Salt | active | 0.7 | 1.5294 | 158.0 | 0.175 |
| Tenofovir | N/A | N/D | N/D | N/D | N/D |
| 5'-Tosyl Adenosine | unknown | N/D | N/D | N/D | N/D |
| Xanthosine 5'-Monophosphate Disodium Salt (XMP) | active | 0.1 | 1.6223 | 167.6 | 0.025 |
| Adenosine, 5'-(dihydrogen phosphorothioate) | active | 0.011 | 1.2435 | 128.4 | 0.003 |
| Adenosine- 5'-O-monophosphorothioate (5'-AMPS) | | | | | |
| Cytidine-5'-O-monophosphorothioate (5'-CMPS) | N/A | N/D | N/D | N/D | N/D |
| Cytidine-3'-O-monophosphate (3'-CMP) | N/A | N/D | N/D | N/D | N/D |
| 7-Deazaadenosine-5'-O-monophosphate (7-CH-5'-AMP/5'-TuMP) | active | 0.75 | 0.4979 | 51.4 | 0.188 |
| 2'-Deoxyguanosine-5'-O-monophosphorothioate (5'-dGMPS) | active | 0.02 | 0.8446 | 87.2 | 0.005 |
| 2'-Deoxyuridine-5'-O-monophosphosphorothioate (5'-dUMPS) | active | >30 | 0.4200 | 43.4 | 5.000 |
| 2'-, 3'-O-(N'-Methylanthraniloyl)guanosine-5'-O-monophosphate (MANT-5'-GMP) | active | 0.0056 | 0.7190 | 74.3 | 0.0014 |
| Fluorescent analogue of 5'-GMP | active | 0.0009 | 1.3614 | 140.6 | 0.0002 |
| 6-Thioguanosine-5'-O-monophosphate (6-T-5'-GMP) | N/A | N/D | N/D | N/D | N/D |
| 6-[(4-Nitrobenzyl)thio]-9-b-D-ribofuranosylpurine-5'-monophosphate disodium salt | | | | | |
| Uridine 3'-monophosphate disodium salt | N/A | N/D | N/D | N/D | N/D |
| Adenosine 5'-monophosphomorpholidate 4-morpholine-N,N'-dicyclohexylcarboxamidine salt | unknown | N/D | N/D | N/D | N/D |
| Adenylosuccinic acid | N/A | N/D | N/D | N/D | N/D |
| 2'-Deoxyuridine 5'-monophosphate disodium salt | N/A | N/D | N/D | N/D | N/D |
| 2'-Deoxyadenosine 5'-monophosphate | active | 0.14 | 1.1503 | 118.8 | 0.035 |
| Nicotinic acid mononucleotide | unknown | N/D | N/D | N/D | N/D |
| Orotidine 5'-monophosphate trisodium salt | unknown | N/D | N/D | N/D | N/D |
| Adefovir | unknown | N/D | N/D | N/D | N/D |
| Lamivudine 5'-monophosphate sodium salt | N/A | N/D | N/D | N/D | N/D |
| Guanosine monophosphate (GMP)-disodium salt | active | 0.03 | 1.2786 | 132.1 | 0.008 |
| N-Lactoyl-5'-GMP | active | 0.1 | 1.3600 | 140.5 | 0.025 |
| N-Acetyl-5'-GMP | active | 0.1 | 1.3351 | 137.9 | 0.025 |
| N-gluconyl ethanolamine phosphate | unknown | N/D | N/D | N/D | N/D |
| Inosine 5'-monophosphate disodium salt (IMP) | active | 0.07 | 0.8681 | 89.7 | 0.018 |
| Triciribine phosphate | N/A | N/D | N/D | N/D | N/D |
| Tricyclic Nucleoside Monophosphate (TCN-P) | | | | | |
| Guanosine 5'-triphosphate sodium salt hydrate | active | 0.7 | 1.8075 | 145.5 | 0.175 |
| 8-Bromoadenosine 5'-monophosphate | N/A | N/D | N/D | N/D | N/D |
| Cytidine 5'-diphosphocholine sodium salt hydrate | N/A | N/D | N/D | N/D | N/D |
| Guanosine 5'-diphosphate sodium salt | active | 0.2 | 1.7550 | 141.2 | 0.050 |
| MRS 2179 ammonium salt hydrate | active | 0.05 | 1.8150 | 146.1 | 0.013 |
| beta-Nicotinamide adenine dinucleotide hydrate | unknown | N/D | N/D | N/D | N/D |
| Thymidine 5'-monophosphate disodium salt hydrate | unknown | N/D | N/D | N/D | N/D |
| 6-Thioinosine Phosphate | active | 0.02 | 1.3875 | 111.7 | 0.005 |
| ((2S,3R,4S)-5-(6-(benzylamino)-9H-purin-9-yl)-3,4-dihydroxytetrahydrofuran-2-yl)methyl dihydrogen phosphate | unknown | N/D | N/D | N/D | N/D |

TABLE 15-continued

| Modulation of T1R1/T1R3 by nucleotide derivatives | | | | | | |
|---|---|---|---|---|---|---|
| | | + Alanine (20 mM) | | | | |
| Compound Name | Activity | $EC_{50}$ (mM) | Max resp ΔF/F | Max resp % of IMP | Thres (mM) |
| 2'-Deoxy-1,N6-ethenoadenosine-5'-O-monophosphate | active | 0.2 | 0.87 | 70.0 | 0.05 |
| 2'-Deoxycytidine-3',5'-O-bisphosphate | N/A | N/D | N/D | N/D | N/D |
| 2-Amino-6-chloropurineriboside-5'-O-monophosphate | active | 0.0005 | 1.8700 | 150.5 | 0.00013 |
| 2'-Amino-2'-deoxyadenosine-5'-O-diphosphate | unknown | N/D | N/D | N/D | N/D |
| 3'-Amino-3'-deoxyadenosine-5'-O-diphosphate | unknown | N/D | N/D | N/D | N/D |
| N6-Benzyladenosine-5'-O-diphosphate_sodiumsalt | unknown | N/D | N/D | N/D | N/D |
| 8-Bromoguanosine-5'-O-monophosphate | active | CNBD | 0.375 | 30.2 | 1 |
| 8-Chloroadenosine-5'-O-monophosphate,sodiumsalt | active | 0.8 | 0.79 | 63.6 | 0.2 |
| 6-Chloropurineriboside-5'-O-monophosphate,sodiumsalt | active | 0.002 | 1.5325 | 123.3 | 0.0005 |
| 2-Chloroadenosine-5'-O-monophosphate,sodiumsalt | unknown | N/D | N/D | N/D | N/D |
| N6-Cyclopentyladenosine-5'-O-diphosphate,sodiumsalt 6-cPe-ADP | N/A | N/D | N/D | N/D | N/D |
| 2'-Deoxyadenosine-5'-O-monophosphorothioate,sodiumsalt 5'-dAMPS | active | 0.06 | 1.0375 | 83.5 | 0.015 |
| 2'-Deoxyguanosine-5'-O-monophosphorothioate,sodiumsalt | active | 0.01 | 1.0775 | 86.7 | 0.0025 |
| 2'-Deoxyinosine-5'-O-monophosphorothioate,sodiumsalt | active | 0.1 | 1.0375 | 83.5 | 0.025 |
| 2'-Deoxy-3'-O-(N'-methylanthraniloyl)adenosine-5'-O-monophosphate | active | 0.01 | 0.3975 | 32.0 | 0.0025 |
| 2'-Deoxy-3'-O-(N'-methylanthraniloyl)guanosine-5'-O-monophosphate | active | 0.01 | 0.295 | 23.7 | 0.0025 |
| 2'-Deoxy-3'-O-(N'-methylanthraniloyl)guanosine-5'-O-diphosphate MANT-dGDP | N/A | N/D | N/D | N/D | N/D |
| 2'-Deoxyguanosine-3',5'-O-bisphosphate | active | 0.02 | 1.8925 | 152.3 | 0.005 |
| 1,N6-Ethenoadenosine-5'-O-diphosphate,sodiumsalt | unknown | N/D | N/D | N/D | N/D |
| Guanosine-5'-O-(1-thiodiphosphate),sodiumsalt,Sp-isomer | N/A | N/D | N/D | N/D | N/D |
| Guanosine-5'-monophosphorothioate sodium salt 5'-GMPS | active | 0.01 | 1.29 | 103.8 | 0.0025 |
| Guanosine-5'-O-(2-thiodiphosphate) | active | 0.01 | 0.5875 | 47.3 | 0.0025 |
| Guanosine-5'-O-(a,β-methylene)diphosphate | N/A | N/D | N/D | N/D | N/D |
| 2-Methylthioadenosine-5'-O-diphosphate,sodiumsalt | unknown | N/D | N/D | N/D | N/D |
| N6-(1-Methylbutyl)-ADP,sodiumsalt | N/A | N/D | N/D | N/D | N/D |
| 2'-/3'-O-(N'-Methyl-anthraniloyl)adenosine-5'-O-monophosphate sodium salt MANT-AMP | active | 0.01 | 1.915 | 154.1 | 0.0025 |
| N6-(2-Phenylethyl)adenosine-5'-O-diphosphate sodium salt 6-PhEt-ADP | N/A | N/D | N/D | N/D | N/D |
| N6-Phenyladenosine-5'-O-diphosphate,sodiumsalt | N/A | N/D | N/D | N/D | N/D |
| 2-Methylthioadenosine-5'-O-monophosphate sodium salt 2-MeS-AMP | unknown | N/D | N/D | N/D | N/D |
| Inosine 5'-diphosphate (IDP) sodium salt | active | 0.65 | 0.3 | 33.3 | 0.1625 |
| 2'-/3'-O-(2-Aminoethy lcarbamoyl)adenosine-5'-O-monophosphate; 2'-/3'-AEC-5'-AMP | active | 0.09 | 2.2 | 213.9 | 0.0225 |
| 2'-/3'-O-(2-Aminoethylcarbamoyl) guanosine-5'-O-monophosphate; 2'-/3'-AEC-5'-GMP | active | 0.14 | 1.1 | 109.5 | 0.035 |
| Inosine Triphosphate (ITP) trisodium salt | active | 0.08 | 0.3 | 25.1 | 0.02 |
| N6-Benzoyladenosine-5'-O-monophosphate; 6-Bnz-5'-AMP | active | >1 | 1.1 | 105.6 | 0.3 |
| 7-Deaza-2'-deoxyadenosine-5'-O-monophosphate (7-CH-5'-dAMP/5'-dTuMP) | N/A | N/D | N/D | N/D | N/D |
| 2'-Deoxyadenosine-3',5'-O-bisphosphate | active | 0.02 | 0.8 | 76.4 | 0.005 |
| N6-(6-Aminohexyl)adenosine 2',5'-diphosphate | N/A | N/D | N/D | N/D | N/D |
| Adenosine 5'-O-thiomonophosphate dilithium salt | active | 0.06 | 1.4 | 139.4 | 0.015 |
| Riboflavin Phosphate Sodium Salt | unknown | N/D | N/D | N/D | N/D |
| Cytidine sulphate | N/A | N/D | N/D | N/D | N/D |
| 2'-Deoxyuridine-5'-O-monophosphorothioate (5'-dUMPS) | N/A | N/D | N/D | N/D | N/D |
| 2'-Deoxycytidine-5'-O-monophosphorothioate (5'-dCMPS) | unknown | N/D | N/D | N/D | N/D |
| Uridine-5'-O-monophosphorothioate (5'-UMPS) | N/A | N/D | N/D | N/D | N/D |

N/D = Not determined
N/T = Not tested
N/A = Not active
CNBD = Could not be determined

TABLE 16

| Positive and negative controls. Amino acid EC50's were measured in the presence of 0.2 mM IMP. | | |
|---|---|---|
| Type of control | Compound Name | $EC_{50}$ (mM) |
| Positive | L-Alanine | 13.6 ± 4.3 mM |
| | L-Serine | 31.5 ± 2.3 mM |
| | L-Cysteine | 39.5 ± 1.9 mM |
| | L-Phenylalanine | 1.9 ± 0.1 mM |

TABLE 16-continued

| Positive and negative controls. Amino acid EC50's were measured in the presence of 0.2 mM IMP. | | |
|---|---|---|
| Type of control | Compound Name | $EC_{50}$ (mM) |
| | L-Tryptophan | 0.9 ± 0.1 mM |
| | L-Histidine | 10.2 ± 1.7 mM |
| | L-Methionine | 25.5 ± 3.7 mM |
| | L-Tyrosine | 10.3 ± 0.9 mM |

TABLE 16-continued

| Positive and negative controls. Amino acid EC50's were measured in the presence of 0.2 mM IMP. | | |
|---|---|---|
| Type of control | Compound Name | $EC_{50}$ (mM) |
| Negative | L-Proline | — |
| | MSG | — |
| | Quinine HCL | — |
| | D-Glucose | — |

Example 3—Identification of T1R1 Nucleotide and Amino Acid Interacting Domains The present example describes the in silico identification of amino acids within T1R1 that interact with nucleotides and amino acids that bind to T1R1.

Methods:

The cat T1R1 is a Group C G protein-coupled receptor (GPCR) that complexes with T1R3 to form an umami taste receptor heterodimer. A model of the cat T1R1 Venus Flytrap domain (VFT domain) was built using the crystal structure of metabotropic glutamate receptor 1EWT, another Group C GPCR (Kunishima et al., Nature 407: 971-977 (2000)), which is available from the Protein Data Bank (Berman et al., Nucleic Acids Research, 28: 235-242 (2000)). Crystal structures of VFT's of Group C GPCR's, including metabotropic glutamate receptors mGluR1, mGluR3, mGluR5, and mGluR7, show remarkably similar modes of ligand binding to the active site cleft of the VFT's. These ligand binding modes were used to manually align the cat T1R1 VFT sequence to the sequence profile of metabotropic glutamate receptors. Subsequently, this alignment was used to perform homology modeling using the Modeller software package (Eswar et al., Curr Protoc Bioinformatics, John Wiley & Sons, Inc., Supplement 15, 5.6.1-5.6.30 (2006)).

Modeling Amino Acids into the Active Site of T1R1:

Alanine (L-alanine) was initially positioned in the active site of the cat T1R1 VFT model following the placement of the zwitterionic backbone of glutamate in mGluR crystal structures. The resulting complex was refined using molecular dynamics and energy minimization. The binding energy was estimated by calculating the difference between the calculated energy of the complex and the calculated energy for the isolated ligand and apo protein using a continuum model for water. Other amino acids were built onto the bound alanine scaffold using Discovery Studio (Dassault Systemes, BIOVIA Corp., San Diego, CA, USA), and refined using molecular dynamics and energy minimization (Brooks et al., J Comput Chem. 30(10):545-614 (2009)). Final models were selected for the amino acids as those whose calculated binding energies were comparable to that of alanine, and that also retained conserved interactions to the hinge observed in mGluR crystal structures.

Modeling Nucleotides into the Active Site of T1R1:

IMP and GMP were initially positioned into the cat T1R1 VFT active site following previously published modeling of IMP into human T1R1, such as described by Zhang et. al. (Zhang et al., Proc Natl Acad Sci USA. 105(52):20930-4 (2008)). Nucleotide torsional bonds were varied and resulting models refined using molecular dynamics and energy minimization. Final models were selected as those whose binding energies were comparable to that of GMP, and that also exhibited nucleotide interactions to conserved residues established as important for IMP binding to human T1R1 by site-directed mutagenesis (Zhang et al., Proc Natl Acad Sci USA. 105(52):20930-4 (2008)). Other nucleotide and nucleotide analogs were initially overlapped with the IMP and GMP models and then subjected to the same refinement, evaluation, and selection procedure described for IMP and GMP.

Figure 14:
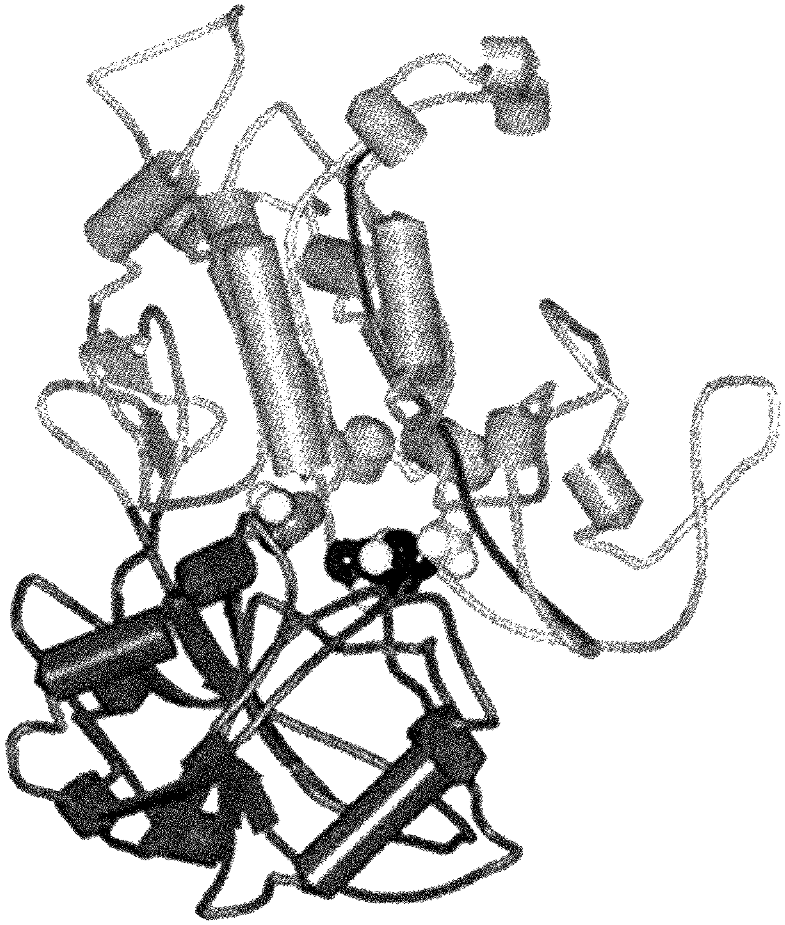
FIG. 14 shows an overall structural model of the VFT domain of cat T1R1/T1R3 bound to IMP and L-Alanine. L-Alanine and IMP are shown bound in the active site between the upper and lower globes of the VFT domain.

Results:

The cat T1R1 VFT domain consists of two lobes as shown in FIG. 14. The upper lobe and the lower lobe are connected by three strands of protein called the hinge. In FIG. 14, the upper lobe is to the top in the figure; the lower lobe is to the bottom in the figure. The hinge is to the left. The flytrap domain transitions from an open to a closed conformation on agonist binding. Active amino acids and nucleotides bind to the VFT domain between the two lobes (see FIG. 14). Amino acids bind to a region near the hinge (see FIG. 14: alanine is shown in CPK space filling rendering to the left in the figure). Nucleotides bind to a region more distal to the hinge but still located between the lobes of the flytrap (see FIG. 14: IMP is shown in CPK space filling rendering to the right in the figure).

Figure 15:
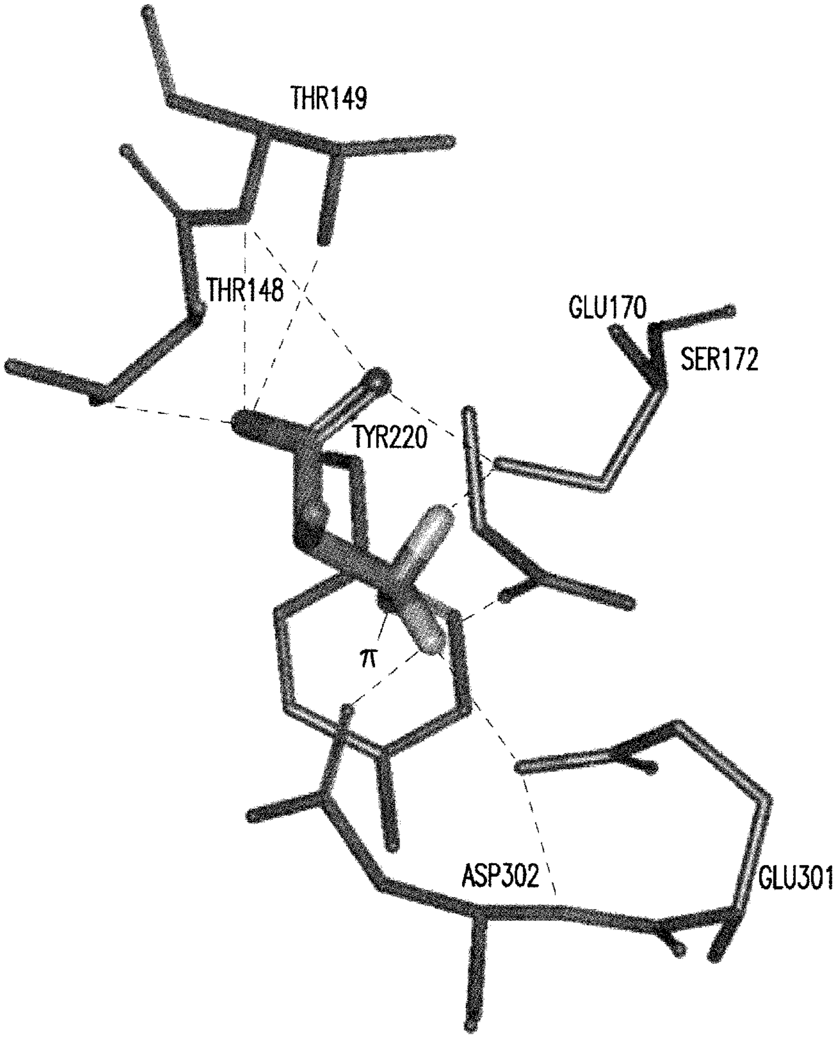
FIG. 15 shows a model of the cat T1R1 VFT bound to L-Alanine. L-Alanine binds to a hinge region of the VFT domain. Putative hydrogen bond, salt-bridge, and Pi-cation interactions are shown between L-Alanine and the following T1R1 amino acids: Thr149, Ser172, Tyr220, Thr148, Glu170, and Asp302. The interactions are shown as dotted lines. Glu170, and Asp302 coordinate the zwitterionic nitrogen of bound amino acids while electrostatically disfavoring binding of L-Glutamate and L-aspartic acid, the native ligands for the human umami receptor.

Amino Acid Binding:

Amino acid ligands bind to the hinge region of the VFT as shown in FIG. 14, and are well-coordinated by interactions near the hinge. FIG. 15 shows an example binding mode for L-alanine illustrating possible hydrogen bonds, salt-bridge interactions, and Pi-cation interactions to Thr149, Ser172, Tyr220, Thr148, Glu170, and Asp302. These interactions are shown as dotted lines.

Thr149, Ser172, and Tyr220 residues were established as important to L-glutamate binding in the human umami receptor by site-directed mutagenesis (Zhang et al., Proc Natl Acad Sci USA. 105(52):20930-4 (2008)). Mouse Asn149, which corresponds to Thr148 in cat, was shown to be important to amino acid binding in mouse (Toda et. al., J. Biol. Chem 288:36863-36877 (2013)). Glu170 and Asp302 are present in cat and mouse T1R1, but not in human. In humans, the amino acids at these positions are alanine. Human T1R1/T1R3 is highly selective for L-Glutamate and L-Aspartic Acid. By contrast, cat and mouse T1R1/T1R3 respond to a broad range of amino acids. In the model described by the present example, Glu170 and Asp302 help coordinate the zwitterionic nitrogen of amino acid ligands that fit the active site of T1R1, while simultaneously establishing an electrostatic environment that is inhospitable to binding L-Glutamate and L-Aspartic Acid. Using site directed mutagenesis Toda et. al. demonstrated that Glu170 and Asp302 are responsible for the observed difference in amino-acid ligand preferences between cat and human (Toda et. al., J. Biol. Chem 288:36863-36877 (2013)).

Figure 16:
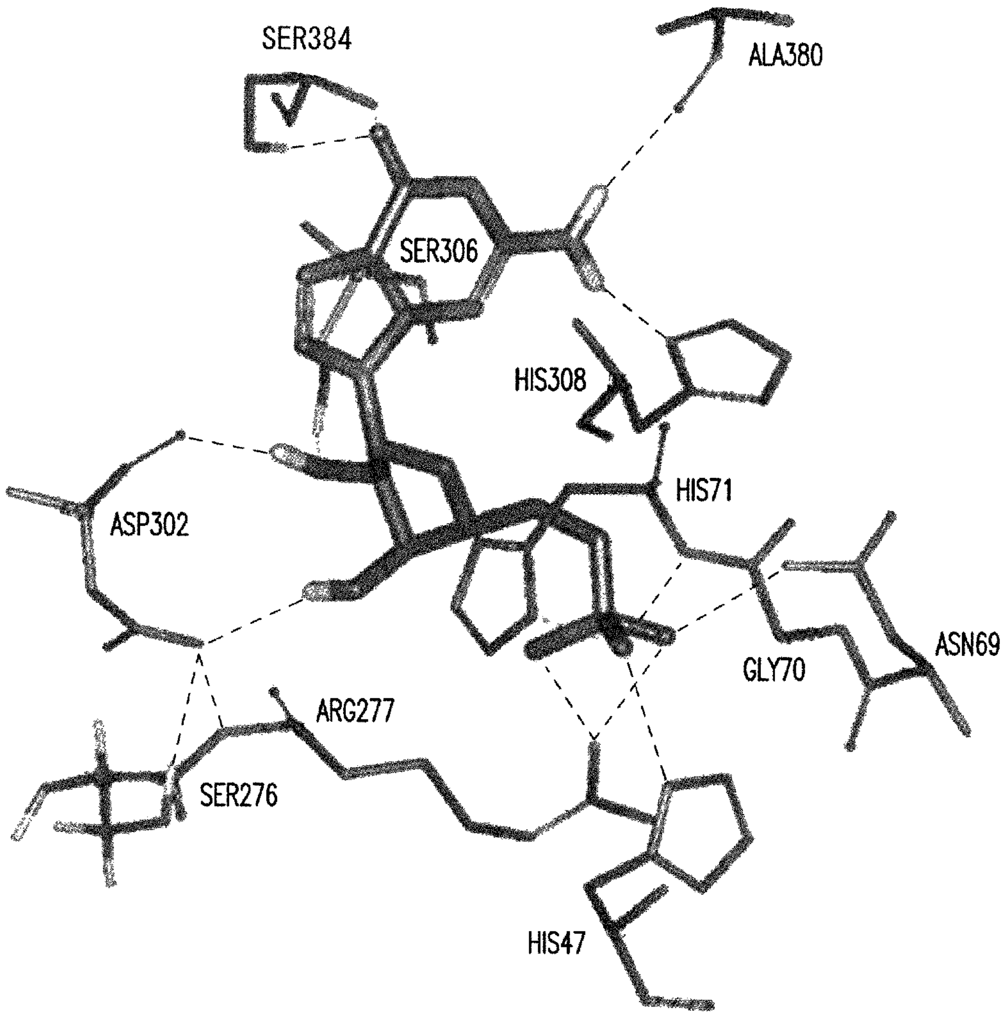
FIG. 16 shows an in silico model of the cat T1R1 VFT bound to GMP. Putative hydrogen bond and salt bridge interactions are shown as dotted lines between the phosphate of GMP and His47, His71, Arg277, and Asn69; the sugar of GMP and Asp302 and Ser306; and the GMP base and Ser384, His308, and Ala380.

Nucleotide Binding:

Nucleotides bind to a position that is more distal to the hinge than do amino acids, as illustrated in FIG. 14. FIG. 16 shows an example binding mode for GMP. Possible hydrogen bond and salt bridge interactions to the phosphate of GMP and T1R1 His47, His71, Arg277, and Asn69; the sugar of GMP and T1R1 Asn302 and Ser306; and the GMP base and T1R1 Ser384, His308, and Ala380. These interactions are shown as dotted lines.

His308 is shown coordinating the base of GMP but may also swing to coordinate GMP's phosphate. Additional hydrophobic interactions that add to the interaction energy of the ligand to the VFT are also present, and the flexibility of the different binding sites can vary (data not shown). Different nucleotides may exhibit different interactions with T1R1, but may overlap with the interactions described herein for GMP. Structure-activity relationships (SAR) and the T1R1 model suggest that the presence of a negatively charged group in the phosphate binding region of T1R1 is important to the binding of a nucleotide to T1R1. SAR and the model suggest that the presence of a nucleotide base, an extended base, a substituted base, or other bioisosteric replacement for the nucleotide base that can form interactions in the nucleotide base binding region of T1R1 is also important for binding (for examples of bases see Limbach et. al., Nucleic Acids Research 22(12): 2183-2196 (1994)).

Similarly SAR and modeling suggest that the interaction between a nucleotide sugar (or sugar replacement molecule) is important for successful binding of a nucleotide to T1R1. The sugar can orient an appropriate negatively charged group to also help establish interactions between T1R1 and the phosphate region and nucleotide base region of the nucleotide.

Although different nucleotides may exhibit different interactions with T1R1, such interactions would likely conform in large part to this set of possible interactions.

Figure 17:
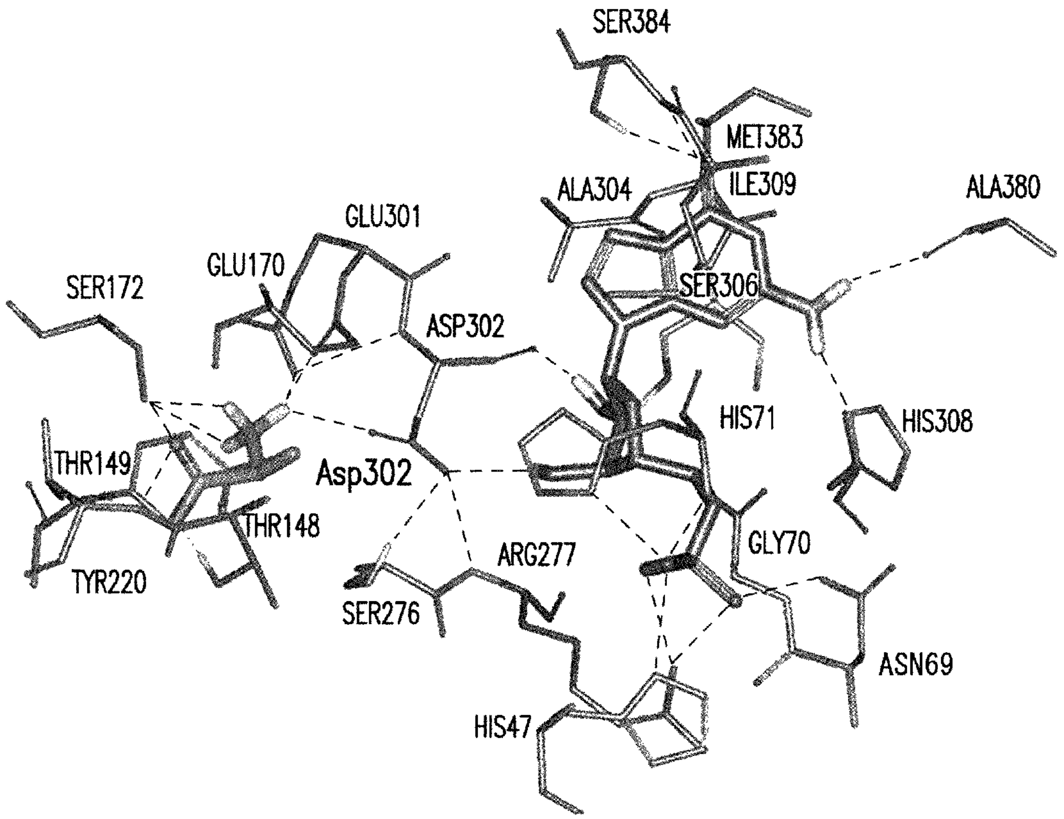
FIG. 17 shows an in silico model of the cat T1R1 VFT that shows that Asp302 of T1R1 may simultaneously coordinate the zwitterionic backbone nitrogen of a bound amino acid (L-alanine to the left) and the sugar molecule of a bound nucleotide (GMP to the right).
Figure 18:
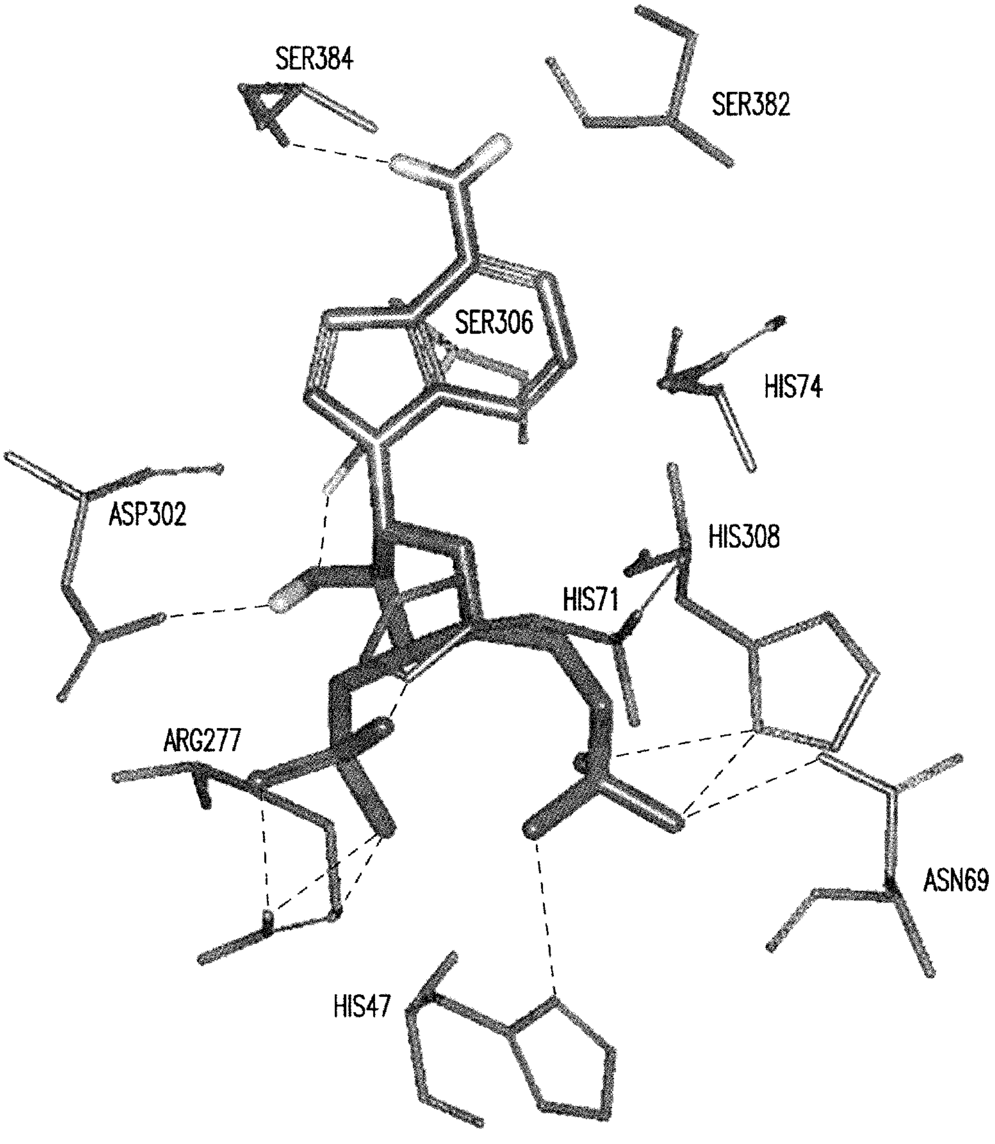
FIG. 18 shows an in silico model of the cat T1R1 VFT that shows putative interactions between T1R1 and a bound 3'5' diphosphate.
Figure 19:
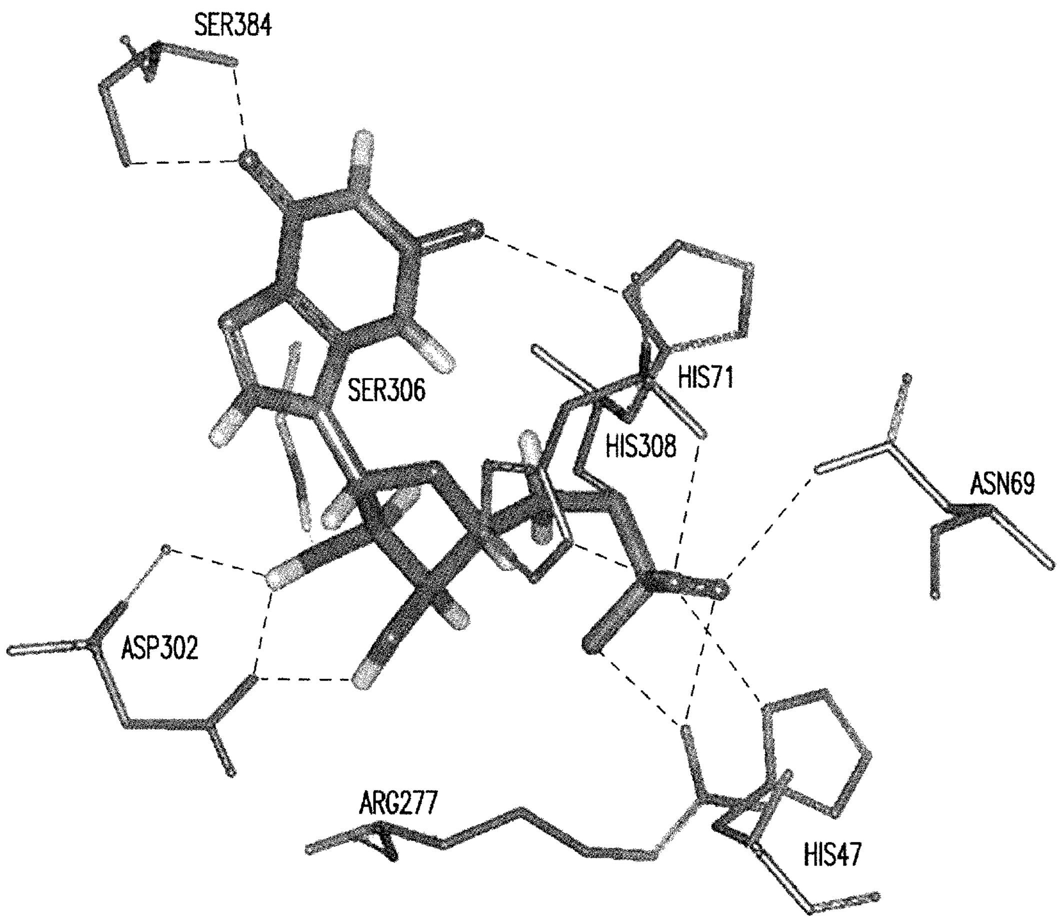
FIG. 19 shows an in silico model of the cat T1R1 VFT that shows putative interactions between T1R1 and a bound XMP.
Figure 20:
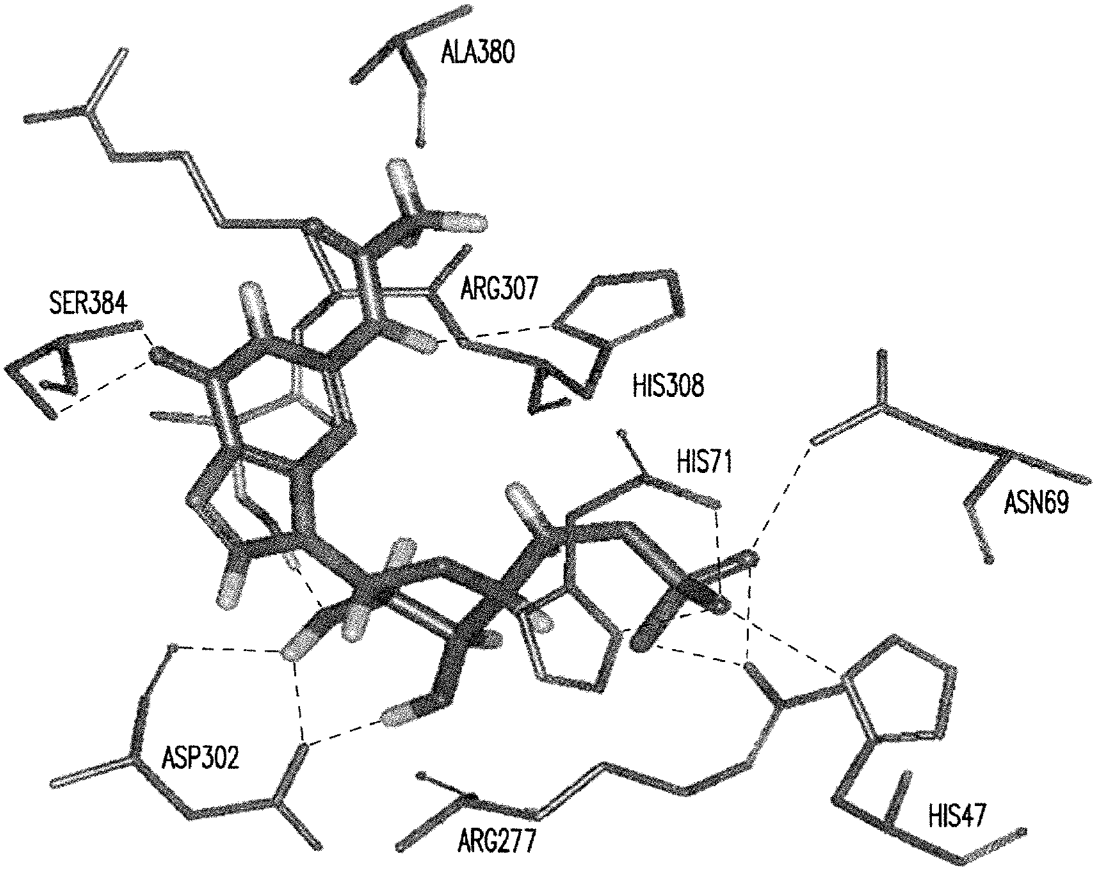
FIG. 20 shows an in silico model of the cat T1R1 VFT that shows putative interactions between T1R1 and a bound N-Acetyl-5'-GMP.
Figure 21:
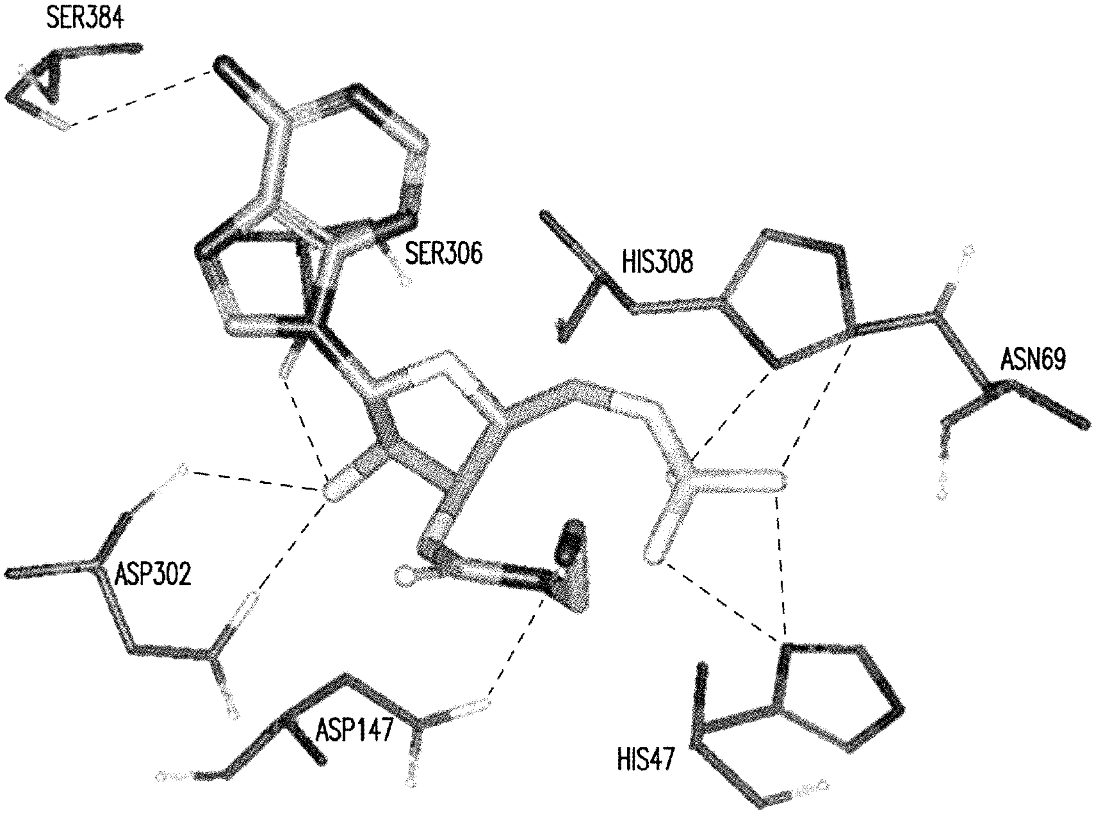
FIG. 21 shows an in silico model of the cat T1R1 VFT that shows putative interactions between T1R1 and a bound 2'-3' AEC-5'-AMP.
Figure 22:
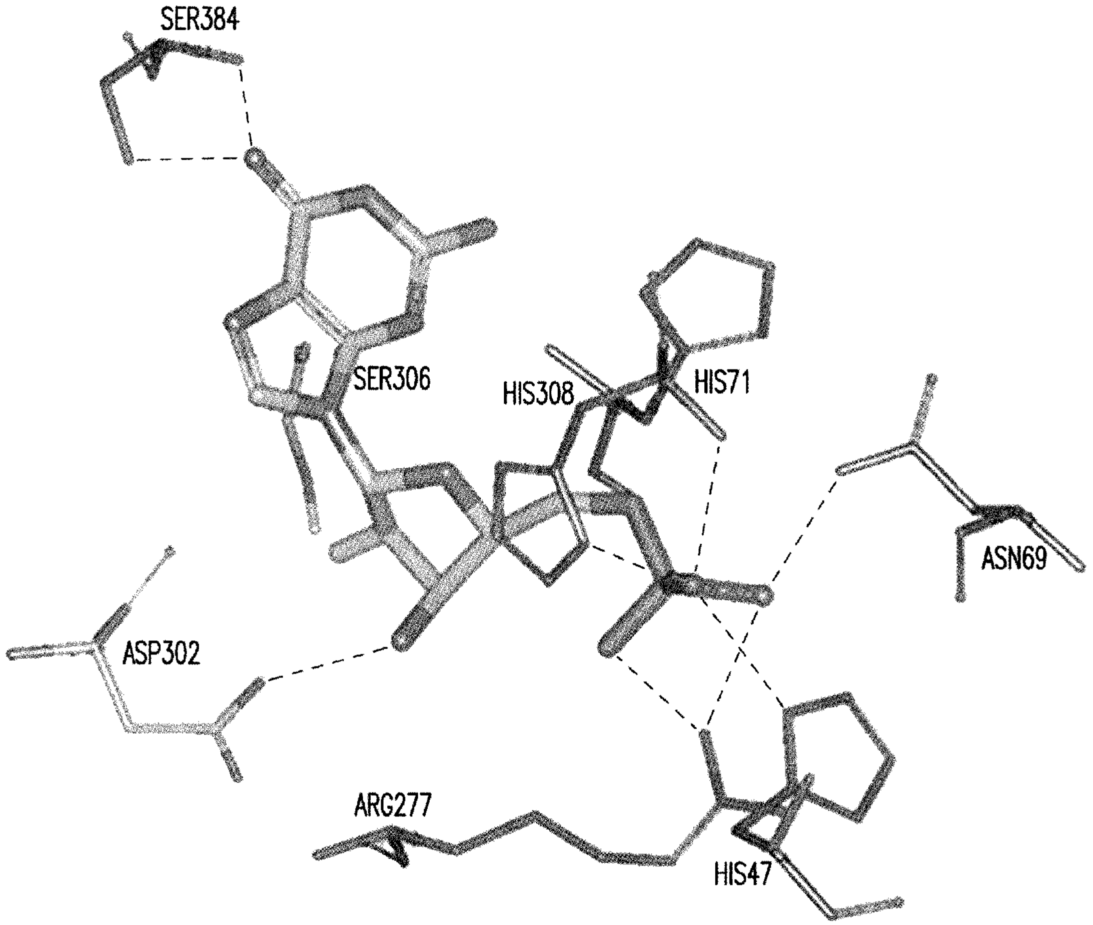
FIG. 22 shows an in silico model of the cat T1R1 VFT that shows putative interactions between T1R1 and a bound 5'd-GMPS.
Figure 23:
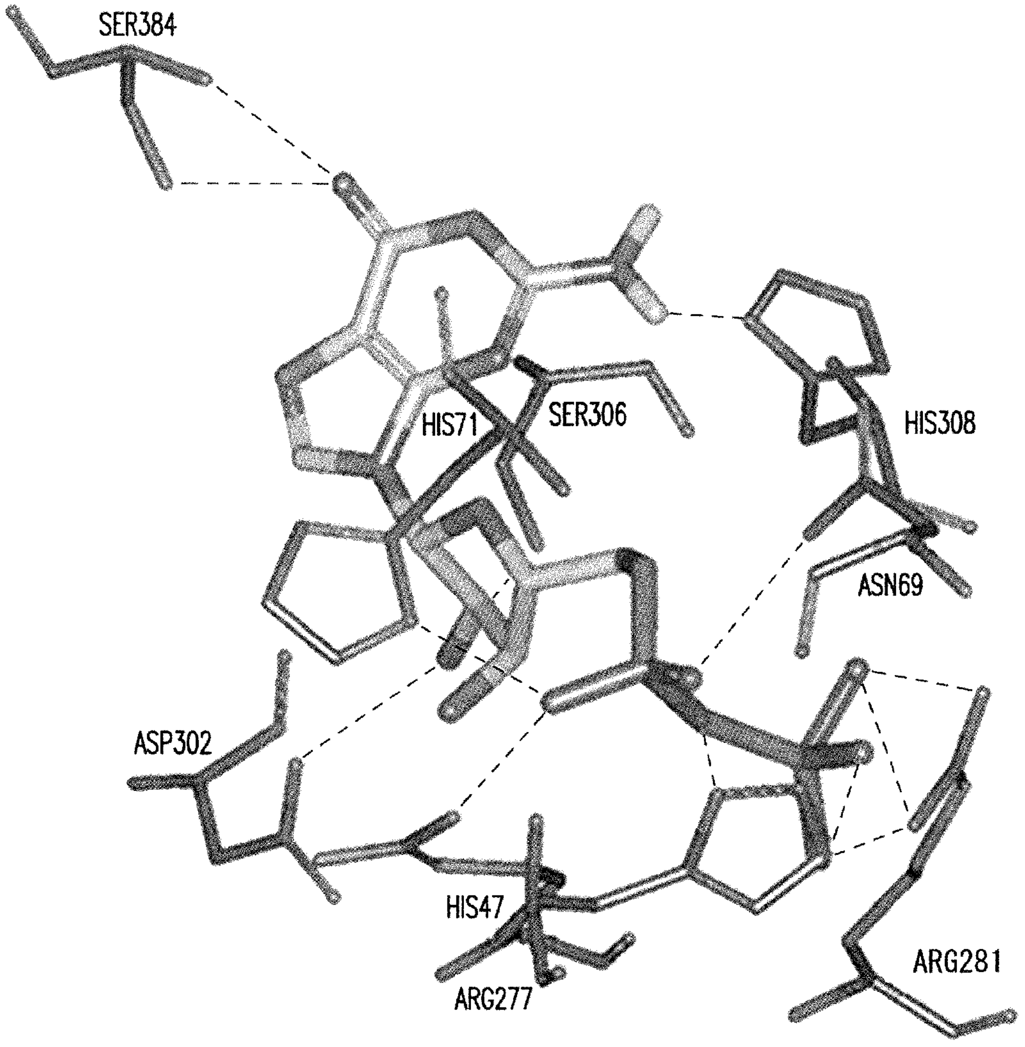
FIG. 23 shows an in silico model of the cat T1R1 VFT that shows putative interactions between T1R1 and a bound 5'-O-2-thiodiphospate.
Figure 24:
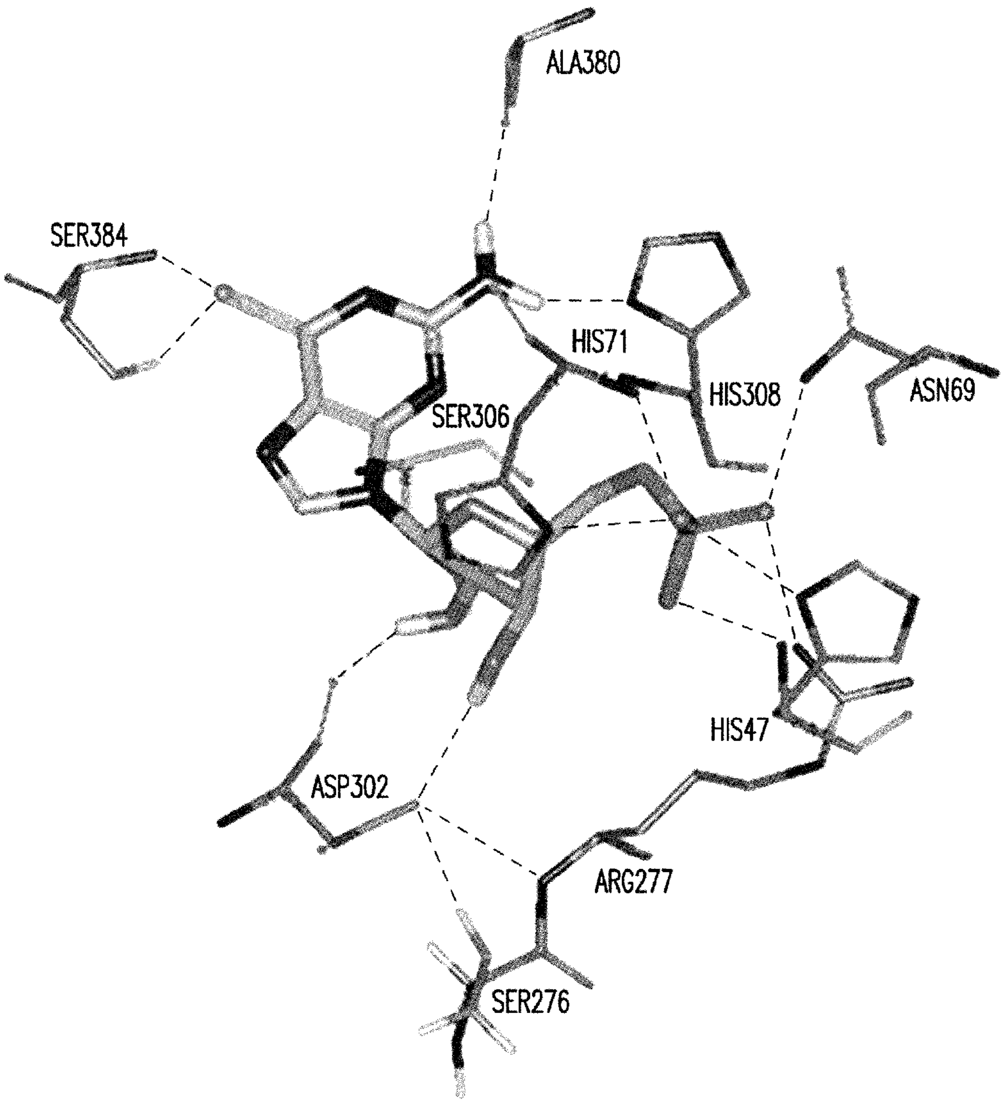
FIG. 24 shows an in silico model of the cat T1R1 VFT that shows putative interactions between T1R1 and a bound 6-Thioguanosine-5'-O-monophosphate.
Figure 25:
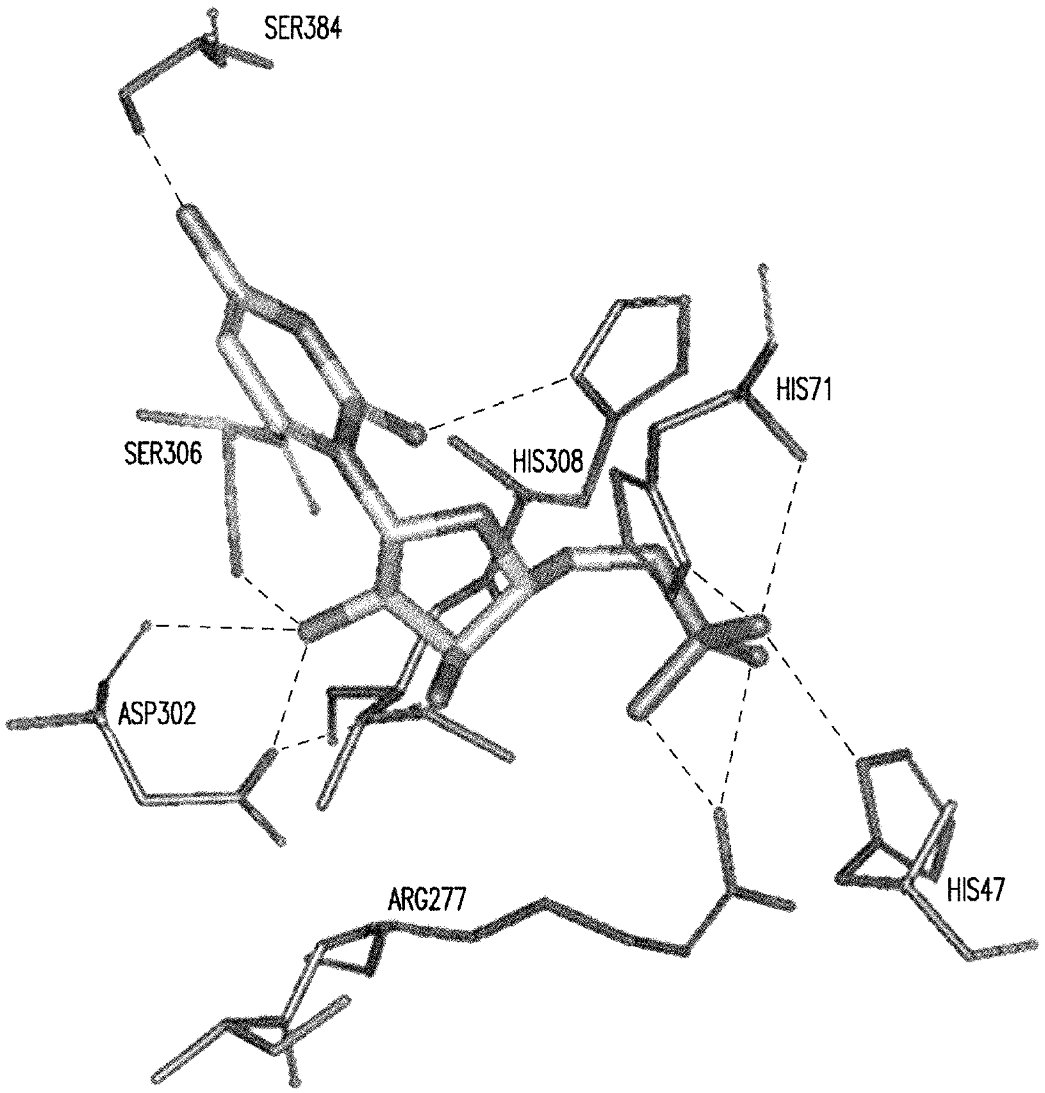
FIG. 25 shows an in silico model of the cat T1R1 VFT that shows putative interactions between T1R1 and a bound CMP.
Figure 26:
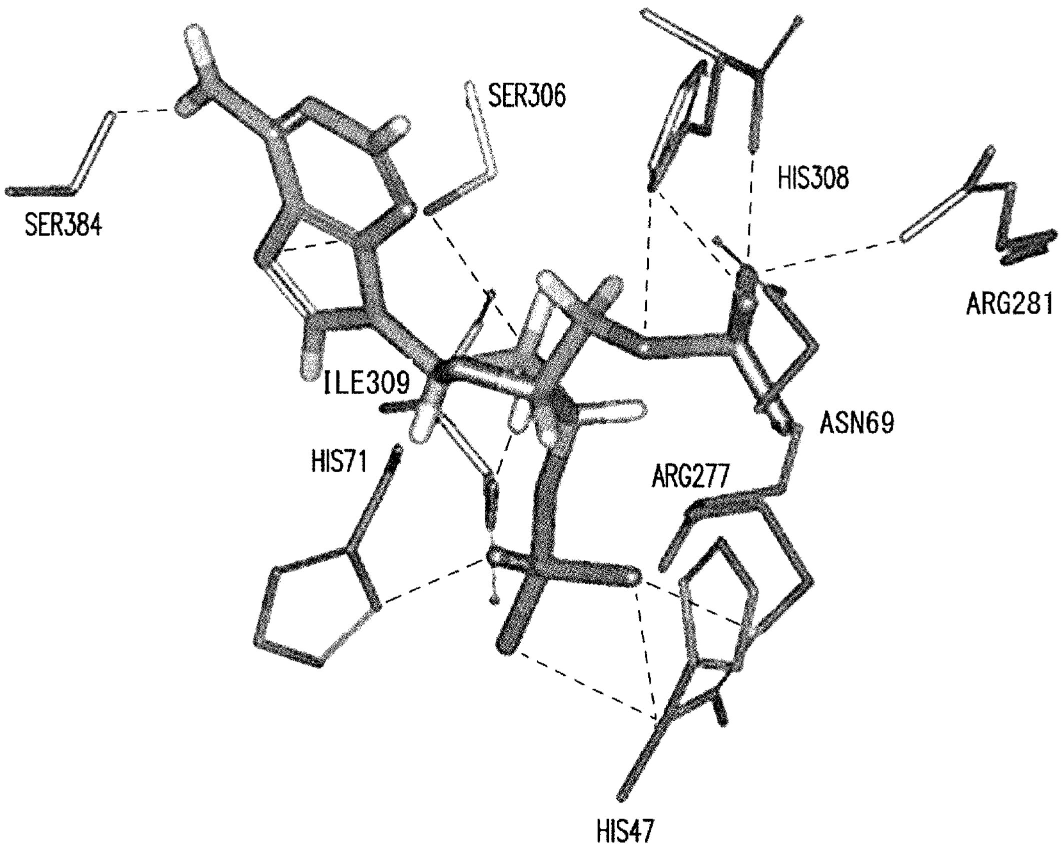
FIG. 26 shows an in silico model of the cat T1R1 VFT bound to adenosine 3'5' diphosphate. Putative hydrogen bond and salt bridge interactions are shown as dotted lines between the phosphates of Adenosine 3'5' diphosphate and His71, His47, Asn69, Arg281, Arg277, His308, and Ile309; the sugar of Adenosine 3'5' diphosphate and Asp302, and Ser306; and the Adenosine 3'5' diphosphate base and Ser384.
Figure 27:
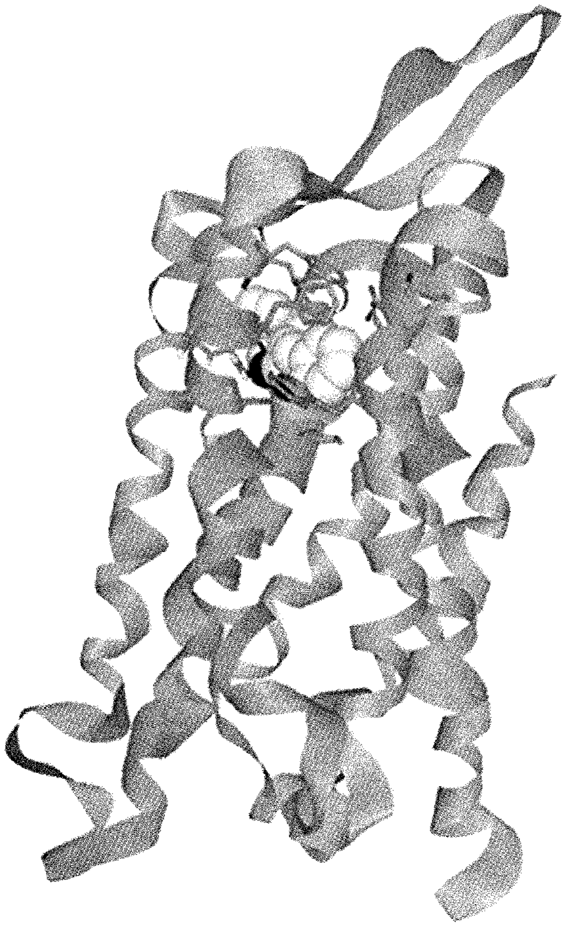
FIG. 27 show an in silico model of the cat T1R1 transmembrane domain. A transmembrane compound N-benzyl-L-phenylalanine methyl ester is shown docked within the transmembrane region of T1R1.

Bridging Interactions Between Amino Acid and Nucleotide Binding:

Asp302 is a residue present in the VFT of T1R1 in multiple species, including cat and mouse. However, in humans the amino acid at this position is alanine. Asp302 has a flexible side chain that may orient to coordinate the zwitterionic nitrogen or side-chain of a bound amino acid ligand (FIG. 15) or may alternatively orient to coordinate the sugar of a bound nucleotide (FIG. 16). Furthermore, Asp302 may also be oriented to simultaneously coordinate the zwitterionic backbone nitrogen of a bound amino acid, and the sugar of a nucleotide (FIG. 17). This bridging interaction may enhance the synergistic effect between a bound amino acid and a bound nucleotide. Because the amino acid at this position in humans is alanine, such a bridging interaction is not possible in humans. An alternative conformation of the nucleotide base may establish further bridging interactions between Glu170 and select nucleotide bases (data not shown).

Example 4—in Silico Identification of Transmembrane Compounds

The present example describes the computational modeling of the T1R1/T1R3 receptor to identify putative transmembrane compounds.

Computational approaches were used to analyze the three-dimensional structure of T1R1 to identify transmembrane regions that can be exploited to selectively activate the T1R1/T1R3 receptor. Although the crystal structure of cat T1R1 has not been determined, a structural model of the transmembrane region of T1R1 was generated based on the crystal structure of the human GPCR Metabotropic Glutamate Receptor 1 (mGluR1) (Wu et al., 2014 Science Vol. 344, p. 58-64) and of the human GPCR Metabotropic Glutamate Receptor 5 (mGluR5) (Dore et al., Nature. 2014 Jul. 31; 511(7511):557-62. Epub 2014 Jul. 6). "In silico" modeling was then used to identify small chemical compounds that could potentially interact with the transmembrane domain of the T1R1 monomer of the T1R1/T1R3 receptor.

Figure 28:
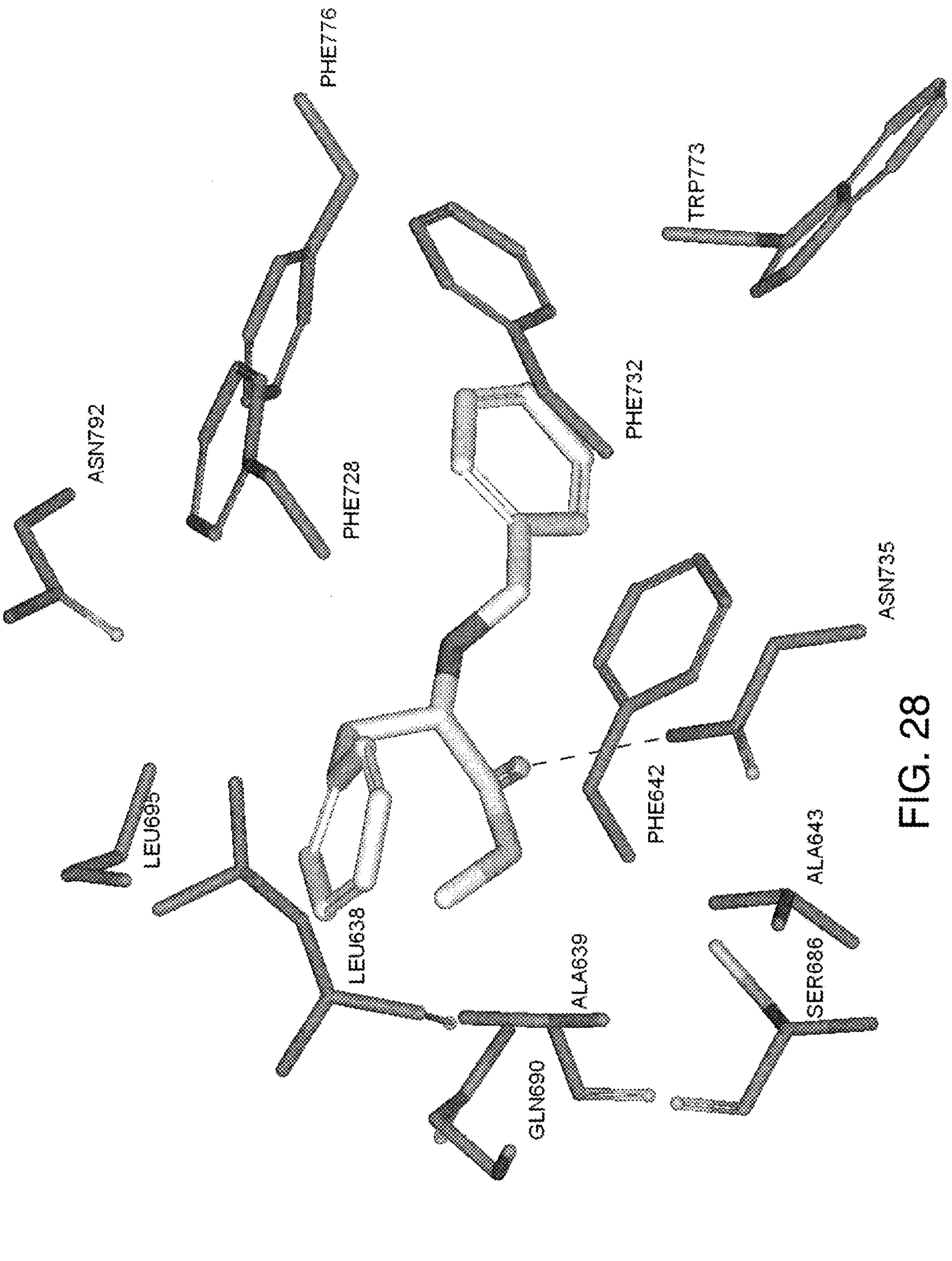
FIG. 28 shows an in silico model of N-benzyl-L-phenylalanine methyl ester docked within the transmembrane region of T1R1.
Figure 29:
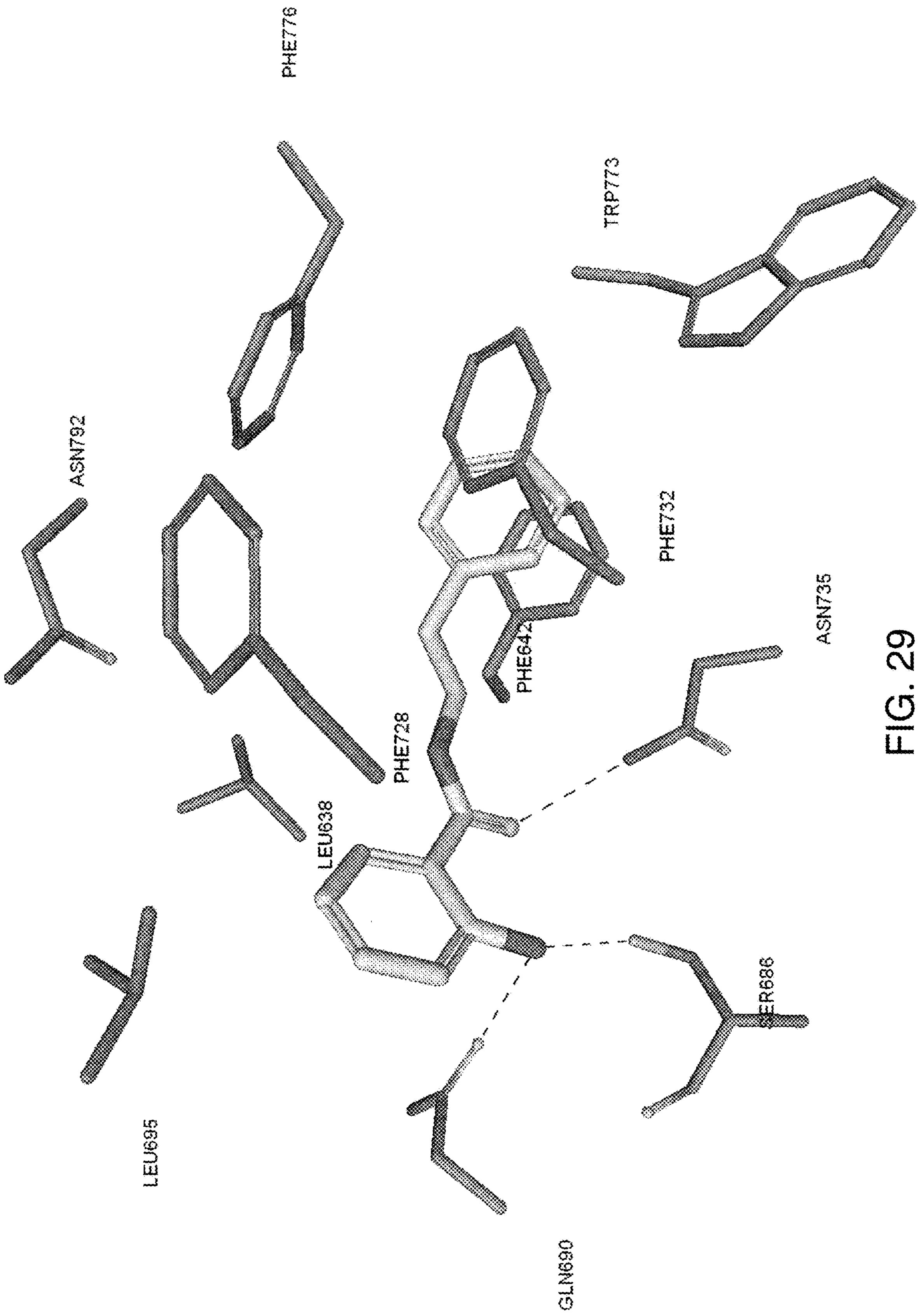
FIG. 29 shows an in silico model of 2-amino-N-phenethylbenzamide docked within the transmembrane region of T1R1.
Figure 30:
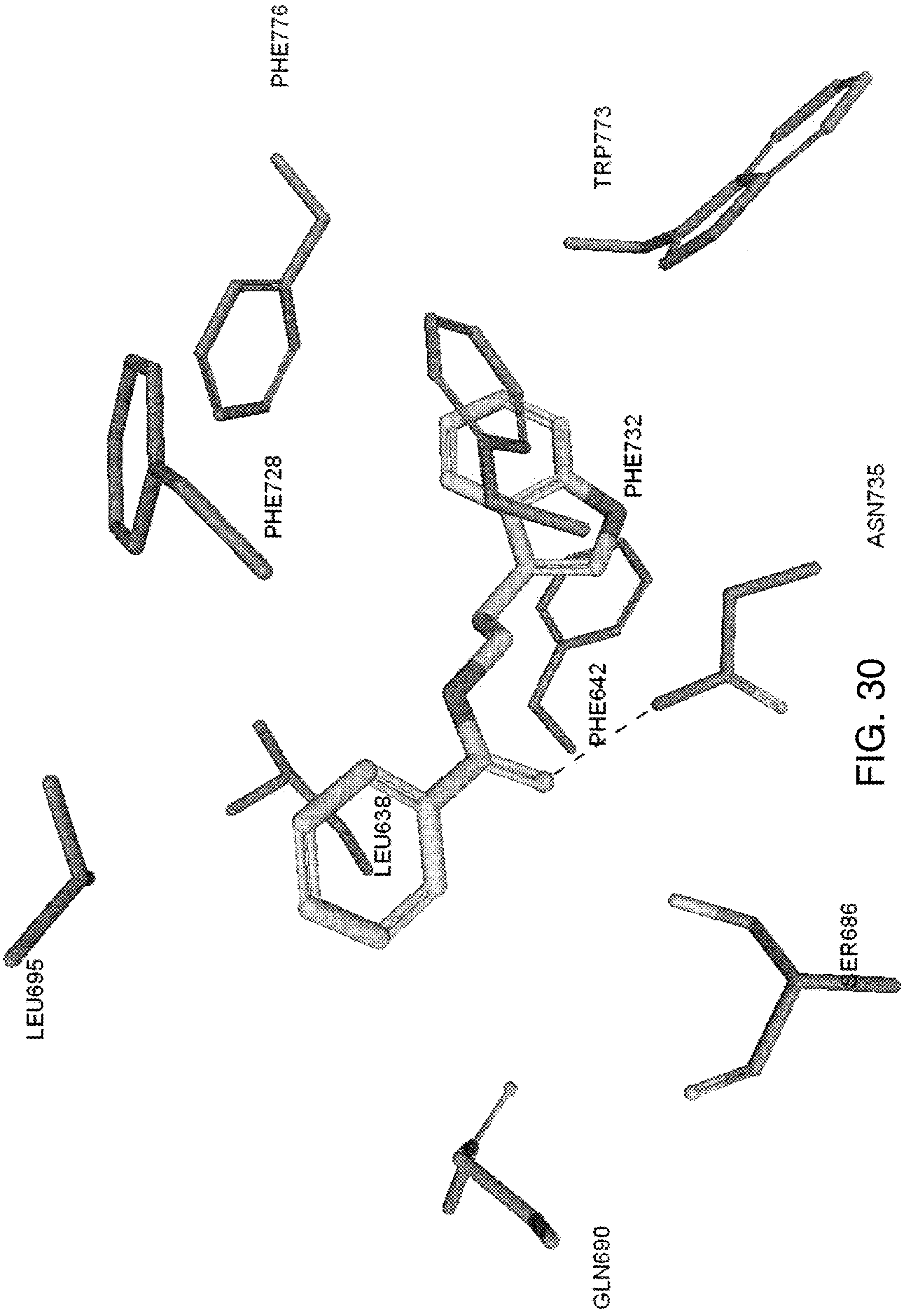
FIG. 30 shows an in silico model of N-(2-(1H-indol-3-yl)ethyl)nicotinamide docked within the transmembrane region of T1R1.
Figure 31:
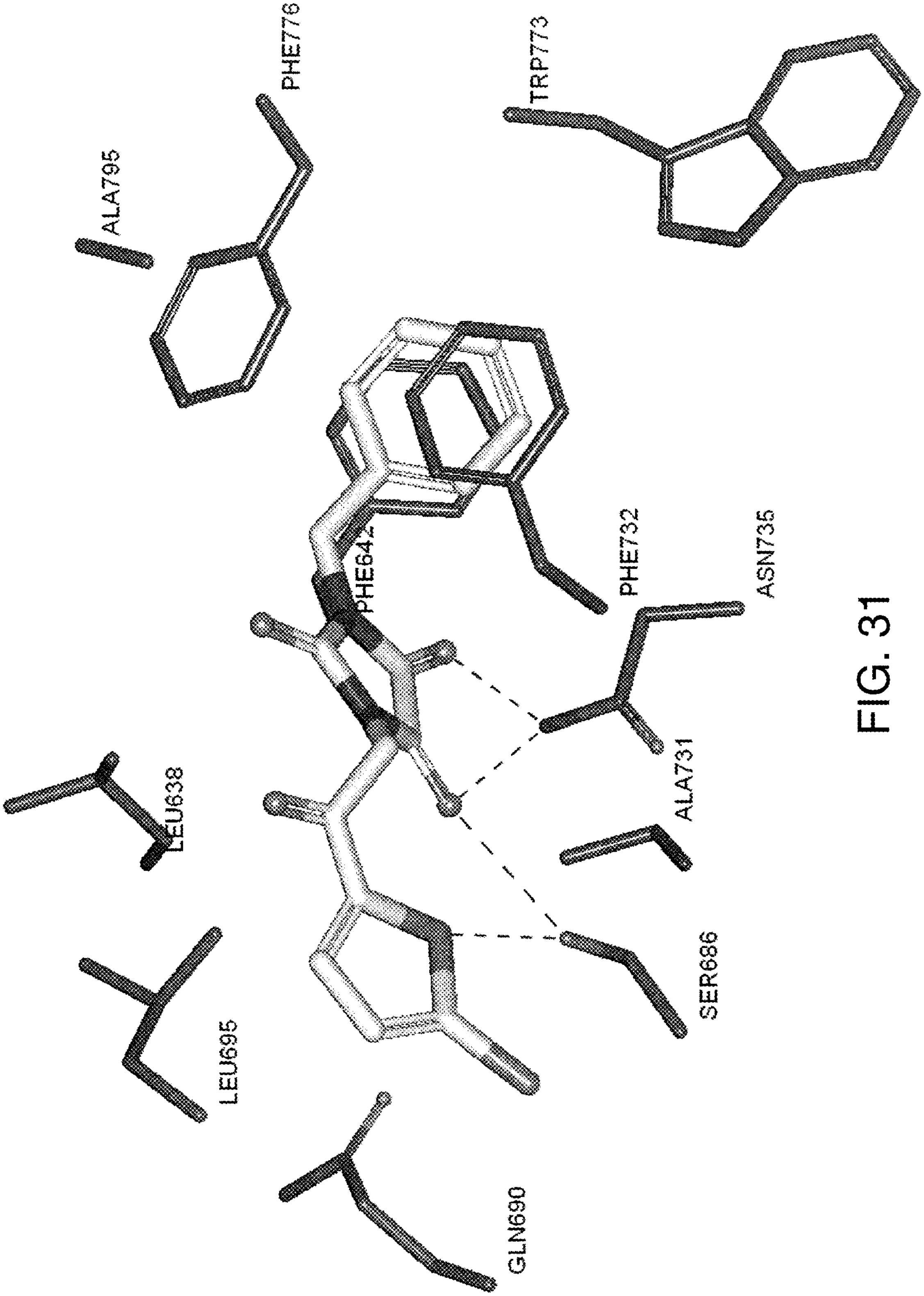
FIG. 31 shows an in silico model of 1-benzyl-3-(2-(5-chlorothiophen-2-yl)-2-oxoethyl)imidazolidine-2,4,5-trione docked within the transmembrane region of T1R1.
Figure 32:
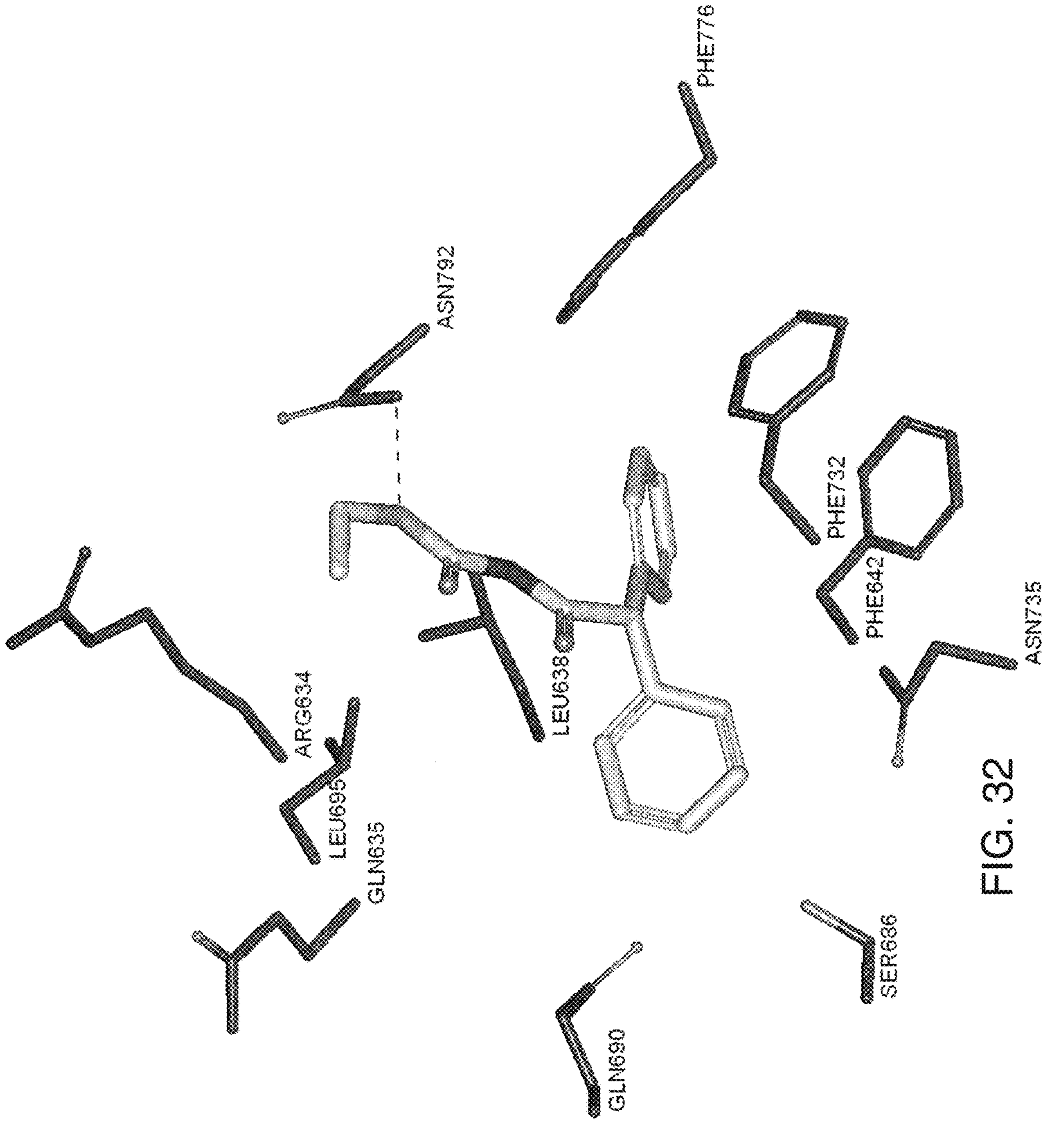
FIG. 32 shows an in silico model of ethyl (2,2-diphenylacetyl)carbamate docked within the transmembrane region of T1R1.
Figure 33:
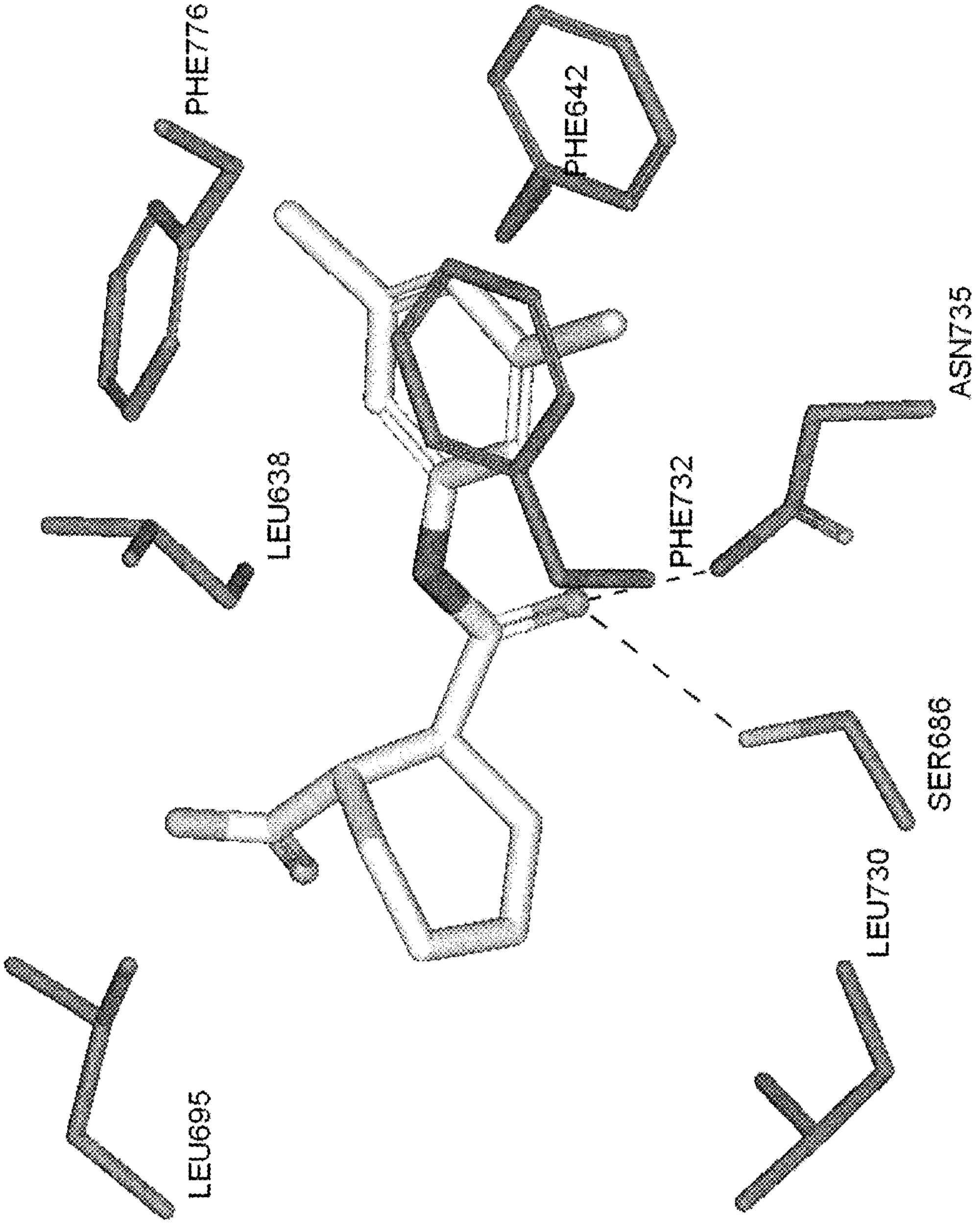
FIG. 33 shows an in silico model of 2-((3,5-dichlorophenyl)carbamoyl) cyclohexanecarboxylic acid docked within the transmembrane region of T1R1.
Figure 34:
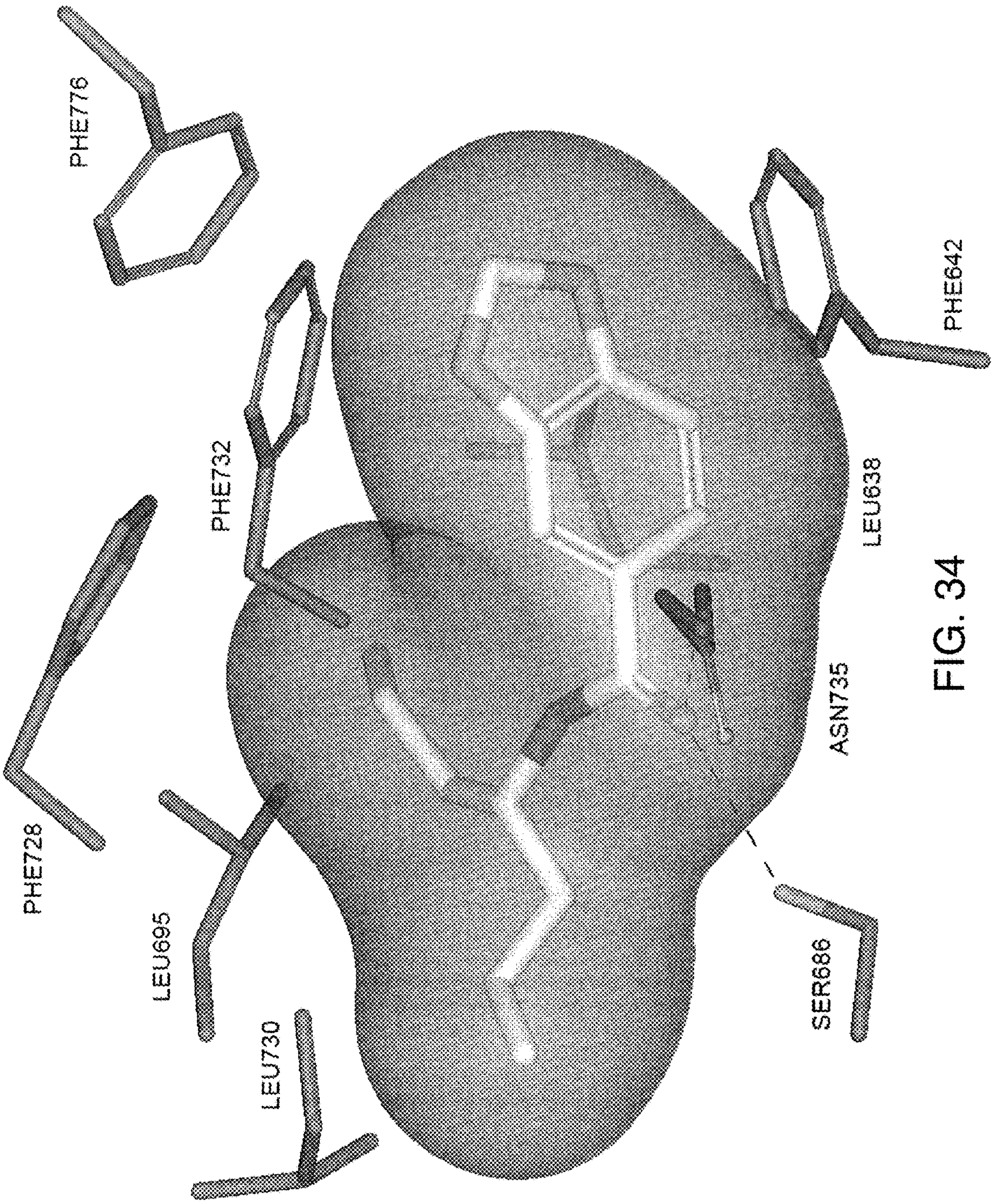
FIG. 34 shows an in silico model of N-(heptan-4-yl)benzo[d][1,3]dioxole-5-carboxamide docked within the transmembrane region of T1R1.
Figure 35:
FIG. 35 shows in silico modeling of 1-benzyl-3-(2-oxo-2-phenylethyl)imidazolidine-2,4,5-trione docked within the transmembrane region of T1R1.
Figure 35:
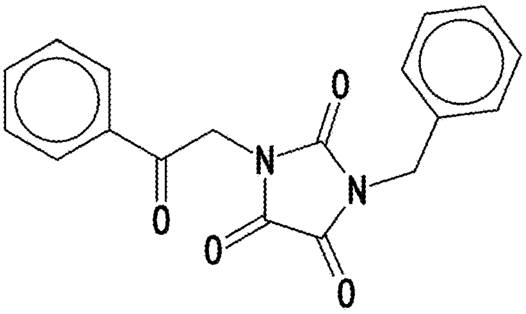
Figure 36:
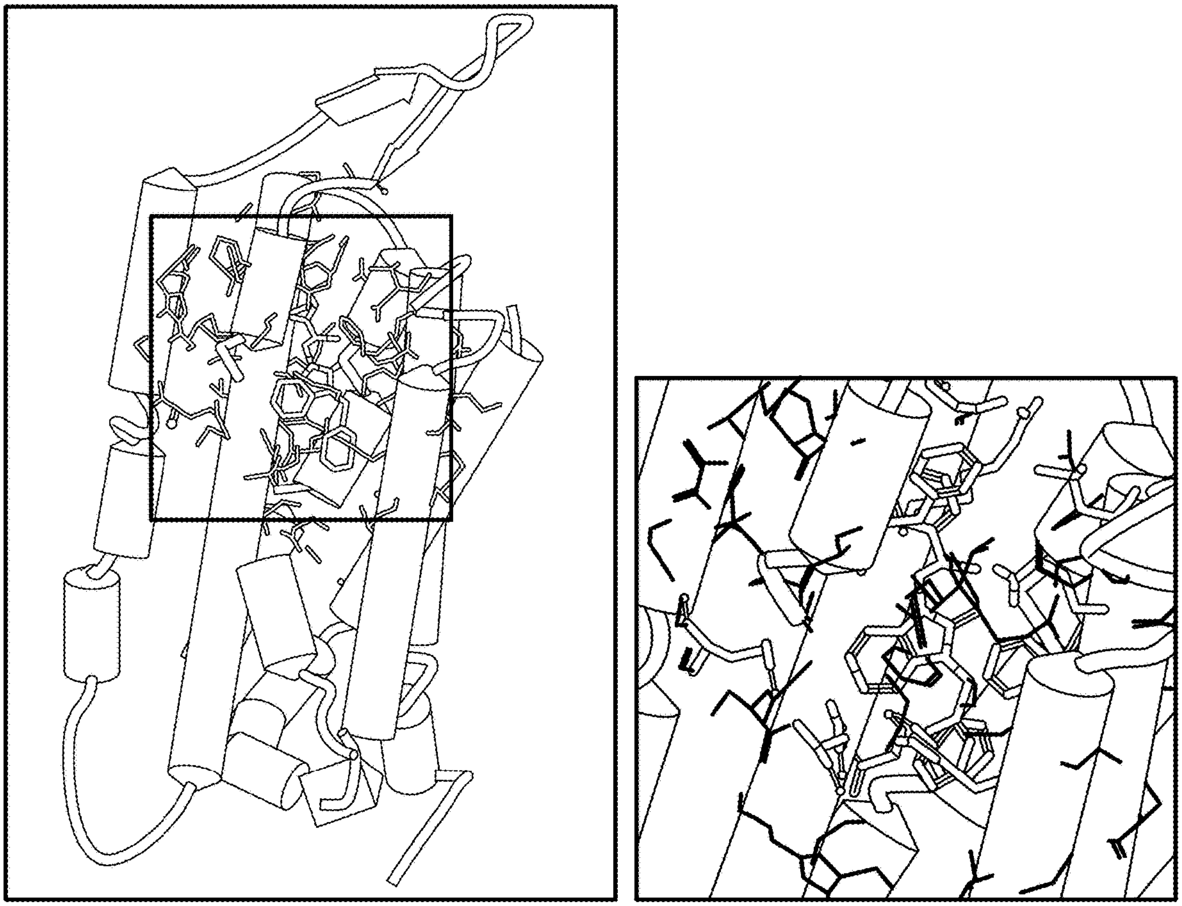
FIG. 36 shows in silico modeling of a 1H-imidazo[4,5-c]pyridin-2(3H)-one derivative compound docked within the transmembrane region of T1R1.
Figure 36:
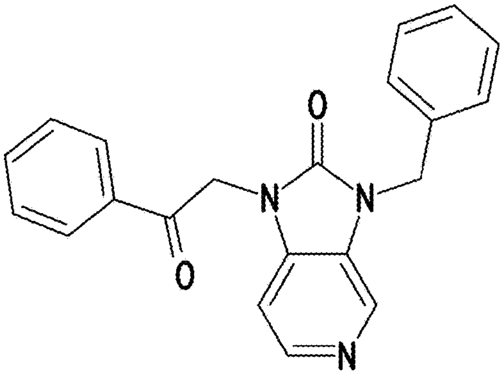

FIG. 28 shows the interaction of N-benzyl-L-phenylalanine methyl ester with T1R1. Asparagine (Asn) 735 of the T1R1 transmembrane domain can be seen interacting with the ester of the ligand. A cluster of aryl residues is positioned in the active site that can coordinate with the ligand by forming ring-stacking interactions to the phenyl group of the ligand to the right in the figure. FIG. 35 shows the modeling of 1-benzyl-3-(2-oxo-2-phenylethyl)imidazolidine-2,4,5-trione within the transmembrane region of T1R1. Phe642 of Helix 6 and Phe776 of Helix 2 interact with the phenyl ring of 1-benzyl-3-(2-oxo-2-phenylethyl)imidazolidine-2,4,5-trione and Asn792 of Helix 6 interacts with the carbonyl group by a hydrogen bond (FIG. 35). The modeling of 1H-imidazo[4,5-c]pyridin-2(3H)-one within the transmembrane region of T1R1 shows the hydrogen bond between Asn735 of the transmembrane region of T1R1 and 1H-imidazo[4,5-c]pyridin-2(3H)-one (FIG. 36).

Example 5—Activation of T1R1/T1R3 Receptor by Transmembrane Compounds

The present example describes the activation of the T1R1/T1R3 receptor by transmembrane compounds in vitro.

Based on the in silico modeling described in Example 4, putative T1R1/T1R3 transmembrane compounds were identified and selected for further testing in vitro. In vitro functional characterization of the selected compounds was used to evaluate the effectiveness of the putative transmembrane compounds in activating the T1R1/T1R3 receptor alone or in combination with one or more nucleotides and/or one or more amino acids.

Methods:

HEK293 cells that stably express T1R3 and inducibly express T1R1 were exposed to transmembrane compounds alone or in combination with one or more amino acids and/or one or more nucleotides to activate the umami receptor. Activation of the T1R1/T1R3 receptor was detected by a change in intracellular calcium levels using a calcium sensitive fluorescent dye. Cells that express T1R3 but not T1R1 were used as a control. A FLIPR® Tetra or a FlexStation® 3 was used for data capture.

For each transmembrane compound, dose response curves were generated and the following properties were determined: $EC_{50}$ of the transmembrane compound alone; $EC_{50}$ of the transmembrane compound with 20 mM alanine; $EC_{50}$ of the transmembrane compound with 0.2 mM IMP; and $EC_{50}$ of the transmembrane compound with 20 mM alanine and 0.2 mM IMP. The term half maximal effective concentration ($EC_{50}$) refers to the concentration of a compound which induces a response halfway between the baseline and the maximum after a specified exposure time. In each experiment, serial dilutions of up to 10 mM of the transmembrane compound were added to the T1R1/T1R3-expressing cells.

Figure 37:
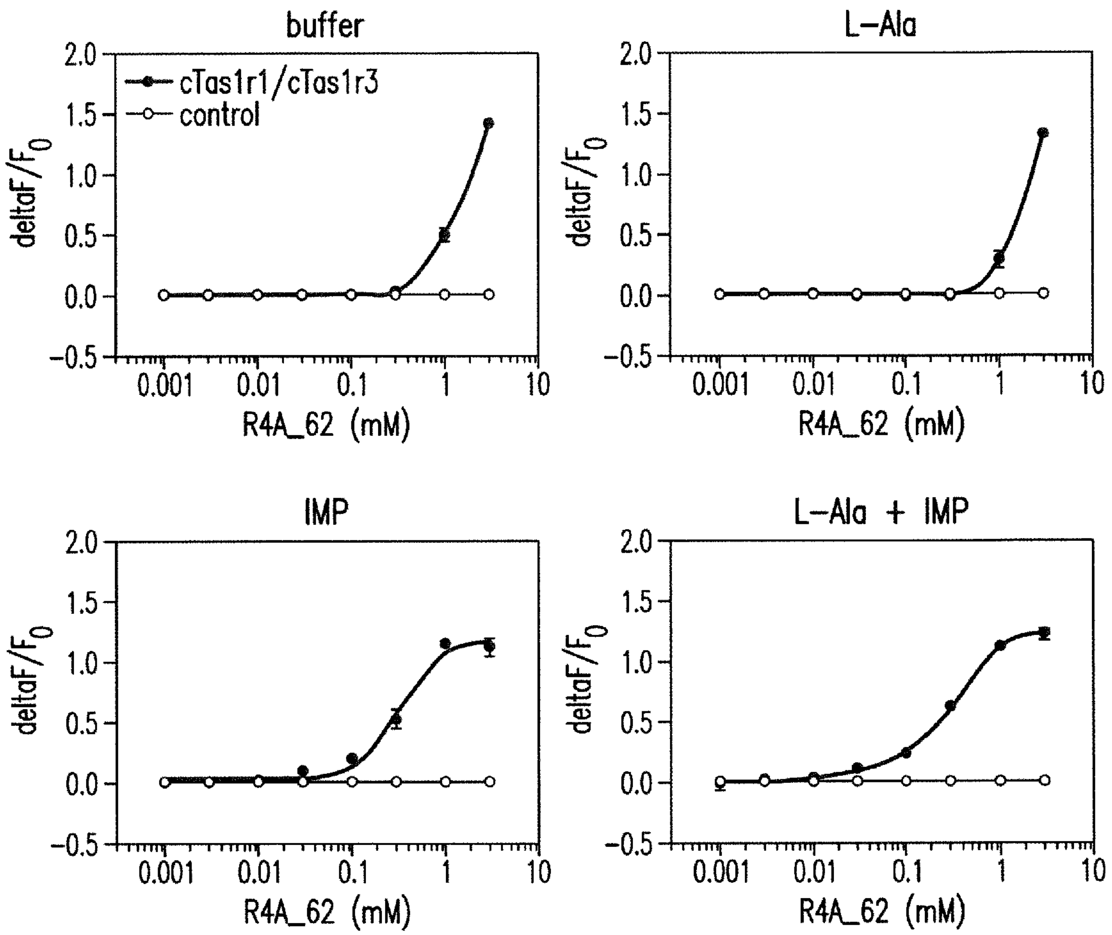
FIG. 37 shows dose response curves for 1-benzyl-3-(2-oxo-2-phenylethyl)imidazolidine-2,4,5-trione.
Figure 38:
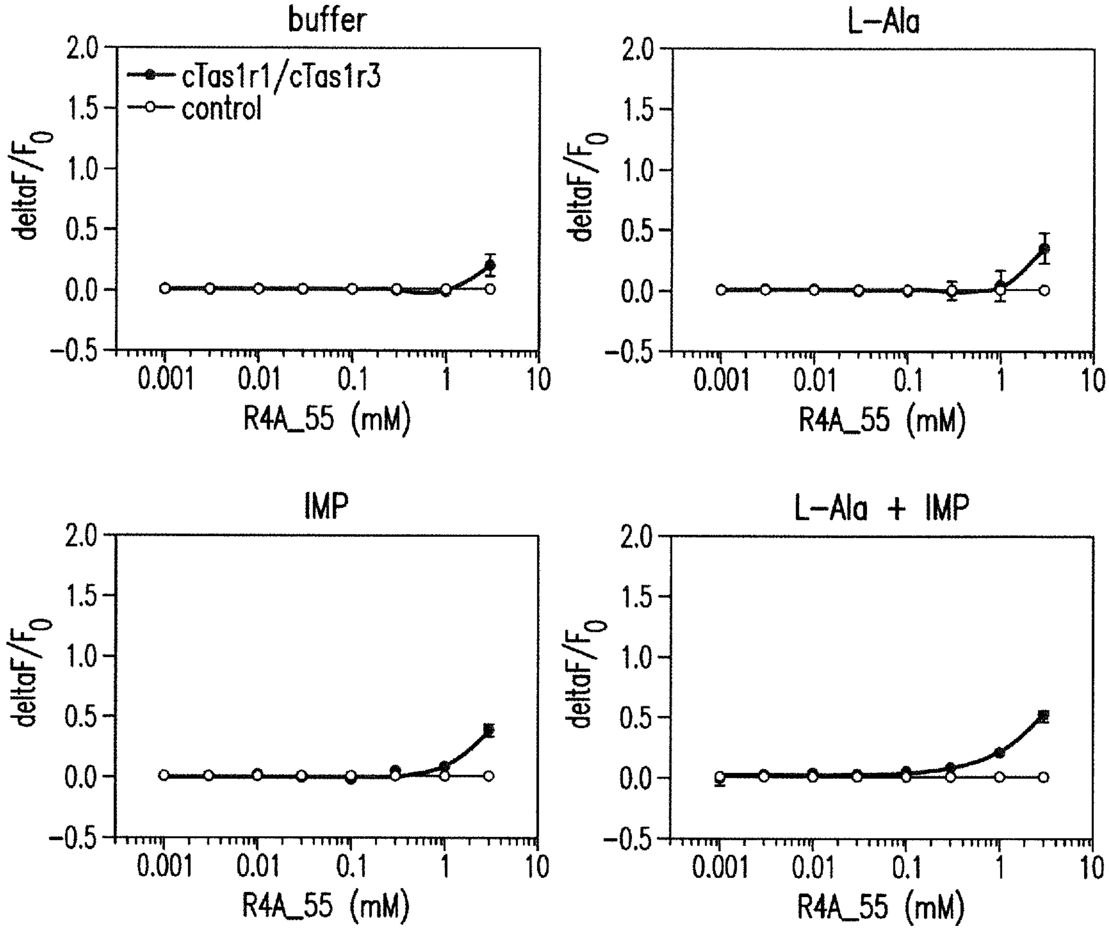
FIG. 38 shows dose response curves for 1-(2-bromophenyl)-3-((1R, 2S)-2-hydroxy-2,3-dihydro-1H-inden-1-yl) urea.

Results:

Treatment of HEK293 cells expressing T1R1/T1R3 receptors with 1-benzyl-3-(2-oxo-2-phenylethyl)imidazolidine-2,4,5-trione alone (e.g., in buffer) or in combination with 20 mM alanine resulted in the activation of the T1R1/T1R3 receptor, as indicated by the change in intracellular calcium levels ($\Delta F/F_0$), and resulted in an observed $EC_{50}$ value greater than 1 mM. In contrast, 1-benzyl-3-(2-oxo-2-phenylethyl)imidazolidine-2,4,5-trione, in the presence of 0.2 mM IMP or in the presence of 20 mM alanine and 0.2 mM IMP, resulted in a decrease in the $EC_{50}$ value to 0.32±0.05 mM and 0.33±0.04, respectively (FIG. 37 and Table 17). These results indicate that IMP is a positive allosteric modulator of the transmembrane compound 1-benzyl-3-(2-oxo-2-phenylethyl)imidazolidine-2,4,5-trione, i.e. that the compounds are synergistic in effect on T1R1/T1R3.

Figure 39:
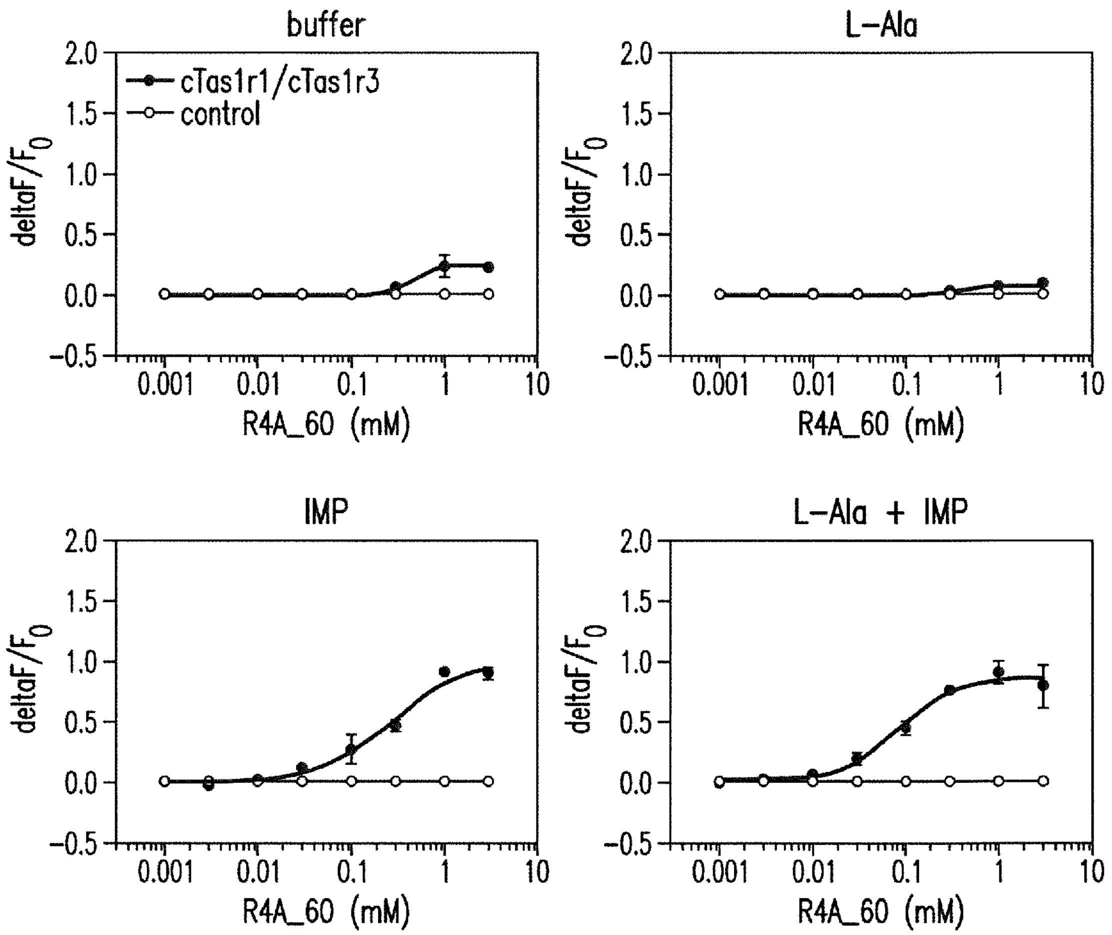
FIG. 39 shows dose response curves for N-(benzo[d][1,3]dioxol-5-yl)-2-propylpentanamide.
Figure 40:
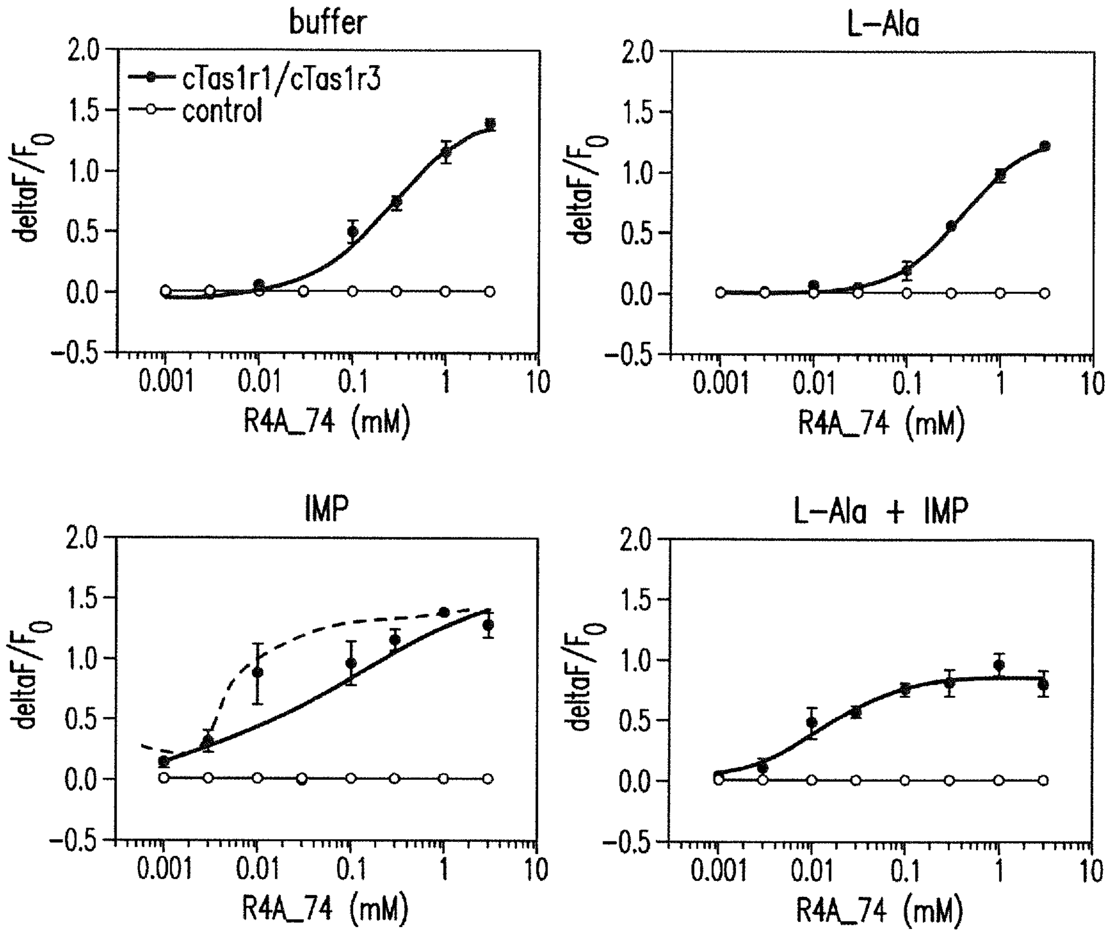
FIG. 40 shows dose response curves for N-(heptan-4-yl) benzo[d][1,3]dioxole-5-carboxamide.

The compound, N-(benzo[d][1,3]dioxol-5-yl)-2-propylpentanamide, was observed to function as an agonist of T1R1/T1R3 alone (FIG. 39 and Table 17). In the presence of IMP or IMP and alanine, the $EC_{50}$ of N-(benzo[d][1,3]dioxol-5-yl)-2-propylpentanamide decreased and the $\Delta F/F_0$ extended significantly higher (FIG. 39 and Table 17). These results suggest that alanine and IMP act synergistically with N-(benzo[d][1,3]dioxol-5-yl)-2-propylpentanamide to activate T1R1/T1R3. Similar results were observed for the transmembrane compound N-(heptan-4-yl)benzo[d][1,3]dioxole-5-carboxamide (FIG. 40 and Table 17). IMP functioned as a positive allosteric modulator of N-(heptan-4-yl)benzo[d][1,3]dioxole-5-carboxamide.

Figure 41:
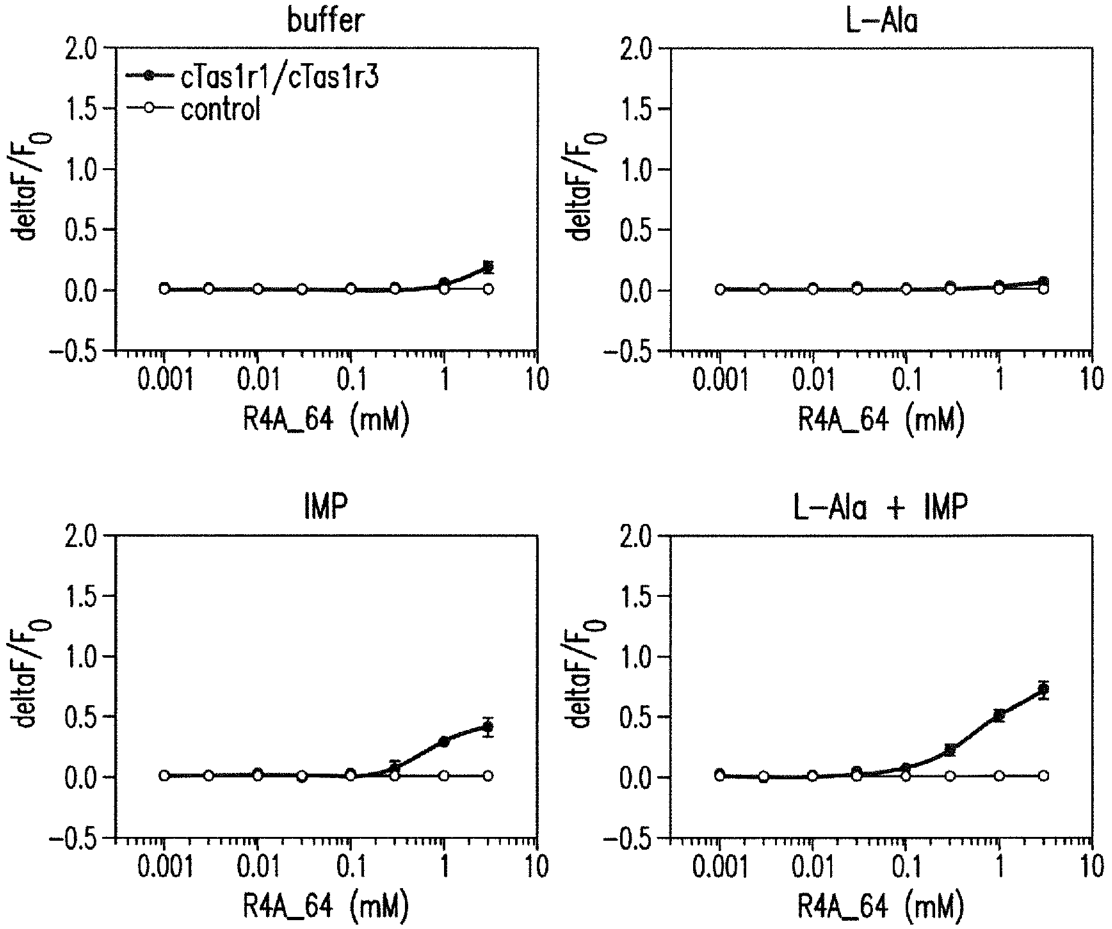
FIG. 41 shows dose response curves for N-(2-amino-2-oxo-1-phenylethyl)-3-chloro-4,5-dimethoxybenzamide.
Figure 43:
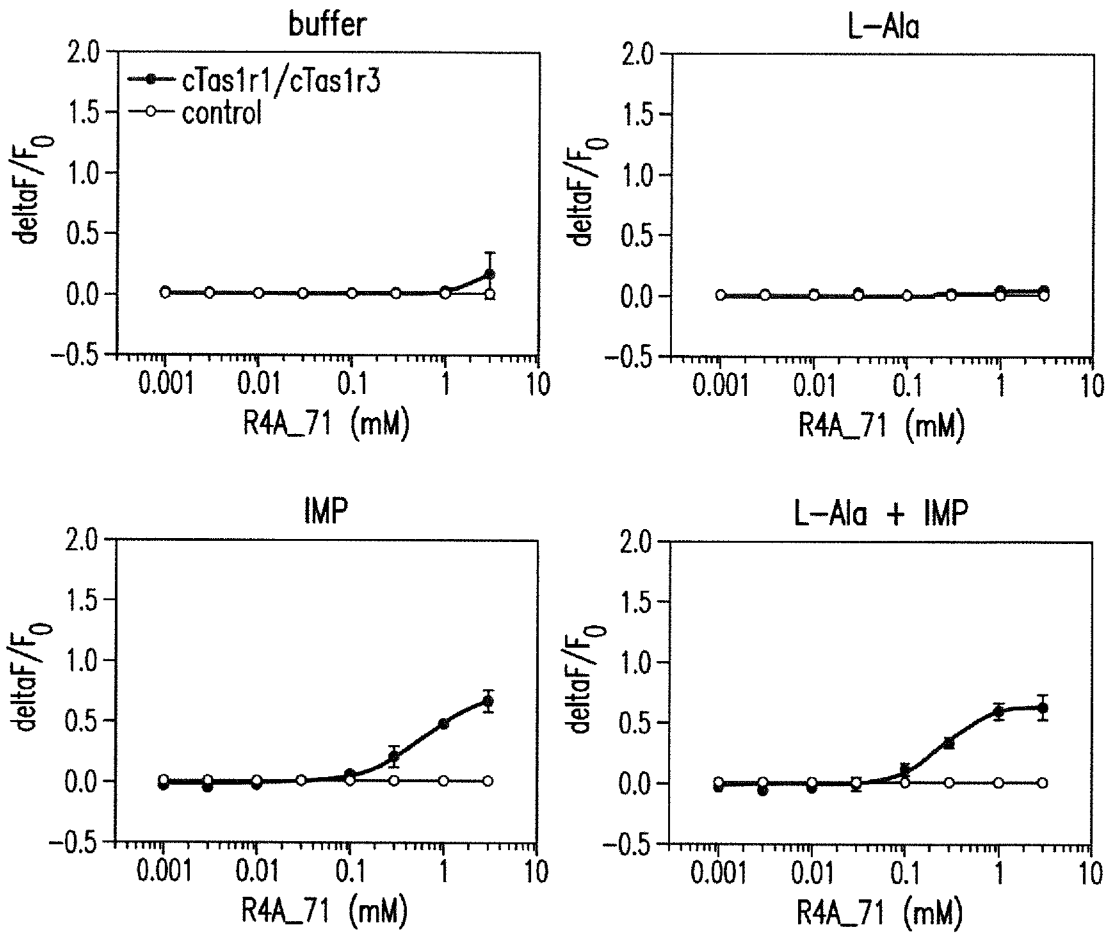
FIG. 43 shows dose response curves for 2-((5-(4-(methylthio)phenyl)-2H-tetrazol-2-yl)methyl)pyridine.

The putative transmembrane compound, N-(2-amino-2-oxo-1-phenylethyl)-3-chloro-4,5-dimethoxybenzamide, failed to activate T1R1/T1R3 alone; however, in the presence of IMP or IMP and alanine, N-(2-amino-2-oxo-1-phenylethyl)-3-chloro-4,5-dimethoxybenzamide activated T1R1/T1R3 as indicated by the increase in $\Delta F/F_0$ at lower concentrations and the reduction in $EC_{50}$ (FIG. 41 and Table 17). Similar results were observed with 2-((5-(4-(methylthio)phenyl)-2H-tetrazol-2-yl)methyl)pyridine (FIG. 43 and Table 17).

Figure 42:
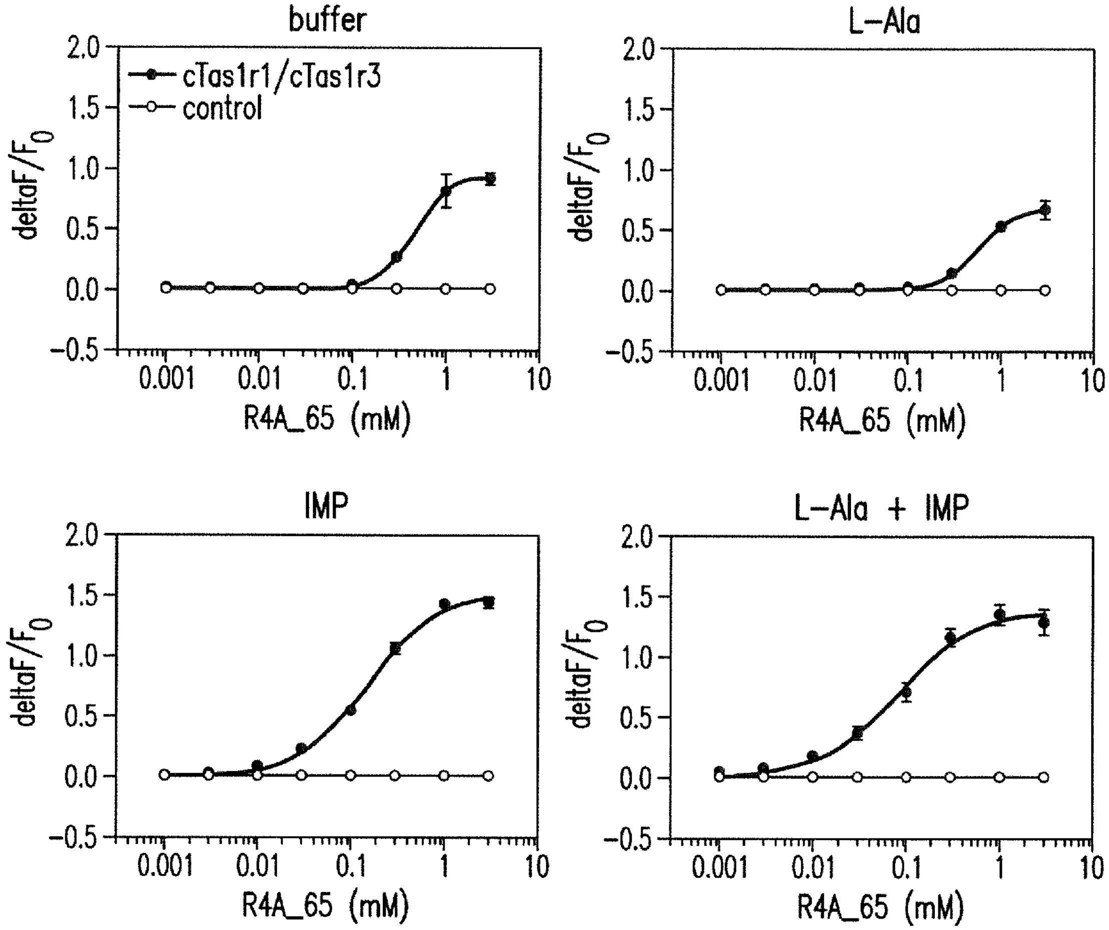
FIG. 42 shows dose response curves for (E)-3-(4-methoxyphenyl)-N-(pentan-3-yl)acrylamide.

The compound, (E)-3-(4-methoxyphenyl)-N-(pentan-3-yl)acrylamide, functions as a transmembrane compound of T1R1/T1R3 with an $EC_{50}$ of 0.45±0.01. In the presence of IMP or IMP and alanine, the activity of (E)-3-(4-methoxyphenyl)-N-(pentan-3-yl)acrylamide was greatly enhanced resulting in an $EC_{50}$ of 0.15±0.02 and 0.08±0.01, respectively, indicating that IMP and alanine function as allosteric modulators of (E)-3-(4-methoxyphenyl)-N-(pentan-3-yl)acrylamide (FIG. 42 and Table 17).

Figure 44:
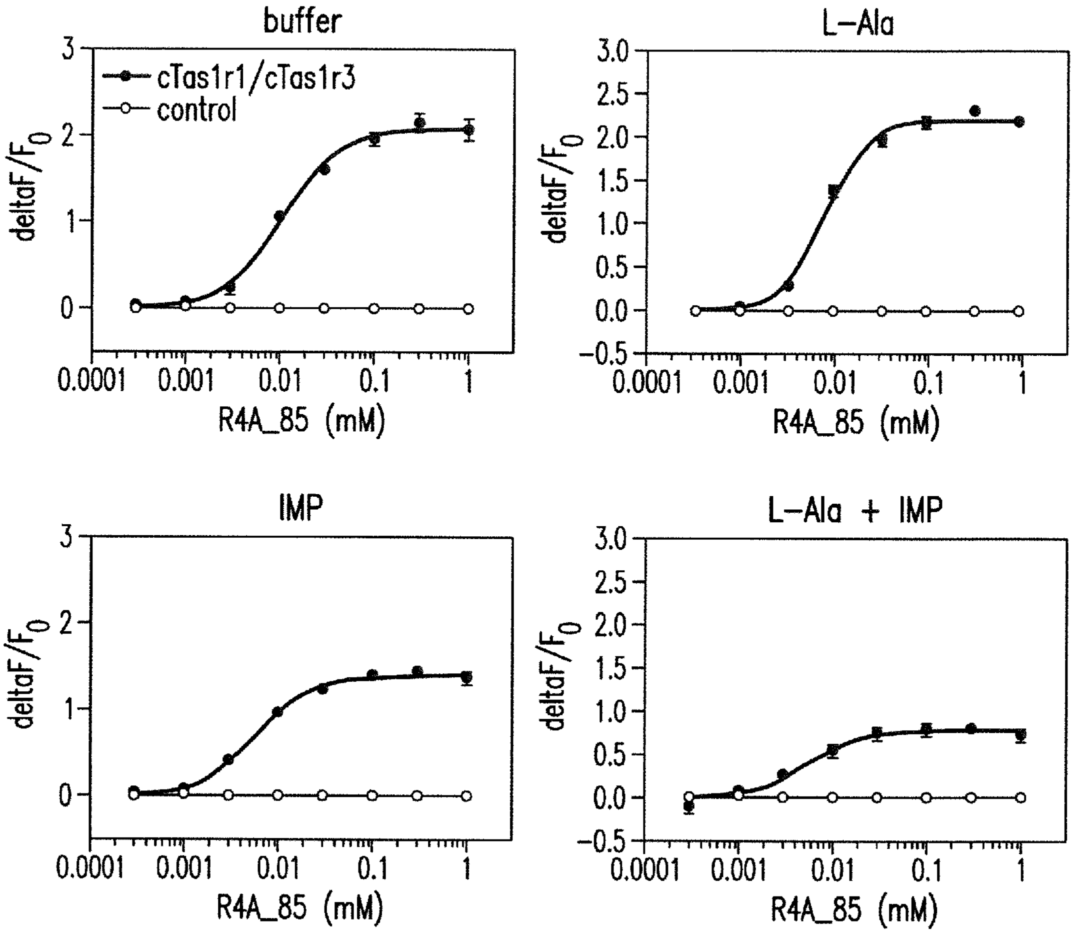
FIG. 44 shows dose response curves for N-(heptan-4-yl) benzo[d][1,3]dioxole-5-carboxamide in the presence of GMP and phenylalanine.
Figure 45:
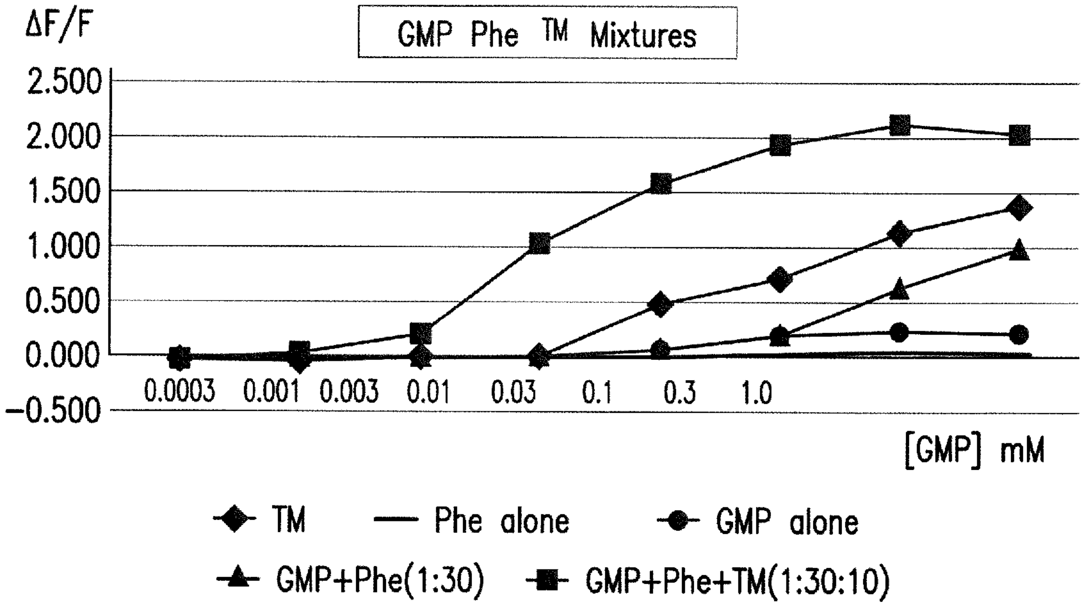
FIG. 45 shows a graph plotting the $\Delta F/F_0$ values for N-(heptan-4-yl)benzo[d][1,3]dioxole-5-carboxamide in the presence of GMP and phenylalanine.

The transmembrane compound, N-(heptan-4-yl)benzo[d][1,3]dioxole-5-carboxamide, was further analyzed. FIG. 44 shows the dose response curves of N-(heptan-4-yl)benzo[d][1,3]dioxole-5-carboxamide in the presence of GMP and phenylalanine; GMP, phenylalanine and alanine; GMP, phenylalanine and IMP; or GMP, phenylalanine, alanine and IMP. The presence of alanine and IMP significantly decreased the $EC_{50}$ value of N-(heptan-4-yl)benzo[d][1,3]dioxole-5-carboxamide compared to the $EC_{50}$ value N-(heptan-4-yl)benzo[d][1,3]dioxole-5-carboxamide in the presence of phenylalanine and GMP or in the presence of IMP alone (Table 19). As indicated above, IMP functions as an allosteric modulator of the agonist activity of N-(heptan-4-yl)benzo[d][1,3]dioxole-5-carboxamide; however, these results indicate that combination of IMP and alanine resulted in a lower $EC_{50}$ value and exhibited a higher shift in $\Delta F/F_0$ than IMP alone, indicating that this combination displayed a synergistic effect with N-(heptan-4-yl)benzo[d][1,3]dioxole-5-carboxamide in the activation of T1R1/T1R3 (FIG. 44 and Table 19). In addition, the $\Delta F/F_0$ is approximately 10× higher in the presence of the ternary mixture of N-(heptan-4-yl)benzo[d][1,3]dioxole-5-carboxamide, phenylalanine and GMP, compared to combination of phenylalanine and GMP in the absence of the agonist (FIG. 45).

Figure 46:
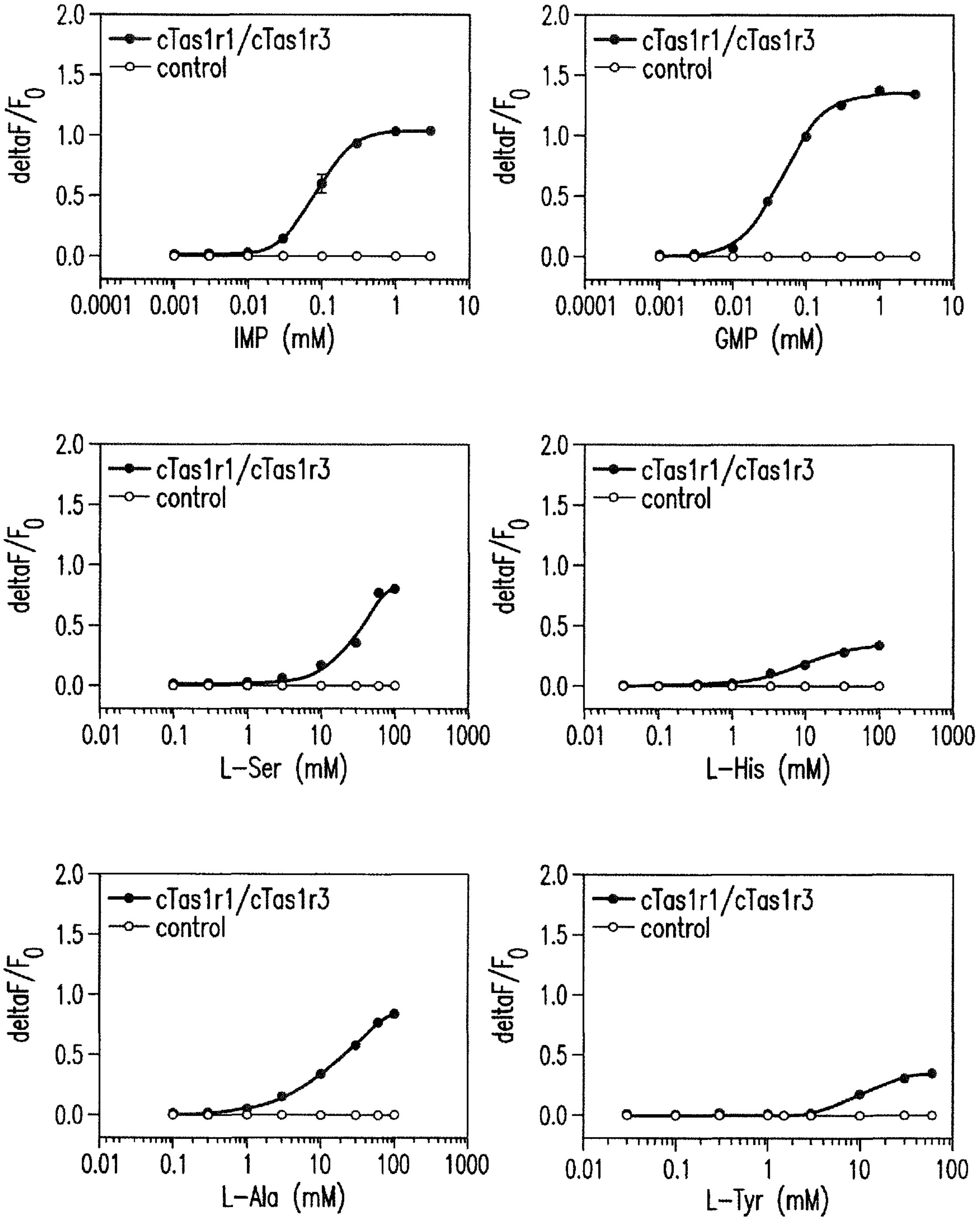
FIG. 46 shows dose response curves for positive and negative controls in activating cat T1R1/T1R3 for the experiments described by FIGS. 1-14 and 38-45. Dose response curves for amino acids were determined in the presence of 0.2 mM IMP. Dose response curves for nucleotides were determined in the presence of 20 mM alanine.
Figure 46:
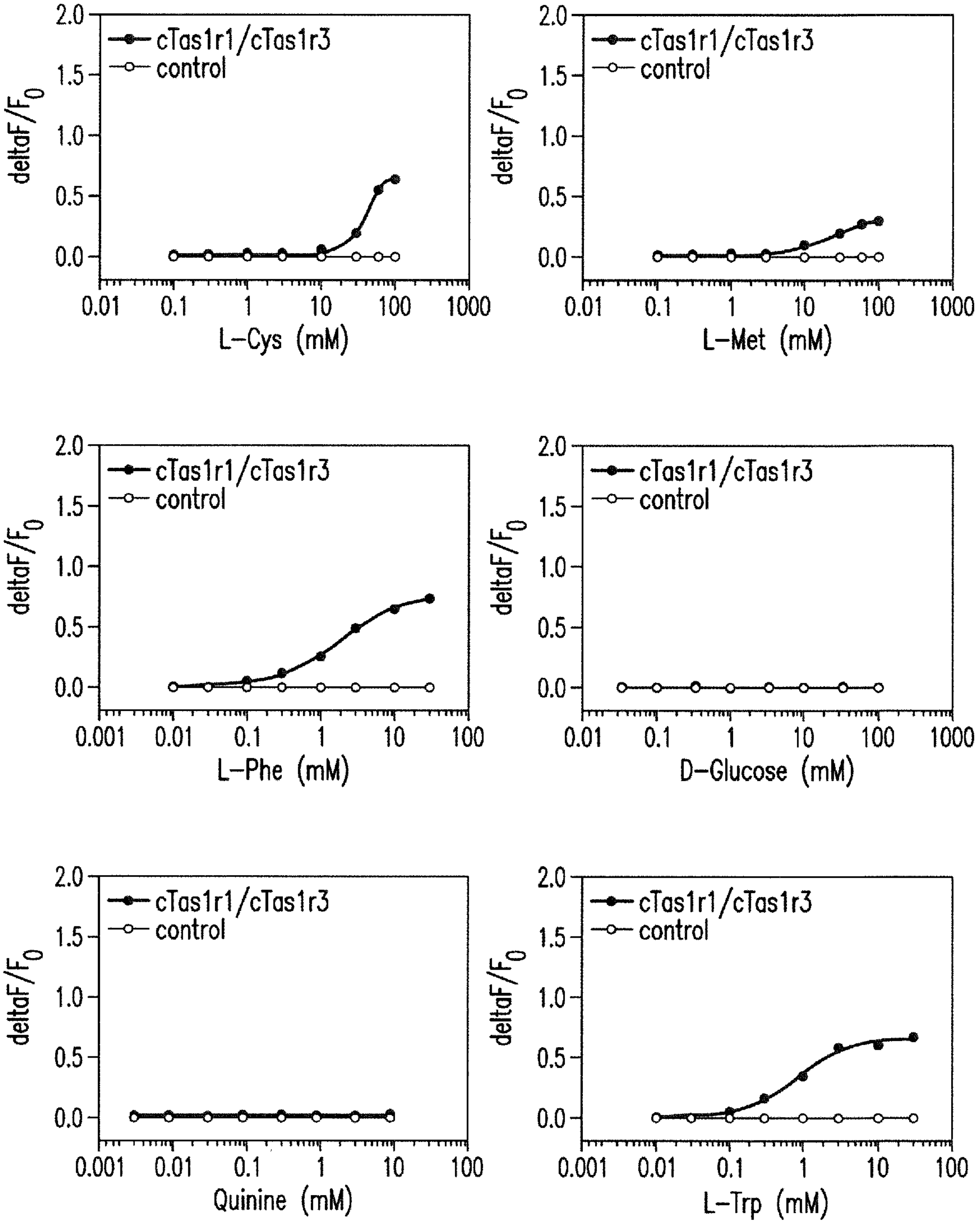
Figure 47:
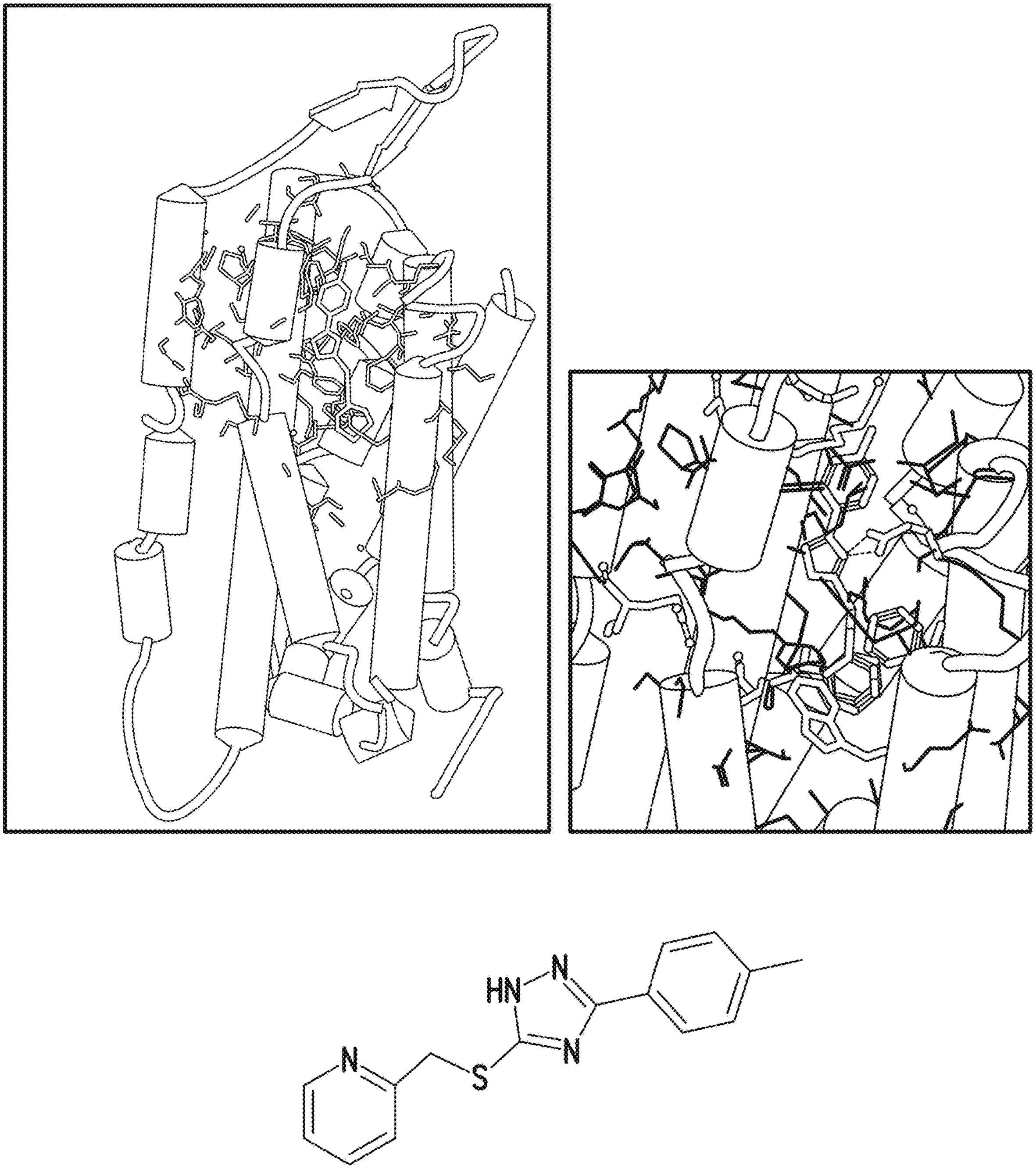
FIG. 47 shows in silico modeling of a transmembrane compound, according to one exemplary embodiment of the disclosed subject matter, docked within the transmembrane region of T1R1.
Figure 48:
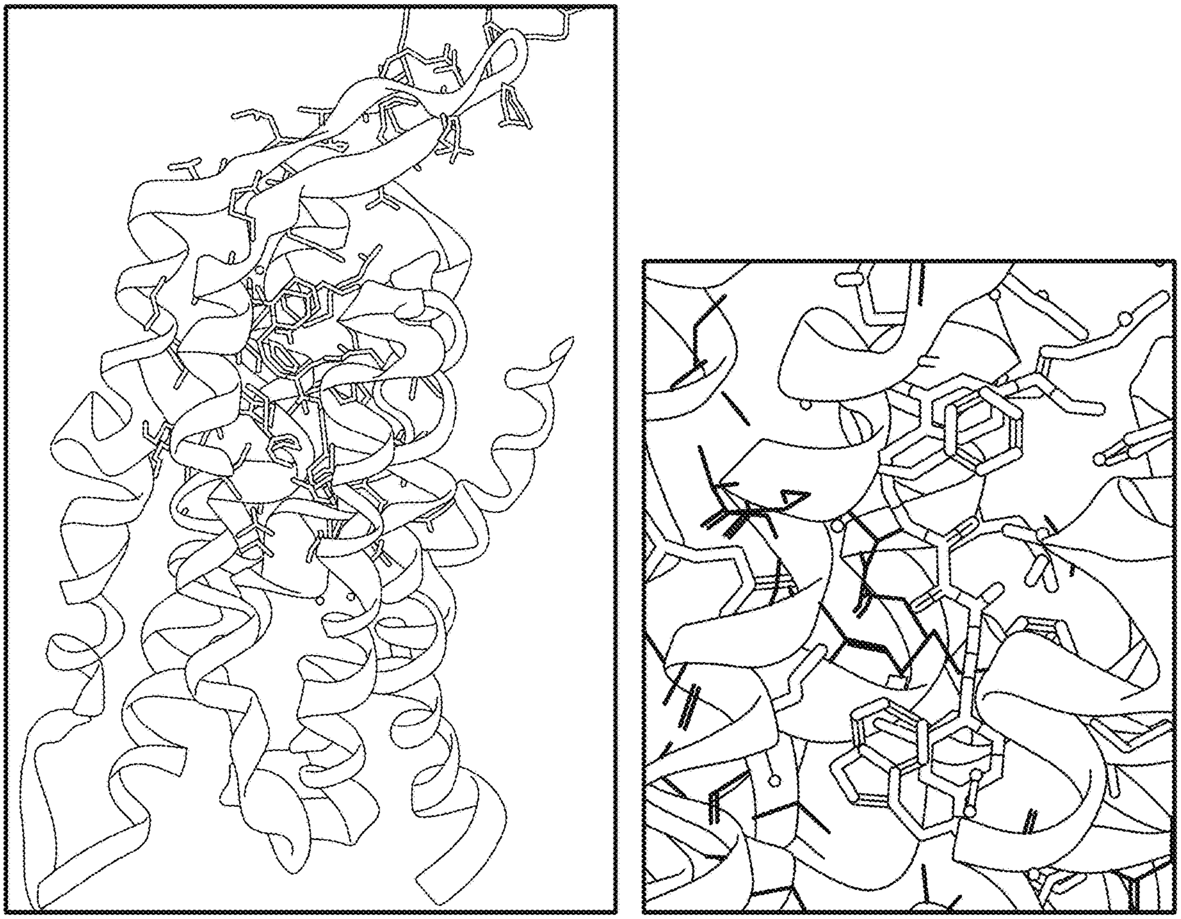
FIG. 48 shows in silico modeling of a transmembrane compound, according to one exemplary embodiment of the disclosed subject matter, docked within the transmembrane region of T1R1.
Figure 48:
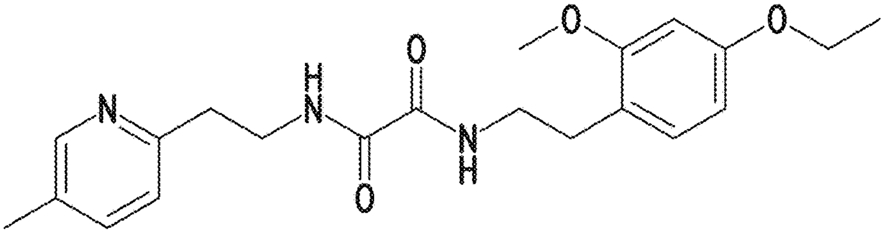
Figure 49:
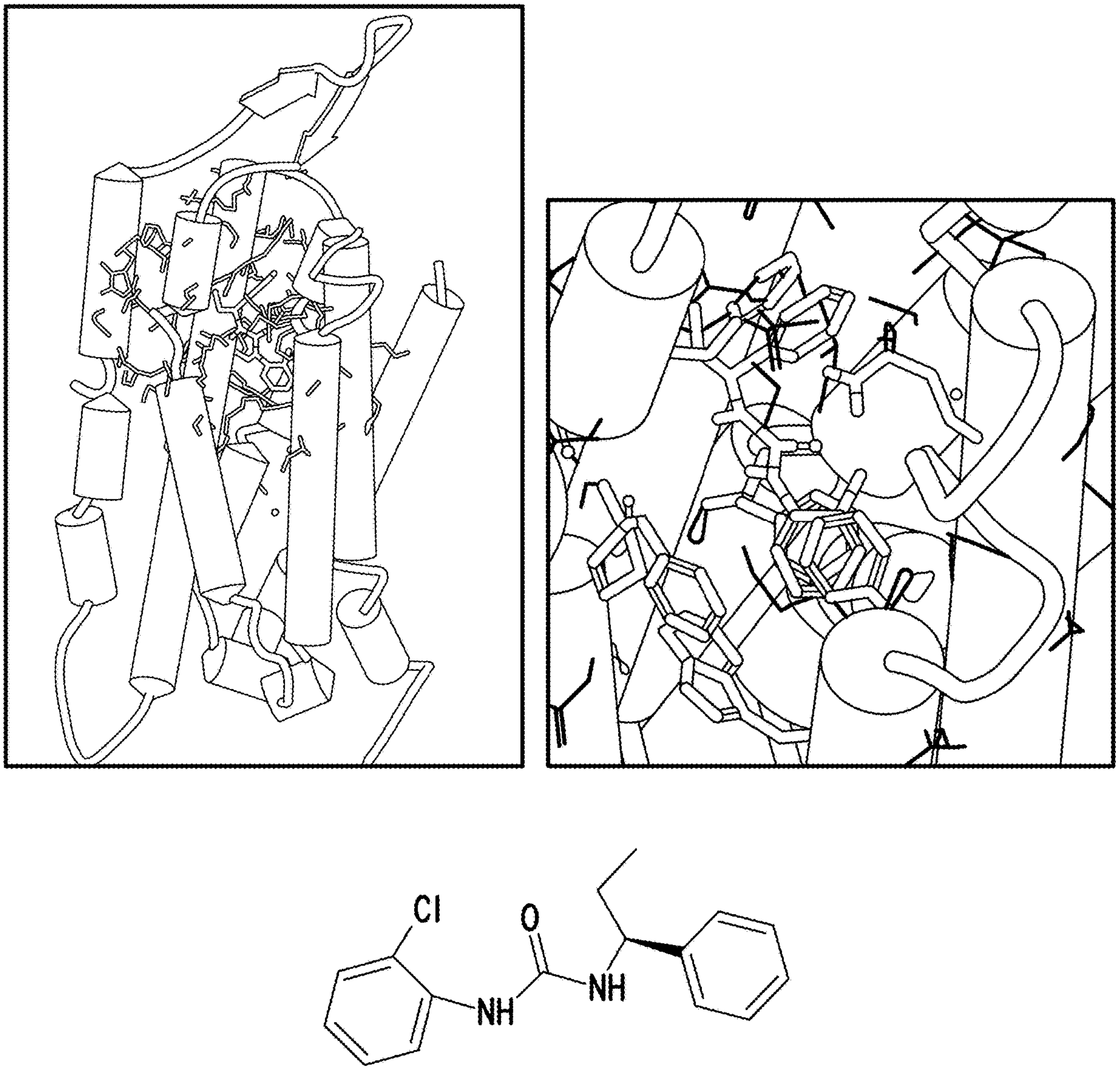
FIG. 49 shows in silico modeling of a transmembrane compound, according to one exemplary embodiment of the disclosed subject matter, docked within the transmembrane region of T1R1.
Figure 50:
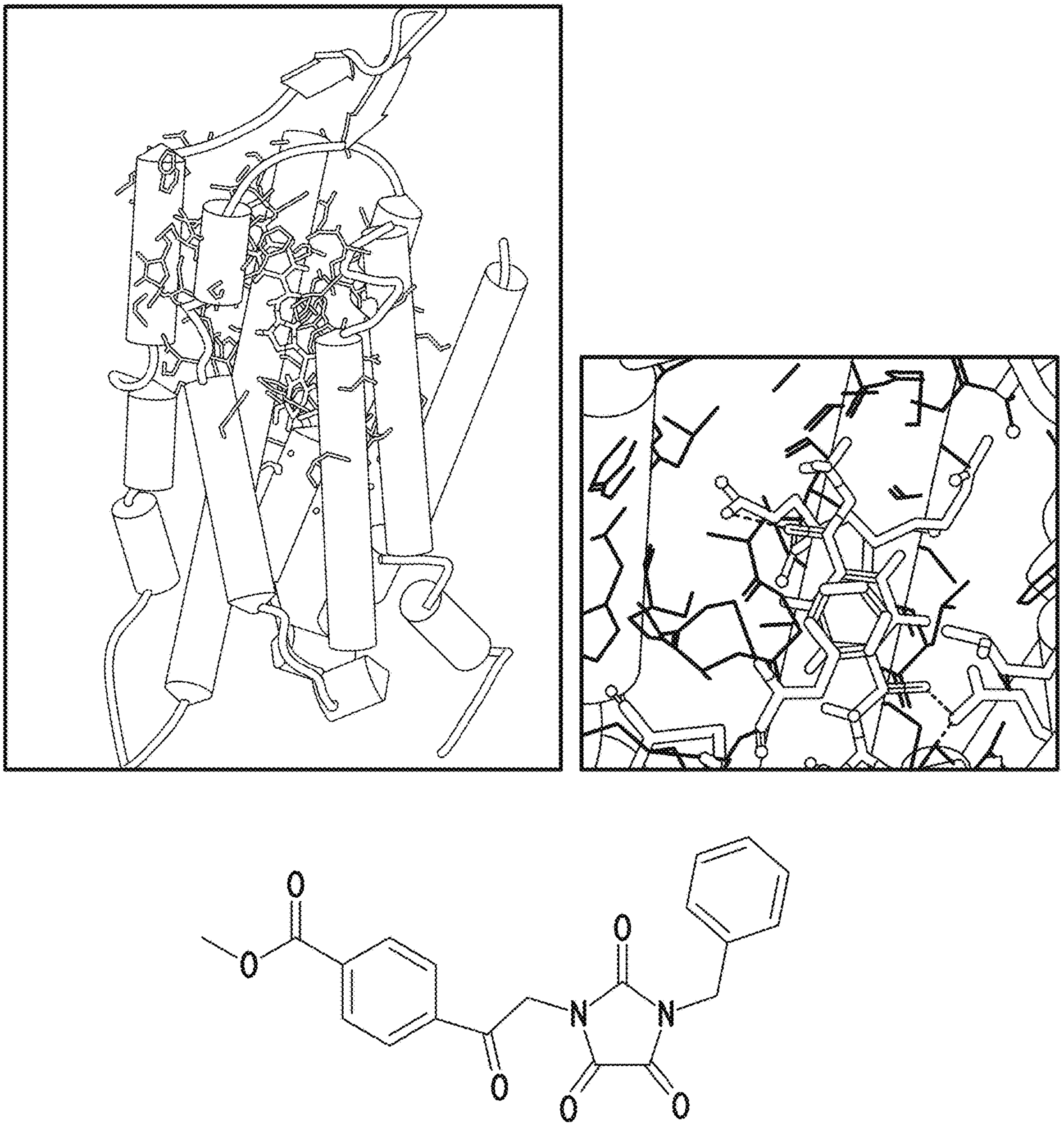
FIG. 50 shows in silico modeling of a transmembrane compound, according to one exemplary embodiment of the disclosed subject matter, docked within the transmembrane region of T1R1.
Figure 51:
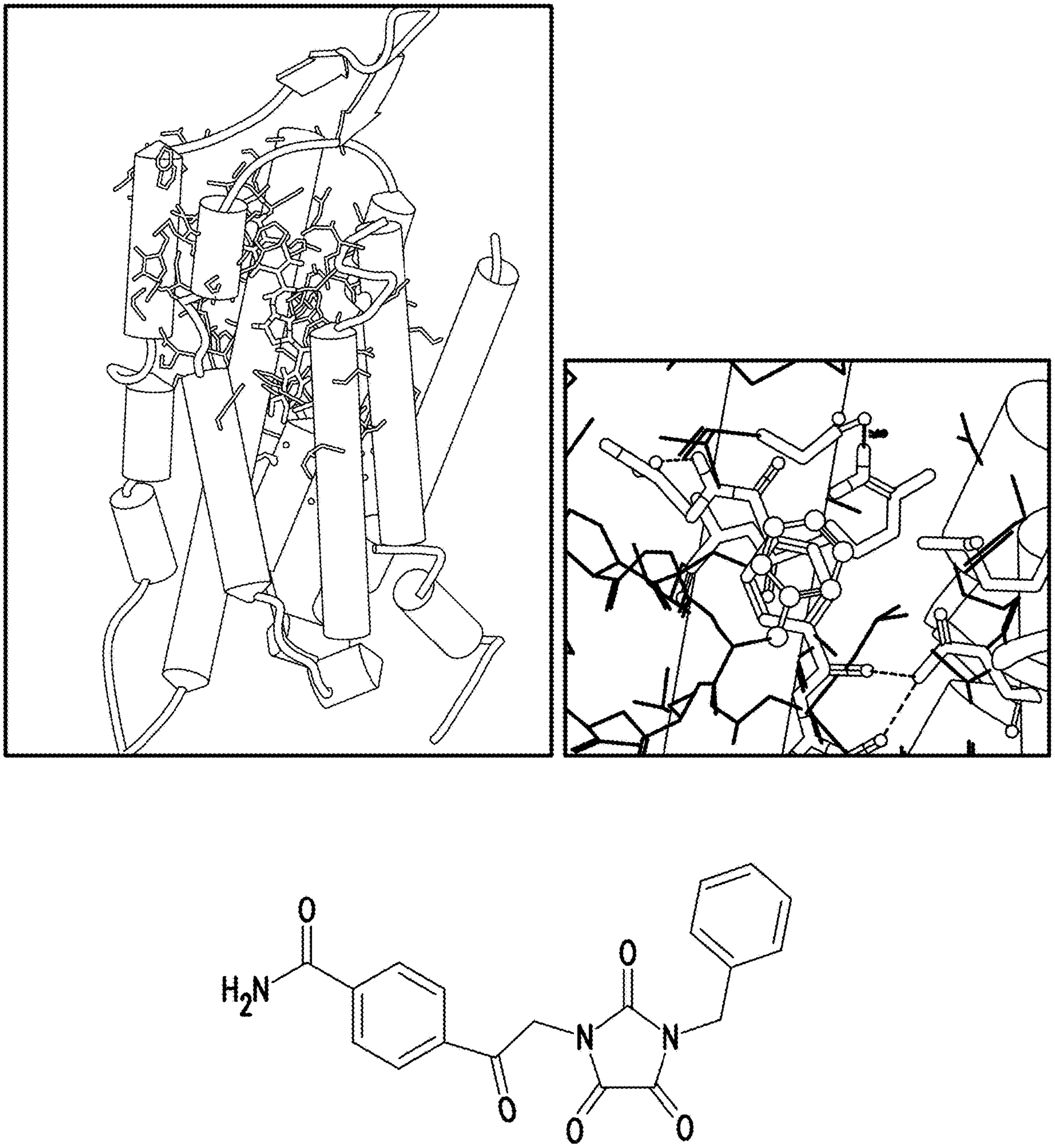
FIG. 51 shows in silico modeling of a transmembrane compound, according to one exemplary embodiment of the disclosed subject matter, docked within the transmembrane region of T1R1.
Figure 52:
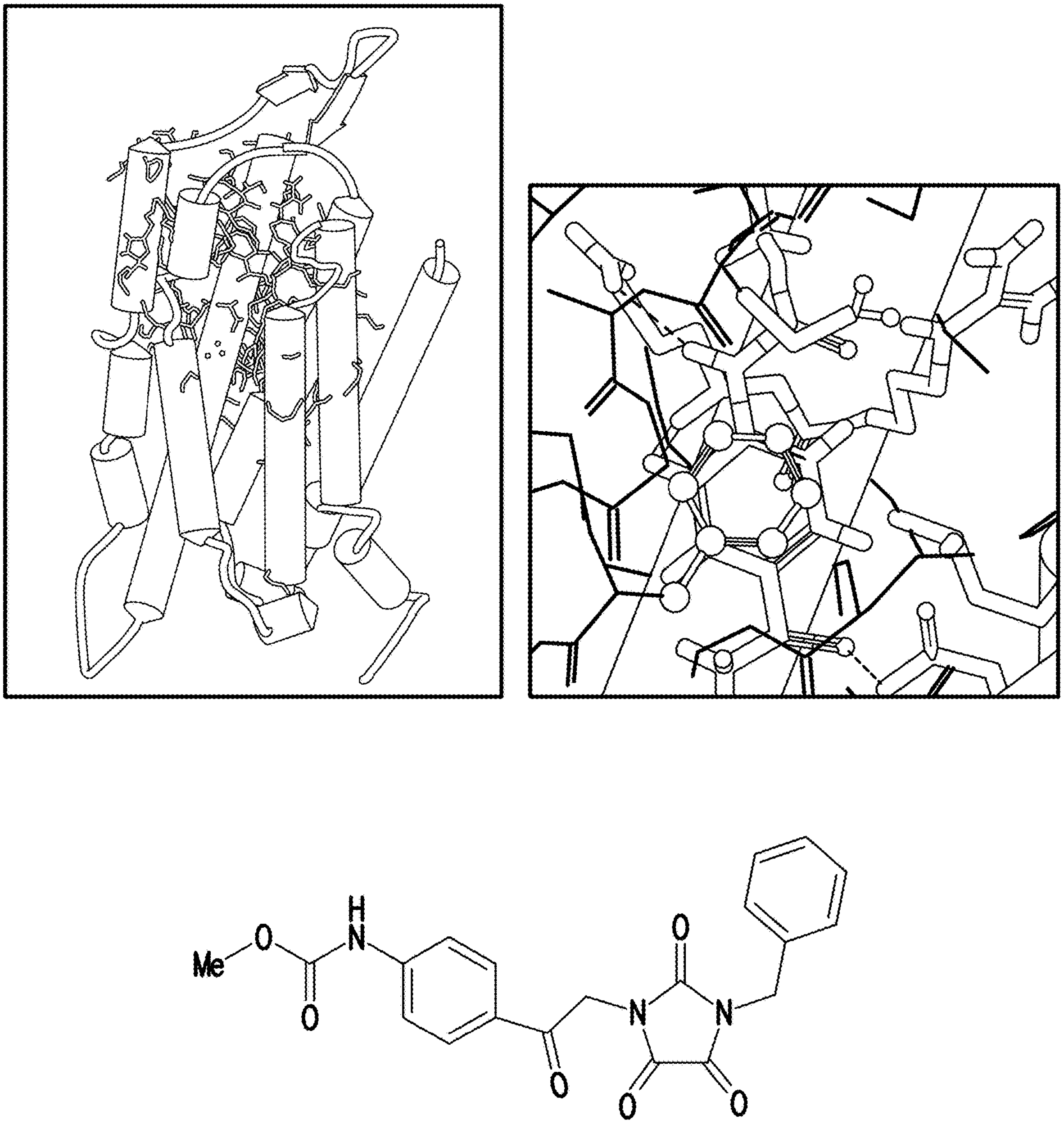
FIG. 52 shows in silico modeling of a transmembrane compound, according to one exemplary embodiment of the disclosed subject matter, docked within the transmembrane region of T1R1.
Figure 53:
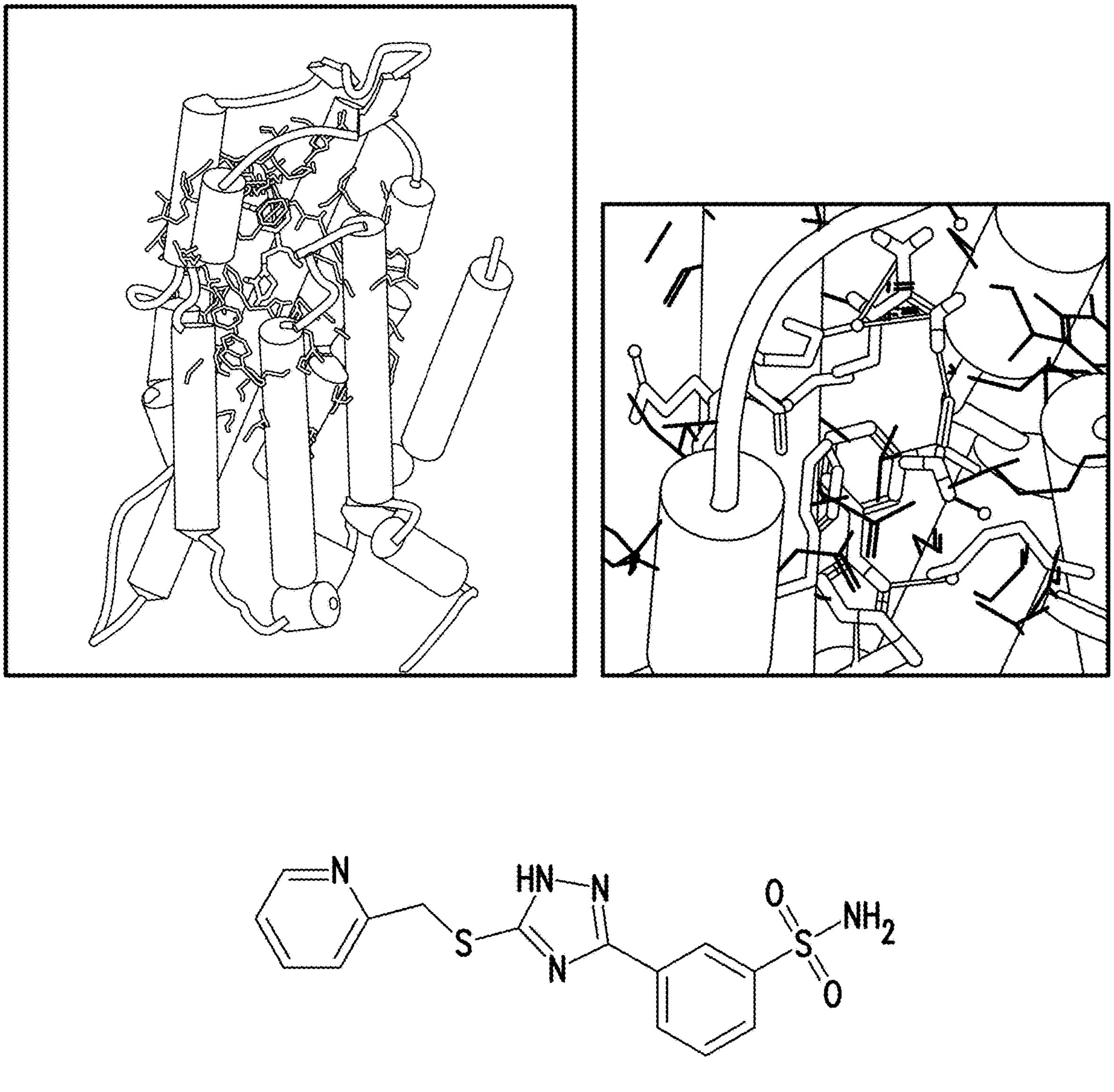
FIG. 53 shows in silico modeling of a transmembrane compound, according to one exemplary embodiment of the disclosed subject matter, docked within the transmembrane region of T1R1.
Figure 54:
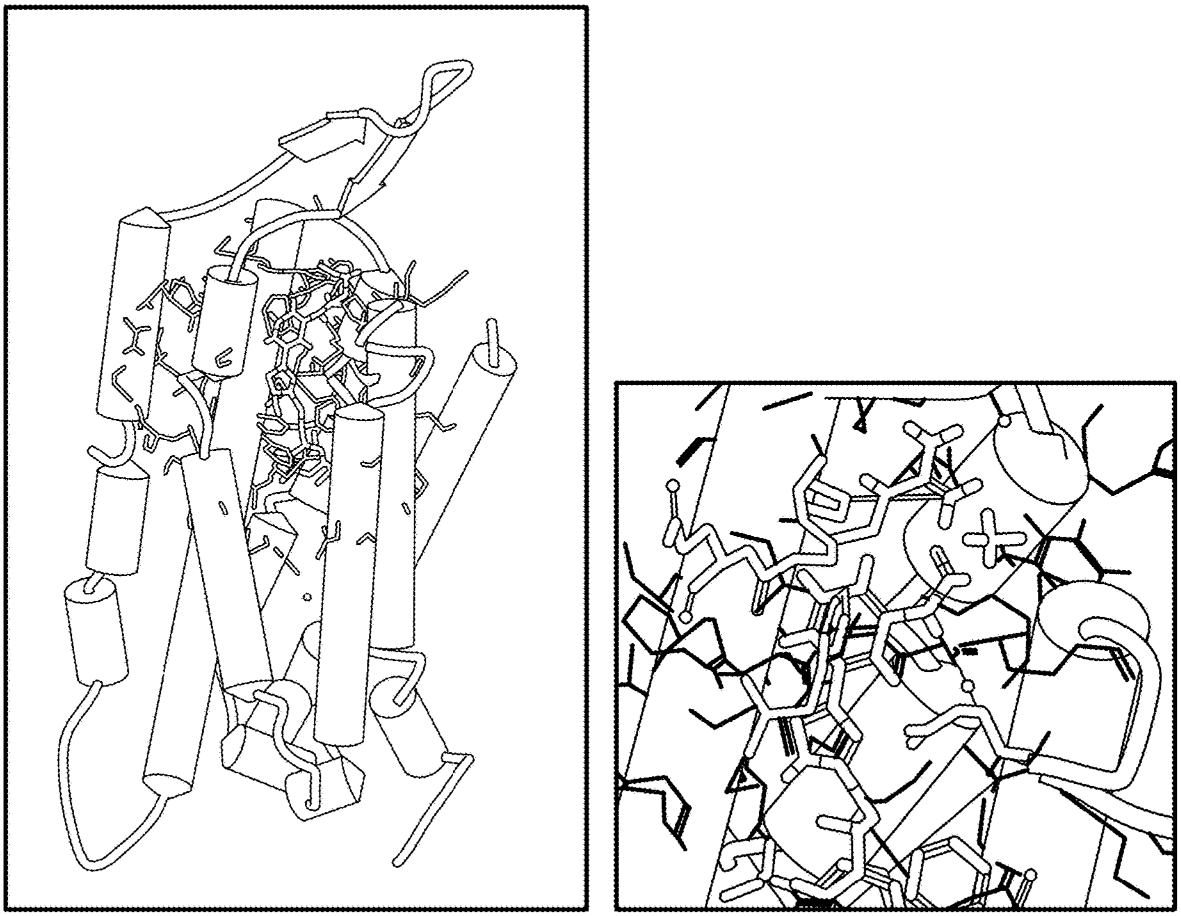
FIG. 54 shows in silico modeling of a transmembrane compound, according to one exemplary embodiment of the disclosed subject matter, docked within the transmembrane region of T1R1.
Figure 54:
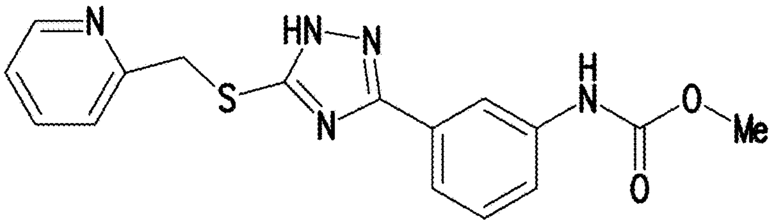
Figure 55:
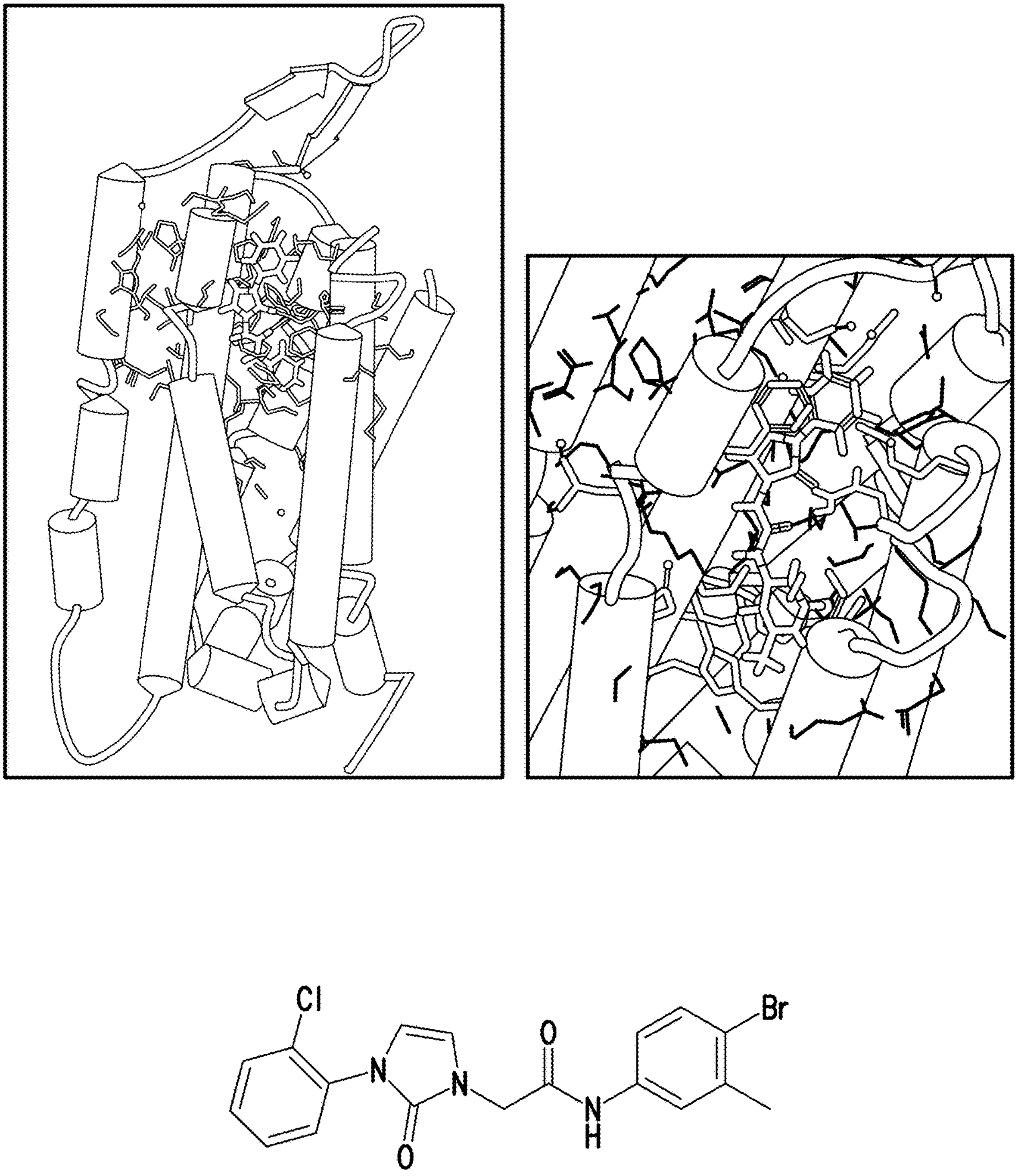
FIG. 55 shows in silico modeling of a transmembrane compound, according to one exemplary embodiment of the disclosed subject matter, docked within the transmembrane region of T1R1.
Figure 56A:
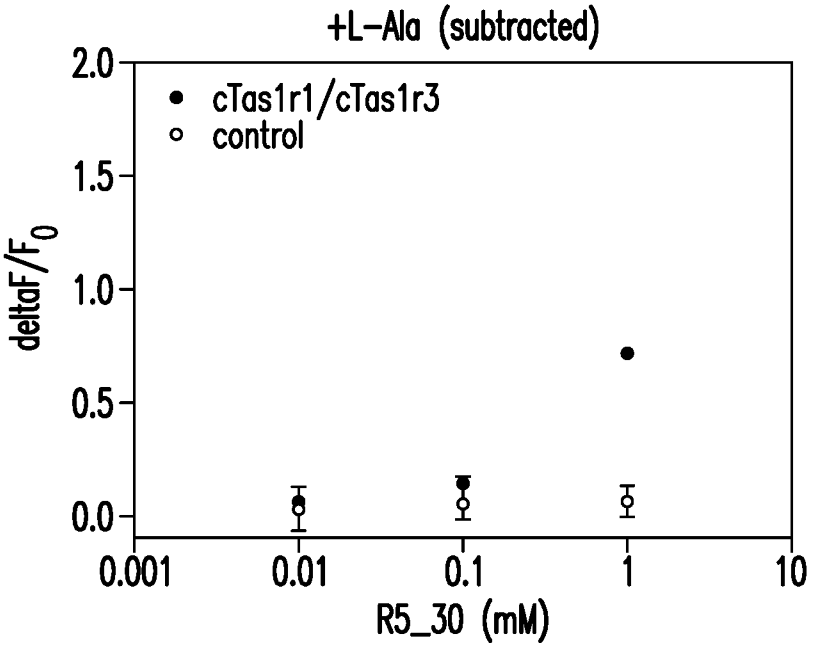
FIG. 56A-B shows (A) the activation of T1R1/T1R3 by 1,3-dibenzylpyrimidine-2,4,6(1H,3H,5H)-trione in the presence of 20 mM L-alanine or 0.2 mM IMP, and (B) dose response curves for activating T1R1/T1R3 by 1,3-dibenzylpyrimidine-2,4,6(1H,3H,5H)-trione alone in buffer, or in the presence of 20 mM L-alanine, 0.2 mM IMP, or both 20 mM L-alanine and 0.2 mM IMP.
Figure 56A:
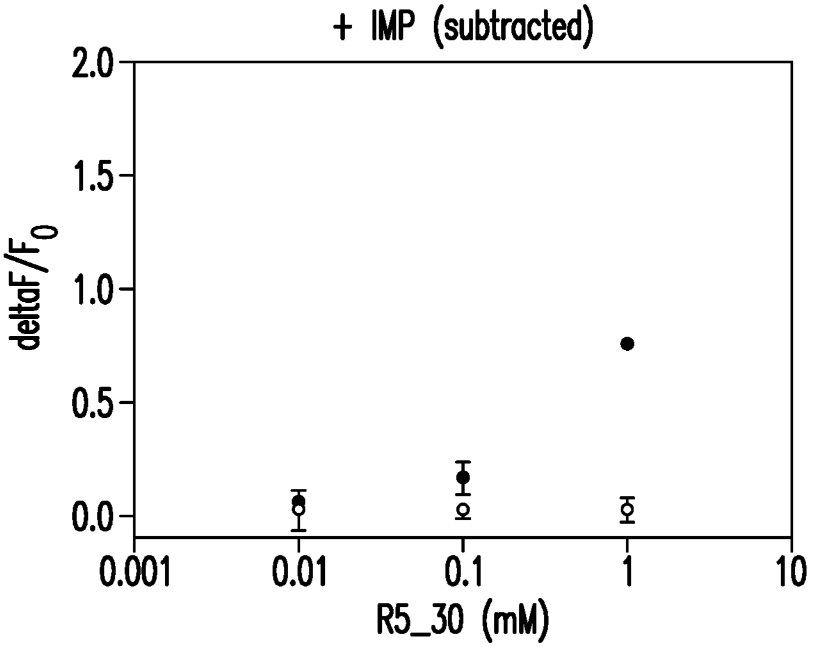
Figure 56B:
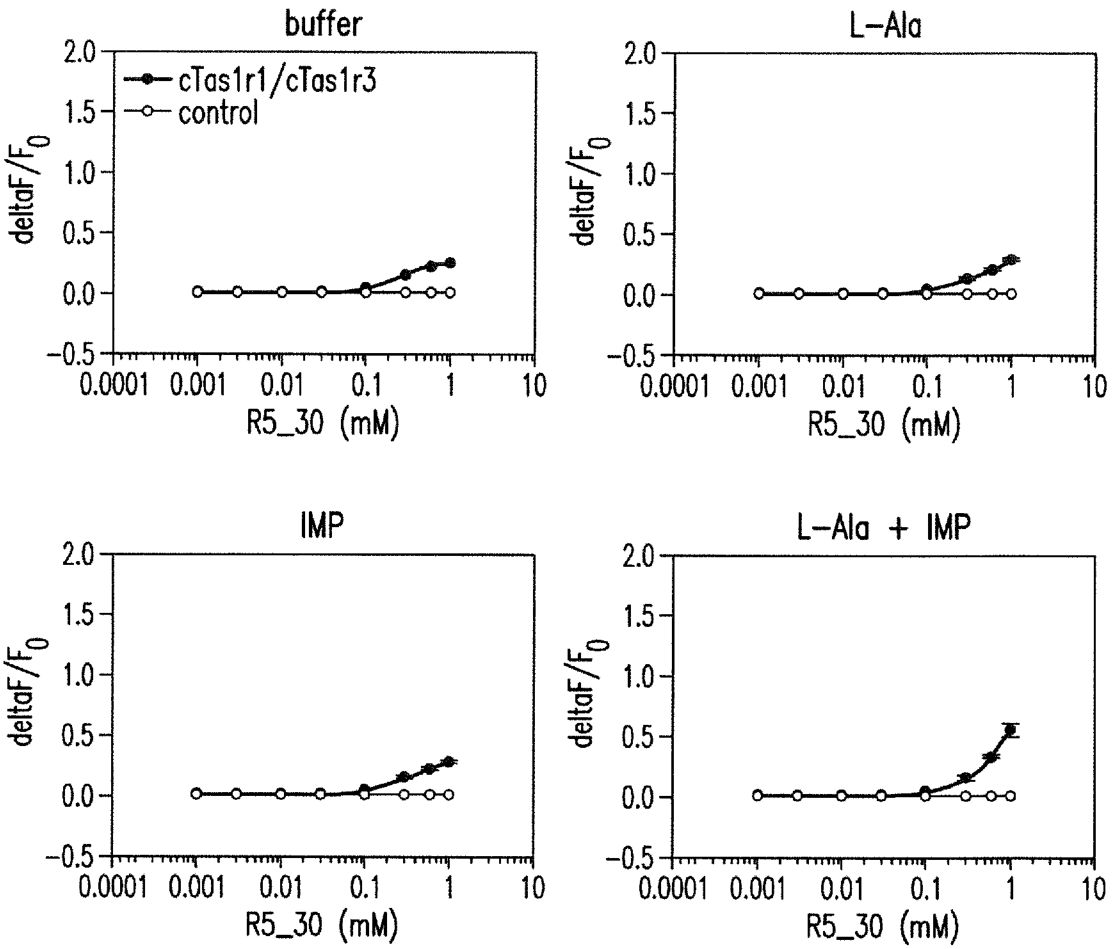
Figure 57A:
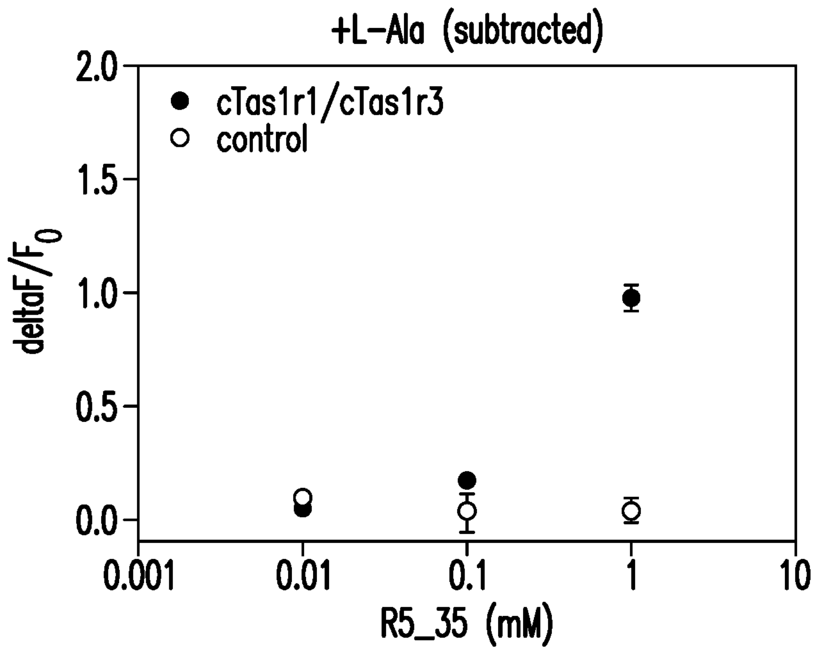
FIG. 57A-B shows (A) the activation of T1R1/T1R3 by 4-benzyl-3-butyl-1-(2-oxo-2-(pyrrolidin-1-yl)ethyl)-1H-1,2,4-triazol-5(4H)-one in the presence of 20 mM L-alanine or 0.2 mM IMP, and (B) dose response curves for activating T1R1/T1R3 by 4-benzyl-3-butyl-1-(2-oxo-2-(pyrrolidin-1-yl)ethyl)-1H-1,2,4-triazol-5(4H)-one alone in buffer, or in the presence of 20 mM L-alanine, 0.2 mM IMP, or both 20 mM L-alanine and 0.2 mM IMP.
Figure 57A:
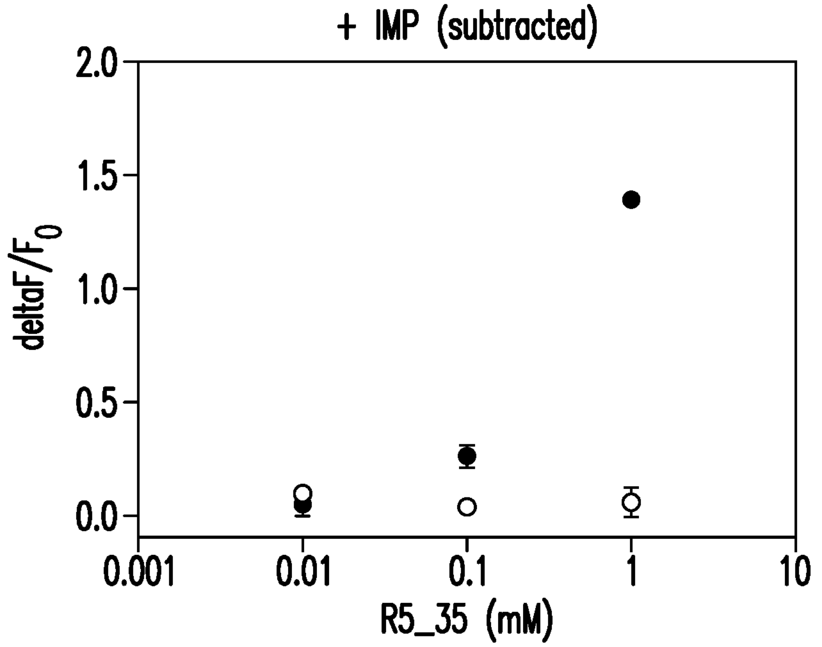
Figure 57B:
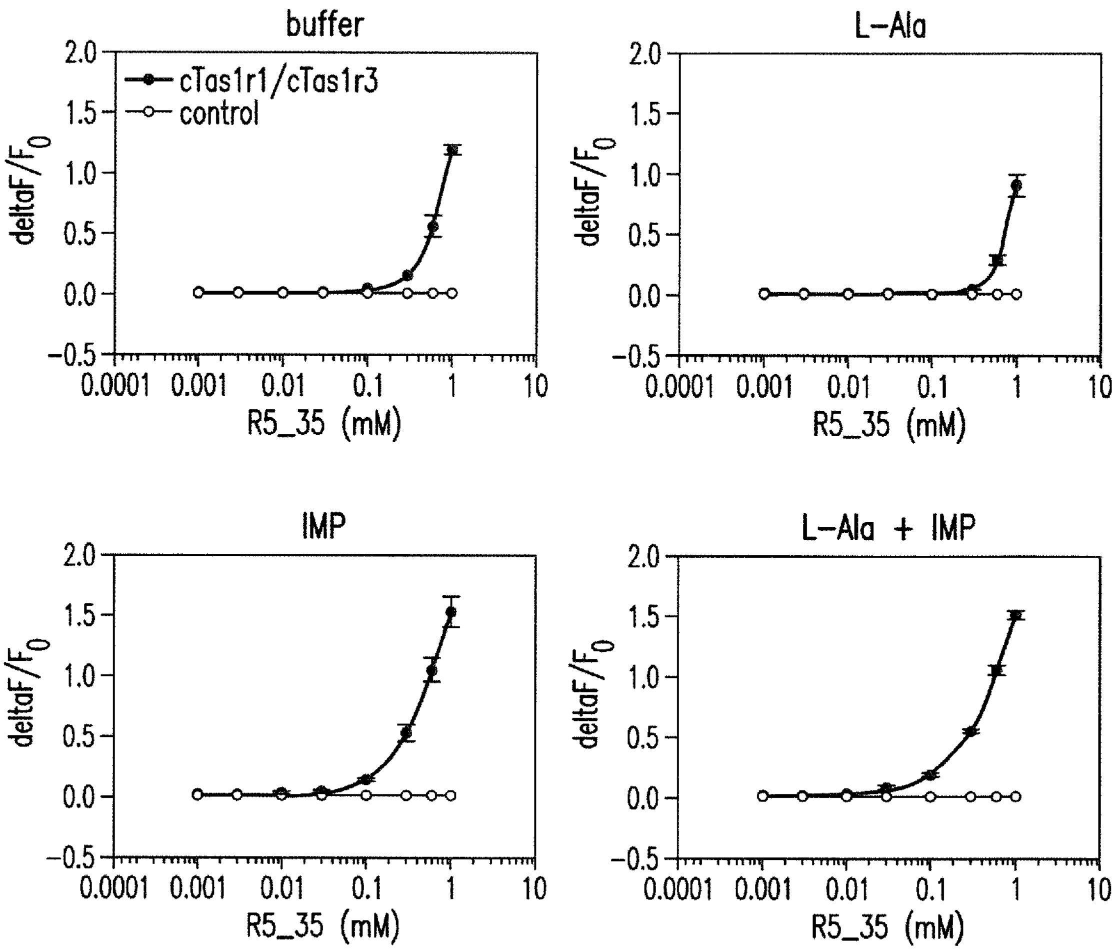
Figure 58A:
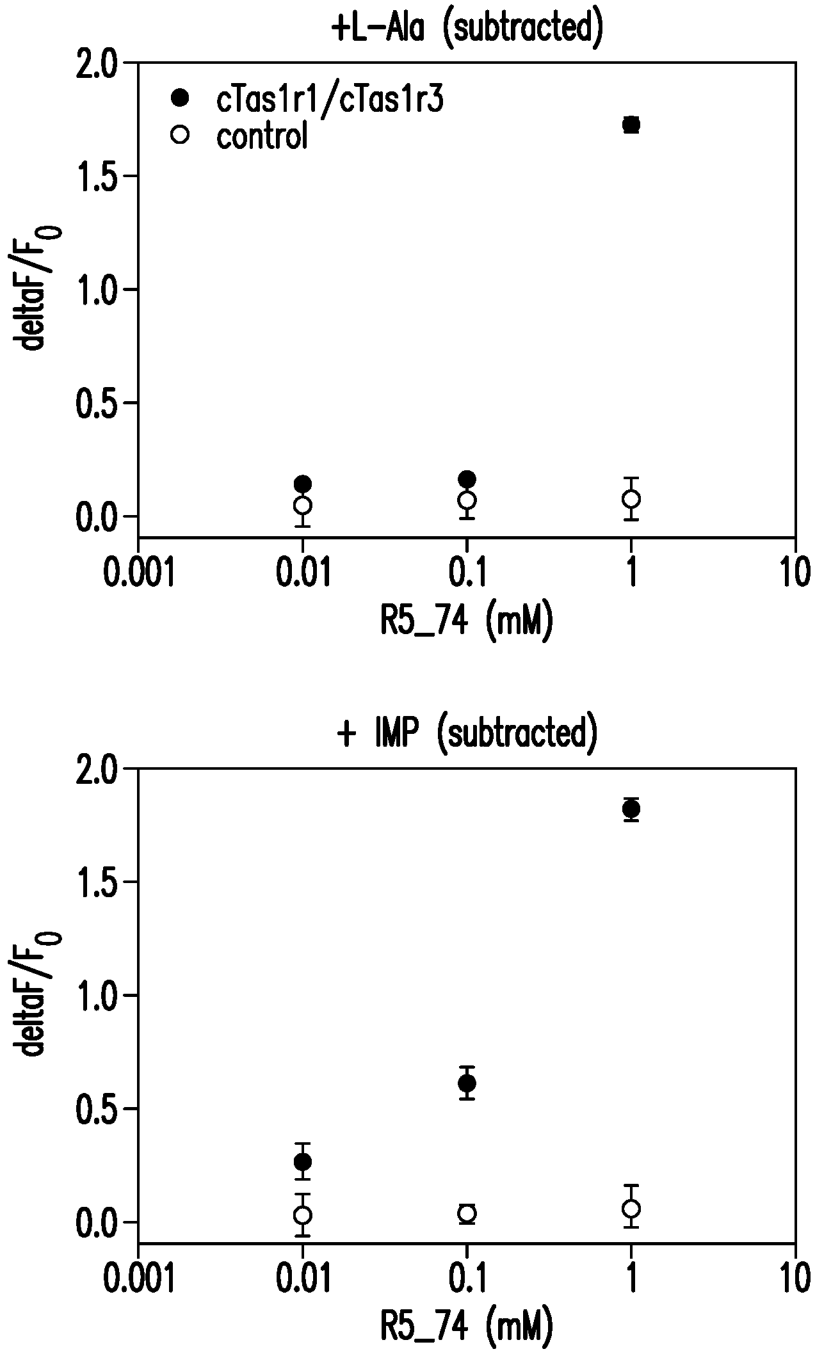
FIG. 58A-B shows (A) the activation of T1R1/T1R3 by 2-((3,5-dichlorophenyl)carbamoyl)cyclohexanecarboxylic acid in the presence of 20 mM L-alanine or 0.2 mM IMP, and (B) dose response curves for activating T1R1/T1R3 by 2-((3,5-dichlorophenyl)carbamoyl)cyclohexanecarboxylic acid alone in buffer, or in the presence of 20 mM L-alanine, 0.2 mM IMP, or both 20 mM L-alanine and 0.2 mM IMP.
Figure 58B:
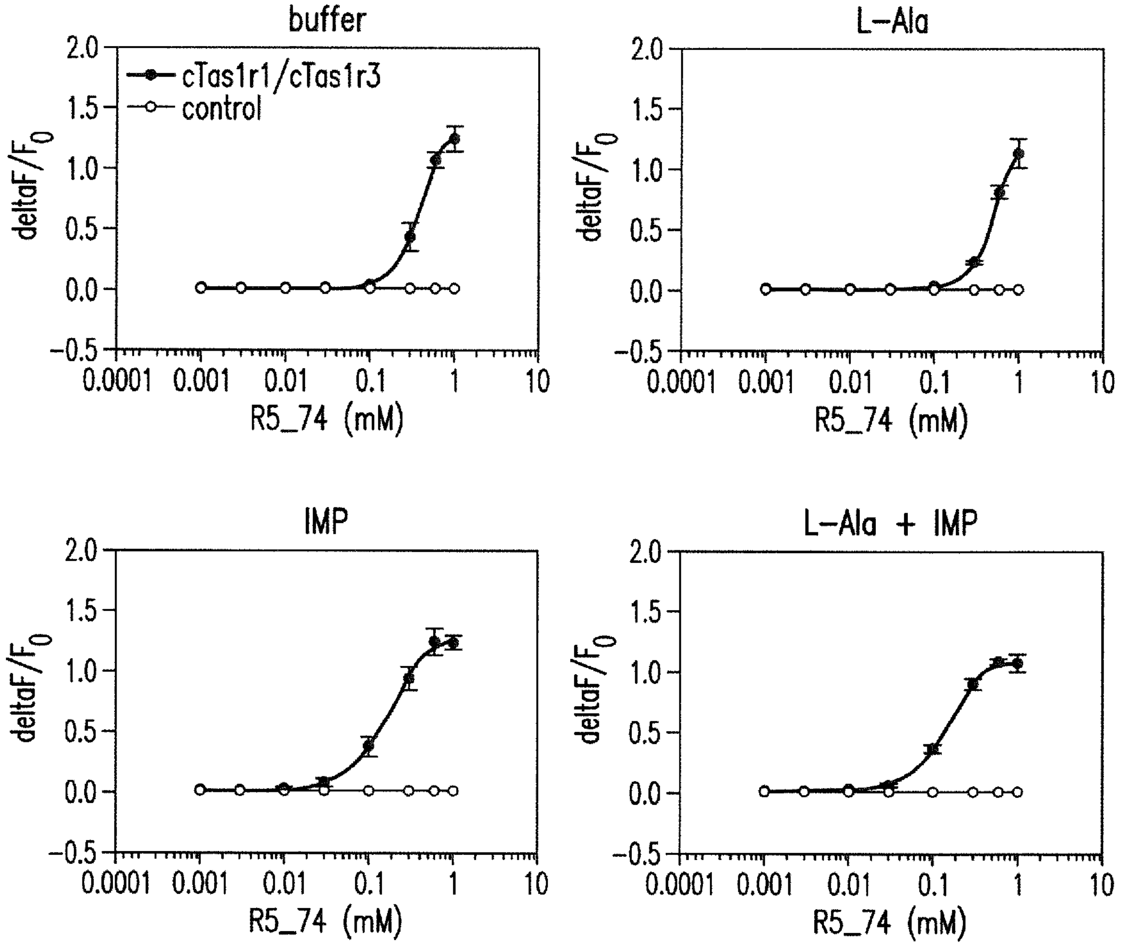
Figure 59A:
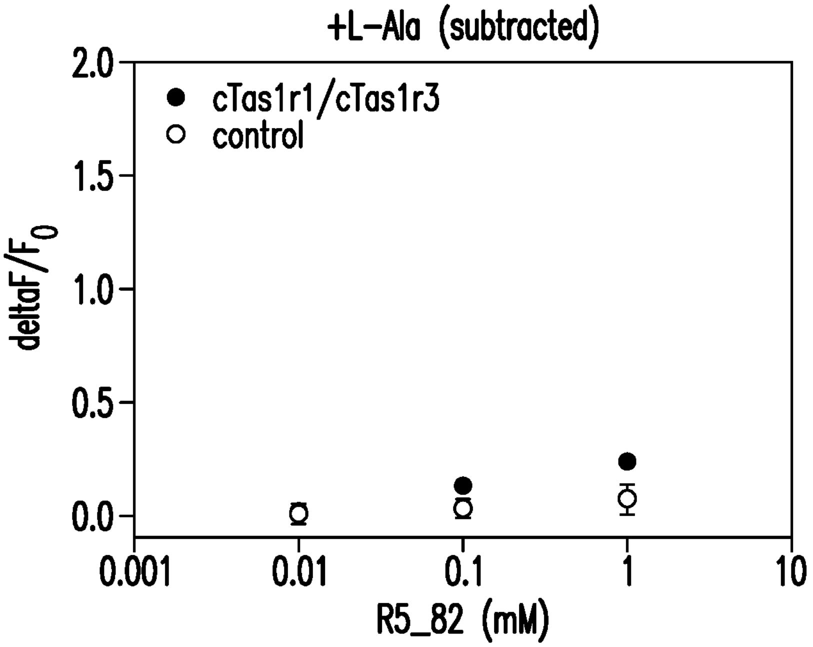
FIG. 59A-B shows (A) the activation of T1R1/T1R3 by 4-acetamido-N-(1-(2-hydroxyethyl)-3-phenyl-1H-pyrazol-5-yl)benzamide in the presence of 20 mM L-alanine or 0.2 mM IMP, and (B) dose response curves for activating T1R1/T1R3 by 4-acetamido-N-(1-(2-hydroxyethyl)-3-phenyl-1H-pyrazol-5-yl)benzamide alone in buffer, or in the presence of 20 mM L-alanine, 0.2 mM IMP, or both 20 mM L-alanine and 0.2 mM IMP.
Figure 59A:
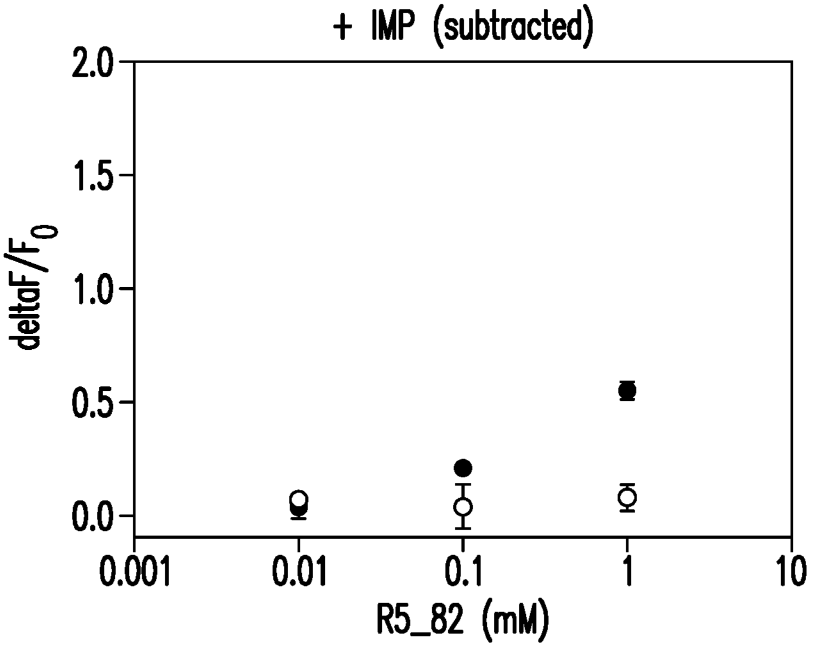
Figure 59B:
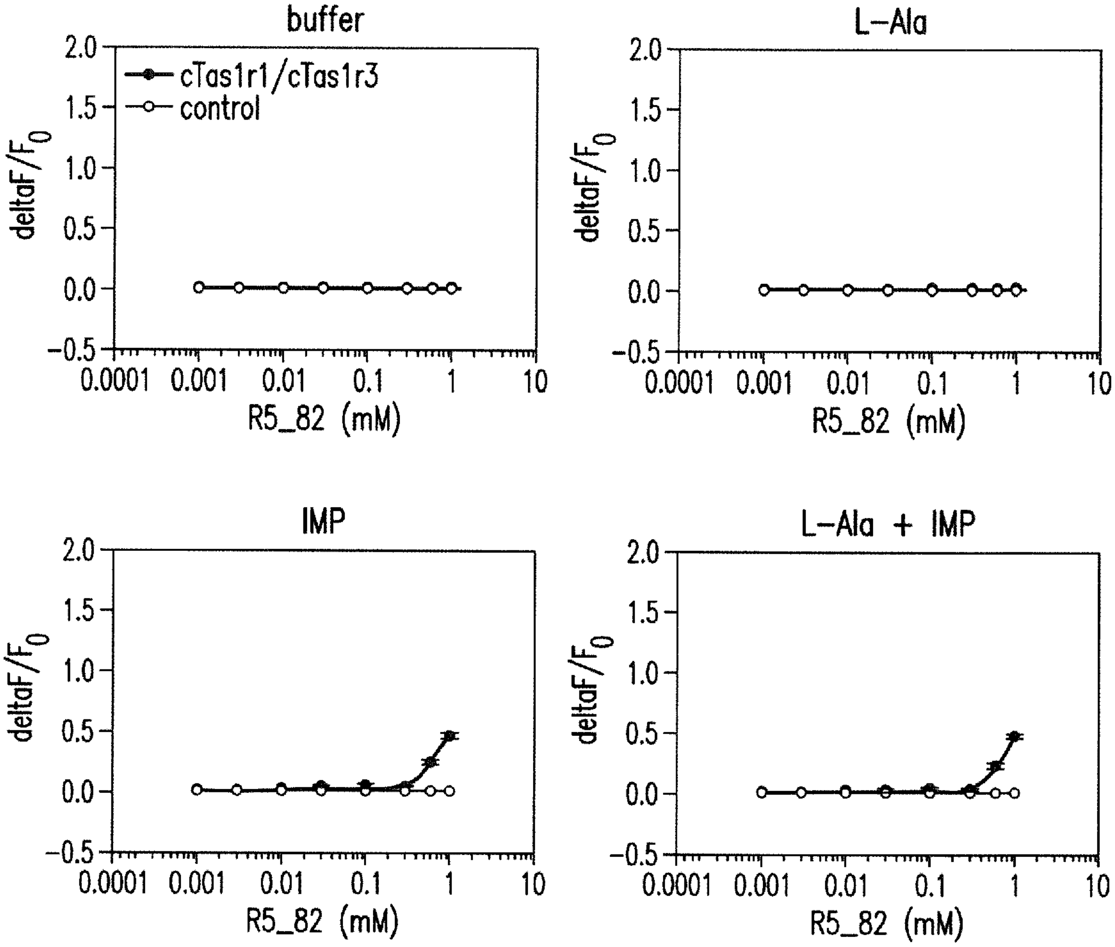
Figure 60A:
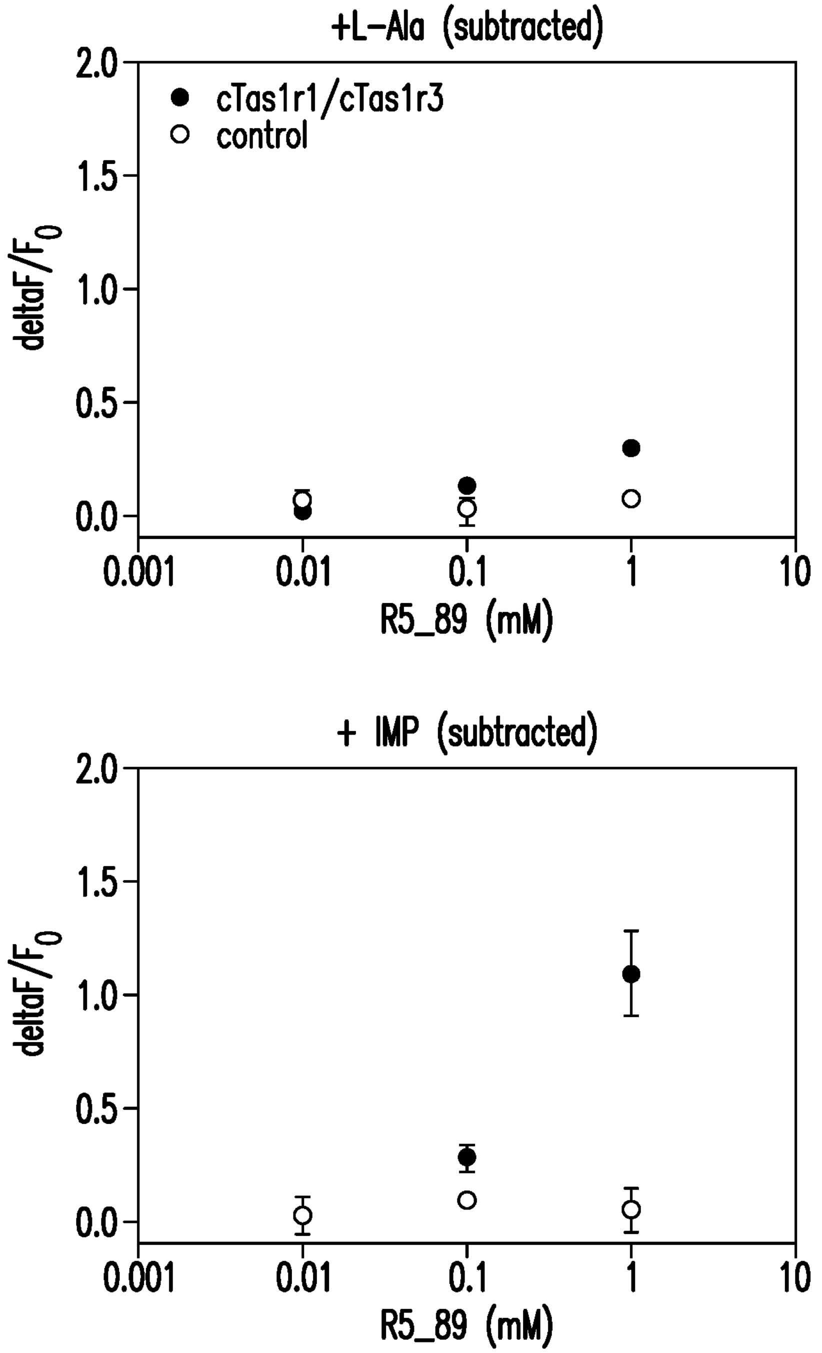
FIG. 60A-B shows (A) the activation of T1R1/T1R3 by (Diphenylacetyl)-carbamic acid ethyl ester in the presence of 20 mM L-alanine or 0.2 mM IMP, and (B) dose response curves for activating T1R1/T1R3 by (Diphenylacetyl)-carbamic acid ethyl ester alone in buffer, or in the presence of 20 mM L-alanine, 0.2 mM IMP, or both 20 mM L-alanine and 0.2 mM IMP.
Figure 60B:
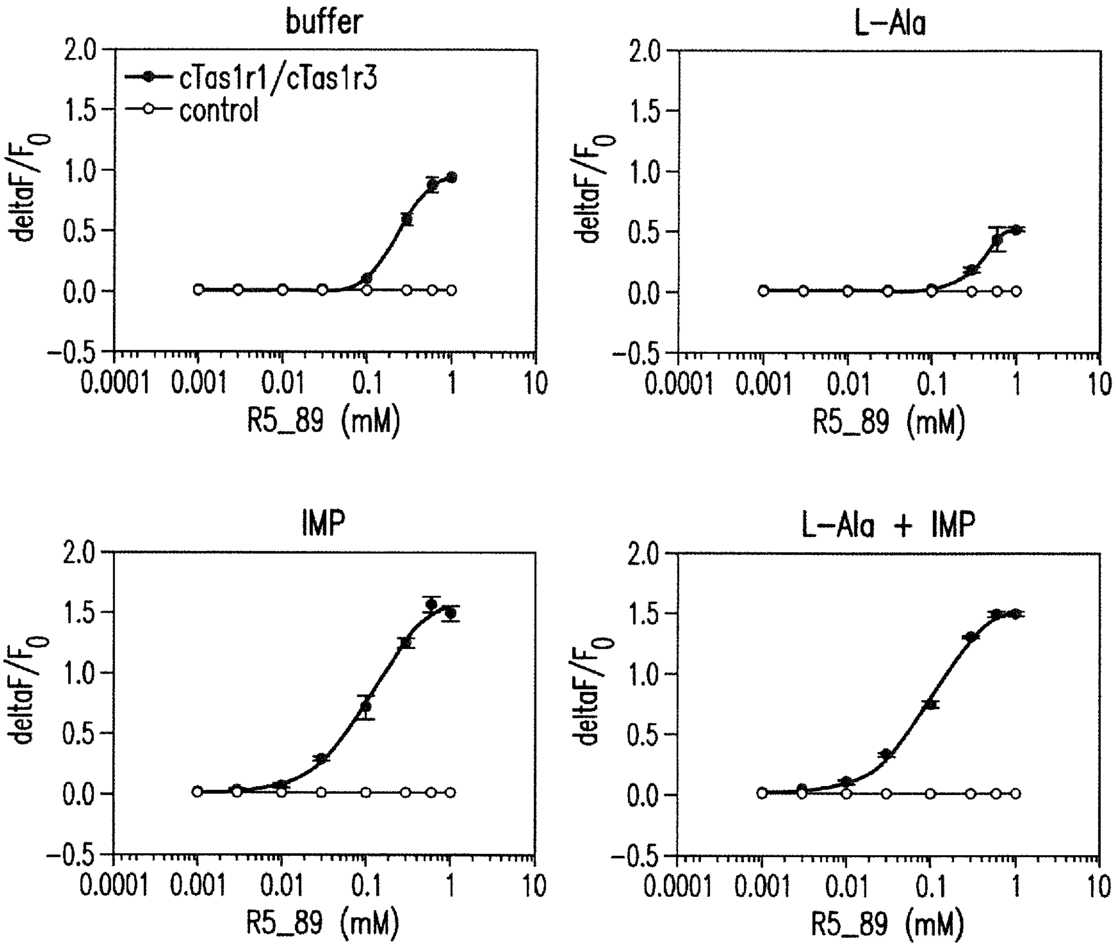
Figure 61A:
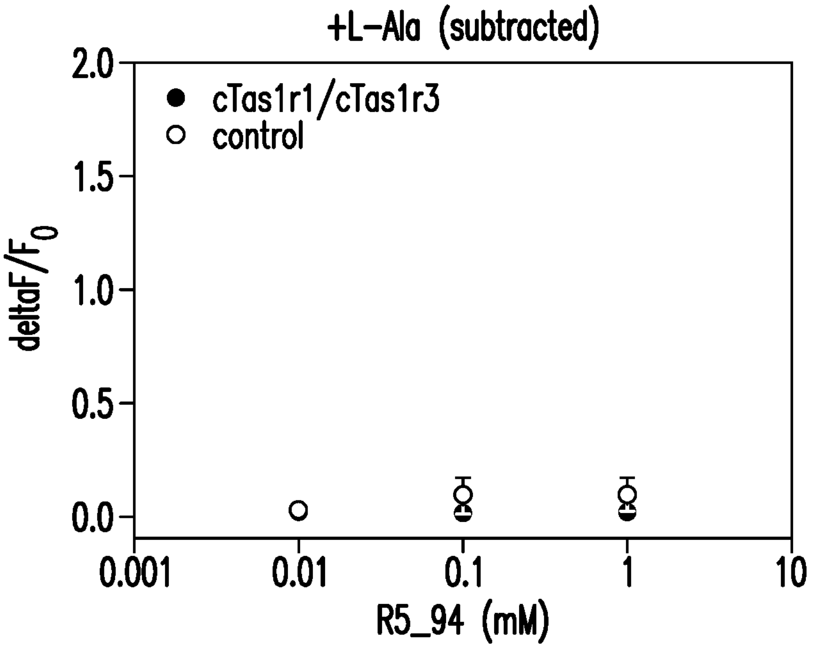
FIG. 61A-B shows (A) the activation of T1R1/T1R3 by N,N'-(butane-1,4-diyl)dinicotinamide in the presence of 20 mM L-alanine or 0.2 mM IMP, and (B) dose response curves for activating T1R1/T1R3 by N,N'-(butane-1,4-diyl)dinicotinamide alone in buffer, or in the presence of 20 mM L-alanine, 0.2 mM IMP, or both 20 mM L-alanine and 0.2 mM IMP.
Figure 61A:
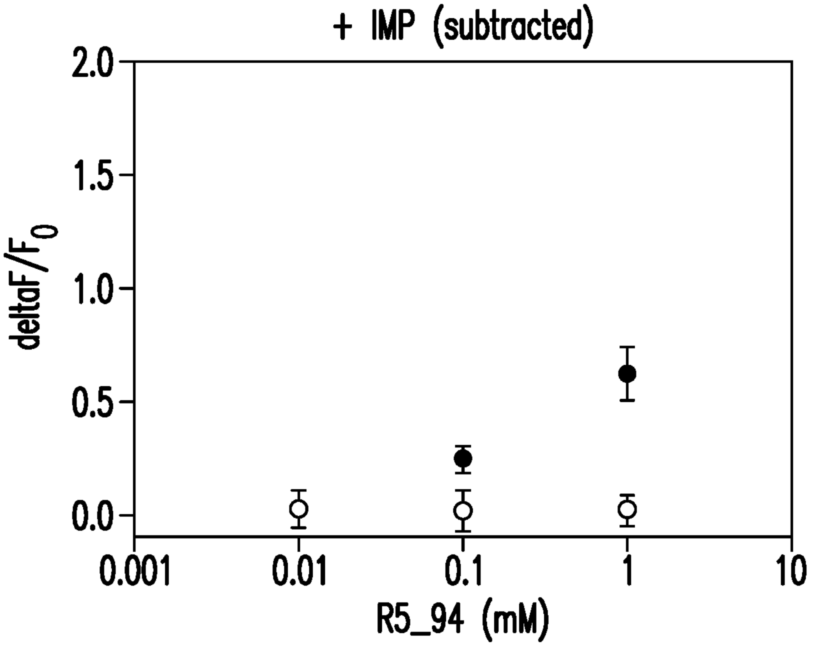
Figure 61B:
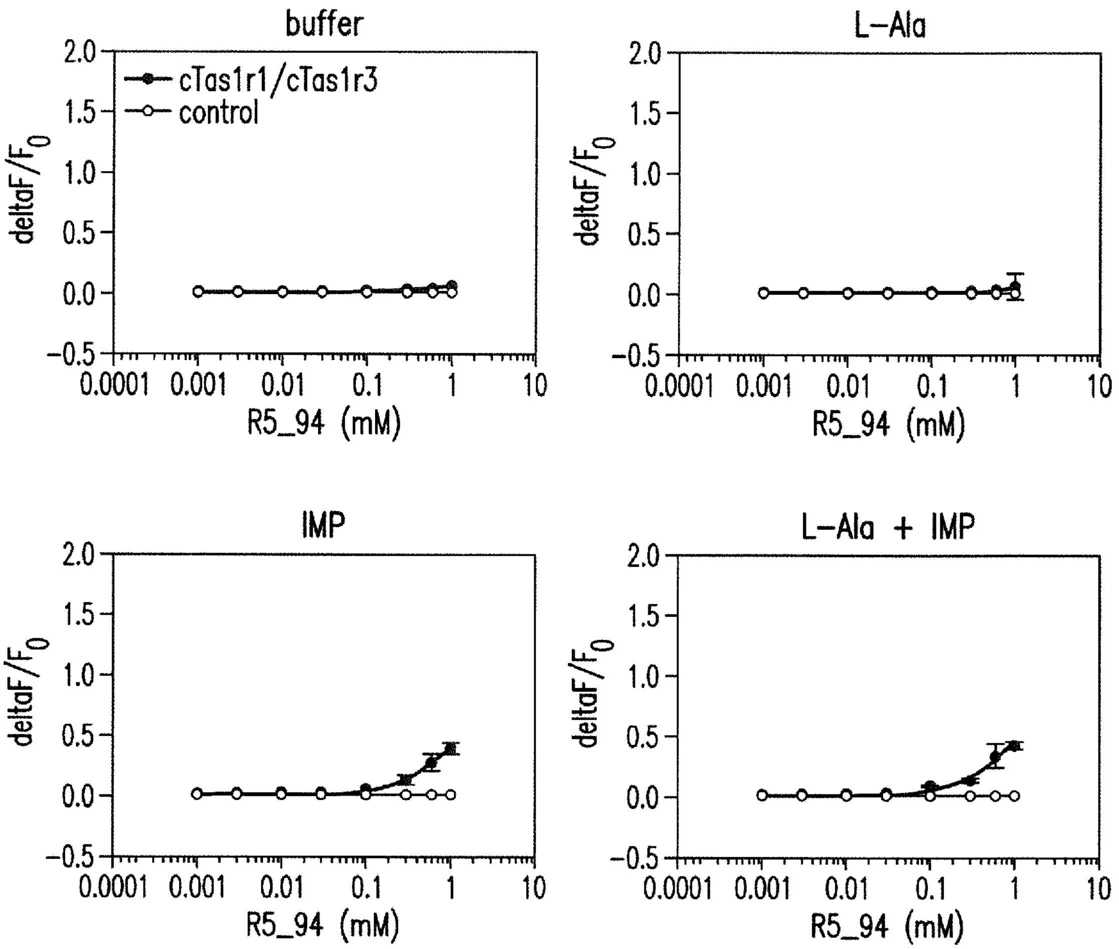
Figure 62A:
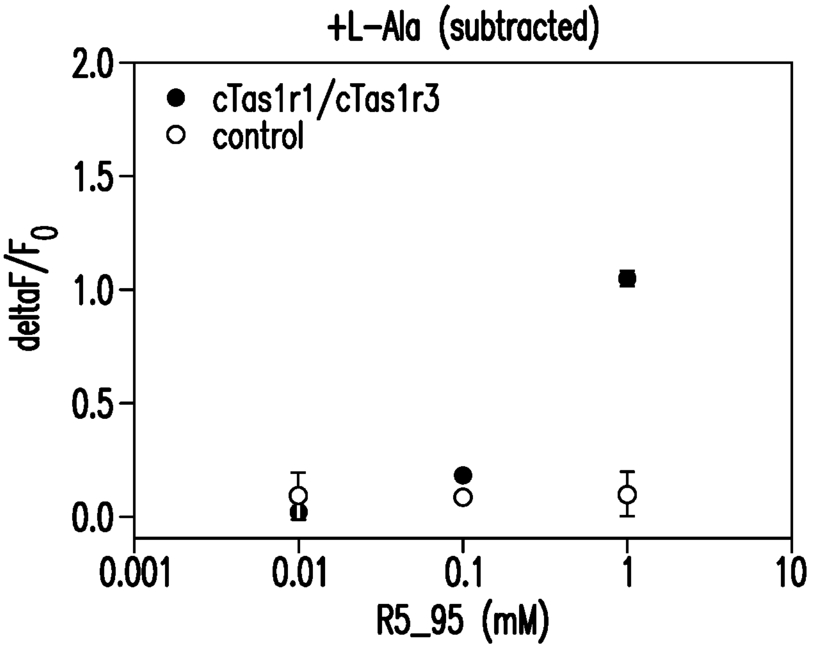
FIG. 62A-B shows (A) the activation of T1R1/T1R3 by N-phenethylnicotinamide in the presence of 20 mM L-alanine or 0.2 mM IMP, and (B) dose response curves for activating T1R1/T1R3 by N-phenethylnicotinamide alone in buffer, or in the presence of 20 mM L-alanine, 0.2 mM IMP, or both 20 mM L-alanine and 0.2 mM IMP.
Figure 62A:
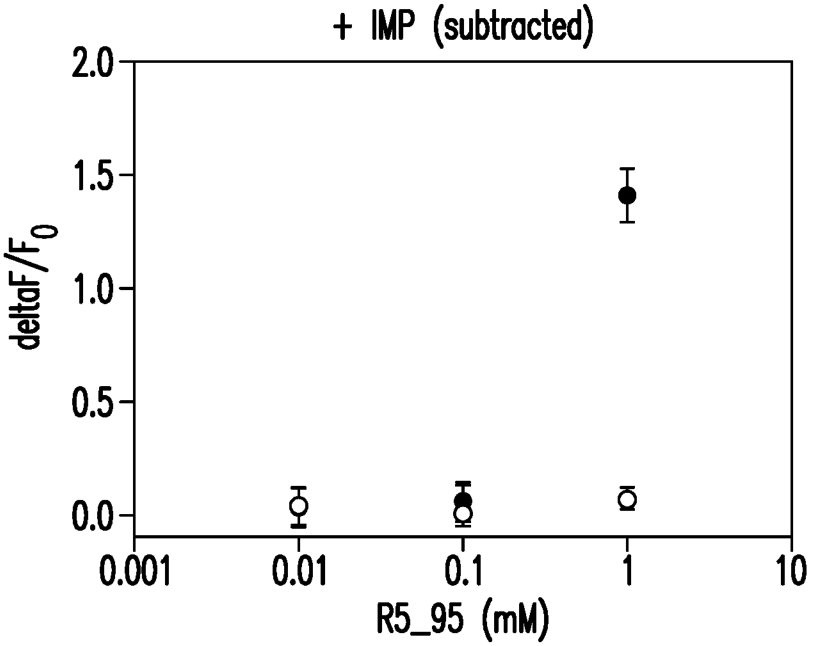
Figure 62B:
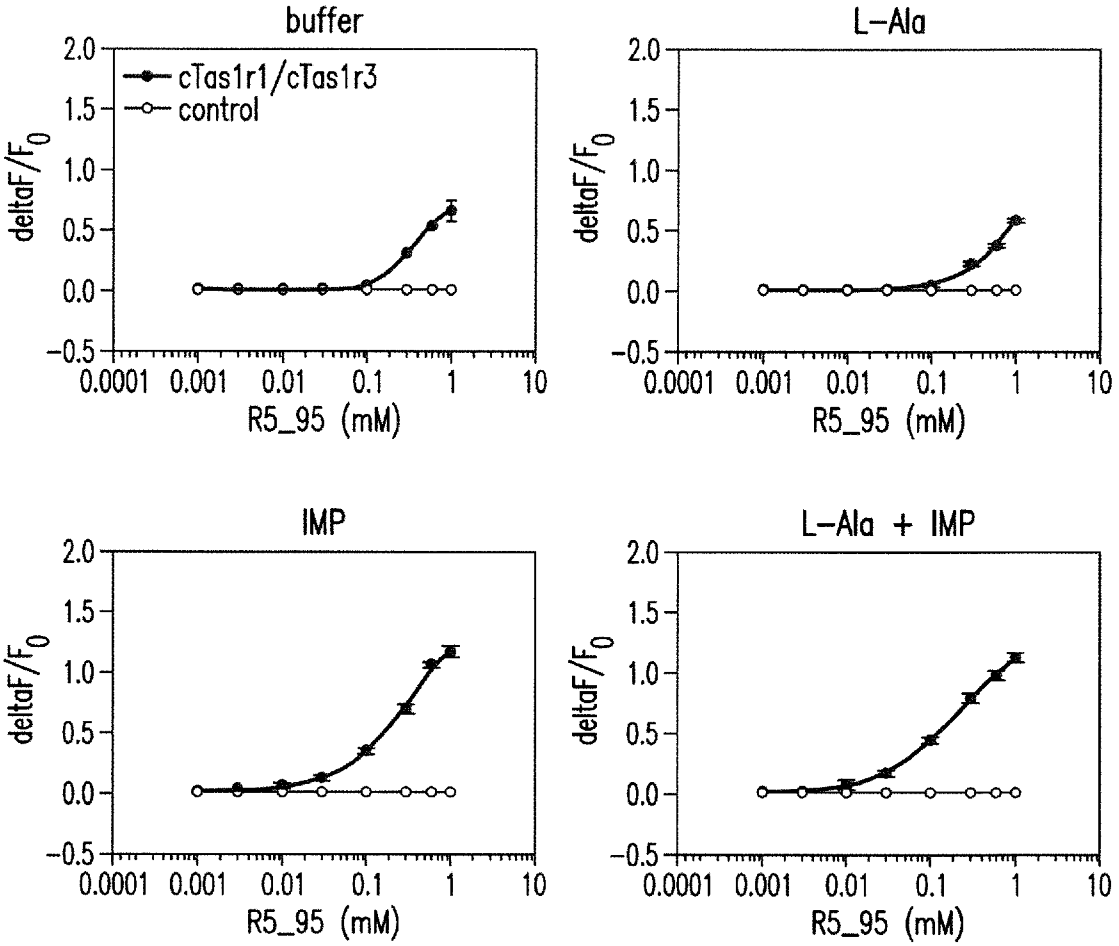
Figure 63A:
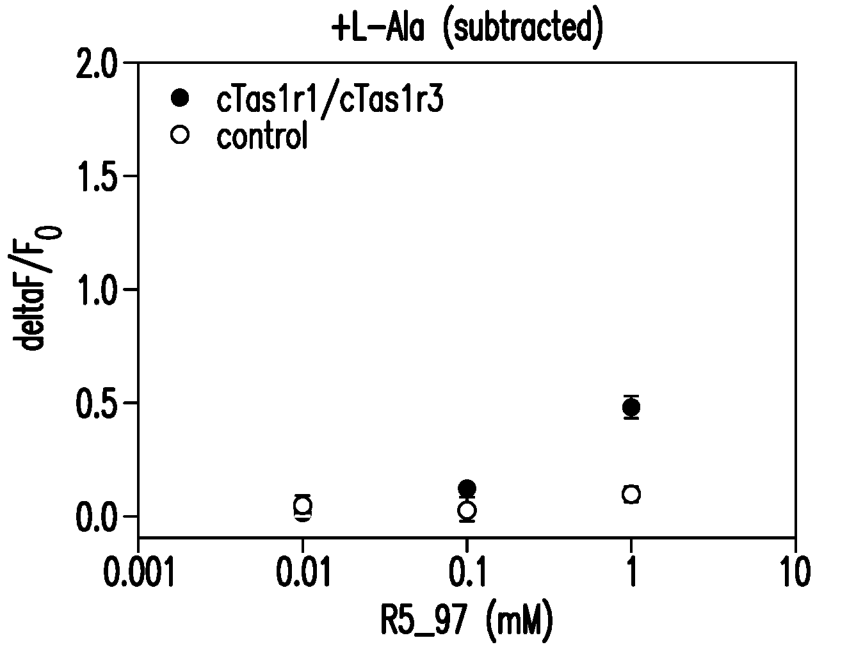
FIG. 63A-B shows (A) the activation of T1R1/T1R3 by 2-amino-N-phenethylbenzamide in the presence of 20 mM L-alanine or 0.2 mM IMP, and (B) dose response curves for activating T1R1/T1R3 by 2-amino-N-phenethylbenzamide alone in buffer, or in the presence of 20 mM L-alanine, 0.2 mM IMP, or both 20 mM L-alanine and 0.2 mM IMP.
Figure 63A:
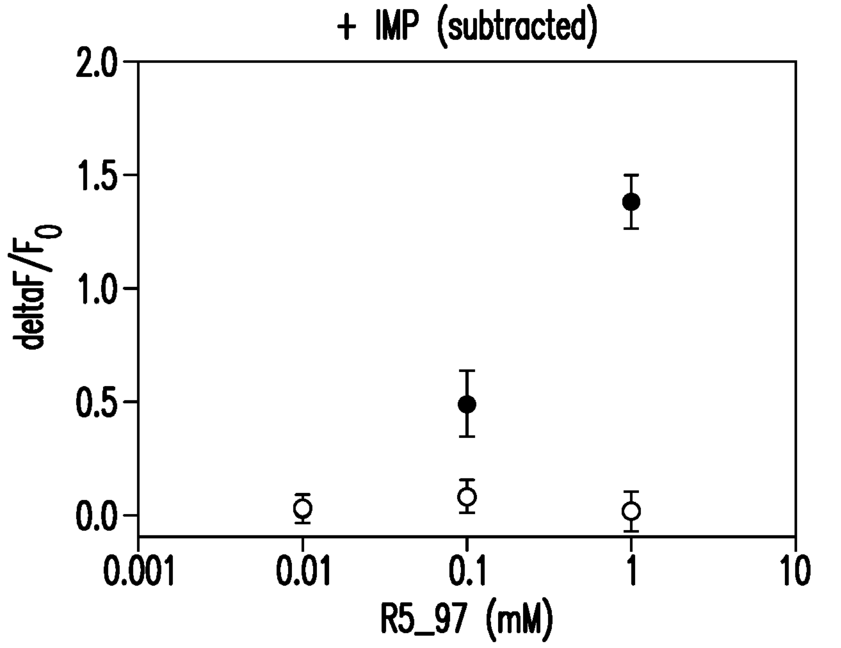
Figure 63B:
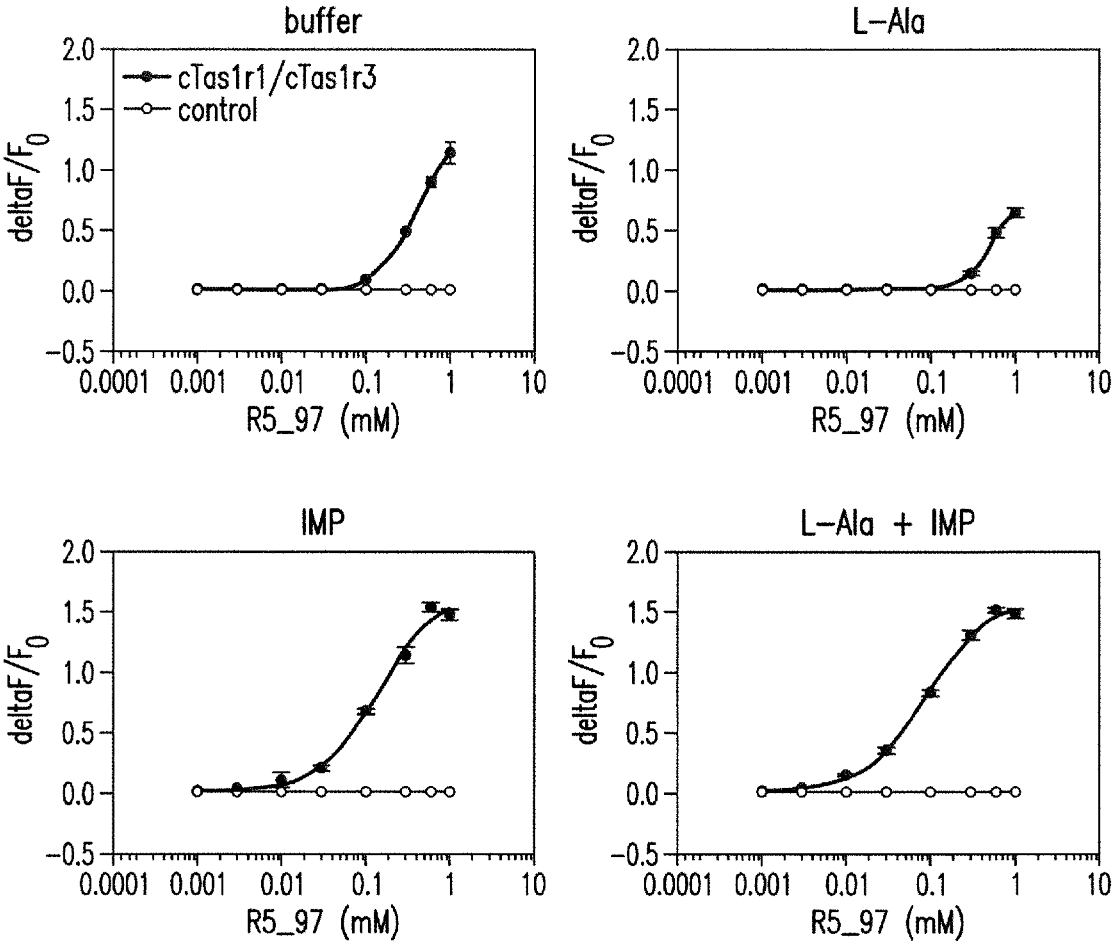
Figure 64A:
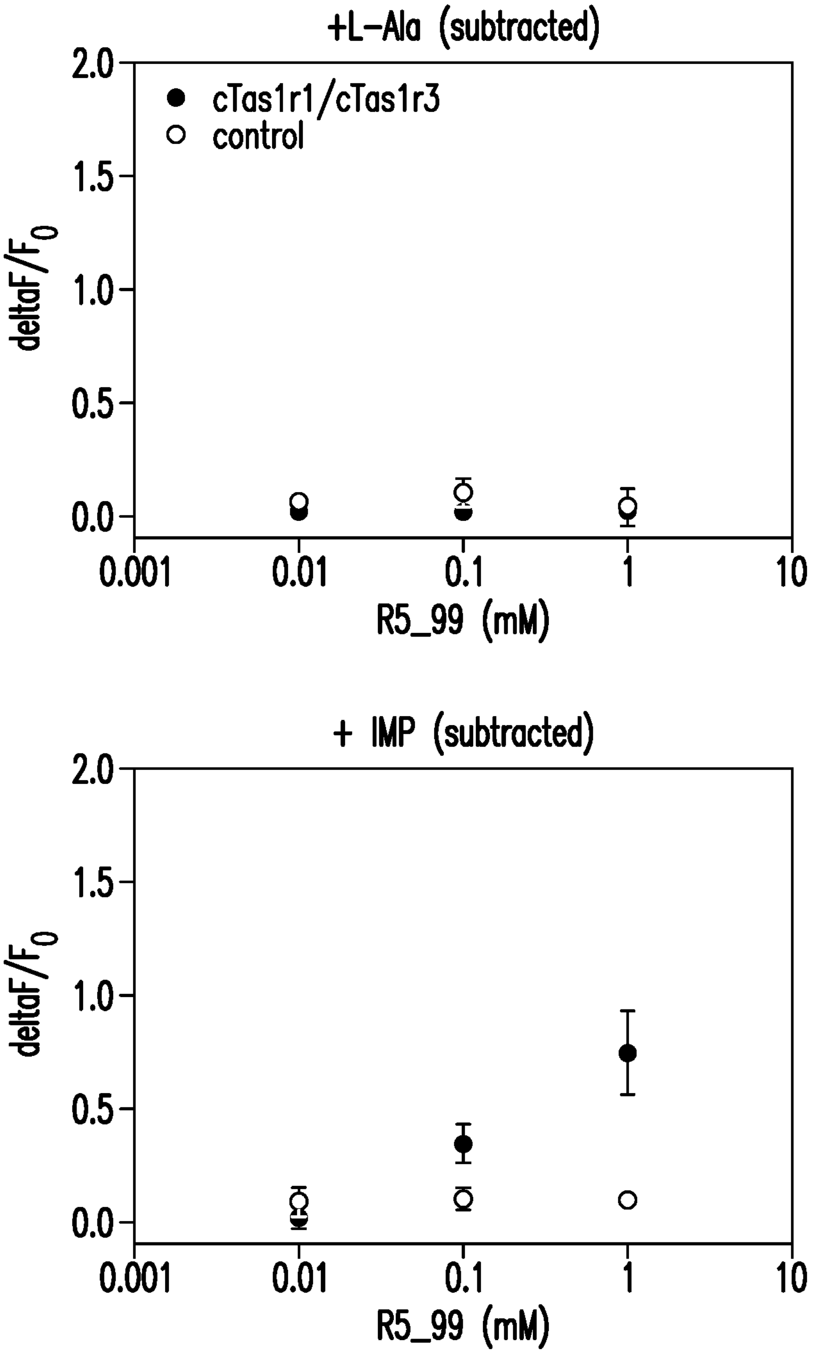
FIG. 64A-B shows (A) the activation of T1R1/T1R3 by N-phenethylbenzo[d][1,3]dioxole-5-carboxamide in the presence of 20 mM L-alanine or 0.2 mM IMP, and (B) dose response curves for activating T1R1/T1R3 by N-phenethylbenzo[d][1,3]dioxole-5-carboxamide alone in buffer, or in the presence of 20 mM L-alanine, 0.2 mM IMP, or both 20 mM L-alanine and 0.2 mM IMP.
Figure 64B:
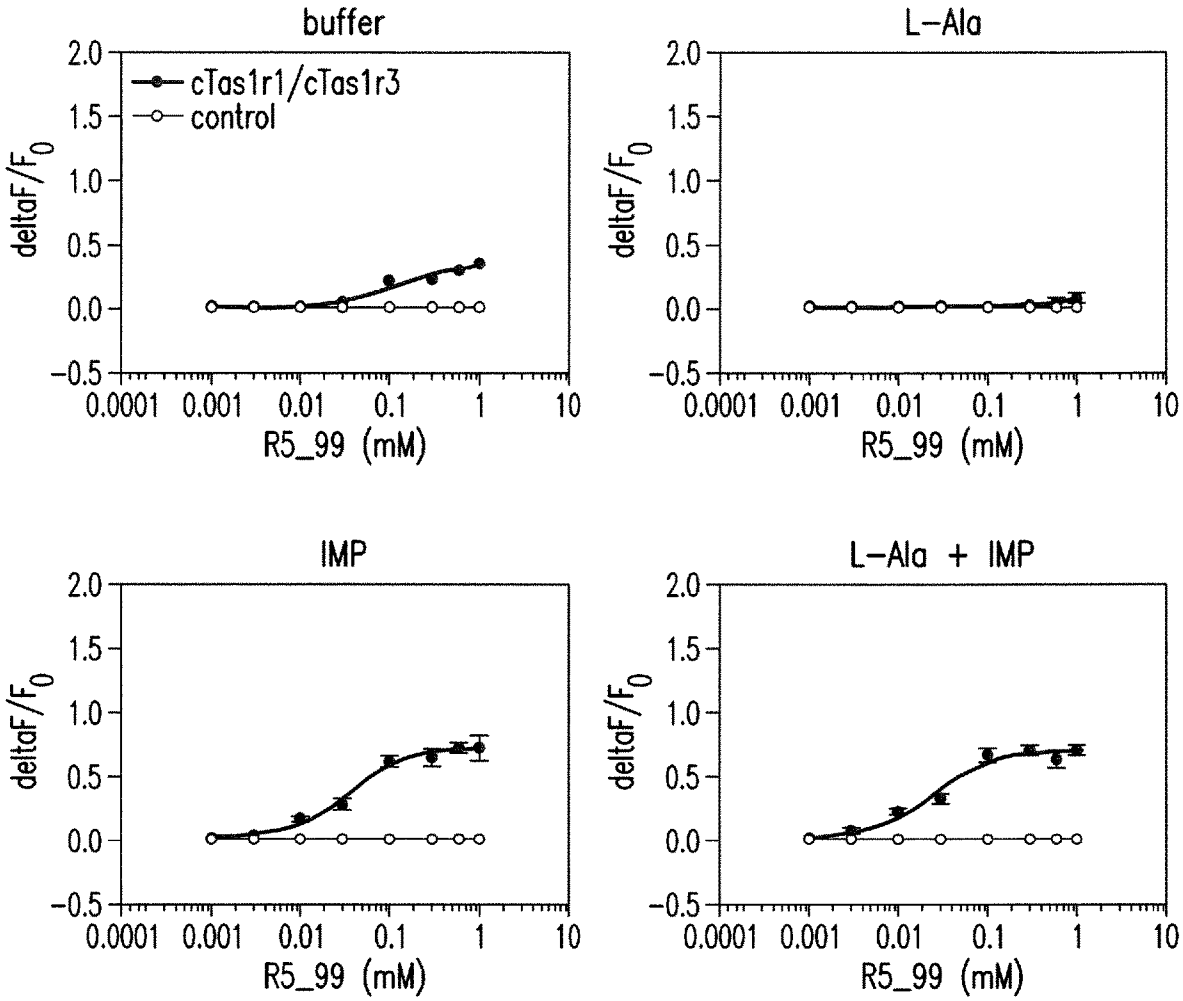
Figure 65A:
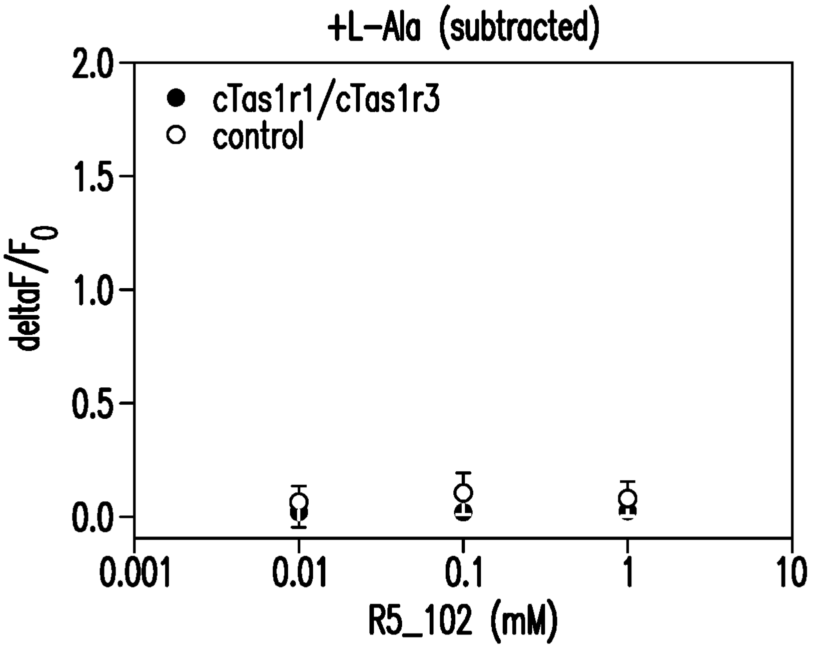
FIG. 65A-B shows (A) the activation of T1R1/T1R3 by N-phenethylbenzamide in the presence of 20 mM L-alanine or 0.2 mM IMP, and (B) dose response curves for activating T1R1/T1R3 by N-phenethylbenzamide alone in buffer, or in the presence of 20 mM L-alanine, 0.2 mM IMP, or both 20 mM L-alanine and 0.2 mM IMP.
Figure 65A:
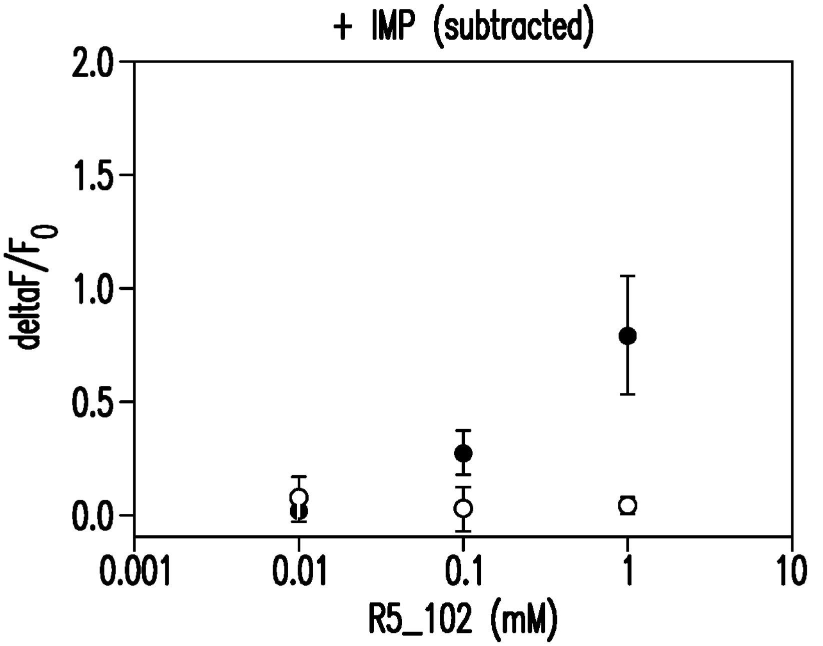
Figure 65B:
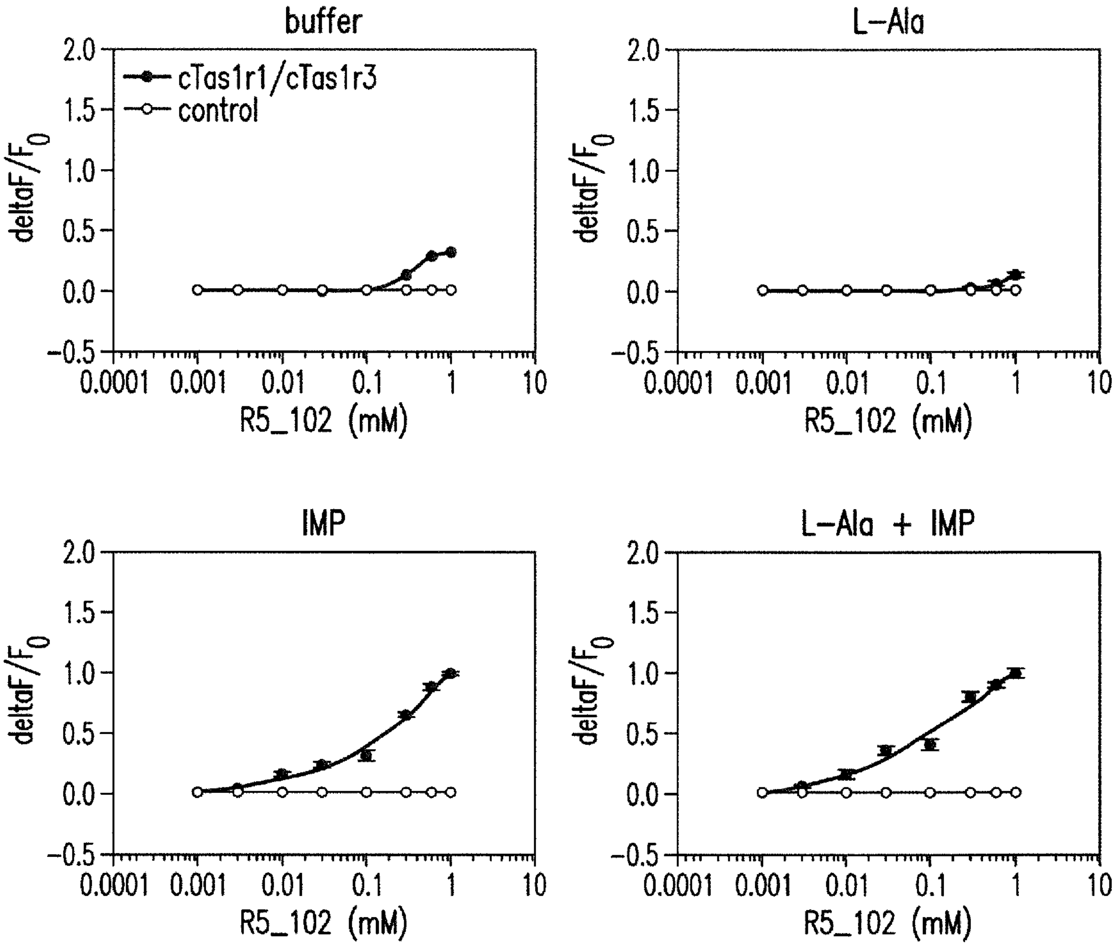
Figure 66A:
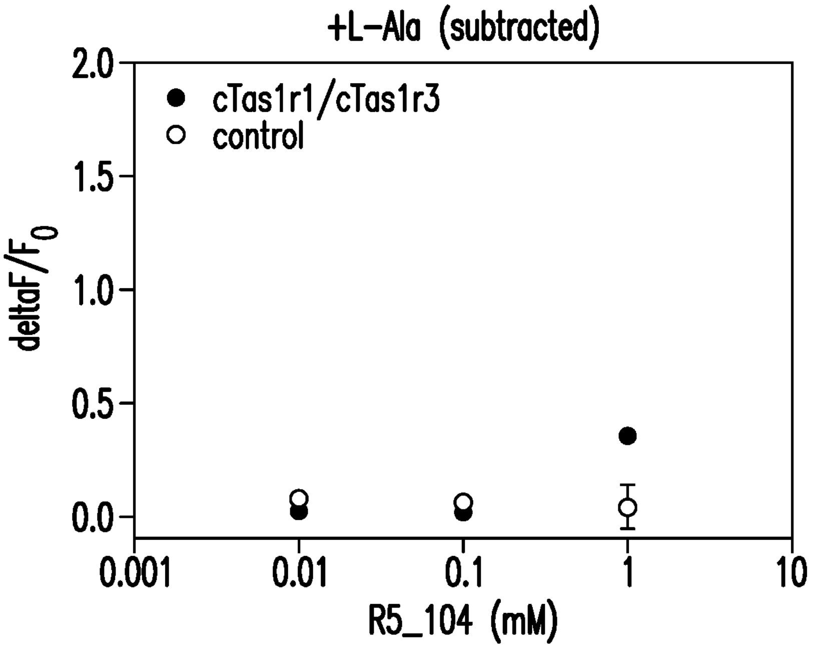
FIG. 66A-B shows (A) the activation of T1R1/T1R3 by N-Benzoyl-DL-Leucinamide in the presence of 20 mM L-alanine or 0.2 mM IMP, and (B) dose response curves for activating T1R1/T1R3 by N-Benzoyl-DL-Leucinamide alone in buffer, or in the presence of 20 mM L-alanine, 0.2 mM IMP, or both 20 mM L-alanine and 0.2 mM IMP.
Figure 66A:
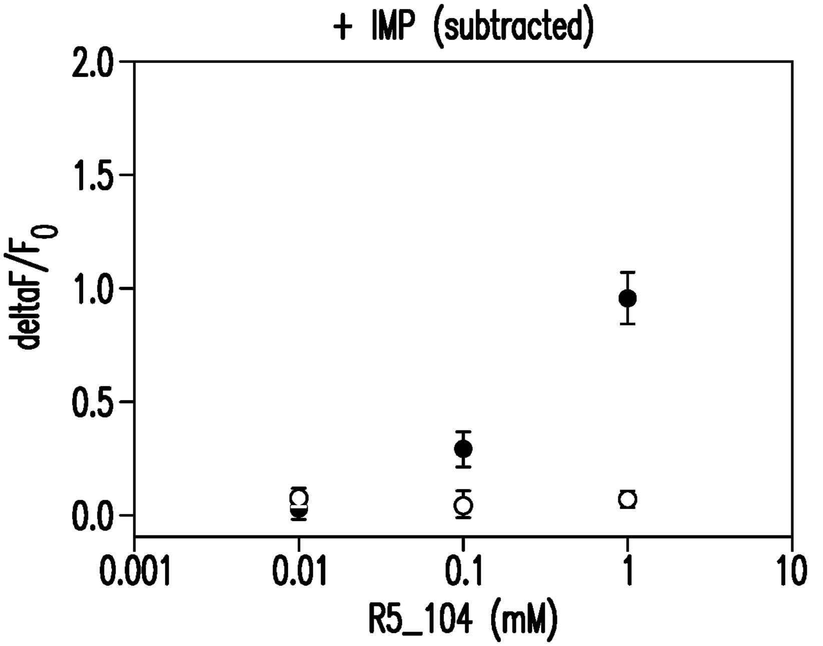
Figure 66B:
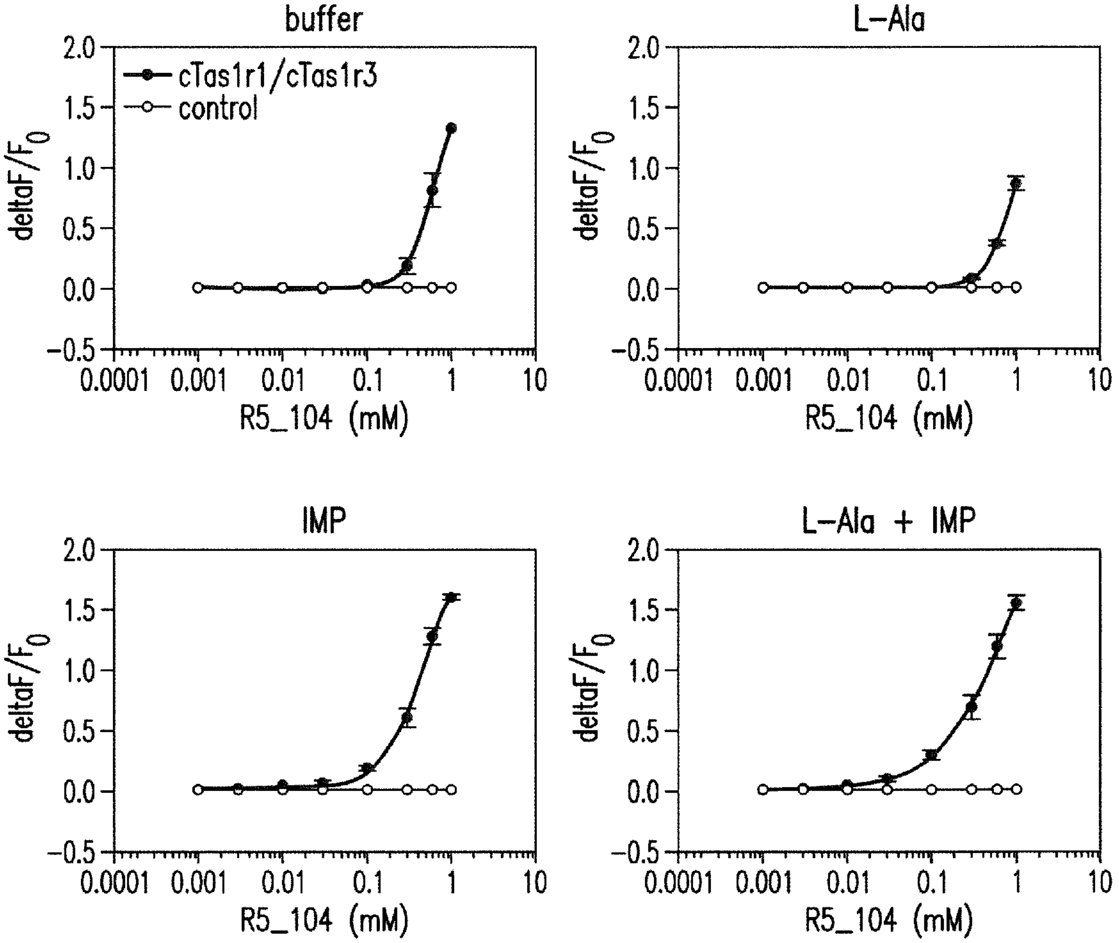
Figure 67A:
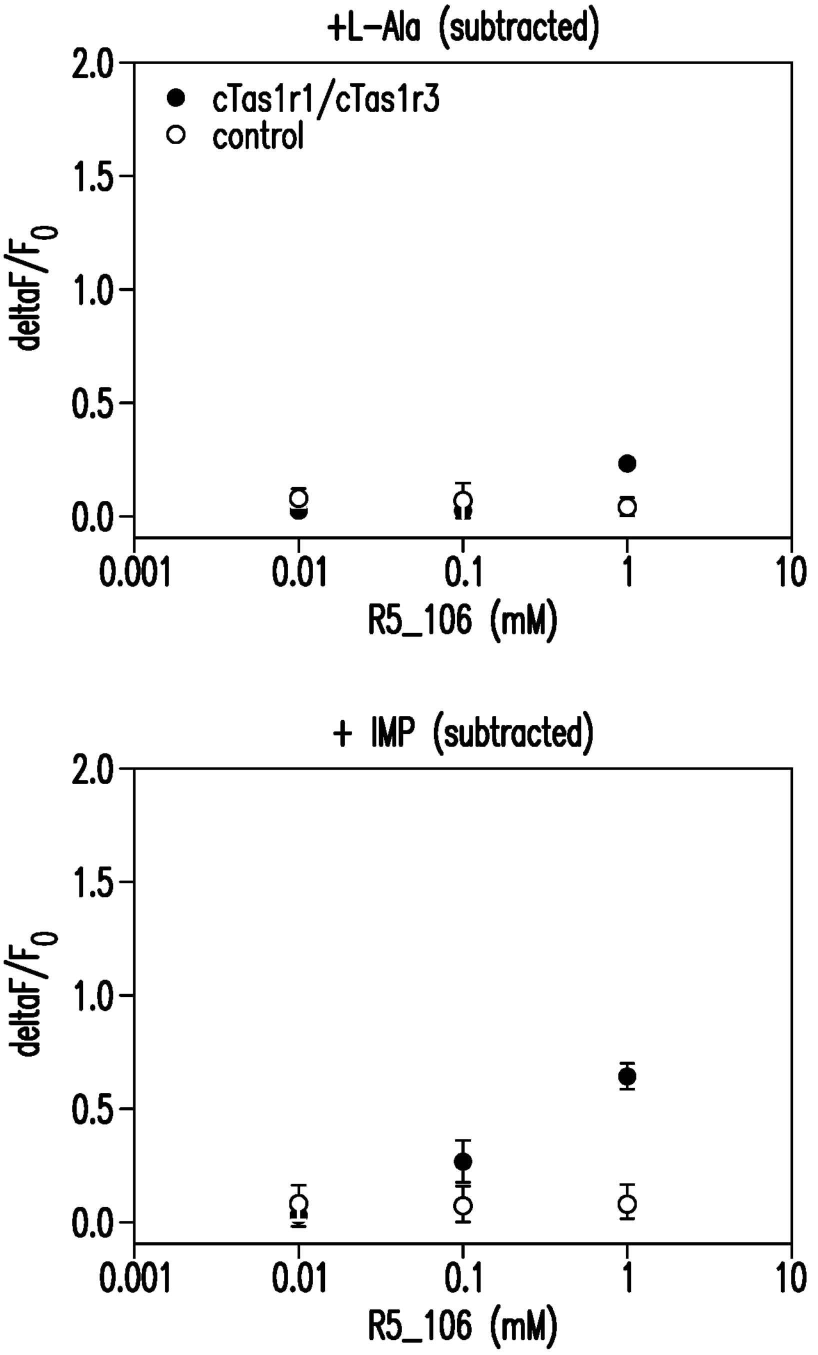
FIG. 67A-B shows (A) the activation of T1R1/T1R3 by N-(2-(1H-Indol-3-yl)ethyl)nicotinamide in the presence of 20 mM L-alanine or 0.2 mM IMP, and (B) dose response curves for activating T1R1/T1R3 by N-(2-(1H-Indol-3-yl)
Figure 67B:
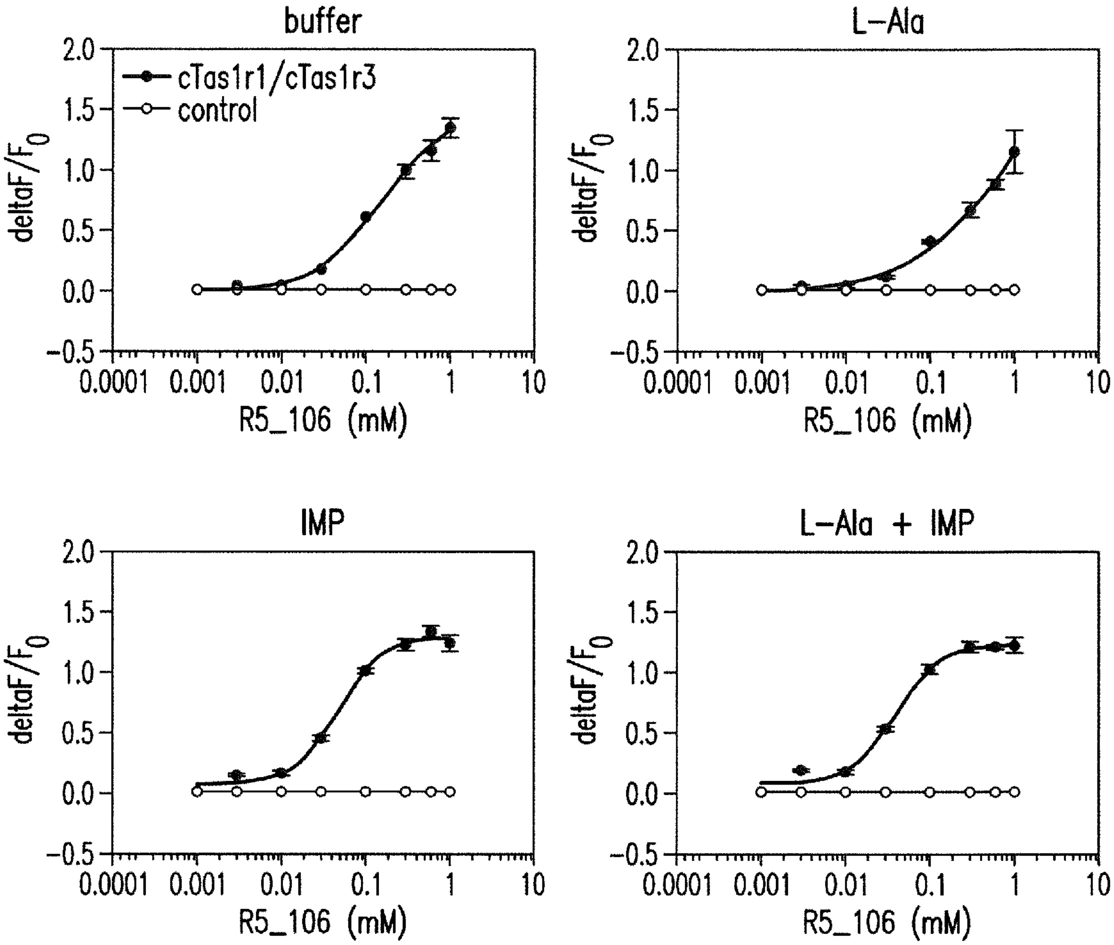

FIG. 46 shows the dose response curves for the positive and negative controls used, and the results for active compounds are summarized in Table 17. Table 18 shows the results for all compounds tested. For the positive and negative controls, dose response curves for amino acids were determined in the presence of 0.2 mM IMP. Dose response curves for nucleotides were determined in the presence of 20 mM alanine.

Without being bound to a particular theory, these results show that nucleotides alone, e.g., IMP, or combinations of nucleotides and amino acids, e.g., IMP and alanine, function as positive modulators of the disclosed transmembrane compounds, thereby resulting in the reduction in the amount of the agonist necessary to sufficiently activate the T1R1/T1R3 receptor.

TABLE 17

Transmembrane compounds that modulate T1R1/T1R3 activity

| | | +buffer | +Alanine (20 mM) | | | | +IMP (0.2 mM) | | | | +Alanine (20 mM) + IMP (0.2 mM) |
|---|---|---|---|---|---|---|---|---|---|---|---|
| Compound Name | Chemical Structure | (alone) $EC_{50}$ (mM) | $EC_{50}$ (mM) | Max resp ΔF/F | Max resp % of IMP | Thres (mM) | $EC_{50}$ (mM) | Max resp ΔF/F | Max resp % of Ala | Thres (mM) | $EC_{50}$ (mM) |
| 5-bromo-N-(pentan-3-yl)furan-2-carboxamide | 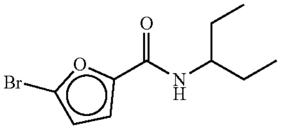 | >3 | >3 | 1.575 | 126.8 | 1 | >1 | 1.8425 | 149.6 | 0.3 | >1 |
| 3,4-dimethyl-N-(pentan-3-yl)benzamide; N-(1-ethylpropyl)-3,4-dimethyl-benzamide | 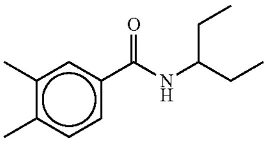 | >3 | >3 | 1.2150 | 97.8 | 3 | 2.1 | 1.5475 | 125.7 | 0.525 | 1.7 |
| 4-methoxy-3-methyl-N-(1-phenylethyl) benzamide | 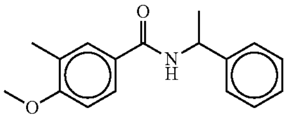 | >3 | >3 | 0.51 | 41.0 | 3 | 1.4 | 1.1775 | 95.6 | 0.35 | 1.2 |

TABLE 17-continued

Transmembrane compounds that modulate T1R1/T1R3 activity

| Compound Name | Chemical Structure | +buffer (alone) $EC_{50}$ (mM) | +Alanine (20 mM) $EC_{50}$ (mM) | +Alanine (20 mM) Max resp ΔF/F | +Alanine (20 mM) Max resp % of IMP | +Alanine (20 mM) Thres (mM) | +IMP (0.2 mM) $EC_{50}$ (mM) | +IMP (0.2 mM) Max resp ΔF/F | +IMP (0.2 mM) Max resp % of Ala | +IMP (0.2 mM) Thres (mM) | +Alanine (20 mM) + IMP (0.2 mM) $EC_{50}$ (mM) |
|---|---|---|---|---|---|---|---|---|---|---|---|
| N-(2,3-dimethyl-cyclohexyl) benzo[d][1,3] dioxole-5-carboxamide | 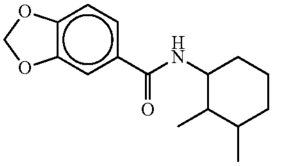 | 2 | >3 | 0.225 | 18.1 | 3 | 1.1 | 1.175 | 95.4 | 0.275 | 0.6 |
| ethyl 2-(benzo [d][1,3]dioxole-5-carboxamido)-3-methyl-butanoate; ethyl N-(1,3-benzo-dioxol-5-ylcarbonyl) valinate | 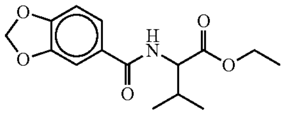 | >10 | >10 | 0.3175 | 25.6 | 10 | >3 | 0.65 | 52.8 | 1 | >3 |
| 4-methoxy-3-methyl-N-(pentan-2-yl) benzamide | 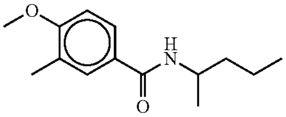 | 0.4 | 0.2 | 1.5650 | 126.0 | 0.050 | 0.1 | 1.5875 | 128.9 | 0.025 | 0.03 |
| N-(pentan-3-yl)-2,3-dihydrobenzo [b][1,4]dioxine-6-carboxamide | 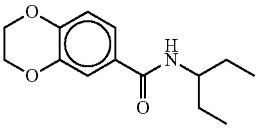 | >1 | >1 | 0.3125 | 25.2 | 0.3 | 0.3 | 0.8725 | 70.9 | 0.075 | 0.2 |
| 3,4-dimethoxy-N-(pentan-3-yl)benzamide | 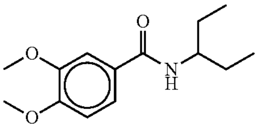 | >10 | >10 | 0.545 | 43.9 | 0.3 | 2 | 0.9975 | 81.0 | 0.5 | >3 |
| (E)-methyl 3-methyl-2-(3-(thiophen-2-yl) acrylamido) butanoate | 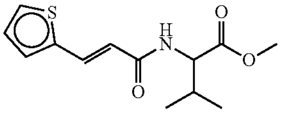 | CNBD | CNBD | 0.1175 | 9.5 | 10 | >10 | 0.7375 | 59.9 | 1 | >10 |
| (E)-3-(3,4-dimethoxy-phenyl)-N-(pentan-2-yl) acrylamide; (2E)-3-(3,4-dimethoxy-phenyl)-N-(pentan-2-yl) prop-2-enamide | 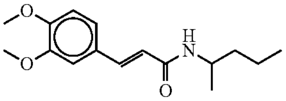 | >10 | >10 | 0.4375 | 35.2 | 1 | 2.2 | 1.07 | 86.9 | 0.55 | 1.9 |
| (E)-3-(4-methoxy-phenyl)-N-(2-methyl-cyclohexyl) acrylamide | 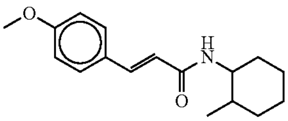 | >10 | >10 | 0.785 | 63.2 | 3 | >3 | 1.7725 | 144.0 | 0.3 | >3 |

TABLE 17-continued

Transmembrane compounds that modulate T1R1/T1R3 activity

| Compound Name | Chemical Structure | +buffer (alone) $EC_{50}$ (mM) | +Alanine (20 mM) $EC_{50}$ (mM) | +Alanine (20 mM) Max resp ΔF/F | +Alanine (20 mM) Max resp % of IMP | +Alanine (20 mM) Thres (mM) | +IMP (0.2 mM) $EC_{50}$ (mM) | +IMP (0.2 mM) Max resp ΔF/F | +IMP (0.2 mM) Max resp % of Ala | +IMP (0.2 mM) Thres (mM) | +Alanine (20 mM) + IMP (0.2 mM) $EC_{50}$ (mM) |
|---|---|---|---|---|---|---|---|---|---|---|---|
| N1-phenethyl-N2-(pyridin-3-ylmethyl) oxalamide; N-(2-phenylethyl)-N'-(pyridin-3-ylmethyl) ethanediamide | 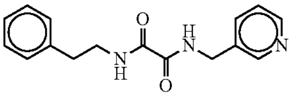 | >1 | >1 | 0.3750 | 30.2 | 1 | >0.3 | 0.7625 | 61.9 | 0.1 | 0.2 |
| N-(heptan-4-yl)benzo[d][1,3]dioxole-5-carboxamide | 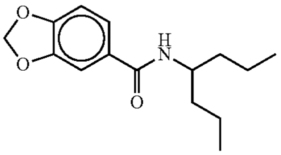 | 0.7 | 1.1 | 1.7725 | 142.7 | 0.275 | 0.09 | 1.4725 | 119.6 | 0.225 | 0.1 |
| 1-(2-bromo-phenyl)-3-((1R,2S)-2-hydroxy-2,3-dihydro-1H-inden-1-yl)urea | 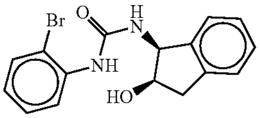 | >3 | >3 | 0.3 | 33.0 | 3 | >3 | 0.378 | 44.9 | 3 | >3 |
| N-(benzo[d][1,3]dioxol-5-yl)-2-propyl-pentanamide | 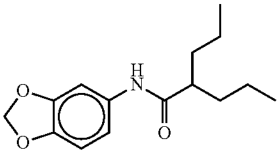 | 0.35 | CNBD | CNBD | CNBD | CNBD | 0.27 | 0.908 | 108.0 | 0.0675 | 0.09 |
| 1-benzyl-3-(2-oxo-2-phenylethyl) imidazolidine-2,4,5-trione | 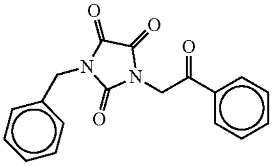 | >1 | >1 | 1.3 | 127.6 | 1 | 0.32 | 1.140 | 135.7 | 0.08 | 0.33 |
| N-(2-amino-2-oxo-1-phenylethyl)-3-chloro-4,5-dimethoxy-benzamide | 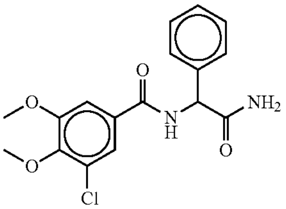 | CNBD | CNBD | CNBD | CNBD | CNBD | 0.68 | 0.415 | 49.4 | 0.17 | 0.75 |
| (E)-3-(4-methoxy-phenyl)-N-(pentan-3-yl) acrylamide | 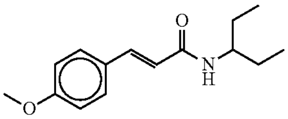 | 0.45 | 0.59 | 0.7 | 64.1 | 0.148 | 0.15 | 1.443 | 171.7 | 0.0375 | 0.08 |
| 2-((5-(4-(methylthio) phenyl)-2H-tetrazol-2-yl) methyl) pyridine | 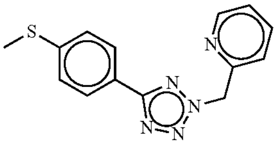 | CNBD | CNBD | CNBD | CNBD | CNBD | 0.63 | 0.678 | 80.7 | 0.1575 | 0.27 |

TABLE 17-continued

Transmembrane compounds that modulate T1R1/T1R3 activity

| Compound Name | Chemical Structure | +buffer (alone) $EC_{50}$ (mM) | +Alanine (20 mM) $EC_{50}$ (mM) | Max resp ΔF/F | Max resp % of IMP | Thres (mM) | +IMP (0.2 mM) $EC_{50}$ (mM) | Max resp ΔF/F | Max resp % of Ala | Thres (mM) | +Alanine (20 mM) + IMP (0.2 mM) $EC_{50}$ (mM) |
|---|---|---|---|---|---|---|---|---|---|---|---|
| N-(heptan-4-yl)benzo[d][1,3]dioxole-5-carboxamide | 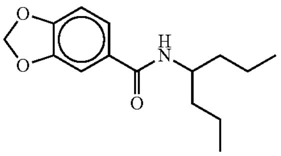 | 0.26 | 0.42 | 1.2 | 118.2 | 0.105 | 0.1 | 1.393 | 165.8 | 0.025 | 0.03 |

CNBD: Could not be determined

TABLE 18

Activation of T1R1/T1R3 by transmembrane compounds

| Compound Name | Activity | +buffer (alone) $EC_{50}$ (mM) | +Alanine (20 mM) $EC_{50}$ (mM) | Max resp ΔF/F | Max resp % of IMP | Thres (mM) | +IMP (0.2 mM) $EC_{50}$ (mM) | Max resp ΔF/F | Max resp % of Ala | Thres (mM) | +Alanine (20 mM) + IMP (0.2 mM) $EC_{50}$ (mM) |
|---|---|---|---|---|---|---|---|---|---|---|---|
| 5-bromo-N-(pentan-3-yl)furan-2-carboxamide | active | >3 | >3 | 1.575 | 126.8 | 1 | >1 | 1.8425 | 149.6 | 0.3 | >1 |
| 3,4-dimethyl-N-(pentan-3-yl)benzamide; N-(1-ethylpropyl)-3,4-dimethylbenzamide | active | >3 | >3 | 1.2150 | 97.8 | 3 | 2.1 | 1.5475 | 125.7 | 0.525 | 1.7 |
| N-(2,4-dimethylpentan-3-yl)-4-methoxybenzamide | N/A | N/D | N/D | N/D | N/D | N/D | N/D | N/D | N/D | N/D | N/D |
| 4-ethoxy-N-(pentan-3-yl)benzamide | N/A | N/D | N/D | N/D | N/D | N/D | N/D | N/D | N/D | N/D | N/D |
| 4-methoxy-3-methyl-N-(1-phenylethyl)benzamide | active | >3 | >3 | 0.51 | 41.0 | 3 | 1.4 | 1.1775 | 95.6 | 0.35 | 1.2 |
| N-(2,3-dimethylcyclo-hexyl)benzo[d][1,3]dioxole-5-carboxamide | active | 2 | >3 | 0.225 | 18.1 | 3 | 1.1 | 1.175 | 95.4 | 0.275 | 0.6 |
| methyl 2-(benzo[d][1,3]dioxole-5-carboxamido)-4-methylpentanoate; methyl N-(1,3-benzodioxo1-5-ylcarbonyl)leucinate | N/A | N/D | N/D | N/D | N/D | N/D | N/D | N/D | N/D | N/D | N/D |
| ethyl 2-(benzo[d][1,3]dioxole-5-carboxamido)-3-methylbutanoate; ethyl N-(1,3-benzodioxol-5-ylcarbonyl)valinate | active | >10 | >10 | 0.3175 | 25.6 | 10 | >3 | 0.65 | 52.8 | 1 | >3 |
| 4-methoxy-3-methyl-N-(pentan-2-yl)benzamide | active | 0.4 | 0.2 | 1.5650 | 126.0 | 0.050 | 0.1 | 1.5875 | 128.9 | 0.025 | 0.03 |
| N-(pentan-3-yl)-2,3-dihydro-benzo[b][1,4]dioxine-6-carboxamide | active | >1 | >1 | 0.3125 | 25.2 | 0.3 | 0.3 | 0.8725 | 70.9 | 0.075 | 0.2 |
| 3,4-dimethoxy-N-(pentan-3-yl)benzamide | active | >10 | >10 | 0.545 | 43.9 | 0.3 | 2 | 0.9975 | 81.0 | 0.5 | >3 |
| (E)-methyl 3-methyl-2-(3-(thiophen-2-yl)acrylamido)butanoate | active | CNBD | CNBD | 0.1175 | 9.5 | 10 | >10 | 0.7375 | 59.9 | 1 | >10 |
| (E)-3-(3,4-dimethoxyphenyl)-N-(pentan-2-yl)acrylamide; (2E)-3-(3,4-dimethoxyphenyl)-N-(pentan-2-yl)prop-2-enamide | active | >10 | >10 | 0.4375 | 35.2 | 1 | 2.2 | 1.07 | 86.9 | 0.55 | 1.9 |
| (E)-3-(4-methoxyphenyl)-N-(2-methylcyclohexypacrylamide | active | >10 | >10 | 0.785 | 63.2 | 3 | >3 | 1.7725 | 144.0 | 0.3 | >3 |

TABLE 18-continued

Activation of T1R1/T1R3 by transmembrane compounds

| Compound Name | Activity | +buffer (alone) $EC_{50}$ (mM) | +Alanine (20 mM) $EC_{50}$ (mM) | +Alanine (20 mM) Max resp ΔF/F | +Alanine (20 mM) Max resp % of IMP | +Alanine (20 mM) Thres (mM) | +IMP (0.2 mM) $EC_{50}$ (mM) | +IMP (0.2 mM) Max resp ΔF/F | +IMP (0.2 mM) Max resp % of Ala | +IMP (0.2 mM) Thres (mM) | +Alanine (20 mM) + IMP (0.2 mM) $EC_{50}$ (mM) |
|---|---|---|---|---|---|---|---|---|---|---|---|
| N-(2,3-dihydro-1H-inden-1-yl)benzo[d][1,3]dioxole-5-carboxamide | N/A | N/D | N/D | N/D | N/D | N/D | N/D | N/D | N/D | N/D | N/D |
| N1-phenethyl-N2-(pyridin-3-ylmethyl)oxalamide; N-(2-phenylethyl)-N'-(pyridin-3-ylmethyl)ethanediamide | active | >1 | >1 | 0.3750 | 30.2 | 1 | >0.3 | 0.7625 | 61.9 | 0.1 | 0.2 |
| N-benzyl-N'-(2-phenylethyl)ethanediamide | N/A | N/D | N/D | N/D | N/D | N/D | N/D | N/D | N/D | N/D | N/D |
| 1-(4-chlorophenyl)-3-[1-(4-methylphenyl)propyl]urea; 1-(4-chlorophenyl)-3-(1-(p-tolyl)propyl)urea | N/A | N/D | N/D | N/D | N/D | N/D | N/D | N/D | N/D | N/D | N/D |
| 1-(2-chlorophenyl)-3-cyclohexylurea | N/A | N/D | N/D | N/D | N/D | N/D | N/D | N/D | N/D | N/D | N/D |
| (E)-N-(2,4-dimethylpentan-3-yl)-3-(4-fluorophenypacrylamide | N/A | N/D | N/D | N/D | N/D | N/D | N/D | N/D | N/D | N/D | N/D |
| 5-bromo-N-cycloheptyl-2-furamide; 5-bromo-N-cycloheptylfuran-2-carboxamide | N/A | N/D | N/D | N/D | N/D | N/D | N/D | N/D | N/D | N/D | N/D |
| N-cyclohexyl-1,3-benzodioxole-5-carboxamide | N/A | N/D | N/D | N/D | N/D | N/D | N/D | N/D | N/D | N/D | N/D |
| N-(2-(dimethyl-amino)ethyl)benzo[d][1,3]di-oxole-5-carboxamide | unknown | N/D | N/D | N/D | N/D | N/D | N/D | N/D | N/D | N/D | N/D |
| N-(2-(methylamino)-2-oxoethyl)benzo[d][1,3]dioxole-5-carboxamide | N/A | N/D | N/D | N/D | N/D | N/D | N/D | N/D | N/D | N/D | N/D |
| N-(heptan-4-yl)benzo[d][1,3]dioxole-5-carboxamide | active | 0.7 | 1.1 | 1.7725 | 142.7 | 0.275 | 0.09 | 1.473 | 119.6 | 0.225 | 0.1 |
| 1-(2-bromophenyl)-3-((1R,2S)-2-hydroxy-2,3-dihydro-1H-inden-1-yl)urea | active | >3 | >3 | 0.3 | 33.0 | 3 | >3 | 0.378 | 44.9 | 3 | >3 |
| 3-(7-bromo-2,3-dihydrobenzo[b][1,4]dioxin-6-yl)-1-(1-(4-chlorophenyl)ethyl)-1-methylurea | N/A | N/D | N/D | N/D | N/D | N/D | N/D | N/D | N/D | N/D | N/D |
| 1-(2,4-dichlorophenyl)-3-(4-methoxybenzyl)urea | N/A | N/D | N/D | N/D | N/D | N/D | N/D | N/D | N/D | N/D | N/D |
| (E)-N-cyclohexyl-3-(4-propoxyphenyl)acrylamide | N/A | N/D | N/D | N/D | N/D | N/D | N/D | N/D | N/D | N/D | N/D |
| (E)-N-cyclohexyl-3-(pyridin-4-yl)acrylamide | N/A | N/D | N/D | N/D | N/D | N/D | N/D | N/D | N/D | N/D | N/D |
| N-(benzo[d][1,3]dioxol-5-yl)-2-propylpentanamide | active | 0.35 | CNBD | CNBD | CNBD | CNBD | 0.27 | 0.908 | 108.0 | 0.0675 | 0.09 |
| N1-(4-methoxybenzyl)-N2-phenethyloxalamide | unknown | N/D | N/D | N/D | N/D | N/D | N/D | N/D | N/D | N/D | N/D |
| 1-benzyl-3-(2-oxo-2-phenylethyl)imidazolidine-2,4,5-trione | active | >1 | >1 | 1.3 | 127.6 | 1 | 0.32 | 1.140 | 135.7 | 0.08 | 0.33 |
| N1-(3,4-dimethoxyphenethyl)-N2-(pyridin-3-ylmethyl) oxalamide | N/A | N/D | N/D | N/D | N/D | N/D | N/D | N/D | N/D | N/D | N/D |
| N-(2-amino-2-oxo-l-phenylethyl)-3-chloro-4,5-dimethoxybenzamide | active | CNBD | CNBD | CNBD | CNBD | CNBD | 0.68 | 0.415 | 49.4 | 0.17 | 0.75 |
| (E)-3-(4-methoxyphenyl)-N-(pentan-3-yl)acrylamide | active | 0.45 | 0.59 | 0.7 | 64.1 | 0.148 | 0.15 | 1.443 | 171.7 | 0.0375 | 0.08 |
| (E)-3-(3-chloro-4,5-dimethoxy-phenyl)-N-cyclohexylacrylamide | N/A | | | | | | | | | | |
| 1-(4-chlorobenzyl)-4-phen-ethylpyrazine-2,3(1H,4H)-dione | N/A | N/D | N/D | N/D | N/D | N/D | N/D | N/D | N/D | N/D | N/D |
| 1-((3-methoxybenzyl)thio)-4-phenylphthalazine | N/A | N/D | N/D | N/D | N/D | N/D | N/D | N/D | N/D | N/D | N/D |
| 3-(benzo[d][1,3]dioxol-5-yl)-6-((4-bromobenzyl)thio)pyridazine | N/A | N/D | N/D | N/D | N/D | N/D | N/D | N/D | N/D | N/D | N/D |

TABLE 18-continued

Activation of T1R1/T1R3 by transmembrane compounds

| Compound Name | Activity | +buffer (alone) $EC_{50}$ (mM) | +Alanine (20 mM) $EC_{50}$ (mM) | Max resp ΔF/F | Max resp % of IMP | Thres (mM) | +IMP (0.2 mM) $EC_{50}$ (mM) | Max resp ΔF/F | Max resp % of Ala | Thres (mM) | +Alanine (20 mM) + IMP (0.2 mM) $EC_{50}$ (mM) |
|---|---|---|---|---|---|---|---|---|---|---|---|
| 5-(3,5-dichlorophenyl)-N-((3-methylpyridin-2-yl)methyl)-1,3,4-thiadiazol-2-amine | unknown | N/D | N/D | N/D | N/D | N/D | N/D | N/D | N/D | N/D | N/D |
| 2-((5-(4-(methylthio)phenyl)-2H-tetrazol-2-yl)methyl)pyridine | active | CNBD | CNBD | CNBD | CNBD | CNBD | 0.63 | 0.678 | 80.7 | 0.1575 | 0.27 |
| 5-((2-chlorobenzyl)thio)-3-(4-methoxyphenyl)-1H-1,2,4-triazole | N/A | N/D | N/D | N/D | N/D | N/D | N/D | N/D | N/D | N/D | N/D |
| 2-(((5-(p-tolyl)-4H-1,2,4-triazol-3-yl)thio)methyl)pyridine | N/A | N/D | N/D | N/D | N/D | N/D | N/D | N/D | N/D | N/D | N/D |
| N-(heptan-4-yl)benzo[d][1,3]dioxole-5-carboxamide | active | 0.26 | 0.42 | 1.2 | 118.2 | 0.105 | 0.1 | 1.393 | 165.8 | 0.025 | 0.03 |

N/D = Not determined
N/T = Not tested
N/A = Not active
CNBD = Could not be determined

TABLE 19

Activation of T1R1/T1R3 by combinations of nucleotides, amino acids and transmembrane compounds

| Compound Name | $EC_{50}$-alone (mM) | $EC_{50}$-with Ala (20 mM) | $EC_{50}$-with IMP (0.2 mM) | $EC_{50}$-with Ala (20 mM) and IMP (0.2 mM) |
|---|---|---|---|---|
| GMP | 0.04 ± 0.01 | 0.05 ± 0.02 | — | — |
| Phenylalanine | — | — | 3.4 ± 0.7 | — |
| N-(heptan-4-yl)benzo[d][1,3]dioxole-5-carboxamide | 0.26 ± 0.09 | 0.42 ± 0.06 | 0.09 ± 0.04 | 0.03 ± 0.03 |
| GMP + Phenylalanine (1:30) | 0.26 ± 0.04 mM | 0.29 ± 0.08 | 0.23 ± 0.04 | — |
| GMP + Phenylalanine (1:3) | >0.3 | 0.11 ± 0.02 | — | — |
| GMP + Phenylalanine (1:0.3) | 0.05 ± 0.01 | 0.09 ± 0.01 | — | — |
| GMP + Phenylalanine + N-(heptan-4-yl) benzo[d][1,3]dioxole-5-carboxamide (1:30:10) | 0.011 ± 0.001 | 0.008 ± 0.001 | 0.006 ± 0.0004 | 0.005 ± 0.001 |

TABLE 20

Positive and negative controls measured with 0.2 mM IMP.

| Type of control | Compound Name | $EC_{50}$ (effect with 0.2 mM IMP) |
|---|---|---|
| Positive | L-Alanine | 13.6 ± 4.3 mM |
| | L-Serine | 31.5 ± 2.3 mM |
| | L-Cysteine | 39.5 ± 1.9 mM |
| | L-Phenylalanine | 1.9 ± 0.1 mM |
| | L-Tryptophan | 0.9 ± 0.1 mM |
| | L-Histidine | 10.2 ± 1.7 mM |
| | L-Methionine | 25.5 ± 3.7 mM |
| | L-Tyrosine | 10.3 ± 0.9 mM |
| | IMP | 0.08 ± 0.002 mM |
| | GMP | 0.05 ± 0.004 mM |
| Negative | L-Proline | — |
| | MSG | — |
| | Quinine HCL | — |
| | D-Glucose | — |

Example 6—Activation of T1R1/T1R3 Receptor by Transmembrane Compounds

The present example describes the activation of the T1R1/T1R3 receptor by transmembrane compounds in vitro.

Based on the in silico modeling described in Example 4, putative T1R1/T1R3 transmembrane compounds were identified and selected for further testing in vitro. In vitro functional characterization of the selected compounds was used to evaluate the effectiveness of the putative transmembrane compounds in activating the T1R1/T1R3 receptor alone or in combination with one or more nucleotides and/or one or more amino acids.

Methods:

In vitro functional characterization of the selected compounds was conducted as described by Example 5.

Results:

As shown in Table 21, treatment of HEK293 cells expressing T1R1/T1R3 receptors with N-benzyl-L-phenylalanine methyl ester HCl alone (e.g., in buffer) resulted in the activation of the T1R1/T1R3 receptor with an $EC_{50}$ of 0.03-0.002 mM. Combining the compound with 20 mM L-alanine increased the $EC_{50}$ to 0.05-0.001 mM. Combining the compound with 0.2 mM IMP lowered the $EC_{50}$ to 0.02-0.001 mM, and combining the compound with 20 mM L-alanine and 0.2 mM IMP lowered the $EC_{50}$ to 0.02-0.021 Mm.

TABLE 21

$EC_{50}$ of N-benzyl-L-phenylalanine methyl ester HCl in activating T1R1/T1R3.

N-benzyl-L-phenylalanine methyl ester HCl

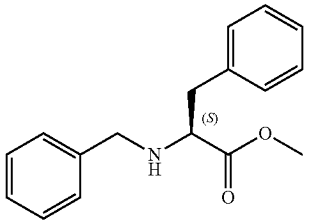

| | T1R1/T1R3 $EC_{50}$ |
|---|---|
| alone in buffer | 0.03 ± 0.002 mM |
| +20 mM L-alanine | 0.05 ± 0.001 mM |
| +0.2 mM IMP | 0.02 ± 0.001 mM |
| +20 mM L-alanine + 0.2 mM IMP | 0.02 ± 0.002 mM |

As shown in Table 22, treatment of HEK293 cells expressing T1R1/T1R3 receptors with N-(2-(1H-indol-3-yl) ethyl)nicotinamide alone (e.g., in buffer) resulted in the activation of the T1R1/T1R3 receptor with an $EC_{50}$ of 0.15-0.03 mM. Combining the compound with 20 mM L-alanine increased the $EC_{50}$ to greater than 0.1 mM. Combining the compound with 0.2 mM IMP lowered the $EC_{50}$ to 0.05-0.01 mM, and combining the compound with 20 mM L-alanine and 0.2 mM IMP lowered the $EC_{50}$ to 0.04-0.01 mM.

TABLE 22

$EC_{50}$ of N-(2-(1H-indol-3-yl)ethyl)nicotinamide in activating T1R1/T1R3.

N-(2-(1H-indol-3-yl)ethyl)nicotinamide

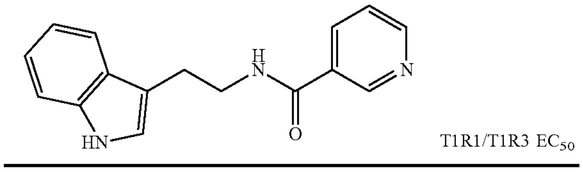

| | T1R1/T1R3 $EC_{50}$ |
|---|---|
| alone in buffer | 0.15 ± 0.03 mM |
| +20 mM L-alanine | >0.1 mM |
| +0.2 mM IMP | 0.05 ± 0.01 mM |
| +20 mM L-alanine + 0.2 mM IMP | 0.04 ± 0.01 mM |

As shown in Table 23, treatment of HEK293 cells expressing T1R1/T1R3 receptors with 2-amino-N-phenethylbenzamide alone (e.g., in buffer) resulted in the activation of the T1R1/T1R3 receptor with an $EC_{50}$ of 0.42-0.01 mM. Combining the compound with 20 mM L-alanine increased the $EC_{50}$ to 0.48-0.01 mM. Combining the compound with 0.2 mM IMP lowered the $EC_{50}$ to 0.14-0.03 mM, and combining the compound with 20 mM L-alanine and 0.2 mM IMP lowered the $EC_{50}$ to 0.09-0.01 mM.

TABLE 23

$EC_{50}$ of 2-amino-N-phenethylbenzamide in activating T1R1/T1R3.

2-amino-N-phenethylbenzamide

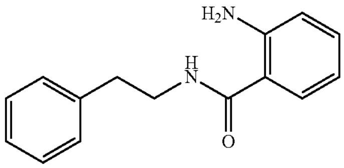 [SMILES: Nc1ccccc1C(=O)NCCc1ccccc1]

| | T1R1/T1R3 $EC_{50}$ |
|---|---|
| alone in buffer | 0.42 ± 0.01 mM |
| +20 mM L-alanine | 0.48 ± 0.01 mM |
| +0.2 mM IMP | 0.14 ± 0.03 mM |
| +20 mM L-alanine + 0.2 mM IMP | 0.09 ± 0.01 mM |

Without being bound to a particular theory, these results show that nucleotides alone, e.g., IMP, or combinations of nucleotides and amino acids, e.g., IMP and alanine, function as positive modulators of the disclosed transmembrane compounds, thereby resulting in the reduction in the amount of the agonist necessary to sufficiently activate the T1R1/T1R3 receptor.

Example 7—Activation of T1R1/T1R3 Receptor by Transmembrane Compounds and Nucleotide Derivatives The present example describes the activation of the T1R1/T1R3 receptor by transmembrane compounds and nucleotide derivatives in vitro.

Based on the in silico modeling described in Example 4, putative T1R1/T1R3 transmembrane compounds were identified and selected for further testing in vitro. In vitro functional characterization of the selected compounds was used to evaluate the effectiveness of the putative transmembrane compounds in activating the T1R1/T1R3 receptor alone or in combination with one or more nucleotides and/or one or more amino acids. Select nucleotide derivatives were also tested alone or in combination with one or more nucleotides and/or one or more amino acids.

Methods:

In vitro functional characterization of the selected compounds was conducted as described by Examples 1, 2 and 5.

Results:

The effect of all transmembrane compounds and nucleotide derivatives tested in activating T1R1/T1R3 is shown in table 26. Treatment of HEK293 cells expressing T1R1/T1R3 receptors with several of the transmembrane compounds alone in buffer resulted in activation of T1R1/T1R3 as indicated by the change in intracellular calcium levels ($\Delta F/F_0$), as shown in Table 24A-O. When these compounds were combined with 0.2 mM IMP, or a mixture of 0.2 mM IMP and 20 mM alanine, the transmembrane compounds were more effective in activating T1R1/T1R3, as evidenced by a decrease in the EC50 concentration of the transmembrane compounds (Table 24A-O and FIGS. 58-75). Table 24A-O show the EC50 for each of the active transmembrane compound alone (in buffer) and in the presence of L-alanine, IMP, and L-alanine+IMP. Table 25 and FIG. 71 show the EC50 and dose response curves for the control compounds (20 mM of an amino acid in the presence of 0.2 mM IMP). Without being bound to a particular theory, these results show that nucleotides alone, e.g., IMP, or combinations of nucleotides and amino acids, e.g., IMP and alanine, function as positive modulators of the disclosed transmembrane compounds, thereby resulting in the reduction in the amount of the transmembrane compound necessary to sufficiently activate the T1R1/T1R3 receptor.

Tables 24A-O. $EC_{50}$ of transmembrane compounds in activating T1R1/T1R3.

TABLE 24A

| 1,3-dibenzylpyrimidine-2,4,6(1H,3H,5H)-trione | T1R1/T1R3 $EC_{50}$ |
|---|---|
| alone in buffer | 0.26 ± 0.01 mM |
| +20 mM L-alanine | 0.31 ± 0.05 mM |
| +0.2 mM IMP | 0.52 ± 0.19 mM |
| +20 mM L-alanine +0.2 mM IMP | >0.3 mM |

TABLE 24B

| 4-benzy1-3-buty1-1-(2-oxo-2-(pyrrolidin-1-yl) ethyl)-1H-1,2,4-triazol-5(4H)-one | T1R1/T1R3 $EC_{50}$ |
|---|---|
| alone in buffer | >0.6 mM |
| +20 mM L-alanine | >0.6 mM |
| +0.2 mMIMP | >0.3 mM |
| +20 mM L-alanine +0.2 mM IMP | >0.3 mM |

TABLE 24C

| 2-((3,5-dichlorophenyl)carbamoyl)cyclohexanecarboxylic acid-1-yl)ethyl)-1H-1,2,4-triazol-5(4H)-one | T1R1/T1R3 $EC_{50}$ |
|---|---|
| alone in buffer | 0.37 ± 0.05 mM |
| +20 mM L-alanine | 0.49 ± 0.01 mM |
| +0.2 mM IMP | 0.18 ± 0.01 mM |
| +20 mM L-alanine + 0.2 mM IMP | 0.15 ± 0.01 mM |

TABLE 24D

| 4-acetamido-N-(1-(2-hydroxyethyl)-3-phenyl-1H-pyrazol-5-yl)benzamide | T1R1/T1R3 $EC_{50}$ |
|---|---|
| alone in buffer | N/A |
| +20 mM L-alanine | N/A |
| +0.2 mM IMP | >0.1 mM |
| +20 mM L-alanine + 0.2 mM IMP | >0.1 mM |

TABLE 24E

| (Diphenylacetyl)-carbamic acid ethyl ester | T1R1/T1R3 $EC_{50}$ |
|---|---|
| alone in buffer | 0.25 ± 0.01 mM |
| +20 mM L-alanine | 0.38 ± 0.01 mM |
| +0.2 mM IMP | 0.12 ± 0.02 mM |
| +20 mM L-alanine + 0.2 mM IMP | 0.10 ± 0.01 mM |

TABLE 24F

| N,N'-(butane-1,4-diyl)dinicotinamide | T1R1/T1R3 $EC_{50}$ |
|---|---|
| alone in buffer | N/A |
| +20 mM L-alanine | N/A |
| +0.2 mM IMP | 0.60 ± 0.09 mM |
| +20 mM L-alanine + 0.2 mM IMP | 0.61 ± 0.36 mM |

TABLE 24G

| N-phenethylnicotinamide | T1R1/T1R3 $EC_{50}$ |
|---|---|
| alone in buffer | 0.37 ± 0.02 mM |
| +20 mM L-alanine | >0.3 mM |
| +0.2 mM IMP | 0.35 ± 0.1 mM |
| +20 mM L-alanine + 0.2 mM IMP | 0.22 ± 0.02 mM |

TABLE 24H

| 2-amino-N-phenethylbenzamide | T1R1/T1R3 $EC_{50}$ |
|---|---|
| alone in buffer | 0.42 ± 0.01 mM |
| +20 mM L-alanine | 0.48 ± 0.01 mM |
| +0.2 mM IMP | 0.14 ± 0.02 mM |
| +20 mM L-alanine + 0.2 mM IMP | 0.09 ± 0.01 mM |

TABLE 24I

| N-phenethylbenzo[d][1,3]dioxole-5-carboxamide | T1R1/T1R3 $EC_{50}$ |
|---|---|
| alone in buffer | 0.12 ± 0.07 mM |
| +20 mM L-alanine | >1.0 mM |
| +0.2 mM IMP | 0.04 ± 0.01 mM |
| +20 mM L-alanine + 0.2 mM IMP | 0.03 ± 0.01 mM |

TABLE 24J

| N-phenethylbenzamide | T1R1/T1R3 $EC_{50}$ |
|---|---|
| alone in buffer | 0.33 ± 0.01 mM |
| +20 mM L-alanine | >1.0 mM |
| +0.2 mM IMP | 0.12 ± 0.03 mM |
| +20 mM L-alanine + 0.2 mM IMP | 0.09 ± 0.02 mM |

TABLE 24K

| N-Benzoyl-DL-Leucinamide | T1R1/T1R3 $EC_{50}$ |
|---|---|
| alone in buffer | >0.6 mM |
| +20 mM L-alanine | >1.0 mM |
| +0.2 mM IMP | 0.47 ± 0.07 mM |
| +20 mM L-alanine + 0.2 mM IMP | 0.91 ± 0.23 mM |

TABLE 24L

| N-(2-(1H-Indol-3-yl)ethyl)nicotinamide | T1R1/T1R3 $EC_{50}$ |
|---|---|
| alone in buffer | 0.15 ± 0.03 mM |
| +20 mM L-alanine | >0.1 mM |
| +0.2 mM IMP | 0.05 ± 0.01 mM |
| +20 mM L-alanine +0.2 mM IMP | 0.04 ± 0.10 mM |

TABLE 24M

| N-Benzyl-L-phenylalanine methyl ester hydrochloride | T1R1/T1R3 $EC_{50}$ |
|---|---|
| alone in buffer | 0.03 ± 0.002 mM |
| +20 mM L-alanine | 0.05 ± 0.001 mM |
| +0.2 mM IMP | 0.02 ± 0.001 mM |
| +20 mM L-alanine + 0.2 mM IMP | 0.02 ± 0.002 mM |

TABLE 24N

| 6-Thioguanosine-5'-O-diphosphate (6-T-GDP) | T1R1/T1R3 $EC_{50}$ |
|---|---|
| alone in buffer | N/A |
| +20 mM L-alanine | 0.18 ± 0.02 mM |
| +0.2 mM IMP | N/A |
| +20 mM L-alanine + 0.2 mM IMP | 0.28 ± 0.05 mM |

TABLE 24O

| 6-Chloropurine riboside-5'-O-triphosphate (6-Cl-PuTP) | T1R1/T1R3 $EC_{50}$ |
|---|---|
| alone in buffer | >0.03 mM |
| +20 mM L-alanine | >0.03 mM |
| +0.2 mM IMP | >0.03 mM |
| +20 mM L-alanine + .2 mM IMP | >0.03 mM |

TABLE 25

Positive and negative controls for transmembrane compound activation of T1R1/T1R3

| Type of control | Compound Name | $EC_{50}$ (effect with 0.2 mM IMP) |
|---|---|---|
| Positive | L-Alanine | 12.3 ± 1.3 mM |
| | L-Serine | 15.1 ± 2.3 mM |
| | L-Cysteine | 43.9 ± 5.6 mM |
| | L-Phenylalanine | 0.5 ± 0.1 mM |
| | L-Tryptophan | 0.5 ± 0.1 mM |
| | L-Histidine | 15.3 ± 3.2 mM |
| | L-Methionine | 33.9 ± 1.5 mM |
| | L-Tyrosine | 9.3 ± 1.7 mM |
| | IMP | 0.21 ± 0.04 mM |
| | GMP | 0.09 ± 0.02 mM |
| Negative | L-Proline | — |
| | MSG | — |
| | Quinine HCL | — |
| | D-Glucose | — |

TABLE 26

Modulation of T1R1/T1R3 by transmembrane compounds

| | | +buffer | +Alanine (20 mM) | | | | +IMP (0.2 mM) | | | | +Alanine (20 mM) + IMP |
|---|---|---|---|---|---|---|---|---|---|---|---|
| Compound Name | Activity | (alone) $EC_{50}$ (mM) | $EC_{50}$ (mM) | Max resp ΔF/F | Max resp % of IMP | Thres (mM) | $EC_{50}$ (mM) | Max resp ΔF/F | Max resp % of Ala | Thres (mM) | (0.2 mM) $EC_{50}$ (mM) |
| L-Cysteine | N/T | N/D | N/D | N/D | N/D | N/D | 43.9 | 0.5800 | 74.6 | 10.0 | N/D |
| L-Phenylalanine | N/T | N/D | N/D | N/D | N/D | N/D | 0.5 | 0.5900 | 75.9 | 0.1 | N/D |
| L-Tryptophan | N/T | N/D | N/D | N/D | N/D | N/D | 0.5 | 0.6750 | 86.8 | 0.1 | N/D |
| L-Serine | N/T | N/D | N/D | N/D | N/D | N/D | 15.1 | 0.7775 | 100.0 | 3.0 | N/D |
| L-Histidine | N/T | N/D | N/D | N/D | N/D | N/D | 15.3 | 0.2825 | 36.3 | 10.0 | N/D |
| L-Alanine | N/T | N/D | N/D | N/D | N/D | N/D | 12.3 | 0.7775 | 100.0 | 3.0 | N/D |
| L-Methionine | N/T | N/D | N/D | N/D | N/D | N/D | 33.9 | 0.3500 | 45.0 | 30.0 | N/D |
| Inosine monophosphate (IMP) | N/T | N/D | 0.21 | 0.6850 | 100.0 | 0.03 | N/D | N/D | N/D | N/D | N/D |
| Guanosine monophosphate (GMP) | N/T | N/D | 0.09 | 0.7850 | 114.6 | 0.01 | N/D | N/D | N/D | N/D | N/D |
| L-Proline | N/T | N/D | N/D | N/D | N/D | N/D | CNBD | CNBD | CNBD | CNBD | N/D |
| MSG (Glutamic acid sodium salt) | N/T | N/D | N/D | N/D | N/D | N/D | CNBD | CNBD | CNBD | CNBD | N/D |
| Quinine HCL | N/T | CNBD | N/D | N/D | N/D | N/D | N/D | N/D | N/D | N/D | N/D |
| D-Glucose | N/T | CNBD | N/D | N/D | N/D | N/D | N/D | N/D | N/D | N/D | N/D |
| L-Tyrosine | N/T | N/D | N/D | N/D | N/D | N/D | 9.3 | 0.2958 | 38.0 | 3.0 | N/D |
| Mars1: 1-benzyl-3-(2-oxo-2-phenylethyl)imidazol-idine-2,4,5-trione | N/A | N/D | N/D | N/D | N/D | N/D | N/D | N/D | N/D | N/D | N/D |
| N-(4-(2-(3-benzyl-2,4,5-trioxoimidazolidin-1-yl)acetyl)phenyl)methane-sulfonamide | N/A | N/D | N/D | N/D | N/D | N/D | N/D | N/D | N/D | N/D | N/D |
| 1-benzyl-3-(2-(2,3-dihydro-1H-inden-5-yl)-2-oxoethyl)imidazolidine-2,4,5-trione | N/A | N/D | N/D | N/D | N/D | N/D | N/D | N/D | N/D | N/D | N/D |
| N-(4-(2-(3-(furan-2-ylmethyl)-2,4,5-trioxoimidazolidin-1-yl)acetyl)phenyl)acetamide | N/A | N/D | N/D | N/D | N/D | N/D | N/D | N/D | N/D | N/D | N/D |
| 1-benzyl-3-(2-(4-bromophenyl)-2-oxoethyl)imidazolidine-2,4,5-trione | N/A | N/D | N/D | N/D | N/D | N/D | N/D | N/D | N/D | N/D | N/D |
| 1-benzyl-3-(2-(4-(methylsulfonyl)phenyl)-2-oxoethyl)imidazolidine-2,4,5-trione | N/A | N/D | N/D | N/D | N/D | N/D | N/D | N/D | N/D | N/D | N/D |
| 1-(furan-2-ylmethyl)-3-(2-mesityl-2-oxoethyl)imidazolidine-2,4,5-trione | N/A | N/D | N/D | N/D | N/D | N/D | N/D | N/D | N/D | N/D | N/D |

TABLE 26-continued

Modulation of T1R1/T1R3 by transmembrane compounds

| Compound Name | Activity | +buffer (alone) $EC_{50}$ (mM) | +Alanine (20 mM) $EC_{50}$ (mM) | +Alanine (20 mM) Max resp ΔF/F | +Alanine (20 mM) Max resp % of IMP | +Alanine (20 mM) Thres (mM) | +IMP (0.2 mM) $EC_{50}$ (mM) | +IMP (0.2 mM) Max resp ΔF/F | +IMP (0.2 mM) Max resp % of Ala | +IMP (0.2 mM) Thres (mM) | +Alanine (20 mM) + IMP (0.2 mM) $EC_{50}$ (mM) |
|---|---|---|---|---|---|---|---|---|---|---|---|
| 1-benzyl-3-(2-(2,3-dihydrobenzo[b][1,4]dioxin-6-yl)-2-oxoethyl)imidazolidine-2,4,5-trione | N/A | N/D | N/D | N/D | N/D | N/D | N/D | N/D | N/D | N/D | N/D |
| 1-benzyl-3-(2-(2,4-dimethoxyphenyl)-2-oxoethyl)imidazolidine-2,4,5-trione | N/A | N/D | N/D | N/D | N/D | N/D | N/D | N/D | N/D | N/D | N/D |
| 1-(2-(3-methoxyphenyl)-2-oxoethyl)-3-(thiophen-2-ylmethyl)imidazolidine-2,4,5-trione | N/A | N/D | N/D | N/D | N/D | N/D | N/D | N/D | N/D | N/D | N/D |
| 1-(2-(3,4-dimethylphenyl)-2-oxoethyl)-3-(2-(thiophen-2-yl)ethyl)imidazolidine-2,4,5-trione | N/A | N/D | N/D | N/D | N/D | N/D | N/D | N/D | N/D | N/D | N/D |
| 1-(2-oxo-2-phenylethyl)-3-(2-(thiophen-2-yl)ethyl)imidazolidine-2,4,5-trione | N/A | N/D | N/D | N/D | N/D | N/D | N/D | N/D | N/D | N/D | N/D |
| 1-(2-(benzo[d][1,3]dioxol-5-yl)-2-oxoethyl)-3-(2-(thiophen-2-yl)ethyl)imidazolidine-2,4,5-trione | N/A | N/D | N/D | N/D | N/D | N/D | N/D | N/D | N/D | N/D | N/D |
| 1-benzyl-3-(2-(3,4-dihydro-2H-benzo[b][1,4]dioxepin-7-yl)-2-oxoethyl)imidazolidine-2,4,5-trione | N/A | N/D | N/D | N/D | N/D | N/D | N/D | N/D | N/D | N/D | N/D |
| 2-(3-benzyl-2,4,5-trioxoimidazolidin-1-yl)-N-(3-cyanophenypacetamide | N/A | N/D | N/D | N/D | N/D | N/D | N/D | N/D | N/D | N/D | N/D |
| N-benzyl-2-(3-benzyl-2,4,5-trioxoimidazolidin-1-yl)acetamide | N/A | N/D | N/D | N/D | N/D | N/D | N/D | N/D | N/D | N/D | N/D |
| N-(3-chloro-4-methoxyphenyl)-2-(3-(4-methoxyphenyl)-2,4,5-trioxoimidazolidin-1-yl)acetamide | N/A | N/D | N/D | N/D | N/D | N/D | N/D | N/D | N/D | N/D | N/D |
| 1-(cyclohexylmethyl)-3-cyclopentylimidazolidine-2,4,5-trione | N/A | N/D | N/D | N/D | N/D | N/D | N/D | N/D | N/D | N/D | N/D |
| 2-(3-benzyl-2,4,5-trioxoimidazolidin-1-yl)-N-methyl-N-(4-methylcyclohexyl)acetamide | N/A | N/D | N/D | N/D | N/D | N/D | N/D | N/D | N/D | N/D | N/D |
| 1-(2-oxo-2-(3-oxo-3,4-dihydro-2H-benzo[b][1,4]oxazin-6-yl)ethyl)-3-(2-(thiophen-2-yl)ethyl)imidazolidine-2,4,5-trione | N/A | N/D | N/D | N/D | N/D | N/D | N/D | N/D | N/D | N/D | N/D |
| 1-(2-(2-methoxyphenyl)-2-oxoethyl)-3-(thiophen-2-ylmethyl)imidazolidine-2,4,5-trione | N/A | N/D | N/D | N/D | N/D | N/D | N/D | N/D | N/D | N/D | N/D |
| 1-(2-(naphthalen-1-yl)-2-oxoethyl)-3-(2-(thiophen-2-yl)ethyl)imidazolidine-2,4,5-trione | N/A | N/D | N/D | N/D | N/D | N/D | N/D | N/D | N/D | N/D | N/D |
| 1-benzyl-3-(2-(5-chlorothiophen-2-yl)-2-oxoethyl)imidazolidine-2,4,5-trione | N/A | N/D | N/D | N/D | N/D | N/D | N/D | N/D | N/D | N/D | N/D |

TABLE 26-continued

Modulation of T1R1/T1R3 by transmembrane compounds

| Compound Name | Activity | +buffer (alone) $EC_{50}$ (mM) | +Alanine (20 mM) $EC_{50}$ (mM) | +Alanine (20 mM) Max resp ΔF/F | +Alanine (20 mM) Max resp % of IMP | +Alanine (20 mM) Thres (mM) | +IMP (0.2 mM) $EC_{50}$ (mM) | +IMP (0.2 mM) Max resp ΔF/F | +IMP (0.2 mM) Max resp % of Ala | +IMP (0.2 mM) Thres (mM) | +Alanine (20 mM) + IMP (0.2 mM) $EC_{50}$ (mM) |
|---|---|---|---|---|---|---|---|---|---|---|---|
| 1-(2-(benzofuran-2-yl)-2-oxoethyl)-3-benzylimidazolidine-2,4,5-trione | N/A | N/D | N/D | N/D | N/D | N/D | N/D | N/D | N/D | N/D | N/D |
| methyl 4-((3-benzyl-2,4,5-trioxoimidazolidin-1-yl)methyl)benzoate | N/A | N/D | N/D | N/D | N/D | N/D | N/D | N/D | N/D | N/D | N/D |
| N-(4-(2-(3-benzyl-2,4,5-trioxoimidazolidin-1-yl)acetyl)phenyl)propionamide | N/A | N/D | N/D | N/D | N/D | N/D | N/D | N/D | N/D | N/D | N/D |
| 1-benzyl-3-(2-chlorobenzyl)imidazolidine-2,4,5-trione | N/A | N/D | N/D | N/D | N/D | N/D | N/D | N/D | N/D | N/D | N/D |
| 1-benzyl-3-(3-phenylpropyl)imidazolidine-2,4,5-trione | N/A | N/D | N/D | N/D | N/D | N/D | N/D | N/D | N/D | N/D | N/D |
| 1,3-dibenzyl-2-thioxoimidazolidine-4,5-dione | N/A | N/D | N/D | N/D | N/D | N/D | N/D | N/D | N/D | N/D | N/D |
| 1,3-dibenzylpyrimidine-2,4,6(1H,3H,5H)-trione | active | 0.26 | 0.31 | 0.2925 | 42.7 | 0.1 | 0.52 | 0.2775 | 35.7 | 0.1 | >0.3 |
| 1-benzyl-5-(4-hydroxy-3-methoxybenzyl)pyrimidine-2,4,6(1H,3H,5H)-trione | N/A | N/D | N/D | N/D | N/D | N/D | N/D | N/D | N/D | N/D | N/D |
| 1-benzyl-3-phenyltetrahydro-1H-thieno[3,4-d]imidazol-2(3H)-one 5,5-dioxide | N/A | N/D | N/D | N/D | N/D | N/D | N/D | N/D | N/D | N/D | N/D |
| 2-(1-benzyl-2-oxo-1H-imidazo[4,5-c]pyridin-3(2H)-yl)-N-isobutylacetamide | N/A | N/D | N/D | N/D | N/D | N/D | N/D | N/D | N/D | N/D | N/D |
| 2-(4-benzyl-3-methyl-5-oxo-4,5-dihydro-1H-1,2,4-triazol-1-yl)-N-(1-(thiophen-2-yl)ethyl)acetamide | N/A | N/D | N/D | N/D | N/D | N/D | N/D | N/D | N/D | N/D | N/D |
| 4-benzyl-3-butyl-1-(2-oxo-2-(pyrrolidin-1-yl)ethyl)-1H-1,2,4-triazol-5(4H)-one | active | >0.6 | >0.6 | 0.8900 | 129.9 | 0.3 | >0.6 | 1.5025 | 193.2 | 0.1 | >0.6 |
| 1-(2-(4-fluorophenyl)-2-oxoethyl)-4-(4-methylbenzyl)pyrazine-2,3(1H,4H)-dione | N/A | N/D | N/D | N/D | N/D | N/D | N/D | N/D | N/D | N/D | N/D |
| 1,3-diphenethylpyrimidine-2,4,6(1H,3H,5H)-trione | N/A | N/D | N/D | N/D | N/D | N/D | N/D | N/D | N/D | N/D | N/D |
| 3-(4-methylbenzyl)-1-(2-(p-tolyloxy)ethyl)pyrimidine-2,4(1H,3H)-dione | N/A | N/D | N/D | N/D | N/D | N/D | N/D | N/D | N/D | N/D | N/D |
| N-(3-chloro-4-methoxyphenyl)-2-(5-(4-chlorobenzyl)-1,1-dioxido-1,2,5-thiadiazolidin-2-yl)acetamide | N/A | N/D | N/D | N/D | N/D | N/D | N/D | N/D | N/D | N/D | N/D |
| 4,4'-((2,2-dioxidobenzo[c][1,2,5]thiadiazole-1,3-diyl)bis(methylene))dibenzamide | N/A | N/D | N/D | N/D | N/D | N/D | N/D | N/D | N/D | N/D | N/D |
| 3,3'-((2,2-dioxidobenzo[c][1,2,5]thiadiazole-1,3-diyl)bis(methylene))dibenzonitrile | N/A | N/D | N/D | N/D | N/D | N/D | N/D | N/D | N/D | N/D | N/D |
| 2,5-diphenethyl-1,3,4-thiadiazole | N/A | N/D | N/D | N/D | N/D | N/D | N/D | N/D | N/D | N/D | N/D |
| N-(4-methyl-5-(pyridin-2-yl)thiazol-2-yl)nicotinamide | N/A | N/D | N/D | N/D | N/D | N/D | N/D | N/D | N/D | N/D | N/D |

TABLE 26-continued

Modulation of T1R1/T1R3 by transmembrane compounds

| Compound Name | Activity | +buffer (alone) $EC_{50}$ (mM) | +Alanine (20 mM) $EC_{50}$ (mM) | +Alanine (20 mM) Max resp ΔF/F | +Alanine (20 mM) Max resp % of IMP | +Alanine (20 mM) Thres (mM) | +IMP (0.2 mM) $EC_{50}$ (mM) | +IMP (0.2 mM) Max resp ΔF/F | +IMP (0.2 mM) Max resp % of Ala | +IMP (0.2 mM) Thres (mM) | +Alanine (20 mM) + IMP (0.2 mM) $EC_{50}$ (mM) |
|---|---|---|---|---|---|---|---|---|---|---|---|
| 5-(3-chlorobenzyl)-N-(pyridin-4-ylmethyl)-1,3,4-oxadiazole-2-carboxamide | N/A | N/D | N/D | N/D | N/D | N/D | N/D | N/D | N/D | N/D | N/D |
| N,N'-(4H-1,2,4-triazole-3,5-diyl)bis(4-fluorobenzamide) | N/A | N/D | N/D | N/D | N/D | N/D | N/D | N/D | N/D | N/D | N/D |
| N-(2-chlorobenzyl)-5-(2,4-dichlorobenzyl)-1,3,4-oxadiazole-2-carboxamide | N/A | N/D | N/D | N/D | N/D | N/D | N/D | N/D | N/D | N/D | N/D |
| 1-benzyl-3-(benzylamino)-1H-pyrrole-2,5-dione | N/A | N/D | N/D | N/D | N/D | N/D | N/D | N/D | N/D | N/D | N/D |
| 1-benzyl-3-(benzylamino)-1H-pyrrole-2,5-dione | N/A | N/D | N/D | N/D | N/D | N/D | N/D | N/D | N/D | N/D | N/D |
| 2-((3-(4-acetylphenyl)-4-methyl-2-oxo-2,3-dihydro-1H-imidazol-1-yl)methyl)-5-fluorobenzonitrile | N/A | N/D | N/D | N/D | N/D | N/D | N/D | N/D | N/D | N/D | N/D |
| 6-methoxy-N-(2-(1-(4-methylbenzyl)-2-oxo-1H-imidazo[4,5-b]pyridin-3(2H)-yl)ethyl)nicotinamide | N/A | N/D | N/D | N/D | N/D | N/D | N/D | N/D | N/D | N/D | N/D |
| N-(2-(1-benzyl-2-oxo-1H-imidazo[4,5-b]pyridin-3(2H)-yl)ethyl)-3-methoxybenzamide | N/A | N/D | N/D | N/D | N/D | N/D | N/D | N/D | N/D | N/D | N/D |
| 1,3-dibenzyltetrahydro-1H-thieno[3,4-d]imidazol-2(3H)-one 5,5-dioxide | N/A | N/D | N/D | N/D | N/D | N/D | N/D | N/D | N/D | N/D | N/D |
| 1-(4-chlorobenzyl)-3-(2-phenoxyethyl)-1H-benzo[d]imidazol-2(3H)-imine | N/A | N/D | N/D | N/D | N/D | N/D | N/D | N/D | N/D | N/D | N/D |
| 2-(3-benzyl-2-imino-2,3-dihydro-1H-benzo[d]imidazol-1-yl)-1-(3,4-dichlorophenyl)ethan-one | N/A | N/D | N/D | N/D | N/D | N/D | N/D | N/D | N/D | N/D | N/D |
| 1-(2,6-dihydroxy-4-methoxyphenyl)-3-phenylpropan-1-one | N/A | N/D | N/D | N/D | N/D | N/D | N/D | N/D | N/D | N/D | N/D |
| 3-(3,4-dimethoxyphenyl)-1-(2-hydroxy-4,6-dimethoxyphenyl)propan-1-one | N/A | N/D | N/D | N/D | N/D | N/D | N/D | N/D | N/D | N/D | N/D |
| (E)-1-(2-hydroxyphenyl)-3-phenylprop-2-en-1-one | N/A | N/D | N/D | N/D | N/D | N/D | N/D | N/D | N/D | N/D | N/D |
| (E)-1-(4-methoxyphenyl)-3-phenylprop-2-en-1-one | N/A | N/D | N/D | N/D | N/D | N/D | N/D | N/D | N/D | N/D | N/D |
| (E)-3-(3,4-di-methoxyphenyl)-1-(2,4,6-trimethoxyphenyl)prop-2-en-1-one | N/A | N/D | N/D | N/D | N/D | N/D | N/D | N/D | N/D | N/D | N/D |
| (E)-1-(4-hydroxy-2-methoxyphenyl)-3-(4-hydroxyphenyl)prop-2-en-1-one | N/A | N/D | N/D | N/D | N/D | N/D | N/D | N/D | N/D | N/D | N/D |
| 2-(2-amino-benzamido)propanoicacid | N/A | N/D | N/D | N/D | N/D | N/D | N/D | N/D | N/D | N/D | N/D |
| methyl 2-benzamido-3-phenylpropanoate | N/A | N/D | N/D | N/D | N/D | N/D | N/D | N/D | N/D | N/D | N/D |
| methyl 2-(2,3-dihydroxybenzamido)-3-hydroxypropanoate | N/A | N/D | N/D | N/D | N/D | N/D | N/D | N/D | N/D | N/D | N/D |
| N-(5-methylthiazol-2-yl)-9H-xanthene-9-carboxamide | N/A | N/D | N/D | N/D | N/D | N/D | N/D | N/D | N/D | N/D | N/D |
| N-(5-acetyl-4-methylthiazol-2-yl)-2,2-diphenylacetamide | N/A | N/D | N/D | N/D | N/D | N/D | N/D | N/D | N/D | N/D | N/D |

TABLE 26-continued

Modulation of T1R1/T1R3 by transmembrane compounds

| Compound Name | Activity | +buffer (alone) $EC_{50}$ (mM) | +Alanine (20 mM) $EC_{50}$ (mM) | +Alanine (20 mM) Max resp ΔF/F | +Alanine (20 mM) Max resp % of IMP | +Alanine (20 mM) Thres (mM) | +IMP (0.2 mM) $EC_{50}$ (mM) | +IMP (0.2 mM) Max resp ΔF/F | +IMP (0.2 mM) Max resp % of Ala | +IMP (0.2 mM) Thres (mM) | +Alanine (20 mM) + IMP (0.2 mM) $EC_{50}$ (mM) |
|---|---|---|---|---|---|---|---|---|---|---|---|
| N-(4-methylthiazol-2-yl)-2,2-diphenylacetamide | N/A | N/D | N/D | N/D | N/D | N/D | N/D | N/D | N/D | N/D | N/D |
| N-(2-methyl-3-nitrobenzyl)-N-(pyridin-3-yl)ethanesulfonamide | N/A | N/D | N/D | N/D | N/D | N/D | N/D | N/D | N/D | N/D | N/D |
| N-benzyl-2-isopropoxy-N-(pyridin-4-yl)ethanesulfonamide | N/A | N/D | N/D | N/D | N/D | N/D | N/D | N/D | N/D | N/D | N/D |
| 5-(phenoxymethyl)-3-phenyloxazolidin-2-one | N/A | N/D | N/D | N/D | N/D | N/D | N/D | N/D | N/D | N/D | N/D |
| N-(4-chloro-2-fluorophenyl)quinoline-2-carboxamide | N/A | N/D | N/D | N/D | N/D | N/D | N/D | N/D | N/D | N/D | N/D |
| N-(4-chlorophenyl)-6-(4H-1,2,4-triazol-4-yl)picolinamide | N/A | N/D | N/D | N/D | N/D | N/D | N/D | N/D | N/D | N/D | N/D |
| 2-((3,5-dichloro-phenyl)carbamoyl)cyclo-hexanecarboxylic acid | active | 0.37 | 0.49 | 1.1200 | 163.5 | 0.1 | 0.18 | 1.2275 | 157.9 | 0.03 | 0.15 |
| 1-(2,4-dimethylphenyl)-4-(3-methylpiperidin-l-yl)-1H-pyrazolo[3,4-d]pyrimidine | N/A | N/D | N/D | N/D | N/D | N/D | N/D | N/D | N/D | N/D | N/D |
| (1E,2E)-1,2-bis(3-fluoro-benzylidene)hydrazine | N/A | N/D | N/D | N/D | N/D | N/D | N/D | N/D | N/D | N/D | N/D |
| 2-((E)-((E)-benzylidene-hydrazono)methyl)phenol | N/A | N/D | N/D | N/D | N/D | N/D | N/D | N/D | N/D | N/D | N/D |
| 2-((E)-((E)-(4-bromoben-zylidene)hydrazono)meth-yl)-4-nitrophenol | N/A | N/D | N/D | N/D | N/D | N/D | N/D | N/D | N/D | N/D | N/D |
| 3-cyano-N-(3-(2-methoxyphenyl)-1H-pyrazol-5-yl)benzamide | N/A | N/D | N/D | N/D | N/D | N/D | N/D | N/D | N/D | N/D | N/D |
| N-(1-(2-hydroxyethyl)-3-phenyl-1H-pyrazol-5-yl)-3-methoxybenzamide | N/A | N/D | N/D | N/D | N/D | N/D | N/D | N/D | N/D | N/D | N/D |
| 4-acetamido-N-(1-(2-hydroxyethyl)-3-phenyl-1H-pyrazol-5-yl)benzamide | active | CNBD | CNBD | 0.0125 | 1.8 | CNBD | >1.0 | 0.4575 | 58.8 | CNBD | >1.0 |
| 2-(4-fluorophenyl)-1-tosylpyrrolidine | N/A | N/D | N/D | N/D | N/D | N/D | N/D | N/D | N/D | N/D | N/D |
| N-(3-(pyridin-2-ylethyn-yl)phenyl)propionamide | N/A | N/D | N/D | N/D | N/D | N/D | N/D | N/D | N/D | N/D | N/D |
| 1-(5-(phenylethynyl)thio-phen-2-yl)ethanone | N/A | N/D | N/D | N/D | N/D | N/D | N/D | N/D | N/D | N/D | N/D |
| (E)-1-(5-(phenylethynyl)thiophen-2-yl)ethanone oxime | N/A | N/D | N/D | N/D | N/D | N/D | N/D | N/D | N/D | N/D | N/D |
| N-(3-methoxypropyl)-4-(phenylethynyl)benzamide | N/A | N/D | N/D | N/D | N/D | N/D | N/D | N/D | N/D | N/D | N/D |
| Ro 67-4853 | N/A | N/D | N/D | N/D | N/D | N/D | N/D | N/D | N/D | N/D | N/D |
| Ro 01-6128 | active | 0.25 | 0.38 | 0.5125 | 74.8 | 0.3 | 0.12 | 1.5525 | 199.7 | 0.01 | 0.10 |
| VU 0361737 | N/A | N/D | N/D | N/D | N/D | N/D | N/D | N/D | N/D | N/D | N/D |
| AMG-073 HCl (Cinacalcet hydrochloride) | N/A | N/D | N/D | N/D | N/D | N/D | N/D | N/D | N/D | N/D | N/D |
| DCB | N/A | N/D | N/D | N/D | N/D | N/D | N/D | N/D | N/D | N/D | N/D |
| VU 0357121 | N/A | N/D | N/D | N/D | N/D | N/D | N/D | N/D | N/D | N/D | N/D |
| N,N'-(butane-1,4-diyl)dinicotinamide | active | CNBD | CNBD | 0.0650 | 9.5 | 1.0 | 0.60 | 0.3825 | 49.2 | 0.1 | 0.61 |
| N-phenethylnicotinamide | active | 0.37 | >0.3 | 0.5725 | 83.6 | 0.1 | 0.35 | 1.1625 | 149.5 | 0.03 | 0.22 |
| N-(2-(1H-indol-3-yl)ethyl)nicotinamide | N/A | N/D | N/D | N/D | N/D | N/D | N/D | N/D | N/D | N/D | N/D |
| 2-amino-N-phenethylbenzamide | active | 0.42 | 0.48 | 0.6400 | 93.4 | 0.3 | 0.14 | 1.5125 | 194.5 | 0.01 | 0.09 |
| N-isobutylbenzo[d][1,3]di-oxole-5-carboxamide | N/A | N/D | N/D | N/D | N/D | N/D | N/D | N/D | N/D | N/D | N/D |
| N-phen-ethylbenzo[d][1,3]dioxole-5-carboxamide | active | 0.12 | CNBD | 0.0775 | 11.3 | 1.0 | 0.04 | 0.7150 | 92.0 | 0.01 | 0.03 |

TABLE 26-continued

Modulation of T1R1/T1R3 by transmembrane compounds

| Compound Name | Activity | +buffer (alone) $EC_{50}$ (mM) | +Alanine (20 mM) $EC_{50}$ (mM) | Max resp ΔF/F | Max resp % of IMP | Thres (mM) | +IMP (0.2 mM) $EC_{50}$ (mM) | Max resp ΔF/F | Max resp % of Ala | Thres (mM) | +Alanine (20 mM) + IMP (0.2 mM) $EC_{50}$ (mM) |
|---|---|---|---|---|---|---|---|---|---|---|---|
| N-(1-amino-l-oxo-3-phenylpropan-2-yl)benzamide | N/A | N/D | N/D | N/D | N/D | N/D | N/D | N/D | N/D | N/D | N/D |
| N-(1-(methylamino)-1-oxopropan-2-yl)cinnamamide | N/A | N/D | N/D | N/D | N/D | N/D | N/D | N/D | N/D | N/D | N/D |
| N-phenethylbenzamide | active | 0.33 | >1.0 | 0.1400 | 20.4 | 0.6 | 0.12 | 0.9800 | 126.0 | 0.01 | 0.09 |
| 2-((carboxymethyl)amino)-3-phenylpropanoic acid | N/A | N/D | N/D | N/D | N/D | N/D | N/D | N/D | N/D | N/D | N/D |
| N-Benzoyl-DL-Leucinamide | active | >0.6 | >1.0 | 0.8600 | 125.5 | 0.3 | 0.47 | 1.5900 | 204.5 | 0.1 | 0.91 |
| N-(2-(1H-Indol-3-yl)ethyl)nicotinamide | active | 0.15 | >0.1 | 1.1400 | 166.4 | 0.03 | 0.05 | 1.3225 | 170.1 | 0.003 | 0.04 |
| N-Benzyl-L-phenylalanine methyl ester hydrochloride | active | 0.03 | 0.05 | 1.8725 | 273.4 | 0.01 | 0.02 | 2.2500 | 289.4 | 0.003 | 0.02 |
| N-benzyl-L-Leucine | N/A | N/D | N/D | N/D | N/D | N/D | N/D | N/D | N/D | N/D | N/D |
| N-(sec-butyl)-2H-1,3-benzodioxole-5-carboxamide | N/A | N/D | N/D | N/D | N/D | N/D | N/D | N/D | N/D | N/D | N/D |
| 2'-/3'-O-(N'-Methyl-anthraniloyl)inosine-5'-O-monophosphate (MANT-5'-IMP) | N/A | N/D | N/D | N/D | N/D | N/D | N/D | N/D | N/D | N/D | N/D |
| N6-Cyclopentyladenosine-5'-O-diphosphate (6-cPe-ADP/cpADP) | N/A | N/D | N/D | N/D | N/D | N/D | N/D | N/D | N/D | N/D | N/D |
| 2'-/3'-O-(N'-Methyl-anthraniloyl)adenosine-5'-O-diphosphate (MANT-ADP) | N/A | N/D | N/D | N/D | N/D | N/D | N/D | N/D | N/D | N/D | N/D |
| 6-Thioguanosine-5'-O-diphosphate (6-T-GDP) | active | CNBD | 0.18 | 1.0470 | 152.8 | 0.03 | CNBD | 0.0720 | 9.3 | CNBD | 0.28 |
| 6-Chloropurine riboside-5'-O-triphosphate (6-Cl-PuTP) | active | >0.3 | >0.3 | 0.3450 | 50.4 | 0.01 | >0.3 | 0.2350 | 30.2 | 0.003 | >0.3 |
| 2'-/3'-O-(N'-Methyl-anthraniloyl)adenosine-5'-O-triphosphate (MANT-ATP) | N/A | N/D | N/D | N/D | N/D | N/D | N/D | N/D | N/D | N/D | N/D |
| benzyl cinnamate (EU Approved) | N/A | N/D | N/D | N/D | N/D | N/D | N/D | N/D | N/D | N/D | N/D |
| Isobutyl benzoate; Flavis 09.705 | N/A | N/D | N/D | N/D | N/D | N/D | N/D | N/D | N/D | N/D | N/D |
| Tartrazine; Yellow No. 5 | N/A | N/D | N/D | N/D | N/D | N/D | N/D | N/D | N/D | N/D | N/D |
| Chromotrope FB; Carmosine Food Red 3 | N/A | N/D | N/D | N/D | N/D | N/D | N/D | N/D | N/D | N/D | N/D |
| Isobutyl phenylacetate Flavis 09.705 (EU Approved) | N/A | N/D | N/D | N/D | N/D | N/D | N/D | N/D | N/D | N/D | N/D |
| Phenethyl phenylacetate (EU Approved) | N/A | N/D | N/D | N/D | N/D | N/D | N/D | N/D | N/D | N/D | N/D |
| Benzyl benzoate (EU Approved) | N/A | N/D | N/D | N/D | N/D | N/D | N/D | N/D | N/D | N/D | N/D |

N/D = Not determined

N/T = Not tested

N/A = Not active

CNBD = Could not be determined

Example 8—Activation of T1R1/T1R3 Receptor by Transmembrane Compounds

The present example describes the activation of the T1R1/T1R3 receptor by transmembrane compounds in vitro, wherein the transmembrane compounds function as receptor agonists and/or positive allosteric modulators (PAMs). When functioning as PAMs, the transmembrane compounds increase the effect of nucleotides and amino acids on the activity of the receptor.

Based on the in silico modeling described in Example 4, putative T1R1/T1R3 transmembrane compounds were identified and selected for further testing in vitro as receptor agonists and/or PAMs. In vitro functional characterization of the selected compounds was used to evaluate the effectiveness of the putative transmembrane compounds as agonists and/or PAMs in activating the T1R1/T1R3 receptor.

Agonist Screening Method:

HEK293 cells that stably express T1R3 and inducibly express T1R1 were exposed to a transmembrane compound. Activation of the T1R1/T1R3 receptor was detected by a change in intracellular calcium levels using a calcium sensitive fluorescent dye and/or a luminescent reporter system. Cells that do not express the T1R1/T1R3 receptor were used as a control. A FLIPR® Tetra or a FlexStation® 3 was used for data capture.

Each transmembrane compound was tested at concentrations of 0.01 mM, 0.1 mM, and 1 mM. Dose response curves were generated for each transmembrane compound that activated T1R1/T1R3. To generate the dose response curves, the transmembrane compound was tested at concentrations of between 0.0001 mM and 1.0 mM in the presence of GMP and Ala. Dose response curves were created wherein Ala was held constant at 20 mm, and GMP was increased from 0.001 to 1 mM (specifically, 0.001, 0.003, 0.01, 0.03, 0.1, 0.3, 0.6, and 1 mM). Similarly, GMP was held constant at 1 mM and the concentration of Ala was varied between 0.1 and 100 mM (specifically, 0.1, 0.3, 1, 3, 10, 30, 60, and 100 mM).

PAM Screening Method:

HEK293 cells that stably express T1R3 and inducibly express T1R1 were exposed to transmembrane compound alone or in combination with Ala and GMP to activate the umami receptor. Activation of the T1R1/T1R3 receptor was detected by a change in intracellular calcium levels using a calcium sensitive fluorescent dye and/or a luminescent reporter system. Cells that do not express the T1R1/T1R3 receptor were used as a control. A FLIPR® Tetra or a FlexStation® 3 was used for data capture.

Dose response curves were generated for each transmembrane compound at concentrations of 0 (buffer only), 0.01, 0.1 and 1 mM, wherein each of the three concentrations of transmembrane compound was tested in combination with 0.03 mM GMP+100 mM Ala (T1); 0.6 mM GMP+10 mM Ala (T2); 0.1 mM GMP+60 mM Ala (T3) and 0.3 mM GMP+60 mM Ala (T4). The T4 mixture was also tested in a 2-fold dilution series (the T4(X) Concentration). In these experiments, the first test concentration was 2× (2 times) the T4 concentration. The subsequent test concentrations were 2-fold dilutions from that (1×, 0.5× etc.). This dilution series was tested with or without the addition of the test compound at a constant 0.3 mM concentration.

Activation of the umami receptor was also determined in the presence of 1 mM GMP+100 mM Ala to generate a "maximum" umami receptor activation level. A compound was classed as a PAM if the response to any combination of compound+Ala+GMP was greater than the sum of the response to the compound alone and the response to GMP+Alanine alone.

Results:

As shown in Table 27, 24 different transmembrane compounds were tested, and nine were identified as a T1R1/T1R3 agonist, PAM, or both.

TABLE 27

Transmembrane compounds that function as a T1R1/T1R3 agonist, PAM, or both.

| | Transmembrane compound name | T1R1/T1R3 agonist | T1R1/T1R3 PAM |
|---|---|---|---|
| 1 | 1-benzyl-3-(2-oxo-2-phenylethyl)imidazolidine-2,4,5-trione | No | No |
| 2 | 1-benzyl-3-(2-(2,3-dihydro-1H-inden-5-yl)-2-oxoethyl)imidazolidine-2,4,5-trione | No | No |
| 3 | 1-benzyl-3-(2-(4-bromophenyl)-2-oxoethyl)imidazolidine-2,4,5-trione | No | No |
| 4 | 1-benzyl-3-(2-(2,3-dihydrobenzo[b][1,4]dioxin-6-yl)-2-oxoethyl)imidazolidine-2,4,5-trione | No | No |
| 5 | 1-benzyl-3-(2-(2,4-dimethoxyphenyl)-2-oxoethyl)imidazolidine-2,4,5-trione | No | No |
| 6 | 1-(2-oxo-2-phenylethyl)-3-(2-(thiophen-2-yl)ethyl)imidazolidine-2,4,5-trione | No | No |
| 7 | 1-(2-(benzo[d][1,3]dioxol-5-yl)-2-oxoethyl)-3-(2-(thiophen-2-yl)ethyl)imidazolidine-2,4,5-trione | No | No |
| 8 | 1-benzyl-3-(2-(3,4-dihydro-2H-benzo[b][1,4]dioxepin-7-yl)-2-oxoethyl)imidazolidine-2,4,5-trione | No | Weak PAM |
| 9 | 2-(3-benzyl-2,4,5-trioxoimidazolidin-1-yl)-N-(3-cyanophenyl)acetamide | No | No |
| 10 | 1-(2-(2-methoxyphenyl)-2-oxoethyl)-3-(thiophen-2-ylmethyl)imidazolidine-2,4,5-trione | No | No |
| 11 | 1-(2-(naphthalen-1-yl)-2-oxoethyl)-3-(2-(thiophen-2-yl)ethyl)imidazolidine-2,4,5-trione | No | No |
| 12 | 1-benzyl-3-(2-(5-chlorothiophen-2-yl)-2-oxoethyl)imidazolidine-2,4,5-trione | No | Weak PAM |
| 13 | 1,3-dibenzyl-2-thioxoimidazolidine-4,5-dione | No | No |
| 14 | N-(heptan-4-yl)benzo[d][1,3]dioxole-5-carboxamide | Yes | Yes |
| 15 | N-Benzyl-L-phenylalanine methyl ester hydrochloride | Yes | Yes |
| 16 | N-Benzyl-D-Phenylalanine methyl ester hydrochloride | Yes | Yes |

TABLE 27-continued

Transmembrane compounds that function as a T1R1/T1R3 agonist, PAM, or both.

| | Transmembrane compound name | T1R1/T1R3 agonist | T1R1/T1R3 PAM |
|---|---|---|---|
| 17 | N-alpha-Benzyl-N-alpha-methyl-L-phenylalanine methyl ester hydrochloride | No | No |
| 18 | Benzyl-L-leucine methyl ester hydrochloride | Yes | Yes |
| 19 | Methyl-2-benzylamino-2-phenylacetate | Yes | Yes |
| 20 | L-Phenylalanine benzyl ester hydrochloride | Yes | Yes |
| 21 | L-Tyrosine benzyl ester | No | No |
| 22 | N-Benzyl-L-Tyrosine | No | No |
| 23 | 2-((4-methylbenzyl)amino)-3-phenylpropanoic acid | No | No |
| 24 | 1,3-dibenzylpyrimidine-2,4,6(1H,3H,5H)-trione | Yes | No |

As described by Table 28, nine of the compounds tested were active as T1R1/T1R3 agonists and/or PAMs. FIGS. 72-80 show the dose response curves for the agonist profiling and PAM profiling for each compound identified as a T1R1/T1R3 agonist and/or PAM.

Without being bound to a particular theory, these results show that transmembrane compounds alone can activate T1R1/T1R3 as agonists, and can also function as positive allosteric modulators of GMP and Ala activation of T1R1/T1R3, thereby reducing the amount of agonist necessary to sufficiently activate the T1R1/T1R3 receptor.

Example 9—Identification of T1R1 Transmembrane Compound Interacting Residues The present example describes the in silico identification of amino acids within T1R1 that interact with transmembrane compounds that bind to T1R1.

Methods:

The cat T1R1 is a Group C G protein-coupled receptor (GPCR), as are T1R2, T1R3, CaSR, GabaB, and mGlu's. Group C GPCRs comprise (1) a large external domain, called a Venus Flytrap domain (VFT), (2) a 7 transmembrane domain (7TM), and (3) a cysteine rich domain which connects VFT and 7TM. A homology model of the cat T1R1 7TM domain was constructed based on crystal structures 40R2 and 4009 from the Protein Data Bank (Berman et al., Nucleic Acids Research, 28: 235-242 (2000)). 40R2 and 4009 are crystal structures of parts of two metabotropic glutamate receptors that are Group C GPCRs. 40R2 is the crystal structure of the transmembrane domain of mGluR1 with a bound negative allosteric modulator (NAM) (Wu et al., Science. 2014 Apr. 4; 344(6179):58-64. Epub 2014 Mar. 6.). 4009 is the crystal structure of the transmembrane domain of mGluR5 with a bound NAM (Dore et al., Nature. 2014 Jul. 31; 511(7511):557-62. Epub 2014 Jul. 6). The models were built using the I-TASSER Suite of programs (Yang et al., Nature Methods, 12: 7-8 (2015)) and the Modeller software package (Eswar et al., Curr Protoc Bioinformatics, John Wiley & Sons, Inc., Supplement 15, 5.6.1-5.6.30 (2006)), which is part of the DiscoveryStudio (DS) suite of programs from Dassault Systemes, BIOVIA Corp., San Diego, CA, USA. There is approximately 25% sequence identity between mGluR1 and cat T1R1 7TM domains. N-Benzyl-L-phenylalanine methyl ester was docked into an allosteric site of the cat T1R1 7TM in the T1R1 model using the docking program BioDock from BioPredict, Inc. (Oradell, NJ, USA). For docking amino acids and nucleotides to the VFT domain, a similar protocol was used to that described for modeling nucleotide docking with the VFT domain.

Results:

In the docking model, N-Benzyl-L-phenylalanine methyl ester interacts with the following amino acids of the allosteric 7TM binding site of cat T1R1: Ala795, Ala796, and Asn792, which are on helix 7 of the 7TM; Trp773 and Phe776, which are on helix 6 of the 7TM; Ala731, Phe728, Leu730, Phe732, and Asn735, which are on helix 5 of the 7TM; Ala689, Ser686, Gln690, Ile693, Cys694 and Leu695, which are on helix 4 of the 7TM; and Arg634, Gln635, Phe642, Ala639, Ala643, and Leu638, which are on helix 3 of the 7TM (FIG. 28. The ester group of N-Benzyl-L-phenylalanine methyl ester forms a hydrogen bond to Asn735. Models of other transmembrane compounds illustrate that the ligand may form hydrogen bonding interactions to Asn735, Ser686, or both.

The majority of the hydrophobic interactions between N-Benzyl-L-phenylalanine methyl ester and the 7TM domain of T1R1 occur between the ligand and Trp773, Phe776, Phe732, Phe728, Leu730, Leu695, Leu638, and Phe642. These amino acids also provide for the majority of the hydrophobic interactions between other T1R1 transmembrane ligands and the T1R1 transmembrane domain.

A striking feature of the T1R1 active site is the number of residues that can undergo ring stacking interactions to a bound ligand. The model of N-Benzyl-L-phenylalanine methyl ester bound to T1R1 7TM shows ring-stacking interactions from the benzyl group to the transmembrane domain. This feature is common to models of other active transmembrane compounds bound to T1R1 7TM. These may contribute both to binding and to stabilization of the T1R1/T1R3 active conformation. T1R1 7TM amino acids that can form such interactions include Trp773, Phe776, Phe732, Phe728, and Phe642.

Although the presently disclosed subject matter and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, and composition of matter, means, methods and steps described in the specification. As one of ordinary skill in the art will readily appreciate from the disclosure of the presently disclosed subject matter, processes, machines, manufacture, compositions of matter, means, methods, or steps, presently existing or later to be developed that perform substantially the same function or achieve substantially the same result as the corresponding embodiments described herein may be utilized according to the presently disclosed subject matter. Accordingly, the appended claims are intended to include within their scope such processes, machines, manufacture, compositions of matter, means, methods, or steps.

Patents, patent applications, publications, product descriptions and protocols are cited throughout this application the disclosures of which are incorporated herein by reference in their entireties for all purposes.

We claim:

1. An umami pet food flavor composition comprising a compound of Formula Tm-2, and an additional compound selected from the group consisting of a nucleotide, a nucleotide derivative, an amino acid, and combinations thereof, wherein the compound of Formula Tm-2 is selected from the group consisting of:

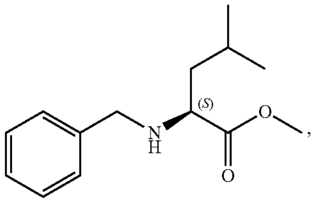
,

-continued

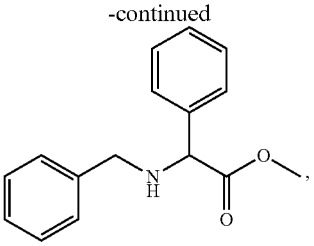

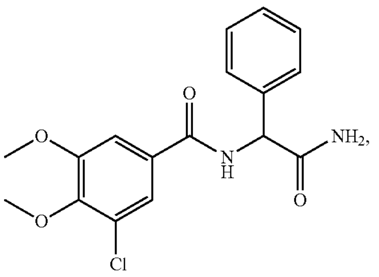

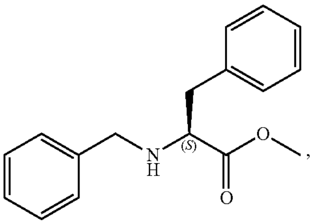

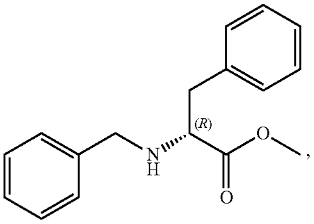

and combinations thereof, and wherein the compound of Formula Tm-2 imparts an umami flavor.

2. The flavor composition of claim 1, wherein the nucleotide is selected from the group consisting of guanosine monophosphate (GMP), guanosine diphosphate (GDP), guanosine triphosphate (GTP), adenosine monophosphate (AMP), adenosine diphosphate (ADP), adenosine triphosphate (ATP), cytidine monophosphate (CMP), cytidine diphosphate (CDP), cytidine triphosphate (CTP), inosine monophosphate (IMP), inosine diphosphate (IDP), inosine triphosphate (ITP), uridine monophosphate (UMP), uridine diphosphate (UDP), uridine triphosphate (UTP), thymidine monophosphate (TMP), thymidine diphosphate (TDP), thymidine triphosphate (TTP), xanthosine monophosphate (XMP), xanthosine diphosphate (XDP), xanthosine triphosphate (XTP), and combinations thereof.

3. The flavor composition of claim 2, wherein the nucleotide is selected from the group consisting of guanosine monophosphate (GMP), inosine monophosphate (IMP), and a combination thereof.

4. The flavor composition of claim 1, further comprising an amino acid selected from the group consisting of tryptophan, phenylalanine, histidine, glycine, cysteine, alanine, tyrosine, serine, methionine, asparagine, leucine, and combinations thereof.

5. The flavor composition of claim 4, wherein the amino acid is alanine.

6. The flavor composition of claim 4, wherein the amino acid is glycine.

7. The flavor composition of claim 4, wherein the amino acid is histidine.

8. The flavor composition of claim 1, further comprising an amino acid selected from the group consisting of asparagine, threonine, isoleucine, proline, glutamic acid, aspartic acid, hydroxyl proline, arginine, cystine, glutamine, lysine, valine, ornithine, monosodium glutamate, taurine, and combinations thereof.

9. The flavor composition of claim 1, comprising a first amino acid selected from the group consisting of tryptophan, phenylalanine, histidine, glycine, cysteine, alanine, tyrosine, serine, methionine, asparagine, leucine, and combinations thereof, and a second amino acid selected from the group consisting of threonine, isoleucine, proline, glutamic acid, aspartic acid, hydroxyl proline, arginine, cystine, glutamine, lysine, valine, ornithine, monosodium glutamate, taurine, and combinations thereof.

10. The flavor composition of claim 1, further comprising alanine and guanosine monophosphate (GMP).

11. The flavor composition of claim 1, further comprising alanine and inosine monophosphate (IMP).

12. The flavor composition of claim 1, further comprising a nucleotide derivative selected from the group consisting of:

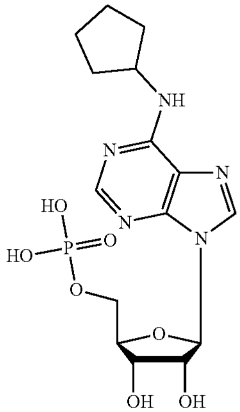

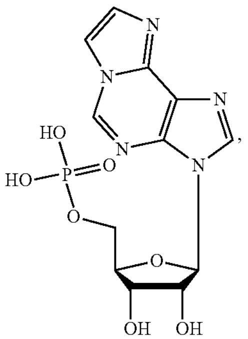

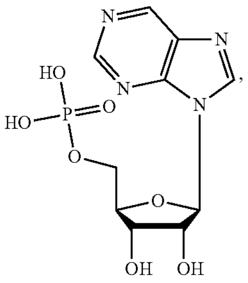

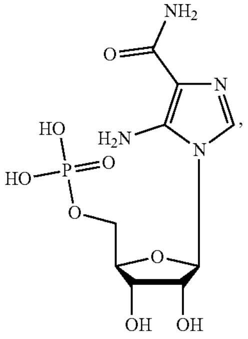

-continued
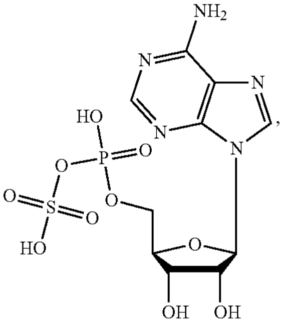
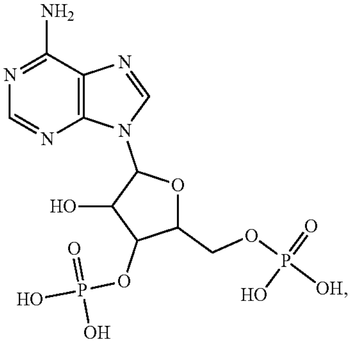
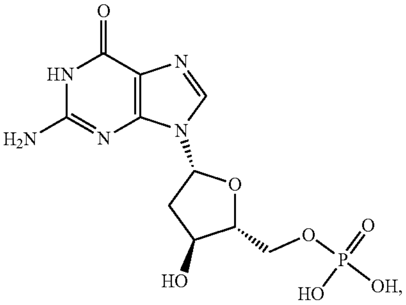
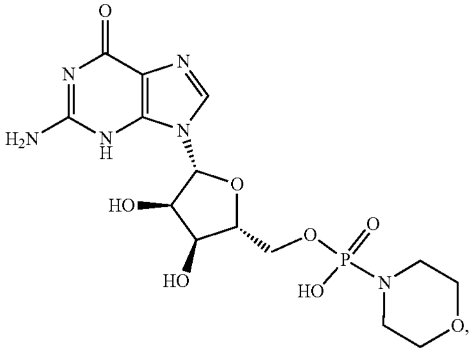
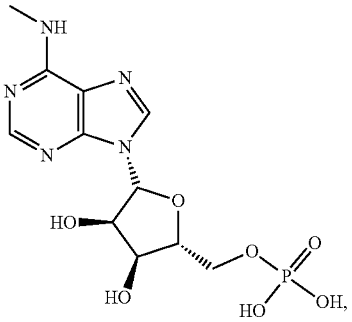
-continued
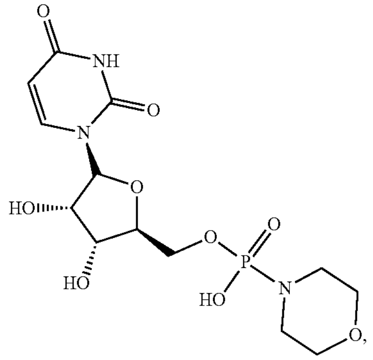
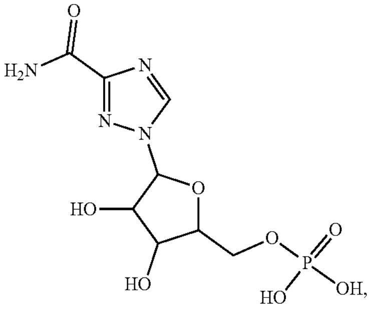
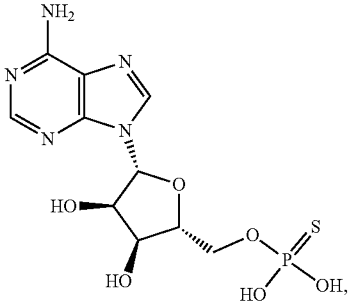
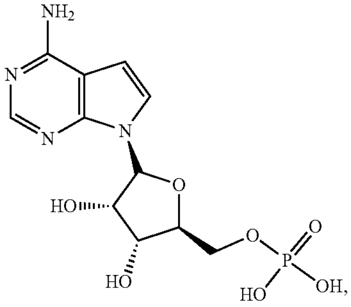
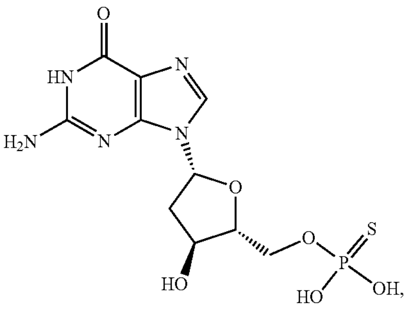

-continued
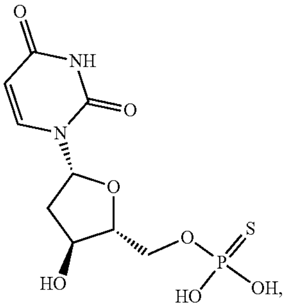
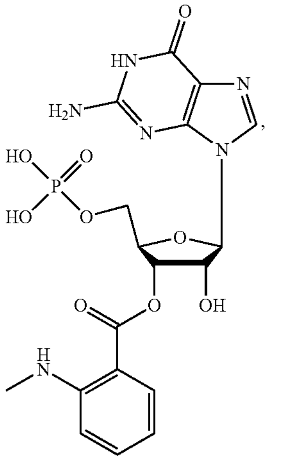
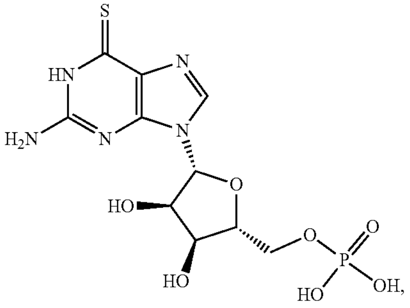
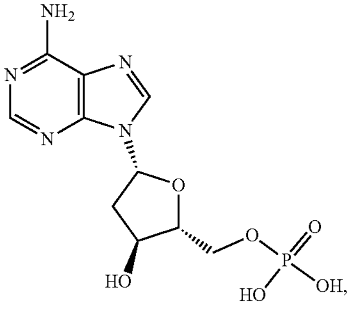
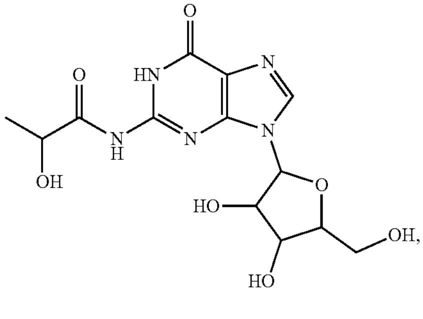
-continued
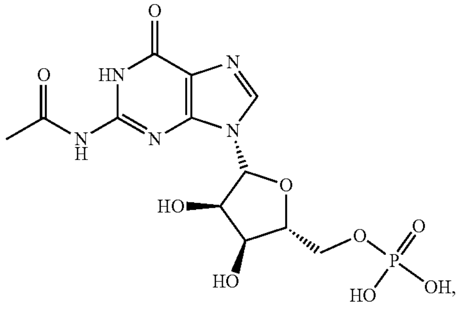
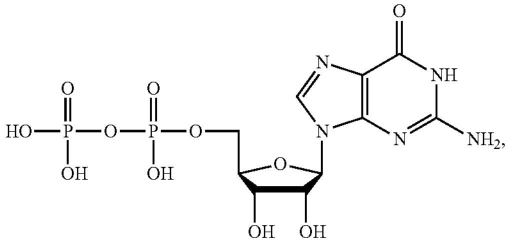
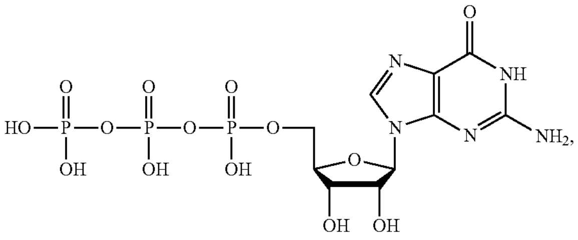
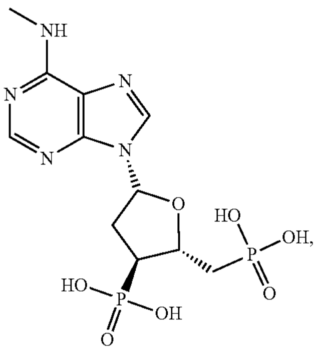
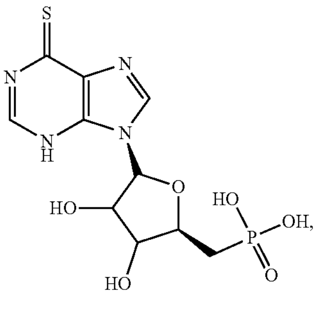

-continued
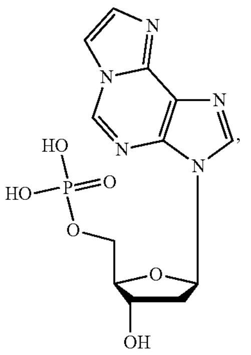
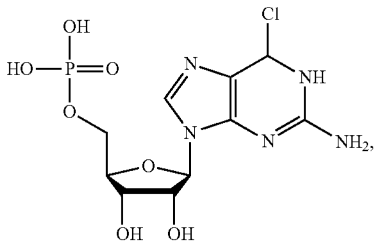
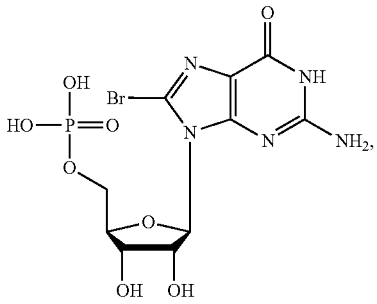
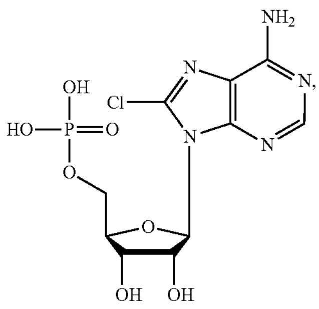
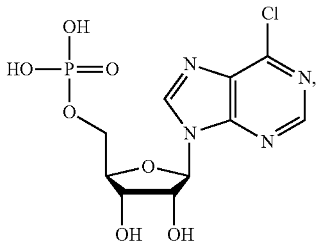
-continued
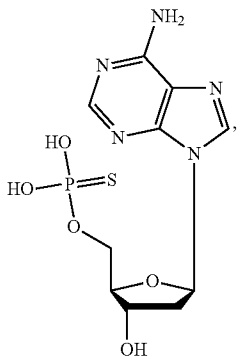
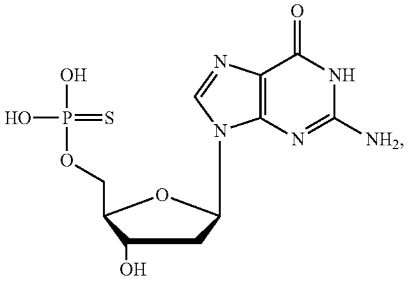
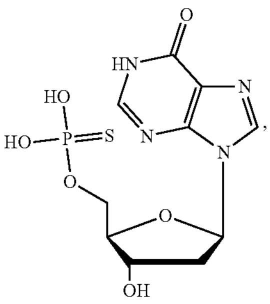
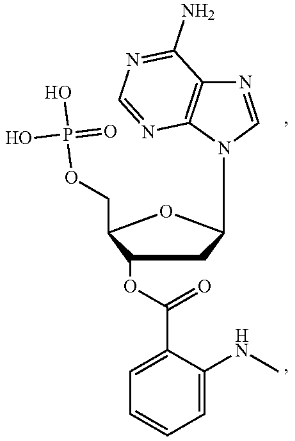
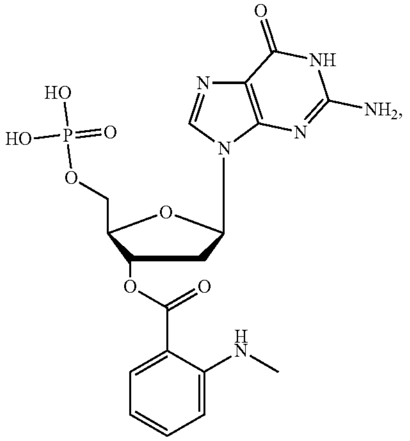

-continued
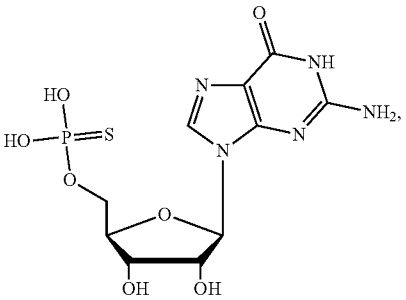
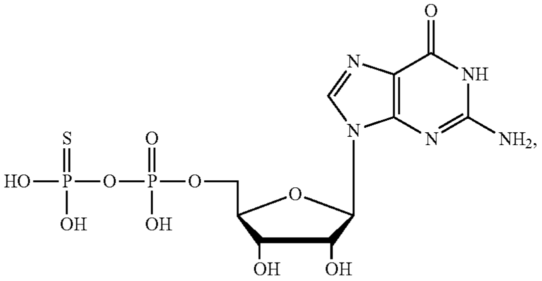
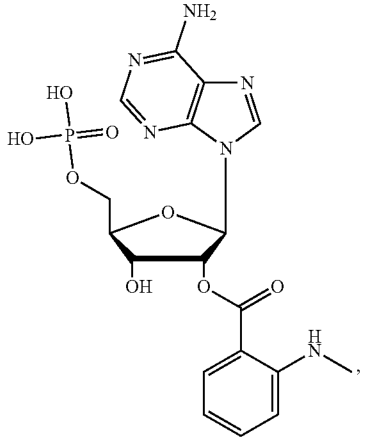
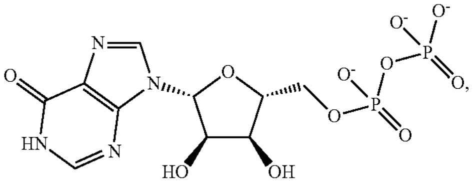
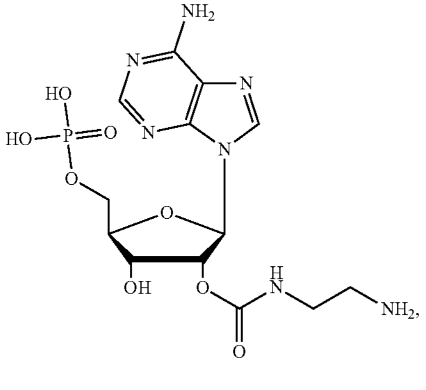
-continued
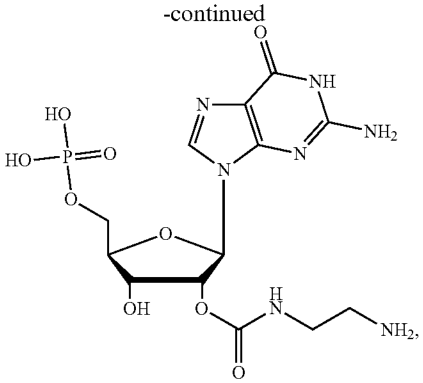
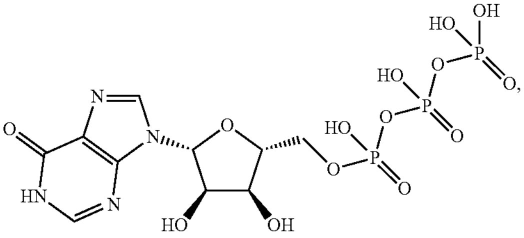
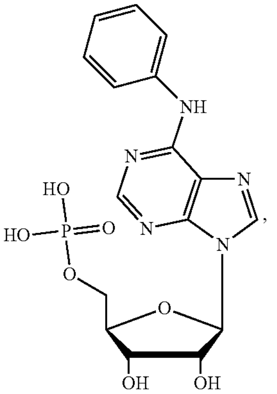
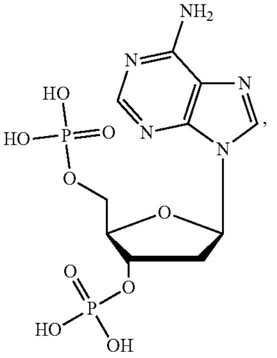
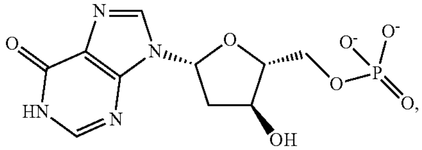
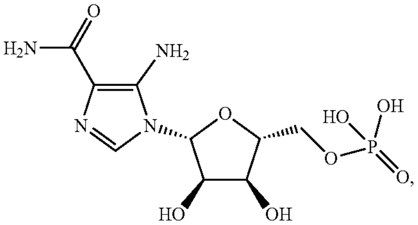

-continued
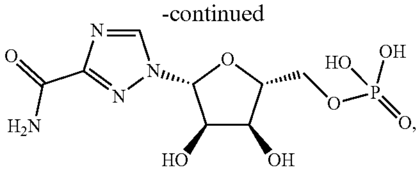
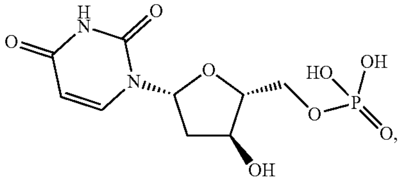
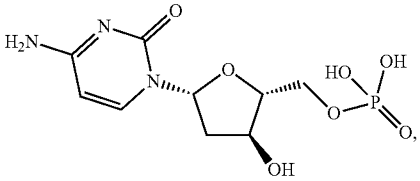
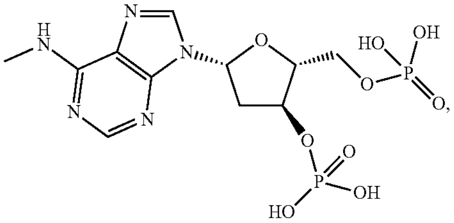
-continued
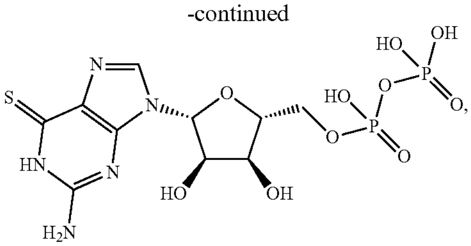
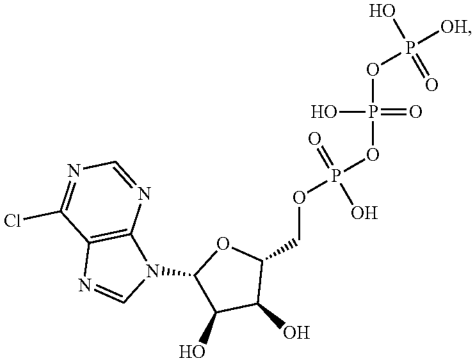
and combinations thereof.
* * * * *

SEQUENCE LISTING

```
<160> NUMBER OF SEQ ID NOS: 4

<210> SEQ ID NO 1
<211> LENGTH: 2526
<212> TYPE: DNA
<213> ORGANISM: Felis catus

<400> SEQUENCE: 1

atgtcactcc cggcggctca cctggtcggc ctgcagctct ccctctcctg ctgctgggct     60

ctcagctgcc acagcacaga gacgtctgcc gacttcagcc tccctgggga ttacctcctc    120

gcaggtctgt tccctctgca ctctgactgt ccgggcgtga ggcaccggcc cacggtgacc    180

ctctgtgaca ggcccgacag cttcaacggt cacggctacc acctcttcca ggccatgcgg    240

tttggcatcg aggagataaa caactccacg gccctcctgc cgaacgtcac cctgggatac    300

cagctgtacg acgtgtgctc ggagtctgcc aacgtgtatg ccacactaaa cgtgctctcc    360

ctgctgggga cacatcacgt agagatccga gcagaccctt cccactattc gcccgccgcc    420

ctggctgtca ttgggcctga caccaccaac cacgcagcca ccactgcagc cctgctgagc    480

cccttcctgg tgcccctgat cagctacgag gccagcagcg tgacgctcgg agtgaagcgg    540

cattacccct cgtttctgcg caccatcccc agcgacaagc accaggtgga ggccatggtg    600

ctgctgctgc agagcttcgg gtgggtctgg atctcggtgg tcggcagcga cggcgactac    660

gggcagctgg gggtgcaggc gctggaggag caggccaccc agcagggcat ctgcgttgcc    720

ttcaaggaca tcatcccctt ctctgcccgg ccgggcgacg agaggatgca gggcatcatg    780

caccacctgg cccgagcgag gaccaccgtt gtggtcgttt tctccagcag gcagctggcc    840

agggtgttct ttgagtcggt ggtgctggcc aacctgactg ccaaggtgtg gatcgcctca    900

gaagactggg ccatctctag acacatcagc aatgtgcccg ggatccaggg cattggcaca    960

gtgctgggtg tggccatcca gcagaggctt gtccctggcc tgaaggagtt tgaagaggcc   1020

tatgtccagg cagataaggg ggcccctggg ccttgctcca ggacctccga gtgcagcagc   1080

aaccagctct gtagagagtg tcgggctttc acggcagagc agatgcccac gctcggggca   1140

ttctccatga gctctgctta taacgcctac cgggcagtct acgcagtggc ccatggcctc   1200

caccagctcc tgggctgtgc ctctggagcc tgttccaggg accgagtcta cccctggcag   1260

cttctggagc agatccgcaa ggtgaatttc ctcctacaca aggacaccgt gaggtttaat   1320

gacaacgggg accctctcag tggctacgac ataattgcct gggactggag tggccccaag   1380

tggaacttca gggtcattgg ctcctccatg tggcctccag ttcagctgga cataaataaa   1440

accaaaatcc ggtggcacgg gaaggacaac caggtgccaa agtctgtgtg ctccagcgac   1500

tgcctcgaag ggcaccagcg agtgatttcg ggtttctacc actgttgctt tgagtgtgtg   1560

ccctgtgagg ccgggagctt cctcaacaag agcgacctcc acagctgcca gccttgtggg   1620

aaagaagagt gggcacccgc gggaagtgaa acctgctttc cacgcaccgt ggtgtttttg   1680

acttggcacg agaccatctc ttgggtgctg ctggcagcta atacgttgct gctgctgctg   1740

gtgactggga ctgctggcct gtttgcctgg cacttagaca cccctgtggt gaagtccgct   1800

gggggccgac tgtgcttctt catgctgggc tccctggcag gggcagctg tgggctctac    1860

ggctttttg gggagcccac gctgcccaca tgcttgttgc gccaaagcct ccttgccctg    1920
```

```
ggttttgcca tcttcctgtc ctgcctgacc atccgctcct tccaactggt cttcatcttc   1980

aagttttctg ccaaggtacc caccttctac cgtgcctggg tccaaaacca cggtcctggc   2040

ctatttgtgg tgatcagctc aatggcccag ctgctcatct gtctaacttg gctggcggtg   2100

tggaccccac tgcccaccag ggagtaccag cgcttccctc agctggtggt gcttgattgc   2160

acagaggcca actcaccggg cttcatgttg gctttcgcct acaatggcct cctgtccgtc   2220

agcgcctttg cctgcagcta cctgggcaag gacctgccag agaactacaa cgaggccaaa   2280

tgtgtcactt ttagtctgct gctcaacttc gtgtcctgga ttgccttctt caccacggcc   2340

agcgtctacc agggcaagta cttgcccgcg gtcaacgtgc tggcggcgct gagcagcctg   2400

agtggcggct tcagcggtta tttcctcccc aagtgctacg tgatcctgtg ccgcccagat   2460

ctcaacagca cagagcactt ccaggcctcc atccaggagt acacgaggcg ctgcggctcc   2520

acctga                                                              2526


<210> SEQ ID NO 2
<211> LENGTH: 841
<212> TYPE: PRT
<213> ORGANISM: Felis catus

<400> SEQUENCE: 2

Met Ser Leu Pro Ala Ala His Leu Val Gly Leu Gln Leu Ser Leu Ser
1               5                   10                  15

Cys Cys Trp Ala Leu Ser Cys His Ser Thr Glu Thr Ser Ala Asp Phe
            20                  25                  30

Ser Leu Pro Gly Asp Tyr Leu Leu Ala Gly Leu Phe Pro Leu His Ser
        35                  40                  45

Asp Cys Pro Gly Val Arg His Arg Pro Thr Val Thr Leu Cys Asp Arg
    50                  55                  60

Pro Asp Ser Phe Asn Gly His Gly Tyr His Leu Phe Gln Ala Met Arg
65                  70                  75                  80

Phe Gly Ile Glu Glu Ile Asn Asn Ser Thr Ala Leu Leu Pro Asn Val
                85                  90                  95

Thr Leu Gly Tyr Gln Leu Tyr Asp Val Cys Ser Glu Ser Ala Asn Val
            100                 105                 110

Tyr Ala Thr Leu Asn Val Leu Ser Leu Leu Gly Thr His His Val Glu
        115                 120                 125

Ile Arg Ala Asp Pro Ser His Tyr Ser Pro Ala Ala Leu Ala Val Ile
    130                 135                 140

Gly Pro Asp Thr Thr Asn His Ala Ala Thr Thr Ala Ala Leu Leu Ser
145                 150                 155                 160

Pro Phe Leu Val Pro Leu Ile Ser Tyr Glu Ala Ser Ser Val Thr Leu
                165                 170                 175

Gly Val Lys Arg His Tyr Pro Ser Phe Leu Arg Thr Ile Pro Ser Asp
            180                 185                 190

Lys His Gln Val Glu Ala Met Val Leu Leu Leu Gln Ser Phe Gly Trp
        195                 200                 205

Val Trp Ile Ser Val Val Gly Ser Asp Gly Asp Tyr Gly Gln Leu Gly
    210                 215                 220

Val Gln Ala Leu Glu Glu Gln Ala Thr Gln Gln Gly Ile Cys Val Ala
225                 230                 235                 240

Phe Lys Asp Ile Ile Pro Phe Ser Ala Arg Pro Gly Asp Glu Arg Met
                245                 250                 255
```

-continued

```
Gln Gly Ile Met His His Leu Ala Arg Ala Arg Thr Thr Val Val Val
            260                 265                 270

Val Phe Ser Ser Arg Gln Leu Ala Arg Val Phe Phe Glu Ser Val Val
        275                 280                 285

Leu Ala Asn Leu Thr Ala Lys Val Trp Ile Ala Ser Glu Asp Trp Ala
    290                 295                 300

Ile Ser Arg His Ile Ser Asn Val Pro Gly Ile Gln Gly Ile Gly Thr
305                 310                 315                 320

Val Leu Gly Val Ala Ile Gln Gln Arg Leu Val Pro Gly Leu Lys Glu
                325                 330                 335

Phe Glu Glu Ala Tyr Val Gln Ala Asp Lys Gly Ala Pro Gly Pro Cys
            340                 345                 350

Ser Arg Thr Ser Glu Cys Ser Ser Asn Gln Leu Cys Arg Glu Cys Arg
        355                 360                 365

Ala Phe Thr Ala Glu Gln Met Pro Thr Leu Gly Ala Phe Ser Met Ser
    370                 375                 380

Ser Ala Tyr Asn Ala Tyr Arg Ala Val Tyr Ala Val Ala His Gly Leu
385                 390                 395                 400

His Gln Leu Leu Gly Cys Ala Ser Gly Ala Cys Ser Arg Asp Arg Val
                405                 410                 415

Tyr Pro Trp Gln Leu Leu Glu Gln Ile Arg Lys Val Asn Phe Leu Leu
            420                 425                 430

His Lys Asp Thr Val Arg Phe Asn Asp Asn Gly Asp Pro Leu Ser Gly
        435                 440                 445

Tyr Asp Ile Ile Ala Trp Asp Trp Ser Gly Pro Lys Trp Asn Phe Arg
    450                 455                 460

Val Ile Gly Ser Ser Met Trp Pro Pro Val Gln Leu Asp Ile Asn Lys
465                 470                 475                 480

Thr Lys Ile Arg Trp His Gly Lys Asp Asn Gln Val Pro Lys Ser Val
                485                 490                 495

Cys Ser Ser Asp Cys Leu Glu Gly His Gln Arg Val Ile Ser Gly Phe
            500                 505                 510

Tyr His Cys Cys Phe Glu Cys Val Pro Cys Glu Ala Gly Ser Phe Leu
        515                 520                 525

Asn Lys Ser Asp Leu His Ser Cys Gln Pro Cys Gly Lys Glu Glu Trp
    530                 535                 540

Ala Pro Ala Gly Ser Glu Thr Cys Phe Pro Arg Thr Val Val Phe Leu
545                 550                 555                 560

Thr Trp His Glu Thr Ile Ser Trp Val Leu Leu Ala Ala Asn Thr Leu
                565                 570                 575

Leu Leu Leu Leu Val Thr Gly Thr Ala Gly Leu Phe Ala Trp His Leu
            580                 585                 590

Asp Thr Pro Val Val Lys Ser Ala Gly Gly Arg Leu Cys Phe Phe Met
        595                 600                 605

Leu Gly Ser Leu Ala Gly Gly Ser Cys Gly Leu Tyr Gly Phe Phe Gly
    610                 615                 620

Glu Pro Thr Leu Pro Thr Cys Leu Leu Arg Gln Ser Leu Leu Ala Leu
625                 630                 635                 640

Gly Phe Ala Ile Phe Leu Ser Cys Leu Thr Ile Arg Ser Phe Gln Leu
                645                 650                 655

Val Phe Ile Phe Lys Phe Ser Ala Lys Val Pro Thr Phe Tyr Arg Ala
            660                 665                 670

Trp Val Gln Asn His Gly Pro Gly Leu Phe Val Val Ile Ser Ser Met
```

-continued

```
        675                 680                 685

Ala Gln Leu Leu Ile Cys Leu Thr Trp Leu Ala Val Trp Thr Pro Leu
    690                 695                 700

Pro Thr Arg Glu Tyr Gln Arg Phe Pro Gln Leu Val Val Leu Asp Cys
705                 710                 715                 720

Thr Glu Ala Asn Ser Pro Gly Phe Met Leu Ala Phe Ala Tyr Asn Gly
                725                 730                 735

Leu Leu Ser Val Ser Ala Phe Ala Cys Ser Tyr Leu Gly Lys Asp Leu
            740                 745                 750

Pro Glu Asn Tyr Asn Glu Ala Lys Cys Val Thr Phe Ser Leu Leu Leu
        755                 760                 765

Asn Phe Val Ser Trp Ile Ala Phe Phe Thr Thr Ala Ser Val Tyr Gln
    770                 775                 780

Gly Lys Tyr Leu Pro Ala Val Asn Val Leu Ala Ala Leu Ser Ser Leu
785                 790                 795                 800

Ser Gly Gly Phe Ser Gly Tyr Phe Leu Pro Lys Cys Tyr Val Ile Leu
                805                 810                 815

Cys Arg Pro Asp Leu Asn Ser Thr Glu His Phe Gln Ala Ser Ile Gln
            820                 825                 830

Glu Tyr Thr Arg Arg Cys Gly Ser Thr
        835                 840
```

<210> SEQ ID NO 3
<211> LENGTH: 2597
<212> TYPE: DNA
<213> ORGANISM: Felis catus

<400> SEQUENCE: 3

```
atgcccggcc tcgctctcct gggcctcacg gctctcctgg gcctcacggc tccttggacc     60

acggggaggg cgcaacgtcc tgcttgtcac agcagctcag gatgcagggg gactatgtgc    120

tgggtgggct cttccctctg ggctctgccg agggtacagg tcttggcgac gggctgcagc    180

ccaatgccac cgtgtgcacc aggttctcgt ctctgggcct gctctgggcg ctggccgtga    240

agatggcggt ggaggagatc aacaacgggt cggccctgct gcccgggctg cacctgggct    300

atgacctctt tgacacgtgt tcagagccca tggtggccat gaagcccagc ctcgtgttca    360

tggccaaagc aggcagctgc agcattgccg cctactgcaa ttacacacag taccagcccc    420

gcgtgctggc cgtcatcggg ccccactcgt ctgagctcgc cctcgtcacc ggcaagttct    480

tcagcttctt ccttgtgcct caggtcagct acggcgccag caccgaccgg ctgagcaacc    540

gggagatctt cccgtccttc ttccgcacgg tgcccagcga ccaggtgcag gtggcggcca    600

tggtggagct gctgcaggag ctcggctgga actgggtggc ggcggtgggt agtgacgacg    660

agtatggccg gcagggcctg agcctcttct ccggcctggc cagcgccagg ggcatctgca    720

tcgcgcatga gggcctggtg ccactgccgc caggcagcct gcggctgggc gccctacagg    780

gcctgctgcg ccaggtgaac cagagcagcg tgcaggtggt ggtgctgttc tcctccgccc    840

acgcggcccg caccctcttc agctacagca tccgctgcaa gctctcaccc aaggtgtggg    900

tggccagcga ggcctggctg acctcagacc tggtcatgac gctgcccggc atgcctgggg    960

tgggcaccgt gctgggcttc ctgcagcagg gcgccccgat gccggagttc ccatcctacg   1020

tgcggacccg cctggccctg gccgctgacc ctgccttctg cgcctcgctg gacgctgaac   1080

agccaggcct ggaggagcac gtggtggggc cacgctgccc ccaatgtgac cacgtcacgc   1140

tagagaacct atctgcgggg ctgctgcacc accagacctt cgctgcctac gcggctgtgt   1200
```

```
atggcgtggc ccaggccctt cacaacacac tgcgctgcaa tgcctcgggc tgccccaggc   1260
gggagcctgt gcggccctgg cagctcctag agaacatgta caacgtgagc ttccgtgctc   1320
gcggcctggc actgcagttc gacgccagcg ggaacgtgaa cgtggattac gacctgaaac   1380
tgtgggtgtg gcaggacccg acgcccgagc tgcgcaccgt aggcaccttc aagggccgcc   1440
tggagctctg gcgctctcag atgtgctggc acacgccggg gaagcagcag cccgtgtccc   1500
agtgctcccg gcagtgcaag gagggccagg tgcgccgcgt gaagggcttc cactcttgct   1560
gttacgactg cgtggactgc aaggcgggca gttatcagcg caacccagat gacctcctct   1620
gcacccagtg tgaccaggac cagtggtccc cagaccggag cacacgctgc ttcgcccgca   1680
agcccatgtt cctggcatgg ggggagccag ctgtgctgct actgctcgcg ctgctggctc   1740
tggcgctggg cctggcgctg gcagccctgg ggctcttcct ctggcactcg gacagcccgc   1800
tggttcaggc ctcaggtggg ccacgggcct gctttggcct ggcctgcctg ggcctggtct   1860
gcctcagtgt cctcctgttc cctggccagc caggccctgc cagctgcctg gcccagcagc   1920
cactgttcca cctcccactc actggctgcc tgagcacgct tttcctgcaa gcggccgaga   1980
tatttgtggg gtcggagctg ccaccaagct gggctgagaa gatgcgtggc cgcctgcggg   2040
ggccctgggc ctggctggtg gtgctgcttg ctatgctggc agaagccgca ttgtgtgcct   2100
ggtacctggt agccttcccg ccagaggtgg tgacggactg gcgggtactg cccacagagg   2160
cgctggtgca ctgccacgtg cactcctgga tcagcttcgg cctggtgcat gccactaacg   2220
ccatgctggc cttcctctgc ttcctgggca ctttcctggt gcagagccgg ccaggccgct   2280
acaatggtgc ccgcggcctc acctttgcca tgctggccta cttcatcacc tggatctcct   2340
ttgtgcccct ctttgccaat gtgcacgtgg cctaccagcc tgccgtgcag atgggcacca   2400
tcctcctctg tgccctgggt atcctagcca ccttccacct gcccaagtgc tacctgctgc   2460
tgcagcggcc ggagctcaac acccctgagt tcttcctgga agacaatgcc agagcacagg   2520
gcagcagttg gggcaggggg aggggagaat cggggcaaaa acaagtgaca cccgatccag   2580
tgacctcacc gcagtga                                                  2597
```

<210> SEQ ID NO 4
<211> LENGTH: 865
<212> TYPE: PRT
<213> ORGANISM: Felis catus

<400> SEQUENCE: 4

```
Met Pro Gly Leu Ala Leu Leu Gly Leu Thr Ala Leu Leu Gly Leu Thr
1               5                   10                  15

Ala Leu Leu Asp His Gly Glu Gly Ala Thr Ser Cys Leu Ser Gln Gln
            20                  25                  30

Leu Arg Met Gln Gly Asp Tyr Val Leu Gly Gly Leu Phe Pro Leu Gly
        35                  40                  45

Ser Ala Glu Gly Thr Gly Leu Gly Asp Gly Leu Gln Pro Asn Ala Thr
    50                  55                  60

Val Cys Thr Arg Phe Ser Ser Leu Gly Leu Leu Trp Ala Leu Ala Val
65                  70                  75                  80

Lys Met Ala Val Glu Glu Ile Asn Asn Gly Ser Ala Leu Leu Pro Gly
                85                  90                  95

Leu His Leu Gly Tyr Asp Leu Phe Asp Thr Cys Ser Glu Pro Met Val
            100                 105                 110

Ala Met Lys Pro Ser Leu Val Phe Met Ala Lys Ala Gly Ser Cys Ser
```

-continued

```
        115                 120                 125

Ile Ala Ala Tyr Cys Asn Tyr Thr Gln Tyr Gln Pro Arg Val Leu Ala
    130                 135                 140

Val Ile Gly Pro His Ser Ser Glu Leu Ala Leu Val Thr Gly Lys Phe
145                 150                 155                 160

Phe Ser Phe Phe Leu Val Pro Gln Val Ser Tyr Gly Ala Ser Thr Asp
                165                 170                 175

Arg Leu Ser Asn Arg Glu Ile Phe Pro Ser Phe Phe Arg Thr Val Pro
            180                 185                 190

Ser Asp Gln Val Gln Val Ala Ala Met Val Glu Leu Leu Gln Glu Leu
        195                 200                 205

Gly Trp Asn Trp Val Ala Ala Val Gly Ser Asp Asp Glu Tyr Gly Arg
    210                 215                 220

Gln Gly Leu Ser Leu Phe Ser Gly Leu Ala Ser Ala Arg Gly Ile Cys
225                 230                 235                 240

Ile Ala His Glu Gly Leu Val Pro Leu Pro Pro Gly Ser Leu Arg Leu
                245                 250                 255

Gly Ala Leu Gln Gly Leu Leu Arg Gln Val Asn Gln Ser Ser Val Gln
            260                 265                 270

Val Val Val Leu Phe Ser Ser Ala His Ala Ala Arg Thr Leu Phe Ser
        275                 280                 285

Tyr Ser Ile Arg Cys Lys Leu Ser Pro Lys Val Trp Val Ala Ser Glu
    290                 295                 300

Ala Trp Leu Thr Ser Asp Leu Val Met Thr Leu Pro Gly Met Pro Gly
305                 310                 315                 320

Val Gly Thr Val Leu Gly Phe Leu Gln Gln Gly Ala Pro Met Pro Glu
                325                 330                 335

Phe Pro Ser Tyr Val Arg Thr Arg Leu Ala Leu Ala Ala Asp Pro Ala
            340                 345                 350

Phe Cys Ala Ser Leu Asp Ala Glu Gln Pro Gly Leu Glu Glu His Val
        355                 360                 365

Val Gly Pro Arg Cys Pro Gln Cys Asp His Val Thr Leu Glu Asn Leu
    370                 375                 380

Ser Ala Gly Leu Leu His His Gln Thr Phe Ala Ala Tyr Ala Ala Val
385                 390                 395                 400

Tyr Gly Val Ala Gln Ala Leu His Asn Thr Leu Arg Cys Asn Ala Ser
                405                 410                 415

Gly Cys Pro Arg Arg Glu Pro Val Arg Pro Trp Gln Leu Leu Glu Asn
            420                 425                 430

Met Tyr Asn Val Ser Phe Arg Ala Arg Gly Leu Ala Leu Gln Phe Asp
        435                 440                 445

Ala Ser Gly Asn Val Asn Val Asp Tyr Asp Leu Lys Leu Trp Val Trp
    450                 455                 460

Gln Asp Pro Thr Pro Glu Leu Arg Thr Val Gly Thr Phe Lys Gly Arg
465                 470                 475                 480

Leu Glu Leu Trp Arg Ser Gln Met Cys Trp His Thr Pro Gly Lys Gln
                485                 490                 495

Gln Pro Val Ser Gln Cys Ser Arg Gln Cys Lys Glu Gly Gln Val Arg
            500                 505                 510

Arg Val Lys Gly Phe His Ser Cys Cys Tyr Asp Cys Val Asp Cys Lys
        515                 520                 525

Ala Gly Ser Tyr Gln Arg Asn Pro Asp Asp Leu Leu Cys Thr Gln Cys
    530                 535                 540
```

-continued

```
Asp Gln Asp Gln Trp Ser Pro Asp Arg Ser Thr Arg Cys Phe Ala Arg
545                 550                 555                 560

Lys Pro Met Phe Leu Ala Trp Gly Glu Pro Ala Val Leu Leu Leu Leu
                565                 570                 575

Ala Leu Leu Ala Leu Ala Leu Gly Leu Ala Leu Ala Ala Leu Gly Leu
            580                 585                 590

Phe Leu Trp His Ser Asp Ser Pro Leu Val Gln Ala Ser Gly Gly Pro
        595                 600                 605

Arg Ala Cys Phe Gly Leu Ala Cys Leu Gly Leu Val Cys Leu Ser Val
    610                 615                 620

Leu Leu Phe Pro Gly Gln Pro Gly Pro Ala Ser Cys Leu Ala Gln Gln
625                 630                 635                 640

Pro Leu Phe His Leu Pro Leu Thr Gly Cys Leu Ser Thr Leu Phe Leu
                645                 650                 655

Gln Ala Ala Glu Ile Phe Val Gly Ser Glu Leu Pro Pro Ser Trp Ala
            660                 665                 670

Glu Lys Met Arg Gly Arg Leu Arg Gly Pro Trp Ala Trp Leu Val Val
        675                 680                 685

Leu Leu Ala Met Leu Ala Glu Ala Ala Leu Cys Ala Trp Tyr Leu Val
    690                 695                 700

Ala Phe Pro Pro Glu Val Val Thr Asp Trp Arg Val Leu Pro Thr Glu
705                 710                 715                 720

Ala Leu Val His Cys His Val His Ser Trp Ile Ser Phe Gly Leu Val
                725                 730                 735

His Ala Thr Asn Ala Met Leu Ala Phe Leu Cys Phe Leu Gly Thr Phe
            740                 745                 750

Leu Val Gln Ser Arg Pro Gly Arg Tyr Asn Gly Ala Arg Gly Leu Thr
        755                 760                 765

Phe Ala Met Leu Ala Tyr Phe Ile Thr Trp Ile Ser Phe Val Pro Leu
    770                 775                 780

Phe Ala Asn Val His Val Ala Tyr Gln Pro Ala Val Gln Met Gly Thr
785                 790                 795                 800

Ile Leu Leu Cys Ala Leu Gly Ile Leu Ala Thr Phe His Leu Pro Lys
                805                 810                 815

Cys Tyr Leu Leu Leu Gln Arg Pro Glu Leu Asn Thr Pro Glu Phe Phe
            820                 825                 830

Leu Glu Asp Asn Ala Arg Ala Gln Gly Ser Ser Trp Gly Gln Gly Arg
        835                 840                 845

Gly Glu Ser Gly Gln Lys Gln Val Thr Pro Asp Pro Val Thr Ser Pro
    850                 855                 860

Gln
865
```